US012093524B2

(12) United States Patent
Smochko et al.

(10) Patent No.: US 12,093,524 B2
(45) Date of Patent: Sep. 17, 2024

(54) MULTIFUNCTION DEVICE CONTROL OF ANOTHER ELECTRONIC DEVICE

(71) Applicant: Apple Inc., Cupertino, CA (US)

(72) Inventors: Michael S. Smochko, San Jose, CA (US); Justin T. Voss, Santa Clara, CA (US); Eliza J. Von Hagen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/451,319

(22) Filed: Oct. 18, 2021

(65) Prior Publication Data

US 2022/0035521 A1 Feb. 3, 2022

Related U.S. Application Data

(63) Continuation of application No. 16/067,511, filed as application No. PCT/US2017/024377 on Mar. 27, (Continued)

(51) Int. Cl.
*G06F 3/01* (2006.01)
*G06F 3/0354* (2013.01)

(Continued)

(52) U.S. Cl.
CPC ...... *G06F 3/04883* (2013.01); *G06F 3/03547* (2013.01); *G06F 3/038* (2013.01);

(Continued)

(58) Field of Classification Search
None
See application file for complete search history.

(56) References Cited

U.S. PATENT DOCUMENTS 5,483,261 A 1/1996 Yasutake
5,488,204 A 1/1996 Mead et al.

(Continued)

FOREIGN PATENT DOCUMENTS

CN 102298502 A 12/2011
CN 102736856 A 10/2012

(Continued)

OTHER PUBLICATIONS

Final Office Action received for U.S. Appl. No. 15/272,405, dated Jun. 8, 2017, 22 pages.

(Continued)

*Primary Examiner* — Carl Adams
(74) *Attorney, Agent, or Firm* — Kubota & Basol LLP

(57) ABSTRACT

Some embodiments described in this disclosure are directed to one or more input devices that simulate dedicated remote control functionality for navigating and playing content items available on other electronic devices, and one or more operations related to the above that the input devices and other electronic devices optionally perform. Some embodiments described in this disclosure are directed to one or more multifunction devices via which keyboard input to electronic devices is provided, and one or more operations related to the above that the multifunction devices and the electronic devices optionally perform. Some embodiments described in this disclosure are directed to one or more multifunction devices via which control and/or navigational inputs to electronic devices is provided, and one or more operations related to the above that the multifunction devices and the electronic devices optionally perform.

54 Claims, 251 Drawing Sheets

Related U.S. Application Data

2017, now Pat. No. 11,150,798, which is a continuation-in-part of application No. 15/272,405, filed on Sep. 21, 2016, now Pat. No. 10,042,599.

(60) Provisional application No. 62/314,342, filed on Mar. 28, 2016, provisional application No. 62/348,700, filed on Jun. 10, 2016, provisional application No. 62/369,174, filed on Jul. 31, 2016, provisional application No. 62/476,778, filed on Mar. 25, 2017.

(51) Int. Cl.

*G06F 3/038* (2013.01)
*G06F 3/0482* (2013.01)
*G06F 3/04842* (2022.01)
*G06F 3/04883* (2022.01)

(52) U.S. Cl.

CPC ........ *G06F 3/0482* (2013.01); *G06F 3/04842* (2013.01); *G06F 2203/04105* (2013.01)

(56) References Cited

U.S. PATENT DOCUMENTS

| | | | |
|---|---|---|---|
| 5,825,352 | A | 10/1998 | Bisset et al. |
| 5,831,664 | A | 11/1998 | Wharton et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,570,557 | B1 | 5/2003 | Westerman et al. |
| 6,677,932 | B1 | 1/2004 | Westerman |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,032,338 | B2 | 5/2015 | Murrett et al. |
| 9,134,809 | B1 | 9/2015 | Mak |
| 9,189,096 | B2 | 11/2015 | Townsend et al. |
| 9,348,458 | B2 | 5/2016 | Hotelling et al. |
| 9,389,745 | B1 | 7/2016 | Leatham |
| 9,609,108 | B2 | 3/2017 | Miura |
| 9,716,774 | B2 | 7/2017 | Brodersen et al. |
| 9,933,937 | B2 | 4/2018 | Lemay et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2006/0267857 | A1 | 11/2006 | Zhang et al. |
| 2007/0008293 | A1 | 1/2007 | Oldrey |
| 2007/0092243 | A1 | 4/2007 | Allen et al. |
| 2010/0011299 | A1 | 1/2010 | Brodersen et al. |
| 2010/0146437 | A1 | 6/2010 | Woodcock et al. |
| 2011/0043326 | A1 | 2/2011 | Lee et al. |
| 2011/0113088 | A1 | 5/2011 | Seo et al. |
| 2012/0084662 | A1 | 4/2012 | Navarro et al. |
| 2012/0306748 | A1 | 12/2012 | Fleizach et al. |
| 2013/0050095 | A1* | 2/2013 | Nakajima ........... H01H 13/703 345/168 |
| 2013/0103797 | A1 | 4/2013 | Park et al. |
| 2013/0151989 | A1 | 6/2013 | Dent et al. |
| 2013/0179813 | A1 | 7/2013 | Bianrosa et al. |
| 2013/0239045 | A1 | 9/2013 | Lindberg et al. |
| 2013/0291015 | A1 | 10/2013 | Pan |
| 2013/0307785 | A1 | 11/2013 | Matsunaga |
| 2013/0318468 | A1 | 11/2013 | Lee |
| 2013/0321268 | A1 | 12/2013 | Tuck et al. |
| 2014/0066285 | A1* | 3/2014 | Beall .................... C03C 14/006 501/32 |
| 2014/0071075 | A1* | 3/2014 | Yamamoto ........... G06F 3/0488 345/173 |
| 2014/0118247 | A1 | 5/2014 | Nomura et al. |
| 2014/0181659 | A1 | 6/2014 | Kumar |
| 2014/0267932 | A1 | 9/2014 | Riddell et al. |
| 2014/0320398 | A1 | 10/2014 | Papstein |
| 2014/0340208 | A1* | 11/2014 | Tan ....................... H01H 57/00 340/407.2 |
| 2014/0359477 | A1 | 12/2014 | Chen |
| 2015/0004945 | A1 | 1/2015 | Steeves et al. |
| 2015/0054766 | A1* | 2/2015 | Ishida ................ G06F 3/04166 345/173 |
| 2015/0058804 | A1 | 2/2015 | Kim |
| 2015/0130688 | A1 | 5/2015 | Li et al. |
| 2015/0194047 | A1 | 7/2015 | Lu |
| 2015/0249733 | A1 | 9/2015 | Miura |
| 2016/0034058 | A1 | 2/2016 | Stauber et al. |
| 2016/0041750 | A1 | 2/2016 | Cieplinski et al. |
| 2016/0073172 | A1 | 3/2016 | Sharples |
| 2016/0088359 | A1 | 3/2016 | Vaidhyanathan et al. |
| 2016/0187988 | A1* | 6/2016 | Levesque ............... G06F 3/016 345/156 |
| 2016/0266747 | A1 | 9/2016 | Leatham |
| 2016/0349946 | A1 | 12/2016 | Koh et al. |
| 2017/0075641 | A1 | 3/2017 | Kwon et al. |
| 2017/0078428 | A1 | 3/2017 | Unter |
| 2017/0083135 | A1* | 3/2017 | Sheik-Nainar ........ G06F 3/0488 |
| 2017/0277498 | A1 | 9/2017 | Wood et al. |
| 2019/0034075 | A1 | 1/2019 | Smochko et al. |

FOREIGN PATENT DOCUMENTS

| | | | |
|---|---|---|---|
| CN | 104144184 | A | 11/2014 |
| CN | 104731502 | A | 6/2015 |
| JP | 2000-163031 | A | 6/2000 |
| JP | 2002-342033 | A | 11/2002 |
| WO | 2013/169849 | A2 | 11/2013 |
| WO | 2014/105276 | A1 | 7/2014 |
| WO | 2014/210304 | A1 | 12/2014 |

OTHER PUBLICATIONS

International Search Report received for PCT Patent Application No. PCT/US2017/024377, dated Aug. 16, 2017, 6 pages.

Non-Final Office Action received for U.S. Appl. No. 15/272,405, dated Dec. 15, 2016, 21 pages.

Non-Final Office Action received for U.S. Appl. No. 16/067,511, dated Dec. 3, 2020, 7 pages.

Non-Final Office Action received for U.S. Appl. No. 16/067,511, dated Mar. 26, 2020, 6 pages.

Notice of Allowability received for U.S. Appl. No. 16/067,511, dated Jul. 8, 2021, 3 pages.

Notice of Allowance received for U.S. Appl. No. 16/067,511, dated Jun. 3, 2021, 10 pages.

Notice of Allowance received for U.S. Appl. No. 15/272,405, dated Jul. 12, 2018, 4 pages.

Notice of Allowance received for U.S. Appl. No. 15/272,405, dated Mar. 22, 2018, 9 pages.

Search Report received for Danish Patent Application No. PA 201670583, dated Oct. 12, 2016, 8 pages.

Search Report received for European Patent Application No. 17776411.5, dated Feb. 12, 2019, 4 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for

(56) References Cited

OTHER PUBLICATIONS the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Extended European Search Report received for European Patent Application No. 22157606.9, dated Aug. 3, 2022, 7 Pages.
Extended European Search Report received for European Patent Application No. 23201810.1, mailed on Apr. 24, 2024, 7 pages.
Search Report received for Chinese Patent Application No. 202311375088.0, mailed on Jun. 19, 2024, 5 pages (3 pages of English Translation and 2 pages of Official Copy).

* cited by examiner

700

Figure 13A:
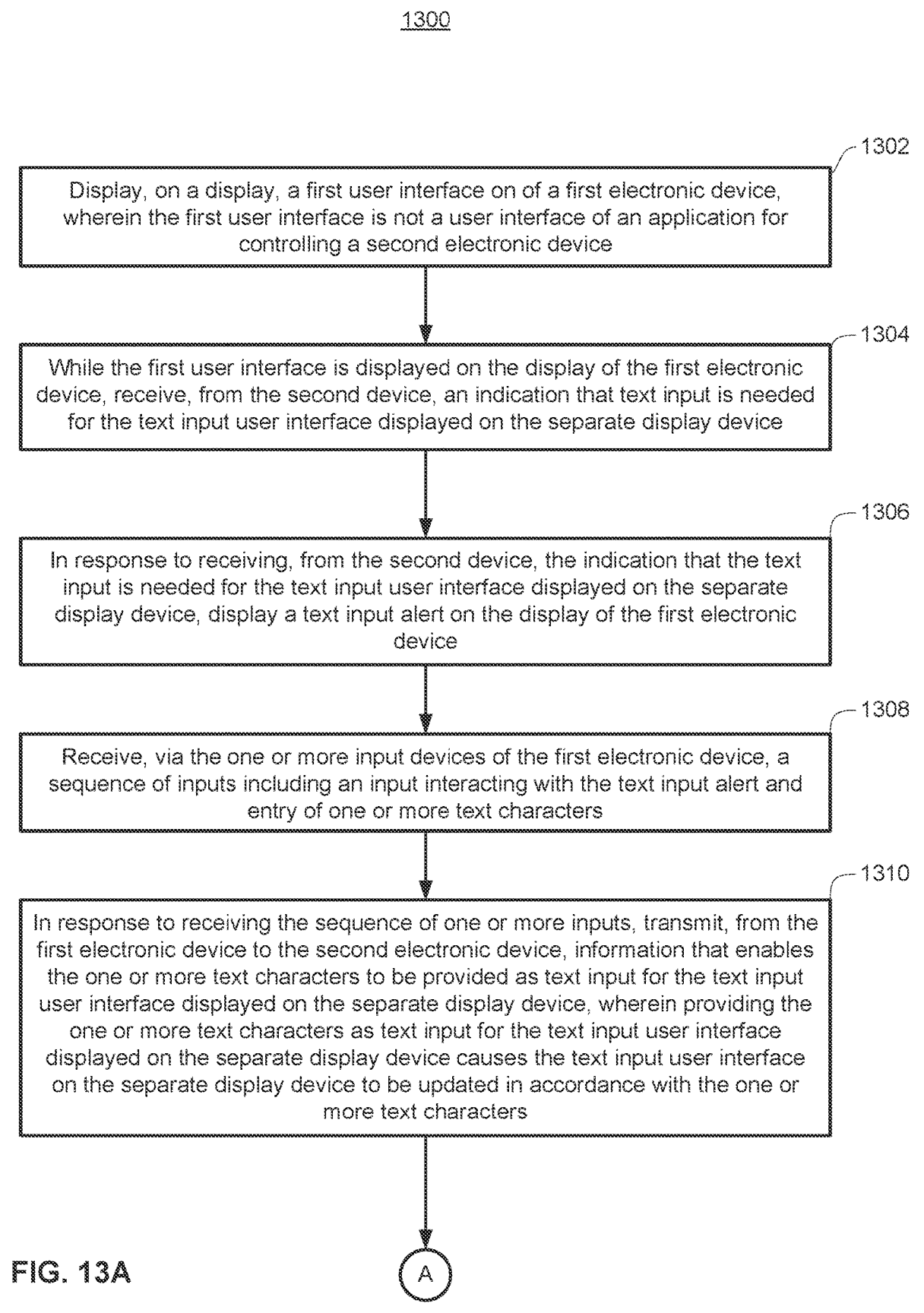

1300

1302: Display, on a display, a first user interface on of a first electronic device, wherein the first user interface is not a user interface of an application for controlling a second electronic device 1304: While the first user interface is displayed on the display of the first electronic device, receive, from the second device, an indication that text input is needed for the text input user interface displayed on the separate display device 1306: In response to receiving, from the second device, the indication that the text input is needed for the text input user interface displayed on the separate display device, display a text input alert on the display of the first electronic device 1308: Receive, via the one or more input devices of the first electronic device, a sequence of inputs including an input interacting with the text input alert and entry of one or more text characters 1310: In response to receiving the sequence of one or more inputs, transmit, from the first electronic device to the second electronic device, information that enables the one or more text characters to be provided as text input for the text input user interface displayed on the separate display device, wherein providing the one or more text characters as text input for the text input user interface displayed on the separate display device causes the text input user interface on the separate display device to be updated in accordance with the one or more text characters

Figure 15A:
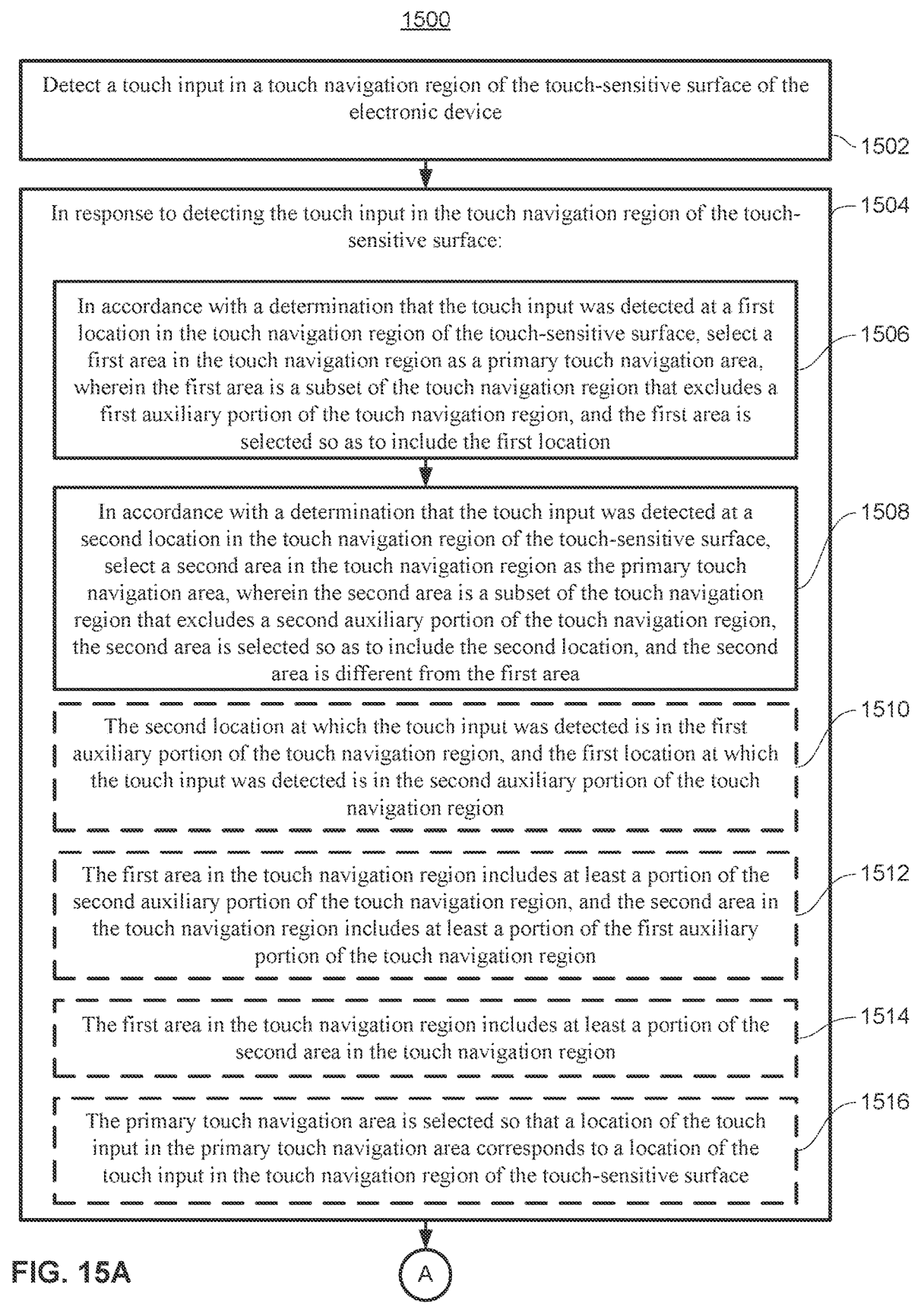

Detect a touch input in a touch navigation region of the touch-sensitive surface of the electronic device — 1502

In response to detecting the touch input in the touch navigation region of the touch-sensitive surface: — 1504

In accordance with a determination that the touch input was detected at a first location in the touch navigation region of the touch-sensitive surface, select a first area in the touch navigation region as a primary touch navigation area, wherein the first area is a subset of the touch navigation region that excludes a first auxiliary portion of the touch navigation region, and the first area is selected so as to include the first location — 1506

In accordance with a determination that the touch input was detected at a second location in the touch navigation region of the touch-sensitive surface, select a second area in the touch navigation region as the primary touch navigation area, wherein the second area is a subset of the touch navigation region that excludes a second auxiliary portion of the touch navigation region, the second area is selected so as to include the second location, and the second area is different from the first area — 1508

The second location at which the touch input was detected is in the first auxiliary portion of the touch navigation region, and the first location at which the touch input was detected is in the second auxiliary portion of the touch navigation region — 1510

The first area in the touch navigation region includes at least a portion of the second auxiliary portion of the touch navigation region, and the second area in the touch navigation region includes at least a portion of the first auxiliary portion of the touch navigation region — 1512

The first area in the touch navigation region includes at least a portion of the second area in the touch navigation region — 1514

The primary touch navigation area is selected so that a location of the touch input in the primary touch navigation area corresponds to a location of the touch input in the touch navigation region of the touch-sensitive surface — 1516

Figure 15C:
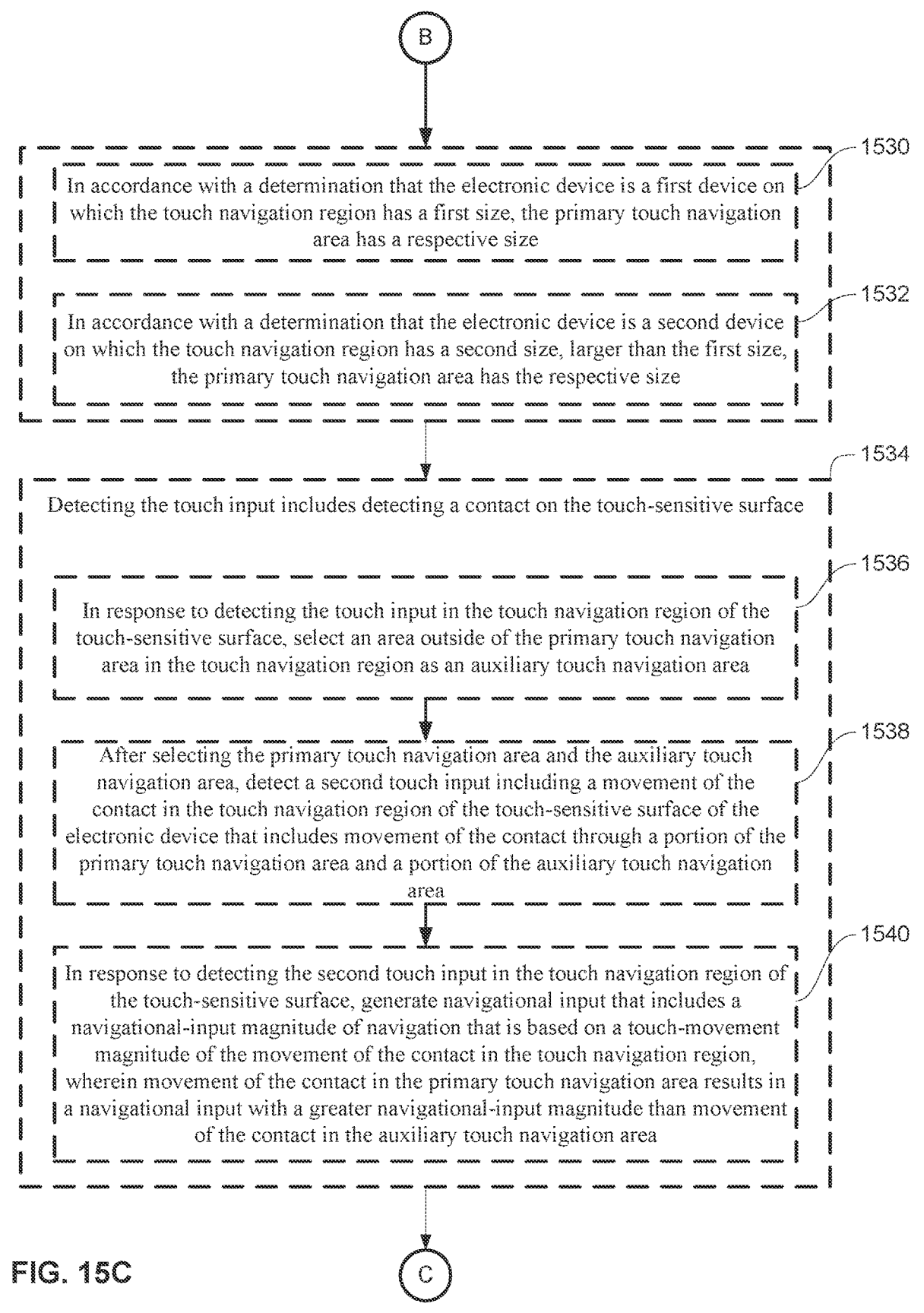

In accordance with a determination that the electronic device is a first device on which the touch navigation region has a first size, the primary touch navigation area has a respective size

1532

In accordance with a determination that the electronic device is a second device on which the touch navigation region has a second size, larger than the first size, the primary touch navigation area has the respective size

1534

Detecting the touch input includes detecting a contact on the touch-sensitive surface

1536

In response to detecting the touch input in the touch navigation region of the touch-sensitive surface, select an area outside of the primary touch navigation area in the touch navigation region as an auxiliary touch navigation area

1538

After selecting the primary touch navigation area and the auxiliary touch navigation area, detect a second touch input including a movement of the contact in the touch navigation region of the touch-sensitive surface of the electronic device that includes movement of the contact through a portion of the primary touch navigation area and a portion of the auxiliary touch navigation area

1540

In response to detecting the second touch input in the touch navigation region of the touch-sensitive surface, generate navigational input that includes a navigational-input magnitude of navigation that is based on a touch-movement magnitude of the movement of the contact in the touch navigation region, wherein movement of the contact in the primary touch navigation area results in a navigational input with a greater navigational-input magnitude than movement of the contact in the auxiliary touch navigation area

Figure 15E:
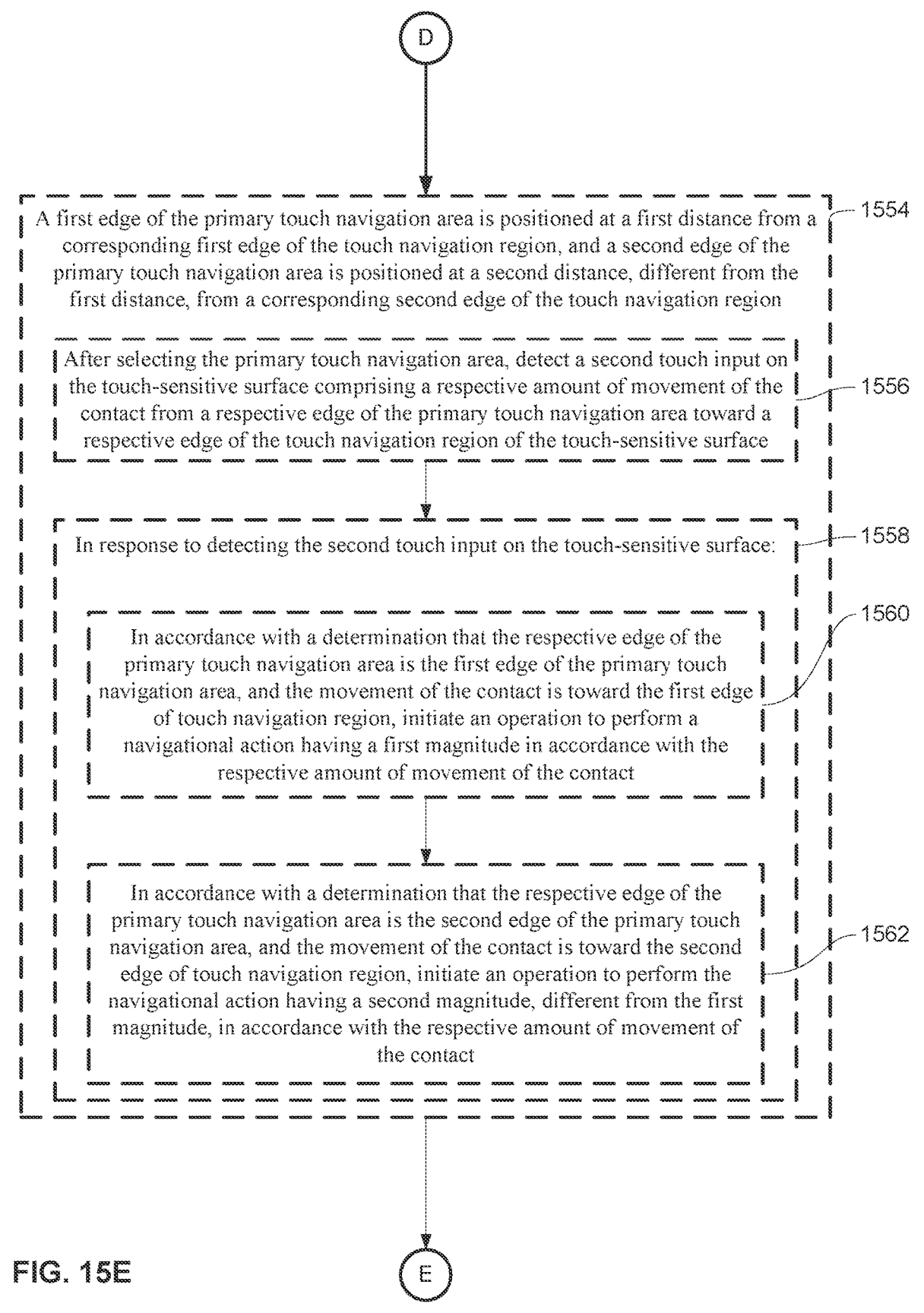

A first edge of the primary touch navigation area is positioned at a first distance from a corresponding first edge of the touch navigation region, and a second edge of the primary touch navigation area is positioned at a second distance, different from the first distance, from a corresponding second edge of the touch navigation region 1554

After selecting the primary touch navigation area, detect a second touch input on the touch-sensitive surface comprising a respective amount of movement of the contact from a respective edge of the primary touch navigation area toward a respective edge of the touch navigation region of the touch-sensitive surface 1556

In response to detecting the second touch input on the touch-sensitive surface: 1558

In accordance with a determination that the respective edge of the primary touch navigation area is the first edge of the primary touch navigation area, and the movement of the contact is toward the first edge of touch navigation region, initiate an operation to perform a navigational action having a first magnitude in accordance with the respective amount of movement of the contact 1560

In accordance with a determination that the respective edge of the primary touch navigation area is the second edge of the primary touch navigation area, and the movement of the contact is toward the second edge of touch navigation region, initiate an operation to perform the navigational action having a second magnitude, different from the first magnitude, in accordance with the respective amount of movement of the contact 1562

Figure 15G:
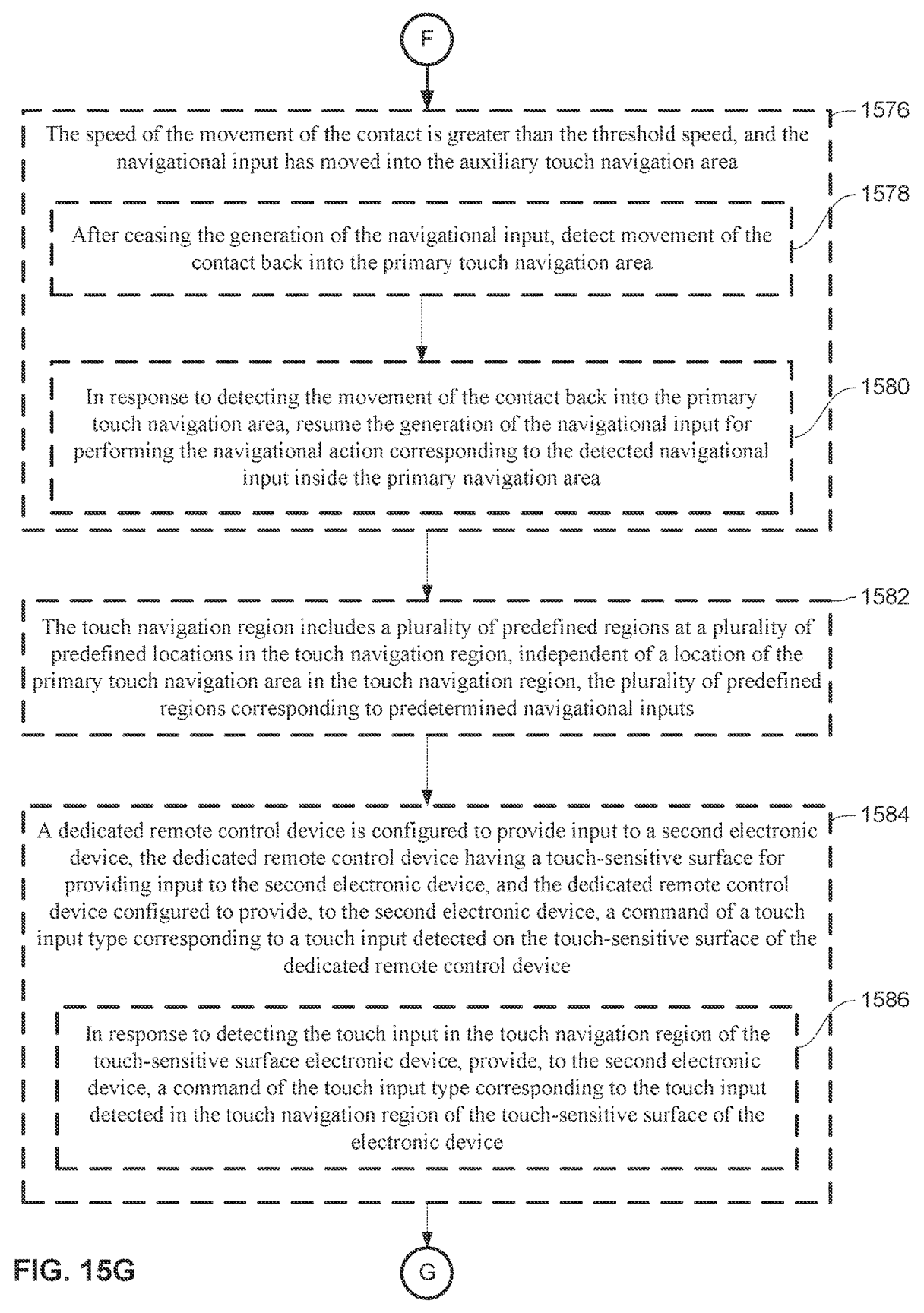

1576: The speed of the movement of the contact is greater than the threshold speed, and the navigational input has moved into the auxiliary touch navigation area 1578: After ceasing the generation of the navigational input, detect movement of the contact back into the primary touch navigation area 1580: In response to detecting the movement of the contact back into the primary touch navigation area, resume the generation of the navigational input for performing the navigational action corresponding to the detected navigational input inside the primary navigation area 1582: The touch navigation region includes a plurality of predefined regions at a plurality of predefined locations in the touch navigation region, independent of a location of the primary touch navigation area in the touch navigation region, the plurality of predefined regions corresponding to predetermined navigational inputs 1584: A dedicated remote control device is configured to provide input to a second electronic device, the dedicated remote control device having a touch-sensitive surface for providing input to the second electronic device, and the dedicated remote control device configured to provide, to the second electronic device, a command of a touch input type corresponding to a touch input detected on the touch-sensitive surface of the dedicated remote control device 1586: In response to detecting the touch input in the touch navigation region of the touch-sensitive surface electronic device, provide, to the second electronic device, a command of the touch input type corresponding to the touch input detected in the touch navigation region of the touch-sensitive surface of the electronic device

Figure 17A:
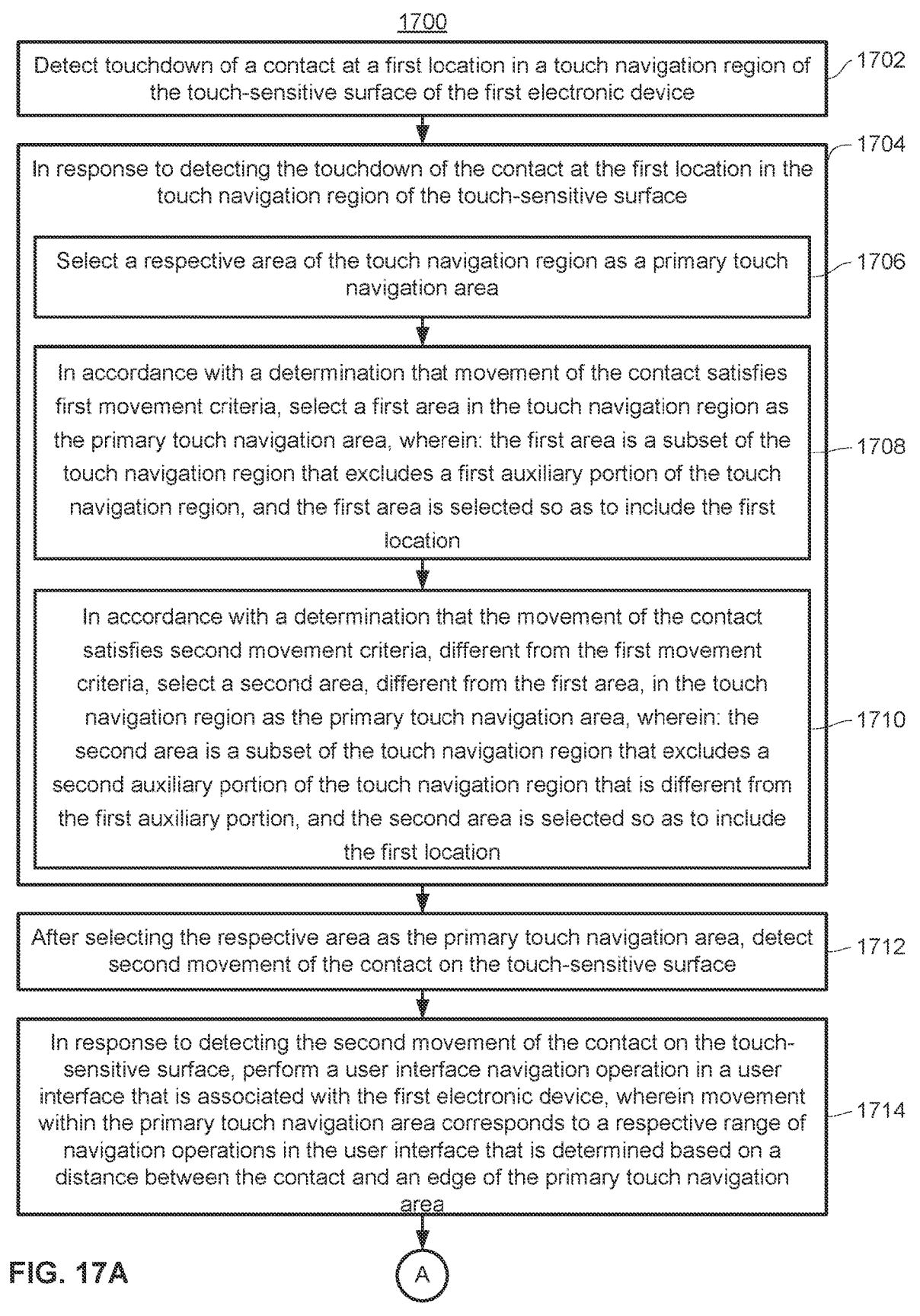

1702: Detect touchdown of a contact at a first location in a touch navigation region of the touch-sensitive surface of the first electronic device 1704: In response to detecting the touchdown of the contact at the first location in the touch navigation region of the touch-sensitive surface 1706: Select a respective area of the touch navigation region as a primary touch navigation area 1708: In accordance with a determination that movement of the contact satisfies first movement criteria, select a first area in the touch navigation region as the primary touch navigation area, wherein: the first area is a subset of the touch navigation region that excludes a first auxiliary portion of the touch navigation region, and the first area is selected so as to include the first location 1710: In accordance with a determination that the movement of the contact satisfies second movement criteria, different from the first movement criteria, select a second area, different from the first area, in the touch navigation region as the primary touch navigation area, wherein: the second area is a subset of the touch navigation region that excludes a second auxiliary portion of the touch navigation region that is different from the first auxiliary portion, and the second area is selected so as to include the first location 1712: After selecting the respective area as the primary touch navigation area, detect second movement of the contact on the touch-sensitive surface 1714: In response to detecting the second movement of the contact on the touch-sensitive surface, perform a user interface navigation operation in a user interface that is associated with the first electronic device, wherein movement within the primary touch navigation area corresponds to a respective range of navigation operations in the user interface that is determined based on a distance between the contact and an edge of the primary touch navigation area

Figure 17C:
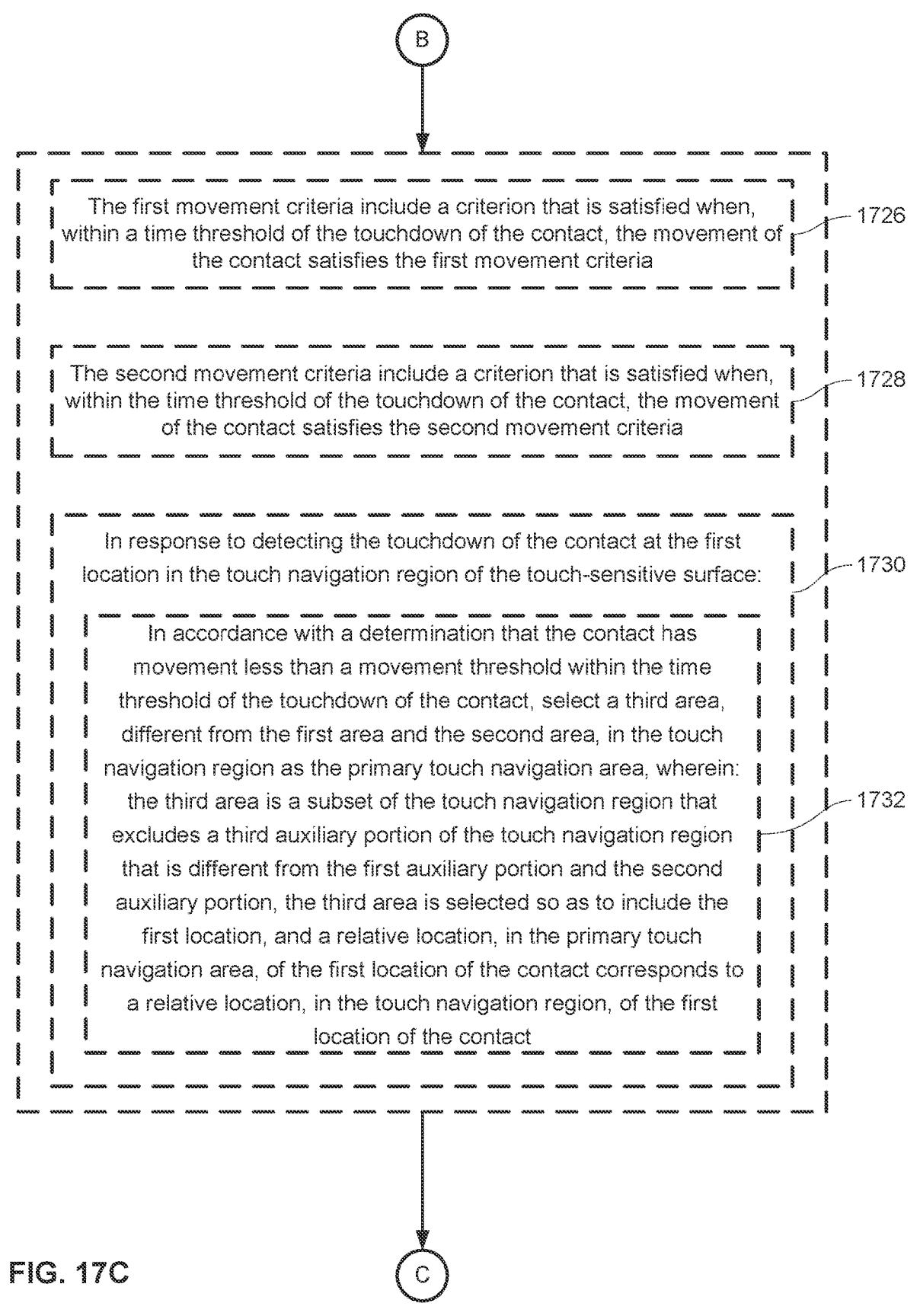

1726: The first movement criteria include a criterion that is satisfied when, within a time threshold of the touchdown of the contact, the movement of the contact satisfies the first movement criteria 1728: The second movement criteria include a criterion that is satisfied when, within the time threshold of the touchdown of the contact, the movement of the contact satisfies the second movement criteria 1730: In response to detecting the touchdown of the contact at the first location in the touch navigation region of the touch-sensitive surface:

1732: In accordance with a determination that the contact has movement less than a movement threshold within the time threshold of the touchdown of the contact, select a third area, different from the first area and the second area, in the touch navigation region as the primary touch navigation area, wherein: the third area is a subset of the touch navigation region that excludes a third auxiliary portion of the touch navigation region that is different from the first auxiliary portion and the second auxiliary portion, the third area is selected so as to include the first location, and a relative location, in the primary touch navigation area, of the first location of the contact corresponds to a relative location, in the touch navigation region, of the first location of the contact

MULTIFUNCTION DEVICE CONTROL OF ANOTHER ELECTRONIC DEVICE

CROSS REFERENCE TO RELATED APPLICATIONS

This application is a continuation of U.S. application Ser. No. 16/067,511, filed Jun. 29, 2018 (now published as U.S. Publication No. 2019-0034075), which is a National Phase Patent Application under 35 U.S.C. § 371 of International Application No. PCT/US2017/024377, filed Mar. 27, 2017, which is a continuation-in-part of U.S. patent application Ser. No. 15/272,405, filed Sep. 21, 2016 (now issued as U.S. Pat. No. 10,042,599) and claims benefit of U.S. Provisional Patent Application No. 62/314,342, filed Mar. 28, 2016, U.S. Provisional Patent Application No. 62/348,700, filed Jun. 10, 2016, U.S. Provisional Patent Application No. 62/369,174, filed Jul. 31, 2016, and U.S. Provisional Patent Application No. 62/476,778, filed Mar. 25, 2017, the entire disclosures of which are incorporated herein by reference for all purposes.

FIELD OF THE DISCLOSURE

This relates generally to controlling an electronic device using a multifunction device, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device has access to content (e.g., music, movies, etc.), and user interaction with such a device entails providing input, using a multifunction device, to the device. Enhancing these interactions improves the user's experience with the device and decreases user interaction time, which is particularly important where input devices are battery-operated.

SUMMARY OF THE DISCLOSURE

Some embodiments described in this disclosure are directed to one or more input devices that simulate dedicated remote control functionality for navigating and playing content items available on other electronic devices, and one or more operations related to the above that the input devices and other electronic devices optionally perform. Some embodiments described in this disclosure are directed to one or more multifunction devices via which keyboard input to electronic devices is provided, and one or more operations related to the above that the multifunction devices and the electronic devices optionally perform. Some embodiments described in this disclosure are directed to one or more multifunction devices via which control and/or navigational inputs to electronic devices is provided, and one or more operations related to the above that the multifunction devices and the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 13A-13K are flow diagrams illustrating a method of indicating, on a multifunction device, the need for text input to an electronic device in accordance with some embodiments of the disclosure.

FIGS. 15A-15H are flow diagrams illustrating a method of selecting a primary touch navigation area on the touch-sensitive surface of an electronic device that behaves similarly to the touch-sensitive surface of a dedicated remote control in accordance with some embodiments of the disclosure.

FIGS. 17A-17G are flow diagrams illustrating a method of selecting a primary touch navigation area on a touch-sensitive surface of an electronic device based on movement of a contact when it is first detected by the electronic device (e.g., when the contact touches down on the touch-sensitive surface) in accordance with some embodiments of the disclosure.

DETAILED DESCRIPTION

Figure 1A:
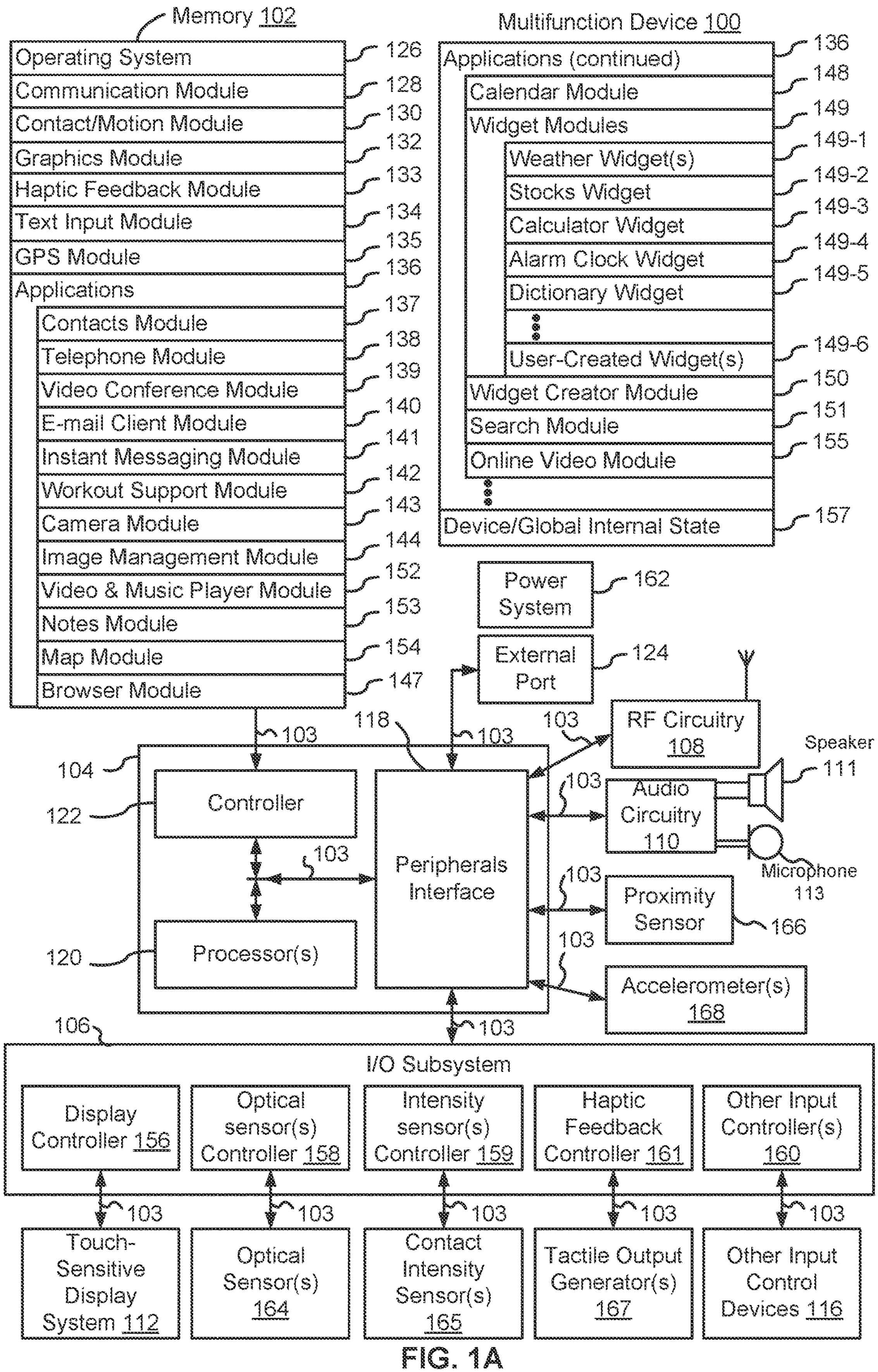
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

EXEMPLARY DEVICES

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, “Unlocking a Device by Performing Gestures on an Unlock Image,” filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed “graphics”). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2402/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2406; (2) U.S. patent application Ser. No. 10/840,862, "Multipoint Touchscreen," filed May 6, 2404; (3) U.S. patent application Ser. No. 10/903,964, "Gestures For Touch Sensitive Input Devices," filed Jul. 30, 2404; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional HandHeld Device," filed Mar. 3, 2406. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050230059, "Acceleration-based Theft Detection System for Portable Electronic Devices," and U.S. Patent Publication No. 24060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
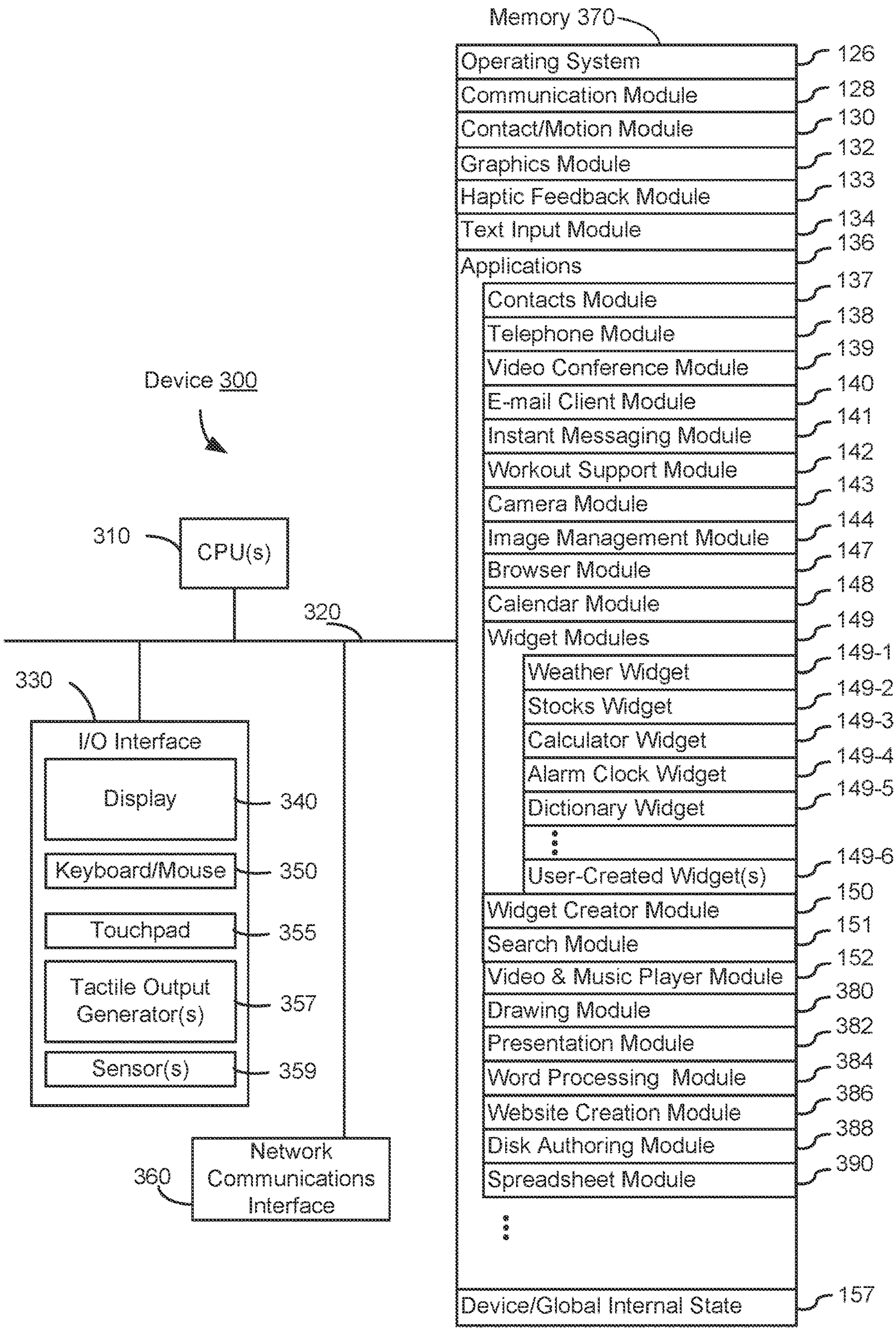
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts).

Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
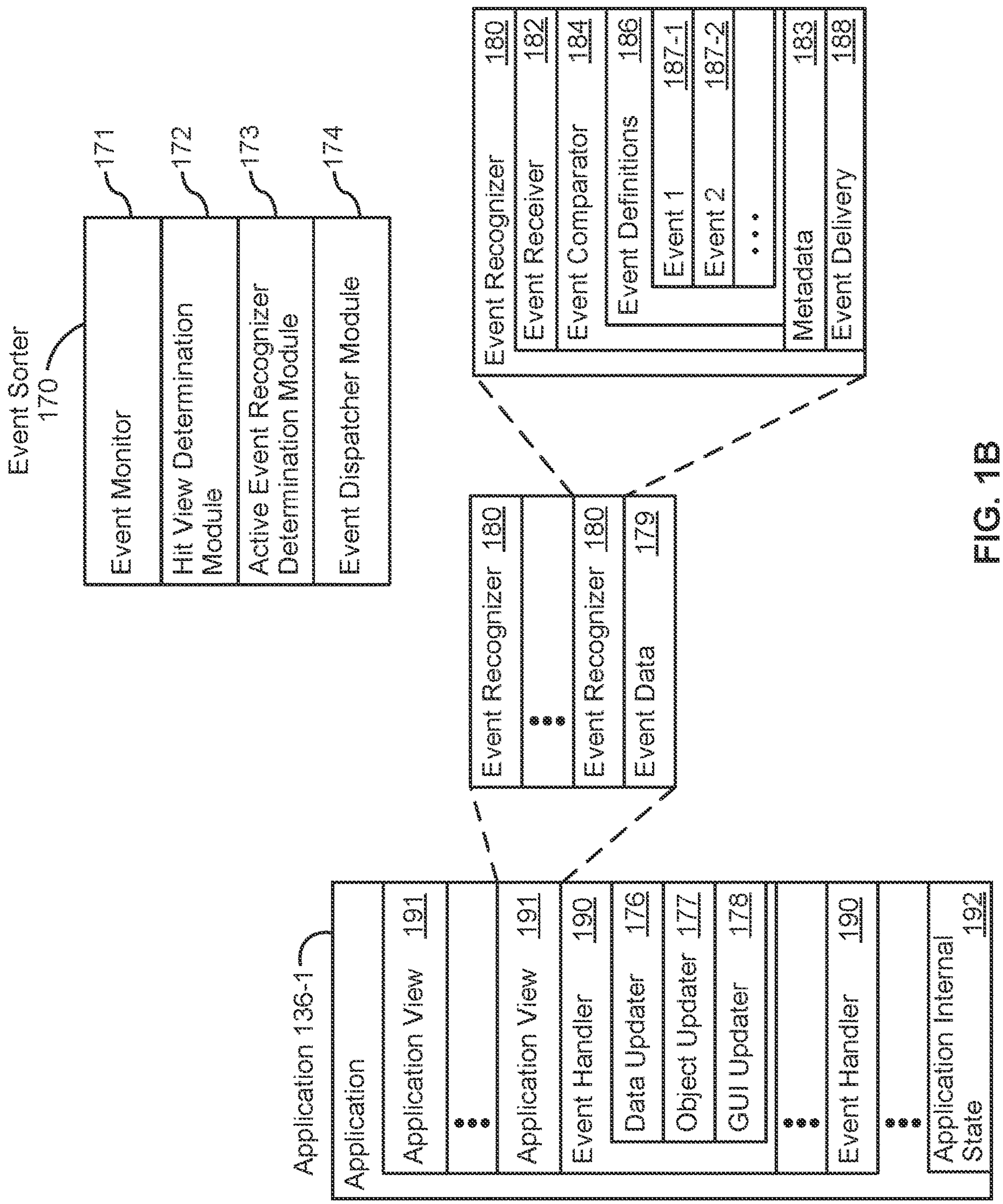
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
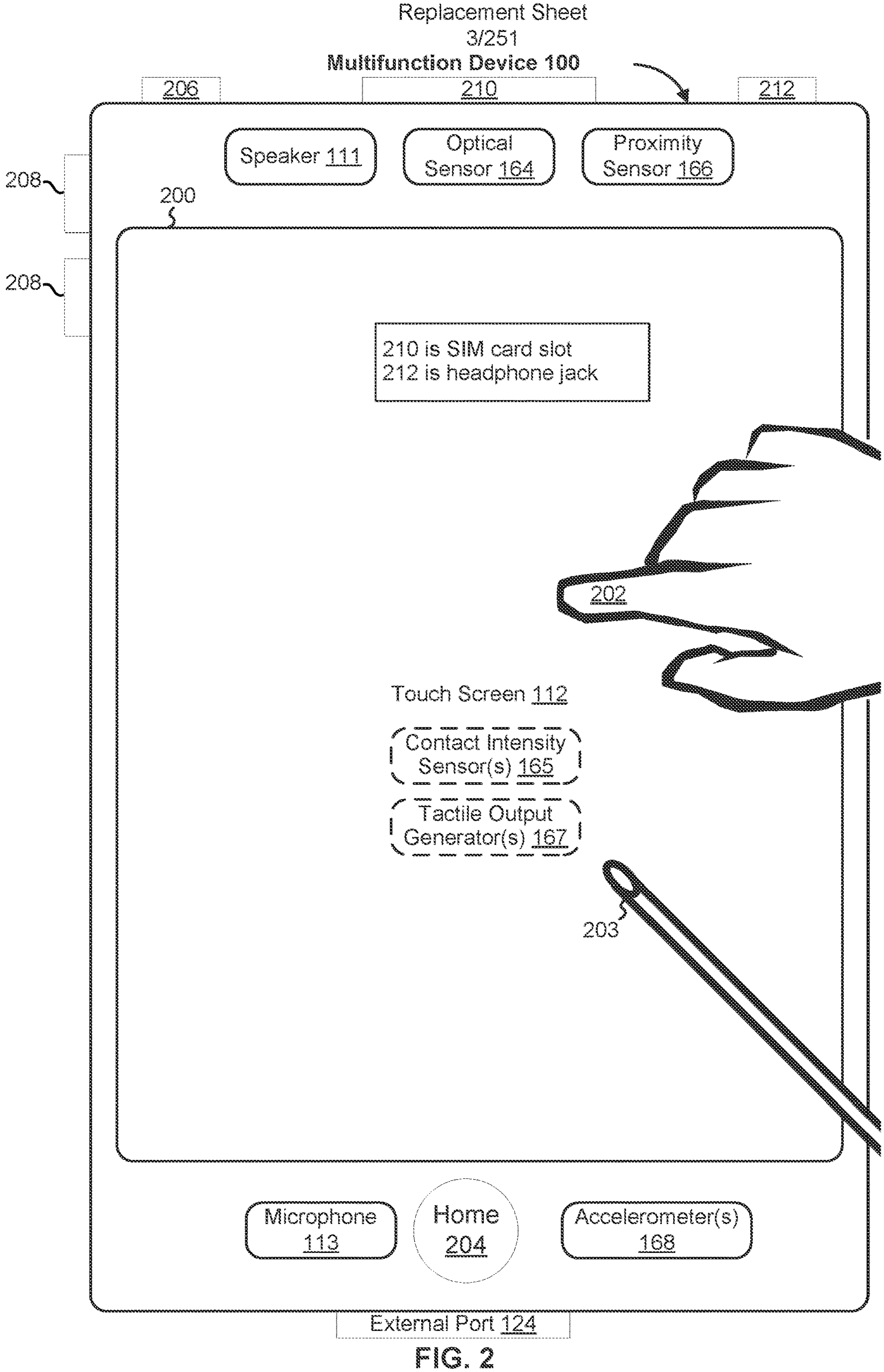
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Figure 4:
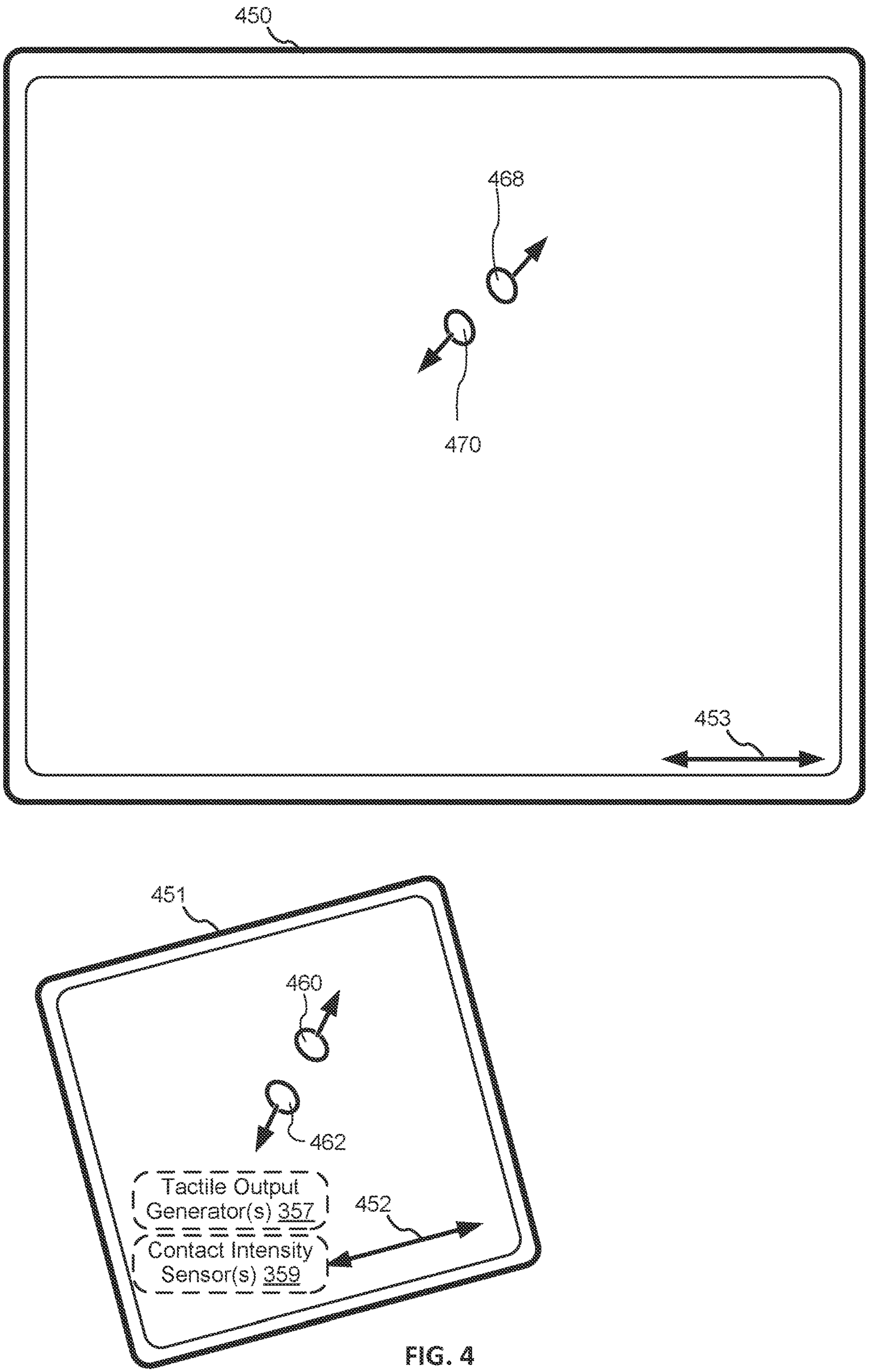
FIG. 4 illustrates an exemplary user interface for a multifunction device with a touch-sensitive surface that is separate from the display in accordance with some embodiments of the disclosure.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
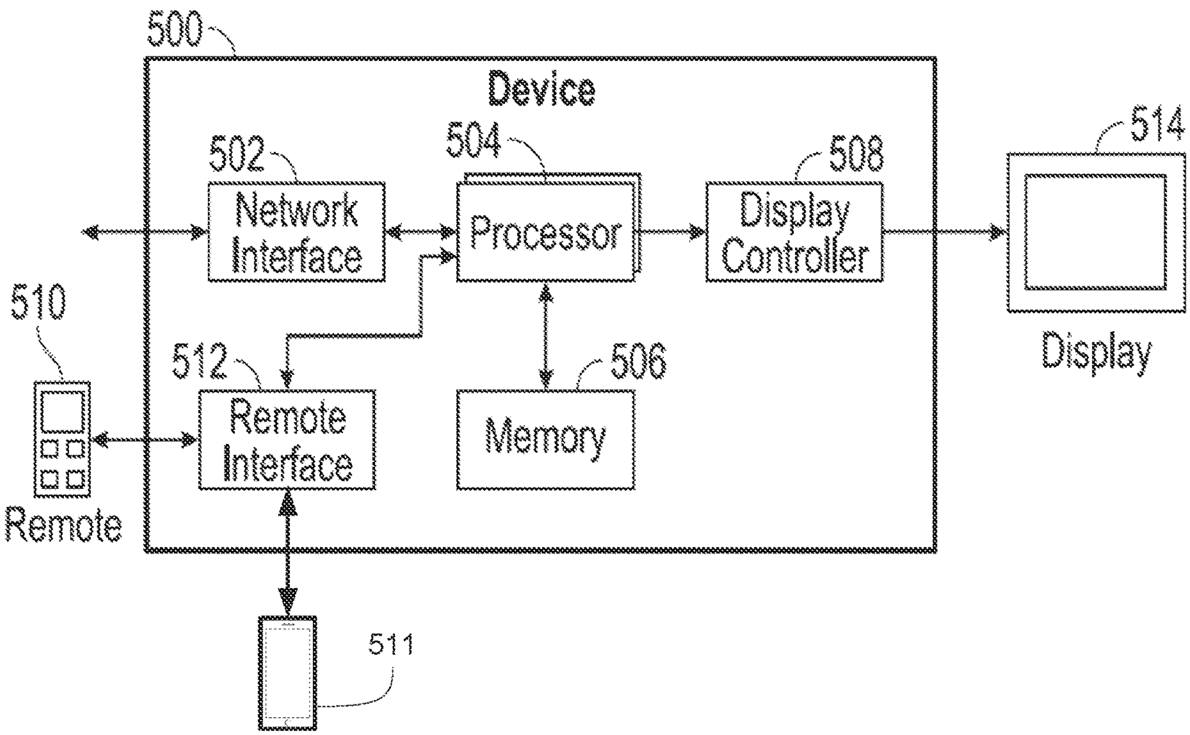
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
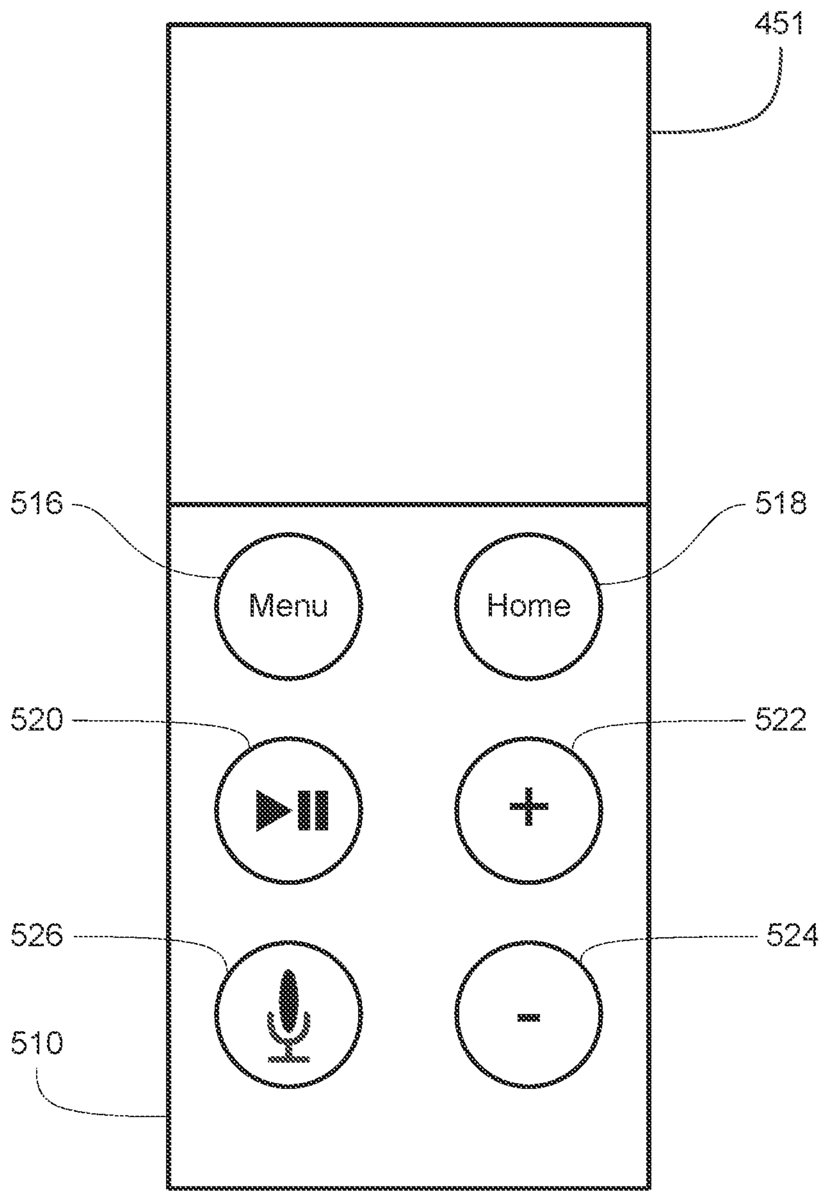

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B).

Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "–" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

USER INTERFACES AND ASSOCIATED PROCESSES

Simulated Click

Users interact with electronic devices in many different manners, including interacting with content (e.g., music, movies, etc.) that may be available (e.g., stored or otherwise accessible) on the electronic devices. In some circumstances, a user may interact with an electronic device using a dedicated remote control having button-click functionality (e.g., to select an object displayed by the electronic device, to initiate playback of content on the electronic device, etc.), such as remote 510 in FIGS. 5A-5B. However, in some circumstances, a user may desire to interact with the electronic device using a multifunction device that includes a touch-sensitive surface without button-click functionality, such as device 511 in FIG. 5A. The embodiments described below provide ways in which button-click functionality is simulated on a device having a touch-sensitive surface, thereby enhancing users' interactions with electronic devices. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
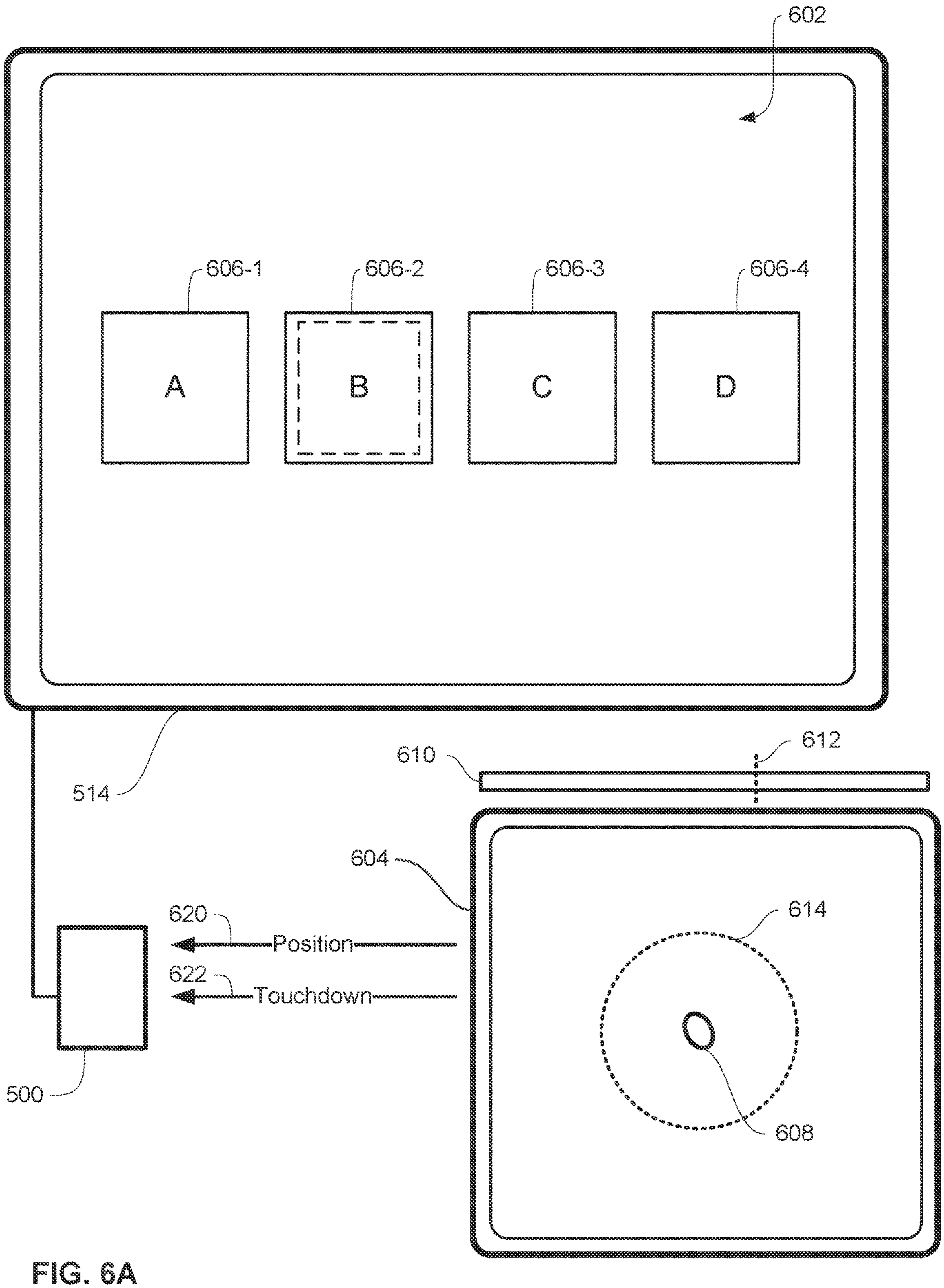
FIGS. 6A-6Q illustrate exemplary ways in which button-click functionality is simulated on a device having a touch-sensitive surface without button-click functionality in accordance with some embodiments of the disclosure.
Figure 6B:
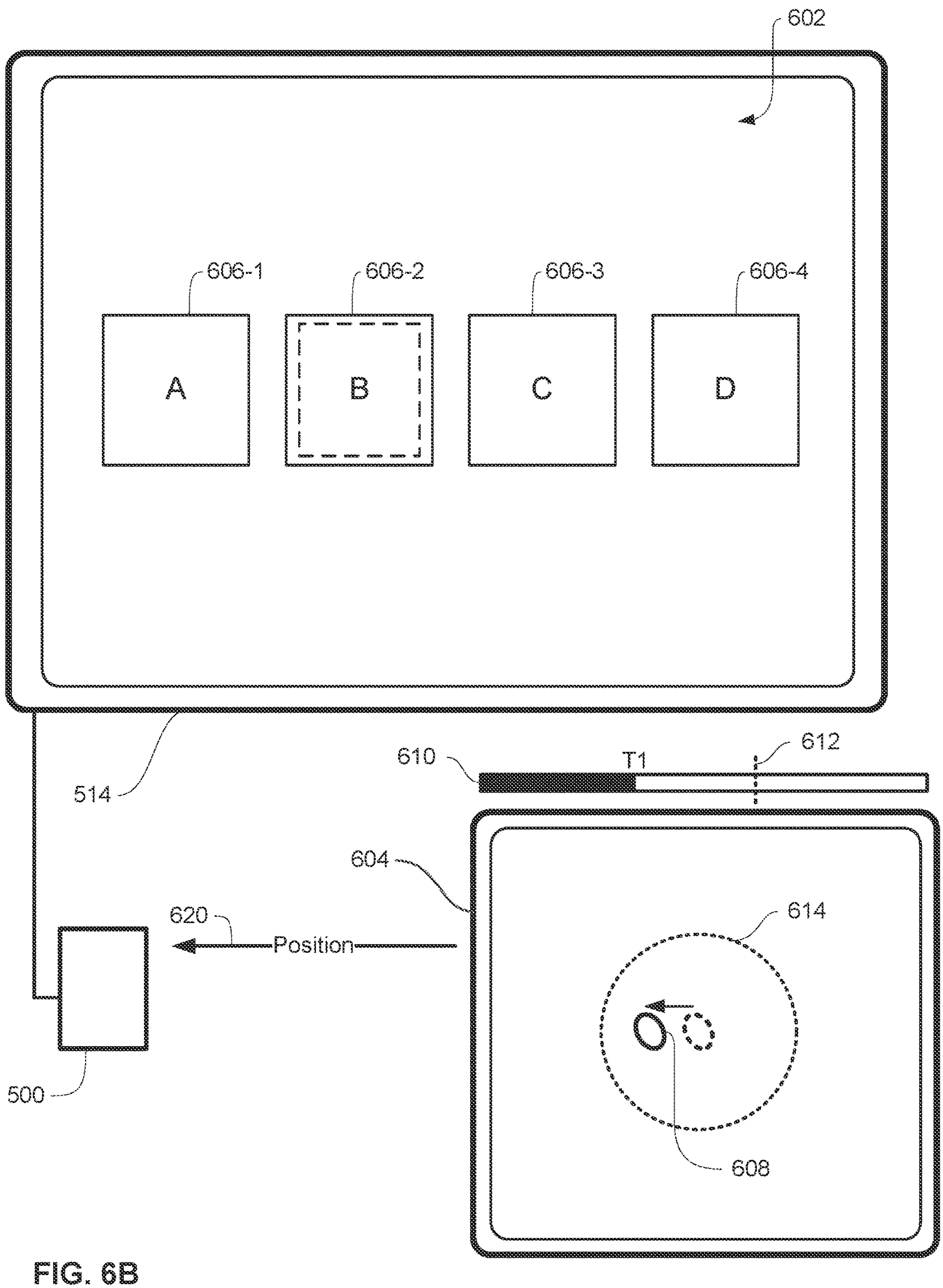
Figure 6C:
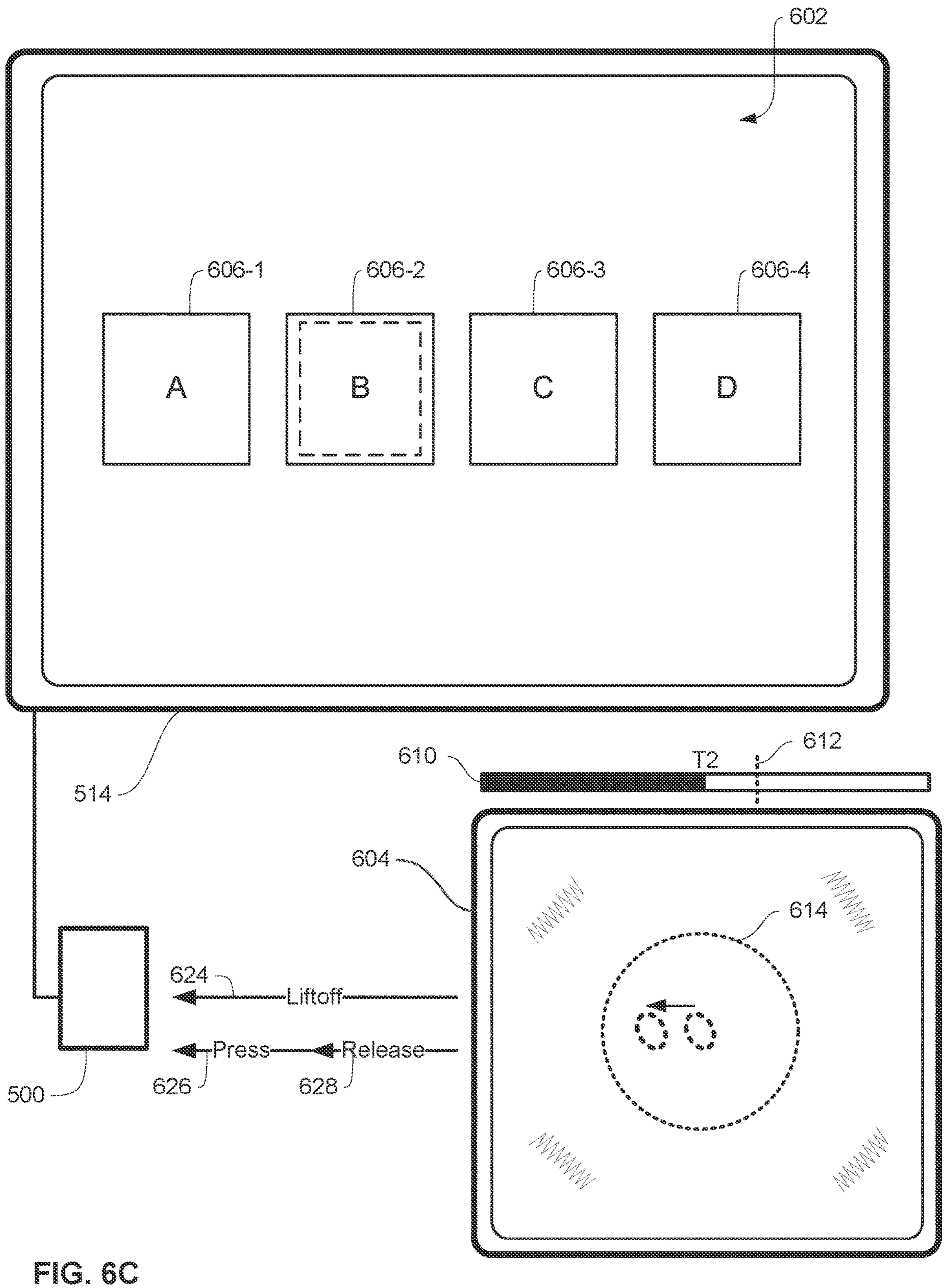
Figure 6D:
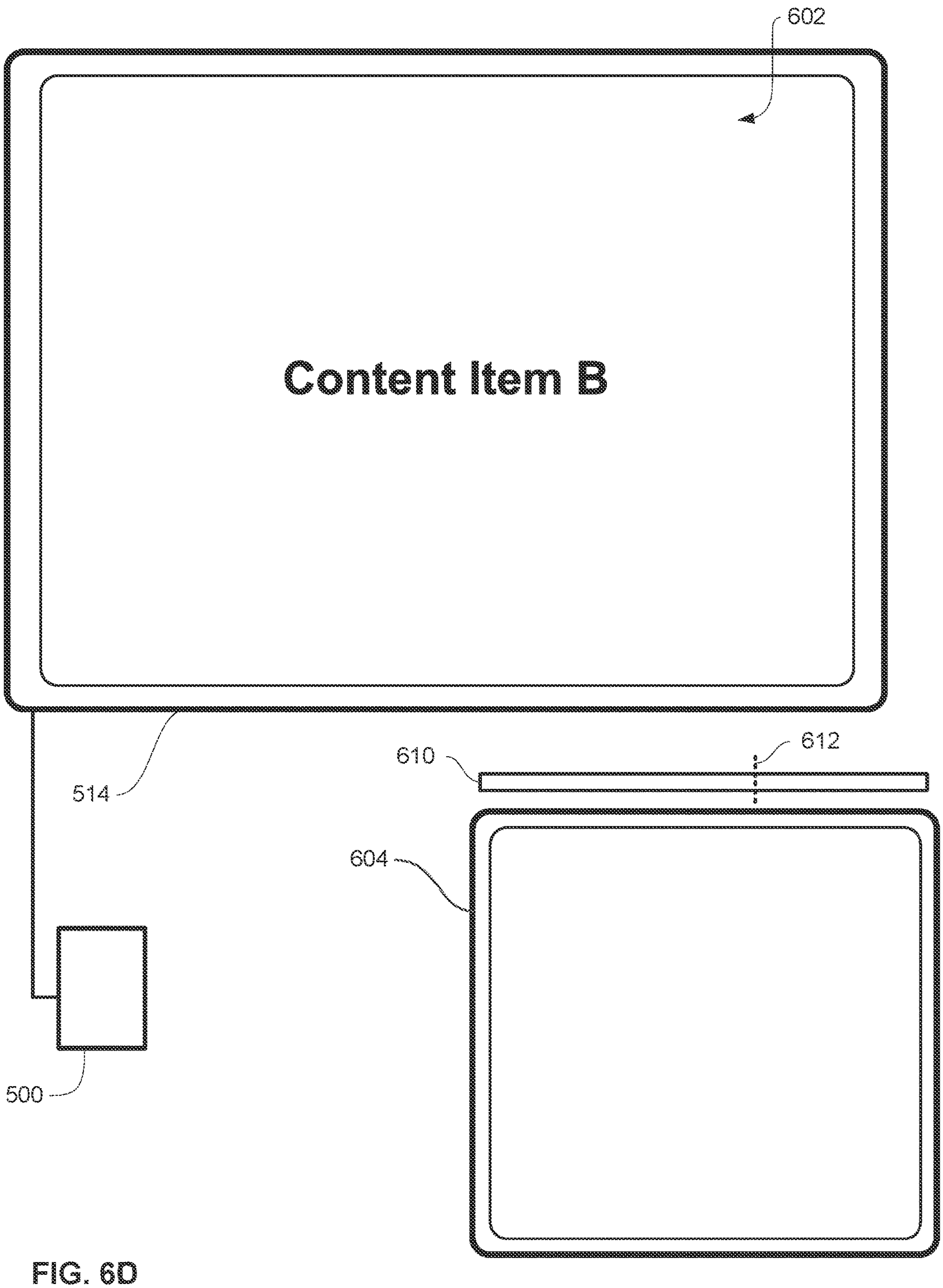
Figure 6E:
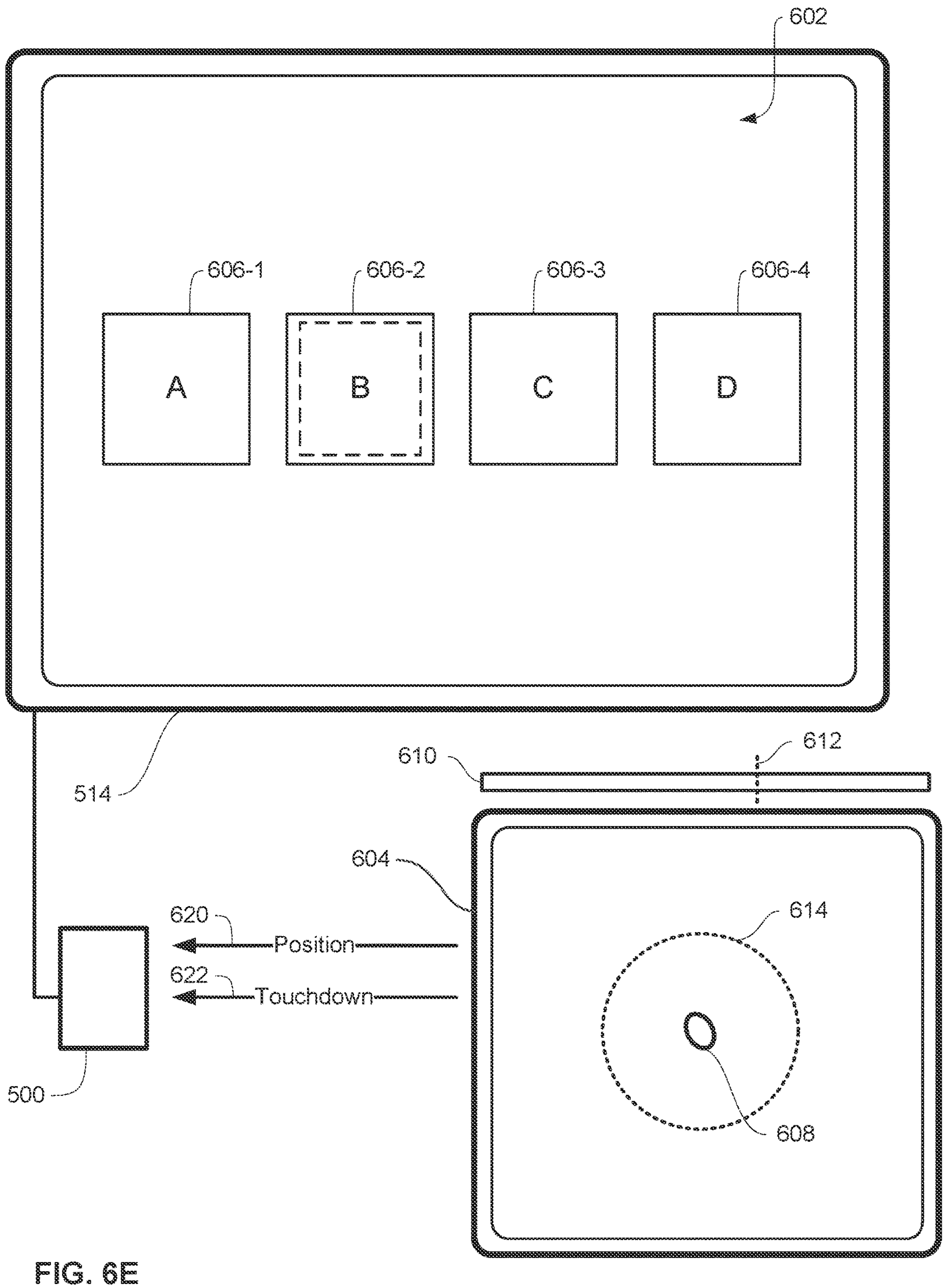
Figure 6F:
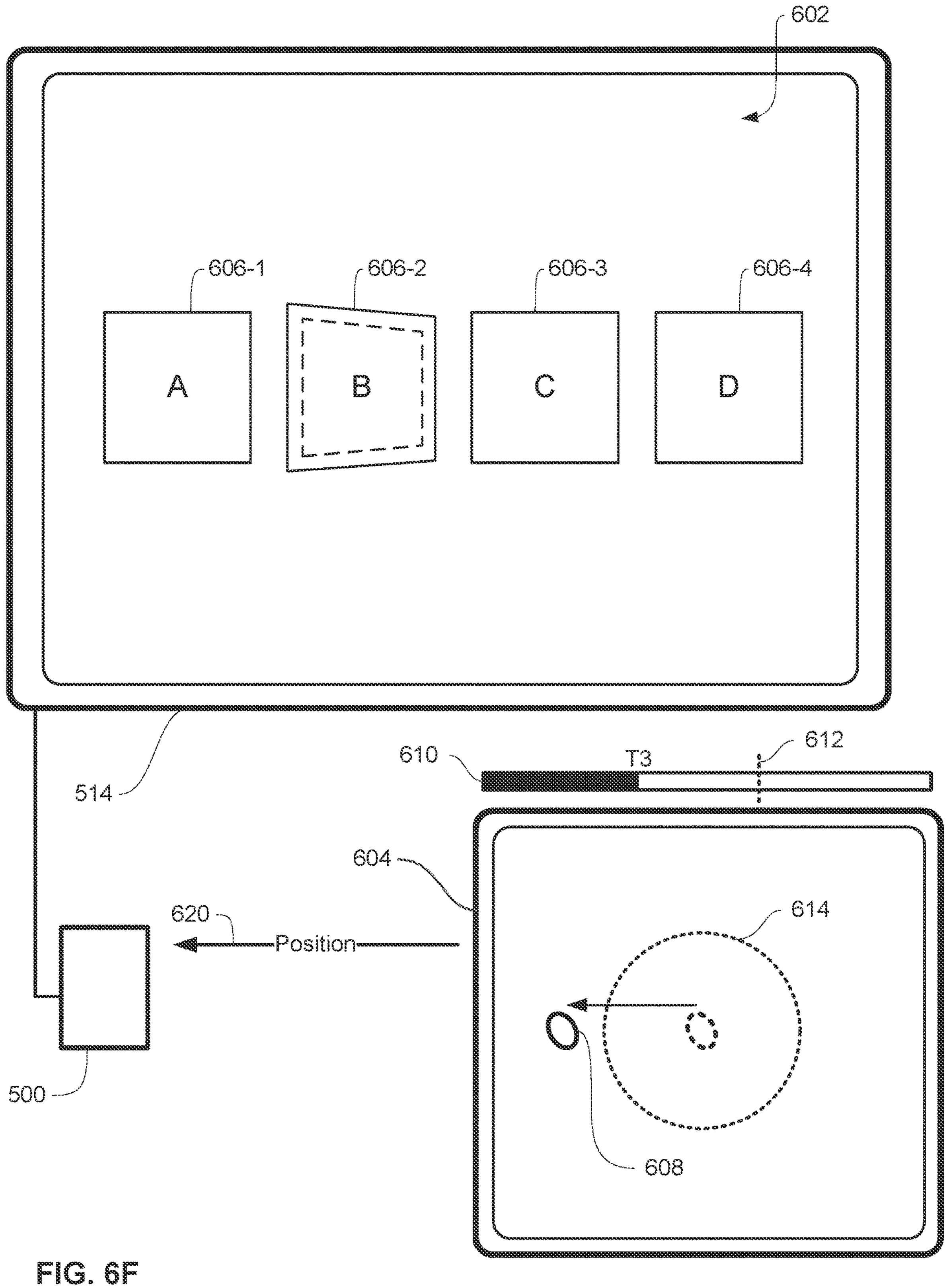
Figure 6G:
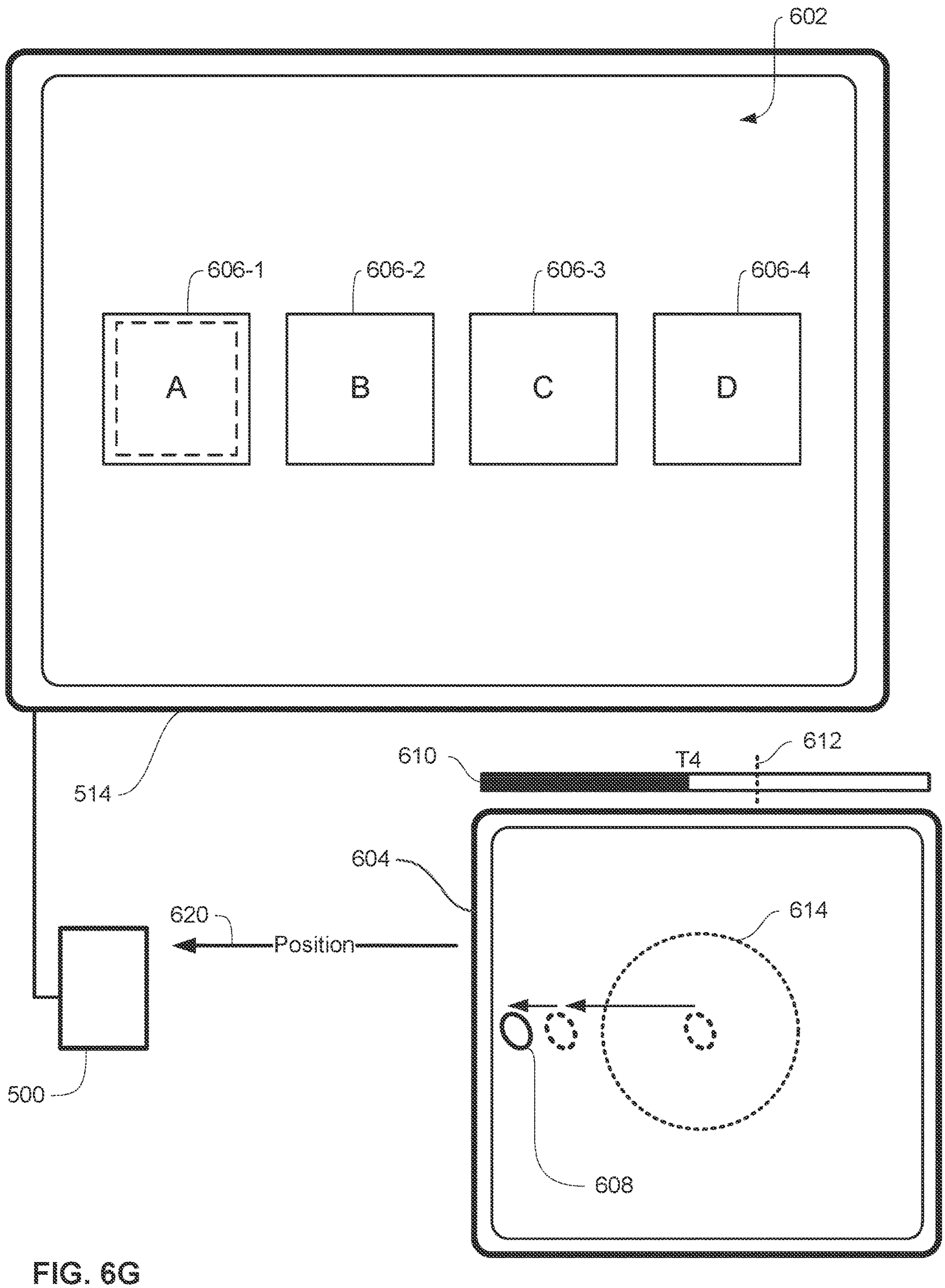
Figure 6H:
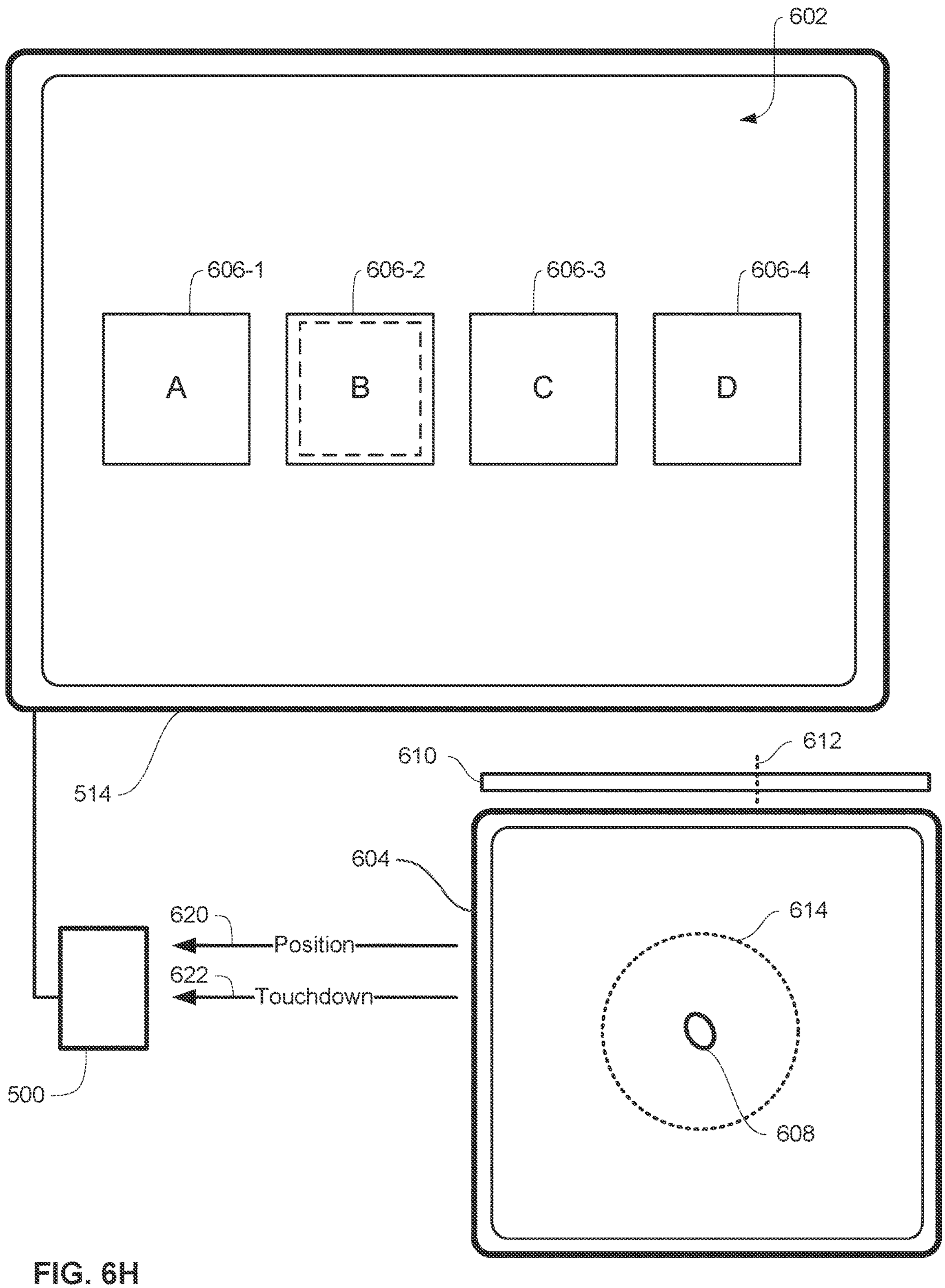
Figure 6I:
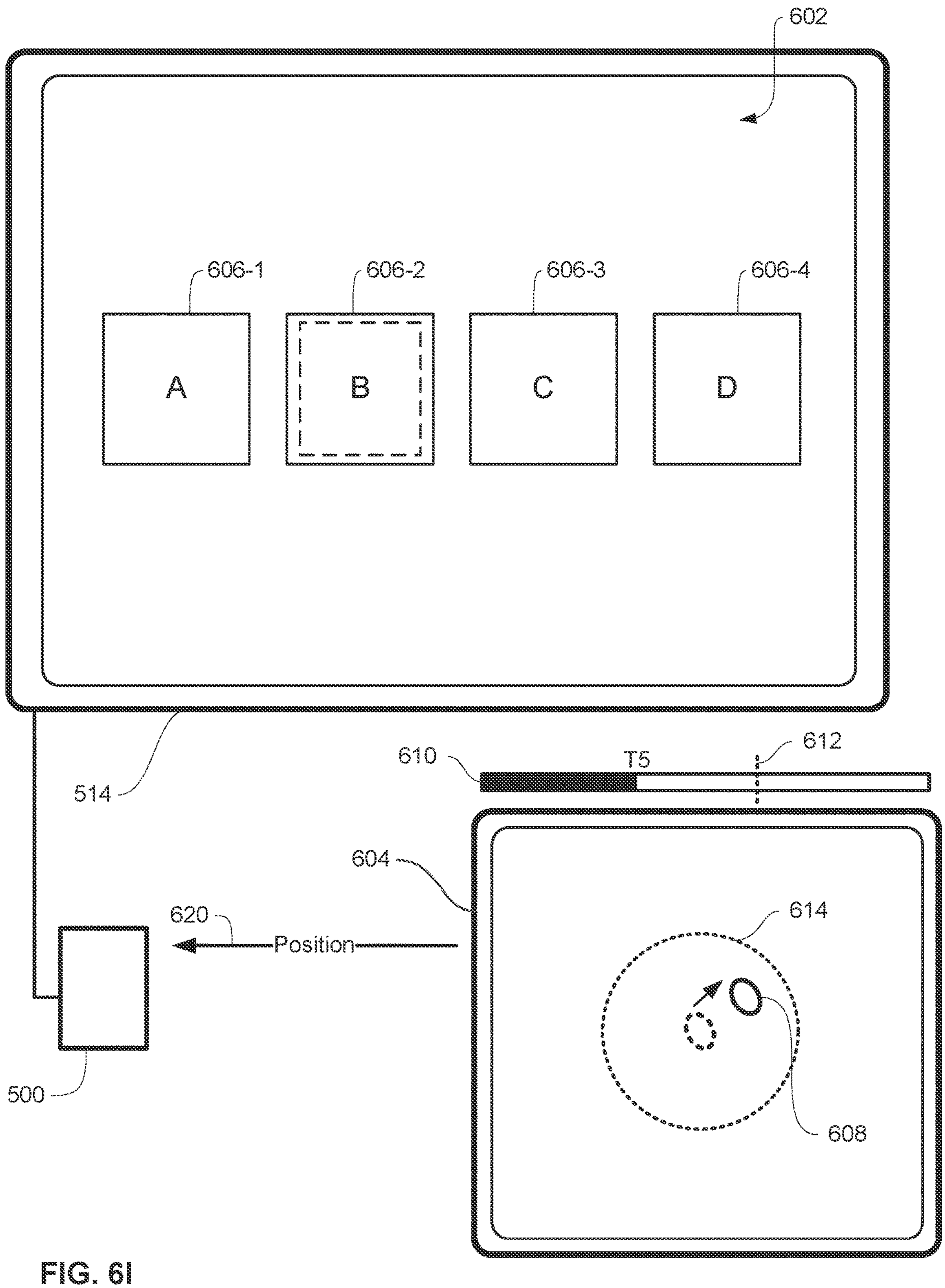
Figure 6J:
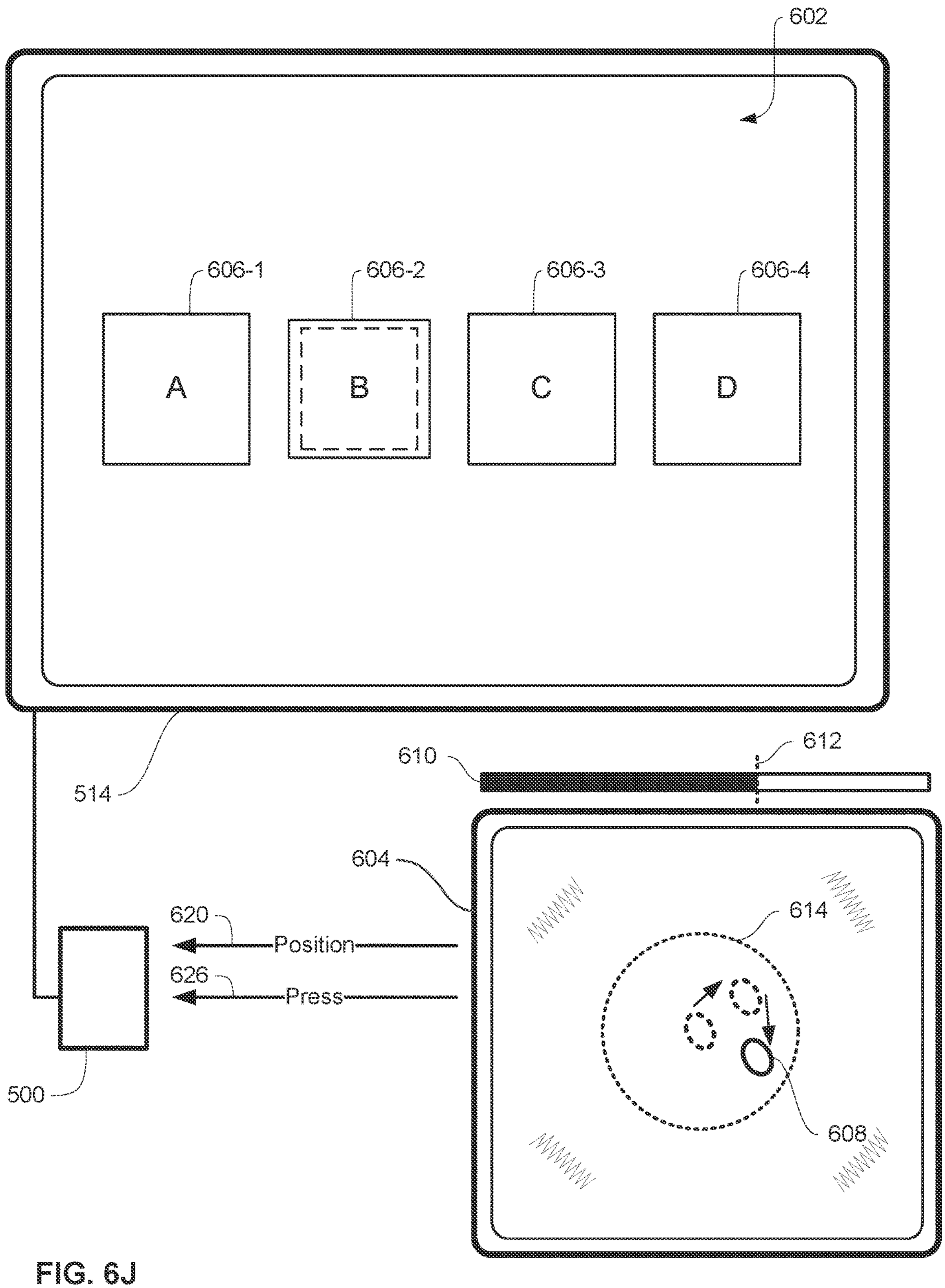
Figure 6K:
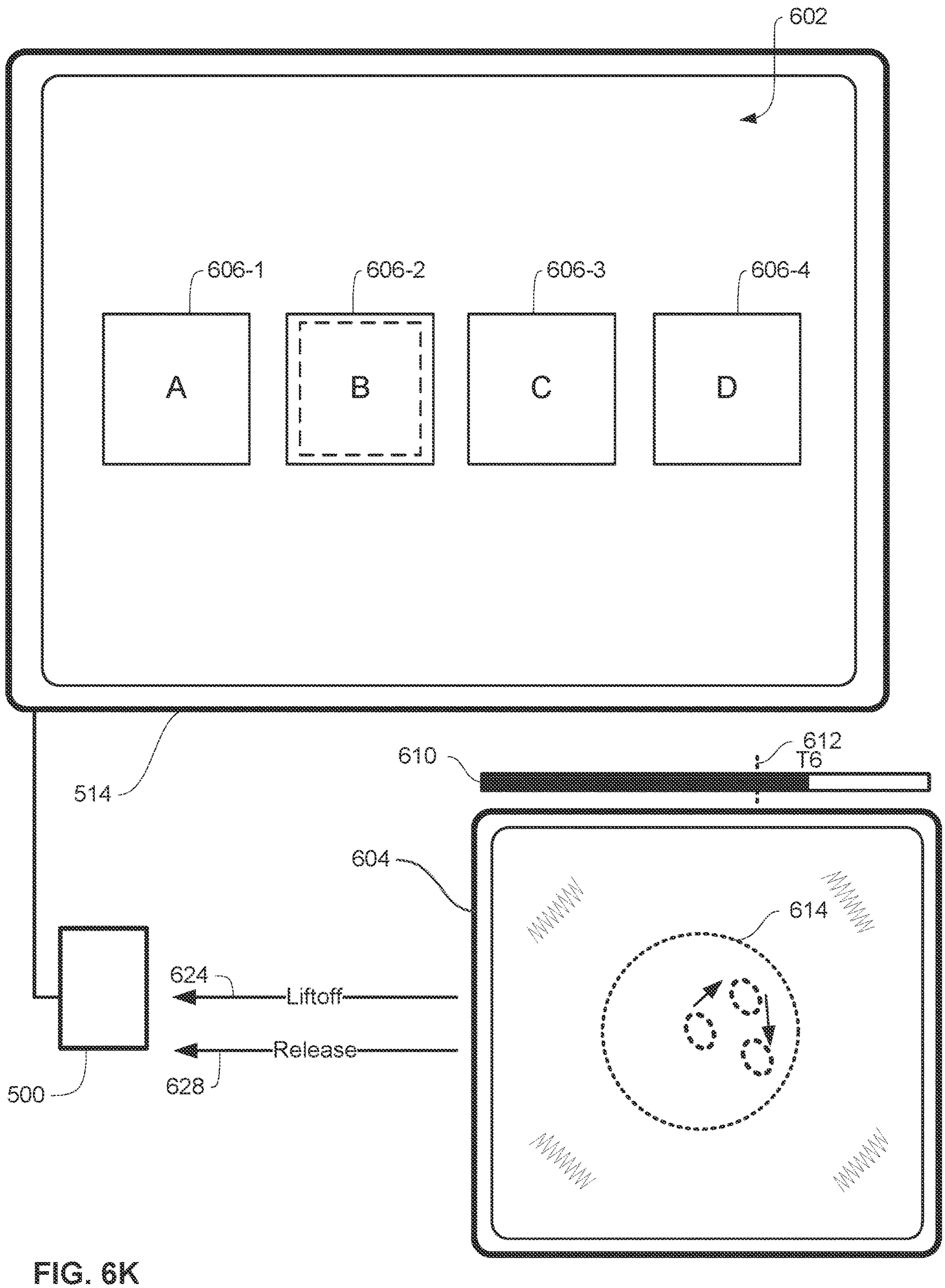
Figure 6L:
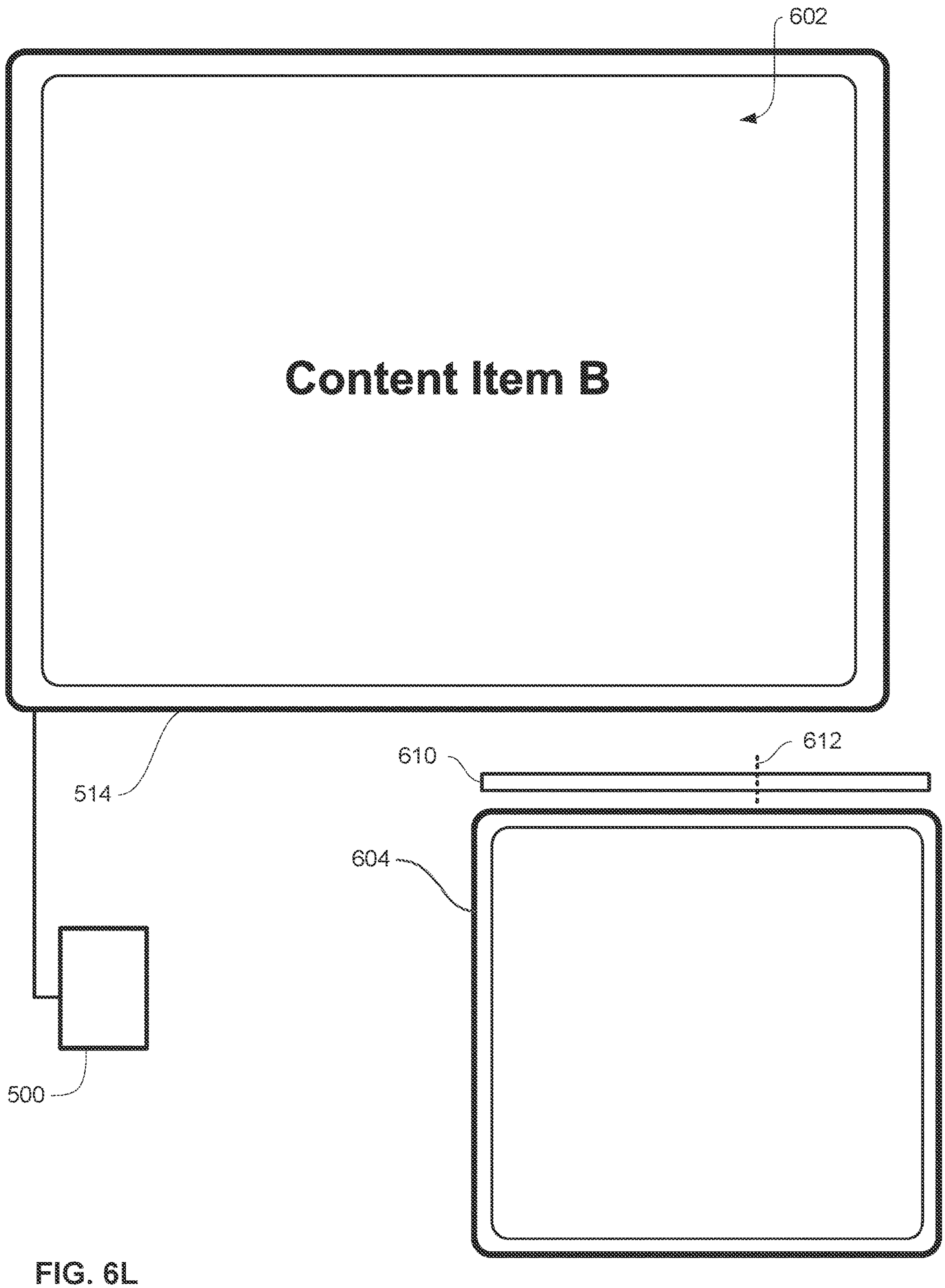
Figure 6M:
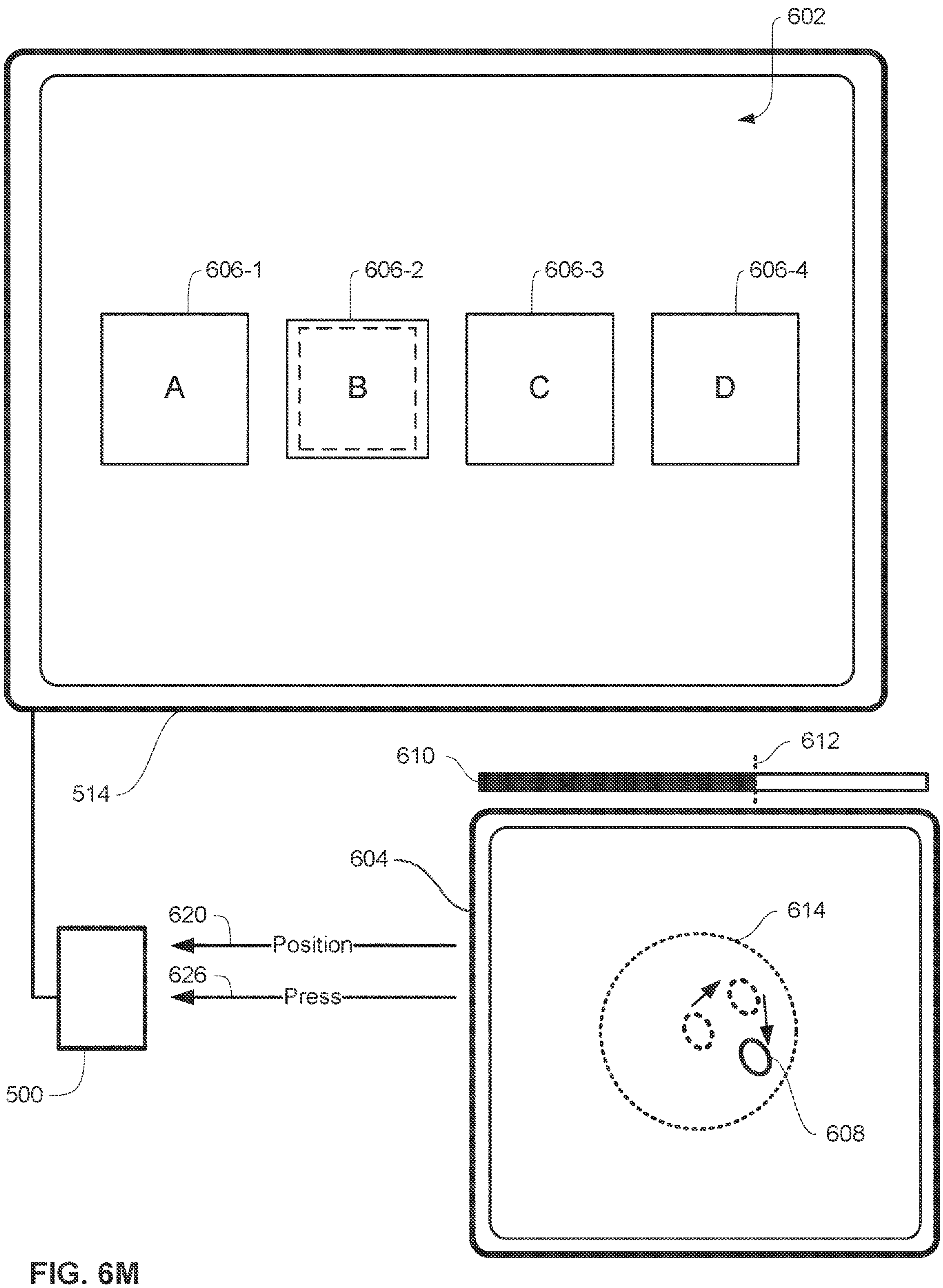
Figure 6N:
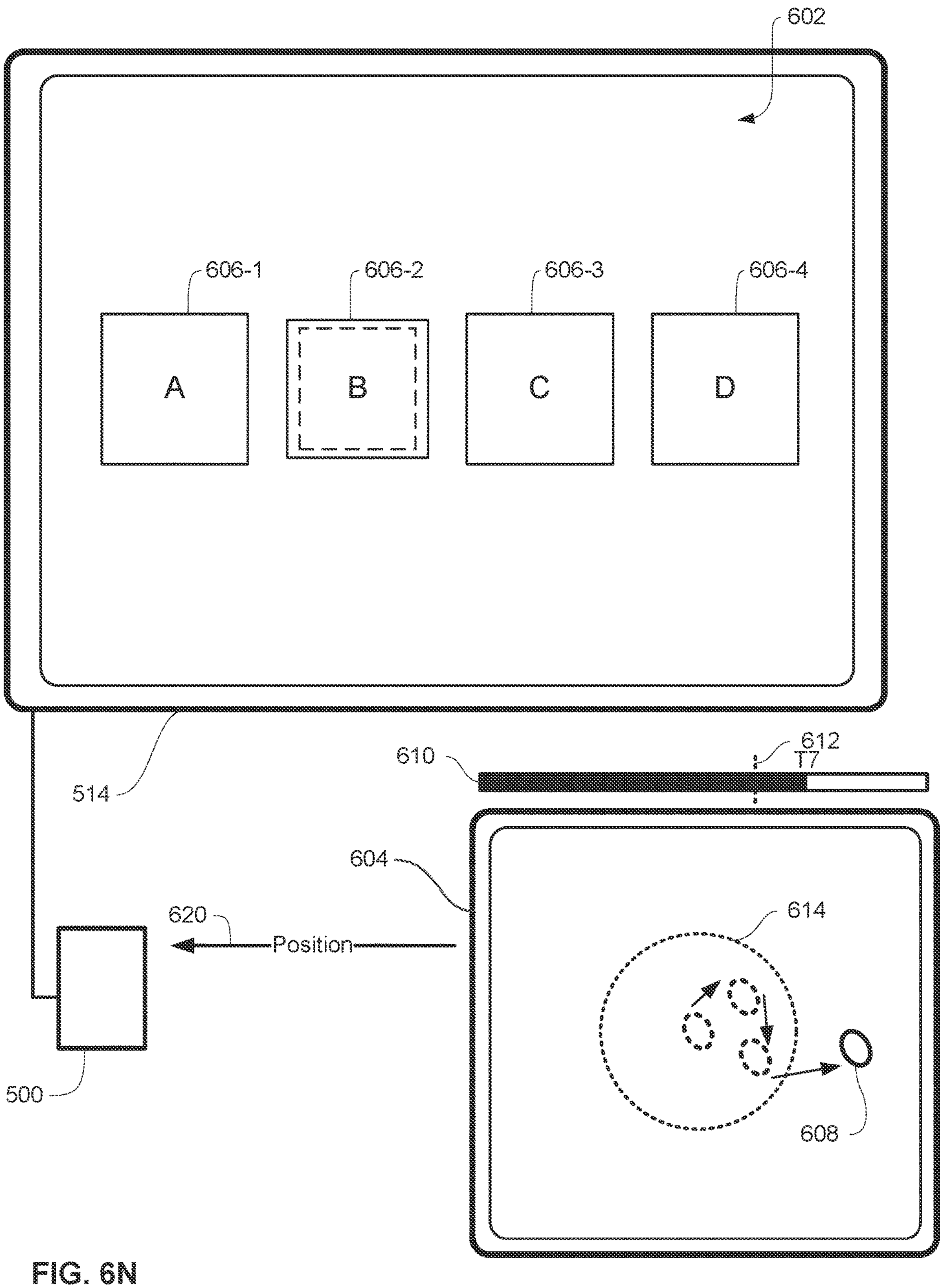
Figure 6O:
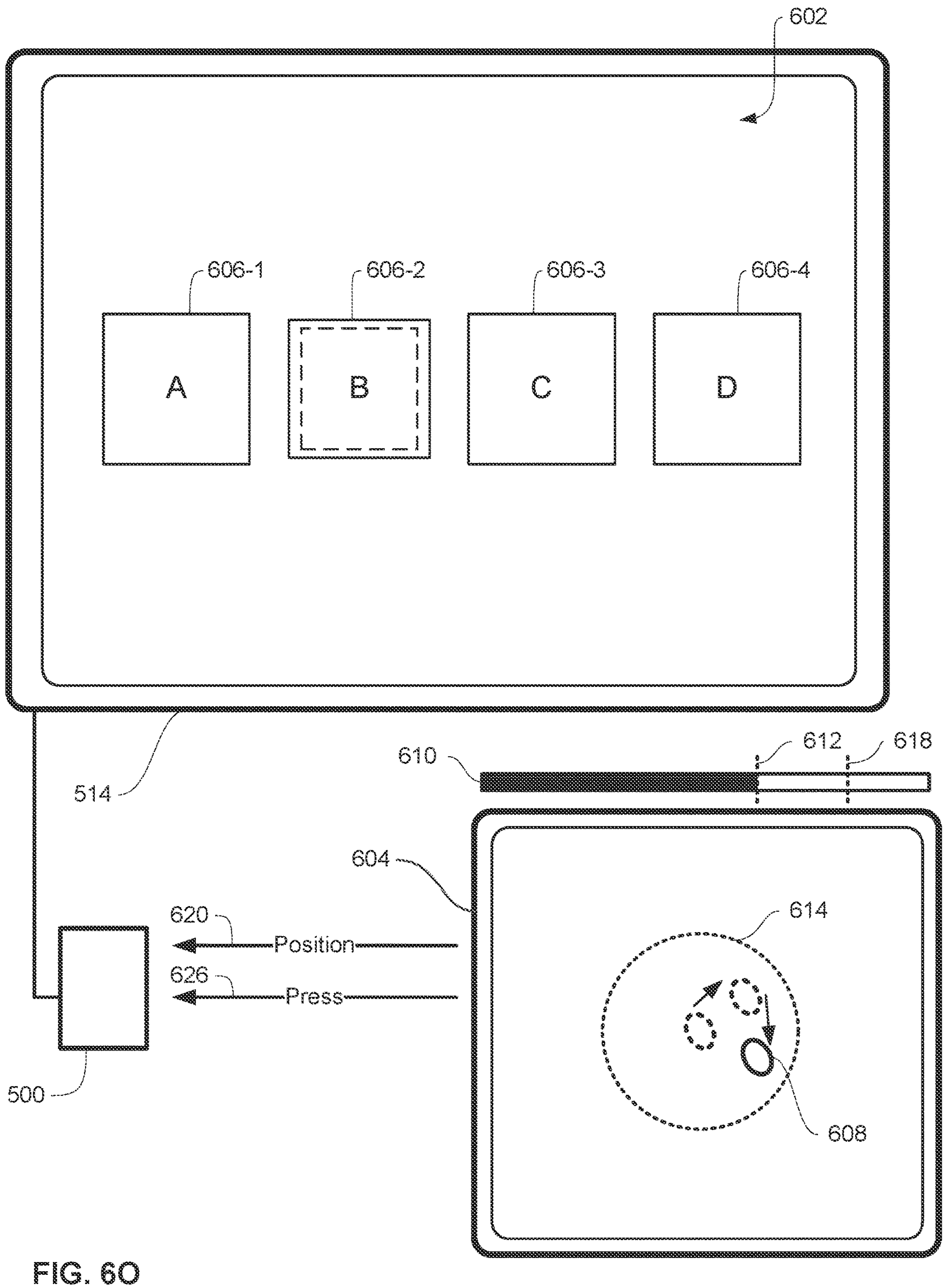
Figure 6P:
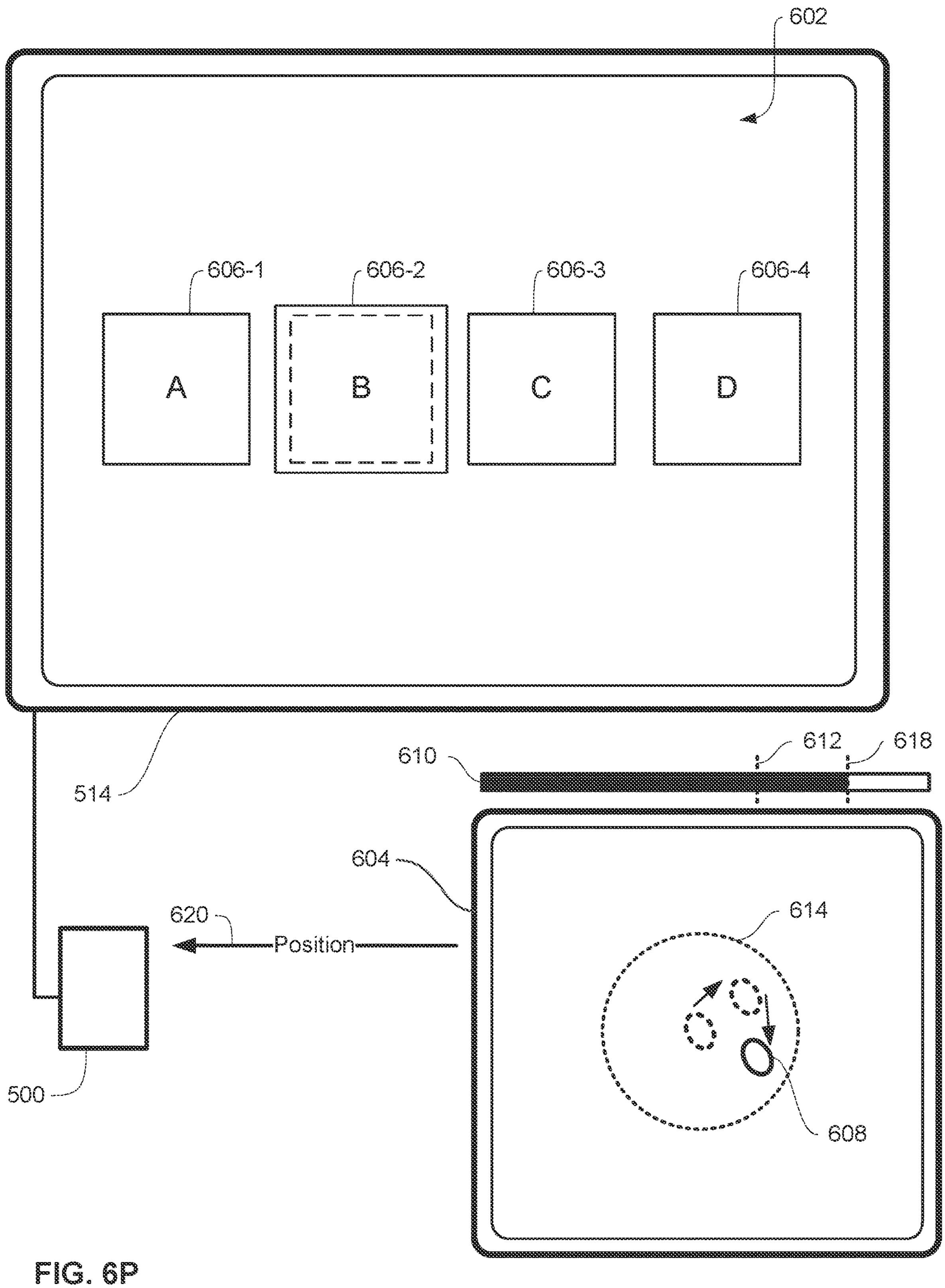
Figure 6Q:
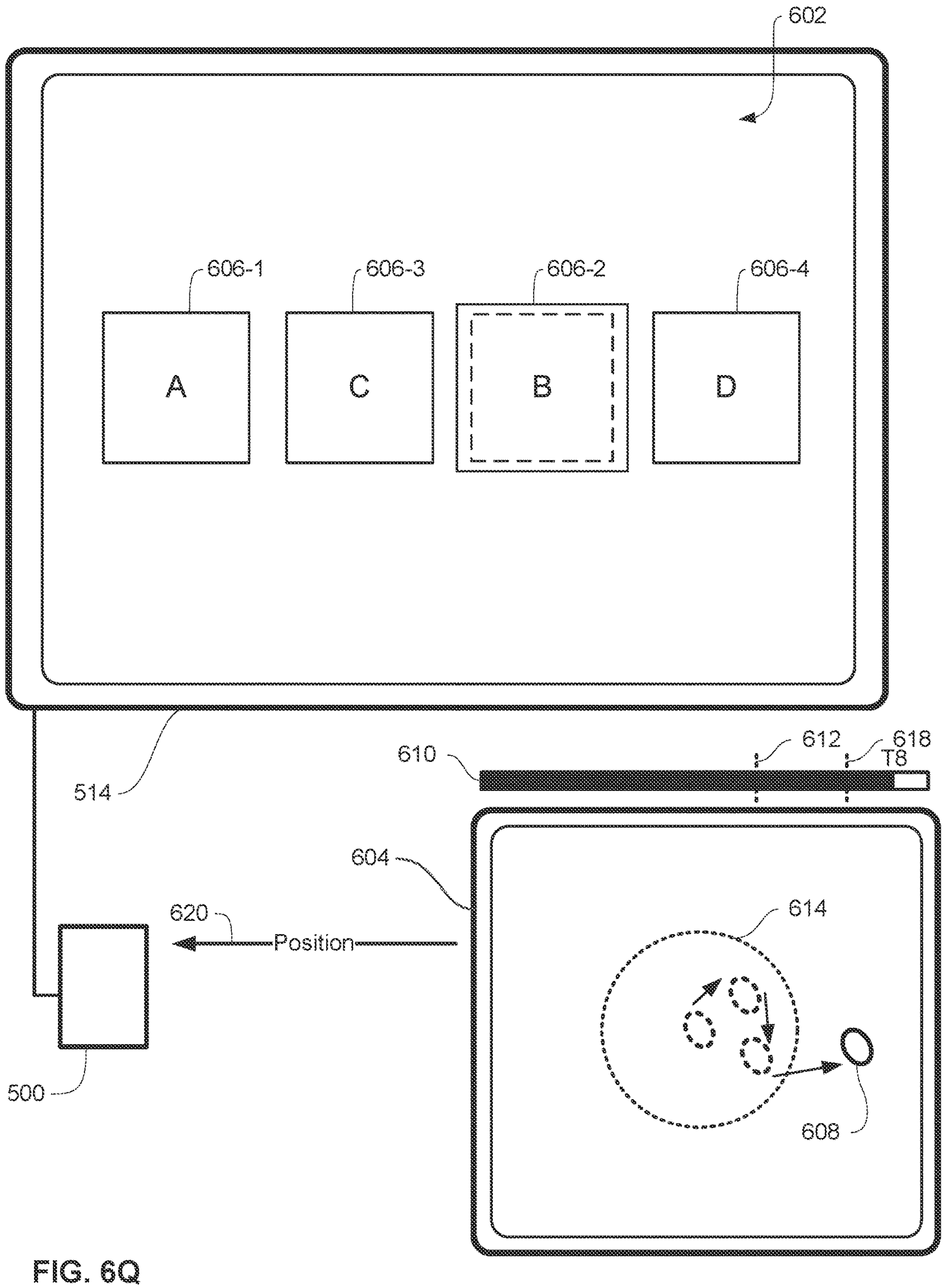
Figure 7A:
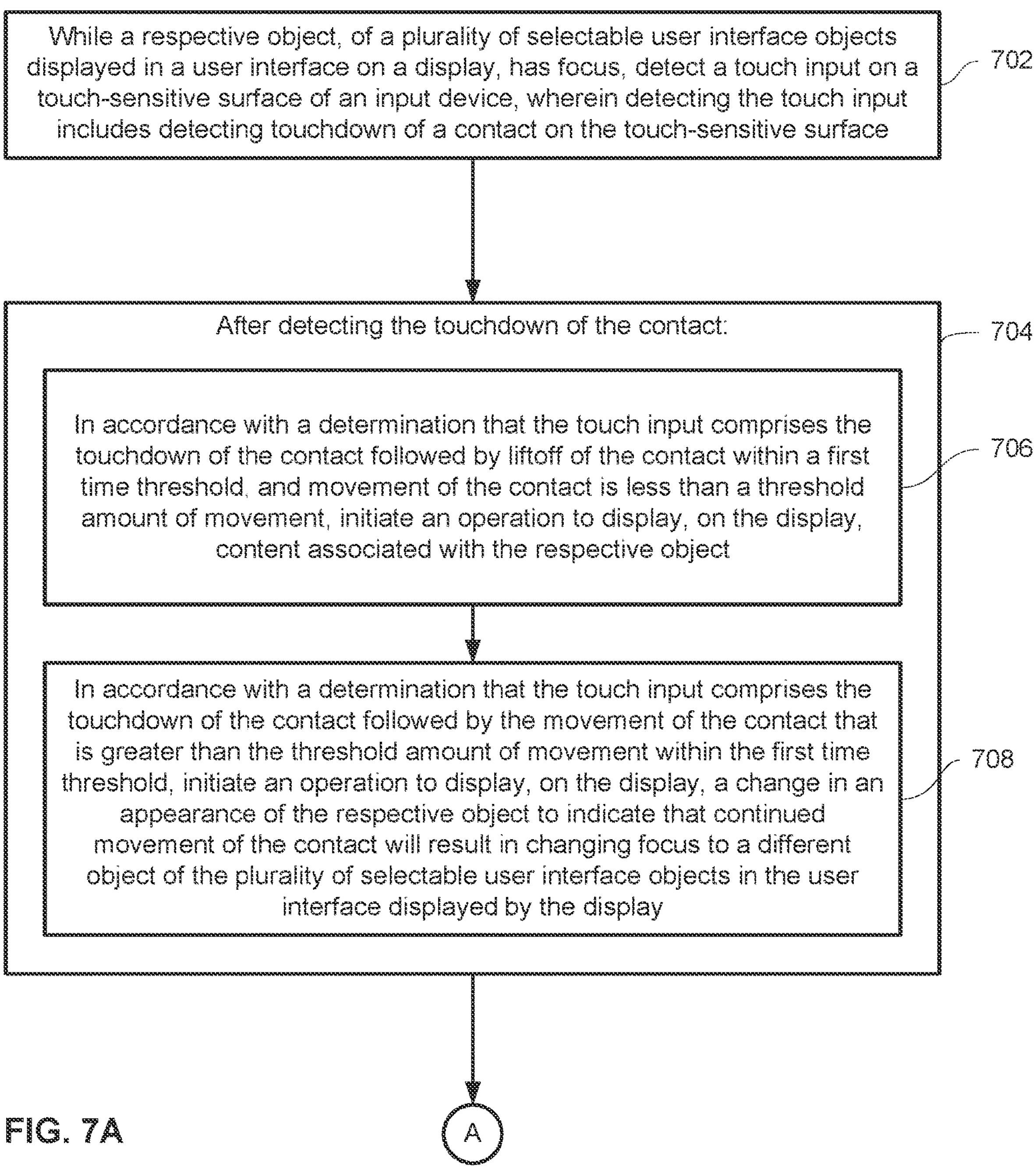
FIGS. 7A-7E are flow diagrams illustrating a method of simulating button-click functionality on a device having a touch-sensitive surface without button-click functionality in accordance with some embodiments of the disclosure.
Figure 7B:
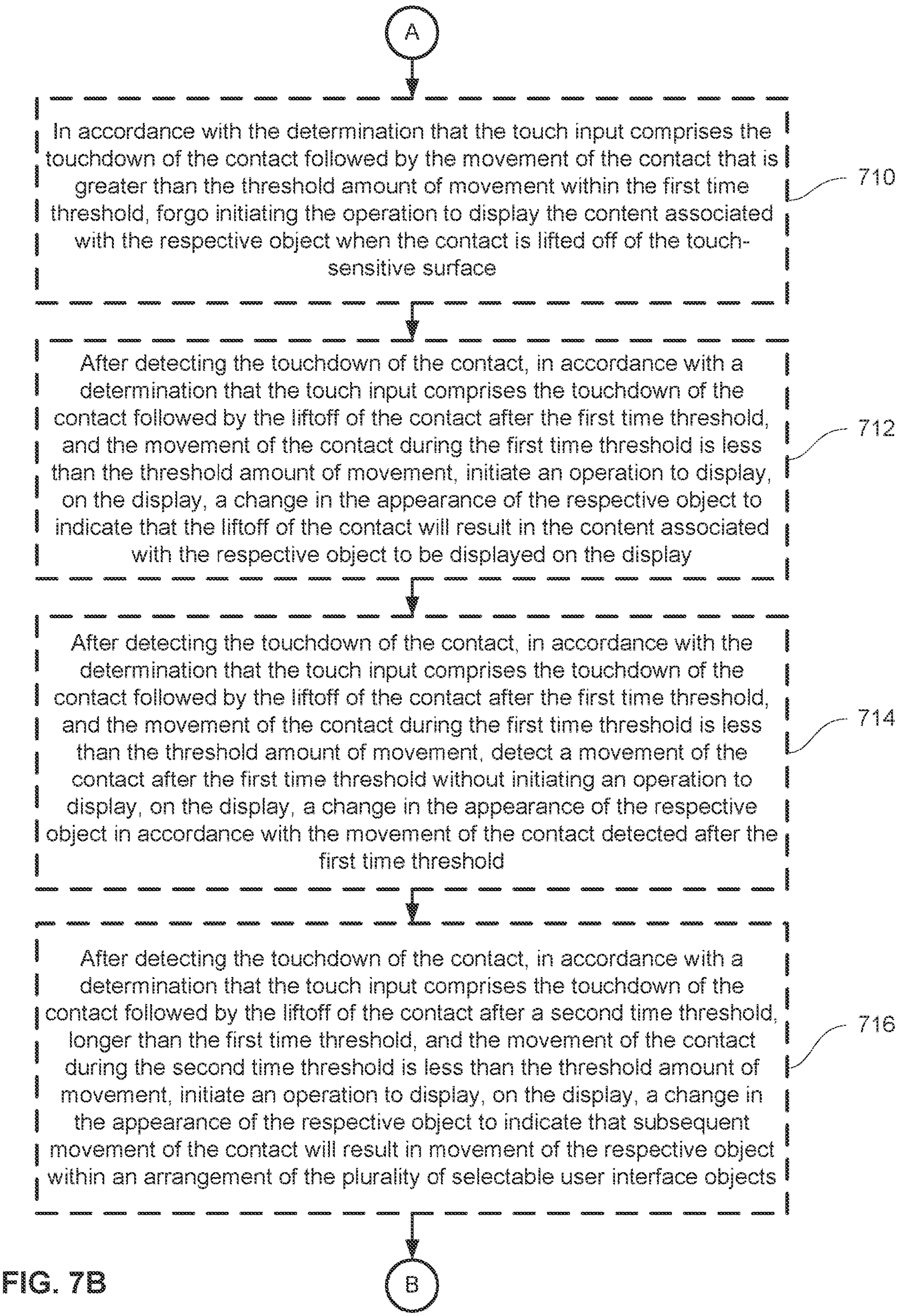
Figure 7C:
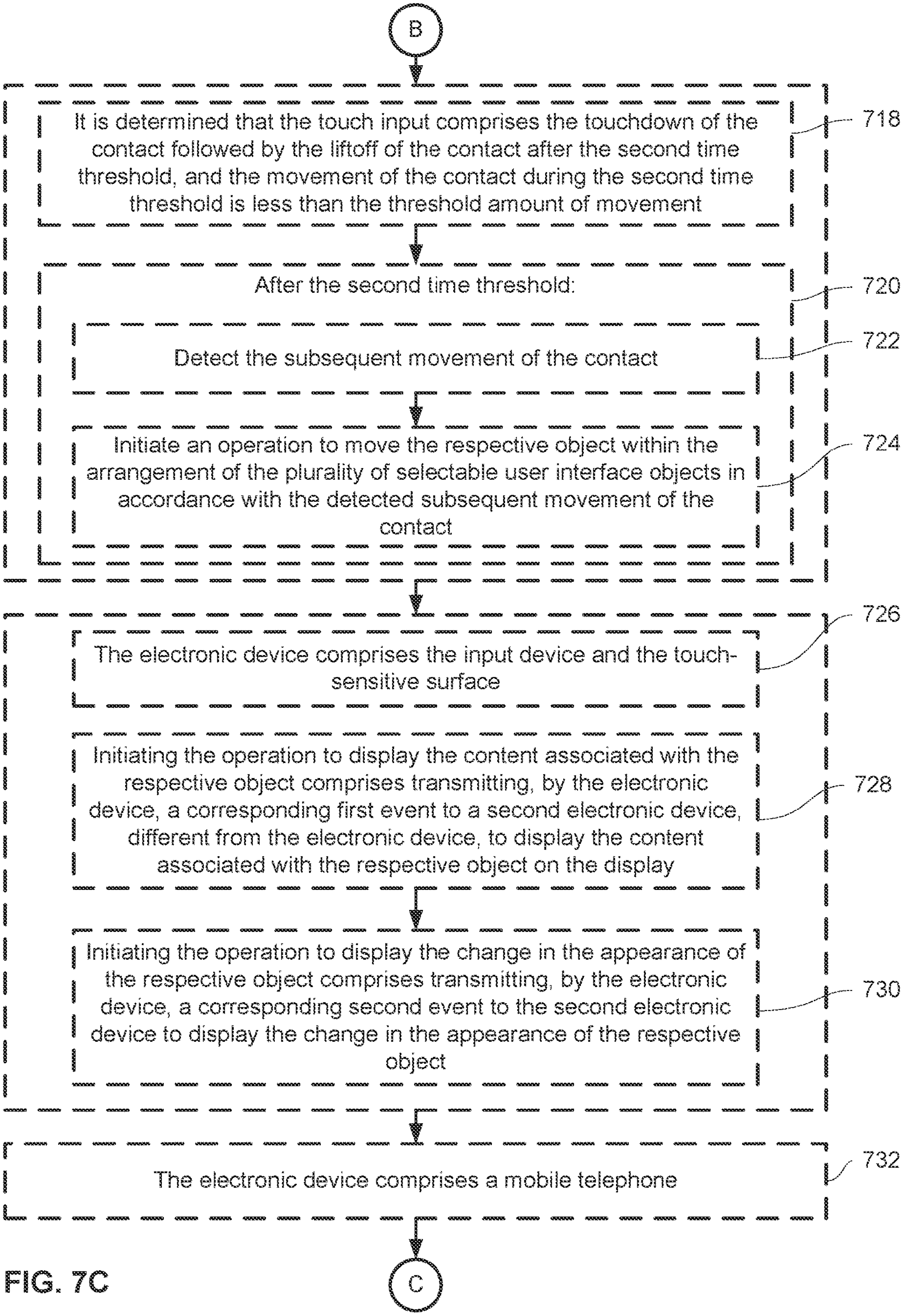
Figure 7D:
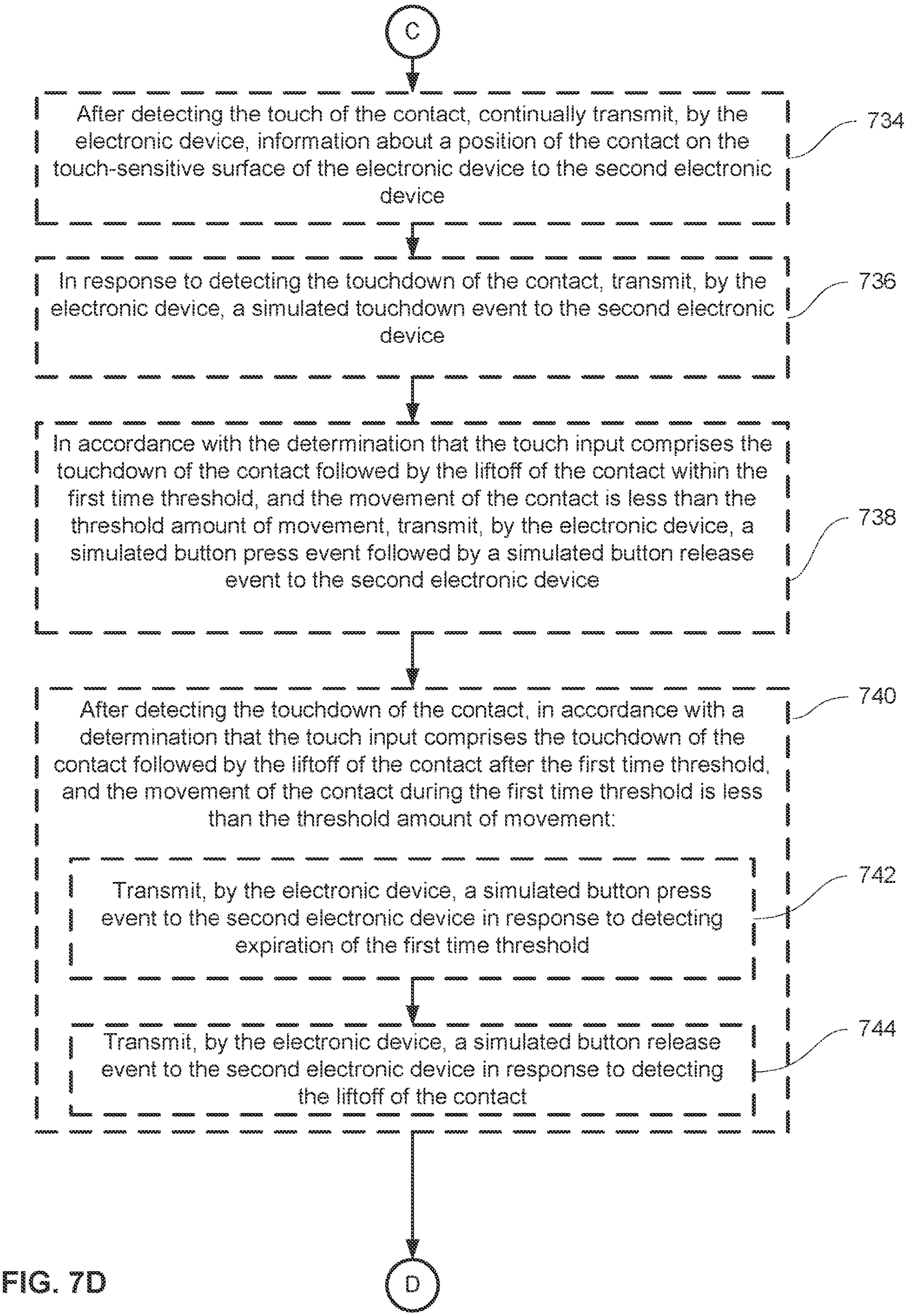
Figure 7E:
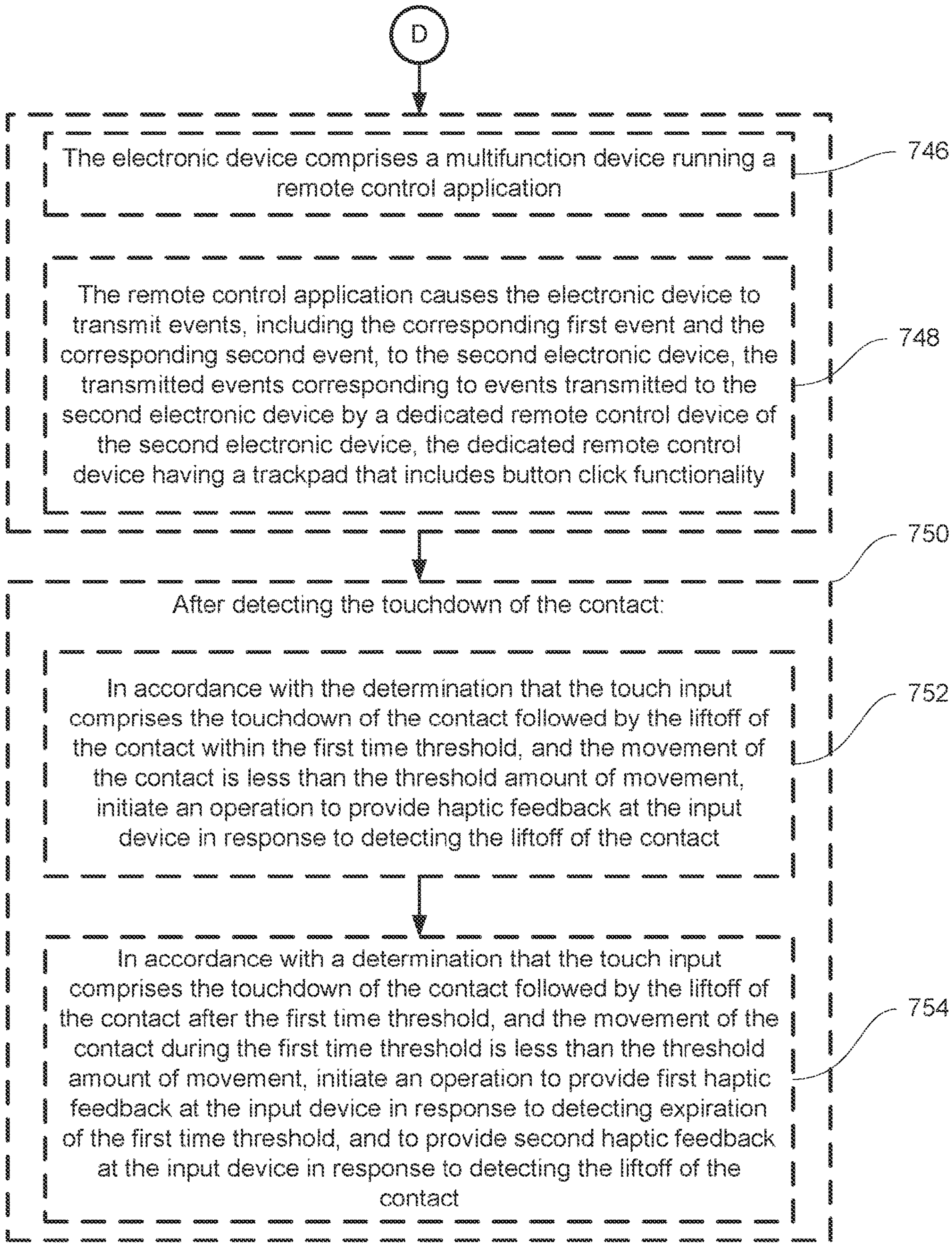

FIGS. 6A-6Q illustrate exemplary ways in which button-click functionality is simulated on a device having a touch-sensitive surface without button-click functionality in accordance with some embodiments of the disclosure. The embodiments in these figures are used to illustrate the processes described below, including the processes described with reference to FIGS. 7A-7E.

FIG. 6A illustrates exemplary display 514. Display 514 optionally displays one or more user interfaces that include various content. In the example illustrated in FIG. 6A, display 514 displays a content application (e.g., a content playback application) running on an electronic device (e.g., electronic device 500 of FIG. 5A) of which display 514 is a part, or to which display 514 is connected. The content application displays user interface 602, which includes a plurality of selectable user interface objects 606-1, 606-2, 606-3 and 606-4. One or more of user interface objects 606, if selected, optionally cause corresponding content (e.g., movies, songs, TV shows, games, a menu for an application, or a menu for navigating to media content, etc.) to be displayed on display 514. Specifically, object 606-1 corresponds to content item A, object 606-2 corresponds to content item B, object 606-3 corresponds to content item C, and object 606-4 corresponds to content item D, and selection of one of objects 606 causes playback of corresponding content items A, B C or D on display 514. Selection of one of objects 606 is optionally accomplished by moving the current focus indicator—shown in FIG. 6A as the dashed lines within object 606-2—to the desired user interface object 606, and detecting a selection input on a dedicated remote control (e.g., remote 510 in FIG. 5B), such as a click of a button on the remote control, or a click of a touch-sensitive surface of the remote control. However, in some circumstances, it may be desirable for a user to provide selection and other inputs to electronic device 500 using a device other than a dedicated remote control; for example, a multifunction device (e.g., a mobile telephone, a media playback device, or a wearable device) that is configured to operate in a manner analogous to a dedicated remote control. Such a device optionally does not include a touch-sensitive surface with mechanical click or contact intensity detection capabilities, as previously described. Touch-sensitive surface 604 optionally corresponds to such a device (e.g., touch-sensitive surface 604 is optionally included in a multifunction device that is configured to simulate dedicated remote control functionality in controlling electronic device 500). In these circumstances, it is beneficial to simulate click or selection input functionality on touch-sensitive surface 604 to enhance the interactions between touch-sensitive surface 604 and electronic device 500. The device in which touch-sensitive surface 604 is included optionally corresponds to one or more of device 100 in FIG. 1A, device 100 in FIG. 2, device 300 in FIG. 3 and device 511 in FIG. 5A. For ease of description, actions optionally taken by the device in which touch-sensitive surface 604 is included (e.g., transmission of commands to electronic device 500, processing of touch inputs, identifying of contacts as particular inputs, tracking various characteristics of contacts, etc.) will be described as being taken by touch-sensitive surface 604, though it is understood that in some embodiments, the device, rather than touch-sensitive surface 604, takes these actions.

As stated above, in FIG. 6A, object 606-2 has the current focus. While object 606-2 has the current focus, touchdown of contact 608 on touch-sensitive surface 604 is detected. As a result of the touchdown of contact 608, the touch-sensitive surface 604 optionally transmits information 620 about the position of contact 608 on the touch-sensitive surface, and/or a touchdown event 622 to electronic device 500 to allow the electronic device to respond accordingly.

Also as a result of the touchdown of contact 608, touch-sensitive surface 604, or a device that includes touch-sensitive surface 604, optionally begins tracking the movement of contact 608 and the duration of contact 608 on touch-sensitive surface 604 (e.g., the length of time between touchdown and liftoff of contact 608), illustrated in FIG. 6A as duration bar 610. Specifically, if touch-sensitive surface 604 detects movement of contact 608 more than a movement threshold (illustrated in FIG. 6A as movement threshold 614) during a time threshold (illustrated in FIG. 6A as time threshold 612), contact 608 and its movement is optionally identified as a movement input. If, on the other hand, touch-sensitive surface 604 detects movement of contact 608 less than movement threshold 614 during time threshold 612, and liftoff of contact 608 within time threshold 612, touch-sensitive surface 604 optionally identifies contact 608 as being a click or selection input. As such, touch-sensitive surface 604 is able to simulate button-click functionality of a dedicate remote control, for example. The above-described behavior, and others, will be described in more detail, below.

In FIG. 6B, after touchdown of contact 608 was detected in FIG. 6A, contact 608 has moved less than movement threshold 614. Some amount of time T1, less than time threshold 612, has passed since touchdown of contact 608, as shown in duration bar 610. In some embodiments, touch-sensitive surface 604 continually transmits information 620 about the position of contact 608 to electronic device 500 while contact 608 is touched down on touch-sensitive surface 604, as shown in FIG. 6B.

In FIG. 6C, after moving less than movement threshold 614, device has detected liftoff of contact 608 from touch-sensitive surface 604. The liftoff of contact 608 was detected at time T2, after time T1, within time threshold 612 of detecting touchdown of contact 608, as shown in duration bar 610. In response to detecting the liftoff of contact 608, touch-sensitive surface 604 optionally transmits liftoff event 624 to electronic device 500 to allow the electronic device to respond accordingly. Because the liftoff of contact 608 was detected within threshold time 612 of the touchdown of contact 608, and because contact 608 moved less than movement threshold 614 during that time, touch-sensitive surface 604 optionally identifies the touch input including contact 608 as being a click or selection input. As a result, touch-sensitive surface 604 transmits a simulated button press event 626 followed by a simulated button release event 628 to electronic device 500. Also, in some embodiments, upon identifying the touch input including contact 608 as being a click or selection input, touch-sensitive surface 604 provides tactile output (e.g., a vibration, represented by the zigzag patterns on touch-sensitive surface 604 in FIG. 6C) to the user to indicate that the user's input was identified as a click or selection input. For ease of description in the remainder of this disclosure, touch-sensitive surface 604 will be described as identifying contact 608 as a particular input (e.g., a click or selection input), rather than identifying "a touch input including contact 608" as the particular input. Further, in some embodiments, inputs are processed and analyzed by electronic device 500 in addition or alternatively to being processed and analyzed by touch-sensitive surface 604.

In FIG. 6D, because object 606-2, corresponding to content item B, had the current focus when contact 608 was identified as a click or selection input in FIG. 6C, electronic device 500 displays content item B on display 514.

FIGS. 6E-6G illustrate a scenario in which contact 608 moves more than movement threshold 614 within time threshold 612. Specifically, in FIG. 6E, touchdown of contact 608 is detected (e.g., as described with reference to FIG. 6A). In FIG. 6F, contact 608 has moved more than movement threshold 614 in an amount of time less than time threshold 612 (e.g., T3, as shown in duration bar 610). As a result, touch-sensitive surface 604 optionally identifies contact 608, not as a click or selection input (e.g., as in FIGS. 6A-6C), but rather as a movement input. As such, touch-sensitive surface 604 optionally initiates an operation to display on display 514 a change in the appearance of object 606-2 (the object with current focus) to indicate that continued movement of contact 608 will result in changing focus to a different object on display 514. In the example of FIG. 6F, because contact 608 is moving to the left, the appearance of object 606-2 is changed to show a skew towards the left to indicate that continued movement of contact 608 will cause the current focus to change to object 606-1. In some embodiments, object 606-2 optionally skews or tilts up or down in accordance with up or down movement of contact 608 detected on touch-sensitive surface 604 (in a manner analogous to skewing or tilting right or left in accordance with right or left movement of contact 608 detected on touch-sensitive surface 604). In FIG. 6F, additional movement of contact 608 to the left optionally results in object 606-2 losing the current focus, and object 606-1 receiving the current focus, as shown in FIG. 6G.

In FIG. 6G, continued movement of contact 608 to the left is detected between times T3 and T4, and the current focus is changed to object 606-1 in accordance with the detected continued movement. Because the current focus has moved from object 606-2 to object 606-1, the appearance of object 606-2 is optionally reverted back to its normal appearance in FIG. 6E. As has been mentioned previously, touch-sensitive surface 604 optionally continually transmits information 620 about the position of contact 608 to electronic device 500 while contact 608 is touched down on touch-sensitive surface 604 (as shown in FIGS. 6E-6G).

FIGS. 6H-6L illustrate a scenario in which contact 608 moves less than movement threshold 614, and the liftoff of contact 608 is detected after time threshold 612, simulating a button press followed by a button release on a dedicated remote control. Specifically, in FIG. 6H, touchdown of contact 608 is detected (e.g., as described with reference to FIG. 6A). In FIG. 6I, contact 608 has moved less than movement threshold 614 in an amount of time less than time threshold 612 (e.g., T5, as shown in duration bar 610). In FIG. 6J, contact 608 has continued to move less than movement threshold 614, and remains in contact with touch-sensitive surface 604 (e.g., has not lifted off touch-sensitive surface 604) when time threshold 612 expires (as shown in duration bar 610). As a result, at the expiration of time threshold 612, touch-sensitive surface 604 optionally identifies contact 608 as a button press input, and transmits a simulated button press event 626 to electronic device 500. In response to receiving the button press event 626, electronic device 500 optionally changes the appearance of object 606-2 (the object with current focus) to indicate that liftoff of contact 608 will cause content item B—associated with object 606-2—to be shown on display 514. Specifically, object 606-2 is optionally "pressed back" into user interface 602 in response to the button press event 626, and is thus shown at a slightly smaller size than the other objects 606 on display 514, as shown in FIG. 6J. Also, in some embodiments, upon identifying contact 608 as a button press input, touch-sensitive surface 604 provides tactile output (e.g., a vibration, represented by the zigzag patterns on touch-sensitive surface 604 in FIG. 6J) to the user to indicate that the user's input was identified as a button press input.

In FIG. 6K, contact 608 has lifted off touch-sensitive surface 604 after time threshold 612 (e.g., T6, as shown in duration bar 610). In response to detecting the liftoff of contact 608, touch-sensitive surface 604 optionally transmits liftoff event 624 to electronic device 500 to allow the electronic device to respond accordingly. Additionally, touch-sensitive surface 604 transmits simulated button release event 628 to electronic device 500 upon detecting liftoff of contact 608, and optionally provides a second tactile output (e.g., a vibration, represented by the zigzag patterns on touch-sensitive surface 604 in FIG. 6K) to the user to indicate that the liftoff of contact 608 was identified as a button release input. The appearance of object 606-2 on display 514 is also reverted back to its original appearance in FIGS. 6H-6I, because contact 608 has lifted off touch-sensitive surface (e.g., the simulated button press has been released), and object 606-2 is no longer being "pressed back" into user interface 602.

In FIG. 6L, because object 606-2, corresponding to content item B, had the current focus when contact 608 was identified as a button press input (in FIG. 6J) followed by a button release input (in FIG. 6K), electronic device 500 displays content item B on display 514. As has been mentioned previously, touch-sensitive surface 604 optionally continually transmits information 620 about the position of contact 608 to electronic device 500 while contact 608 is touched down on touch-sensitive surface 604 (as shown in FIGS. 6H-6J).

FIGS. 6M-6N illustrate a scenario in which contact 608 has moved less than movement threshold 614 during time threshold 612, thus being identified as a button press input, and has moved after being identified as such. Specifically, in FIG. 6M, contact 608 has been identified as a button press input at time threshold 612 (e.g., as described with reference to FIGS. 6H-6J). In FIG. 6N, contact 608 has moved after being identified as a button press input at time threshold 612 (e.g., between time threshold 612 and time T7). In some embodiments, movement of contact 608 after being identified as a button press input is not identified as a movement input, and thus does not cause a change in appearance of object 606-2 (e.g., the object with current focus) that movement of contact 608 before being identified as a button press input might have caused (e.g., as described with reference to FIGS. 6E-6F).

FIGS. 6O-6Q illustrate a scenario in which contact 608 has moved less than movement threshold 614 during time threshold 612, thus being identified as a button press input, and has continued to move less than movement threshold 614 while remaining touched down on touch-sensitive surface 604 for a second time threshold 618, longer than time threshold 612. Specifically, in FIG. 6O, contact 608 has been identified as a button press input at time threshold 612 (e.g., as described with reference to FIGS. 6H-6J). In FIG. 6P, contact 608 has remained touched down on touch-sensitive surface 604 through time threshold 618, which is longer than time threshold 612. Additionally, contact 608 has moved less than movement threshold 614 during time threshold 618. As a result, contact 608 is optionally identified as a long press input that causes electronic device 500 to enter an object rearrangement mode in which objects 606 can be rearranged in response to movement detected on touch-sensitive surface 604. In some embodiments, when the object rearrangement mode is entered, the appearance of object 606-2 (the object with the current focus) is optionally changed to indicate that subsequent movement of contact 608 will result in movement of object 606-2 within the arrangement of objects 606 in user interface 602. In the example of FIG. 6P, object 606-2 is enlarged with respect to the other objects 606 to indicate that subsequent movement of contact 608 will result in movement of object 606-2. Alternatively, or in addition, the object optionally also moves slightly (e.g., oscillating or jiggling) to indicate that it can be moved within the plurality of objects.

In FIG. 6Q, contact 608 has moved to the right after being identified as a long press input (e.g., between time threshold 618 and time T8). As a result, object 606-2 has been moved to the right in objects 606 in accordance with the movement of contact 608, and specifically, has taken the place of object 606-3, which has moved to take the original place of object 606-2 in the arrangement of objects 606. Additional movement of contact 608 on touch-sensitive surface optionally results in further movement of object 606-2 in the arrangement of objects 606 in accordance with the additional movement of contact 608.

FIGS. 7A-7E are flow diagrams illustrating a method 700 of simulating button-click functionality on a device having a touch-sensitive surface without button-click functionality in accordance with some embodiments of the disclosure. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways of simulating button-click functionality on a device having a touch-sensitive surface without button-click functionality. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a mobile telephone, a remote control, a media playback device, a set-top box connected to a television, such as device 100, 300 or 500 or remote 510), while a respective object (e.g., a representation of a content item available on a set-top box), of a plurality of selectable user interface objects displayed in a user interface on a display (e.g., a television connected to a set-top box), has focus, detects (702) a touch input on a touch-sensitive surface (e.g., a touchpad, a touchscreen) of an input device (e.g., a remote control, a mobile telephone, or a media playback device controlling a set-top box that is configured to control the user interface), wherein detecting the touch input includes detecting touchdown of a contact on the touch-sensitive surface, such as in FIG. 6A. In some embodiments, after detecting the touchdown of the contact (704): in accordance with a determination (e.g., determined on a mobile telephone, a remote control, a media playback device, a set-top box connected to a television) that the touch input comprises the touchdown of the contact followed by liftoff of the contact within a first time threshold (e.g., 20 ms, 50 ms, 80 ms, 100 ms, 150 ms, before a command corresponding to the touch input is transmitted to a set-top box connected to the display), and movement of the contact is less than a threshold amount of movement (e.g., 0.5 mm, 1 mm or 2 mm; the contact touches down on, and lifts off from, the touch-sensitive surface without moving substantially (e.g., moving less than one or two pixels)), the electronic device initiates (706) an operation to display, on the display, content associated with the respective object, such as in FIGS. 6B-6D (e.g., interpret the touch input as "clicking" the touch-sensitive surface, and selecting the respective object in the user interface, and in response to the selection, playing content associated with the respective object). In some embodiments, after detecting the touchdown of the contact, in accordance with a determination that the touch input comprises the touchdown of the contact followed by the movement of the contact that is greater than the threshold amount of movement within the first time threshold (e.g., the contact touches down on the touch-sensitive surface and moves substantially), the electronic device initiates (708) an operation to display, on the display, a change in an appearance of the respective object to indicate that continued movement of the contact will result in changing focus to a different object of the plurality of selectable user interface objects in the user interface displayed by the display, such as in FIGS. 6E-6F (e.g., interpret the touch input, not as "clicking" and selecting the respective object in the user interface, but rather corresponding to an input for moving the current focus away from the respective object in accordance with the movement of the contact). In some embodiments, the appearance of the respective object, such as its shading, color, positioning, etc., changes as the contact in the touch input moves.

In some embodiments, in accordance with the determination that the touch input comprises the touchdown of the contact followed by the movement of the contact that is greater than the threshold amount of movement within the first time threshold, the electronic device forgoes initiating (710) the operation to display the content associated with the respective object when the contact is lifted off of the touch-sensitive surface, such as in FIGS. 6E-6F. For example, if the contact moves substantially after touching down on the touch-sensitive surface, the contact is optionally identified, not as a "click" or selection input, but as a movement input. Thus, the touch input does not select the respective object, which has current focus.

In some embodiments, after detecting the touchdown of the contact, in accordance with a determination that the touch input comprises the touchdown of the contact followed by the liftoff of the contact after the first time threshold, and the movement of the contact during the first time threshold is less than the threshold amount of movement (e.g., 0.5 mm, 1 mm or 2 mm; the contact touches down on, and lifts off from, the touch-sensitive surface without moving substantially (e.g., moving less than one or two pixels) during the first time threshold. For example, an input corresponding to a button press is detected for a period of time that is shorter than a period of time for detecting a long button press input), the electronic device initiates (712) an operation to display, on the display, a change in the appearance of the respective object to indicate that the liftoff of the contact will result in the content associated with the respective object to be displayed on the display, such as in FIGS. 6H-6K. For example, if the contact maintains touchdown longer than the first time threshold, the electronic device optionally generates a simulated button press event at the end of the first time threshold, such as in FIG. 6J. Liftoff of the contact after the first time threshold optionally causes the electronic device to generate a simulated button release event when the liftoff of the contact is detected, such as in FIG. 6K. If the touchdown of the contact is maintained for longer than the first time threshold, but shorter than a second time threshold, a simulated button press event optionally causes the respective object to be pushed back, into the user interface, to indicate that liftoff of the contact will result in selection of the respective object, and thus playback of the content associated with the respective object.

In some embodiments, after detecting the touchdown of the contact, in accordance with the determination that the touch input comprises the touchdown of the contact followed by the liftoff of the contact after the first time threshold, and the movement of the contact during the first time threshold is less than the threshold amount of movement, the electronic device detects (714) a movement of the contact after the first time threshold without initiating an operation to display, on the display, a change in the appearance of the respective object in accordance with the movement of the contact detected after the first time threshold, such as in FIGS. 6M-6N. For example, once the touch input is identified as corresponding to a simulated button press event because it is substantially stationary for the first time threshold, subsequent movement of the contact is optionally not identified as corresponding to an input to move the current focus in the user interface. As such, the appearance of the respective object in the user interface is optionally not changed to indicate that the current focus will change with continued movement of the contact.

In some embodiments, after detecting the touchdown of the contact, in accordance with a determination that the touch input comprises the touchdown of the contact followed by the liftoff of the contact after a second time threshold, longer than the first time threshold (e.g., an input corresponding to a button press is detected for a period of time that is longer than a period of time for detecting a long button press input), and the movement of the contact during the second time threshold is less than the threshold amount of movement, the electronic device initiates (716) an operation to display, on the display, a change in the appearance of the respective object to indicate that subsequent movement of the contact will result in movement of the respective object within an arrangement of the plurality of selectable user interface objects, such as in FIGS. 60-6P (e.g., an input corresponding to a click-and-hold input (e.g., a button press input for a long period of time) optionally initiates a mode for moving, not the current focus from one object to another in the user interface, but rather for moving the respective object around in the user interface). In some embodiments, subsequent movement of the contact then optionally moves the respective object with respect to other objects in the user interface in accordance with the movement of the contact, such as in FIG. 6Q. Initiation of this mode is optionally indicated by changing the appearance of the respective object, such as causing the respective object to wiggle or jiggle in place.

In some embodiments, wherein it is determined that the touch input comprises the touchdown of the contact followed by the liftoff of the contact after the second time threshold, and the movement of the contact during the second time threshold is less than the threshold amount of movement (718), after the second time threshold (720): the electronic device detects (722) the subsequent movement of the contact (e.g., detecting movement of the contact after the touch input is identified as corresponding to an input to move the respective object in the user interface) and initiates (724) an operation to move the respective object within the arrangement of the plurality of selectable user interface objects in accordance with the detected subsequent movement of the contact, such as in FIGS. 6P-6Q.

In some embodiments, the electronic device comprises (726) the input device and the touch-sensitive surface (e.g., the electronic device is a mobile phone with a touch screen, which is configured as an input device (e.g., a remote control) to a second electronic device, such as a set-top box connected to a television). In some embodiments, initiating the operation to display the content associated with the respective object comprises transmitting (728), by the electronic device, a corresponding first event (e.g., a remote control command, such as a button press event, a button release event) to a second electronic device (e.g., a set-top box connected to a television), different from the electronic device, to display the content associated with the respective object on the display, such as in FIG. 6C (e.g., the electronic device processes the touch input and identifies it as a selection input, and after processing the touch input, transmits a command corresponding to a selection input (e.g., button press and button release events) to the second electronic device), and initiating the operation to display the change in the appearance of the respective object comprises transmitting (730), by the electronic device, a corresponding second event (e.g., a remote control command, such as one or more contact movement events) to the second electronic device to display the change in the appearance of the respective object, such as in FIG. 6F. In some embodiments, the electronic device comprises a mobile telephone.

In some embodiments, after detecting the touchdown of the contact, the electronic device continually transmits (734) information about a position of the contact on the touch-sensitive surface of the electronic device to the second electronic device, such as in FIGS. 6A-6Q. For example, the electronic device optionally transmits contact position commands to the second electronic device independent of which operation the electronic device initiates based on characteristics of the touch input. In this way, the second electronic device optionally always has information about the position of the contact on the touch-sensitive surface, and responds appropriately.

In some embodiments, in response to detecting the touchdown of the contact, the electronic device transmits (736) a simulated touchdown event to the second electronic device, such as in FIG. 6A. For example, the electronic device optionally sends information to the second electronic device indicating that a contact has been detected on the touch-sensitive surface in response to detecting the contact.

In some embodiments, in accordance with the determination that the touch input comprises the touchdown of the contact followed by the liftoff of the contact within the first time threshold (e.g., 20 ms, 50 ms, 80 ms, 100 ms, 150 ms), and the movement of the contact is less than the threshold amount of movement (e.g., 0.5 mm, 1 mm or 2 mm; the contact touches down on, and lifts off from, the touch-sensitive surface within the first time threshold without moving substantially (e.g., moving less than one or two pixels)), the electronic device transmits (738) a simulated button press event followed by a simulated button release event to the second electronic device, such as in FIG. 6C (e.g., a short and substantially stationary contact is optionally identified as a button press and button release input, the corresponding simulated button press and button release events for which are optionally transmitted to the second electronic device). In some embodiments, the simulated button press event is the same as a button press event that is sent to the second electronic device when a physical button of a dedicated remote control device is pressed, and an object in a user interface with current focus is optionally pushed down and pops up in accordance with the button press and subsequent button release of the physical (or simulated) button.

In some embodiments, after detecting the touchdown of the contact, in accordance with a determination that the touch input comprises the touchdown of the contact followed by the liftoff of the contact after the first time threshold, and the movement of the contact during the first time threshold is less than the threshold amount of movement (740): (e.g., a long and substantially stationary, during the first time threshold, contact is detected), the electronic device transmits (742) a simulated button press event to the second electronic device in response to detecting expiration of the first time threshold, such as in FIG. 6J (e.g., the touch input is optionally identified as corresponding to a button press at the end of the first time threshold. In some embodiments, the simulated button press event is the same as a button press event that is sent to the second electronic device when a physical button of a dedicated remote control device is pressed). In some embodiments, the electronic device transmits (744) a simulated button release event to the second electronic device in response to detecting the liftoff of the contact, such as in FIG. 6K (e.g., the touch input is optionally identified as corresponding to a button release when the contact lifts off from the touch-sensitive surface). In some embodiments, the simulated button release event is the same as a button release event that is sent to the second electronic device when a physical button of a dedicated remote control device is released.

In some embodiments, the electronic device comprises a multifunction device. In some embodiments, the multifunction device is a mobile telephone configured to perform multiple functions, such as telephone functions, messaging functions, etc. that are independent of the controlling content displayed on the display (e.g., the electronic device is configured to run applications that are unrelated to controlling functions of a set top box) running a remote control application (746), such as in FIGS. 10A-10N (e.g., software on the multifunction device for configuring the multifunction device to operate as a remote control for a second electronic device, such as a set-top box), and the remote control application causes the electronic device to transmit events (748), including the corresponding first event and the corresponding second event, to the second electronic device, the transmitted events corresponding to events transmitted to the second electronic device by a dedicated remote control device of the second electronic device, the dedicated remote control device having a trackpad that includes button click functionality. For example, the application optionally configures the multifunction device to operate in a manner analogous to a dedicated remote control device, and thus transmit remote control events to the second electronic device that correspond to remote control events that the dedicated remote control device would transmit to the second electronic device. The dedicated remote control device is optionally a remote control device with a physical actuator for allowing clicking of a button or surface of the remote control, or a remote control device with a haptic actuator and pressure detectors coupled to a surface (e.g., touch-sensitive surface, touch screen, etc.) of the remote control device, the pressure detectors for triggering the haptic actuator when contacts are detected at one or more predefined pressures on the surface of the remote control device.

In some embodiments, after detecting the touchdown of the contact (750): in accordance with the determination that the touch input comprises the touchdown of the contact followed by the liftoff of the contact within the first time threshold, and the movement of the contact is less than the threshold amount of movement, the electronic device initiates (752) an operation to provide haptic feedback at the input device in response to detecting the liftoff of the contact, such as in FIG. 6C (e.g., causing the input device and/or the touch-sensitive surface of the input device to deflect or vibrate, to provide the user with a sensation of "clicking" the touch-sensitive surface). If the contact is a relatively short contact with substantially no movement, the simulated "click" of the touch-sensitive surface is optionally provided at the time of liftoff of the contact from the touch-sensitive surface. In some embodiments, a single tactile output is provided at the time of the liftoff of the contact. In some embodiments, two tactile output events are provided at the time of the liftoff of the contact (e.g., to simulate a physical click and release at the time of the liftoff of the contact). In some embodiments, in accordance with a determination that the touch input comprises the touchdown of the contact followed by the liftoff of the contact after the first time threshold, and the movement of the contact during the first time threshold is less than the threshold amount of movement (e.g., the contact is relatively long with substantially no movement), the electronic device initiates (754) an operation to provide first haptic feedback at the input device in response to detecting expiration of the first time threshold, such as in FIG. 6J, and to provide second haptic feedback at the input device in response to detecting the liftoff of the contact, such as in FIG. 6K (e.g., if the contact is a relatively long contact with substantially no movement, the simulated "click" of the touch-sensitive surface is optionally provided at the time of expiration of the first time threshold). In some embodiments, the simulated "release" of the touch-sensitive surface is optionally provided at the time of the liftoff of the contact from the touch-sensitive surface.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500, 1700 and 1900) are also applicable in an analogous manner to method 700 described above with respect to FIGS. 7A-7E. For example, the touch-sensitive surface, user interface objects, tactile outputs, software remote control applications, simulated buttons, simulated remote trackpads and/or touch inputs described above with reference to method 700 optionally has one or more of the characteristics of the touch-sensitive surfaces, user interface objects, tactile outputs, software remote control applications, simulated buttons, simulated remote trackpads and/or touch inputs described herein with reference to other methods described herein (e.g., methods 900, 1100, 1300, 1500, 1700 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 20) or application specific chips. Further, the operations described above with reference to FIGS. 7A-7E are, optionally, implemented by components depicted in FIGS. 1A-1B. For example, detecting operation 702, and initiating operations 706 and 708 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Movement-Dependent Intensity Thresholds

Users interact with electronic devices in many different manners, including interacting with content (e.g., music, movies, etc.) that may be available (e.g., stored or otherwise accessible) on the electronic devices. In some circumstances, a user may interact with an electronic device using a dedicated remote control having button-click functionality and/or a multifunction device that includes a touch-sensitive surface with contact intensity detection capabilities, such as remote 510 in FIGS. 5A-5B and device 511 in FIG. 5A. A click or selection input is optionally detected at the touch-sensitive surface when the intensity of a contact is above a predefined intensity threshold. However, in some circumstances, a user may unintentionally provide more force on the touch-sensitive surface when providing moving inputs than when providing stationary inputs, potentially resulting in unintentional detection of click or selection inputs at the touch-sensitive surface. The embodiments described below provide ways in which electronic devices reduce the unintentional identification of click or selection inputs when a user is providing moving touch inputs on a touch-sensitive surface, thereby enhancing users' interactions with the electronic devices. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
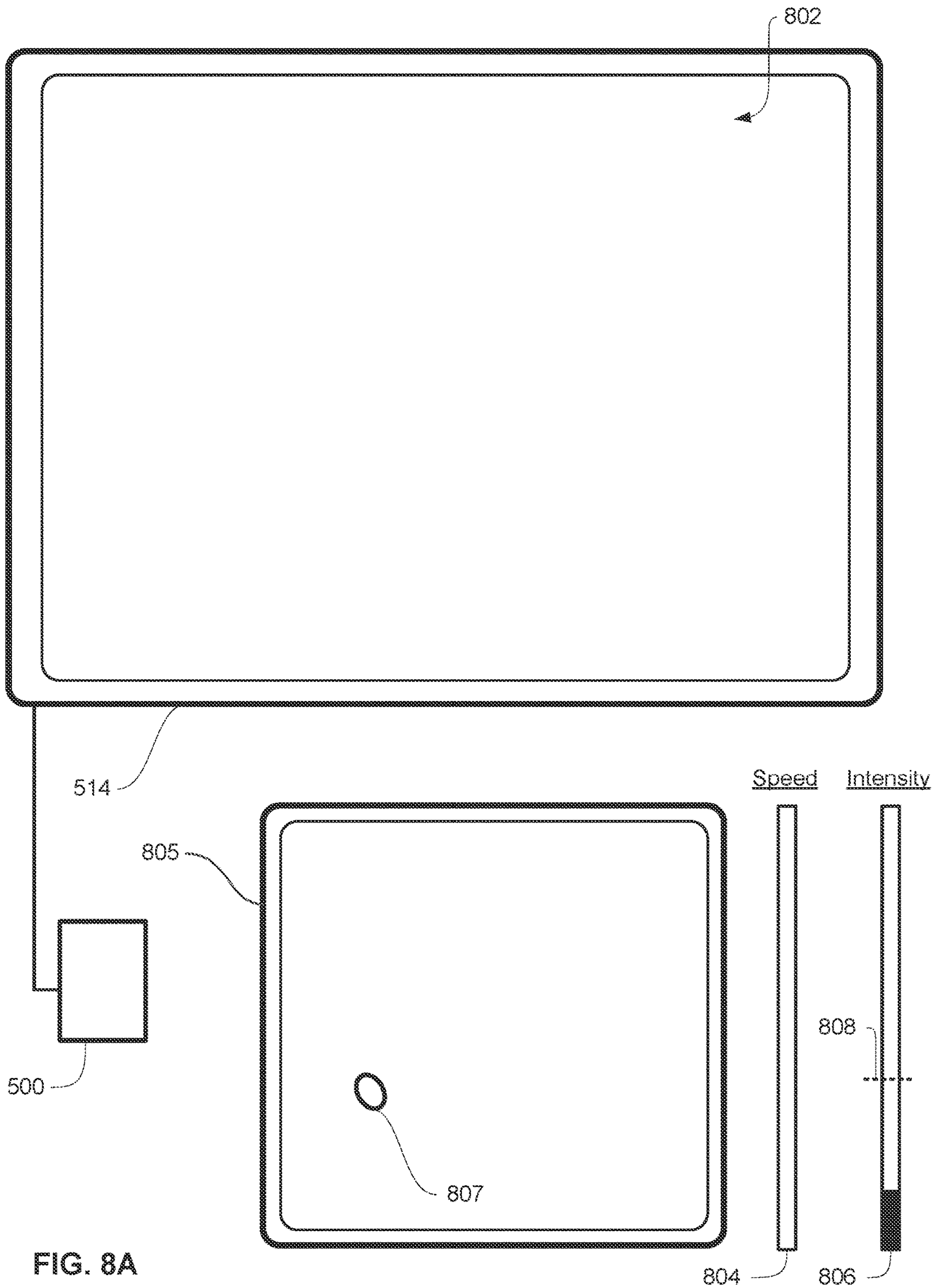
FIGS. 8A-8R illustrate exemplary ways in which electronic devices reduce the unintentional identification of click or selection inputs when a user is providing moving touch inputs on a touch-sensitive surface in accordance with some embodiments of the disclosure.
Figure 8B:
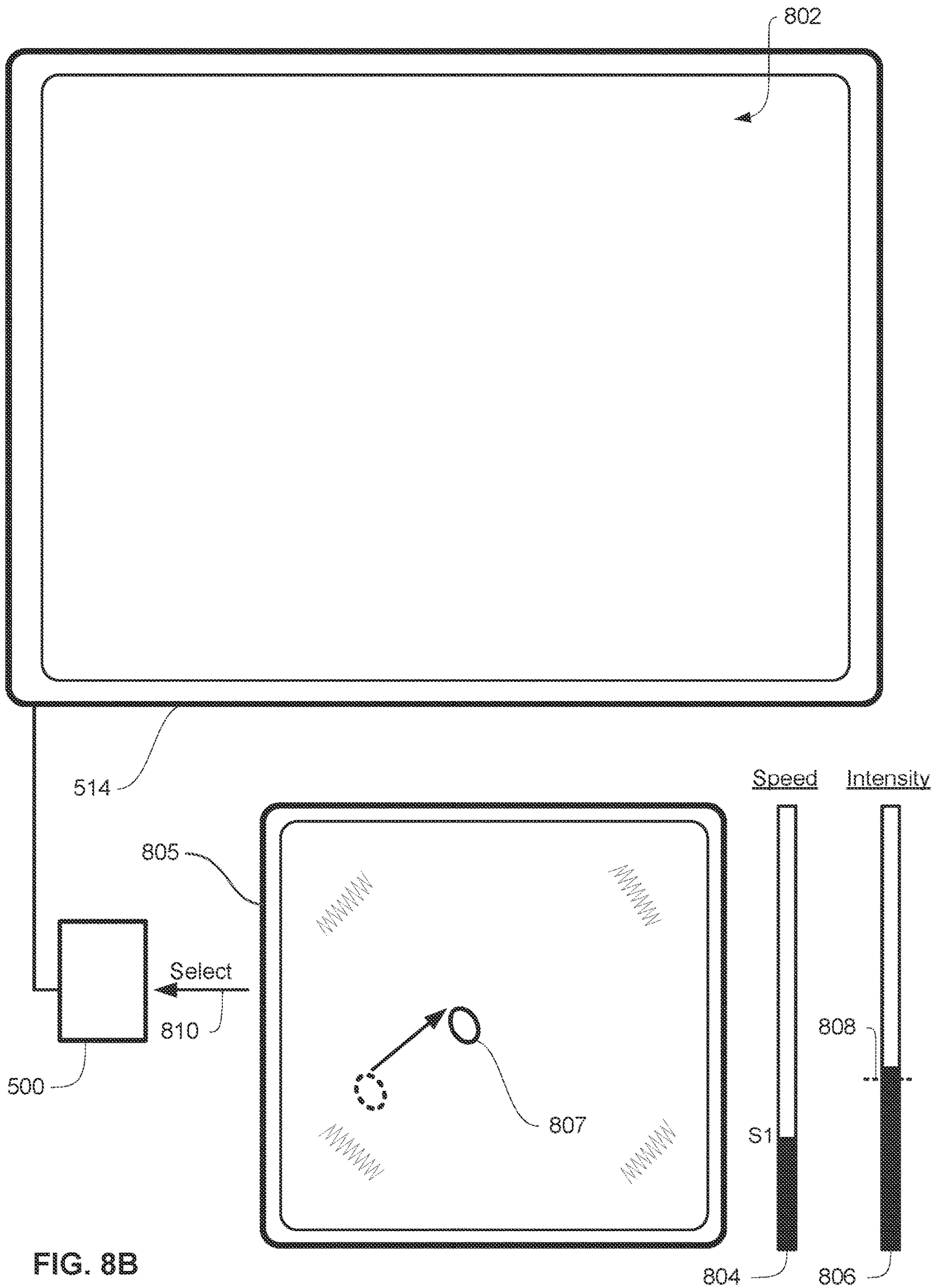
Figure 8C:
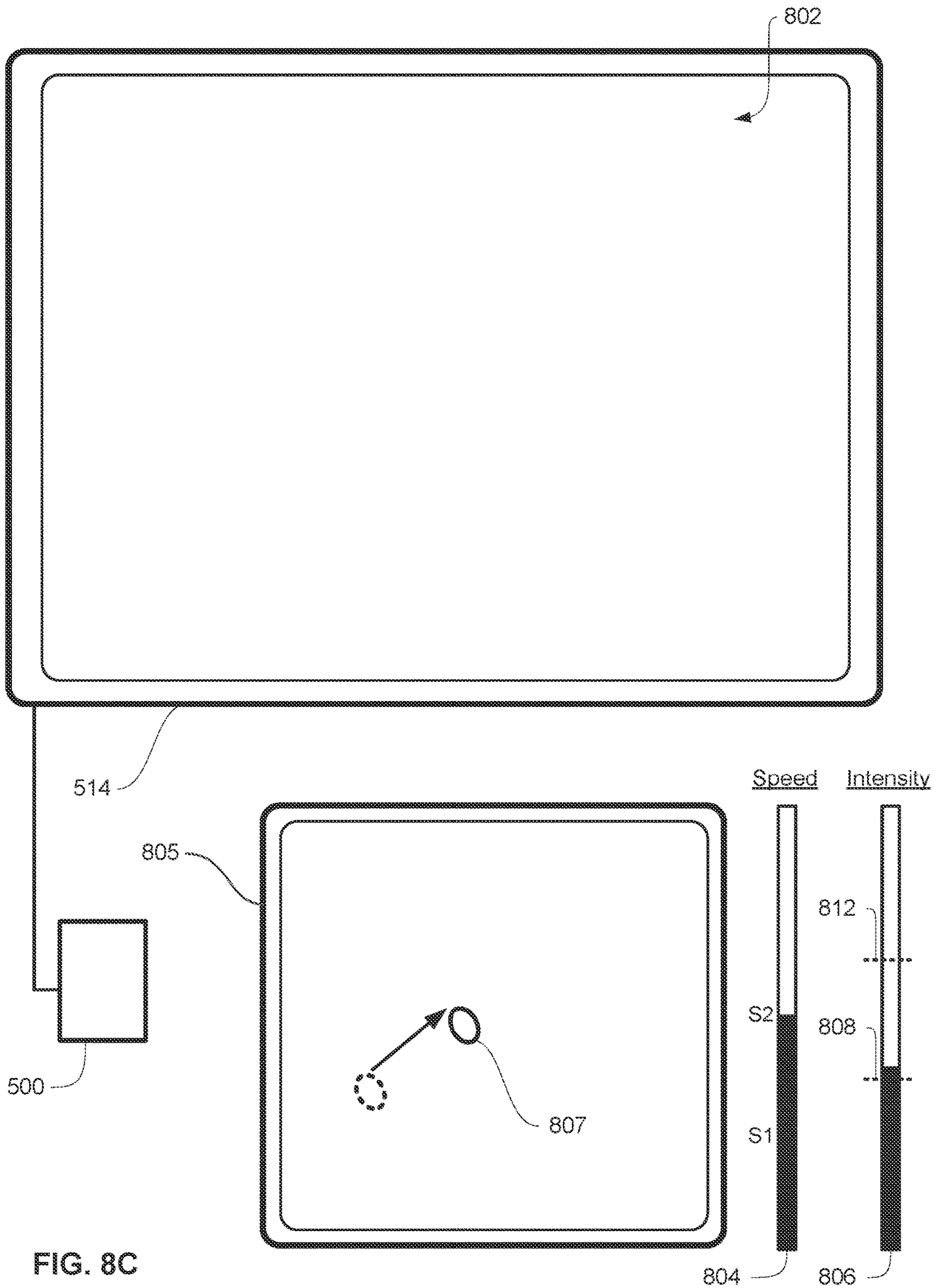
Figure 8D:
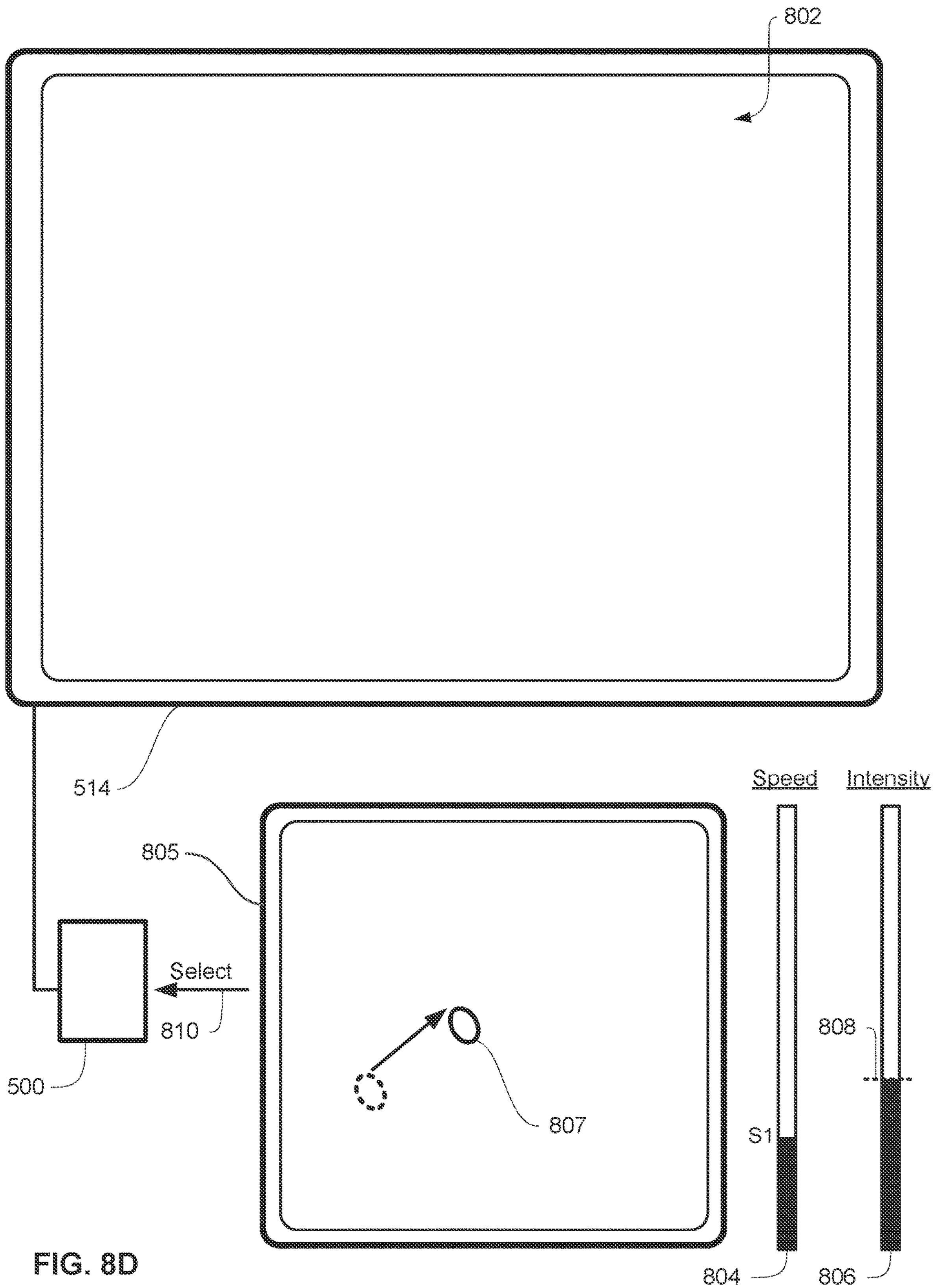
Figure 8E:
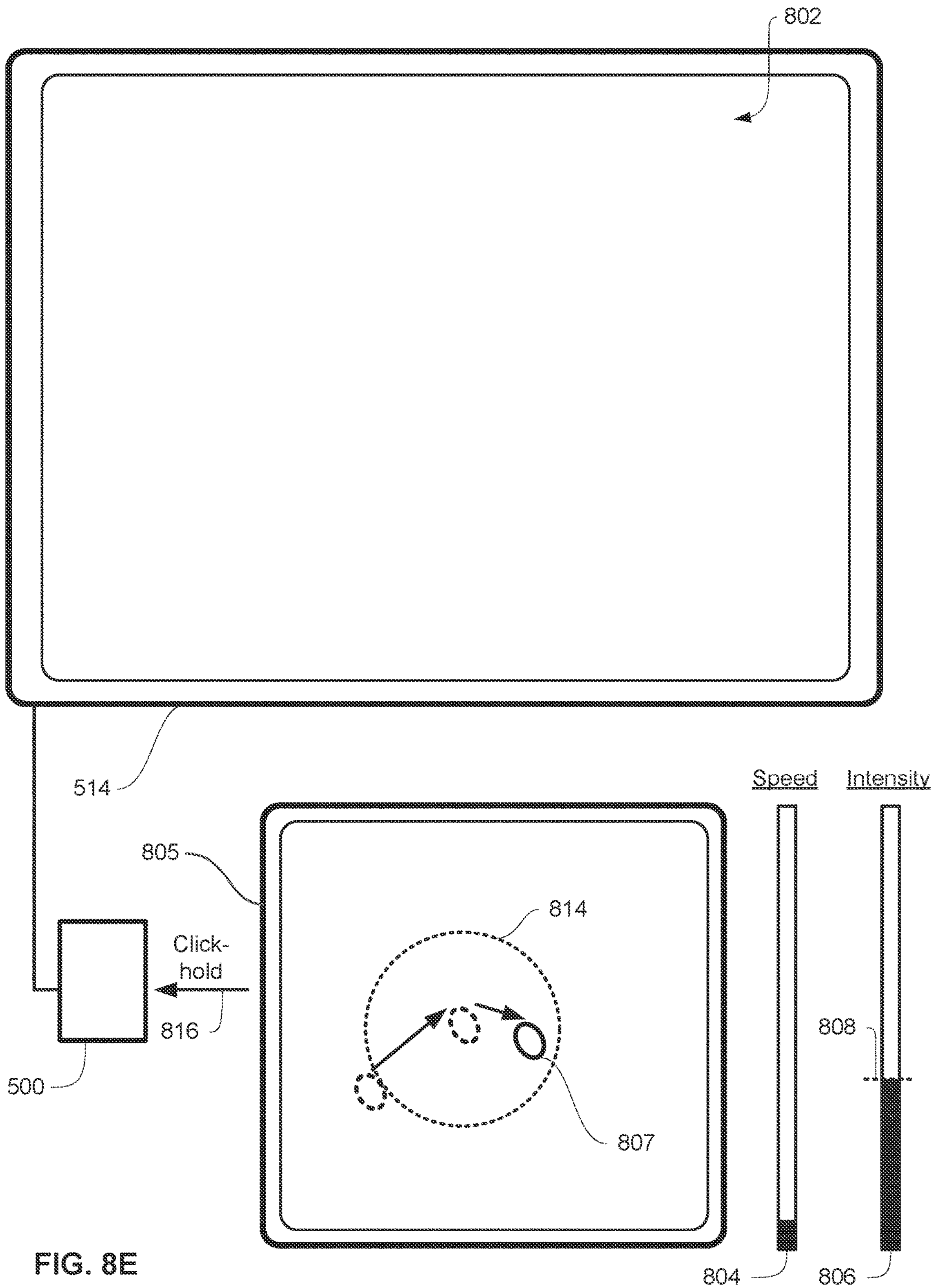
Figure 8F:
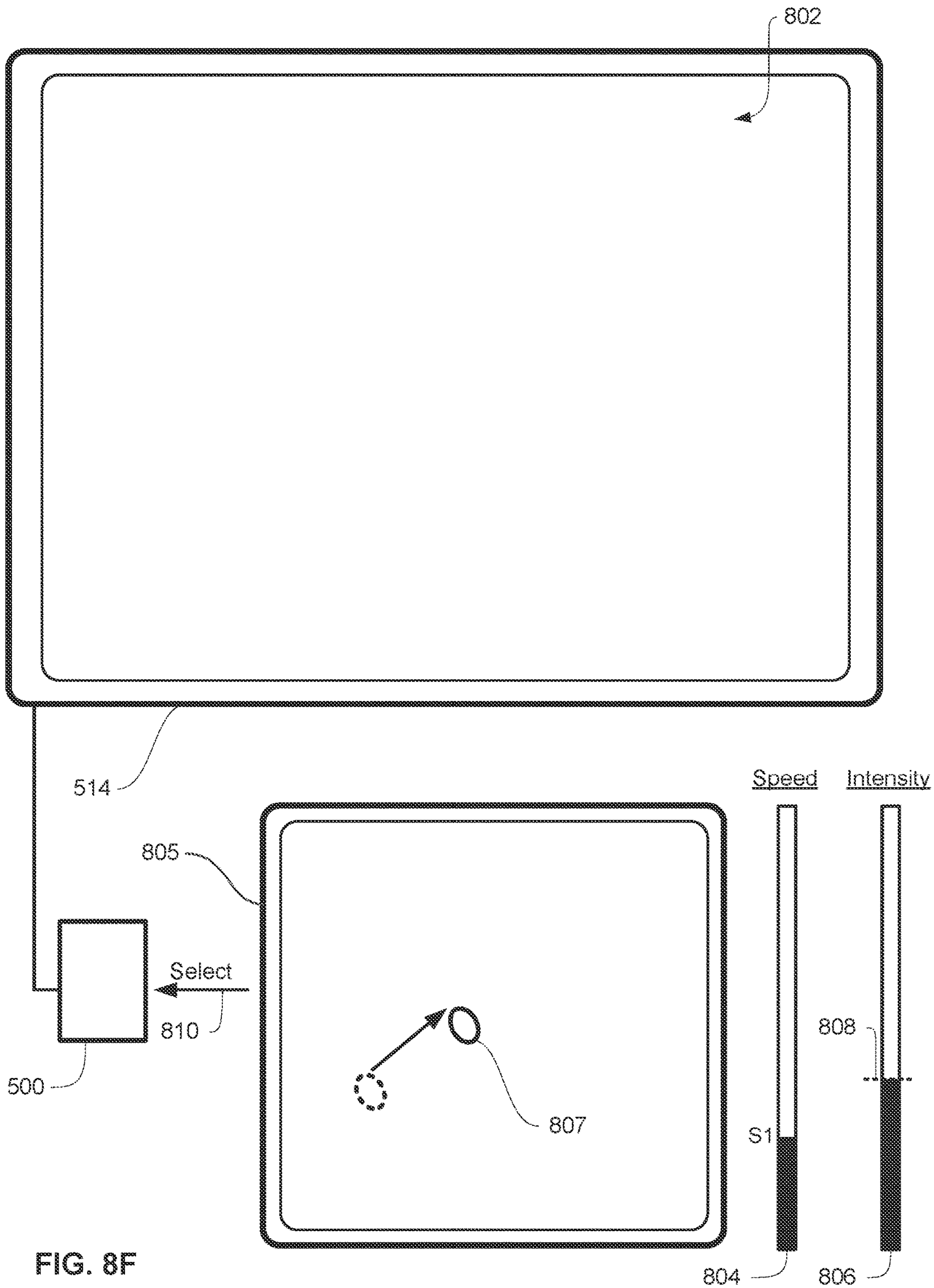
Figure 8G:
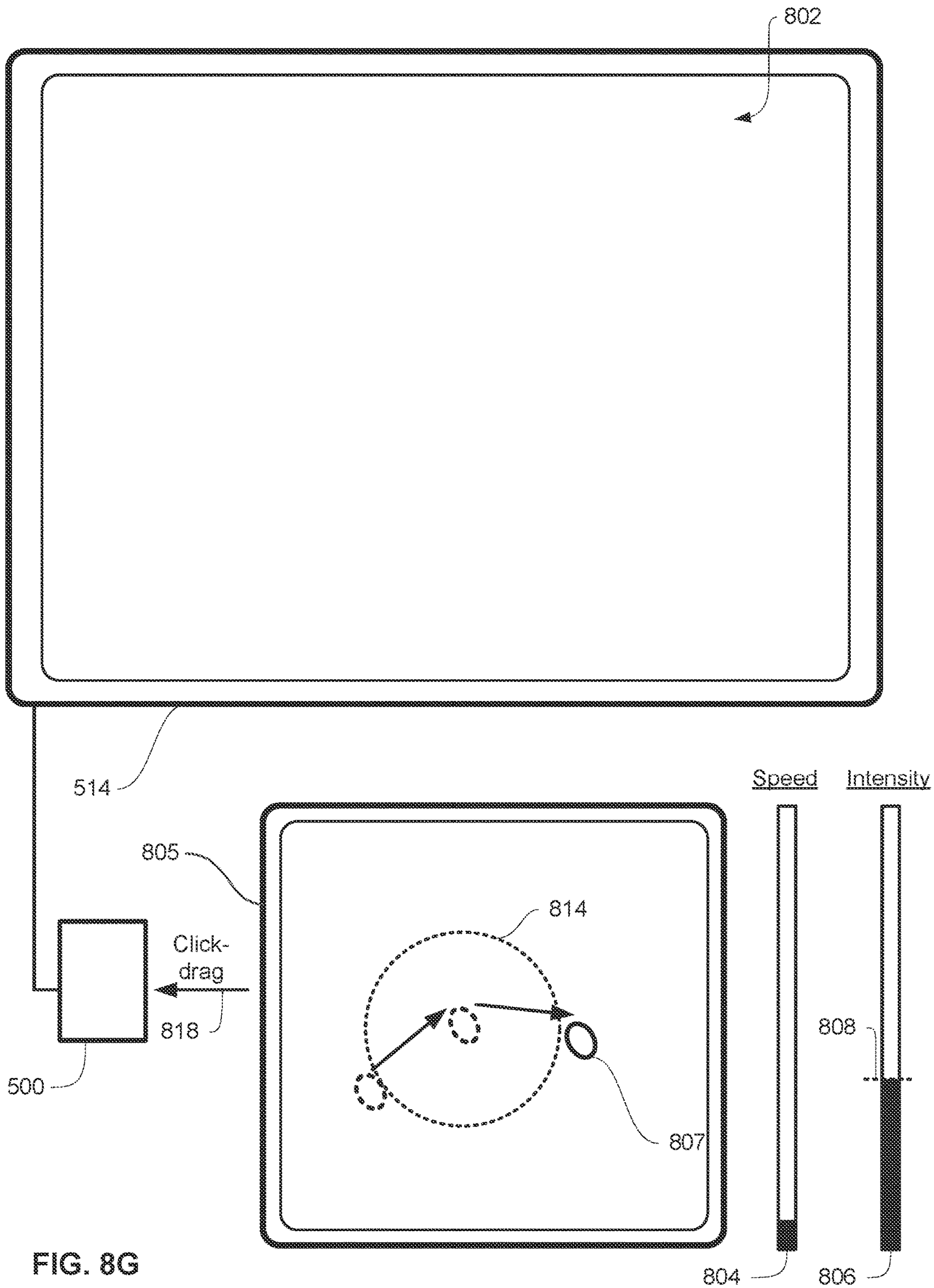
Figure 8H:
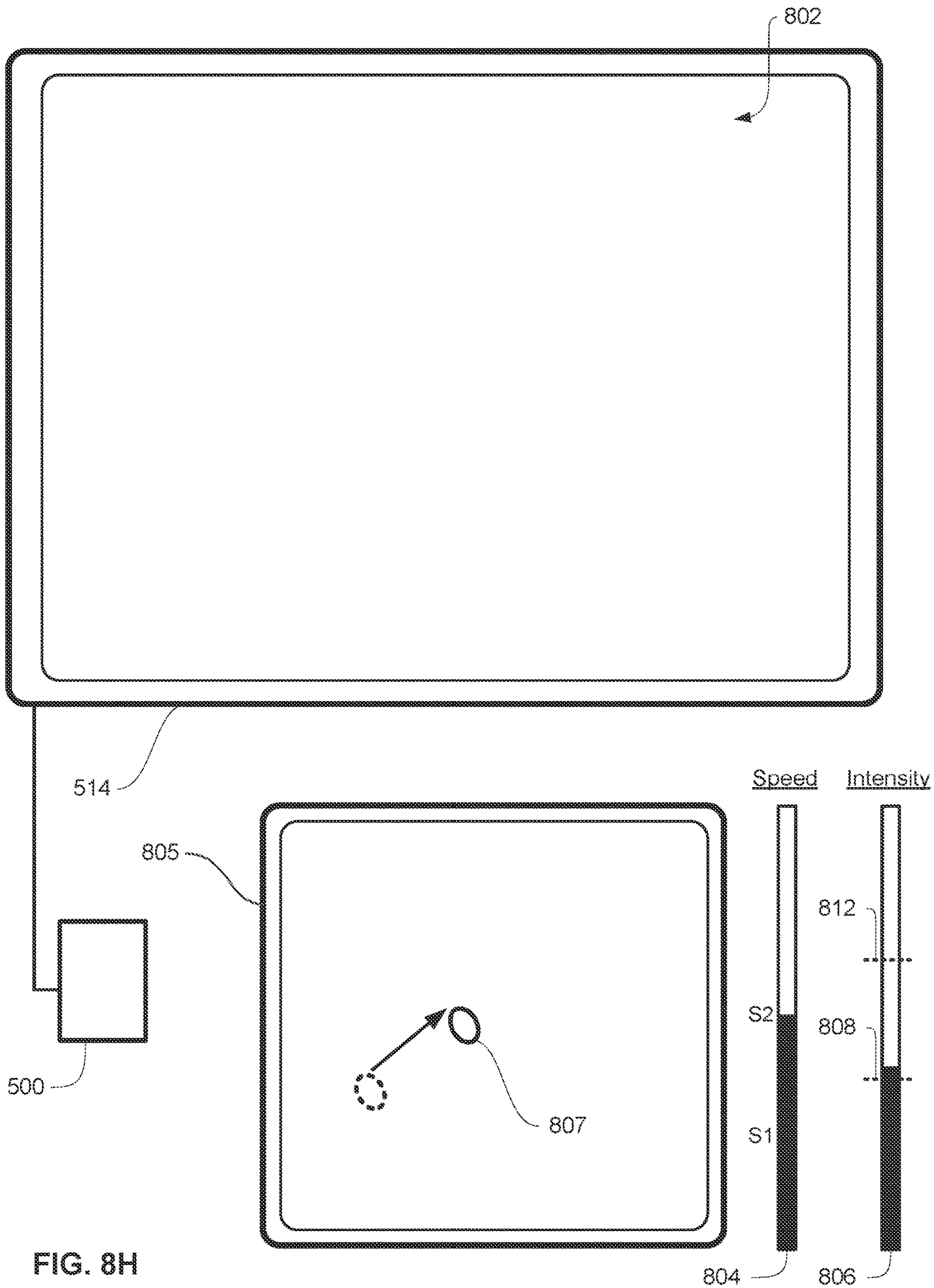
Figure 8I:
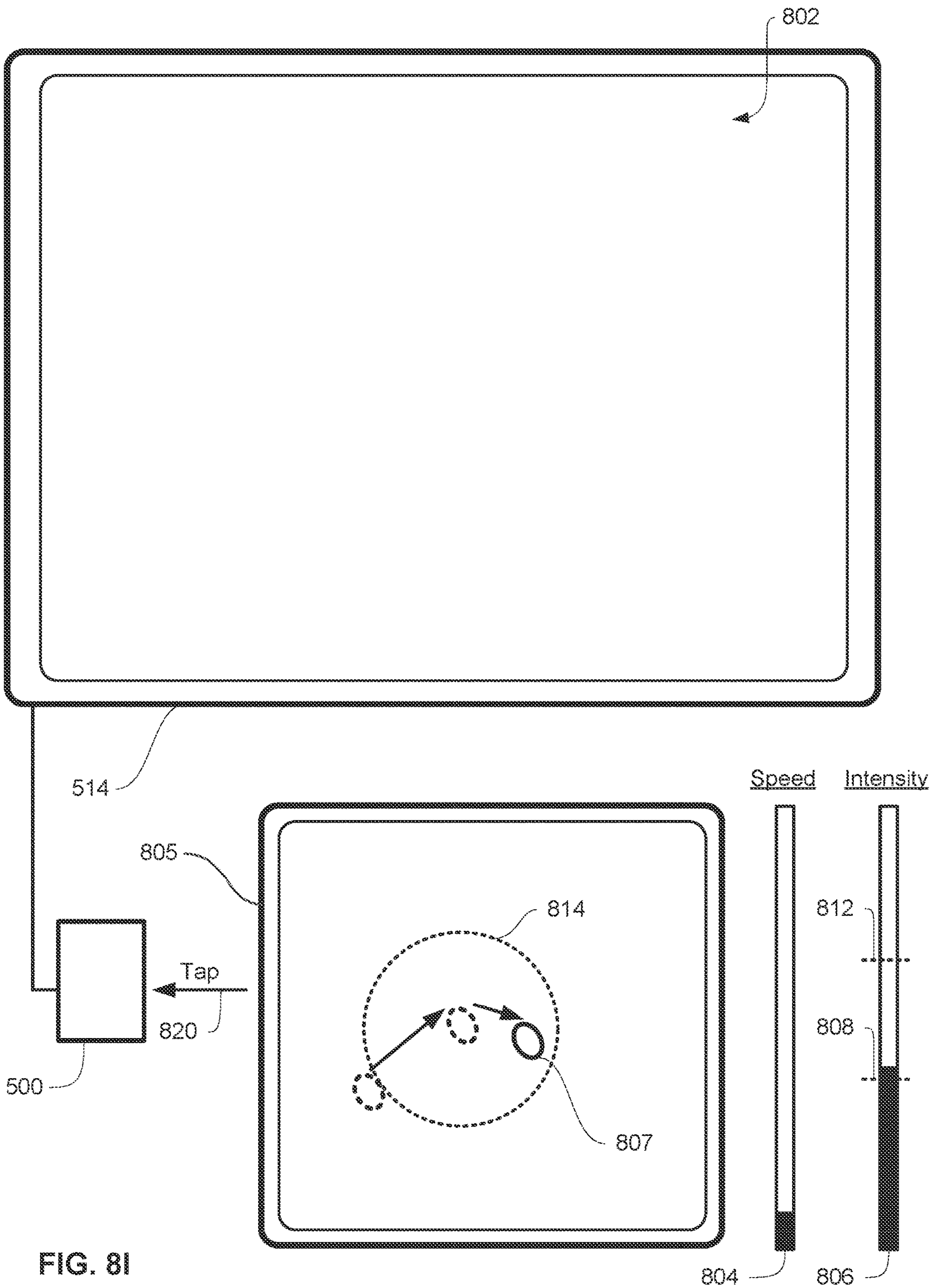
Figure 8J:
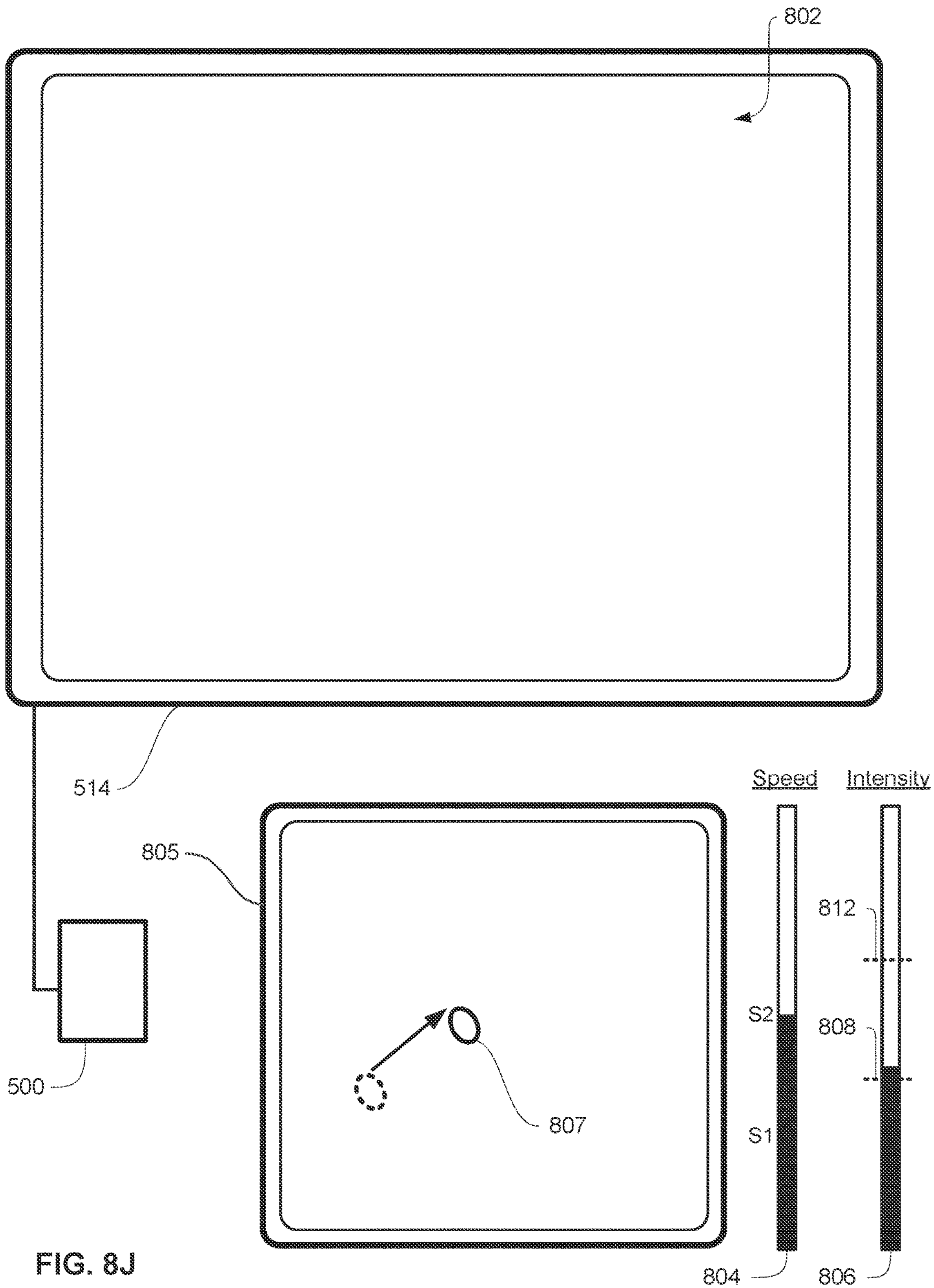
Figure 8K:
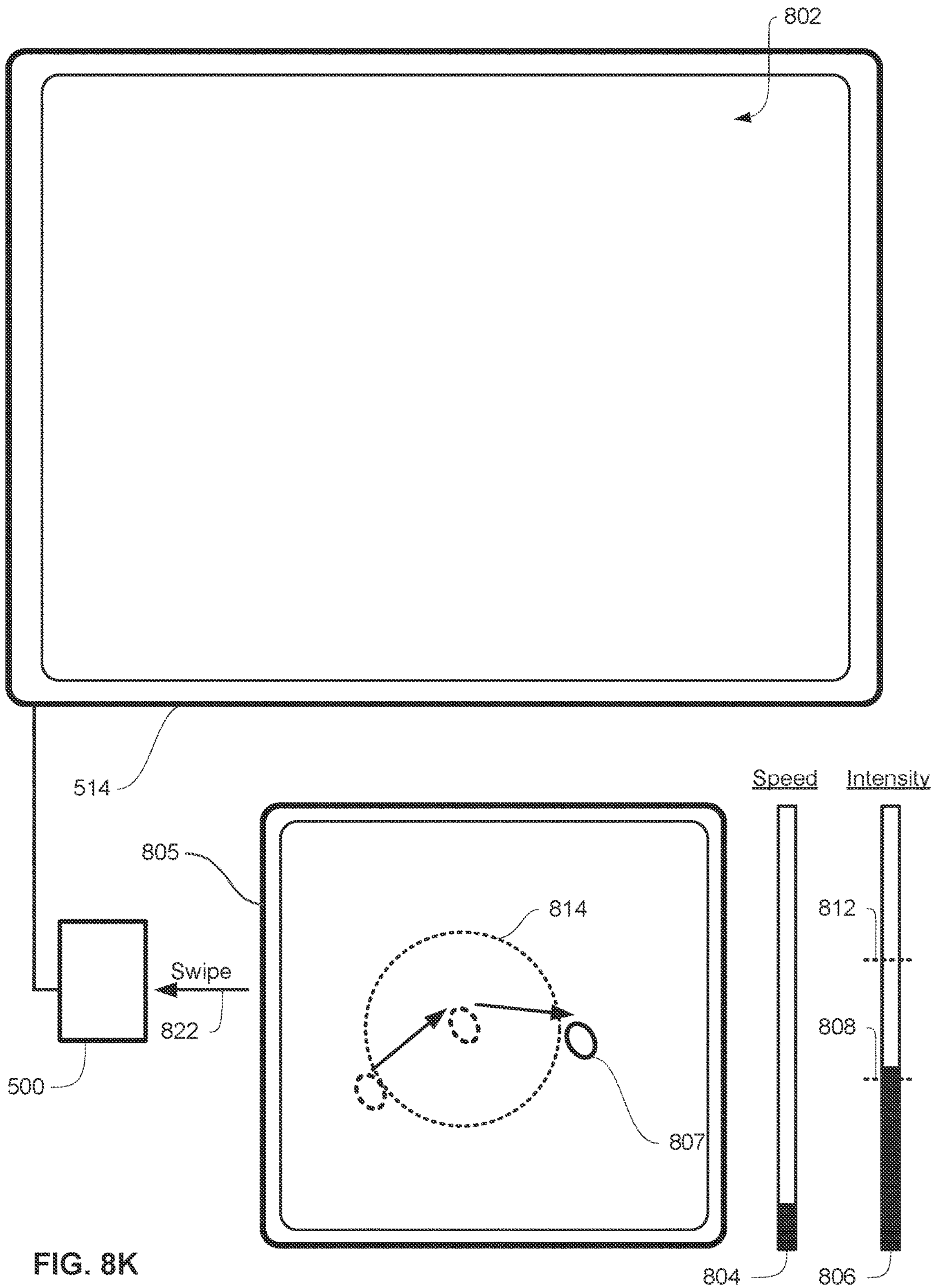
Figure 8L:
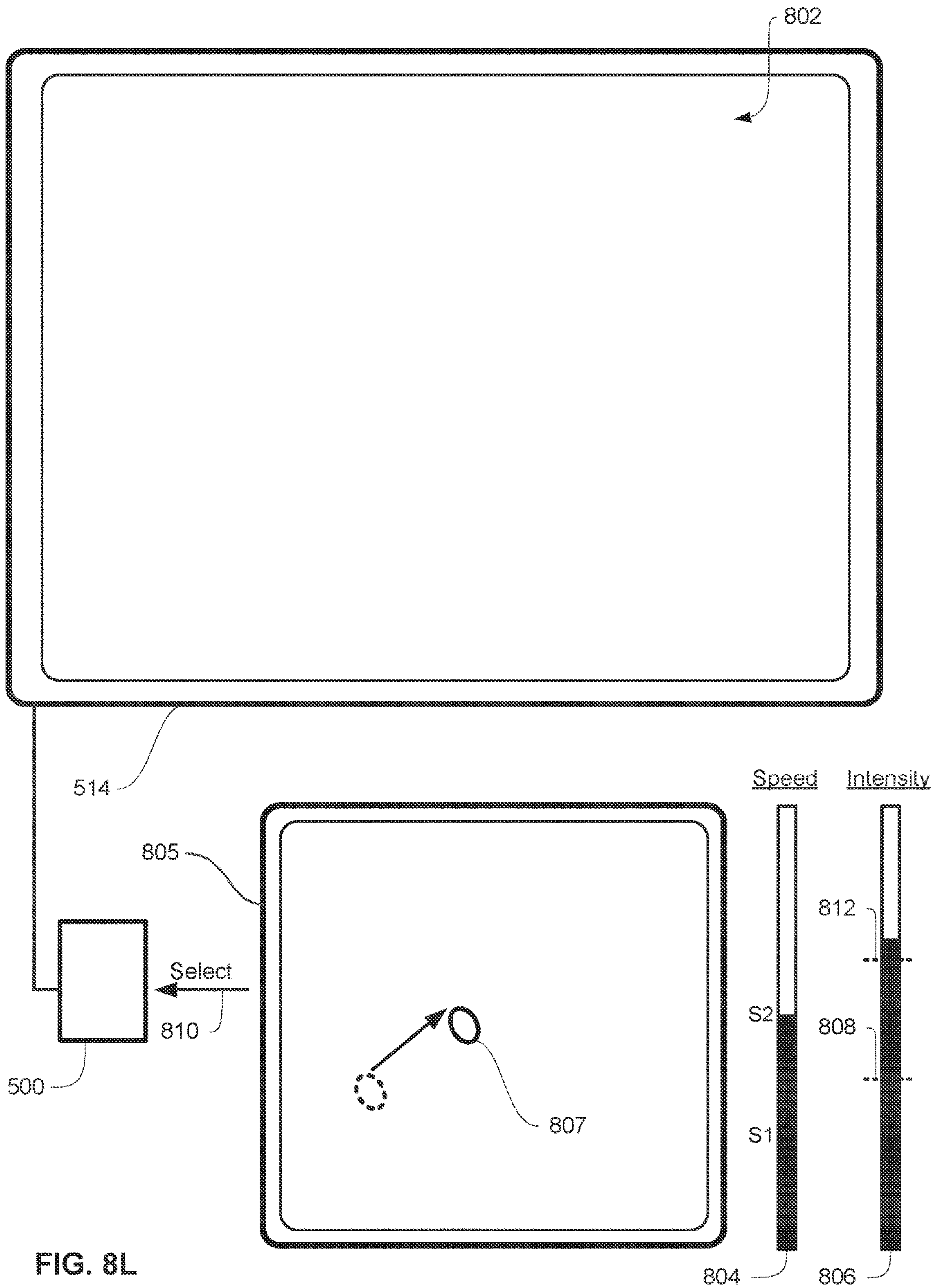
Figure 8M:
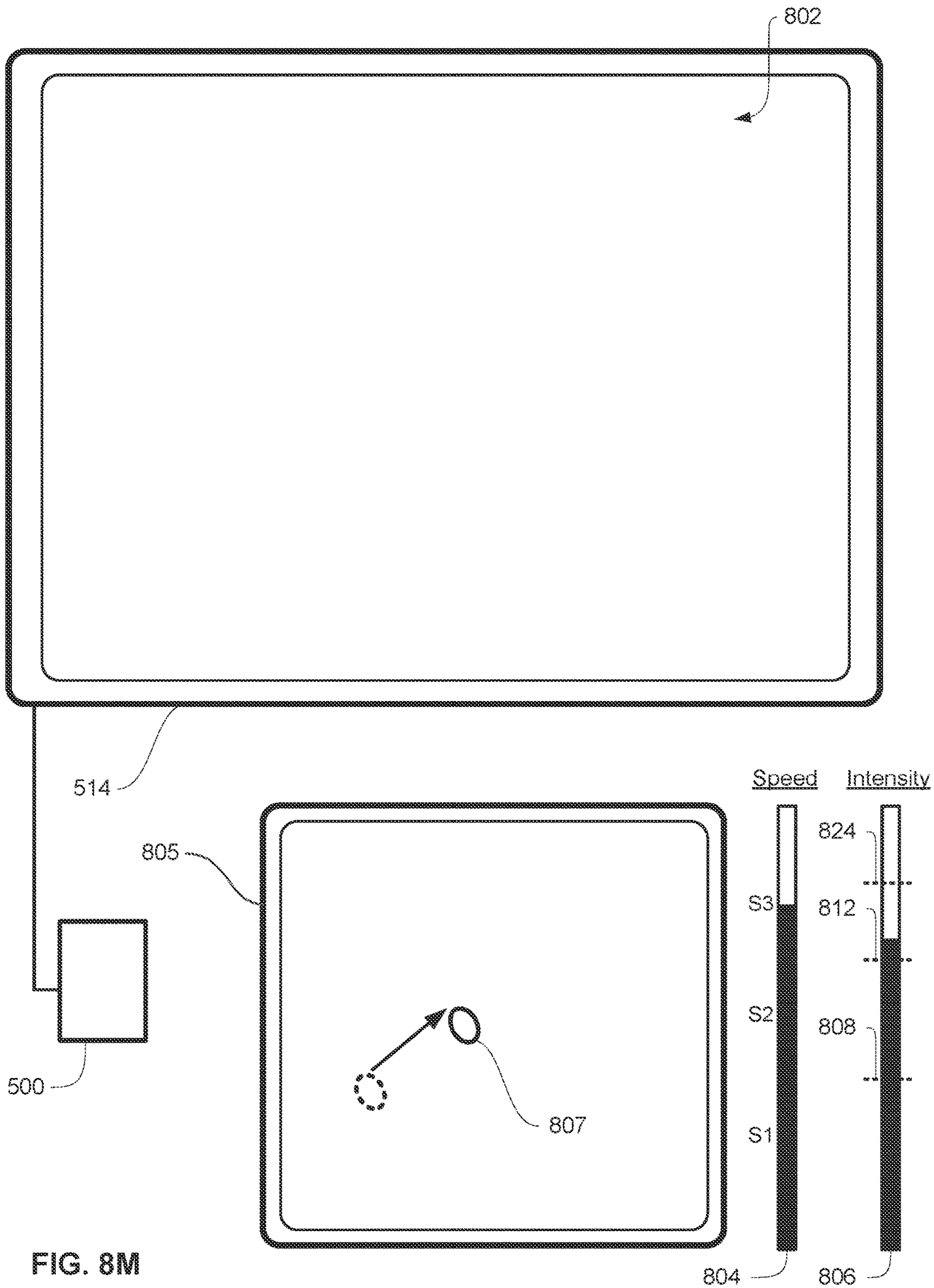
Figure 8N:
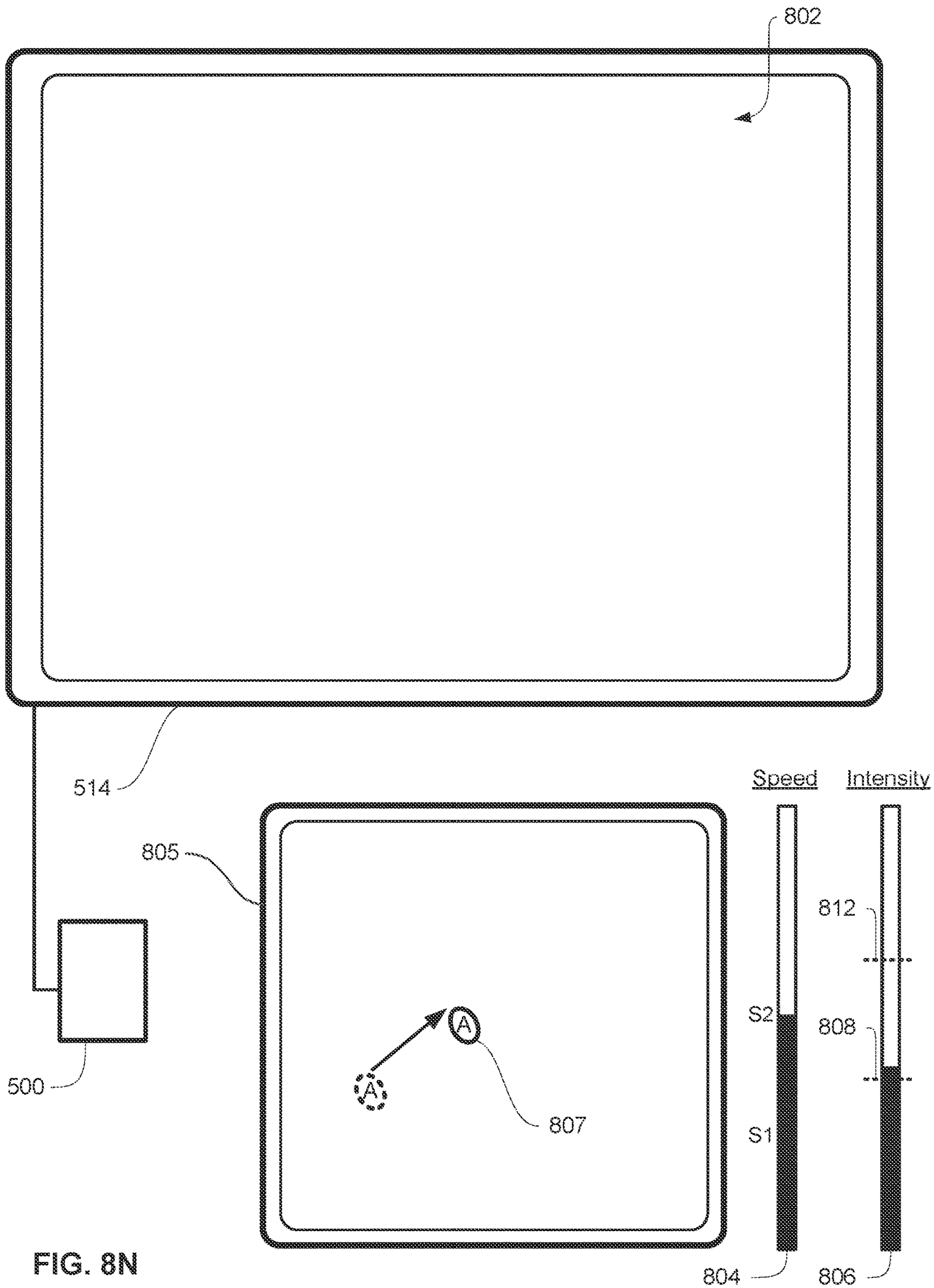
Figure 8O:
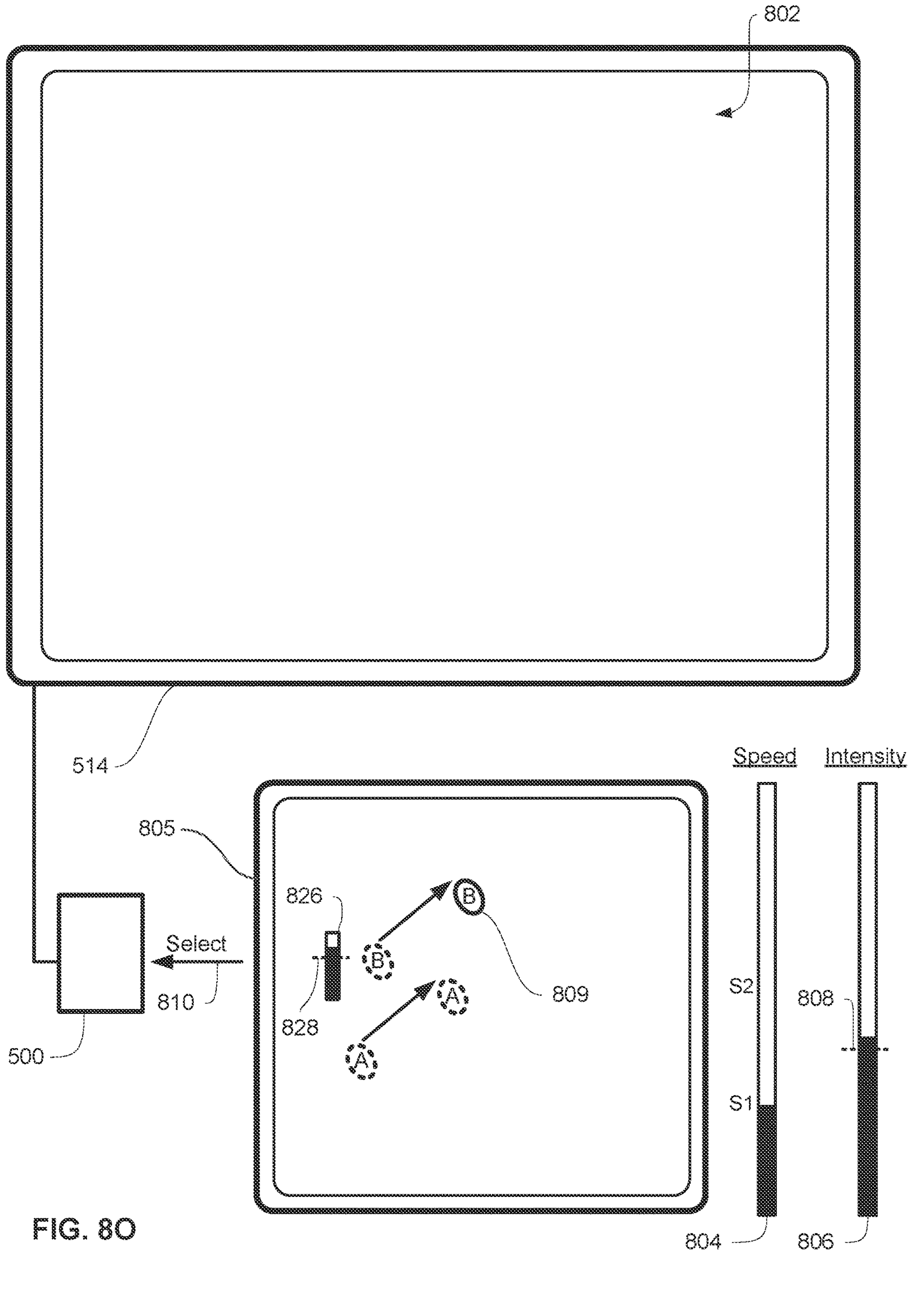
Figure 8P:
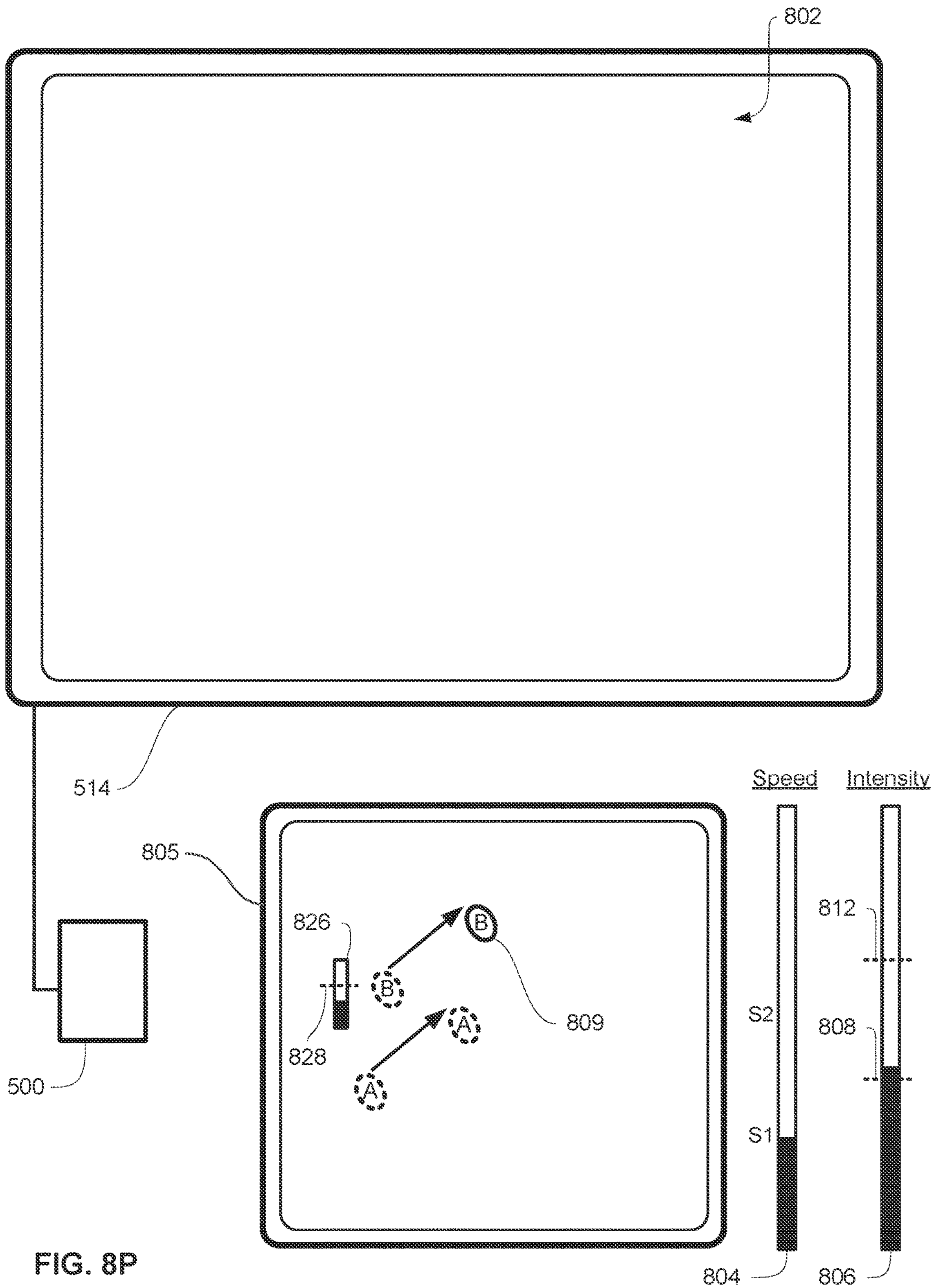
Figure 8Q:
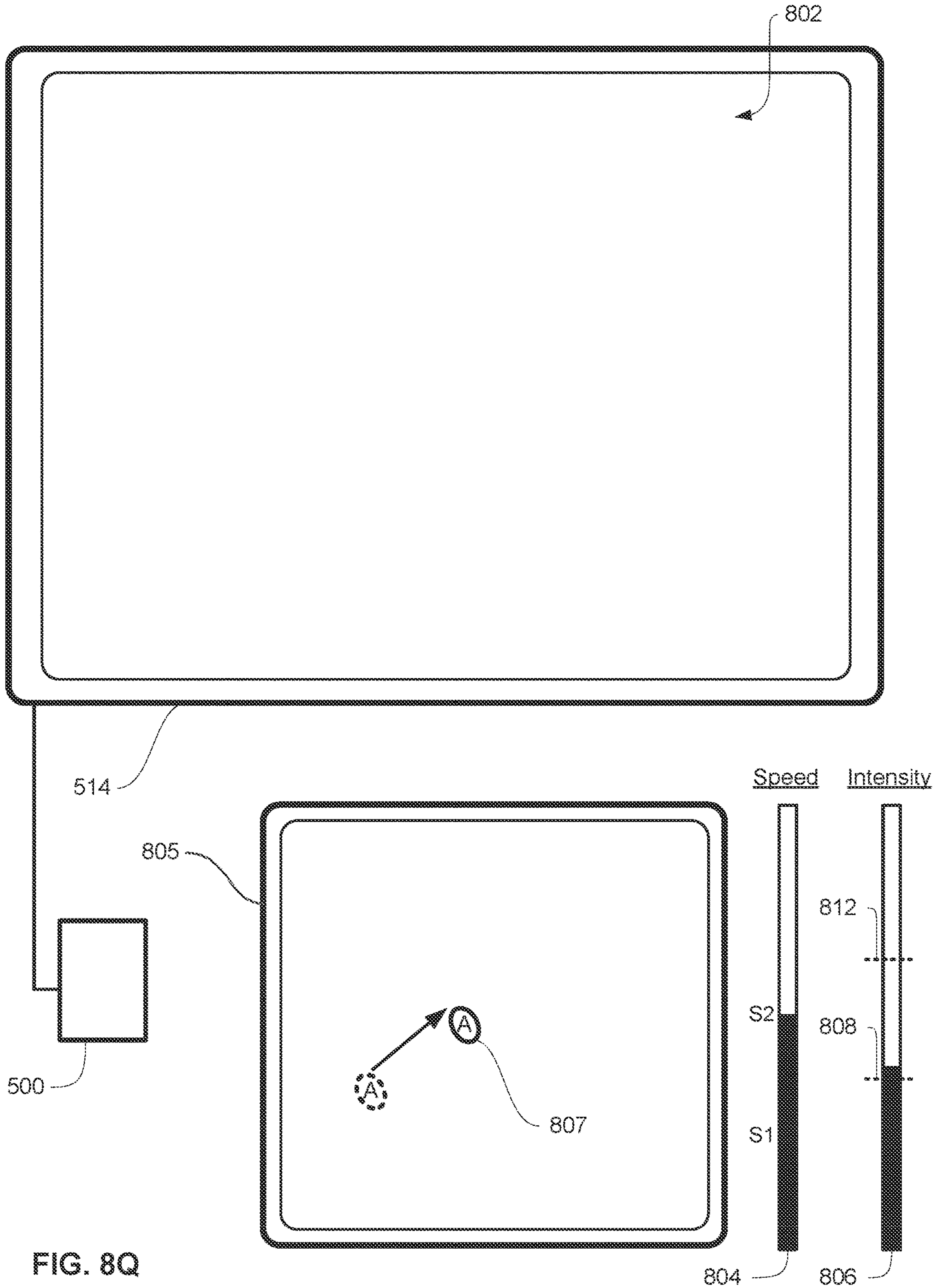
Figure 8R:
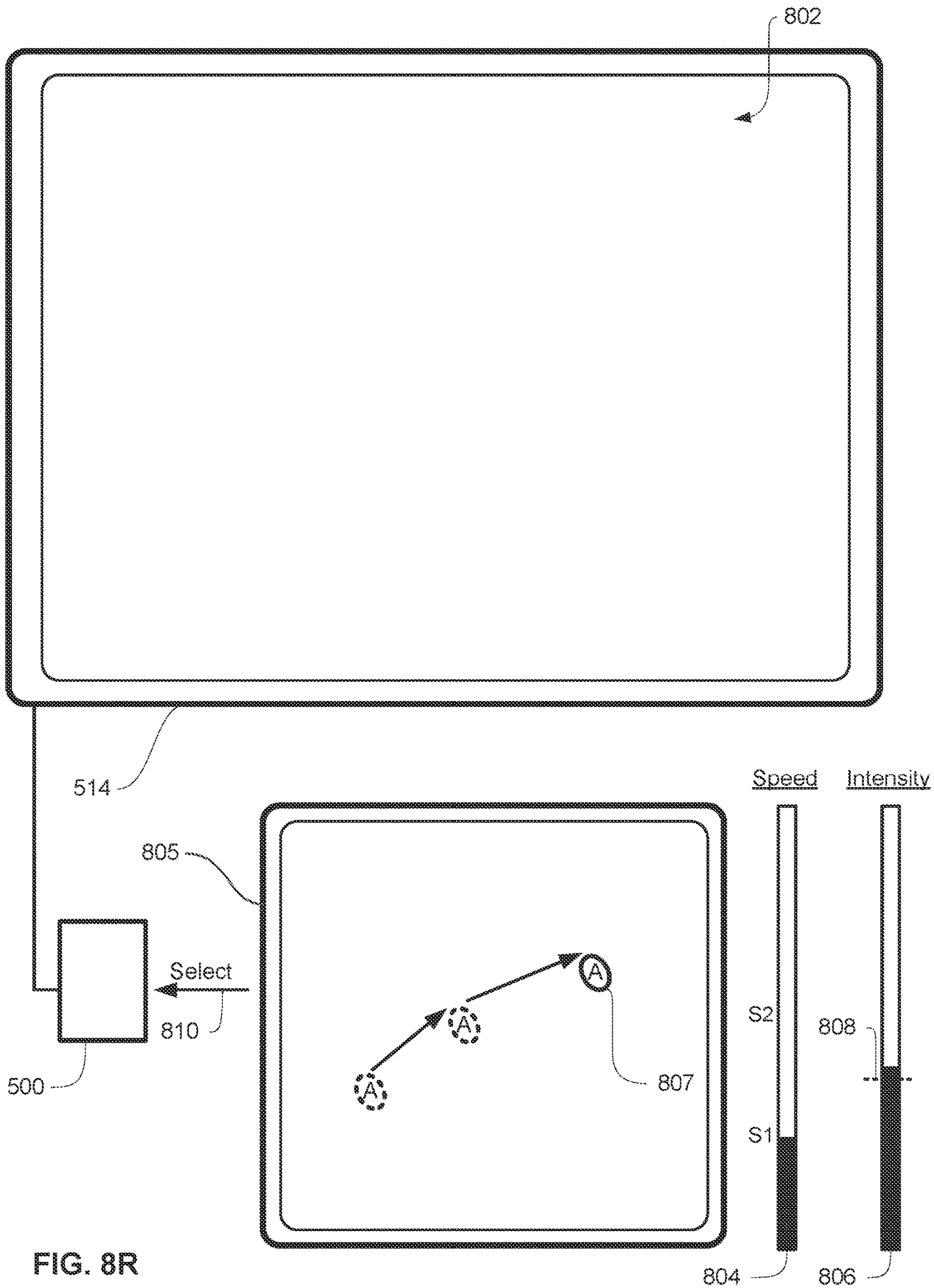
Figure 9A:
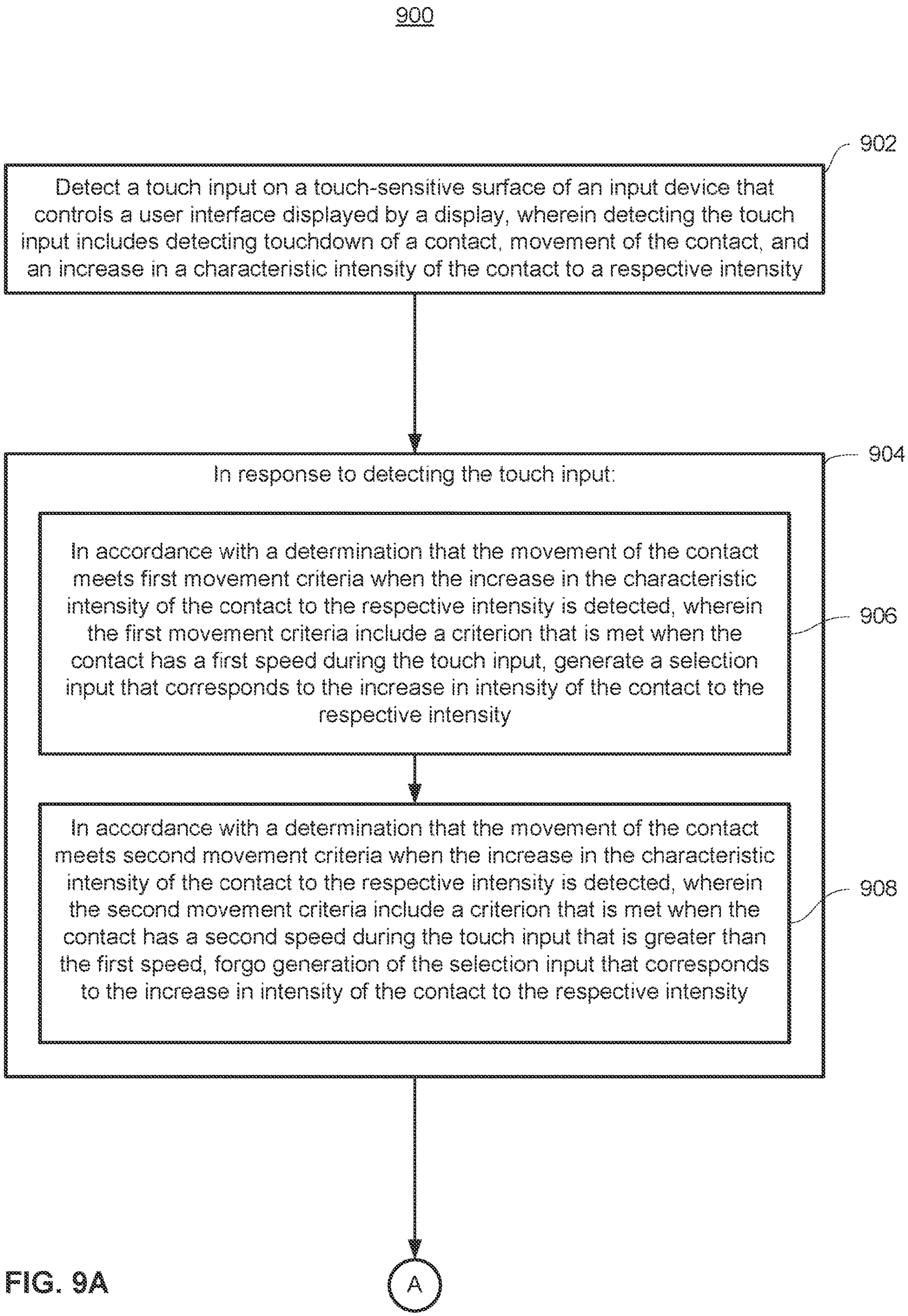
FIGS. 9A-9G are flow diagrams illustrating a method of reducing the unintentional identification of click or selection inputs when a user is providing moving touch inputs on a touch-sensitive surface in accordance with some embodiments of the disclosure.
Figure 9B:
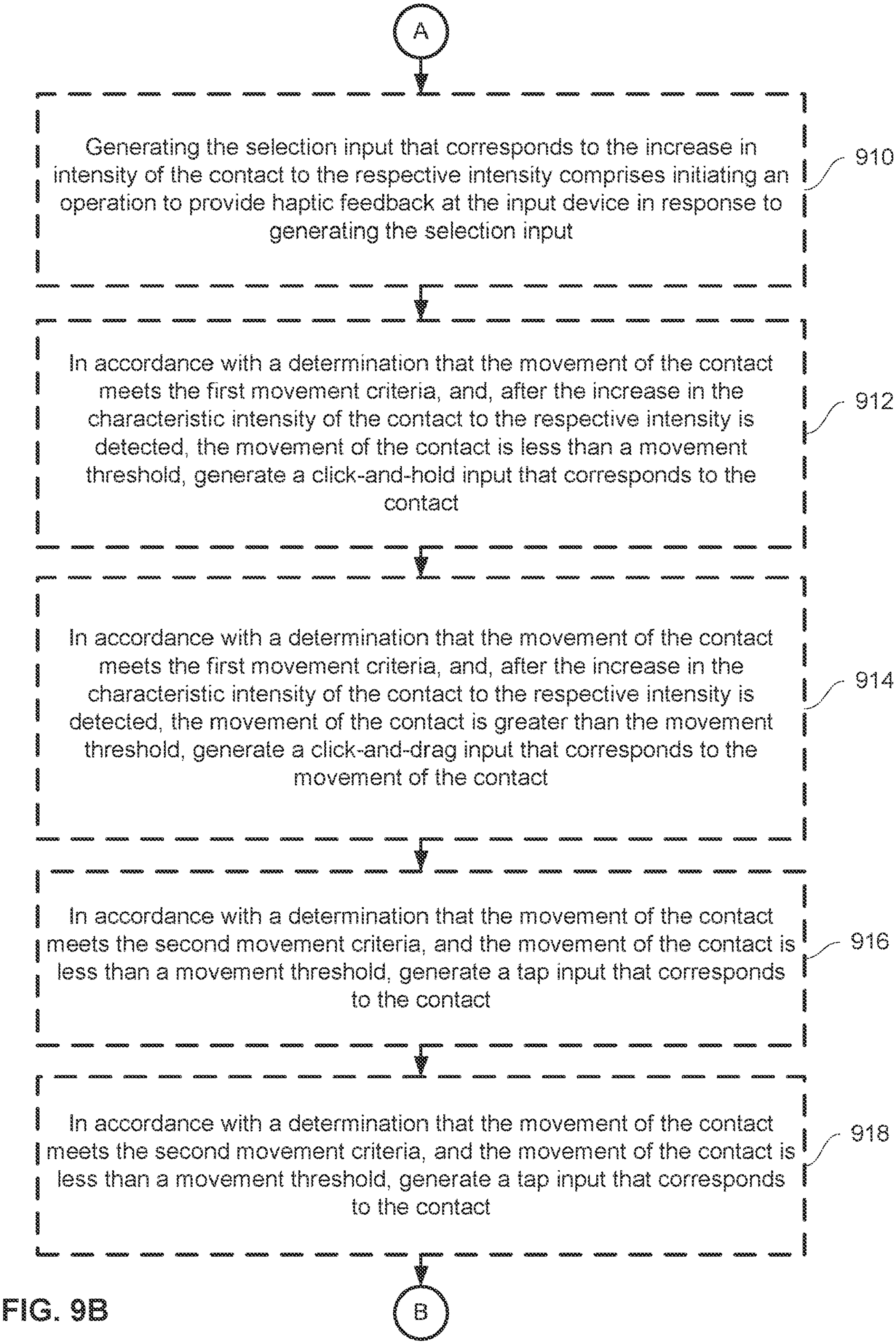
Figure 9C:
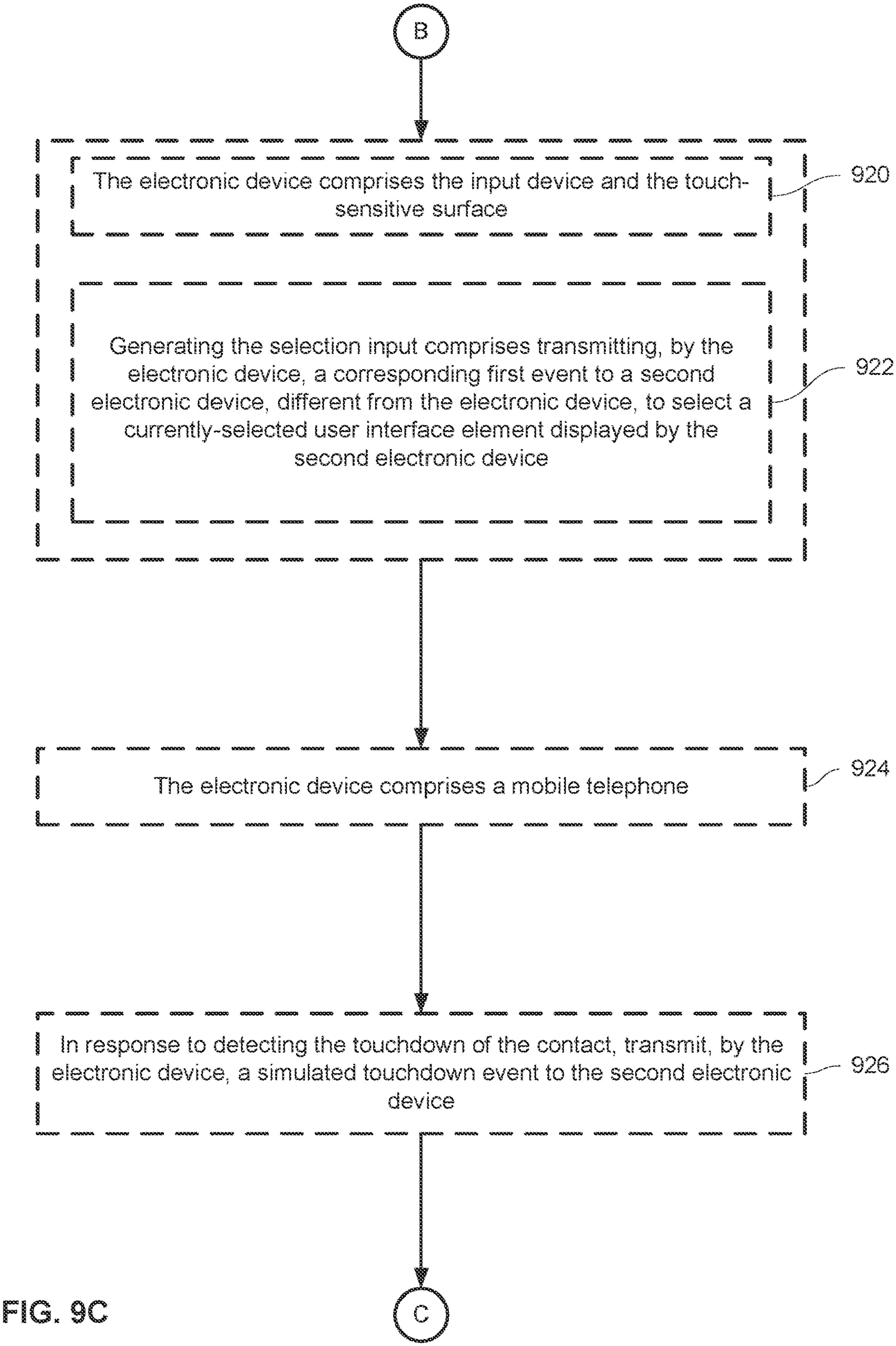
Figure 9D:
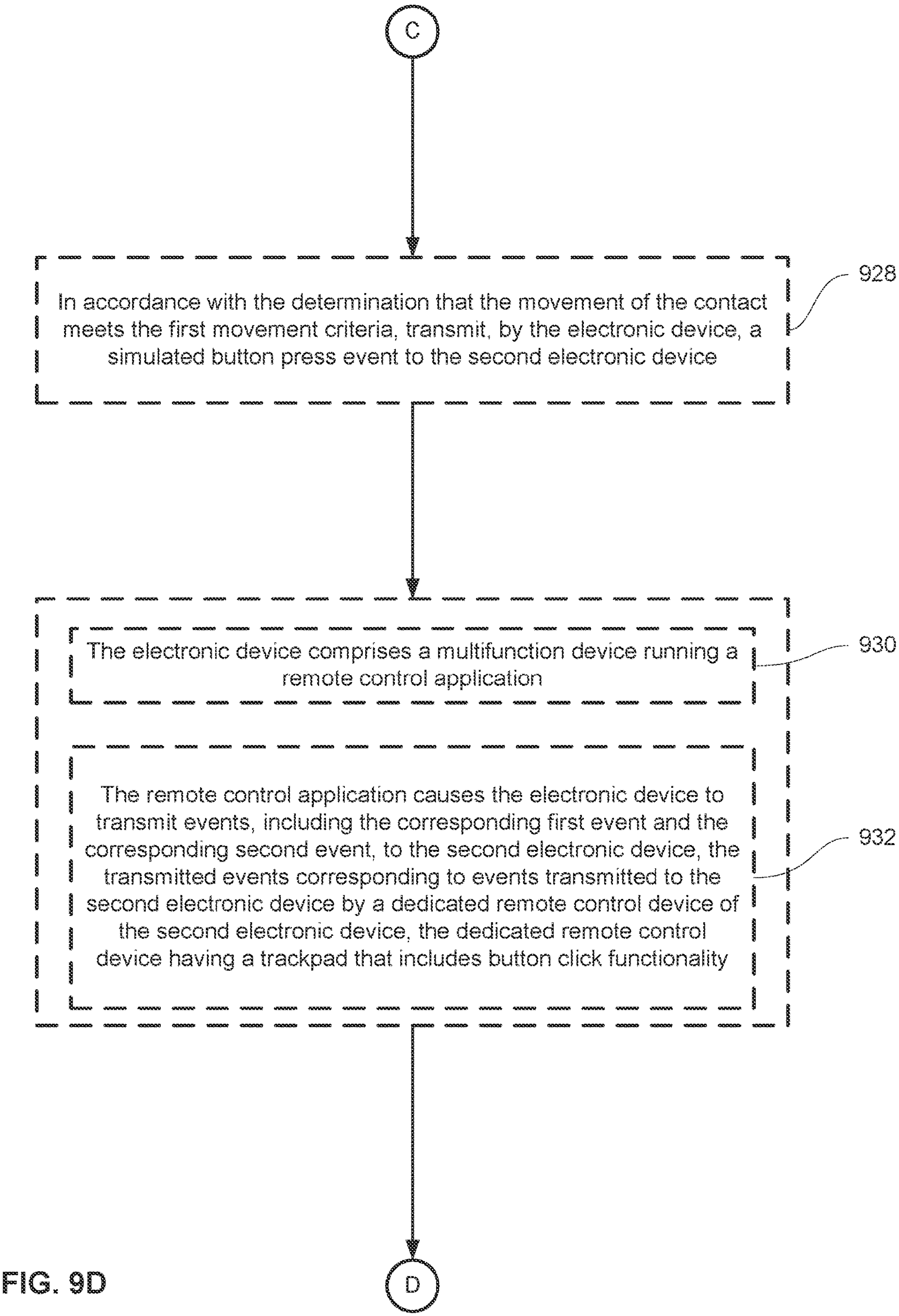
Figure 9E:
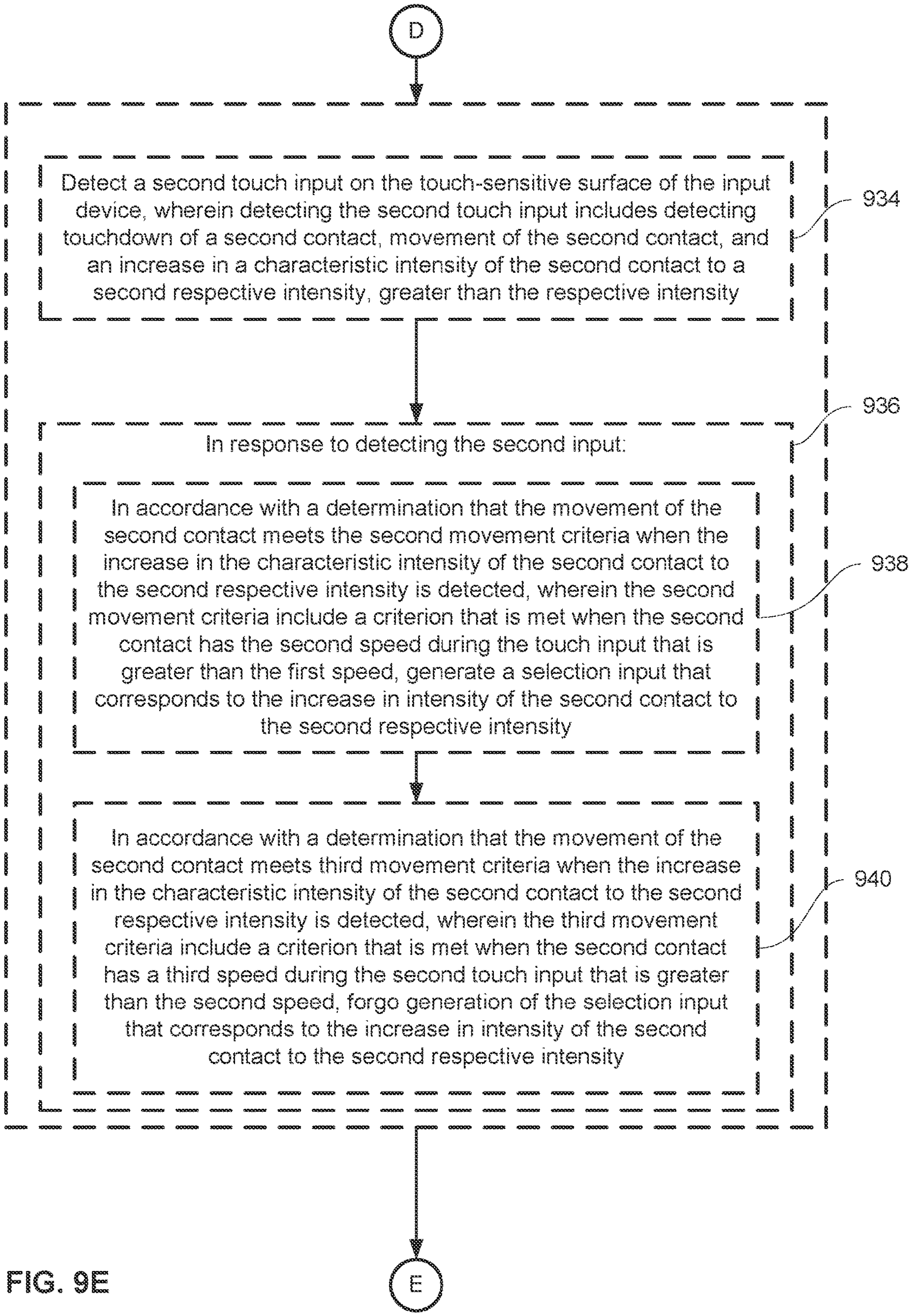
Figure 9F:
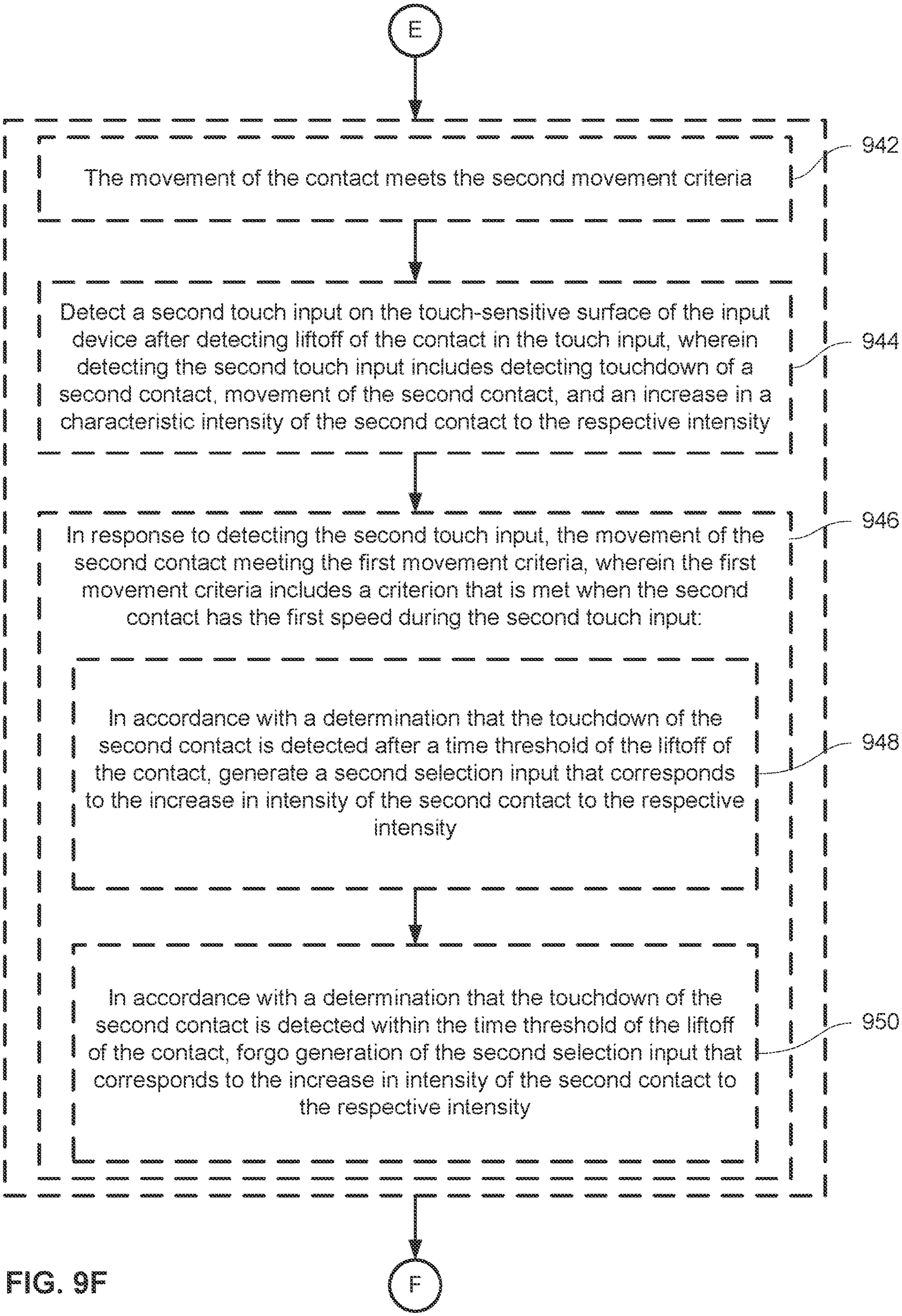
Figure 9G:
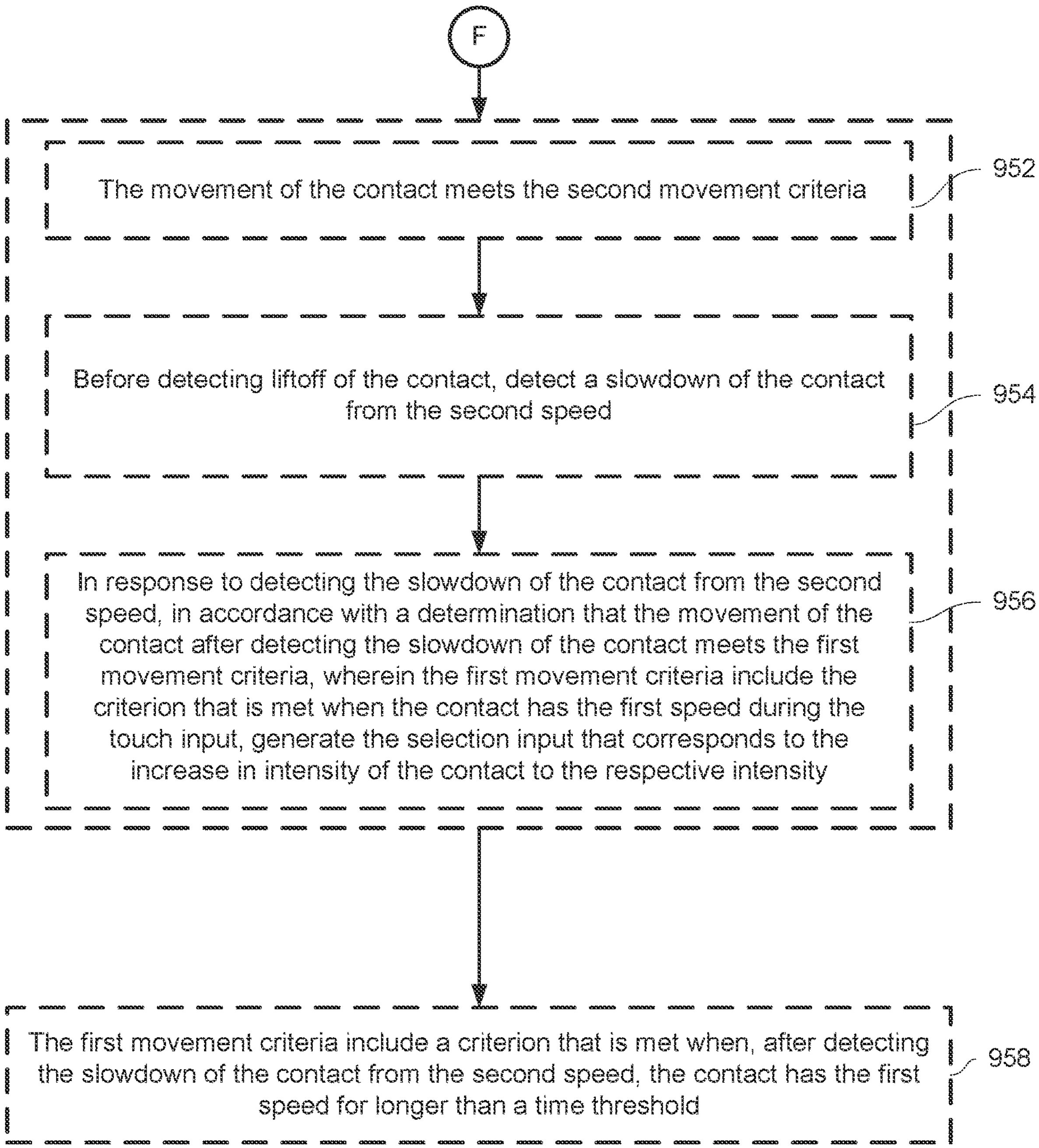

FIGS. 8A-8R illustrate exemplary ways in which electronic devices reduce the unintentional identification of click or selection inputs when a user is providing moving touch inputs on a touch-sensitive surface in accordance with some embodiments of the disclosure. The embodiments in these figures are used to illustrate the processes described below, including the processes described with reference to FIGS. 9A-9G.

FIG. 8A illustrates exemplary display 514. Display 514 optionally displays one or more user interfaces that include various content. In the example of illustrated in FIG. 8A, display 514 displays an application running on an electronic device (e.g., electronic device 500 of FIG. 5A) of which display 514 is a part, or to which display 514 is connected.

The application displays user interface 802. In some embodiments, the application is a content application (e.g., a content playback application) for displaying or playing content (e.g., movies, songs, TV shows, games, a menu for an application, or a menu for navigating to media content, etc.), as described with reference to FIGS. 6A-6Q. Providing a selection input to the application (e.g., to display content on display 514) is optionally accomplished by detecting a selection input on a dedicated remote control (e.g., remote 510 in FIG. 5B), such as a click of a button on the remote control, or a click of a touch-sensitive surface of the remote control. However, in some circumstances, it may be desirable for a user to provide selection and other inputs to electronic device 500 using a device other than a dedicated remote control; for example, a multifunction device (e.g., a mobile telephone, a media playback device, or a wearable device) that is configured to operate in a manner analogous to a dedicated remote control. Such a device optionally includes a touch-sensitive surface with contact intensity detection capabilities. Touch-sensitive surface 805 optionally corresponds to such a device (e.g., touch-sensitive surface 805 is optionally included in a multifunction device that is configured to simulate dedicated remote control functionality in controlling electronic device 500). Using contact intensity to determine click or selection inputs at a touch-sensitive surface, as will be described below, is advantageous compared to the simulated button click embodiments described with reference to FIGS. 6A-6Q, because a click or selection input is optionally triggered as soon as a requisite contact intensity is reached—the device need not delay the click or selection input until a particular time threshold is reached, for example, as described with reference to FIGS. 6A-6Q. The device in which touch-sensitive surface 805 is included optionally corresponds to one or more of device 100 in FIG. 1A, device 100 in FIG. 2, device 300 in FIG. 3 and device 511 in FIG. 5A. For ease of description, actions optionally taken by the device in which touch-sensitive surface 805 is included (e.g., transmission of commands to electronic device 500, processing of touch inputs, identifying of contacts as particular inputs, tracking various characteristics of contacts, etc.) will be described as being taken by touch-sensitive surface 805, though it is understood that in some embodiments, the device, rather than touch-sensitive surface 805, takes these actions.

A click or selection input is optionally detected at touch-sensitive surface 805 when the intensity of a contact, as previously described in this disclosure, is above a predefined intensity threshold. However, as described above, in some circumstances, a user may unintentionally press harder on touch-sensitive surface 805 when providing moving inputs than when providing stationary inputs. Moreover, the user may be unaware that they are pressing harder. Thus, in order to reduce the unintentional identification of click or selection inputs when a user is providing moving touch inputs on touch-sensitive surface 805, the intensity required to trigger such click or selection inputs is optionally adjusted based on the detected movement on touch-sensitive surface 805, as will be described below.

Referring again to FIG. 8A, contact 807 is detected on touch-sensitive surface 805. Upon touchdown of contact 807, touch-sensitive surface 805 optionally detects the speed of contact 807 (shown in speed bar 804) and the intensity of contact 807 (shown in intensity bar 806). In FIG. 8A, contact 807 has an intensity that is less than intensity threshold 808 (e.g., an intensity corresponding to a finger resting on touch-sensitive surface 805). Additionally, in some embodiments, touch-sensitive surface 805 continually transmits information about the position of contact 807 to electronic device 500 while contact 807 is touched down on touch-sensitive surface 805, and transmits touchdown and liftoff events to electronic device when contact 807 touches down and lifts off touch-sensitive surface 805, as described with reference to FIGS. 6A-6Q.

In FIG. 8B, contact 807 is moving at speed S1, and the intensity of contact 807 has increased above intensity threshold 808. As a result, touch-sensitive surface 805 has identified contact 807 as a click or selection input, and has transmitted a selection event 810 to electronic device 500 to allow the electronic device to respond accordingly (e.g., as described with reference to FIGS. 6A-6Q). In some embodiments, selection event 810 corresponds to button press 626 and/or release 628 events described with reference to FIGS. 6A-6Q. Also, in some embodiments, upon identifying contact 807 as being a click or selection input, touch-sensitive surface 805 provides tactile output (e.g., a vibration, represented by the zigzag patterns on touch-sensitive surface 805 in FIG. 8B) to the user to indicate that the user's input was identified as a click or selection input. For ease of description in the remainder of this disclosure, touch-sensitive surface 805 will be described as identifying contact 807 as a particular input (e.g., a click or selection input), rather than identifying "a touch input including contact 807" as the particular input. Further, in some embodiments, inputs are processed and analyzed by electronic device 500 in addition or alternatively to being processed and analyzed by touch-sensitive surface 805.

FIG. 8C illustrates a different scenario in which contact 807, rather than having moved at speed S1 in FIG. 8B, is moving at speed S2, which is greater than speed S1. As a result, the intensity required to generate a click or selection input (illustrated as intensity threshold 812 in FIG. 8C) is greater than the intensity that was required to generate a click or selection input when contact 807 was moving at speed S1 (illustrated as intensity threshold 808 in FIG. 8C). This is so, to reduce unintentional identification of click or selection inputs when movement is detected on touch-sensitive surface 805, as previously described. Contact 807 in FIG. 8C optionally has the same intensity as contact 807 in FIG. 8B. However, because of the increased intensity threshold 812 for generating a click or selection input, contact 807 in FIG. 8C does not generate a click or selection input, and thus touch-sensitive surface 805 does not transmit a selection event to electronic device 500.

FIGS. 8D-8E illustrate identification of a click-and-hold input (e.g., corresponding to a substantially stationary contact 807 that has generated a click or selection input). In FIG. 8D, contact 807 is moving at speed S1, and has an intensity that satisfies intensity threshold 808 (e.g., the intensity threshold corresponding to contact speed S1, as described with reference to FIG. 8B). As a result, touch-sensitive surface 805 has identified contact 807 as a click or selection input, and has transmitted a selection event 810 to electronic device 500 to allow the electronic device to respond accordingly (e.g., as described with reference to FIGS. 6A-6Q).

In some embodiments, after identifying contact 807 as a click or selection input, touch-sensitive surface 805 tracks the movement of contact 807 to determine whether contact 807 moves more than movement threshold 814, as illustrated in FIG. 8E. If contact 807 moves less than movement threshold 814 after being identified as a click or selection input, as illustrated in FIG. 8E, then touch-sensitive surface 805 transmits a click-and-hold event 816, in accordance with the detected characteristics of contact 807, to electronic device 500 to allow the electronic device to respond accordingly (e.g., as described with reference to FIGS. 6A-6Q).

FIGS. 8F-8G illustrate identification of a click-and-drag input (e.g., corresponding to a substantially moving contact 807 that has generated a click or selection input). In FIG. 8F, contact 807 is moving at speed S1, and has an intensity that satisfies intensity threshold 808 (e.g., the intensity threshold corresponding to contact speed S1, as described with reference to FIG. 8B). As a result, touch-sensitive surface 805 has identified contact 807 as a click or selection input, and has transmitted a selection event 810 to electronic device 500 to allow the electronic device to respond accordingly (e.g., as described with reference to FIGS. 6A-6Q).

In FIG. 8G, after contact 807 was identified as a click or selection input, contact 807 has moved more than movement threshold 814. As a result, touch-sensitive surface 805 transmits a click-and-drag event 818, in accordance with the detected characteristics of contact 807, to electronic device 500 to allow the electronic device to respond accordingly (e.g., as described with reference to FIGS. 6A-6Q).

FIGS. 8H-8I illustrate identification of a tap input (e.g., corresponding to a substantially stationary contact 807 without generating a click or selection input). In FIG. 8H, contact 807 is moving at speed S2, thus the intensity required to generate a click or selection input is increased to intensity threshold 812, as described with reference to FIG. 8C. Contact 807 has an intensity that satisfies intensity threshold 808 (e.g., the intensity threshold corresponding to contact speed S1, as described with reference to FIG. 8B) but does not satisfy intensity threshold 812 (e.g., the intensity threshold corresponding to contact speed S2, as described with reference to FIG. 8C). As a result, contact 807 in FIG. 8H does not generate a click or selection input, and thus touch-sensitive surface 805 does not transmit a selection event to electronic device 500.

In some embodiments, after contact 807 moves at speed S2, touch-sensitive surface 805 tracks the movement of contact 807 to determine whether contact 807 moves more than movement threshold 814, as illustrated in FIG. 8I. In FIG. 8I, after moving at speed S2, contact 807 has moved less than movement threshold 814, and thus touch-sensitive surface 805 transmits a tap event 820, in accordance with the detected characteristics of contact 807, to electronic device 500 to allow the electronic device to respond accordingly (e.g., as described with reference to FIGS. 6A-6Q).

FIGS. 8J-8K illustrate identification of a swipe input (e.g., corresponding to a substantially moving contact 807 without generating a click or selection input). In FIG. 8J, contact 807 is moving at speed S2, thus the intensity required to generate a click or selection input is increased to intensity threshold 812, as described with reference to FIG. 8C. Contact 807 has an intensity that satisfies intensity threshold 808 (e.g., the intensity threshold corresponding to contact speed S1, as described with reference to FIG. 8B) but does not satisfy intensity threshold 812 (e.g., the intensity threshold corresponding to contact speed S2, as described with reference to FIG. 8C). As a result, contact 807 in FIG. 8J does not generate a click or selection input, and thus touch-sensitive surface 805 does not transmit a selection event to electronic device 500.

In FIG. 8K, after contact 807 moves at speed S2, contact 807 has moved more than movement threshold 814. As a result, touch-sensitive surface 805 transmits a swipe event 822, in accordance with the detected characteristics of contact 807, to electronic device 500 to allow the electronic device to respond accordingly (e.g., as described with reference to FIGS. 6A-6Q).

FIGS. 8L-8M illustrate a further increased intensity threshold resulting from faster movement of contact 807. In FIG. 8L, contact 807 is moving at speed S2. As a result, the intensity required to generate a click or selection input (illustrated as intensity threshold 812 in FIG. 8L) is greater than the intensity that was required to generate a click or selection input when contact 807 was moving at speed S1 (illustrated as intensity threshold 808 in FIG. 8L). However, in contrast to FIG. 8C, contact 807 in FIG. 8L has an intensity that exceeds intensity threshold 812. As a result, touch-sensitive surface 805 has identified contact 807 as a click or selection input, and has transmitted a selection event 810 to electronic device 500 to allow the electronic device to respond accordingly (e.g., as described with reference to FIGS. 6A-6Q).

FIG. 8M illustrates a different scenario in which contact 807, rather than having moved at speed S2 in FIG. 8L, is moving at speed S3, which is greater than speed S2. As a result, the intensity required to generate a click or selection input (illustrated as intensity threshold 824 in FIG. 8M) is greater than the intensity that was required to generate a click or selection input when contact 807 was moving at speed S2 (illustrated as intensity threshold 812 in FIG. 8M). Contact 807 in FIG. 8M optionally has the same intensity as contact 807 in FIG. 8L. However, because of the increased intensity threshold 824 for generating a click or selection input, contact 807 in FIG. 8M does not generate a click or selection input, and thus touch-sensitive surface 805 does not transmit a selection event to electronic device 500.

FIGS. 8N-8R illustrate scenarios in which increased intensity thresholds for generating click or selection inputs are optionally maintained or decreased over time. In FIGS. 8N-8P, two contacts are detected, one after the other, and whether an increased intensity threshold is maintained depends on how long after detecting liftoff of the first contact is touchdown of the second contact detected. Specifically, in FIG. 8N, contact A 807 is moving at speed S2, thus the intensity required to generate a click or selection input is increased to intensity threshold 812, as described with reference to FIG. 8C. Contact A 807 has an intensity that satisfies intensity threshold 808 (e.g., the intensity threshold corresponding to contact speed S1, as described with reference to FIG. 8B) but does not satisfy intensity threshold 812 (e.g., the intensity threshold corresponding to contact speed S2, as described with reference to FIG. 8C). As a result, contact A 807 in FIG. 8N does not generate a click or selection input, and thus touch-sensitive surface 805 does not transmit a selection event to electronic device 500.

In FIG. 8O, after detecting liftoff of contact A 807, touch-sensitive surface 805 detects touchdown and movement of contact B 809. Contact B 809 is moving at speed S1, and contact B 809 optionally has the same intensity as contact A 807 (e.g., an intensity that satisfies intensity threshold 808 but does not satisfy intensity threshold 812). Additionally, touchdown of contact B 809 was detected after time threshold 828 of liftoff of contact A 807 (as shown in time bar 826). As a result, the intensity required to generate a click or selection input is reduced from intensity threshold 812 in FIG. 8N (corresponding to speed S2) to intensity threshold 808 in FIG. 8O (corresponding to speed S1). As such, touch-sensitive surface 805 has identified contact B 809 as a click or selection input, and has transmitted a selection event 810 to electronic device 500 to allow the electronic device to respond accordingly (e.g., as described with reference to FIGS. 6A-6Q).

FIG. 8P illustrates a different scenario in which contact B 809, rather than having touched down on touch-sensitive surface 805 longer than time threshold 828 after liftoff of contact A 807 in FIG. 8O, touched down within time threshold 828 after liftoff of contact A 807. As a result, the intensity required to generate a click or selection input (illustrated as intensity threshold 812 in FIG. 8P) remains at the increased level established as a result of the speed of contact A 807 in FIG. 8N. Contact B 809 in FIG. 8P optionally has the same intensity and speed as contact B 809 in FIG. 8O. However, because of the maintained increased intensity threshold 812 for generating a click or selection input, contact B 809 in FIG. 8P does not generate a click or selection input, and thus touch-sensitive surface 805 does not transmit a selection event to electronic device 500.

In FIGS. 8Q-8R, a contact is initially moving at speed S2, thus increasing the intensity threshold for generating a click or selection input to intensity threshold 812, and then subsequently slows down to speed S1, thus reducing the intensity threshold to intensity threshold 808. Specifically, in FIG. 8Q, contact A 807 is moving at speed S2, thus the intensity required to generate a click or selection input is increased to intensity threshold 812, as described with reference to FIG. 8C. Contact A 807 has an intensity that satisfies intensity threshold 808 (the intensity threshold corresponding to contact speed S1, as described with reference to FIG. 8B) but does not satisfy intensity threshold 812 (the intensity threshold corresponding to contact speed S2, as described with reference to FIG. 8C). As a result, contact A 807 in FIG. 8Q does not generate a click or selection input, and thus touch-sensitive surface 805 does not transmit a selection event to electronic device 500.

However, if contact A 807, without lifting off touch-sensitive surface 805, slows down (in some embodiments, if it slows down for longer than a threshold amount of time), the intensity required to generate a click or selection input is optionally reduced. In FIG. 8R, contact A 807 has slowed down to speed S1 while maintaining the contact intensity in FIG. 8Q. As a result, the intensity required to generate a click or selection input has decreased to intensity threshold 808 (e.g., the intensity threshold corresponding to contact speed S1, as described with reference to FIG. 8B). Because contact A 807 has an intensity that satisfies intensity threshold 808, touch-sensitive surface 805 has identified contact A 807 as a click or selection input, and has transmitted a selection event 810 to electronic device 500 to allow the electronic device to respond accordingly (e.g., as described with reference to FIGS. 6A-6Q).

FIGS. 9A-9G are flow diagrams illustrating a method 900 of reducing the unintentional identification of click or selection inputs when a user is providing moving touch inputs on a touch-sensitive surface in accordance with some embodiments of the disclosure. The method 900 is optionally performed at an electronic device such as device 100, device 300, device 500 or remote 510 as described above with reference to FIGS. 1A-1B, 2-3 and 5A-5B. Some operations in method 900 are, optionally, combined and/or the order of some operations is, optionally, changed.

As described below, the method 900 provides ways to reduce the unintentional identification of click or selection inputs when a user is providing moving touch inputs on a touch-sensitive surface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a mobile telephone, a remote control, a media playback device, a set-top box connected to a television, such as device 100, device 300, device 500 or remote 510) detects (902) a touch input on a touch-sensitive surface (e.g., a touchpad or a touchscreen capable of detecting an intensity of one or more contacts on the touchpad or touchscreen) of an input device (e.g., a remote control, a mobile telephone, or a media playback device controlling a set-top box) that controls a user interface displayed by a display, such as in FIG. 8A (e.g., a television connected to a set-top box), wherein detecting the touch input includes detecting touchdown of a contact, movement of the contact, and an increase in a characteristic intensity of the contact (e.g., the force with which the contact is touching the touch-sensitive surface of the input device) to a respective intensity, such as in FIGS. 8A-8B. In some embodiments, in response to detecting the touch input (904): in accordance with a determination that the movement of the contact meets first movement criteria when the increase in the characteristic intensity of the contact to the respective intensity is detected, wherein the first movement criteria include a criterion that is met when the contact has a first speed during the touch input, the device generates (906) a selection input that corresponds to the increase in intensity of the contact to the respective intensity, such as in FIG. 8B (e.g., relatively slow contact movement results in a relatively low intensity threshold to trigger a selection or "click" input). In some embodiments, in response to detecting the touch input (904) in accordance with a determination that the movement of the contact meets second movement criteria when the increase in the characteristic intensity of the contact to the respective intensity is detected, wherein the second movement criteria include a criterion that is met when the contact has a second speed during the touch input that is greater than the first speed, the device forgoes generation (908) of the selection input that corresponds to the increase in intensity of the contact to the respective intensity, such as in FIG. 8C (e.g., a relatively fast contact movement results in a relatively high intensity threshold to trigger a selection or "click" input). In some embodiments, the amount of force with which a contact must touch the touch-sensitive surface to trigger a "mechanical click" response increases as the contact moves faster on the touch-sensitive surface. In some embodiments, this is to reduce unintentional "mechanical click" responses when a user is providing moving touch inputs to the touch-sensitive surface, as the user may, sometimes unintentionally, provide more force on the touch-sensitive surface when providing moving inputs than when providing stationary inputs.

In some embodiments, generating the selection input that corresponds to the increase in intensity of the contact to the respective intensity comprises initiating an operation to provide haptic feedback at the input device in response to generating the selection input (910), such as in FIG. 8B. For example, causing the input device and/or the touch-sensitive surface of the input device to deflect or vibrate, to generate a tactile output that provides the user with a sensation of "clicking" the touch-sensitive surface.

In some embodiments, in accordance with a determination that the movement of the contact meets the first movement criteria (e.g., the speed of the contact is low enough such that the pressure of the contact is sufficient to trigger a "click" because the required pressure to trigger a "click" is relatively low), and, after the increase in the characteristic intensity of the contact to the respective intensity is detected, the movement of the contact is less than a movement threshold (e.g., 0.5 mm, 1 mm, 2 mm), the electronic device generates (912) a click-and-hold input that corresponds to the contact, such as in FIGS. 8D-8E (e.g., a relatively stationary contact with sufficient pressure to trigger a "click" is optionally identified as a click-and-hold input).

In some embodiments, in accordance with a determination that the movement of the contact meets the first movement criteria (e.g., the speed of the contact is low enough such that the pressure of the contact is sufficient to trigger a "click" because the required pressure to trigger a "click" is relatively low), and, after the increase in the characteristic intensity of the contact to the respective intensity is detected, the movement of the contact is greater than the movement threshold (e.g., 0.5 mm, 1 mm, 2 mm), the electronic device generates (914) a click-and-drag input that corresponds to the movement of the contact, such as in FIGS. 8F-8G (e.g., a relatively mobile contact with sufficient pressure to trigger a "click" is optionally identified as a click-and-drag input).

In some embodiments, in accordance with a determination that the movement of the contact meets the second movement criteria (e.g., the speed of the contact is high enough such that the pressure of the contact is not sufficient to trigger a "click" because the required pressure to trigger a "click" is relatively high), and the movement of the contact is less than a movement threshold (e.g., 0.5 mm, 1 mm, 2 mm), the electronic device generates (916) a tap input that corresponds to the contact, such as in FIGS. 8H-8I (e.g., a relatively stationary contact with insufficient pressure to trigger a "click" is optionally identified as a tap input).

In some embodiments, in accordance with a determination that the movement of the contact meets the second movement criteria (e.g., the speed of the contact is high enough such that the pressure of the contact is not sufficient to trigger a "click" because the required pressure to trigger a "click" is relatively high), and the movement of the contact is greater than the movement threshold (e.g., 0.5 mm, 1 mm, 2 mm), the electronic device generates (918) a swipe input that corresponds to the movement of the contact, such as in FIGS. 8J-8K (e.g., a relatively mobile contact with insufficient pressure to trigger a "click" is optionally identified as a swipe input).

In some embodiments, the electronic device comprises the input device and the touch-sensitive surface (920) (e.g., the electronic device is a mobile phone with a touch screen, which is configured as an input device (e.g., a remote control) to a second electronic device, such as a set-top box connected to a television), and generating the selection input (922) comprises transmitting, by the electronic device, a corresponding first event (e.g., a remote control command, such as a button press event, a button release event) to a second electronic device (e.g., a set-top box connected to a television), different from the electronic device, to select a currently-selected user interface element displayed by the second electronic device, such as in FIG. 8B (e.g., the electronic device processes the touch input and identifies it as a selection input, and after processing the touch input, transmits a command corresponding to a selection input (e.g., button press and button release events) to the second electronic device). In some embodiments, the electronic device comprises a mobile telephone (924).

In some embodiments, in response to detecting the touchdown of the contact, the electronic device transmits (926) a simulated touchdown event to the second electronic device, such as in FIG. 6A (e.g., the electronic device optionally sends information to the second electronic device indicating that a contact has been detected on the touch-sensitive surface in response to detecting the contact).

In some embodiments, in accordance with the determination that the movement of the contact meets the first movement criteria (e.g., the speed of the contact is low enough such that the pressure of the contact is sufficient to trigger a "click" because the required pressure to trigger a "click" is relatively low), the electronic device transmits (928), a simulated button press event to the second electronic device, such as in FIG. 8B (e.g., a contact with sufficient pressure to trigger a "click" is optionally identified as an input including a "click", the corresponding simulated button press event for which is optionally transmitted to the second electronic device). In some embodiments, the simulated button press event is the same as a button press event that is sent to the second electronic device when a physical button of a dedicated remote control device is pressed.

In some embodiments, the electronic device comprises a multifunction device. In some embodiments, the multifunction device is a mobile telephone configured to perform multiple functions, such as telephone functions, messaging functions, etc. that are independent of the controlling content displayed on the display (e.g., the electronic device is configured to run applications that are unrelated to controlling functions of a set top box) running (930) a remote control application, such as in FIGS. 10A-10N (e.g., software on the multifunction device for configuring the multifunction device to operate as a remote control for a second electronic device, such as a set-top box), and the remote control application causes the electronic device to transmit events (932), including the corresponding first event, to the second electronic device, the transmitted events corresponding to events transmitted to the second electronic device by a dedicated remote control device of the second electronic device, the dedicated remote control device having a trackpad that includes button click functionality. For example, the application optionally configures the multifunction device to operate in a manner analogous to a dedicated remote control device, and thus transmit remote control events to the second electronic device that correspond to remote control events that the dedicated remote control device would transmit to the second electronic device. The dedicated remote control device is optionally a remote control device with a physical actuator for allowing physical clicking of a button or surface of the remote control, or a remote control device with a haptic actuator and pressure detectors coupled to a surface (e.g., touch-sensitive surface, touch screen, etc.) of the remote control device, the pressure detectors for triggering the haptic actuator when contacts are detected at one or more predefined pressures on the surface of the remote control device.

In some embodiments, the electronic device detects (934) a second touch input on the touch-sensitive surface (e.g., a touchpad or a touchscreen capable of detecting an intensity of one or more contacts on the touchpad or touchscreen) of the input device (e.g., a remote control, a mobile telephone, or a media playback device controlling a set-top box), wherein detecting the second touch input includes detecting touchdown of a second contact, movement of the second contact, and an increase in a characteristic intensity of the second contact (e.g., the force with which the second contact is touching the touch-sensitive surface of the input device) to a second respective intensity, greater than the respective intensity, such as in FIG. 8L. In some embodiments, in response to detecting the second touch input (936): in accordance with a determination that the movement of the second contact meets the second movement criteria when the increase in the characteristic intensity of the second contact to the second respective intensity is detected, wherein the second movement criteria include a criterion that is met when the second contact has the second speed during the touch input that is greater than the first speed, the electronic device generates (938) a selection input that corresponds to the increase in intensity of the second contact to the second respective intensity, such as in FIG. 8L (e.g., a relatively fast contact movement results in a relatively high intensity threshold to trigger a selection or "click" input. However, the pressure of the second contact is optionally high enough to trigger a "click" on the touch-sensitive surface despite the higher required pressure for doing so, as compared to the pressure of the first contact, which was optionally insufficient to trigger a "click" when the second movement criteria were met). In some embodiments, in response to detecting the second touch input (936), in accordance with a determination that the movement of the second contact meets third movement criteria when the increase in the characteristic intensity of the second contact to the second respective intensity is detected, wherein the third movement criteria include a criterion that is met when the second contact has a third speed during the second touch input that is greater than the second speed, the electronic device forgoes generation (940) of the selection input that corresponds to the increase in intensity of the second contact to the second respective intensity, such as in FIG. 8M (e.g., faster movement of the second contact optionally results in an even higher contact intensity threshold, and the pressure of the second contact is optionally insufficient to trigger a "click" on the touch-sensitive surface when the third movement criteria are met).

In some embodiments, the movement of the contact meets the second movement criteria (942) (e.g., the first contact had relatively high speed, thus increasing the intensity required to trigger a "click" on the touch-sensitive surface, and the first contact did not trigger a "click"), and the electronic device detects (944) a second touch input on the touch-sensitive surface (e.g., a touchpad or a touch-screen capable of detecting an intensity of one or more contacts on the touchpad or touchscreen) of the input device (e.g., a remote control, a mobile telephone, or a media playback device controlling a set-top box) after detecting liftoff of the contact in the touch input, such as in FIGS. 8N-8P (e.g., detecting a second contact after liftoff of the first contact), wherein detecting the second touch input includes detecting touchdown of a second contact, movement of the second contact, and an increase in a characteristic intensity of the second contact (e.g., the force with which the contact is touching the touch-sensitive surface of the input device) to the respective intensity (e.g., the second contact has substantially the same intensity as the first contact). In some embodiments, in response to detecting the second touch input (946), the movement of the second contact meeting the first movement criteria, wherein the first movement criteria includes a criterion that is met when the second contact has the first speed during the second touch input (e.g., the second contact has a speed that is slower than the first contact—had the first contact had the first speed rather than the faster second speed, the first contact would have triggered generation of the selection input): in accordance with a determination that the touchdown of the second contact is detected after a time threshold (e.g., 0.2 seconds, 0.5 seconds, 1 second) of the liftoff of the contact, the electronic device generates (948) a second selection input that corresponds to the increase in intensity of the second contact to the respective intensity, such as in FIG. 8O (e.g., if the second contact is detected after a sufficiently long period of time after the liftoff of the first contact, the intensity required to trigger a "click" on the touch-sensitive surface is optionally reduced, and the second contact triggers the "click"). In some embodiments, when the required intensity is reduced, it is reduced all the way back down to a base intensity threshold. In some embodiments, when the required intensity is reduced, it is reduced gradually back down to a base intensity threshold (e.g., reduced in a step-wise manner over time as long as no contacts are detected during that time that cause the intensity threshold to increase). In some embodiments, in accordance with a determination that the touchdown of the second contact is detected within the time threshold (e.g., 0.2 seconds, 0.5 seconds, 1 second) of the liftoff of the contact, the electronic device forgoes generation (950) of the second selection input that corresponds to the increase in intensity of the second contact to the respective intensity, such as in FIG. 8P (e.g., if the second contact is detected within a relatively short period of time after the liftoff of the first contact, the increased intensity required to trigger a "click" on the touch-sensitive surface caused by the first contact is optionally maintained, and the second contact does not trigger the "click").

In some embodiments, the movement of the contact meets the second movement criteria (952) (e.g., the first contact had relatively high speed, thus increasing the intensity required to trigger a "click" on the touch-sensitive surface), and before detecting liftoff of the contact, the electronic device detects (954) a slowdown of the contact from the second speed, such as in FIGS. 8Q-8R. In some embodiments, in response to detecting the slowdown of the contact from the second speed, in accordance with a determination that the movement of the contact after detecting the slowdown of the contact meets the first movement criteria, wherein the first movement criteria include the criterion that is met when the contact has the first speed during the touch input, the electronic device generates (956) the selection input that corresponds to the increase in intensity of the contact to the respective intensity, such as in FIG. 8R. For example, initially, the contact optionally had sufficiently high speed to increase the required intensity to trigger a "click" on the touch-sensitive surface, and would not have triggered a "click" on the touch-sensitive surface, as a result. However, the contact optionally slowed down sufficiently to reduce the required intensity to trigger a "click," and thus triggered the "click." In some embodiments, when the required intensity is reduced, it is reduced all the way back down to a base intensity threshold. In some embodiments, when the required intensity is reduced, it is reduced gradually back down to a base intensity threshold (e.g., reduced in a step-wise manner over time as long as no contacts are detected during that time that cause the intensity threshold to increase).

In some embodiments, the first movement criteria include a criterion that is met when, after detecting the slowdown of the contact from the second speed, the contact has the first speed for longer than a time threshold (e.g., 0.2 seconds, 0.5 seconds, 1 second. In some embodiments, the contact must slow down for a sufficiently long period of time before the increased intensity threshold is reduced).

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500, 1700 and 1900) are also applicable in an analogous manner to method 900 described above with respect to FIGS. 9A-9G. For example, the touch-sensitive surface, user interface objects, tactile outputs, software remote control applications, simulated buttons, simulated remote trackpads and/or touch inputs described above with reference to method 900 optionally have one or more of the characteristics of the touch-sensitive surface, user interface objects, tactile outputs, software remote control applications, simulated buttons, simulated remote trackpads and/or touch inputs described herein with reference to other methods described herein (e.g., methods 700, 1100, 1300, 1500, 1700 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 21) or application specific chips. Further, the operations described above with reference to FIGS. 9A-9G are, optionally, implemented by components depicted in FIGS. 1A-1B. For example, detecting operation 902, and generating operation 906 are, optionally, implemented by event sorter 170, event recognizer 180, and event handler 190. Event monitor 171 in event sorter 170 detects a contact on touch-sensitive surface 805, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Remote Application User Interface

Users interact with electronic devices in many different manners, including interacting with content (e.g., music, movies, etc.) that may be available (e.g., stored or otherwise accessible) on the electronic devices. In some circumstances, the users desire to navigate content and/or user interfaces available on the electronic devices. The embodiments described below provide ways in which a user may interact with an electronic device using a multifunction device, such as device 511 in FIG. 5A, that displays various user interfaces for controlling and interacting with the electronic device, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
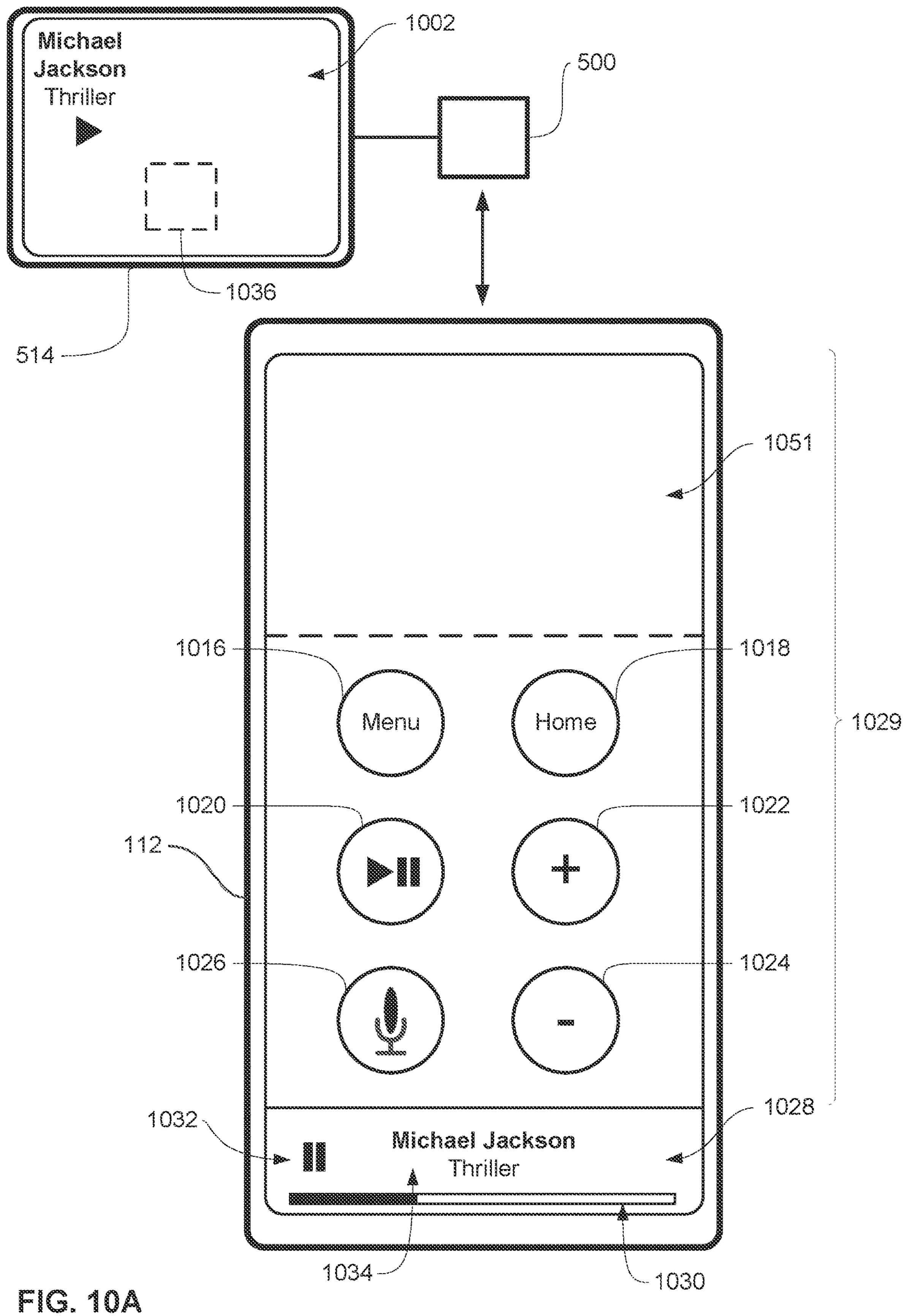
FIGS. 10A-10N illustrate exemplary ways in which a user may interact with an electronic device using a multifunction device that displays various user interfaces for controlling and interacting with the electronic device in accordance with some embodiments of the disclosure.
Figure 10B:
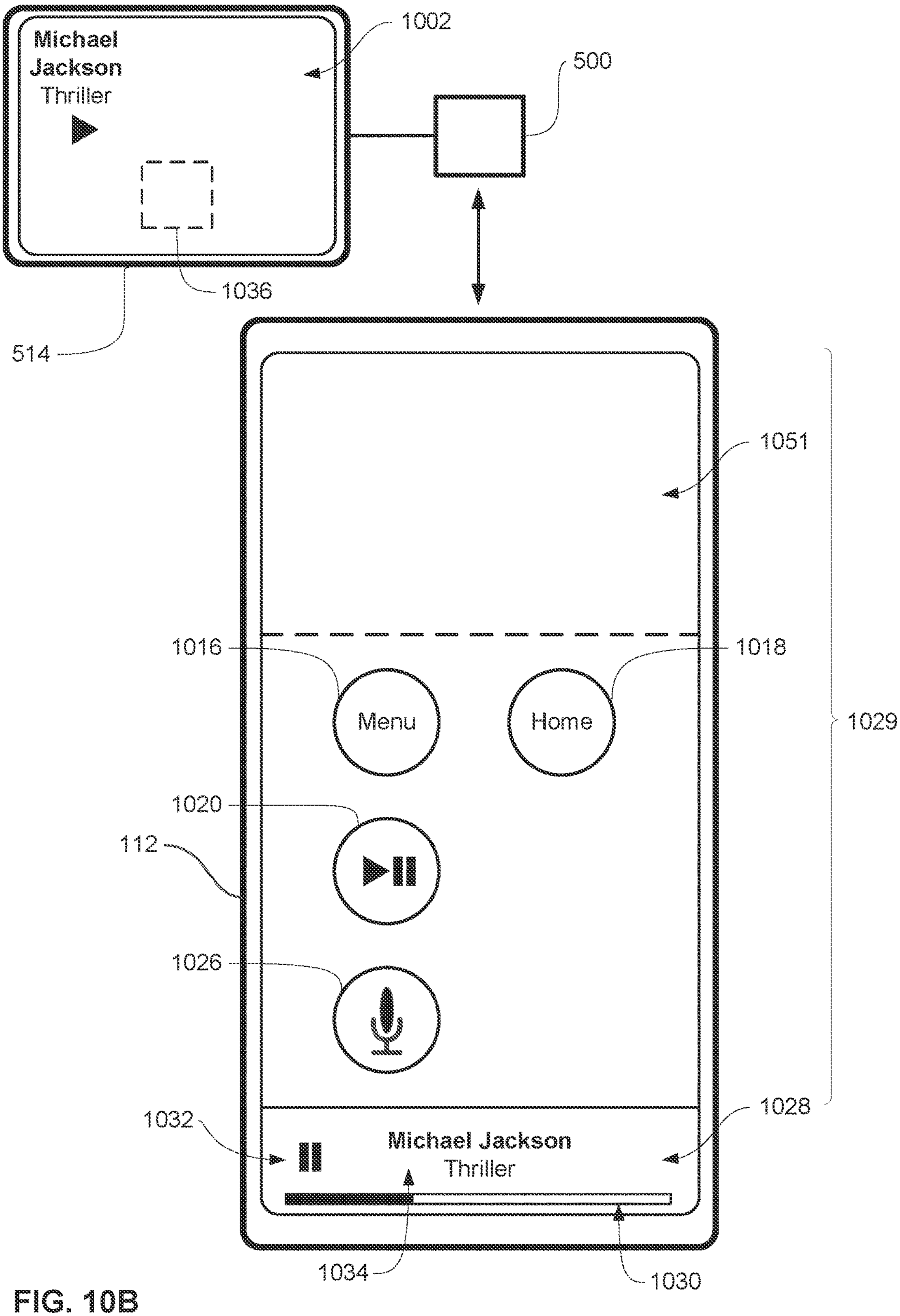
Figure 10C:
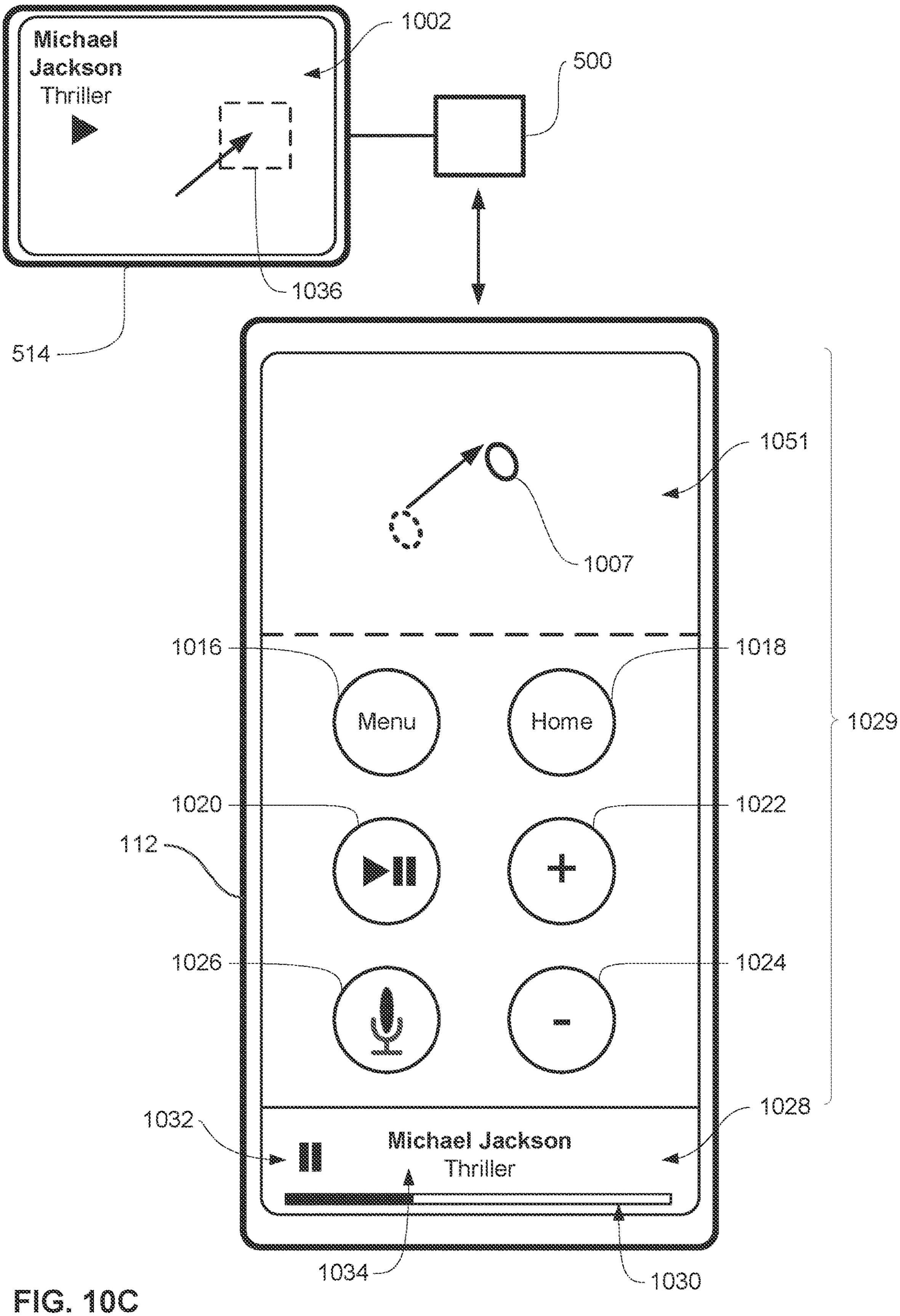
Figure 10D:
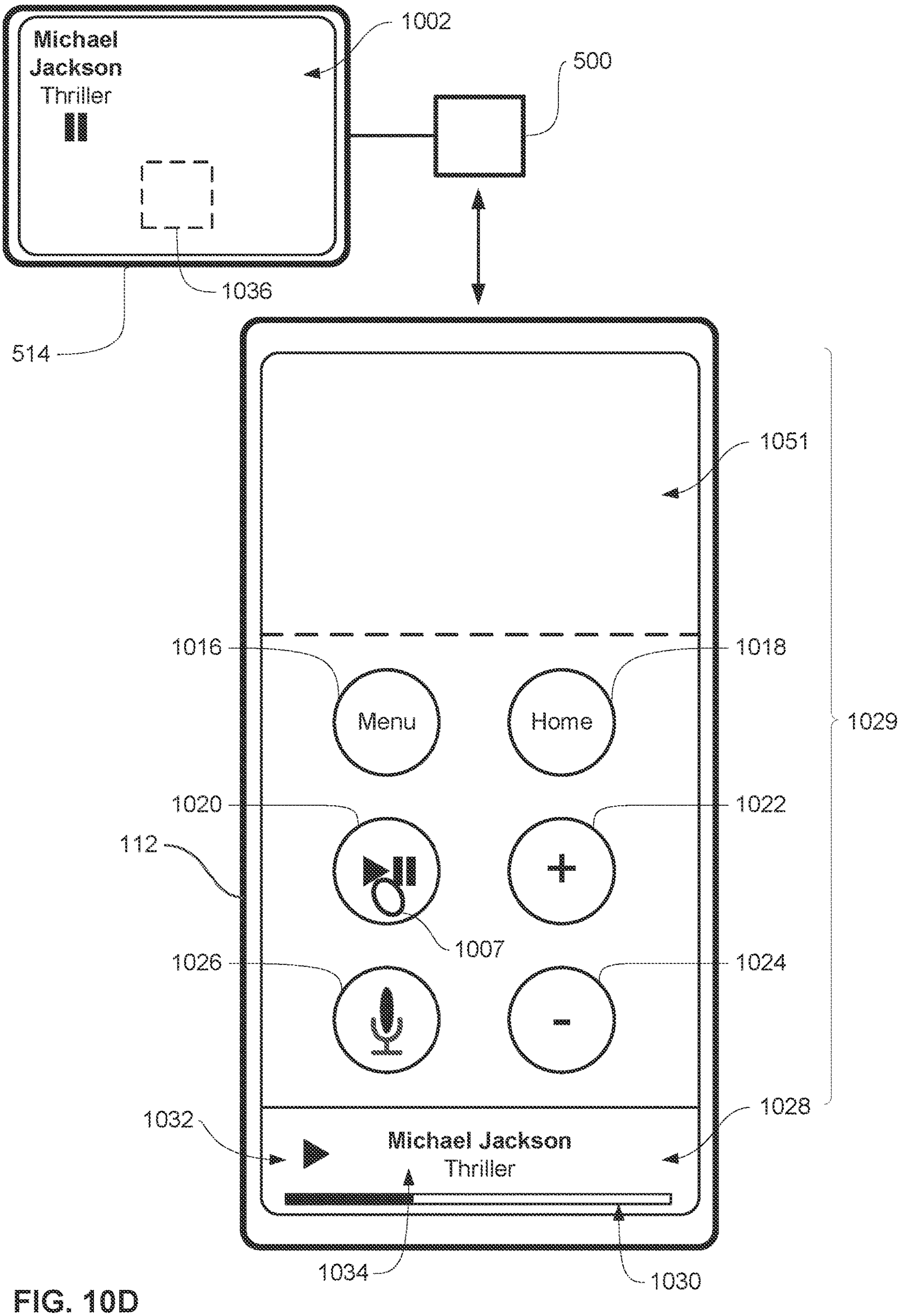
Figure 10E:
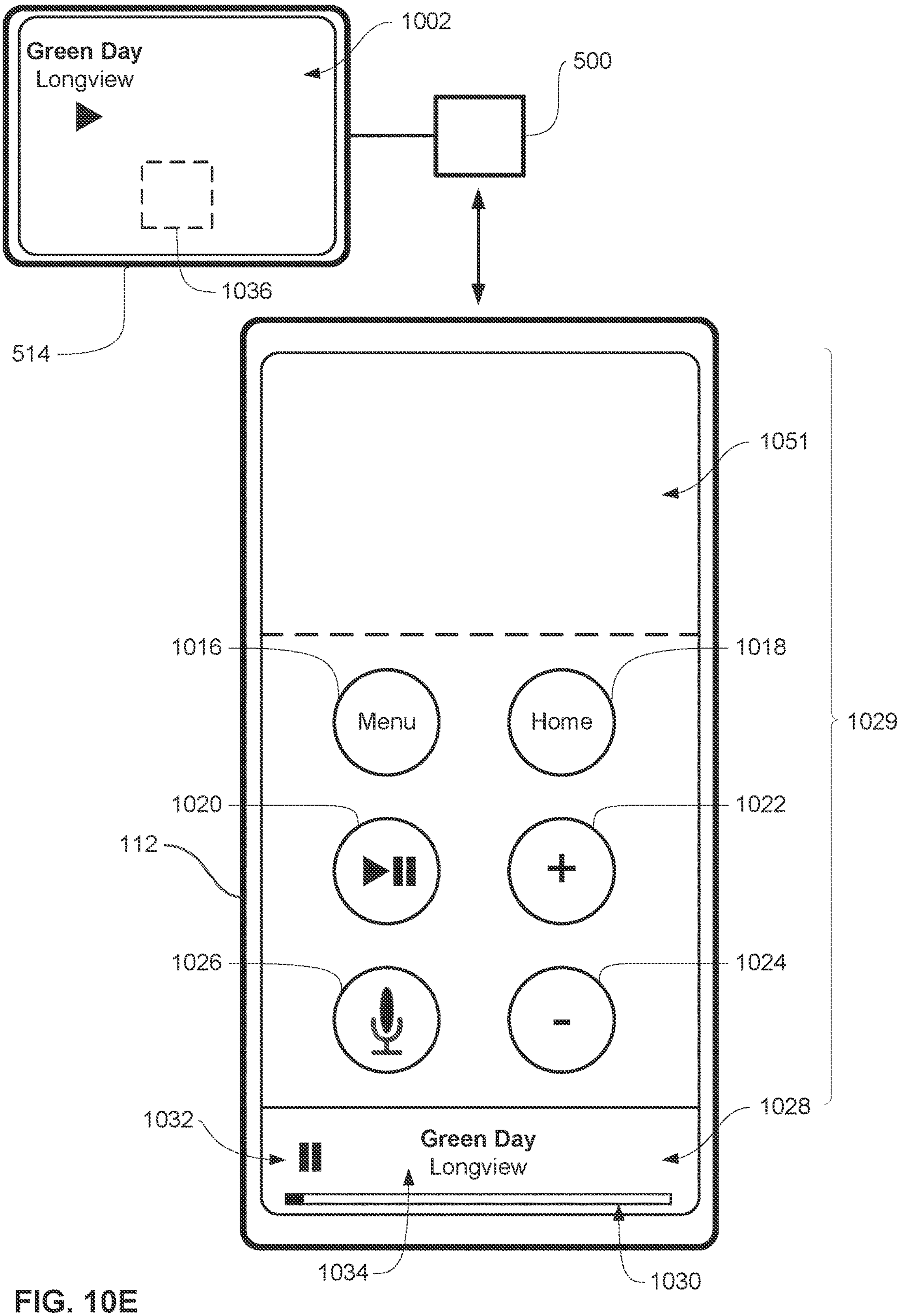
Figure 10F:
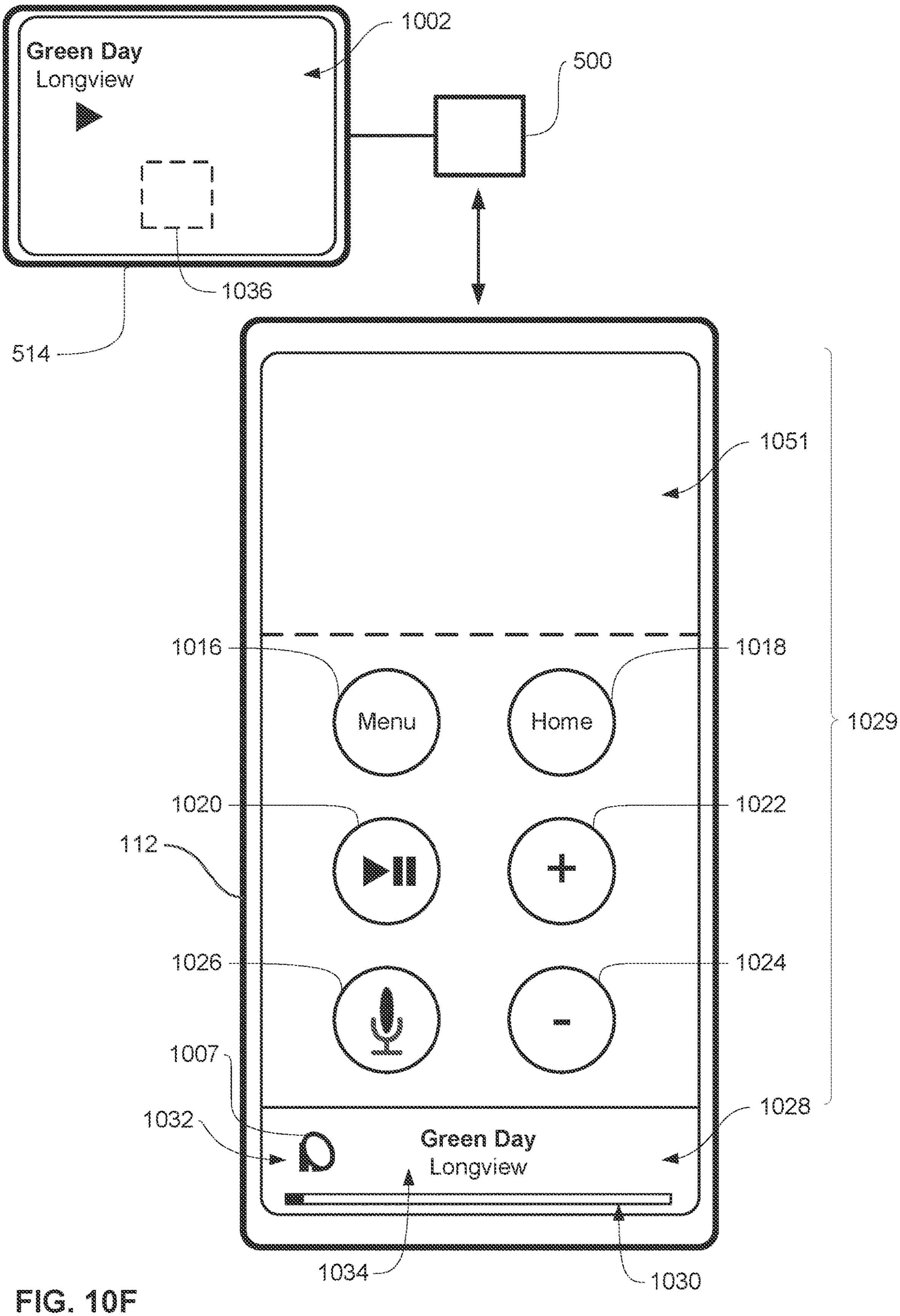
Figure 10G:
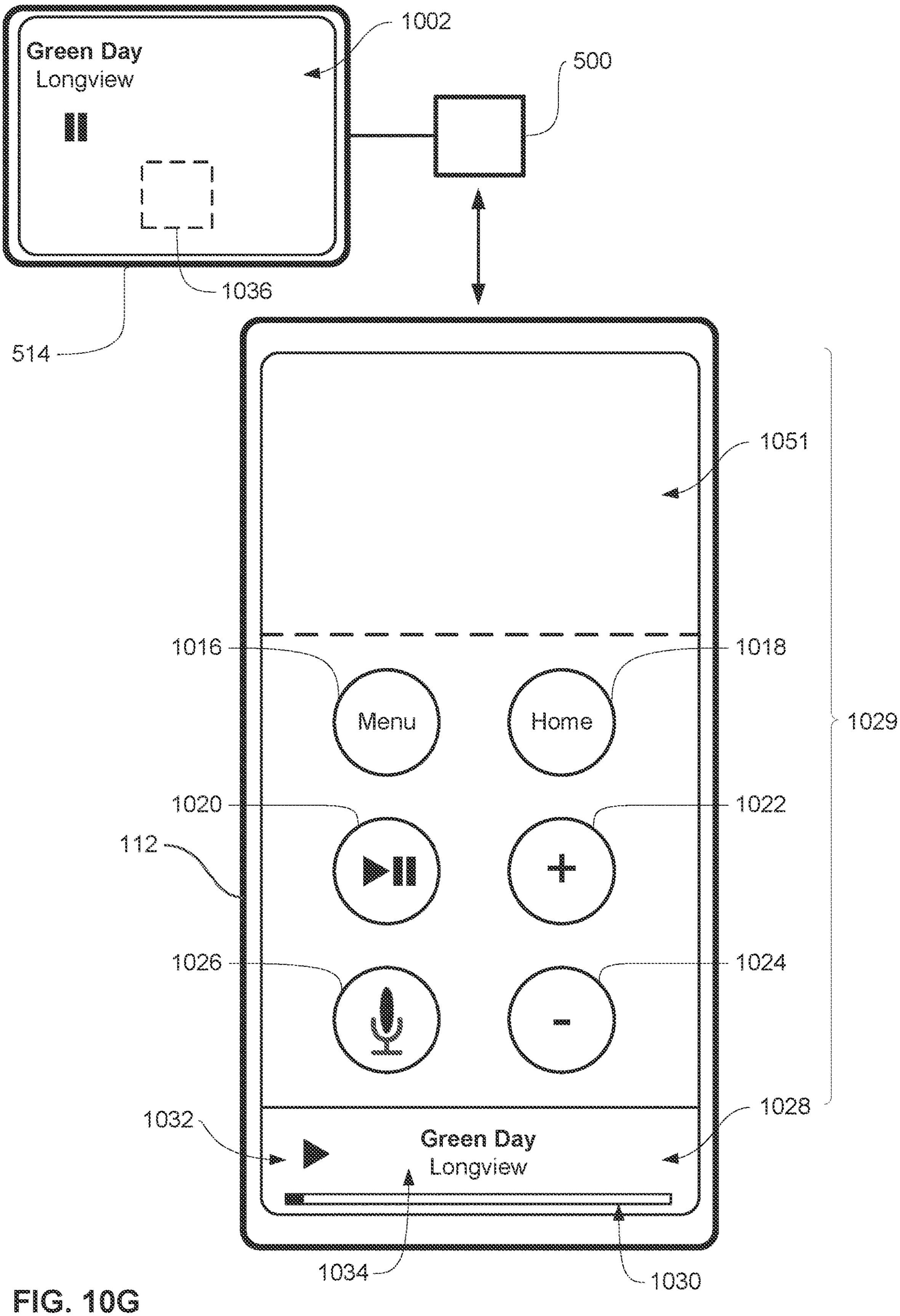
Figure 10H:
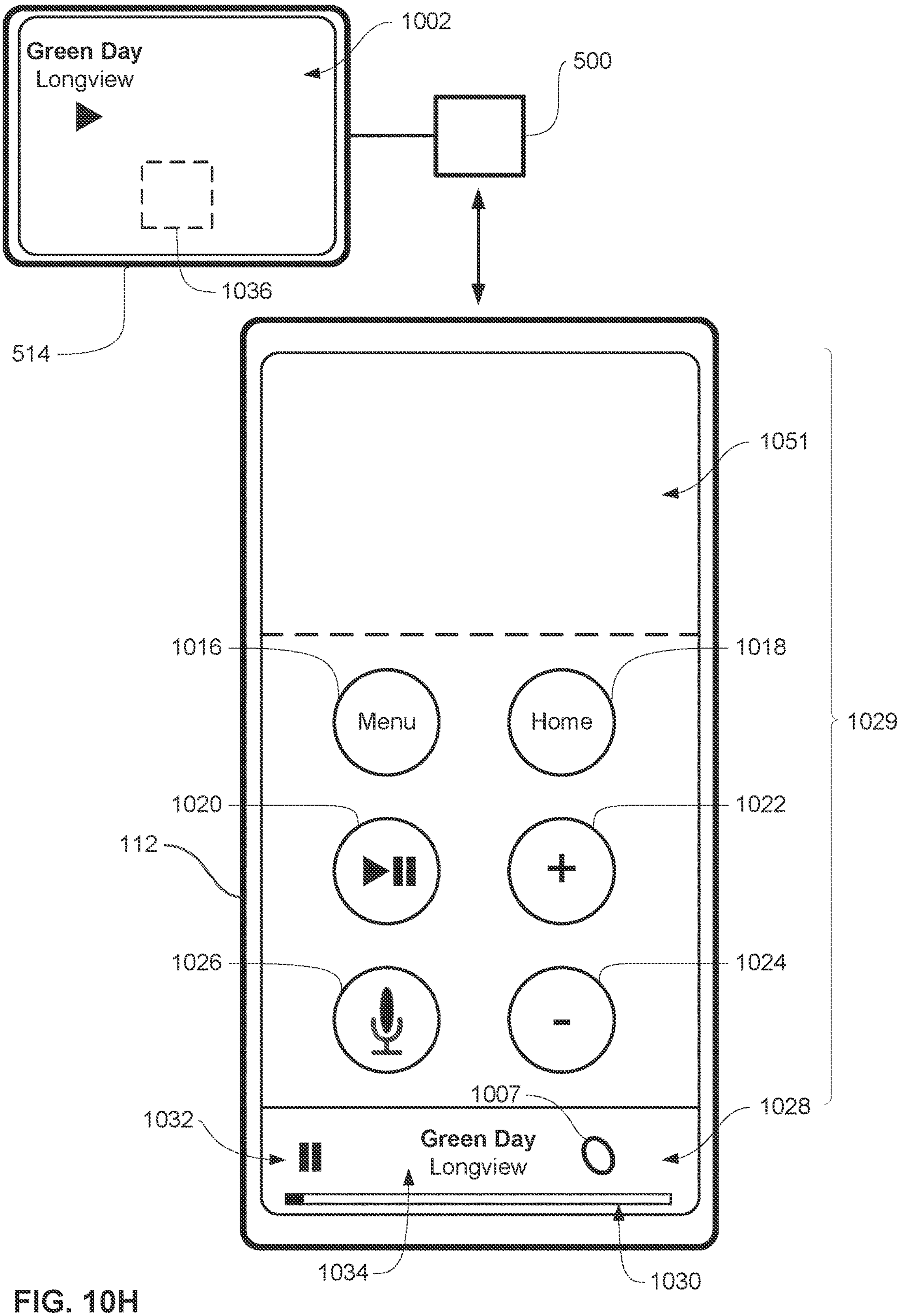
Figure 10I:
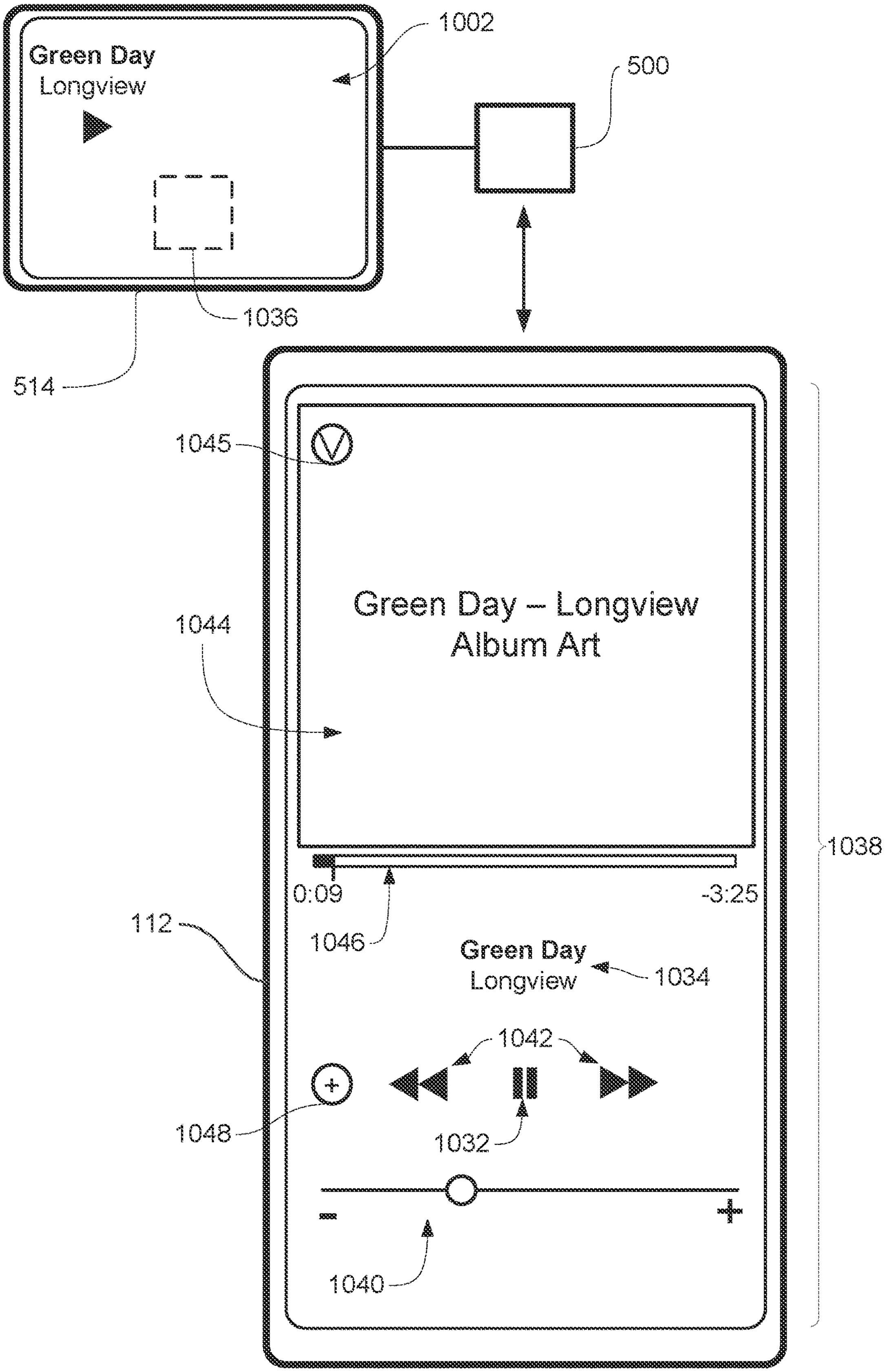
Figure 10J:
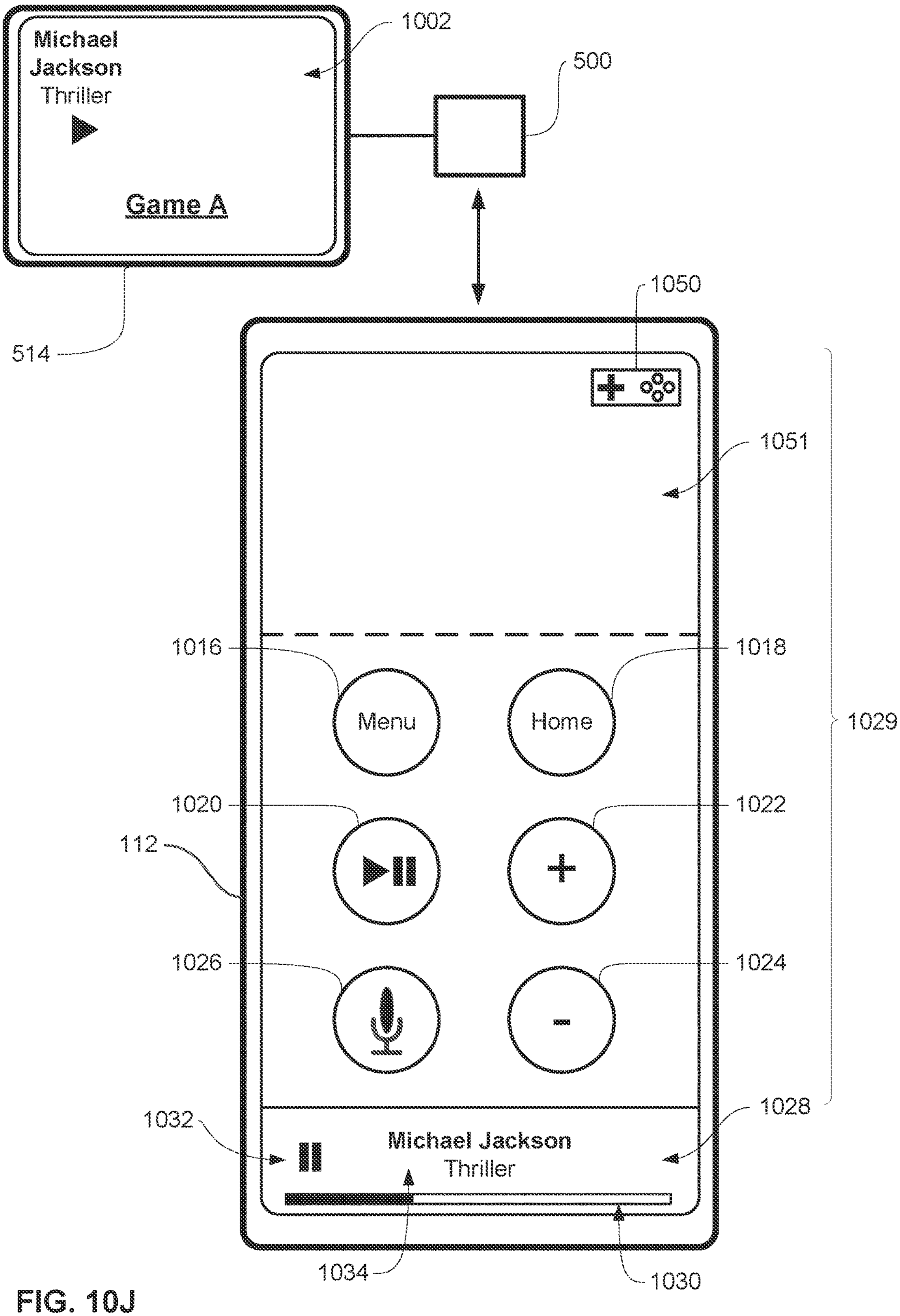
Figure 10K:
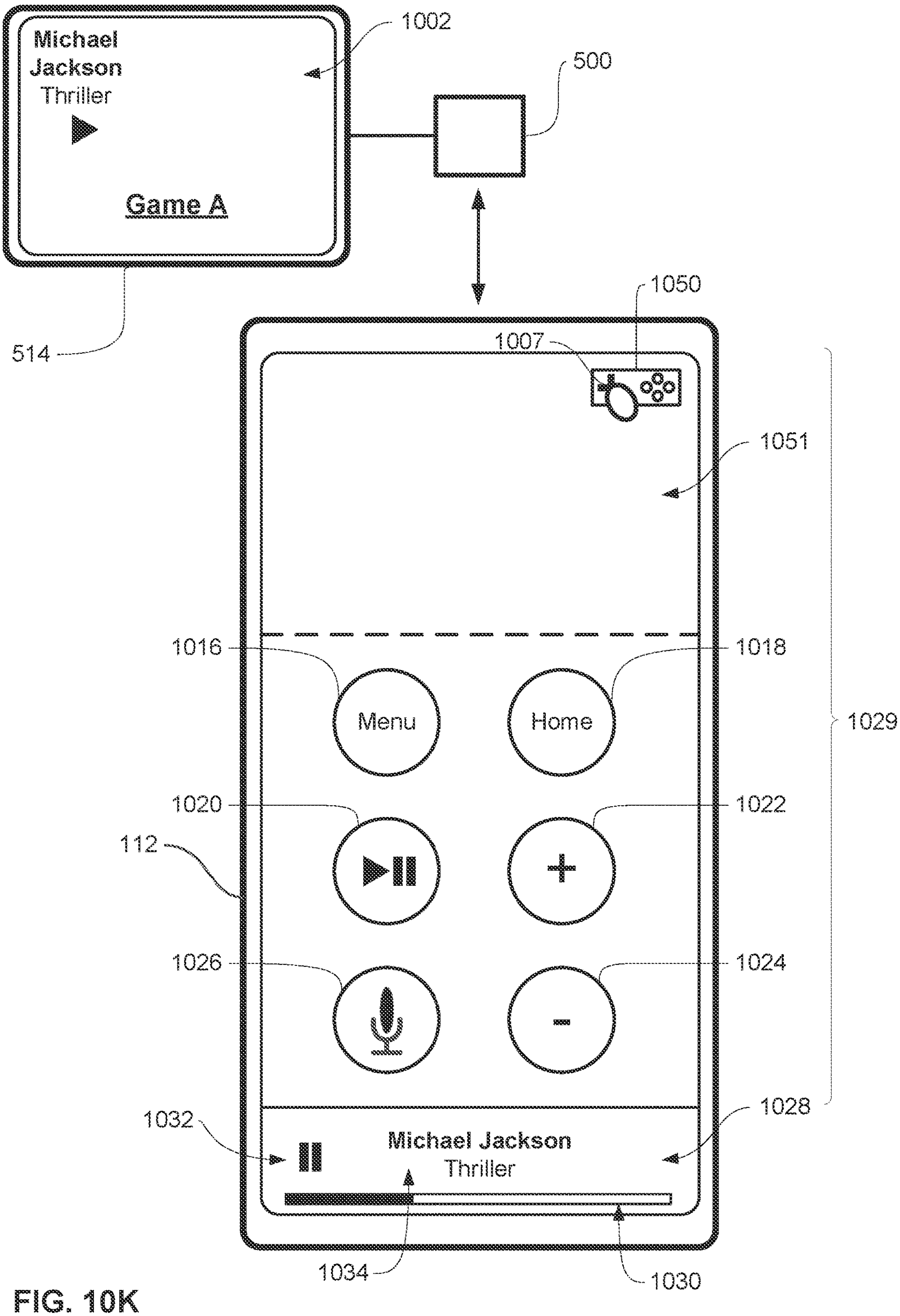
Figure 10L:
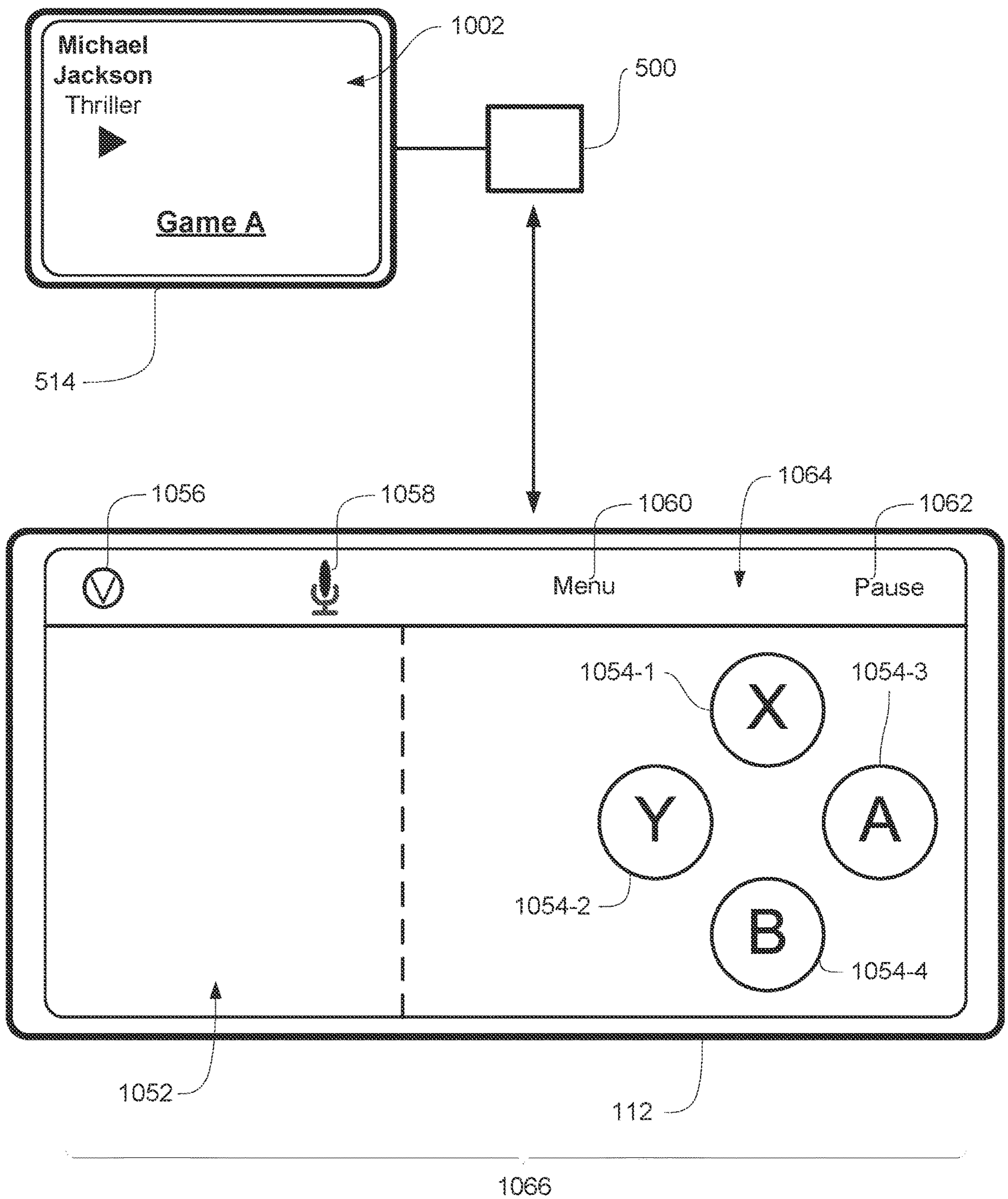
Figure 10M:
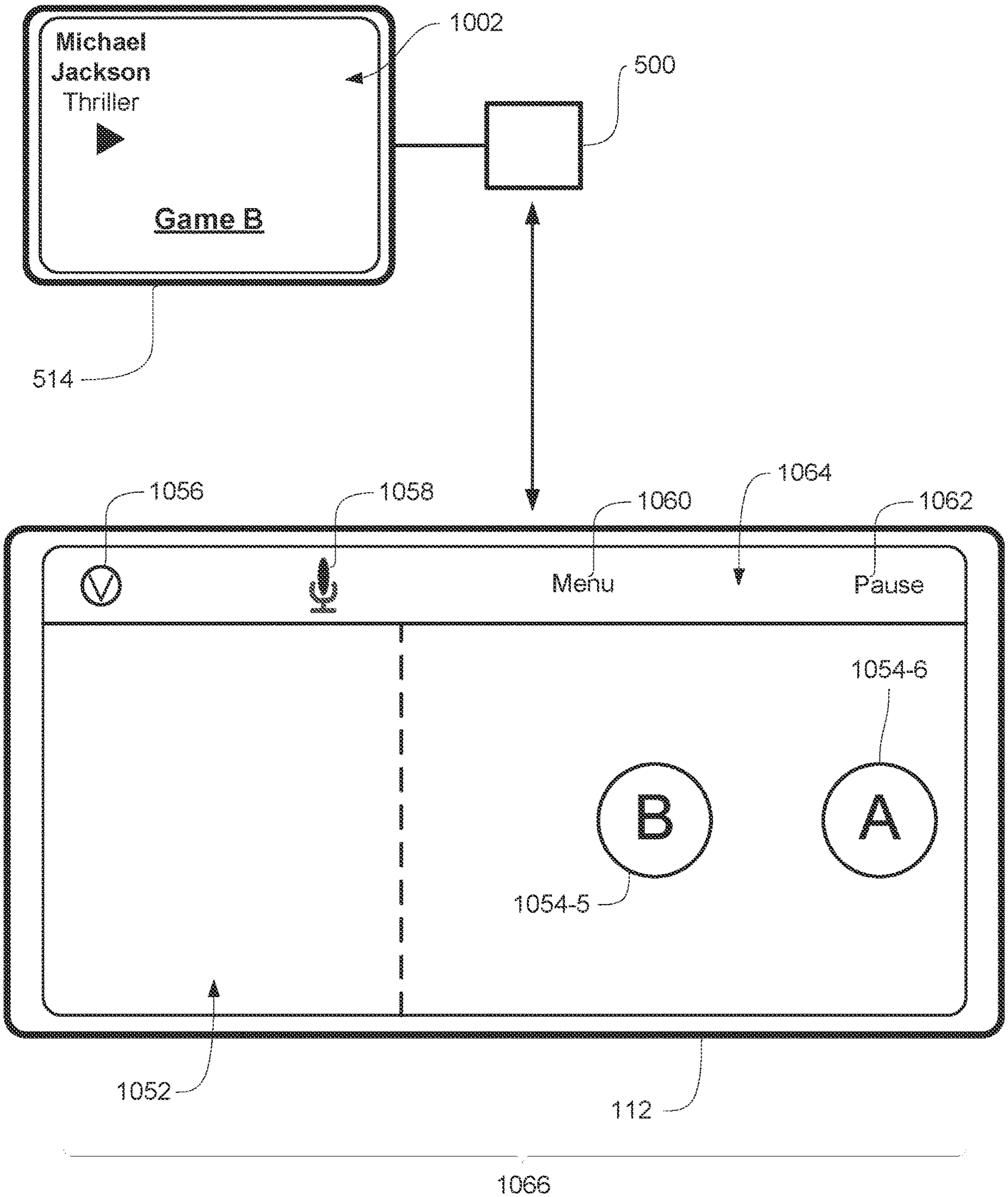
Figure 10N:
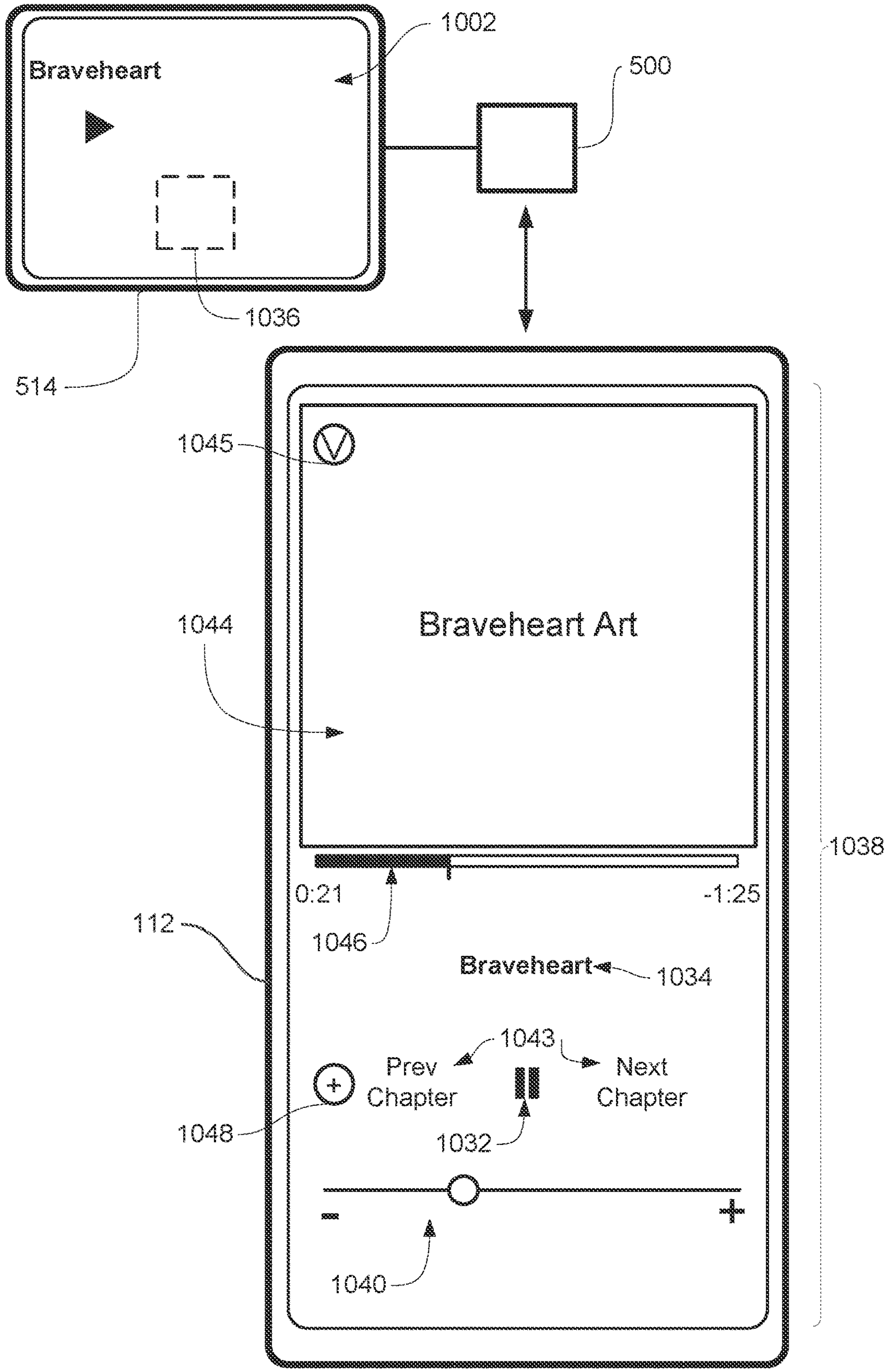
Figure 11A:
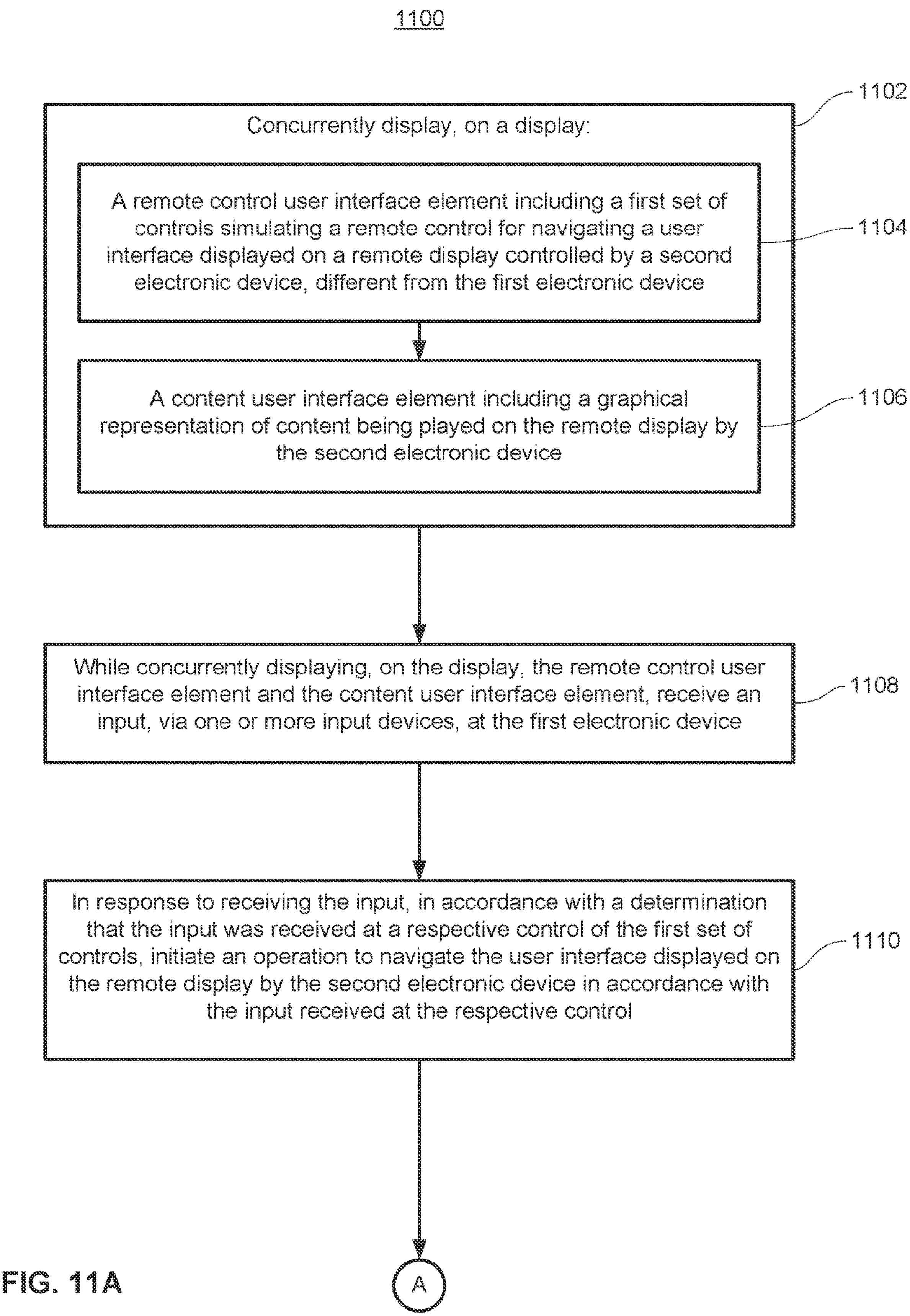
FIGS. 11A-11J are flow diagrams illustrating a method of interacting with an electronic device using a multifunction device that displays various user interfaces for controlling and interacting with the electronic device in accordance with some embodiments of the disclosure.
Figure 11B:
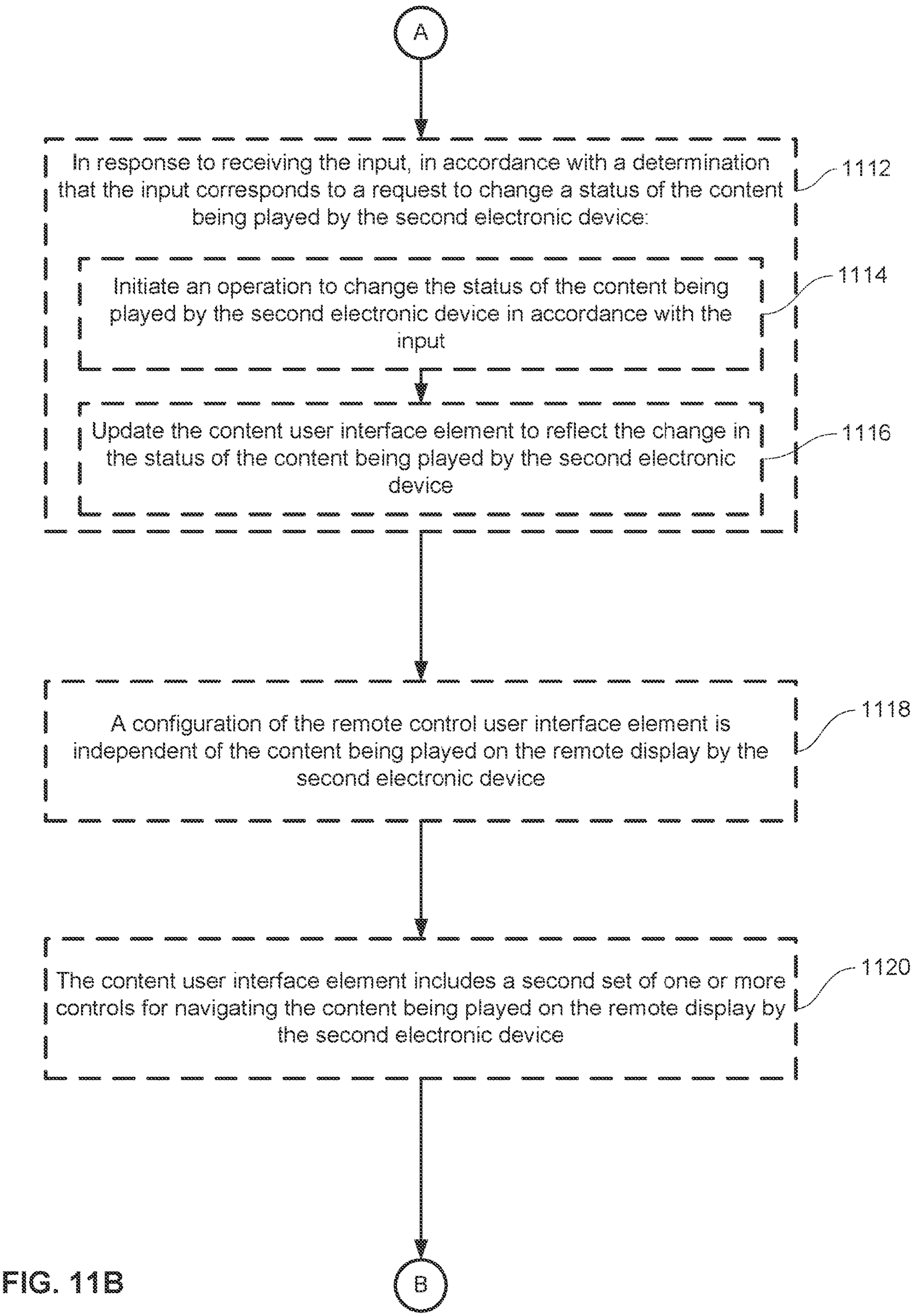
Figure 11C:
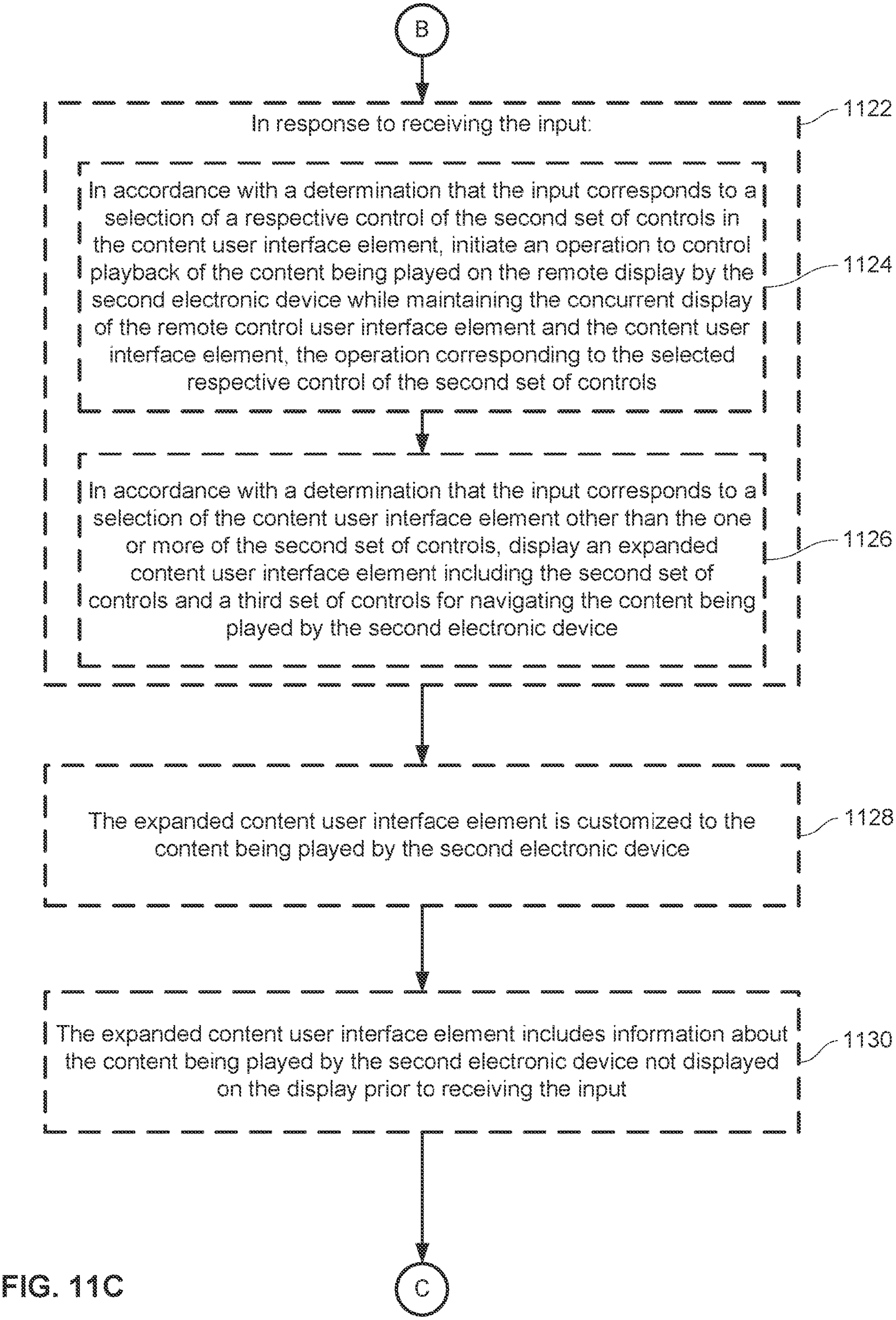
Figure 11D:
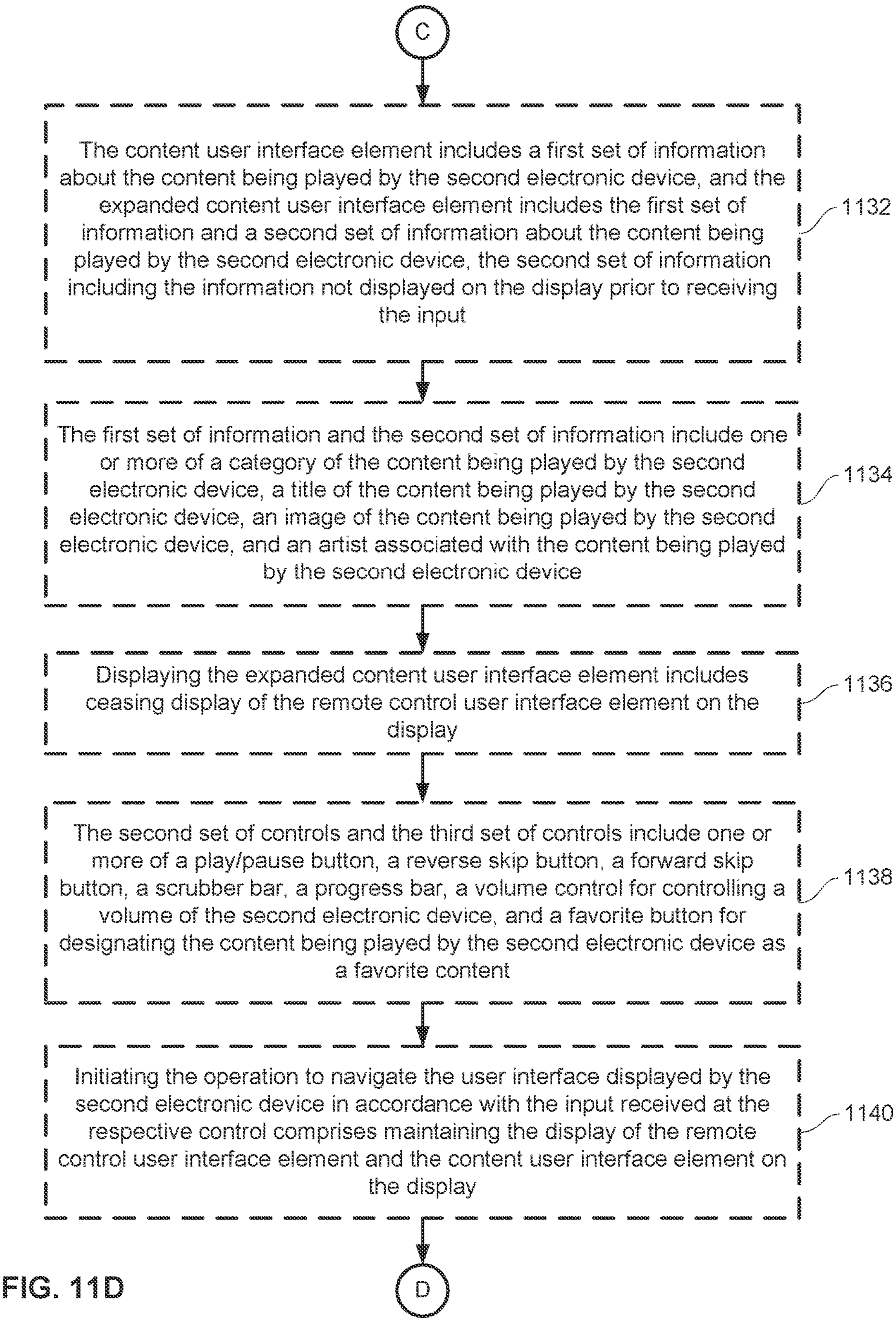
Figure 11E:
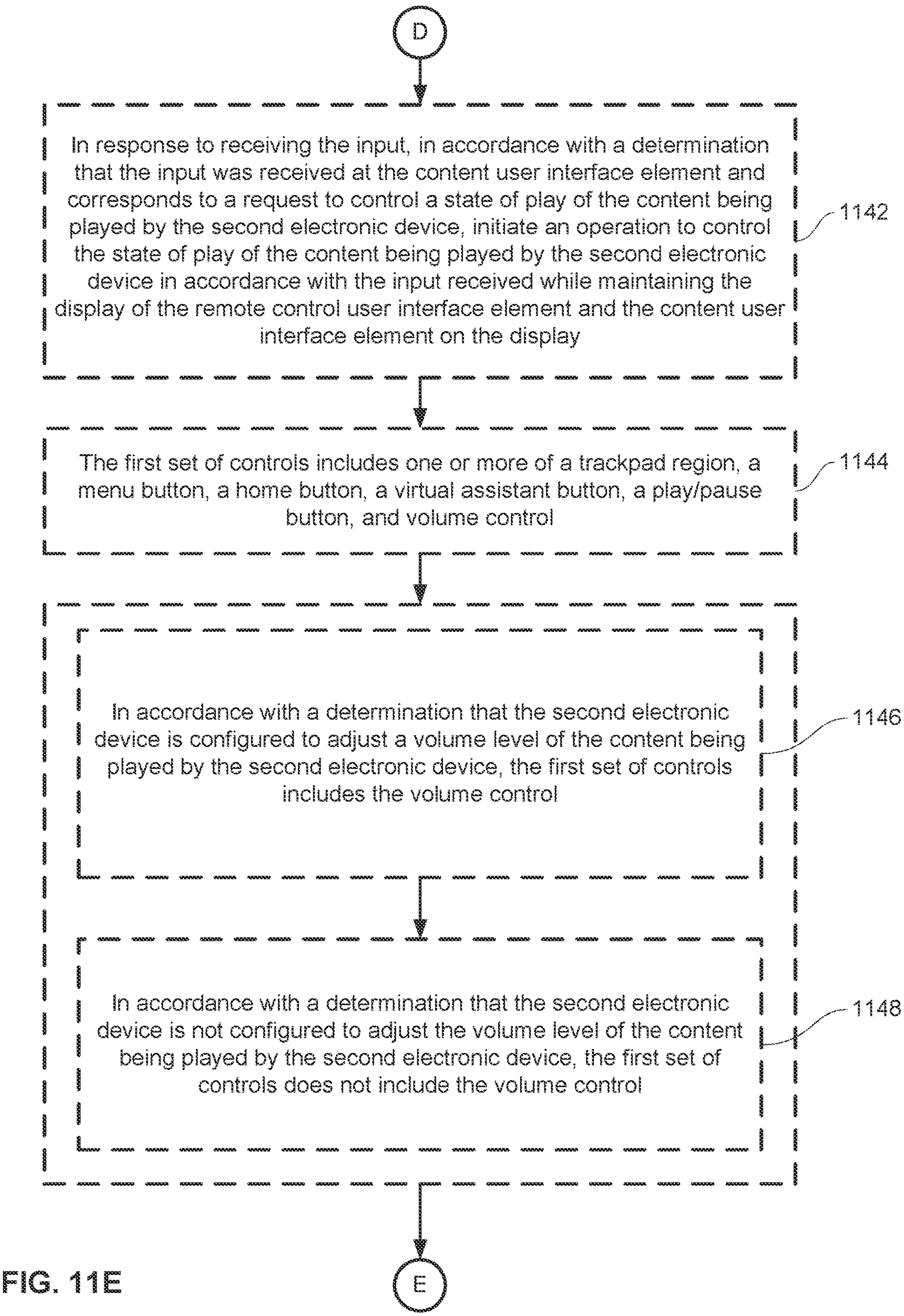
Figure 11F:
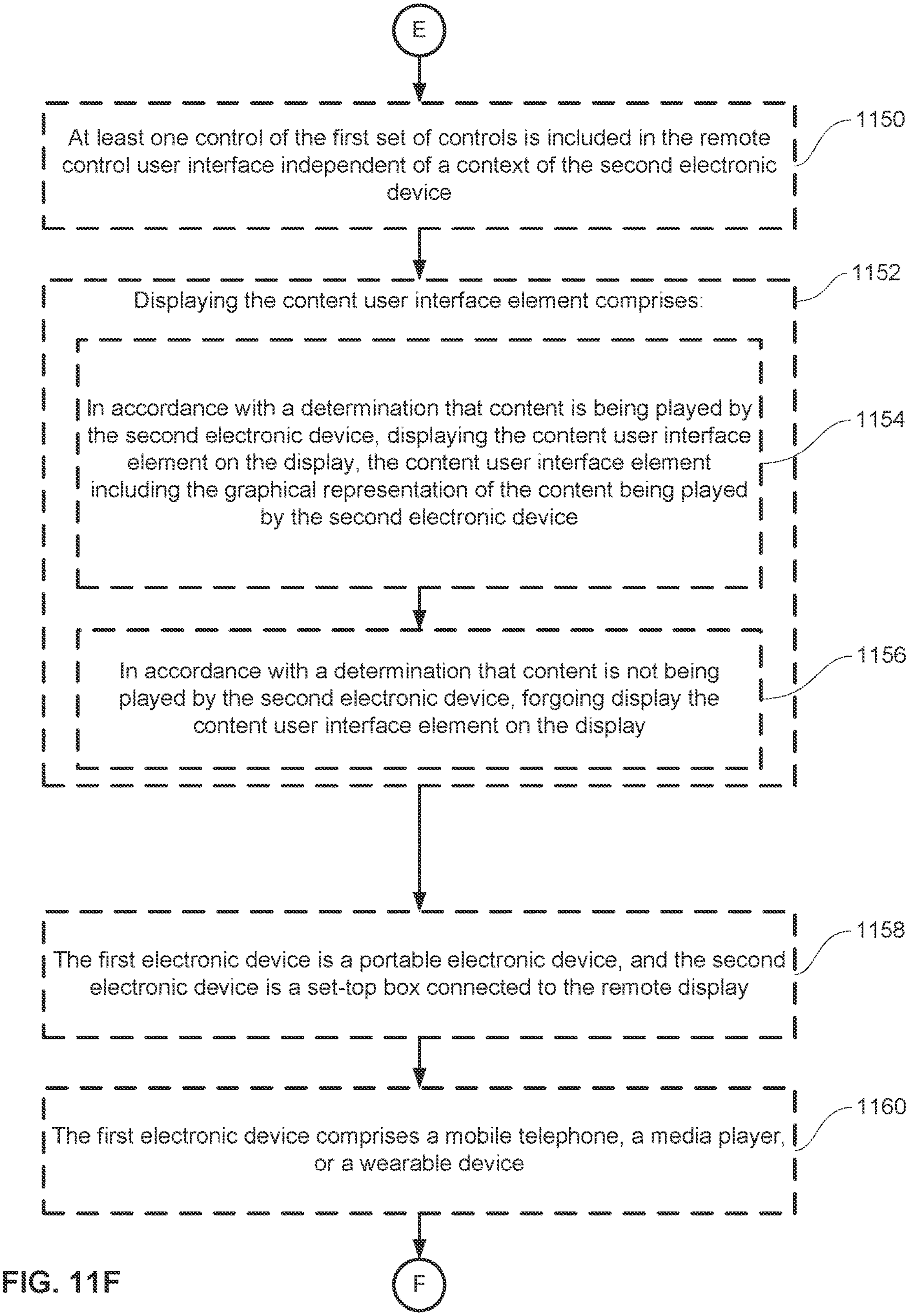
Figure 11G:
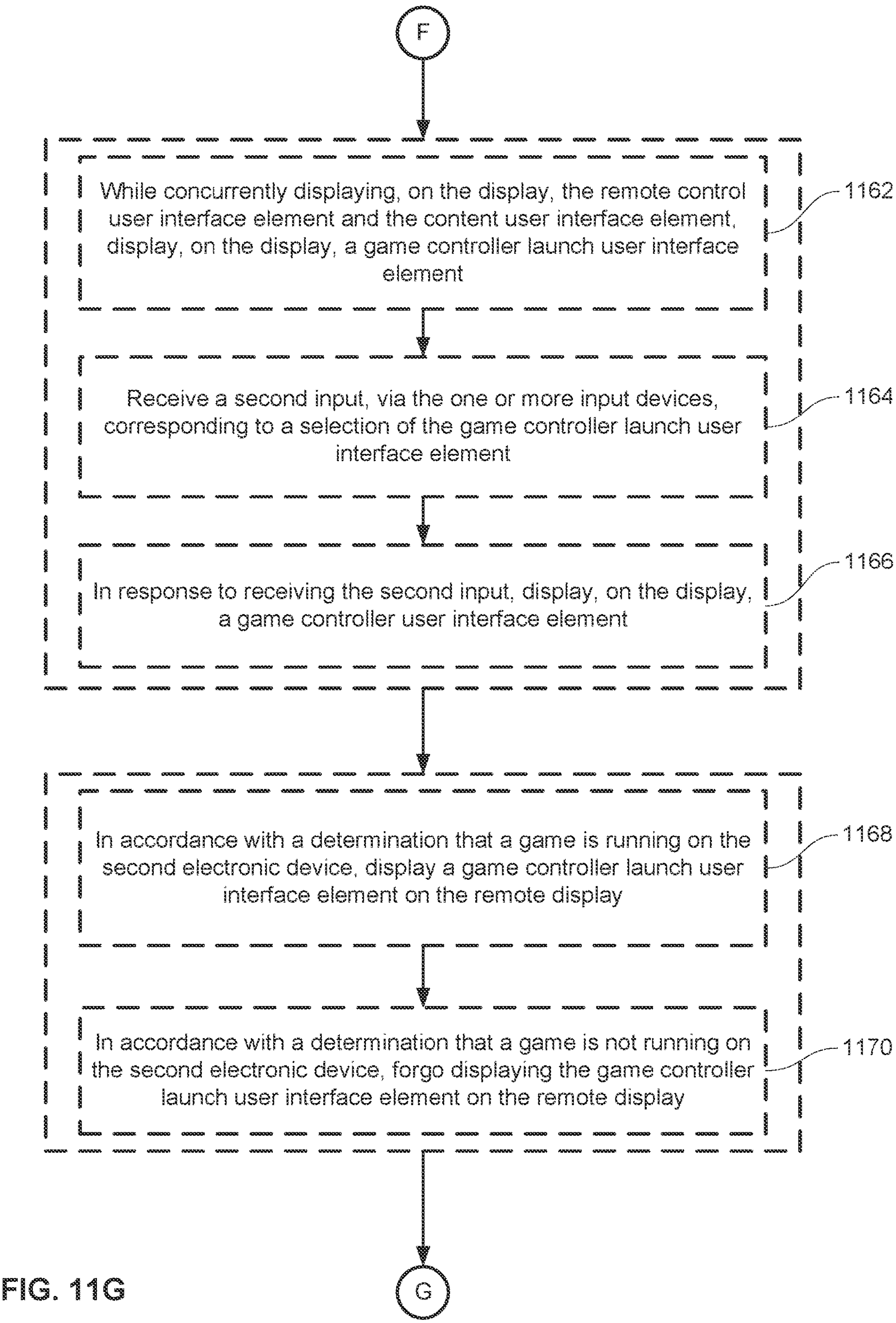
Figure 11H:
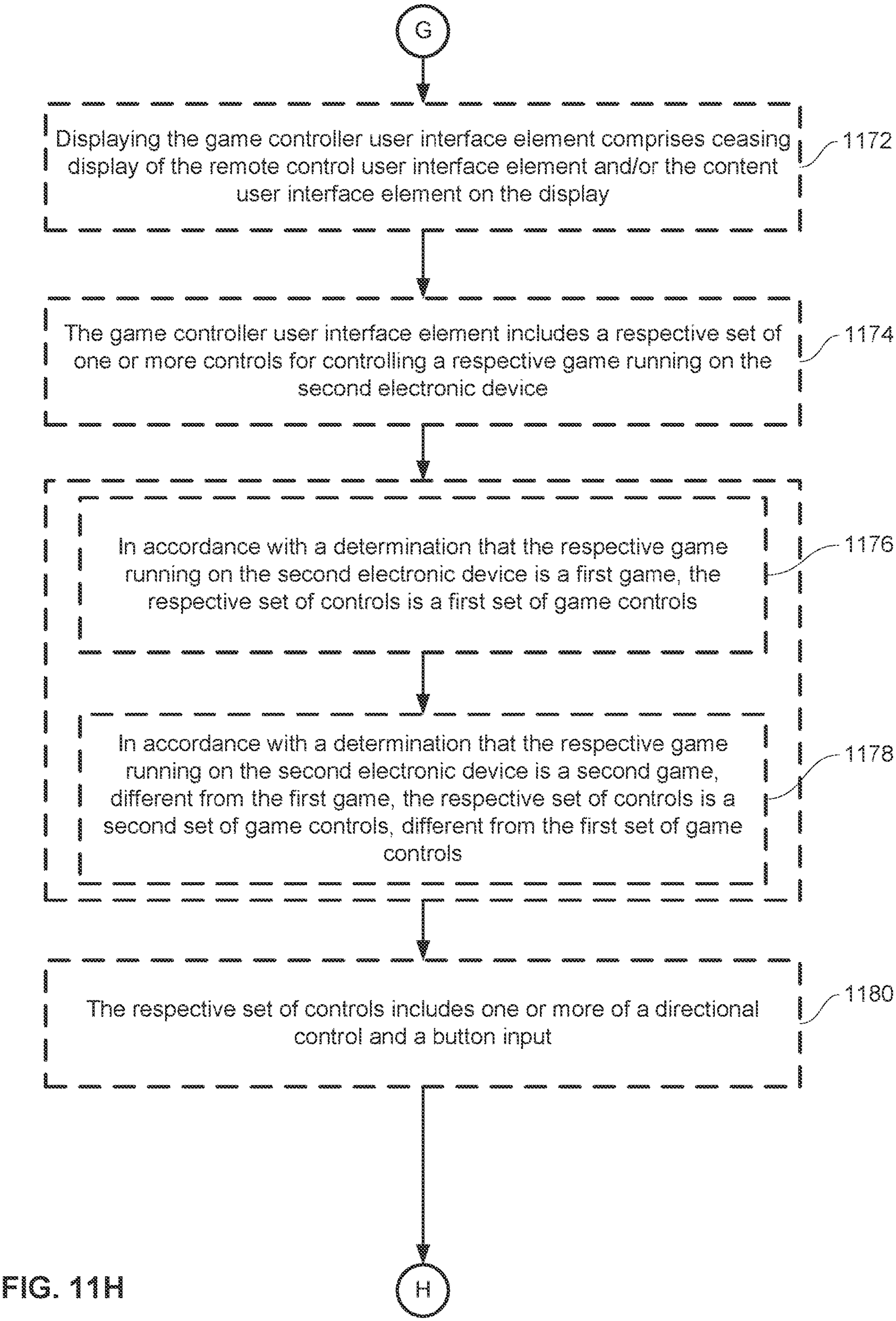
Figure 11I:
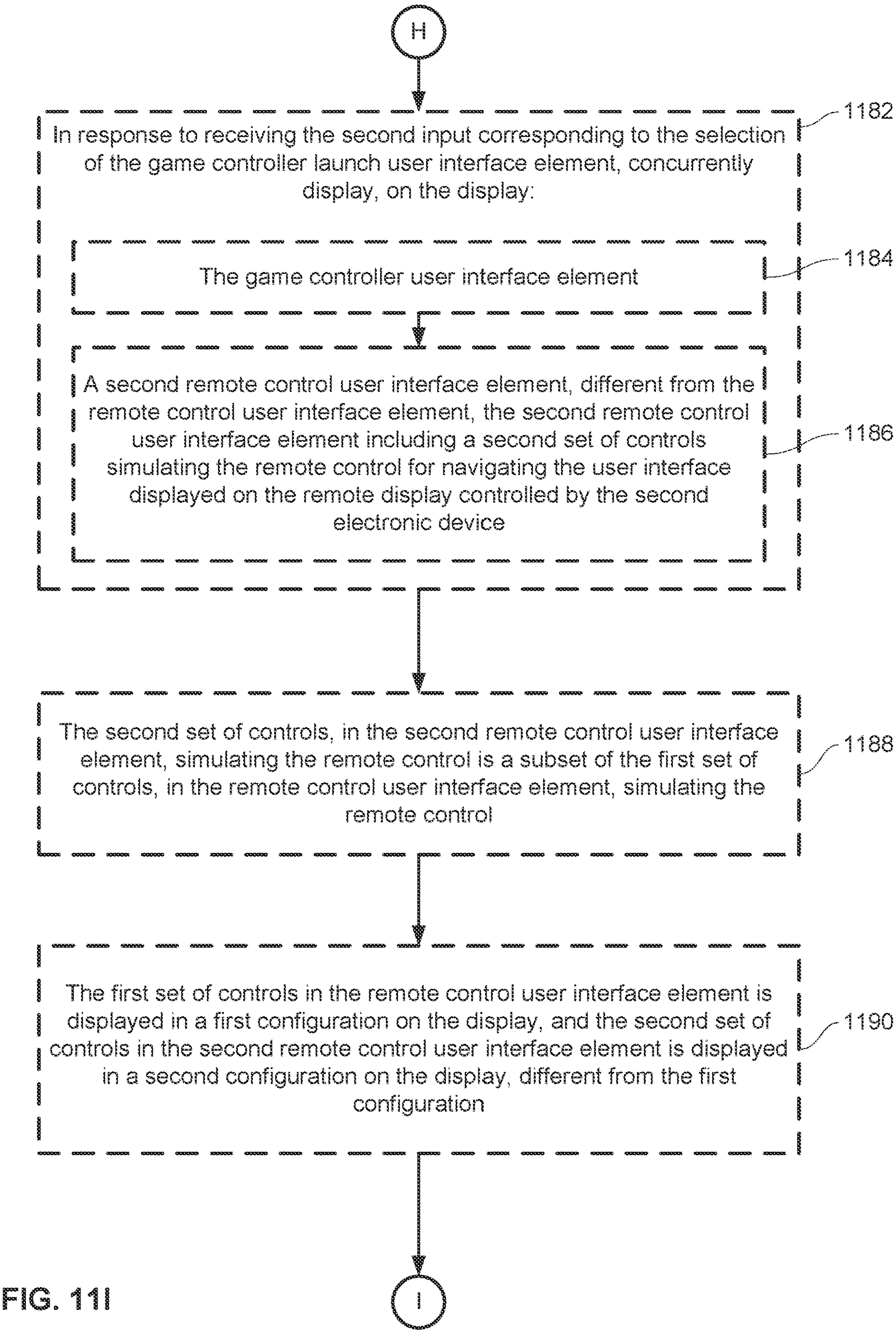
Figure 11J:
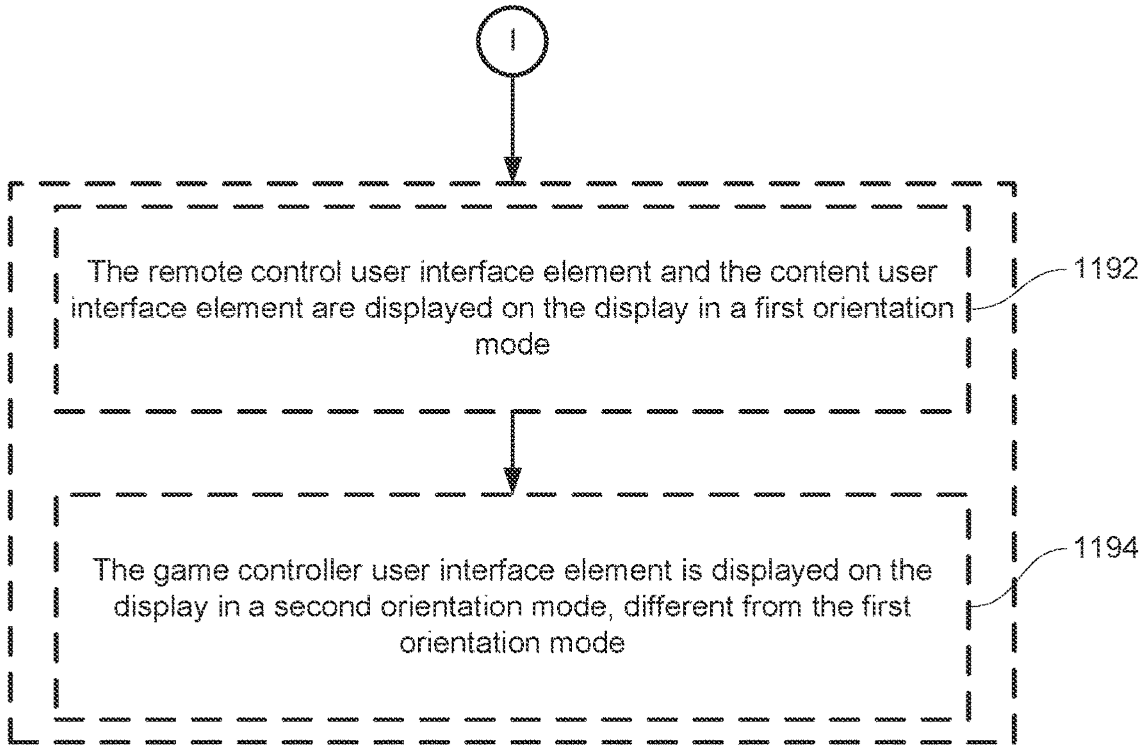

FIGS. 10A-10N illustrate exemplary ways in which a user may interact with an electronic device using a multifunction device that displays various user interfaces for controlling and interacting with the electronic device in accordance with some embodiments of the disclosure. The embodiments in these figures are used to illustrate the processes described below, including the processes described with reference to FIGS. 11A-11J.

FIG. 10A illustrates exemplary display 514. Display 514 optionally displays one or more user interfaces that include various content. In the example illustrated in FIG. 10A, display 514 displays a content application (e.g., a content playback application) running on an electronic device (e.g., electronic device 500 of FIG. 5A) of which display 514 is a part, or to which display 514 is connected. In some embodiments, the content application is for displaying or playing content (e.g., movies, songs, TV shows, games, a menu for an application, or a menu for navigating to media content, etc.), as described with reference to FIGS. 6A-6Q and 8A-8R. The content application displays user interface 1002. User interface 1002 includes current focus indicator 1036 for indicating an object in user interface 1002 that has the current focus (e.g., as described with reference to FIGS. 6A-6Q). The position of current focus indicator 1036 is optionally controlled by movement input detected on a touch-sensitive surface of a remote control or other device, as will be described in more detail below. In FIG. 10A, content application is playing the song "Thriller" by Michael Jackson on electronic device 500. Providing input to the application (e.g., to control the application, to control content playback on electronic device 500, to control the location of current focus indicator 1036, etc.) is optionally accomplished by detecting various control inputs (e.g., a selection input, a movement input, a dedicated button input, etc.) on a dedicated remote control (e.g., remote 510 in FIG. 5B), such as a click of a button on the remote control, a touch input on a touch-sensitive surface of the remote control (e.g., as described above with reference to method 600), or a click of the touch-sensitive surface of the remote control (e.g., as described above with reference to method 800). However, in some embodiments, it may be desirable for a user to provide inputs to electronic device 500 using a device other than a dedicated remote control; for example, a multifunction device (e.g., a mobile telephone, a media playback device, or a wearable device) that is configured to operate in a manner analogous to a dedicated remote control. Touch screen 112 optionally corresponds to such a device (e.g., touch screen 112 is optionally included in a multifunction device that is configured to simulate dedicated remote control functionality in controlling electronic device 500). The device in which touch screen 112 is included optionally corresponds to one or more of device 100 in FIG. 1A, device 100 in FIG. 2, device 300 in FIG. 3 and device 511 in FIG. 5A. For ease of description, actions optionally taken by the device in which touch screen 112 is included (e.g., transmission of commands to electronic device 500, processing of touch inputs, identifying of contacts as particular inputs, tracking various characteristics of contacts, etc.) will be described as being taken by touch screen 112, though it is understood that in some embodiments, the device, rather than touch screen 112, takes these actions.

Touch screen 112 is optionally in communication with electronic device 500, and displays various user interfaces for controlling and interacting with electronic device 500. In FIG. 10A, touch screen 112 is displaying a remote control application user interface that includes a remote control user interface element 1029 and a content user interface element 1028. Remote control user interface element 1029 includes various controls that simulate controls on a dedicated remote control (e.g., remote 510 in FIG. 5B) for controlling electronic device 500. For example, remote control user interface element 1029 includes buttons 1016, 1018, 1020, 1022, 1024 and 1026 corresponding to the buttons described with reference to remote 510 in FIG. 5B. Selection of buttons 1016, 1018, 1020, 1022, 1024 and 1026 (e.g., via one or more taps detected on the buttons) optionally causes touch screen 112 to transmit corresponding commands to electronic device 500 to allow the electronic device to respond accordingly (e.g., as described with reference to FIGS. 6A-6Q and 8A-8R).

Remote control user interface element 1029 also includes trackpad area 1051. Trackpad area 1051 optionally corresponds to touch-sensitive surface 451 on remote 510 in FIG. 5B, and is for providing tap, click, selection and/or movement inputs to electronic device 500 to allow the electronic device to respond accordingly (e.g., as described with reference to FIGS. 6A-6Q and 8A-8R). For example, touch inputs (e.g., a swipe) detected in trackpad area 1051 optionally control the location of current focus indicator 1036 in user interface 1002.

In FIG. 10A, in addition to displaying remote control user interface element 1029, touch screen 112 is displaying content user interface element 1028. Content user interface element 1028 includes one or more graphical indications of content that is playing on electronic device 500 and/or being displayed on display 514. For example, in FIG. 10A, content user interface element 1028 includes information 1034, which indicates the artist (Michael Jackson) and the song (Thriller) currently playing on electronic device 500. Content user interface element 1028 also includes progress bar 1030, which indicates the current play position in Thriller, and play/pause control 1032, which both allows a user to control the play/pause state of Thriller (e.g., via a tap detected on play/pause control 1032) as well as gives the user an indication of the play/pause state of Thriller (e.g., play/pause control 1032 is displayed as a pause symbol when Thriller is playing on electronic device 500, and is displayed as a play symbol when Thriller is paused on the electronic device to give the user an indication of the result of selecting play/pause control 1032 at that time). In some embodiments, content user interface element 1028 includes different controls in addition or alternatively to play/pause control 1032 (e.g., a fast-forward or rewind control for navigating the content playing on electronic device 500 is included in content user interface element 1028, because remote user interface element 1029 already includes play/pause button 1020). In some embodiments, content user interface element 1028 is only displayed on touch screen 112 if content is currently being played or controlled by electronic device 500—otherwise, content user interface element 1028 is optionally not displayed on touch screen 112.

In some embodiments, one or more of buttons 1016, 1018, 1020, 1022, 1024 and 1026 and trackpad area 1051 in remote control user interface element 1029 are displayed only when electronic device 500 is capable of being controlled by the buttons or trackpad area. For example, in FIG. 10A, electronic device 500 is optionally able to control the volume of the content being played on the electronic device (e.g., electronic device 500 is connected to one or more speakers in such a way as to allow the electronic device to control the volume level of those speakers that are playing audio from the content being played by the electronic device). As such, remote control user interface element 1029 in FIG. 10A includes volume buttons 1022 and 1024. In contrast, in FIG. 10B, electronic device 500 is optionally not able to control the volume of the content being played on the electronic device. As such, remote control user interface element 1029 in FIG. 10B does not include volume buttons 1022 and 1024. Conditional display of other controls in remote control user interface element 1029 is similarly contemplated. In some embodiments, certain controls in remote control user interface element 1029 are displayed regardless of the type of content being played on electronic device 500 and/or the configuration of the electronic device. For example, remote control user interface element 1029 optionally always includes menu button 1016 or trackpad area 1051, regardless of any configuration of electronic device 500.

FIG. 10C illustrates control of the location of current focus indicator 1036 in user interface 1002 on display 514 in response to touch input detected in trackpad area 1051. Specifically, contact 1007 and movement of contact 1007 has been detected in trackpad area 1051. In response, current focus indicator 1036 is moved in user interface 1002 in accordance with the detected movement of contact 1007 in trackpad area 1051 (e.g., analogously to movement detected on touch-sensitive surface 451 of remote 510, as described with reference to FIG. 5B). Additionally, as shown in FIG. 10C, in some embodiments, input provided to remote control user interface element 1029 (e.g., contact 1007 detected in trackpad area 1051) is detected while maintaining the display of the remote control user interface element 1029 and the content user interface element 1028 on touch screen 112 (e.g., if the input selects a control in the remote control user interface element 1029, selection of the control causes a corresponding operation to occur without changing the placement and/or size, on touch screen 112, of the remote control user interface element 1029 and the content user interface element 1028).

FIG. 10D illustrates control of the state of play of the content being played on electronic device 500 in response to touch input detected on play/pause button 1020. Specifically, contact 1007 (e.g., a tap) has been detected on play/pause button 1020. In response, "Thriller" has been paused on electronic device 500 (indicated by the pause symbol in user interface 1002 on display 514). Additionally, content user interface element 1028 is updated to reflect the changed status of the content being played on electronic device 500. Specifically, play/pause control 1032 in content user interface element 1028 is updated to change from a pause symbol (e.g., as in FIG. 10C) to a play symbol (e.g., as in FIG. 10D), to indicate that selection of play/pause control 1032 will cause "Thriller" to start playing again on electronic device 500. Similar to FIG. 10C, the input detected at play/pause button 1020 is detected while maintaining the display of the remote control user interface element 1029 and the content user interface element 1028 on touch screen 112.

FIG. 10E illustrates a change in content being played on electronic device 500, and the corresponding update to content user interface element 1028. Specifically, electronic device 500 has been changed from playing Michael Jackson's "Thriller" to playing Green Day's "Longview" (e.g., via one or more appropriate inputs detected in remote control user interface element 1029), as shown in user interface 1002 on display 514. As a result, information 1034 in content user interface element 1028 has been updated to indicate that the currently playing content on electronic device is Green Day's "Longview," and progress bar 1030 has been updated to indicate the current play position in "Longview." Further, in some embodiments, the configuration of remote control user interface element 1029 is independent of the content playing on electronic device. As such, despite electronic device 500 having changed from playing "Thriller" to playing "Longview," the configuration of remote control user interface element 1029 in FIG. 10E (corresponding to playback of "Longview") is the same as the configuration of remote control user interface element 1029 in FIG. 10D (corresponding to playback of "Thriller).

In some embodiments, a touch input detected in content user interface element 1028 either maintains display of the content user interface element or expands the content user interface element depending on where the touch input is detected. Such behavior is illustrated in FIGS. 10F-10I. Specifically, in FIG. 10F, contact 1007 (e.g., a tap) has been detected on play/pause control 1032 in content user interface element 1028. As a result, in FIG. 10G, "Longview" has been paused on electronic device 500 (as indicated in user interface 1002 on display 514), while the placement and/or size, on touch screen 112, of remote control user interface element 1029 and content user interface element 1028 is maintained.

In contrast, in FIG. 10H, contact 1007 (e.g., a tap) has been detected on an area of content user interface element 1028 other than play/pause control 1032. As a result, in FIG. 10I, expanded content user interface element 1038 is displayed on touch screen 112. In some embodiments, expanded content user interface element 1038 replaces remote control user interface element 1029 and content user interface element 1028 on touch screen 112, as illustrated in FIG. 10I. Expanded content user interface element 1038 optionally includes additional controls and/or information as compared with content user interface element 1028 in FIG. 10H. For example, in FIG. 10I, expanded content user interface element 1038 includes album artwork 1044 associated with the content playing on electronic device 500 (e.g., Green Day's "Longview"), a scrubber bar 1046 that both displays an indication of a current play position in the content playing on electronic device 500 and allows a user to scrub through the content (e.g., via left/right swipes detected on scrubber bar 1046), and information 1034 about the artist associated with, and the title of, the content playing on electronic device 500. Expanded content user interface element 1038 also includes play/pause control 1032, forward and reverse skip controls 1042 for skipping forward and backward through content playing on electronic device 500, and favorite button 1048 for adding the content playing on electronic device 500 to a favorites list of the user. Additionally, expanded content user interface element 1038 includes volume control 1040 for controlling the volume of the content playing on electronic device 500 (e.g., via left/right swipes detected on volume control 1040). Finally, in the embodiment of FIG. 10I, expanded content user interface element includes return element 1042 for closing expanded content user interface element 1038, and returning to the display of content user interface element 1028 and remote control user interface element 1029 of FIG. 10H, for example.

In some embodiments, expanded content user interface element 1038 is customized to the content being played by electronic device 500. For example, expanded content user interface element 1038 optionally includes customized information, such as album art corresponding to the content being played on electronic device 500, and/or customized controls that are specific to the content that is currently being played on display 514 by electronic device 500 (e.g., a forward skip button to skip to a next track if the content being played is a song in a playlist, or a fast-forward button to fast-forward through the content if the content being played is a movie). FIG. 10N illustrates an embodiment in which device 500 is playing a movie (e.g., Braveheart) rather than music, as in FIG. 10I. Expanded content user interface element 1038 in FIG. 10N optionally includes previous/next chapter controls 1043 for skipping to a previous or next chapter in the movie, as opposed to forward and reverse skip controls 1042 for skipping forward and backward through a song, as in FIG. 10I.

In some embodiments, electronic device 500 is capable of running one or more games. In such circumstances, touch screen 112 optionally displays various user interfaces to interact with the games, as illustrated in FIGS. 10J-10N. Specifically, in FIG. 10J, touch screen 112 is displaying content user interface element 1028 and remote control user interface element 1029, and electronic device 500 is optionally playing Michael Jackson's "Thriller," as described with reference to FIG. 10A, for example. Additionally, electronic device 500 is optionally running game A, as indicated in user interface 1002. As a result, touch screen 112 displays game controller launch user interface element 1050 for displaying a game controller user interface element on touch screen 112, as will be described in more detail later. In some embodiments, game controller launch user interface element 1050 is only displayed on touch screen 112 if a game is running on electronic device 500, and/or the game running on electronic device 500 supports game controller input.

In FIG. 10K, contact 1007 (e.g., a tap) has been detected on game controller launch user interface element 1050. In response, touch screen 112 ceases displaying remote control user interface element 1029 and content user interface element 1028 (e.g., with touch screen 112 in a portrait orientation mode), and displays game controller user interface element 1066 (e.g., with touch screen 112 in a landscape orientation mode), as illustrated in FIG. 10L. Game controller user interface element 1066 optionally includes controls and/or information relating to playing a game on electronic device 500. For example, in FIG. 10L, game controller user interface element 1066 includes trackpad area 1052 for providing directional inputs to game A (e.g., with a user's left thumb), and buttons 1054-1, 1054-2, 1054-3 and 1054-4 for providing button inputs to game A (e.g., with a user's right thumb).

Touch screen 112 also displays remote control user interface element 1064, which includes various controls that simulate controls on a dedicated remote control (e.g., remote 510 in FIG. 5B) for controlling electronic device 500 and/or navigating user interface 1002 displayed on display 514, similar to remote control user interface element 1029 in FIG. 10A, for example. However, in some embodiments, remote control user interface element 1064 includes different controls and/or controls of different appearance than remote control user interface element 1029 in FIG. 10A. Specifically, in FIG. 10L, remote control user interface element 1064 includes voice assistant button 1058, menu button 1060 and play/pause button 1062 (currently showing "pause," because the content on electronic device 500 is currently playing). Remote control user interface element 1064 does not include other buttons that are included in remote control user interface element 1029 in FIG. 10A, for example. Additionally, voice assistant button 1058, menu button 1060 and play/pause button 1062 in remote control user interface element 1051 have a different appearance, and are displayed in a different arrangement, than the corresponding buttons in remote control user interface element 1029 in FIG. 10A.

In some embodiments, the game controls included in game controller user interface element 1066 and/or the configuration of game controller user interface element 1066 (e.g., the placement of controls) are game-dependent. For example, the game controls in game controller user interface element 1066 are optionally customized based on the game that is running on electronic device 500. As previously stated, in FIG. 10L, electronic device 500 is running game A, as indicated in user interface 1002, and game controller user interface element 1066 has the configuration described above and illustrated in FIG. 10L. In FIG. 10M, electronic device is running game B, as indicated in user interface 1002. As a result, game controller user interface element 1066 in FIG. 10M has a different configuration than does game controller user interface element 1066 in FIG. 10L. Specifically, game controller user interface element 1066 in FIG. 10M (corresponding to game B) has buttons 1054-5 and 1054-6, whereas game controller user interface element 1066 in FIG. 10L (corresponding to game A) has buttons 1054-1, 1054-2, 1054-3 and 1054-4, arranged in a different manner than buttons 1054-5 and 1054-6. The configuration of game controller user interface element 1066 can similarly vary in other ways based on the game that is currently running on electronic device 500 depending on the features or requirements of the game.

FIGS. 11A-11J are flow diagrams illustrating a method 1100 of interacting with an electronic device using a multifunction device that displays various user interfaces for controlling and interacting with the electronic device in accordance with some embodiments of the disclosure. The method 1100 is optionally performed at an electronic device such as device 100, device 300, or device 500 as described above with reference to FIGS. 1A-1B, 2-3 and 5A-5B. Some operations in method 1100 are, optionally, combined and/or the order of some operations is, optionally, changed.

As described below, the method 1100 provides ways of interacting with an electronic device using a multifunction device that displays various user interfaces for controlling and interacting with the electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device (e.g., a remote control, a mobile telephone, a media playback device, or a watch controlling a set-top box, such as device 100, device 300, or device 500) with a display and one or more input devices (e.g., a touch-sensitive surface, or a touchscreen) concurrently displays (1102), on the display: a remote control user interface element (1104) including a first set of controls simulating a remote control (e.g., simulating functionality of a dedicated remote control) for navigating a user interface displayed on a remote display (e.g., a television) controlled by a second electronic device (e.g., a set-top box connected to the television), different from the first electronic device (e.g., displaying virtual input elements such as virtual buttons or a movement tracking region that correspond to physical controls such as buttons or a touch-sensitive surface on a physical remote that is dedicated to controlling the second electronic device) and a content user interface element (1106) including a graphical representation of content (e.g., a movie, a television show, a song, etc.) being played on the remote display by the second electronic device, such as in FIG. 10A (e.g., a graphical representation of the type of content that is playing on the second electronic device, the name of the content, the artist associated with the content, the state of play of the content (e.g., currently paused, currently playing, etc.), one or more controls for controlling the playback of the content on the second electronic device, etc.). In some embodiments, while concurrently displaying, on the display, the remote control user interface element and the content user interface element, the electronic device receives (1108) an input (e.g., a touch input, such as a tap or a swipe input), via the one or more input devices, at the first electronic device, and in response to receiving the input, in accordance with a determination that the input was received at a respective control (e.g., a play/pause button, a menu button, a back button, etc.) of the first set of controls, the electronic device initiates (1110) an operation to navigate the user interface displayed on the remote display by the second electronic device, such as in FIG. 10C (e.g., by transmitting a corresponding command from the first electronic device to the second electronic device) in accordance with the input received at the respective control. For example, in response to the receiving the input, navigating menus displayed by the second electronic device, changing a user interface object having current focus in a collection of user interface objects displayed by the second electronic device, etc.

In some embodiments, in response to receiving the input (1112), in accordance with a determination that the input corresponds to a request to change a status of the content being played by the second electronic device (e.g., skipping to a next song, playing or pausing the currently playing content, skipping to the next episode of a television series, etc.), the electronic device initiates (1114) an operation to change the status of the content being played by the second electronic device in accordance with the input (e.g., transmitting a command from the first electronic device to the second electronic device to effectuate the status change requested by the input), and the electronic device updates (1116) the content user interface element to reflect the change in the status of the content being played by the second electronic device, such as in FIG. 10D (e.g., show that the content is paused or show that different content is now being played on the remote display). For example, if the input causes a new song to be played on the second electronic device, updating the content user interface element to include the title of the newly-playing song, such as in FIG. 10E; if the input pauses the currently playing content on the second electronic device, updating the content user interface element to indicate that the content is currently paused, rather than currently playing, such as in FIG. 10D, etc.

In some embodiments, a configuration of the remote control user interface element (e.g., the appearance of the remote control user interface element, the controls included in the remote control user interface element, the sizes of the controls included in the remote control user interface element, etc.) is independent of the content being played on the remote display by the second electronic device (1118) (e.g., the same set of controls are displayed in the remote control user interface element without regard to what content is currently being played on the remote display device by the second electronic device). In some embodiments, if the content being played by the second electronic device changes, the set of controls in the remote control user interface will remain unchanged, such as in FIGS. 10D-10E.

In some embodiments, the content user interface element includes (1120) a second set of one or more controls for navigating the content being played on the remote display by the second electronic device, such as in FIG. 10A (e.g., a play/pause button, a skip forward button, a skip backwards button, a scrubber bar that can be scrubbed back and forth to control a current play position in the content, etc.). In some embodiments, in response to receiving the input (1122), in accordance with a determination that the input corresponds to a selection of a respective control of the second set of controls in the content user interface element (e.g., a tap of one of the controls in the content user interface element, such as a play/pause button), the electronic device initiates (1124) an operation to control playback of the content being played on the remote display by the second electronic device while maintaining the concurrent display of the remote control user interface element and the content user interface element, such as in FIGS. 10F-10G (e.g., if the input selects a control in the content user interface element, selection of the control causes a corresponding operation to occur without changing the placement and/or size, on the display, of the remote control user interface element and the content user interface element), the operation corresponding to the selected respective control of the second set of controls. In some embodiments, in response to receiving the input (1122), in accordance with a determination that the input corresponds to a selection of the content user interface element other than the one or more of the second set of controls (e.g., a tap or swipe in the content user interface element that does not coincide with one of the controls in the content user interface element), the electronic device displays (1126) an expanded content user interface element including the second set of controls and a third set of controls for navigating the content being played by the second electronic device, such as in FIGS. 10H-10I. For example, if the input coincides with an area of the content user interface element that does not include a control, the input causes display, on the display, of an expanded content user interface element that includes additional controls and/or information for navigating the content being played by the second electronic device. In some embodiments, displaying the expanded content user interface element is, optionally, triggered by swiping from the content user interface element away from an edge of the touch-sensitive display (e.g., toward a central region of the touch-sensitive display).

In some embodiments, the expanded content user interface element is customized (1128) to the content being played by the second electronic device, such as in FIG. 10I (e.g., includes information, such as album art corresponding to the content being played on the second electronic device, and/or controls that are specific to the content that is currently being played on the remote display by the second electronic device). For example, the expanded content user interface element optionally includes a forward skip button to skip to a next track if the content being played is a song in a playlist, and optionally includes a fast-forward button to fast-forward through the content if the content being played is a movie. In some embodiments, the expanded content user interface element includes (1130) information about the content being played by the second electronic device not displayed on the display prior to receiving the input, such as in FIG. 10I (e.g., the expanded content user interface element includes album art, content duration, content name, or other content metadata that was not included in the content user interface element, or anywhere else on the display, prior to receiving the input).

In some embodiments, the content user interface element includes (1132) a first set of information about the content being played by the second electronic device (e.g., the title of the content and the artist associated with the content), and the expanded content user interface element includes the first set of information and a second set of information about the content being played by the second electronic device, such as in FIG. 10I (e.g., the expanded content user interface element, in addition to the title of the content and the artist associated with the content, includes album artwork associated with the content and a progress bar indicating a current play position in the content), the second set of information including the information not displayed on the display prior to receiving the input. In some embodiments, the first set of information and the second set of information include (1134) one or more of a category of the content being played by the second electronic device, a title of the content being played by the second electronic device, an image of the content being played by the second electronic device, and an artist associated with the content being played by the second electronic device.

In some embodiments, displaying the expanded content user interface element includes ceasing display (1136) of the remote control user interface element on the display, such as in FIG. 10I (e.g., when the content user interface element is expanded, the remote control user interface element is optionally no longer displayed on the display). In some embodiments, the second set of controls and the third set of controls (e.g., the content navigation controls in the content user interface element and the expanded content user interface element) include (1138) one or more of a play/pause button, a reverse skip button, a forward skip button, a scrubber bar, a progress bar, a volume control for controlling a volume of the second electronic device, and a favorite button for designating the content being played by the second electronic device as a favorite content, such as in FIG. 10I.

In some embodiments, initiating the operation to navigate the user interface displayed by the second electronic device in accordance with the input received at the respective control (e.g., selection of a control in the remote control user interface element) comprises maintaining (1140) the display of the remote control user interface element and the content user interface element on the display, such as in FIGS. 10C-10D. For example, if the input selects a control in the remote control user interface element, selection of the control causes a corresponding operation to occur without changing the placement and/or size, on the display, of the remote control user interface element and the content user interface element.

In some embodiments, in response to receiving the input, in accordance with a determination that the input was received at the content user interface element and corresponds to a request to control a state of play of the content being played by the second electronic device (e.g., selection of a control, such as a play/pause button, in the content user interface element), the electronic device initiates (1142) an operation to control the state of play of the content being played by the second electronic device in accordance with the input received while maintaining the display of the remote control user interface element and the content user interface element on the display, such as in FIG. 10F. For example, if the input selects a control in the content user interface element, selection of the control causes a corresponding operation to occur without changing the placement and/or size, on the display, of the remote control user interface element and the content user interface element.

In some embodiments, the first set of controls (e.g., the controls in the remote control user interface element) includes (1144) one or more of a trackpad region (e.g., for detecting touch inputs, such as taps, swipes, clicks, etc., corresponding to the dedicated remote control trackpad region described with reference to FIG. 5B), a menu button, a home button, a virtual assistant button, a play/pause button, and volume control, such as in FIG. 10A (e.g., corresponding to the dedicated remote control buttons described with reference to FIG. 5B).

In some embodiments, in accordance with a determination that the second electronic device is configured to adjust a volume level of the content being played by the second electronic device (e.g., the second electronic device is connected to one or more speakers in such a way as to allow the second electronic device to control the volume level of those speakers that are playing audio from the content being played by the second electronic device), the first set of controls includes (1146) the volume control, such as in FIG. 10A, and in accordance with a determination that the second electronic device is not configured to adjust the volume level of the content being played by the second electronic device, the first set of controls does not include (1148) the volume control, such as in FIG. 10B. For example, the remote control user interface element only includes a volume control if the first electronic device, via the second electronic device, is able to control the volume level of the content being played by the second electronic device.

In some embodiments, at least one control of the first set of controls (e.g., the controls in the remote control user interface element) is included (1150) in the remote control user interface independent of a context of the second electronic device (e.g., independent of the type of content being played on the second electronic device, independent of the configuration of the second electronic device, etc.). For example, the remote control user interface element optionally always includes a menu button, regardless of any configuration of the second electronic device.

In some embodiments, displaying the content user interface element comprises (1152): in accordance with a determination that content is being played by the second electronic device, displaying (1154) the content user interface element on the display, the content user interface element including the graphical representation of the content being played by the second electronic device, such as in FIG. 10A, and in accordance with a determination that content is not being played by the second electronic device, forgoing displaying (1156) the content user interface element on the display (e.g., the content user interface element is only displayed on the display if content, such as a song or a movie, is being played on the second electronic device).

In some embodiments, the first electronic device is a portable electronic device, and the second electronic device is a set-top box connected to the remote display (1158). In some embodiments, the first electronic device comprises a mobile telephone, a media player, or a wearable device (1160) (e.g., a smart watch).

In some embodiments, while concurrently displaying, on the display, the remote control user interface element and the content user interface element, the electronic device displays (1162), on the display, a game controller launch user interface element, such as in FIG. 10J (e.g., a user interface element for displaying a game controller user interface element on the display). In some embodiments, the game controller launch user interface element is displayed when a game application is available to be played using the remote display (e.g., when a user interface for the game application is displayed on the remote display) and is not displayed when a game application is not available to be played using the remote display. The electronic device optionally receives (1164) a second input, via the one or more input devices, corresponding to a selection of the game controller launch user interface element (e.g., a tap on the game controller launch user interface element) and in response to receiving the second input, displays (1166), on the display, a game controller user interface element, such as in FIGS. 10K-10M (e.g., a user interface element including controls and/or information relating to playing a game on the second electronic device). For example, the game controller user interface element optionally includes a directional input control, such as a direction pad or trackpad, and/or one or more buttons for providing input to a game running on the second electronic device, such as in FIG. 10L.

In some embodiments, in accordance with a determination that a game is running on the second electronic device, the electronic device displays (1168) a game controller launch user interface element on the remote display and in accordance with a determination that a game is not running on the second electronic device, the electronic device forgoes displaying (1170) the game controller launch user interface element on the remote display (e.g., the game controller launch user interface element is optionally only displayed when a game is running on the second electronic device, and/or when a game that supports a game controller is running on the second electronic device).

In some embodiments, displaying the game controller user interface element comprises ceasing display (1172) of the remote control user interface element and/or the content user interface element on the display, such as in FIG. 10L. For example, when the game controller user interface element is displayed via selection of the game controller launch user interface element, the remote control user interface element and/or the content user interface element are optionally no longer displayed on the display. In some embodiments, the game controller user interface element includes (1174) a respective set of one or more controls for controlling a respective game running on the second electronic device, such as in FIG. 10L. For example, the game controller user interface element optionally includes a directional input control, such as a direction pad or trackpad, and/or one or more buttons for providing input to a game running on the second electronic device. In some embodiments, the respective set of controls includes (1180) one or more of a directional control and a button input.

In some embodiments, in accordance with a determination that the respective game running on the second electronic device is a first game, the respective set of controls (1176) is a first set of game controls, such as in FIG. 10L (e.g., a trackpad and two input buttons) and in accordance with a determination that the respective game running on the second electronic device is a second game, different from the first game, the respective set of controls (1178) is a second set of game controls, different from the first set of game controls, such as in FIG. 10M (e.g., a trackpad and three input buttons). Thus, in some embodiments, the controls in the game controller user interface element are customized based on the game that is running on the second electronic device.

In some embodiments, in response to receiving the second input corresponding to the selection of the game controller launch user interface element (e.g., a user interface element for displaying a game controller user interface element on the display), the electronic device concurrently displays (1182), on the display, the game controller user interface element (1184) (e.g., a user interface element including controls and/or information relating to playing a game on the second electronic device), and a second remote control user interface element (1186), different from the remote control user interface element, the second remote control user interface element including a second set of controls simulating the remote control for navigating the user interface displayed on the remote display controlled by the second electronic device, such as in FIG. 10L. For example, when the game controller user interface element is displayed on the display, a second remote control user interface element, which is different from the remote control user interface element that is displayed with the content user interface element, is displayed on the display. In some embodiments, this second remote control user interface element includes different controls and/or controls of different appearance than the remote control user interface element, such as in FIG. 10L.

In some embodiments, the second set of controls (1188), in the second remote control user interface element, simulating the remote control is a subset of the first set of controls, in the remote control user interface element, simulating the remote control, such as in FIG. 10L (e.g., the second remote control user interface element, which is displayed when the game controller user interface element is displayed, has fewer controls than does the remote control user interface element). In some embodiments, the first set of controls in the remote control user interface element is displayed in a first configuration on the display, and the second set of controls in the second remote control user interface element is displayed in a second configuration on the display, different from the first configuration (1190), such as in FIG. 10L (e.g., different spatial arrangement, size, appearance (e.g., specified by a currently playing application)).

In some embodiments, the remote control user interface element and the content user interface element are displayed (1192) on the display in a first orientation mode, such as in FIG. 10K (e.g., the remote control user interface element and the content user interface element are displayed with the display in a portrait mode), and the game controller user interface element is displayed (1194) on the display in a second orientation mode, different from the first orientation mode, such as in FIGS. 10L-10M (e.g., when displaying the game controller user interface element, the display switches to a landscape mode).

It should be understood that the particular order in which the operations in FIGS. 11A-11J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, 1500, 1700 and 1900) are also applicable in an analogous manner to method 1100 described above with respect to FIGS. 11A-11J. For example, the touch inputs, software remote control applications, simulated buttons, and/or simulated remote trackpads described above with reference to method 1100 optionally have one or more of the characteristics of the touch inputs, software remote control applications, simulated buttons, and/or simulated remote trackpads described herein with reference to other methods described herein (e.g., methods 700, 900, 1300, 1500, 1700 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 22) or application specific chips. Further, the operations described above with reference to FIGS. 11A-11J are, optionally, implemented by components depicted in FIGS. 1A-1B. For example, displaying operation 1102, receiving operation 1108 and initiating operation 1110 are, optionally, implemented by event sorter 170, event recognizer 180, and event handler 190. Event monitor 171 in event sorter 170 detects a contact on touch screen 112, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Text Entry Alert

Users interact with electronic devices in many different manners, including interacting with content (e.g., music, movies, etc.) that may be available (e.g., stored or otherwise accessible) on the electronic devices. In some circumstances, a user may interact with an electronic device by using a multifunction device to provide text input to the electronic device. The embodiments described below provide ways in which the need for text input to an electronic device is indicated on a multifunction device, thereby enhancing users' interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 12A:
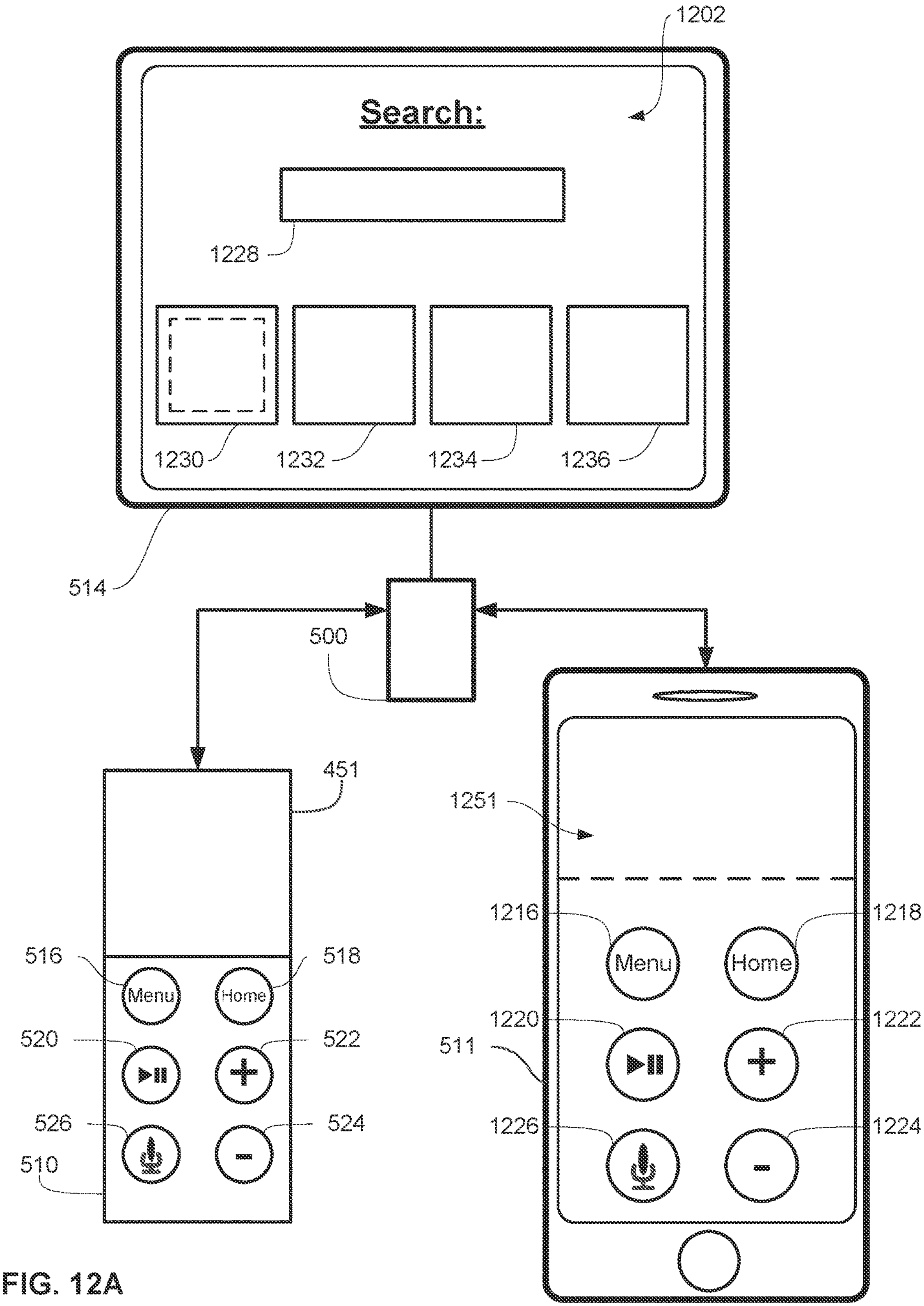
FIGS. 12A-12RR illustrate exemplary ways in which the need for text input to an electronic device is indicated on a multifunction device in accordance with some embodiments of the disclosure.
Figure 12B:
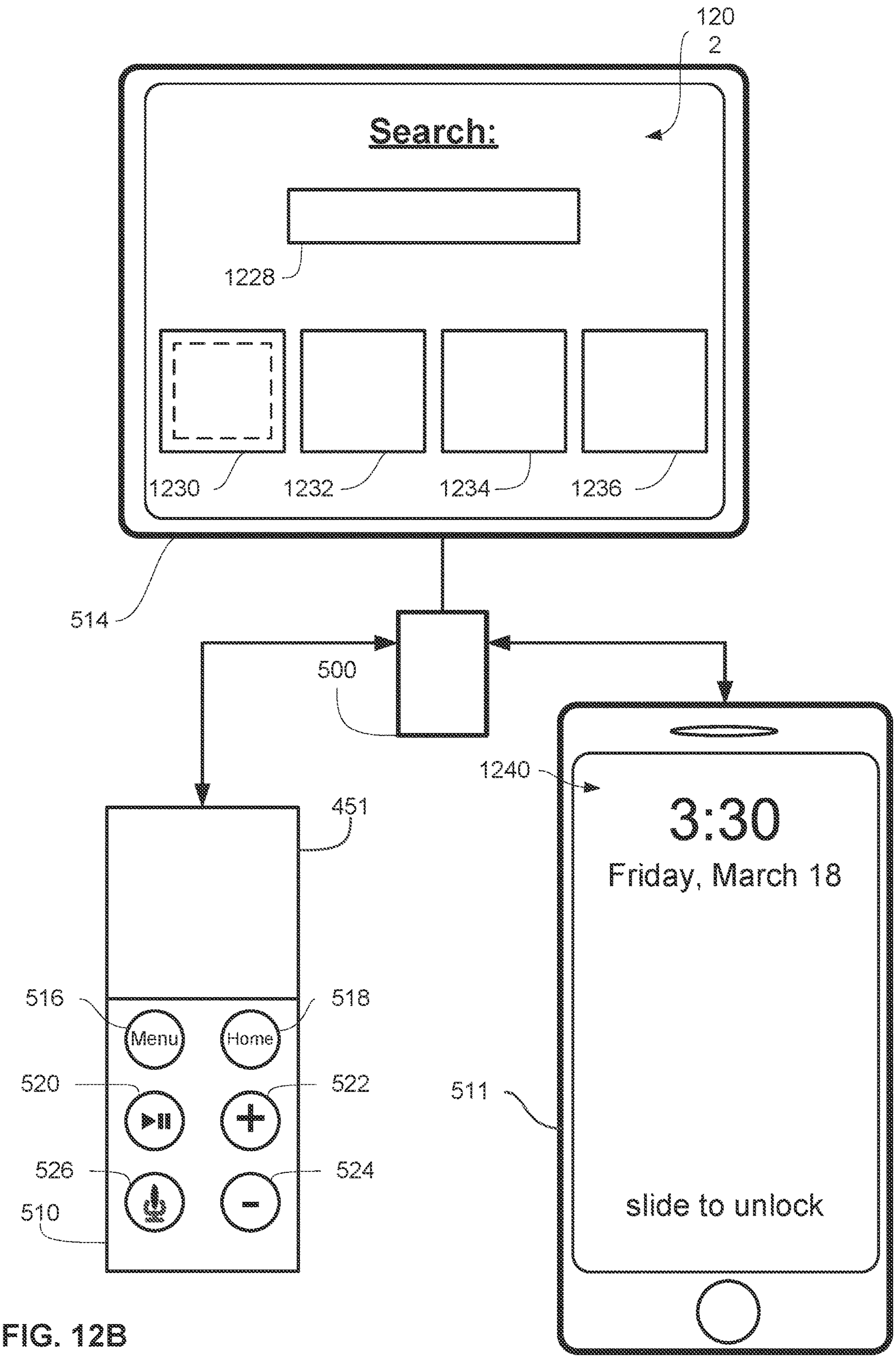
Figure 12C:
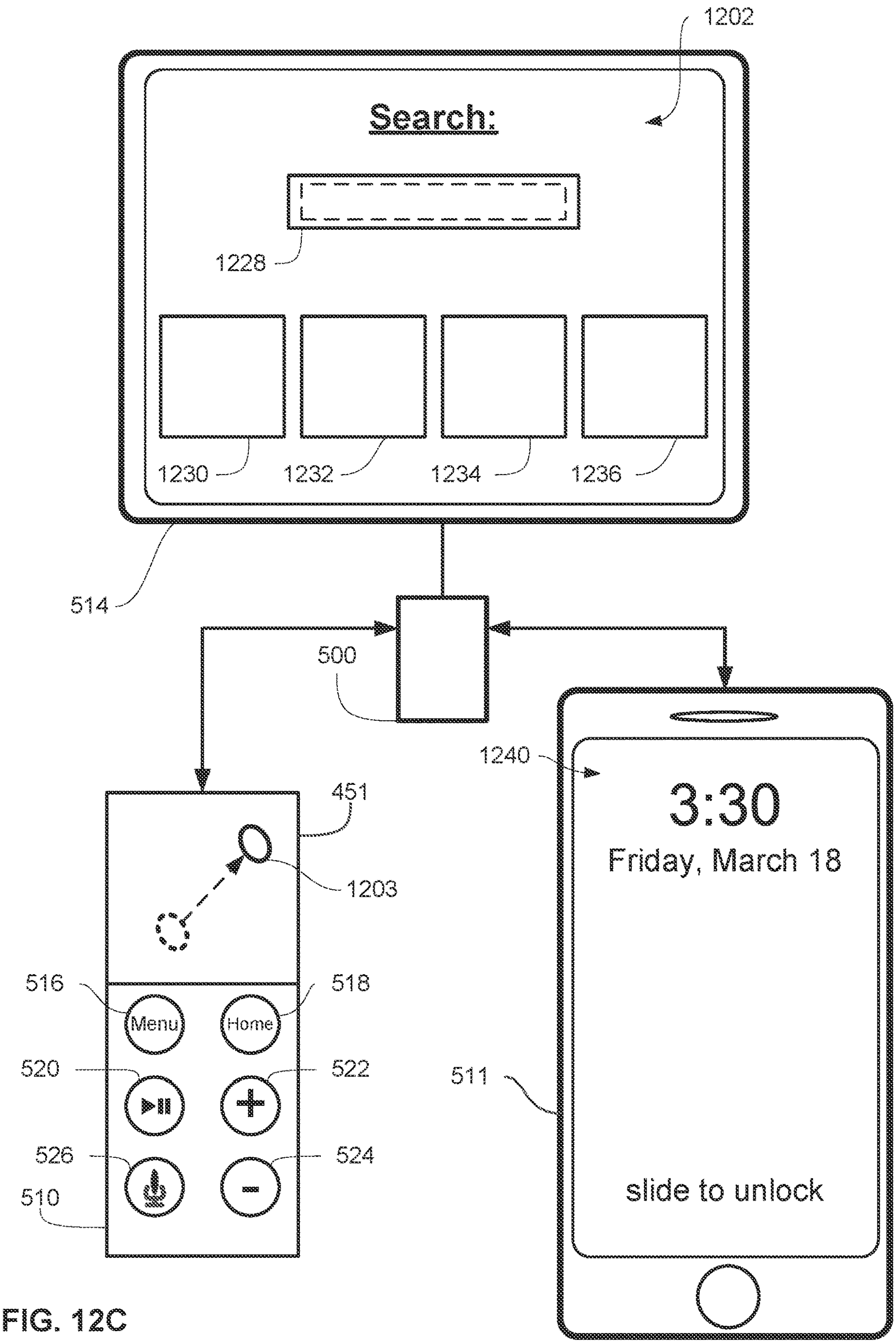
Figure 12D:
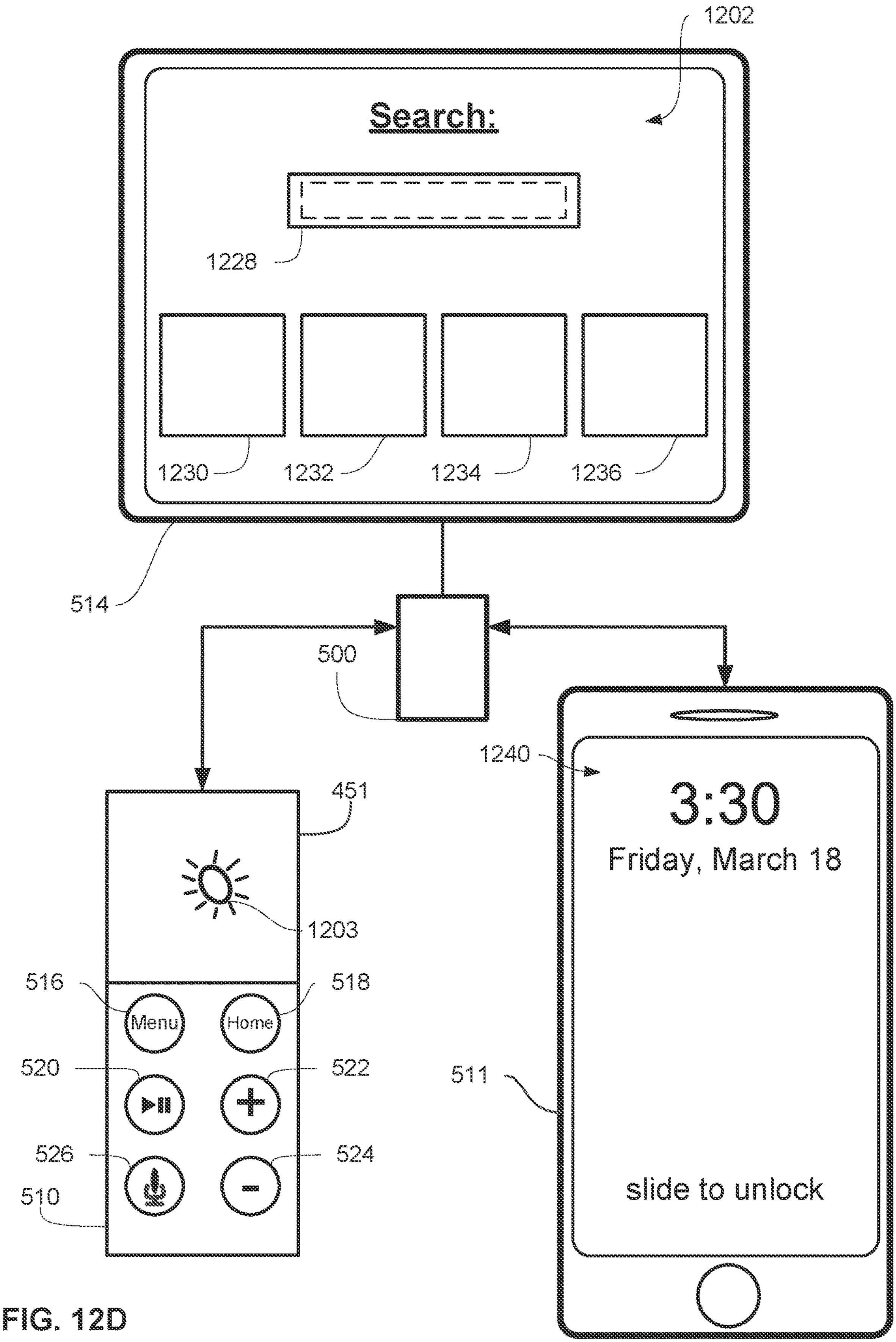
Figure 12E:
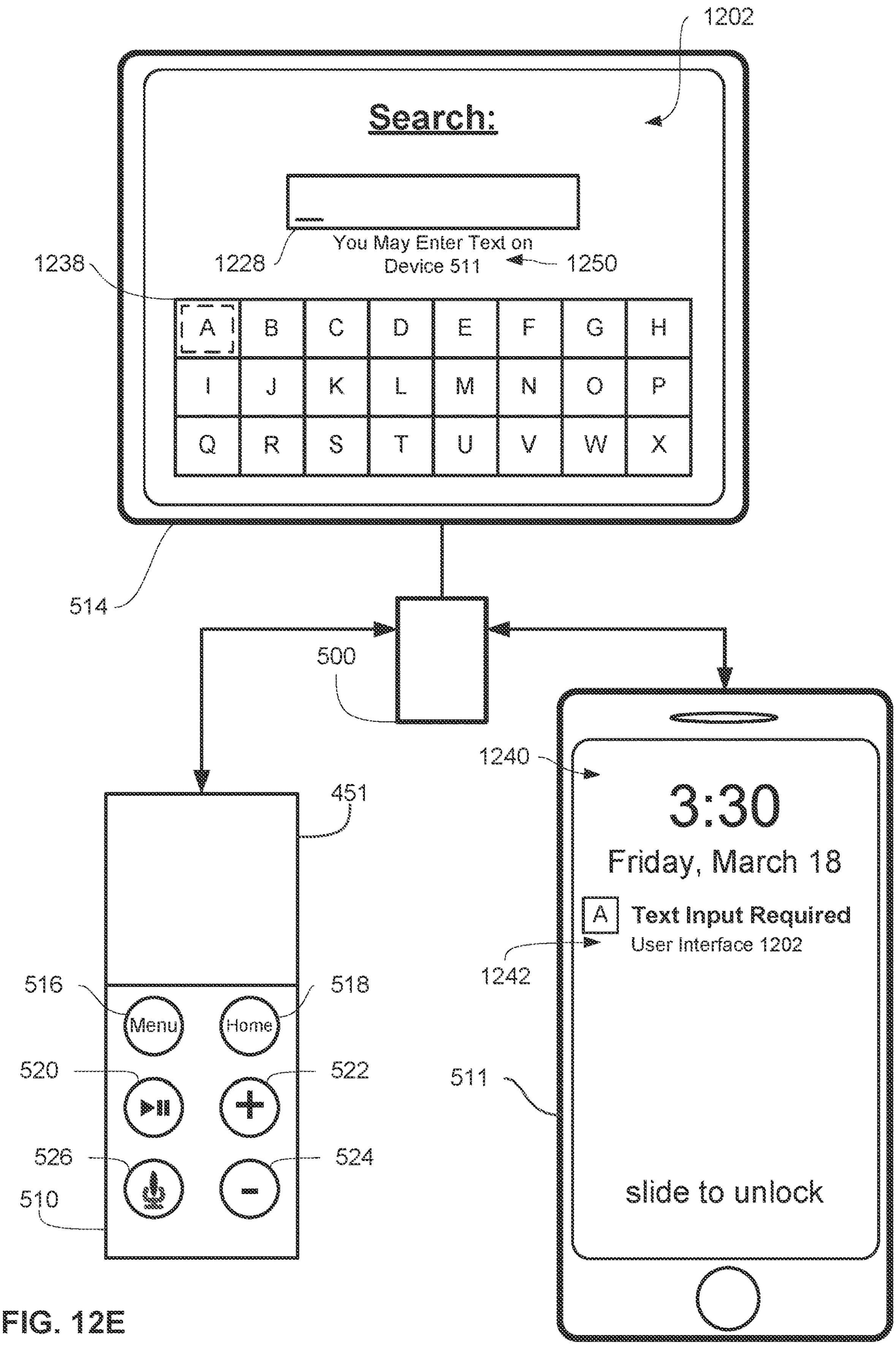
Figure 12F:
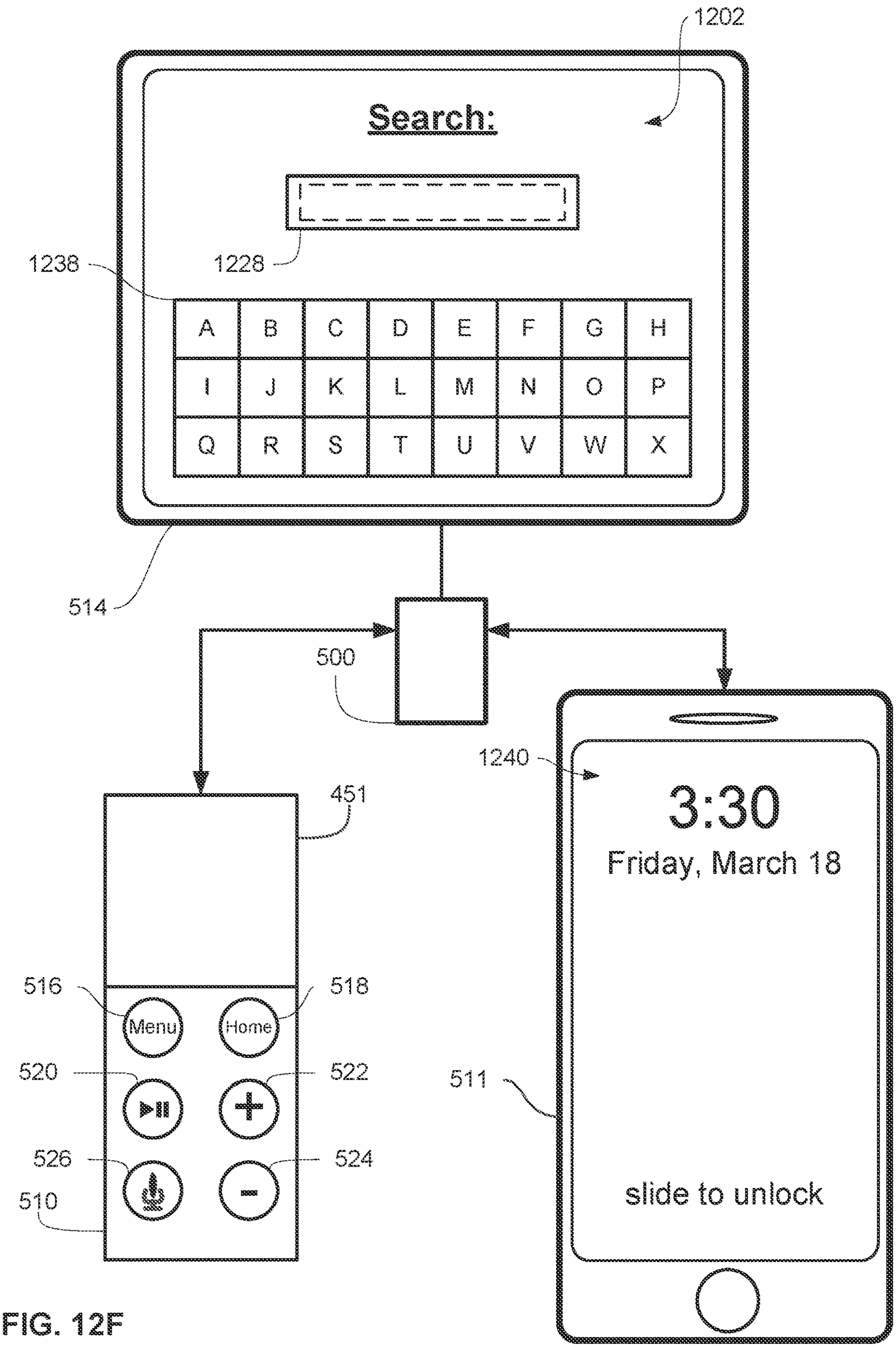
Figure 12G:
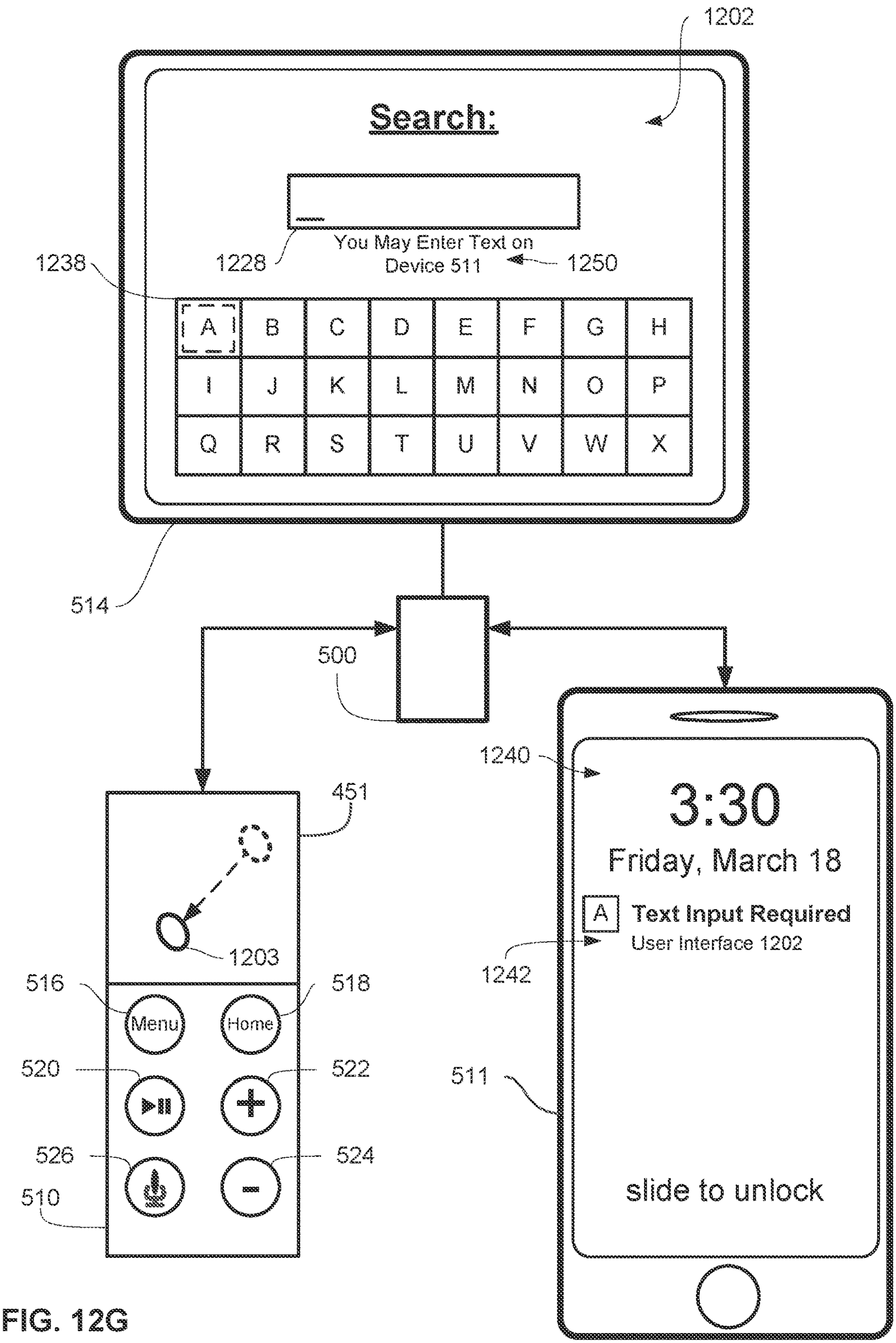
Figure 12H:
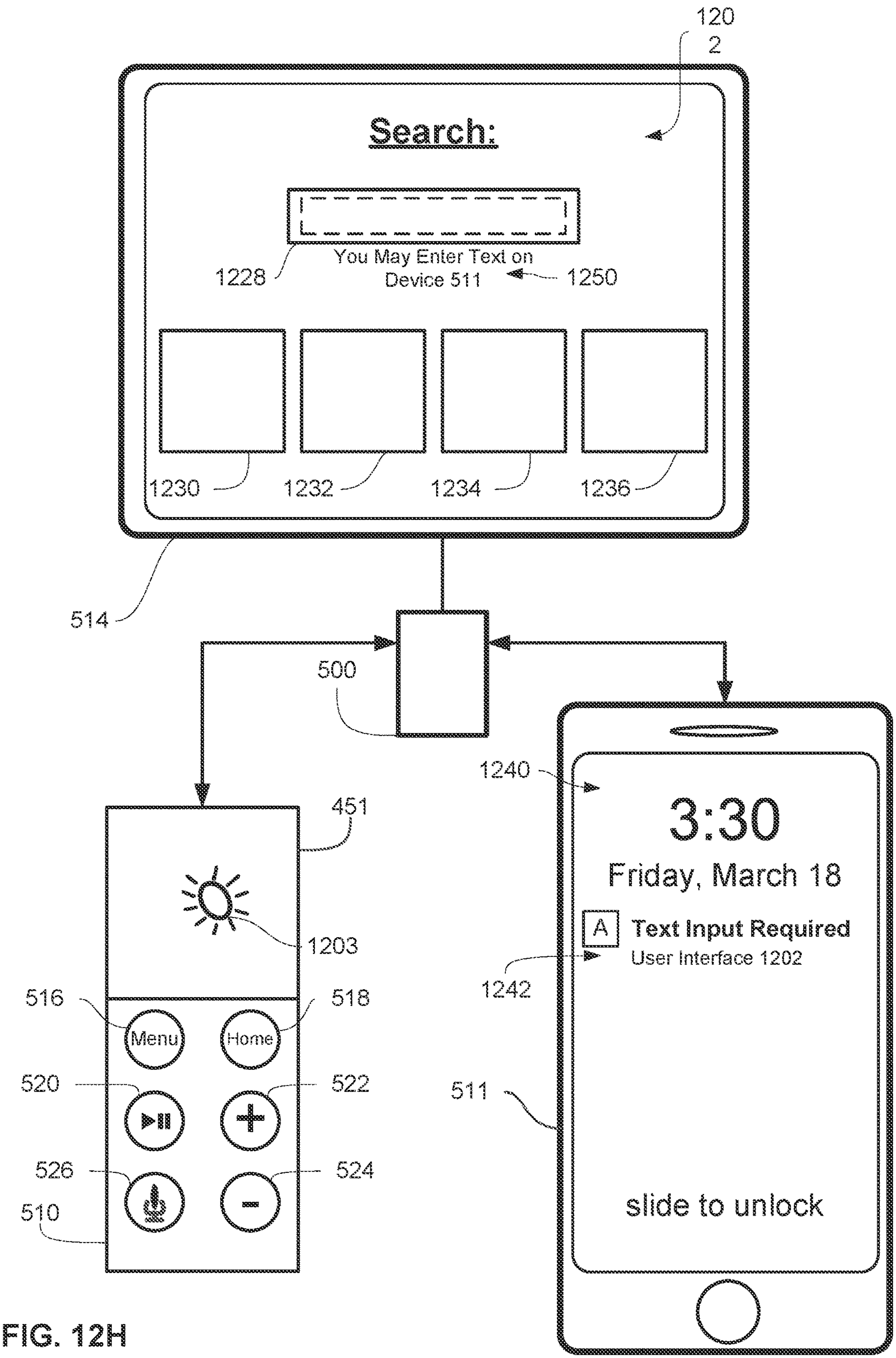
Figure 12I:
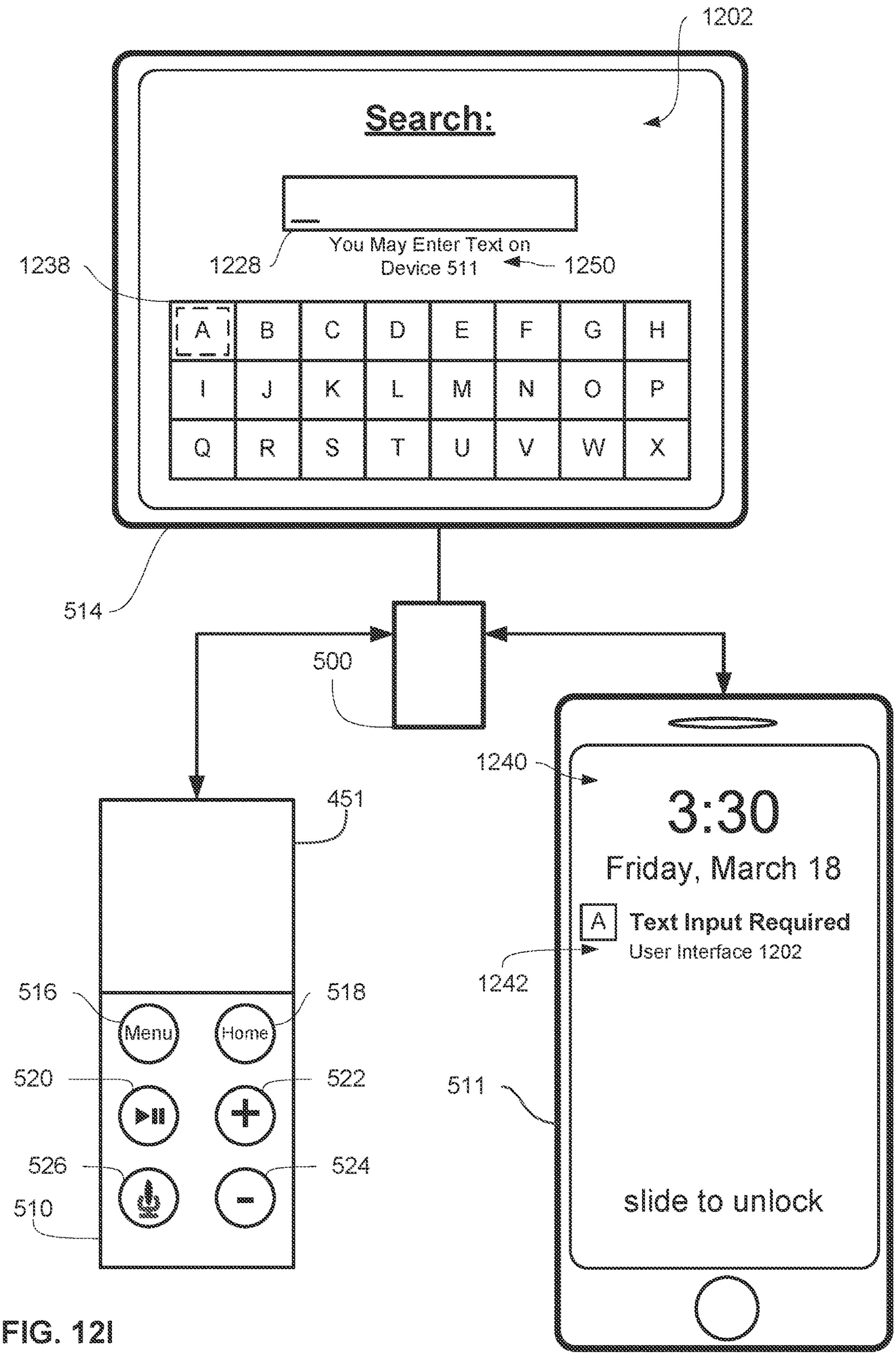
Figure 12J:
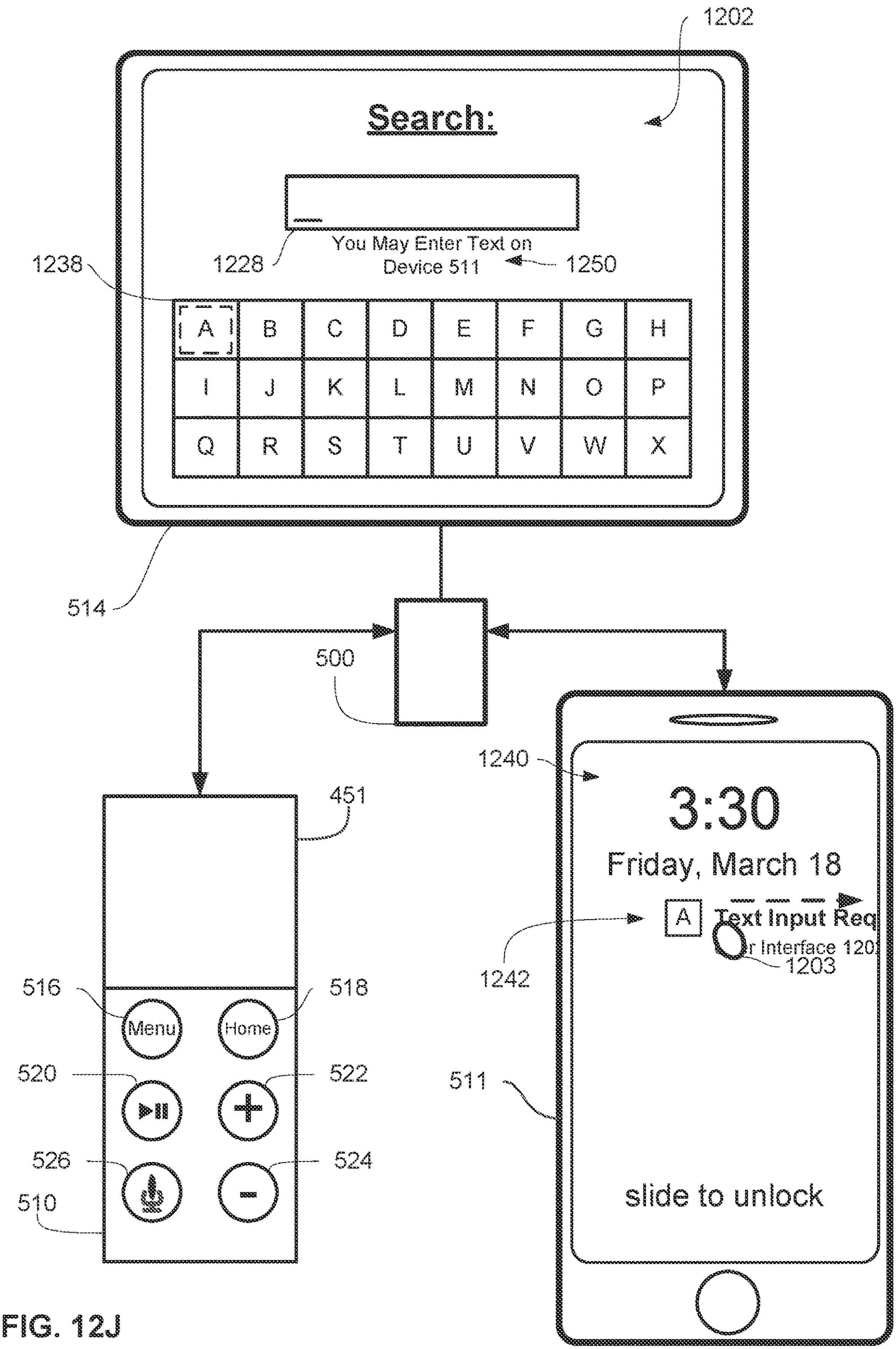
Figure 12K:
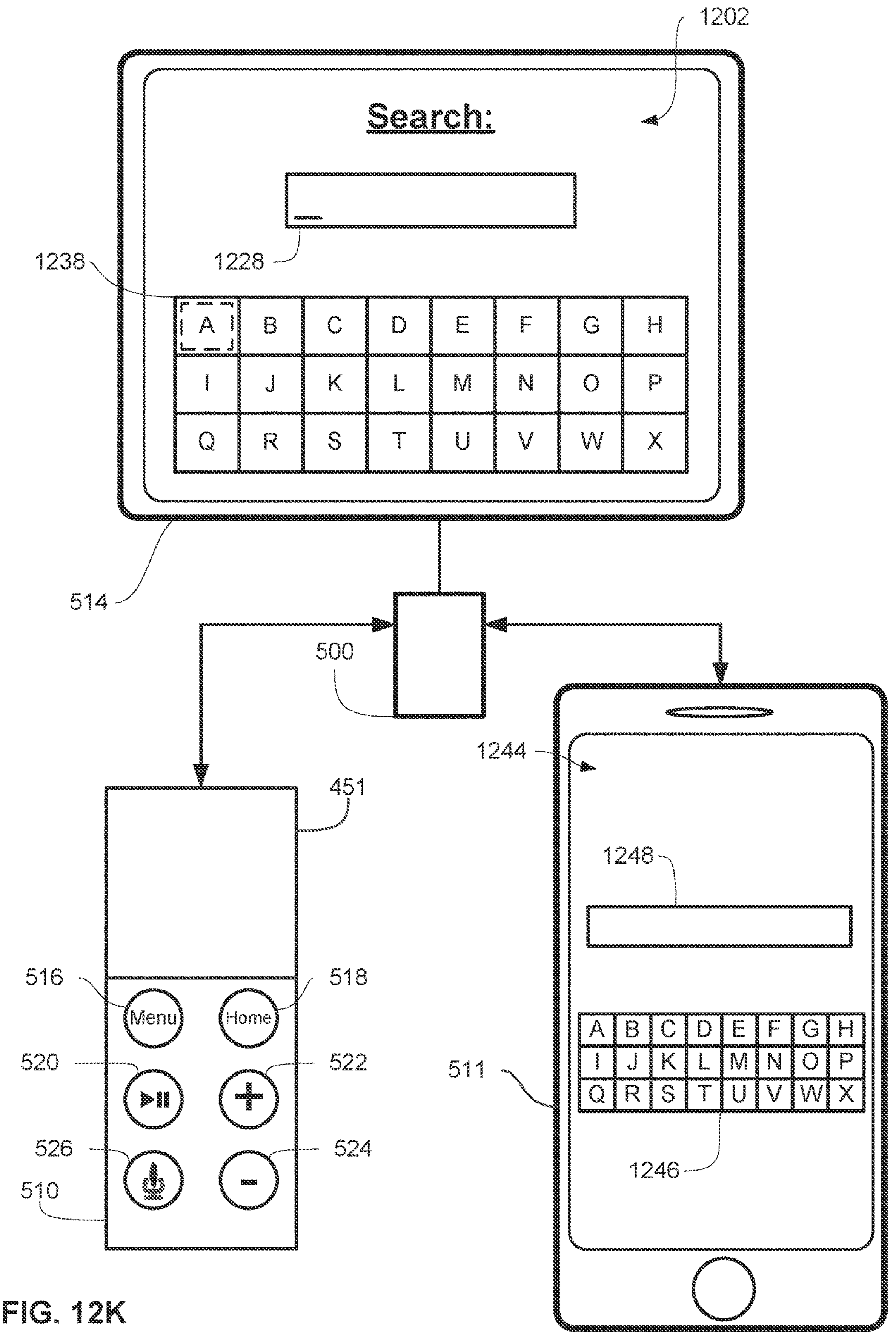
Figure 12L:
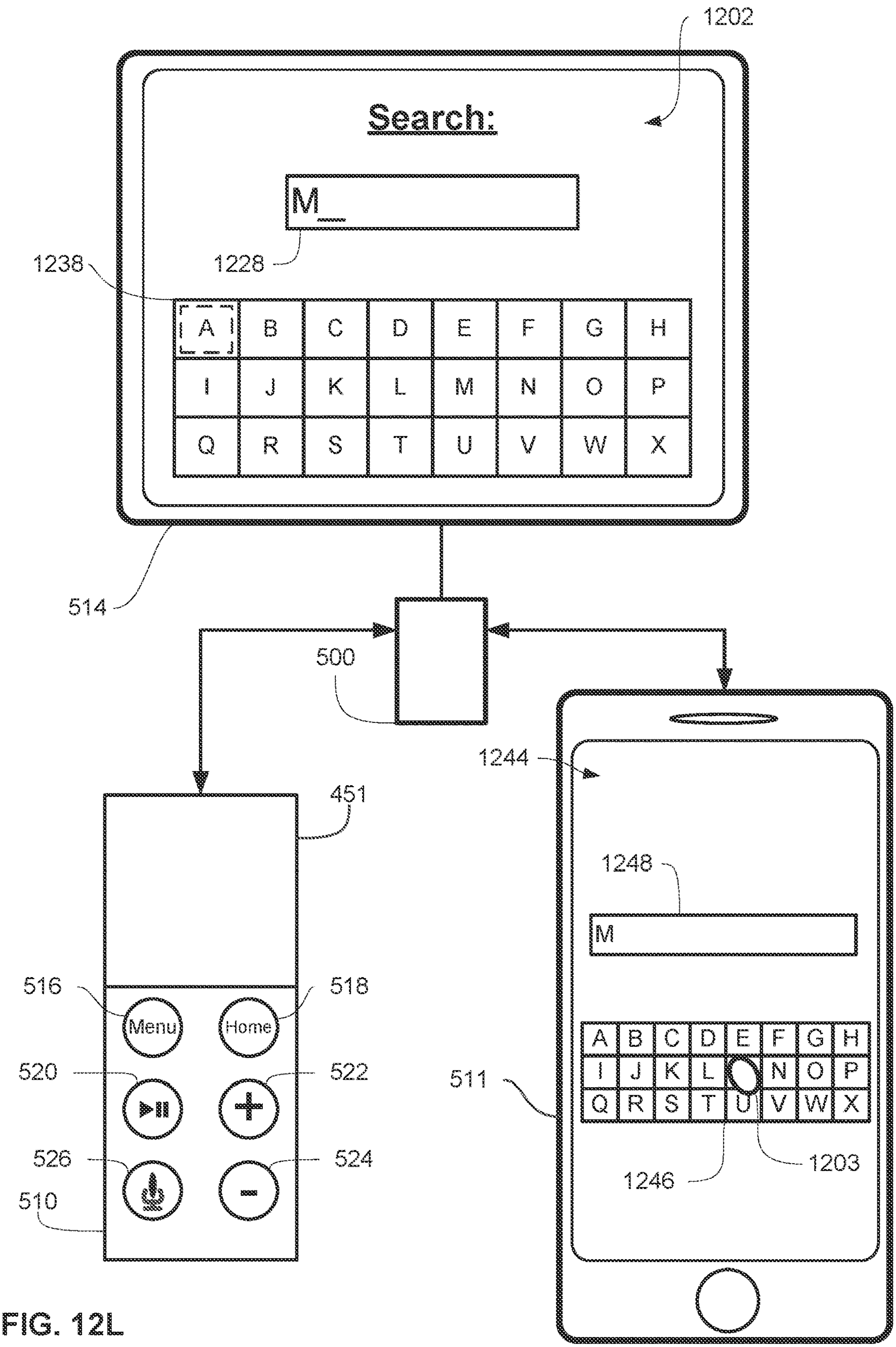
Figure 12M:
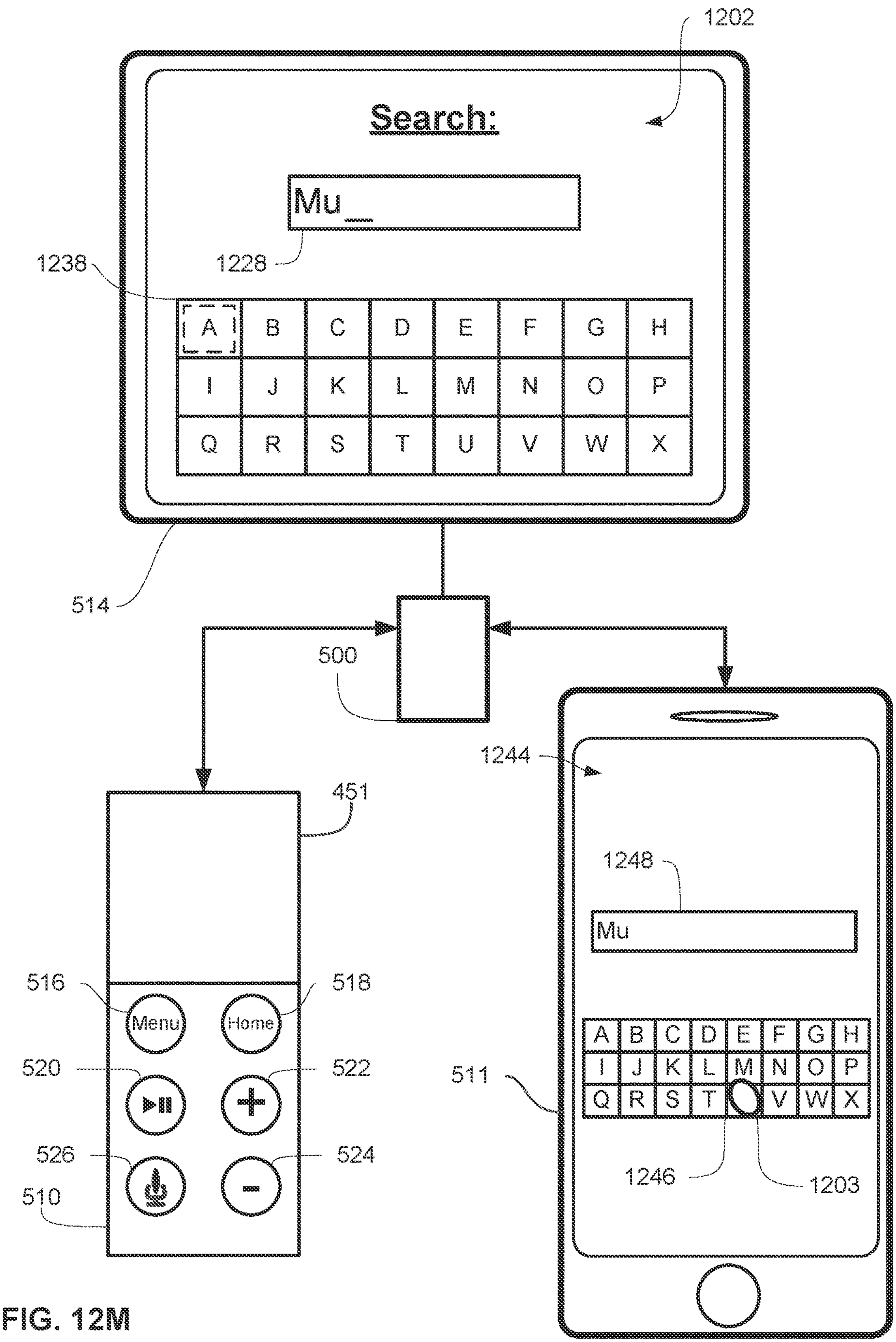
Figure 12N:
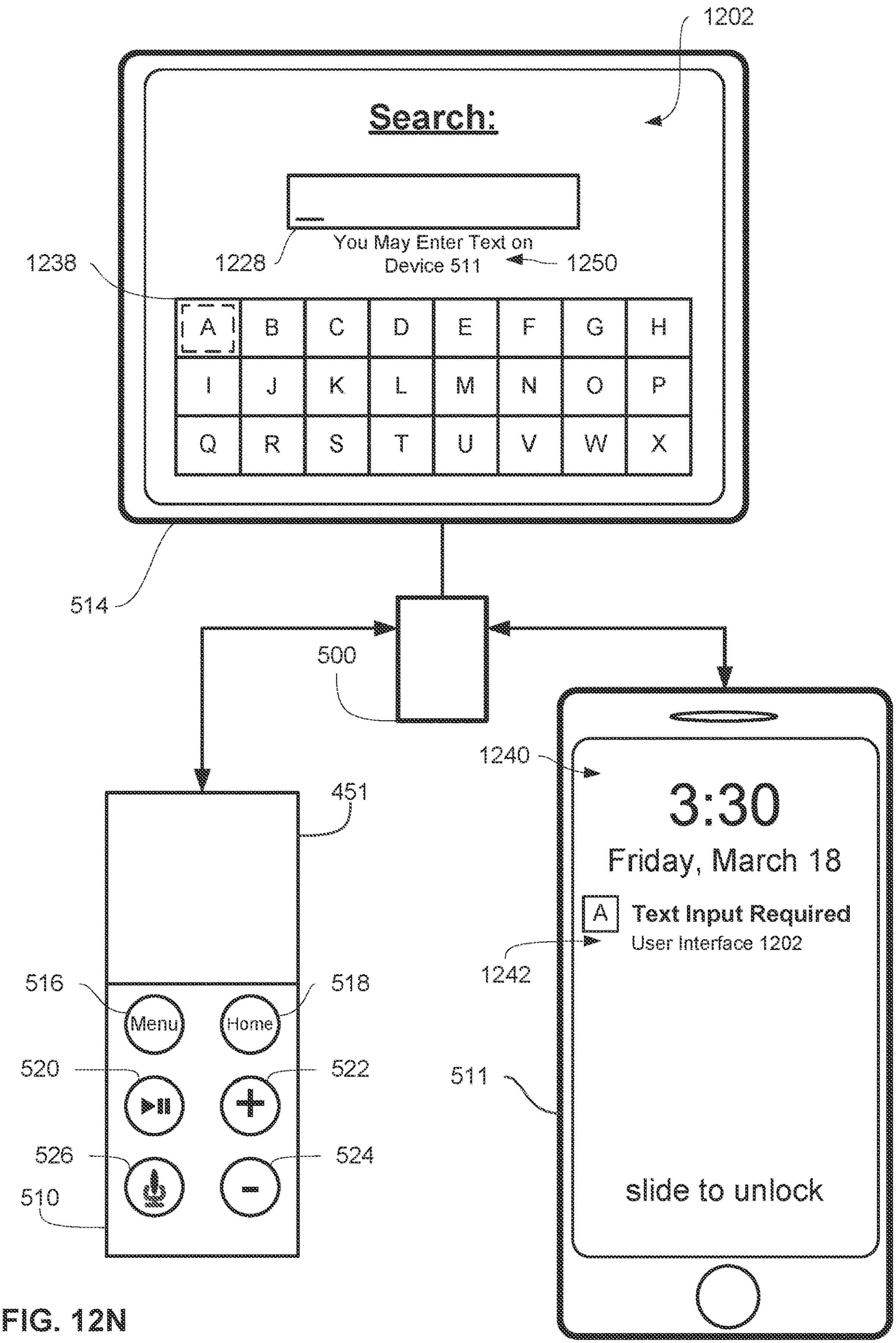
Figure 12O:
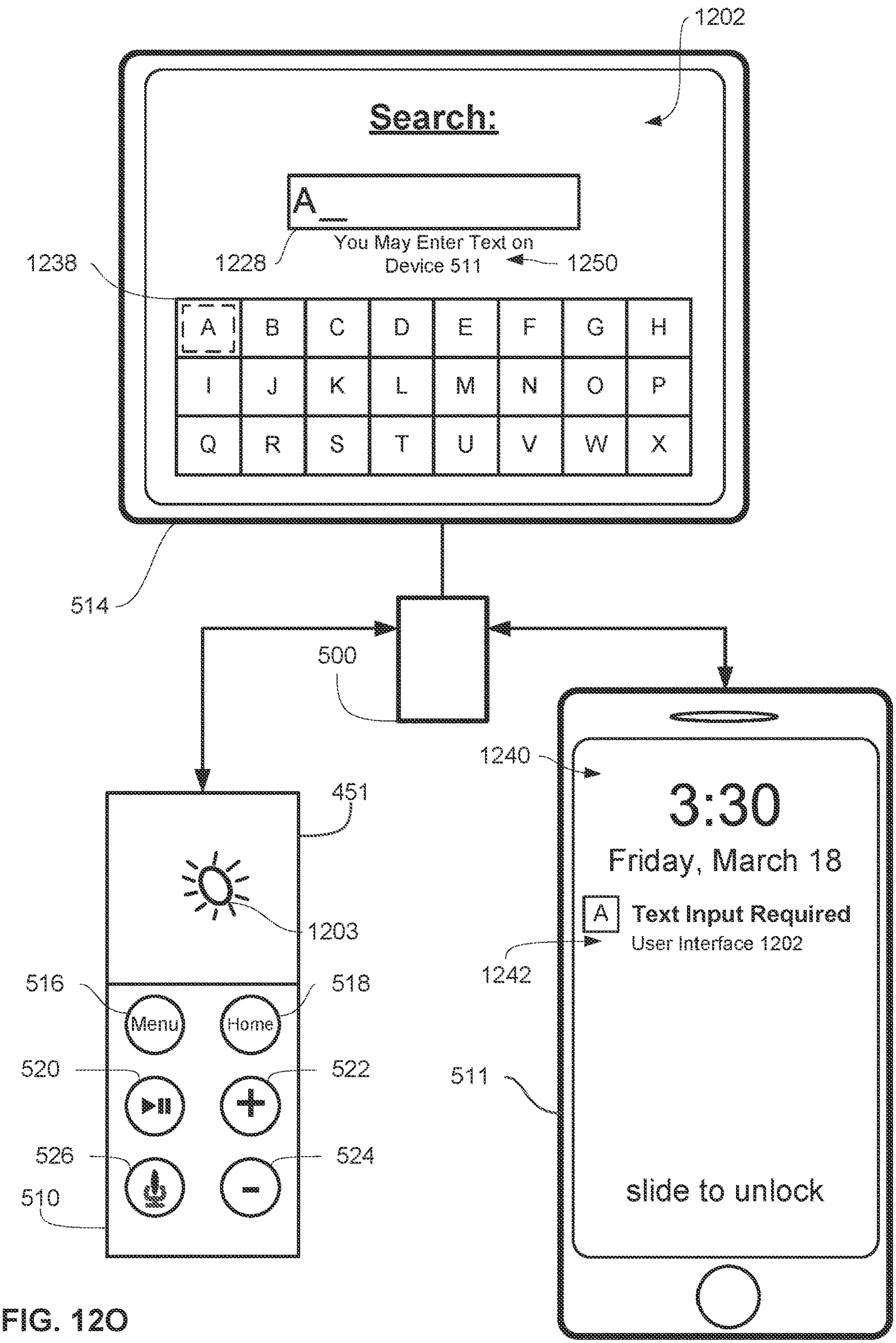
Figure 12P:
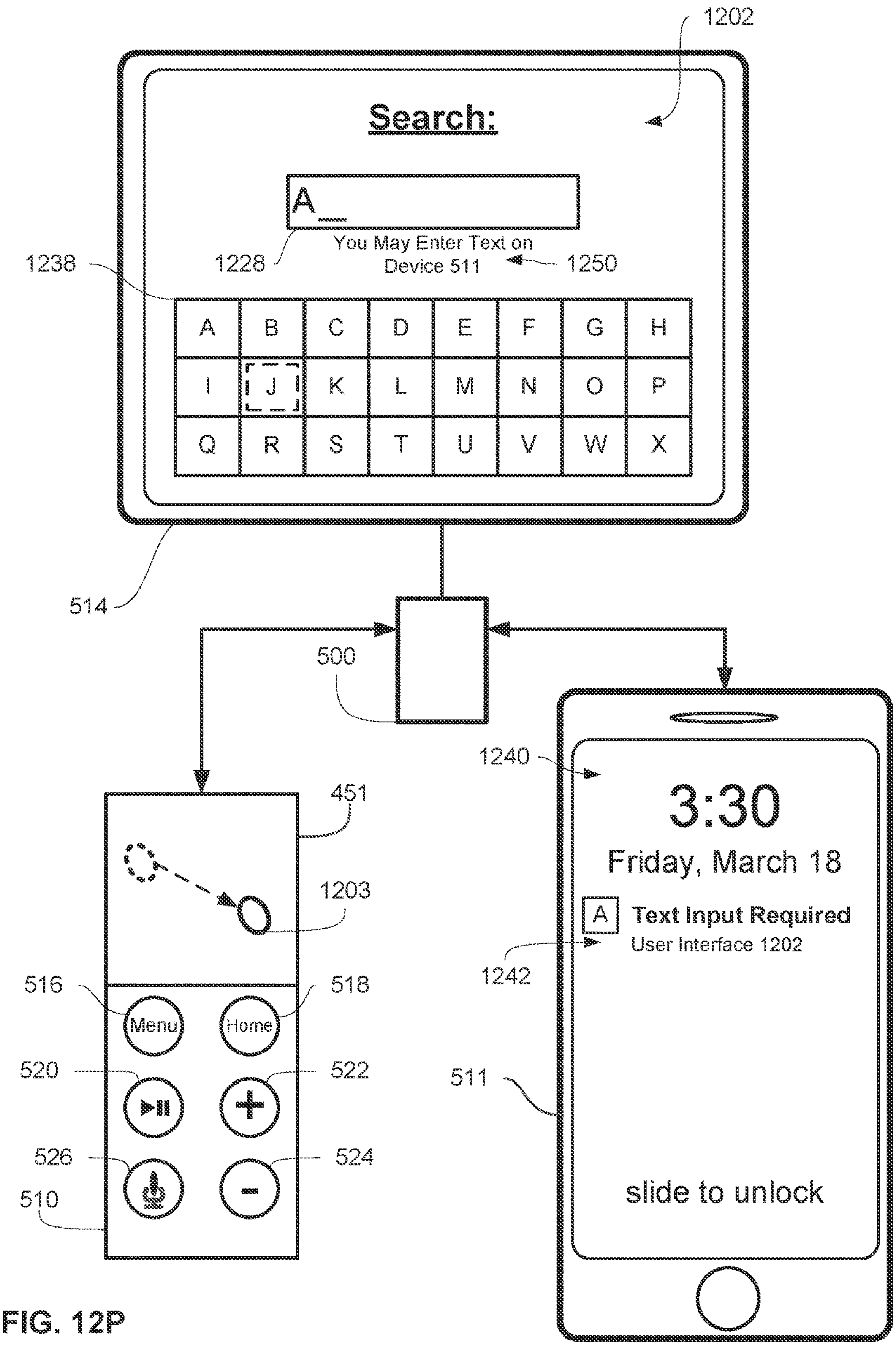
Figure 12Q:
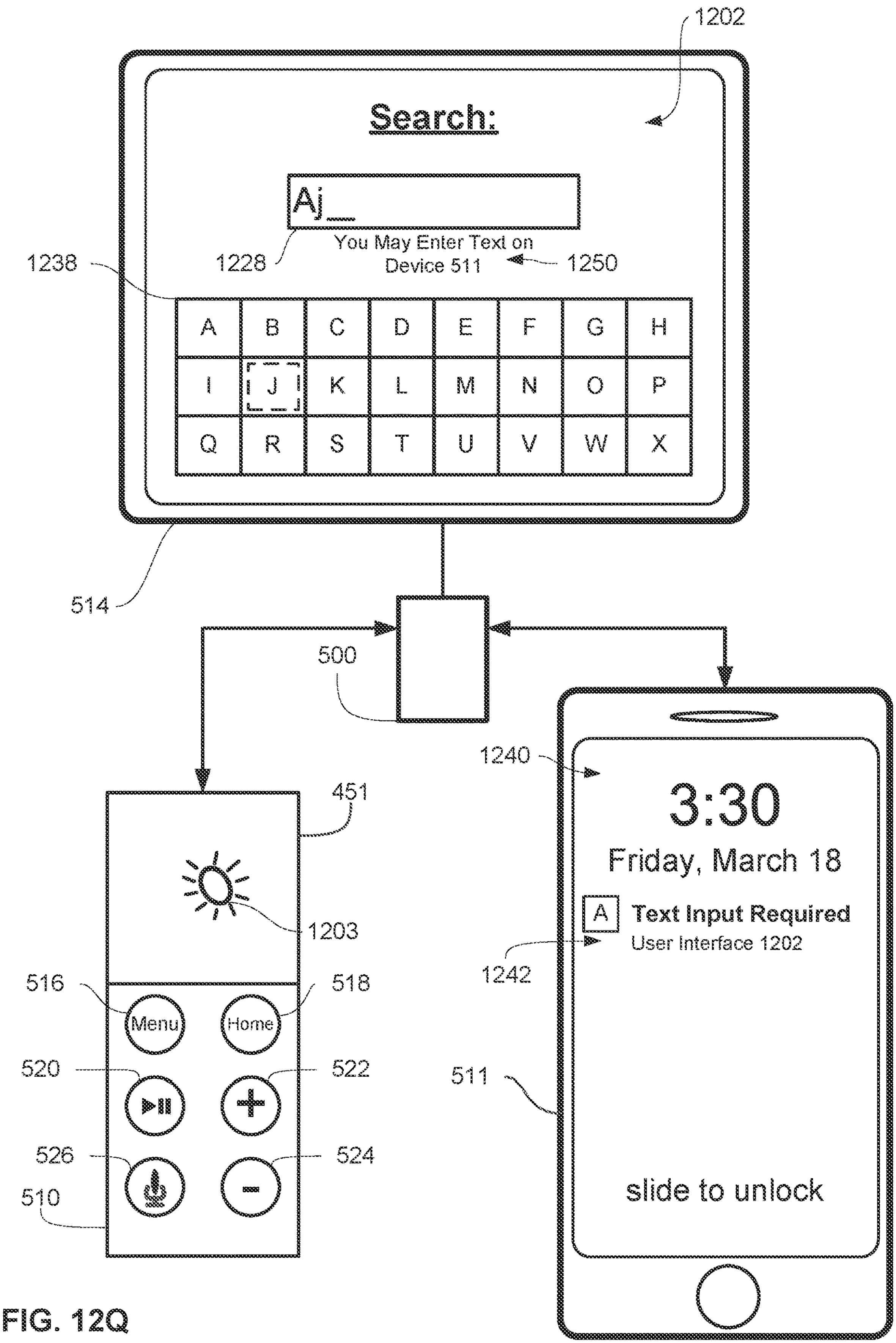
Figure 12R:
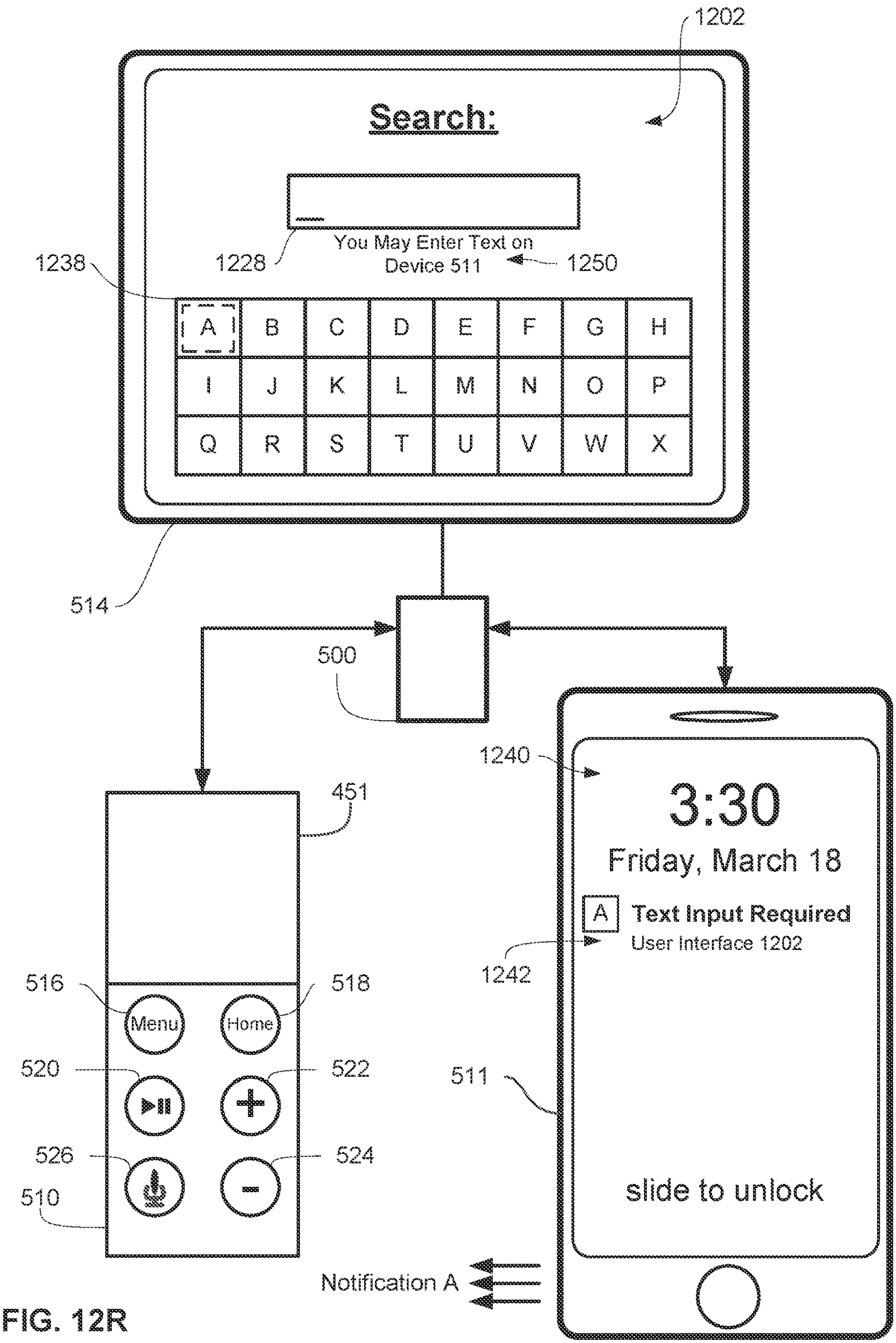

FIGS. 12A-12RR illustrate exemplary ways in which the need for text input to an electronic device is indicated on a multifunction device in accordance with some embodiments of the disclosure. The embodiments in these figures are used to illustrate the processes described below, including the processes described with reference to FIGS. 13A-13K.

FIG. 12A illustrates exemplary display 514. Display 514 optionally displays one or more user interfaces that include various content. In the example illustrated in FIG. 12A, display 514 displays a text entry user interface 1202 of a content search application running on an electronic device (e.g., electronic device 500 of FIG. 5A) of which display 514 is a part, or to which display 514 is connected. Text entry user interface 1202 is optionally a user interface for searching for content that is available for viewing on electronic device 500, though text entry user interface 1202 is optionally any user interface into which text may be entered. Text entry user interface 1202 optionally includes a text entry field 1228 and user interface objects 1230, 1232, 1234 and 1236, which are selectable to display respective corresponding content on display 514. Text entry user interface 1202 also has a current focus that indicates which object in text entry user interface 1202 is currently-selected—in FIG. 12A, user interface object 1230 has the current focus, as indicated by the dashed line box within user interface objects 1230.

As described with reference to FIGS. 5A-5B, electronic device 500 is optionally controlled using remote 510 and/or device 511. Specifically, remote 510 and device 511 are optionally in communication with electronic device 500, and provide input to electronic device 500. Remote 510 optionally has features described with reference to FIG. 5B for providing input to electronic device 500. For example, selection of one or more of buttons 516, 518, 520, 522, 524 and 526 optionally causes remote 510 to transmit corresponding commands to electronic device 500, to which electronic device 500 responds accordingly. Touch-sensitive surface 451 is optionally for providing tap, click, selection and/or movement inputs to electronic device 500, to which electronic device 500 responds accordingly. For example, touch inputs (e.g., a swipe) detected on touch-sensitive surface 451 optionally control the location of the current focus in user interface 1202.

Device 511 is optionally a multifunction device. In some embodiments, device 511 is a mobile telephone configured to run applications and perform multiple functions, such as telephone functions, messaging functions, etc., that are independent of controlling electronic device 500. In some embodiments, device 511 runs a remote control application that configures device 511 to operate as a remote control for electronic device 500. In FIG. 12A, device 511 is running such a remote control application, which causes device 511 to display a remote control user interface that includes various controls that simulate controls on a dedicated remote control (e.g., remote 510) for controlling electronic device 500. For example, the remote control user interface includes buttons 1216, 1218, 1220, 1222, 1224 and 1226 corresponding to the buttons described with reference to remote 510 in FIG. 5B. Selection of one or more of buttons 1216, 1218, 1220, 1222, 1224 and 1226 (e.g., via one or more taps detected on the buttons) optionally causes device 511 to transmit corresponding commands to electronic device 500, to which electronic device 500 responds accordingly. The remote control user interface also includes trackpad area 1251. Trackpad area 1251 optionally corresponds to touch-sensitive surface 451 on remote 510 in FIG. 5B, and is for providing tap, click, selection and/or movement inputs to electronic device 500, to which electronic device 500 responds accordingly. For example, touch inputs (e.g., a swipe) detected in trackpad area 1251 optionally control the location of the current focus in user interface 1202.

As mentioned above, device 511, in addition to running the remote control application, is configured to run other applications and perform multiple other functions, such as telephone functions, messaging functions, etc., that are independent of controlling electronic device 500. In such circumstances, device 511 optionally displays user interfaces that are not user interfaces of the remote control application. For example, in FIG. 12B, device 511 is in a locked state, and is, therefore, displaying lock screen 1240. In other words, lock screen 1240 is optionally a user interface of the operating system of device 511 (not of the remote control application), and is optionally displayed by device 511 when device 511 is in a locked state. In some embodiments, user input on lock screen 1240 is limited to selection of an alert displayed on lock screen 1240 (e.g., text input alerts, incoming email alerts, incoming call alerts, incoming text message alerts, etc.), or entry of authentication information for unlocking device 511. In some embodiments, the text input alerts of this disclosure are displayed on device 511 even when the device does not have the remote control application installed on the device.

Text input user interface 1202 is optionally a user interface into which text can be entered, as previously described. In some embodiments, when electronic device 500 determines that text input is needed for text input user interface 1202, electronic device 500 transmits an indication of such need to device 511, which device 511 receives, so that device 511 is aware of the need for text input for text input user interface 1202. Device 511, in turn, responds accordingly, as will be described below.

FIG. 12C illustrates an upward-rightward swipe of contact 1203 detected on touch-sensitive surface 451 of remote 510 while device 511 is displaying lock screen 1240. In response to the swipe of contact 1203, the current focus in text input user interface 1202 moves from user interface element 1230 to text entry field 1228 in accordance with the swipe. In FIG. 12D, a selection input is detected on touch-sensitive surface 451 of remote 510 (indicated by contact 1203) while text entry field 1228 has the current focus. In response to the selection input, as illustrated in FIG. 12E, electronic device 500 optionally enters a text entry mode, soft keyboard 1238 is displayed in text input user interface 1202, and the current focus moves to one of the keys in soft keyboard 1238 (e.g., the "A" key in FIG. 12E). Soft keyboard 1238 optionally includes one or more keys corresponding to text, selection of which using remote 510 and/or device 511 causes that respective text to be entered into text entry field 1228. For example, swipe inputs detected on touch-sensitive surface 451 optionally cause the current focus in text input user interface 1202 to move from key to key in soft keyboard 1238, and selection inputs detected on touch-sensitive surface 451 optionally cause text corresponding to the key with current focus to be entered into text entry field 1228.

Also in response to electronic device 500 entering the text entry mode and displaying soft keyboard 1238, electronic device 500 optionally transmits an indication to device 511, while device 511 is displaying a user interface that is not a user interface of the remote control application (e.g., lock screen 1240), that text input is needed for user interface 1202. In response to receiving that indication, device 511 displays text input alert 1242 on lock screen 1240, as shown in FIG. 12E. Text input alert 1242 optionally overlays/replaces part of lock screen 1240, and indicates to a user of device 511 that text input to user interface 1202 may be entered from device 511, as will be described in more detail below. Finally, electronic device 500 also optionally displays visual indication 1250 in text input user interface 1202 that text may be entered into text input user interface 1202 using device 511, so that a user looking at display 514 knows that such a method of text input is available to him.

In FIGS. 12D-12E, a selection input detected on touch-sensitive surface 451 while text entry field 1228 had the current focus caused electronic device 500 to transmit, to device 511, the indication of the need for text input for text input user interface 1202. In some embodiments, electronic device 500 does not transmit that indication until a user moves the current focus to soft keyboard 1238. For example, in FIG. 12F, soft keyboard 1238 is displayed in text input user interface 1202, and text entry field 1228 has the current focus (e.g., FIG. 12F optionally results from the selection input detected in FIG. 12D). Electronic device 500 has not yet transmitted the indication of the need for text input to device 511, and therefore, device 511 is not displaying a text input alert on lock screen 1240. In FIG. 12G, a downward-leftward swipe of contact 1203 is detected on touch-sensitive surface 451. In response to the swipe, the current focus moves from text entry field 1228 to the "A" key in soft keyboard 1238 in accordance with the swipe. As a result, electronic device 500 displays indication 1250 in text input user interface 1202 and transmits the indication of the need for text input to device 511, and device 511 displays text input alert 1242 on lock screen in response to receiving the indication, as shown in FIG. 12G.

In some embodiments, no soft keyboard is displayed in text input user interface 1202 while text input is prompted on device 511. For example, in FIG. 12H, text input user interface 1202 does not include a soft keyboard. A selection input is detected on touch-sensitive surface 451 of remote 510 (indicated by contact 1203) while text entry field 1228 has the current focus. In response, electronic device 500 transmits the indication of the need for text input to device 511, and device 511 displays text input alert 1242 on lock screen in response to receiving the indication. Even after the selection input is detected on touch-sensitive surface 451, electronic device 500 optionally does not display a soft keyboard in text input user interface 1202, and text is entered in text entry field 1228 using device 511, as will be described below.

A manner of interacting with text input alert 1242 and providing text input to text input user interface 1202 using device 511 will now be described with reference to FIGS. 12I-12M. In FIG. 12I, text input alert 1242 is displayed on lock screen 1240, as described with reference to FIG. 12E. In some embodiments, text input alert 1242 is selectable from lock screen 1240 via a rightward swipe of text input alert 1242. For example, in FIG. 12J, contact 1203 on text input alert 1242 is swiping text input alert 1242 to the right on lock screen 1240. In response to the rightward swipe of text input alert 1242, device 511 displays user interface 1244 as shown in FIG. 12K, which optionally includes soft keyboard 1246 and text field 1248. Text field 1248 optionally mirrors the contents of text entry field 1228 in text input user interface 1202. User interface 1244 is optionally a user interface of the operating system of device 511, and not of the remote control application described with reference to FIG. 12A. Input detected on user interface 1244 optionally causes device 511 to provide text input, for entry into text input user interface 1202, to electronic device 500. For example, in FIG. 12L, contact 1203 has been detected on the "M" key in soft keyboard 1246. In response to the detection of contact 1203 on the "M" key, device 511 transmits information corresponding to the "M" key to electronic device 500, which in response updates text entry field 1228 to include "M". Device 511 optionally updates text field 1248 to reflect that text entry field 1228 includes "M". In FIG. 12M, additional text input has been detected on soft keyboard 1246. Specifically, contact 1203 has been detected on the "U" key. In response, device 511 transmits information corresponding to the "U" key to electronic device 500, which in response updates text entry field 1228 to include "Mu". Device 511 optionally updates text field 1248 to reflect that text entry field 1228 includes "Mu". Additional text input is optionally inputted to text input user interface 1202 using device 511 in analogous ways.

In some embodiments, despite text input alert 1242 being displayed on device 511, text input can be provided to text input user interface 1202 using remote 510, as will be described with reference to FIGS. 12N-12Q. Specifically, in FIG. 12N, text input alert 1242 is displayed on lock screen 1240, as described with reference to FIG. 12E, and the "A" key in soft keyboard 1238 has the current focus. In FIG. 12O, while device 511 is displaying text input alert 1242, and while the "A" key in soft keyboard 1238 has the current focus, a selection input is detected on touch-sensitive surface 451, as indicated by contact 1203. In response, electronic device 500 enters "A" into text entry field 1228. In FIG. 12P, a downward-rightward swipe of contact 1203 is detected on touch-sensitive surface 451. In response to the swipe, the current focus moves from the "A" key to the "J" key in the soft keyboard 1238 in accordance with the swipe. In FIG. 12Q, a selection input is detected on touch-sensitive surface 451, as indicated by contact 1203, while the "J" key in the soft keyboard 1238 has the current focus. In response, electronic device 500 enters "j" into text entry field 1228. Thus, as shown above, even after text input alert 1242 is displayed on device 511, text may be entered into text input user interface 1202 using remote 510.

Figure 12S:
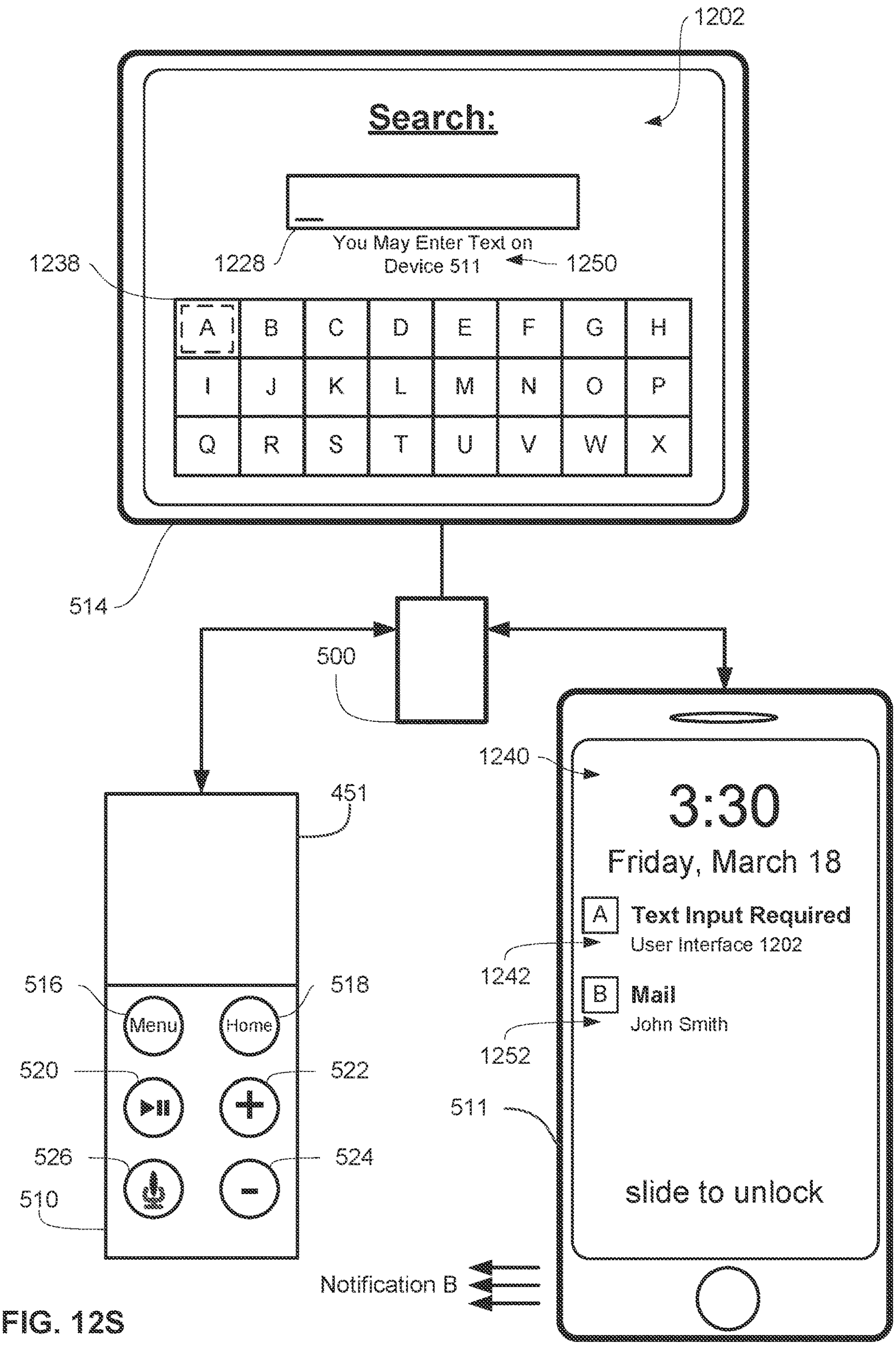

In some embodiments, device 511 provides some sort of notification (e.g., vibration notification, audible notification, visual notification, etc.) in response to displaying, and/or receiving indications corresponding to, alerts of various kinds. Further, device 511 optionally generates a different type of notification when it displays a text input alert than it does when it displays other types of alert (e.g., e-mail alerts, text message alerts, voicemail alerts, etc.). For example, in FIG. 12R, device 511 has received an indication of the need for text input in text input user interface 1202. In response, device 511 displays text input alert 1242 on lock screen 1240, and also generates a first type of notification (e.g., Notification A) that corresponds to text input alert 1242. In other words, device 511 is optionally configured to generate one type of notification (e.g., vibration only, or visual only) when it displays text input alerts such as text input alert 1242. In FIG. 12S, while displaying text input alert 1242, device 511 has determined that John Smith has sent device 511 (or the user associated with device 511) a new email message. In response, device 511 displays email alert 1252 in addition to displaying text input alert 1242 on lock screen 1240. When device 511 displays email alert 1252, device 511 generates a second type of notification (e.g., Notification B) that corresponds to email alert 1252. In other words, device 511 is optionally configured to generate a different type of notification (e.g., vibration and visual, or vibration and sound) when it displays alerts other than text input alerts (e.g., email alerts, text message alerts, voicemail alerts, etc.), such as email alert 1252. In this way, a user of device 511 is able to discern, without looking at device 511, whether a given alert is a text input alert or a different kind of alert.

Figure 12T:
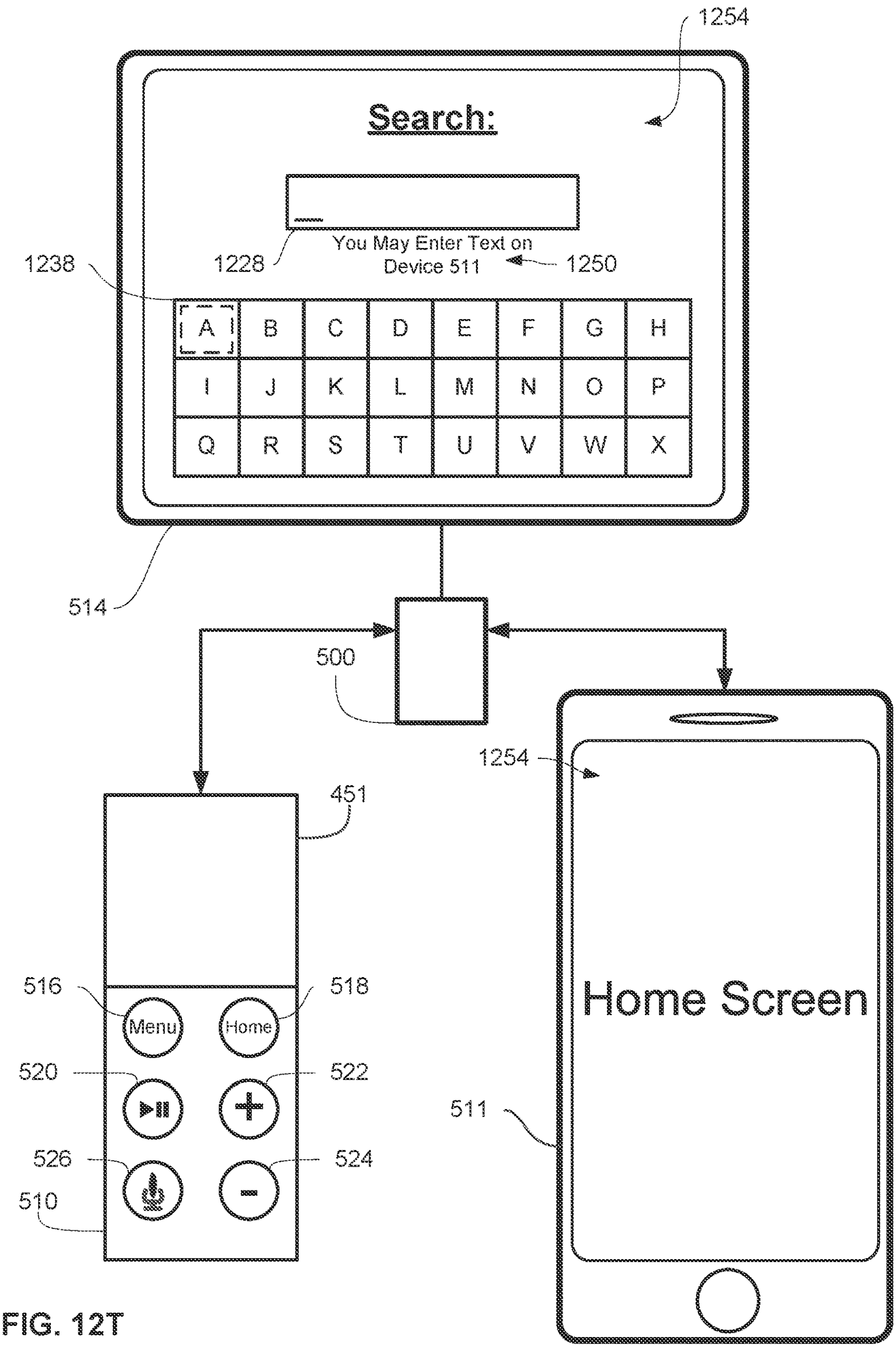
Figure 12U:
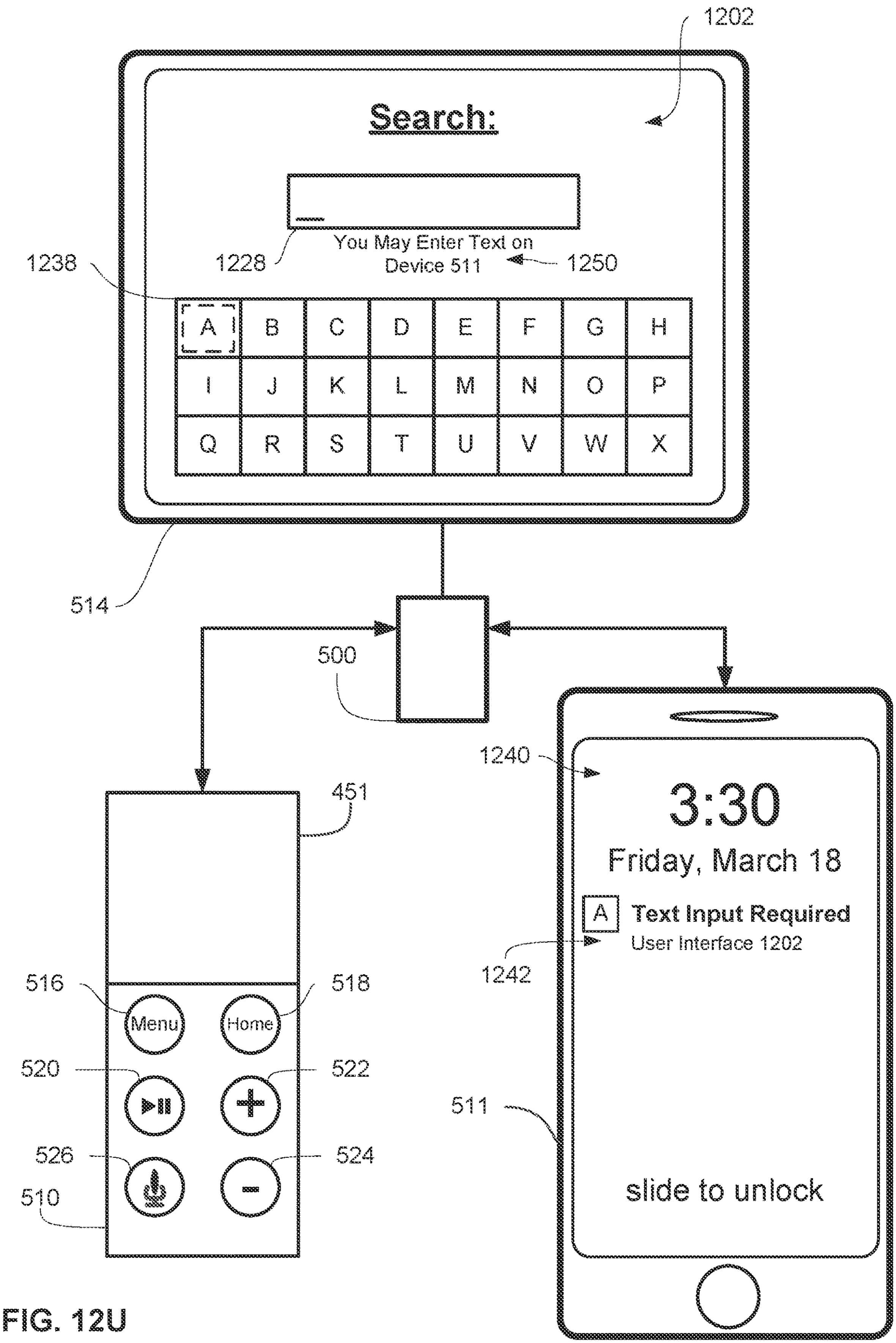
Figure 12V:
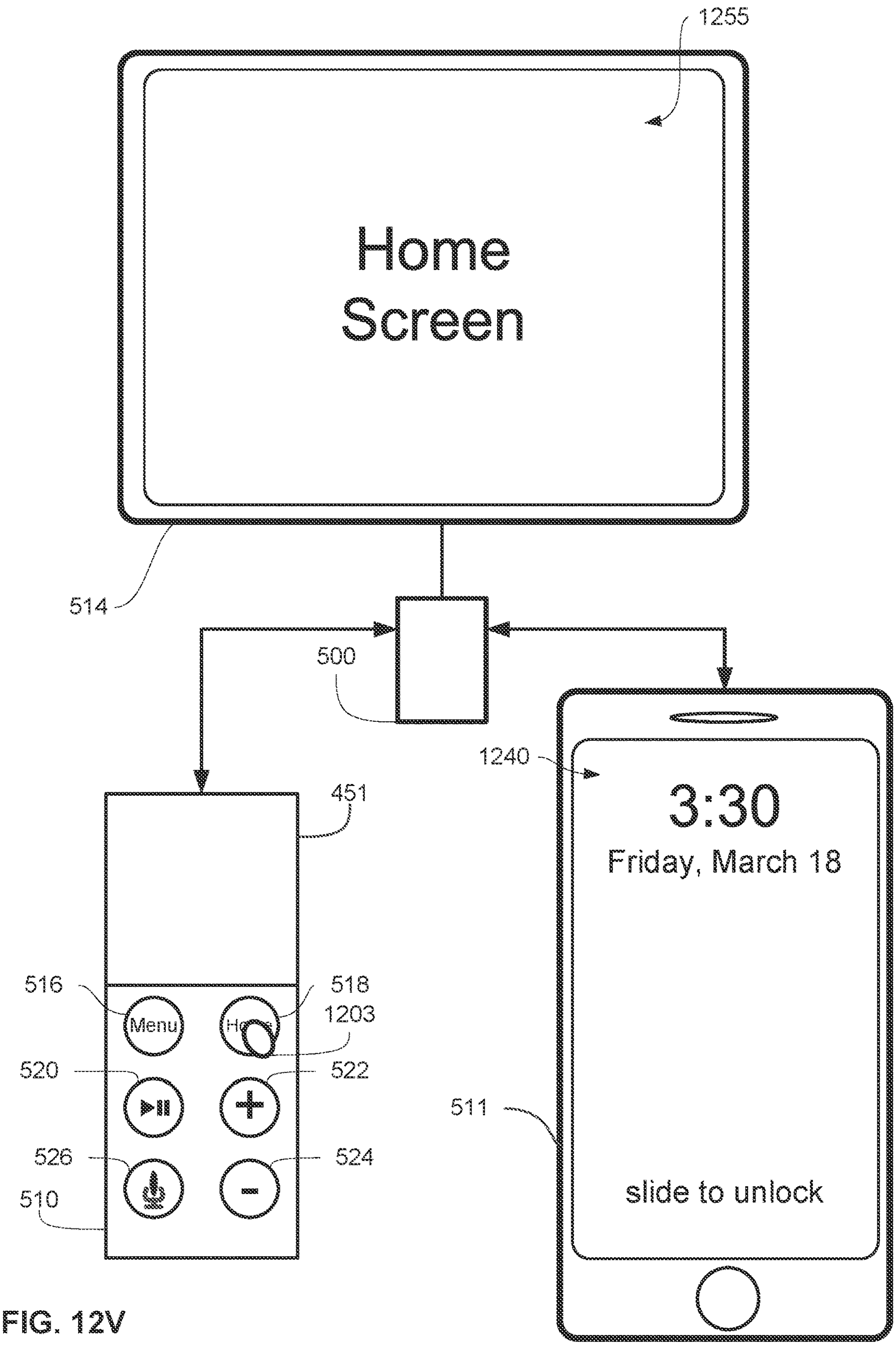

In some embodiments, in addition to generating different notifications for text input alerts and other alerts, device 511 treats text input alerts differently from other alerts in other ways. Specifically, text input alerts are optionally more "persistent" than other types of alerts, as will be described with reference to FIGS. 12S-12V. As previously described, in FIG. 12S, device 511 is concurrently displaying text input alert 1242 and email alert 1252 on lock screen 1240. Email alert 1252, along with other alerts outside of text input alerts, is optionally no longer displayed by device 511 when lock screen 1240 is dismissed and redisplayed. However, text input alert 1242, as long as text input for text entry user interface 1202 is needed, optionally remains displayed by device 511 even when lock screen 1240 is dismissed and redisplayed. For example, in FIG. 12T, lock screen 1240 has been dismissed, and home screen 1254 is being displayed on device 511. Home screen 1254 is optionally a user interface of the operating system of device 511 that displays a plurality of selectable icons for running various applications or accessing various functionalities on device 511. In some embodiments, lock screen 1240 is dismissed and home screen 1254 is displayed when a user unlocks device 511 from lock screen 1240 (e.g., by entering authentication information into device 511). In FIG. 12U, lock screen 1240 has been redisplayed on device 511 (e.g., as a result of a user locking device 511). Email alert 1252 is no longer displayed on lock screen 1240 (e.g., despite the fact that the new email message corresponding to email alert 1252 has not yet been read). However, text input alert 1242 is optionally still displayed on lock screen 1240, because text input for text entry user interface 1202 is optionally still needed. Thus, text input alert 1242 is optionally more "persistent" than other types of alerts on lock screen 1240.

Text input alert 1242 is optionally dismissed from lock screen 1240 when text input is no longer needed for text entry user interface 1202. For example, in FIG. 12V, selection of "Home" button 518 on remote 510 has been detected, as indicated by contact 1203. In response, electronic device 500 has stopped displaying text input user interface 1202, and has started displaying home screen 1255 on display 514. Home screen 1255 is optionally a user interface of device 500 that displays a plurality of selectable icons for running various applications or accessing various functionalities on device 500. Because text input user interface 1202 has been dismissed, text input is optionally no longer needed for text input user interface 1202, and as a result, device 511 stops displaying text input alert 1242 on lock screen 1240.

Figure 12W:
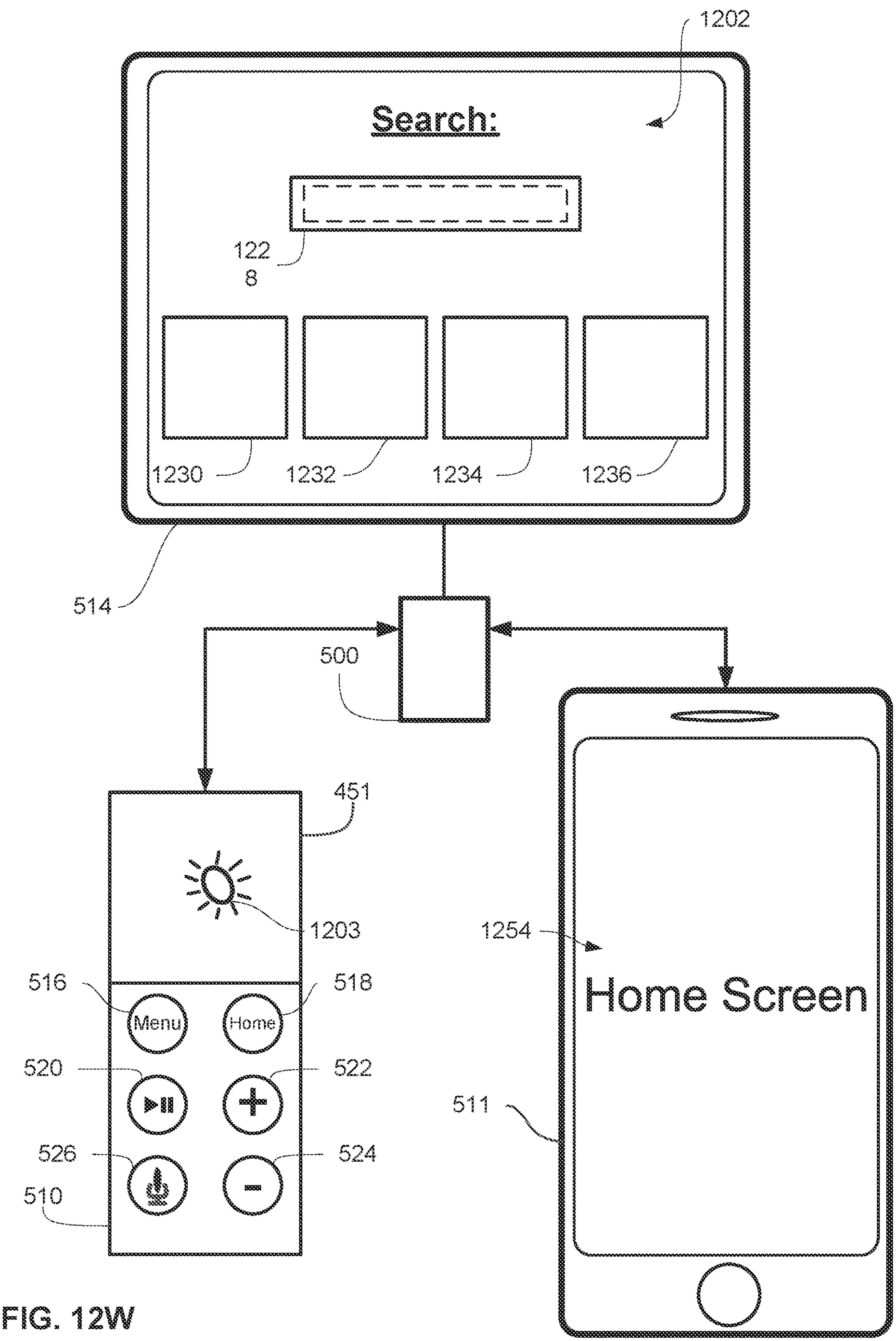
Figure 12X:
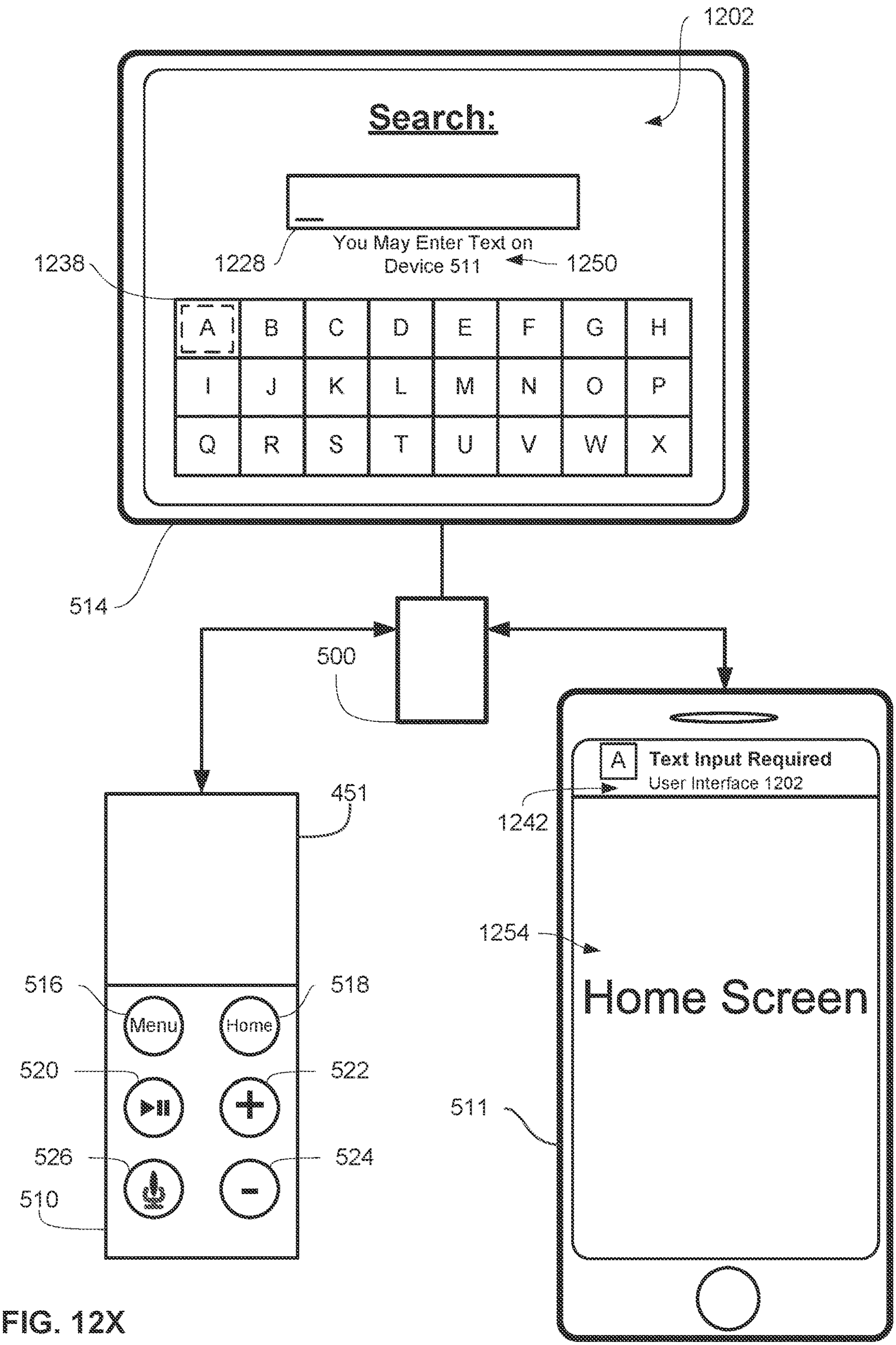

The behaviors of text input alerts on user interfaces other than lock screen 1240 will be described with reference to FIGS. 12W-12GG. The behaviors of text input alerts on user interfaces other than lock screen 1240 are optionally the same as the behaviors of text input alerts on lock screen 1240, except as otherwise described below. For example, in FIG. 12W, device 511 is displaying home screen 1254. The examples of FIGS. 12W-12GG optionally apply to user interfaces other than home screen 1254 (e.g., user interfaces of applications running on device 511), outside of lock screen 1240. While device 511 is displaying home screen 1254 in FIG. 12W, a selection input is detected on touch-sensitive surface 451 of remote 510 (indicated by contact 1203) while text entry field 1228 has the current focus. In response to the selection input, as illustrated in FIG. 12X, electronic device 500 optionally enters a text entry mode, soft keyboard 1238 is displayed in text input user interface 1202, and the current focus moves to one of the keys in soft keyboard 1238 (e.g., the "A" key in FIG. 12X). Also in response to electronic device 500 entering the text entry mode and displaying soft keyboard 1238, electronic device 500 optionally transmits an indication to device 511, while device 511 is displaying home screen 1254, that text input is needed for user interface 1202. In response to receiving that indication, device 511 displays text input alert 1242 on home screen 1254.

Figure 12Y:
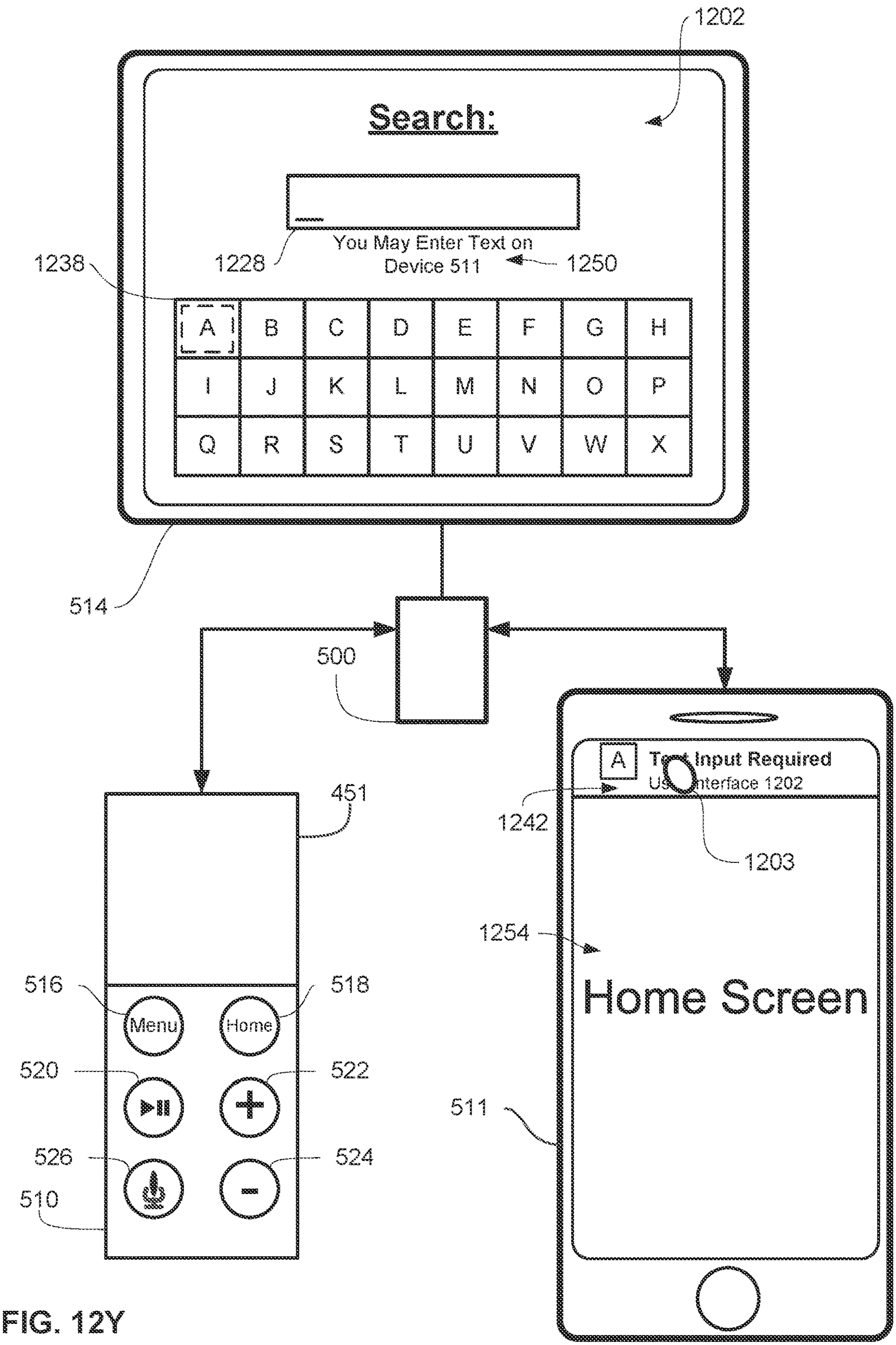
Figure 12Z:
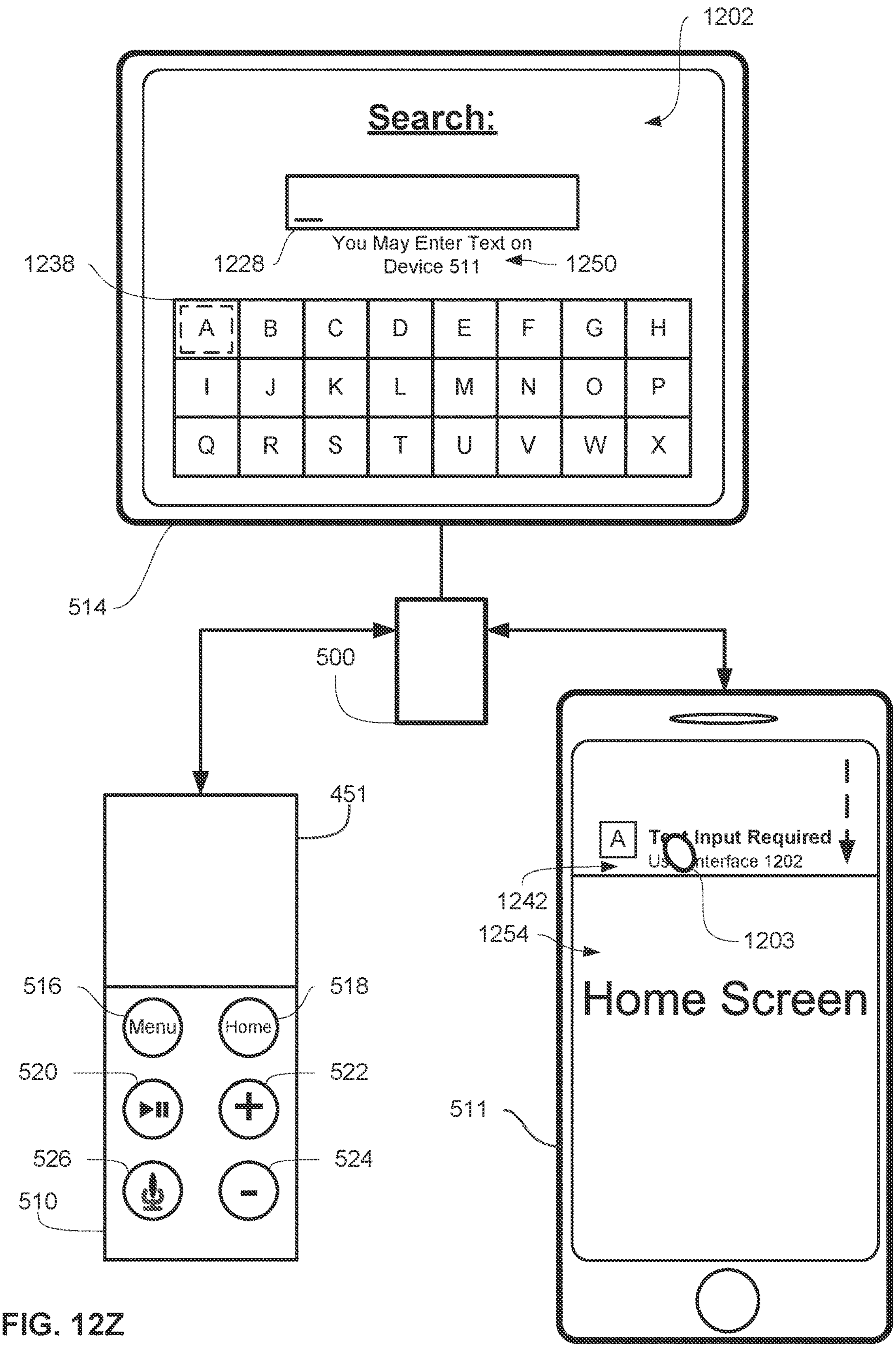
Figure 12A:
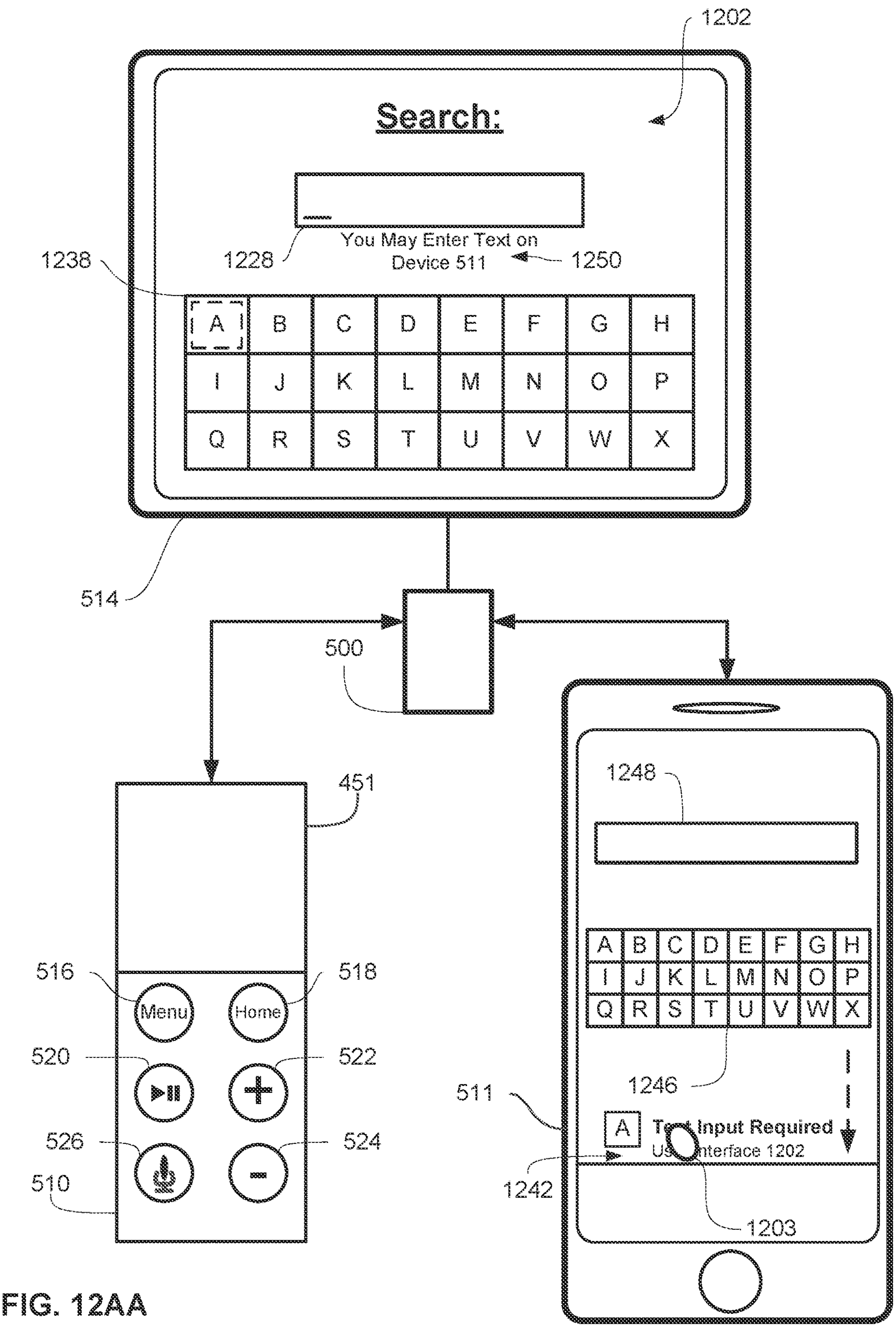
Figure 12B:
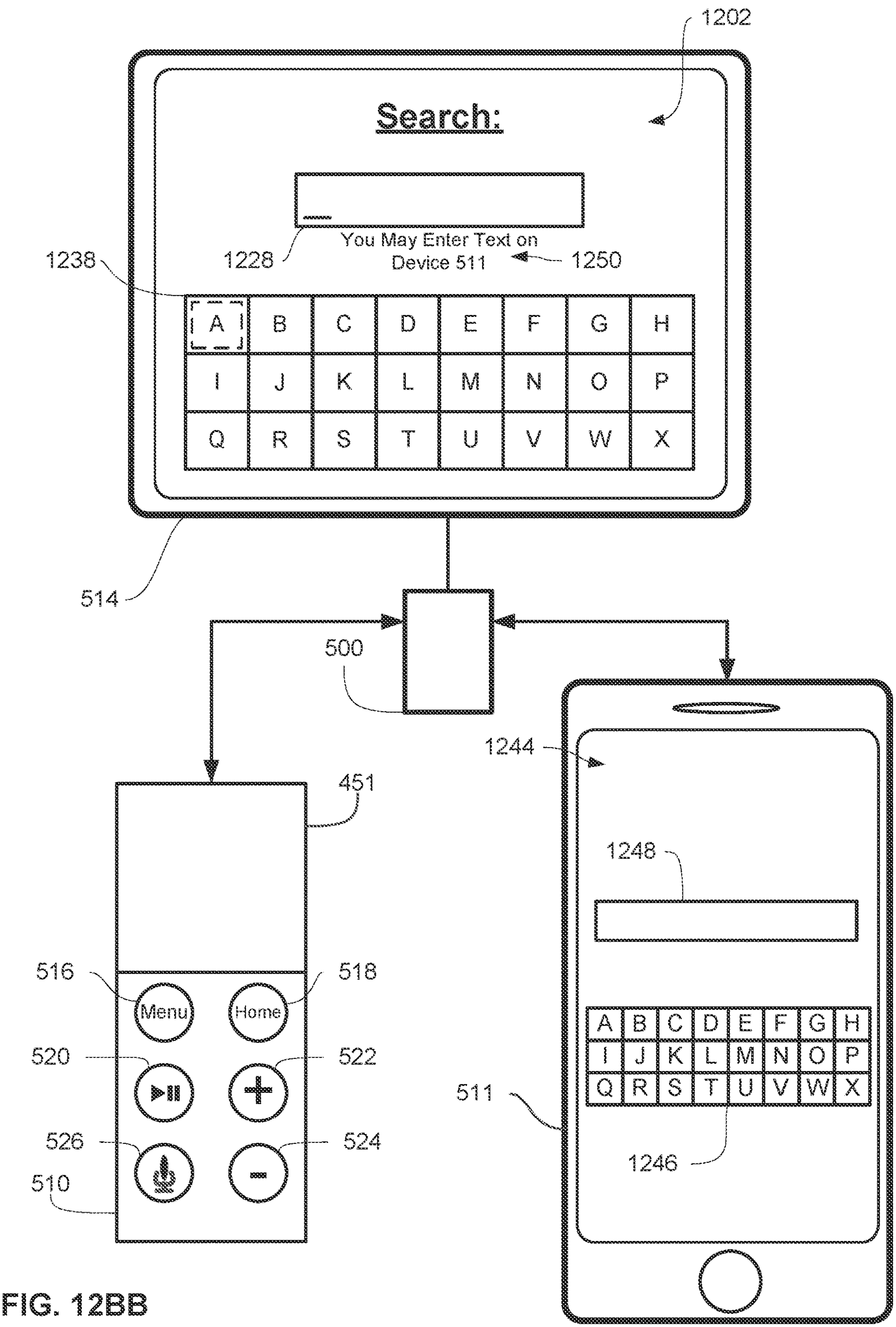
Figure 12C:
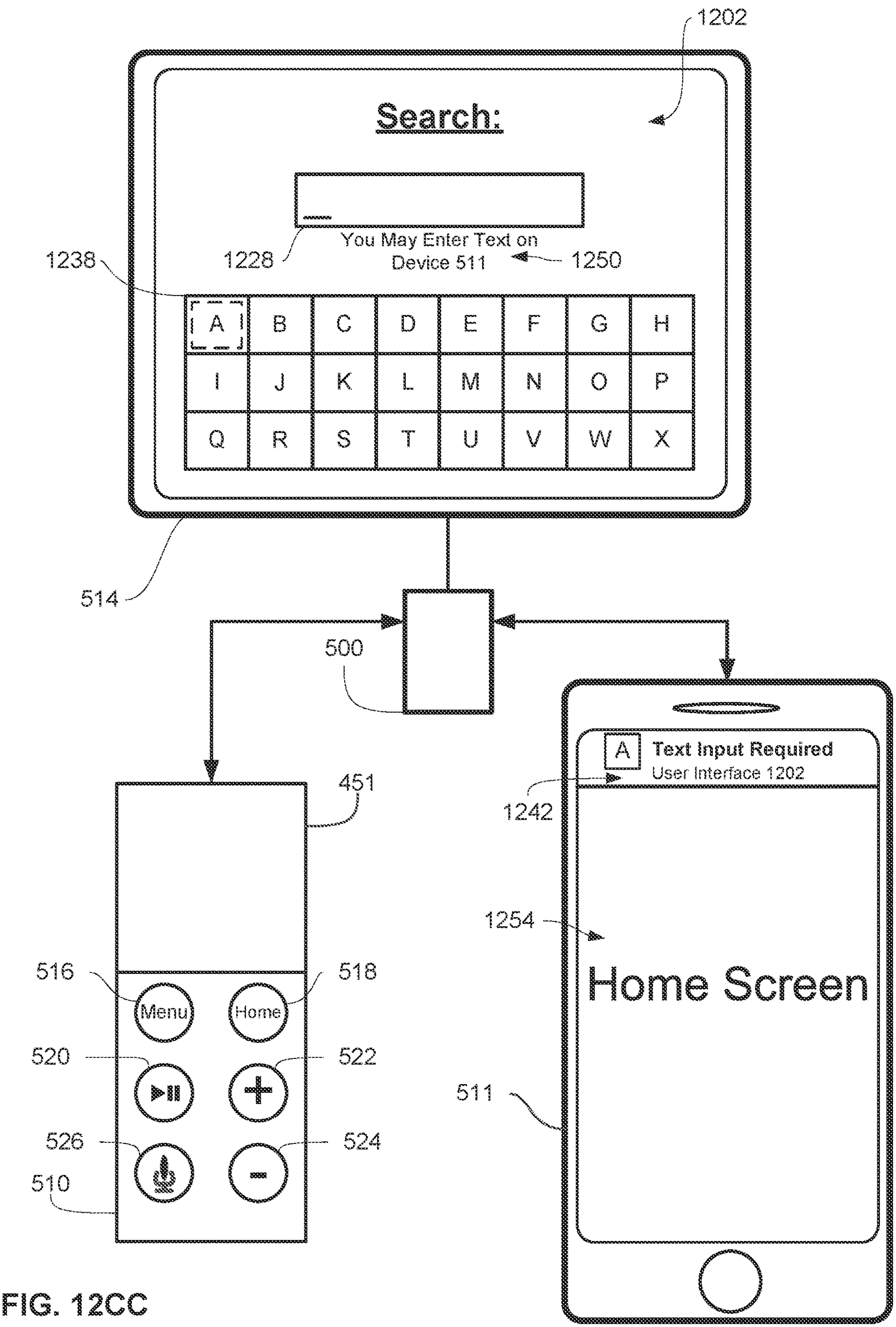
Figure 12D:
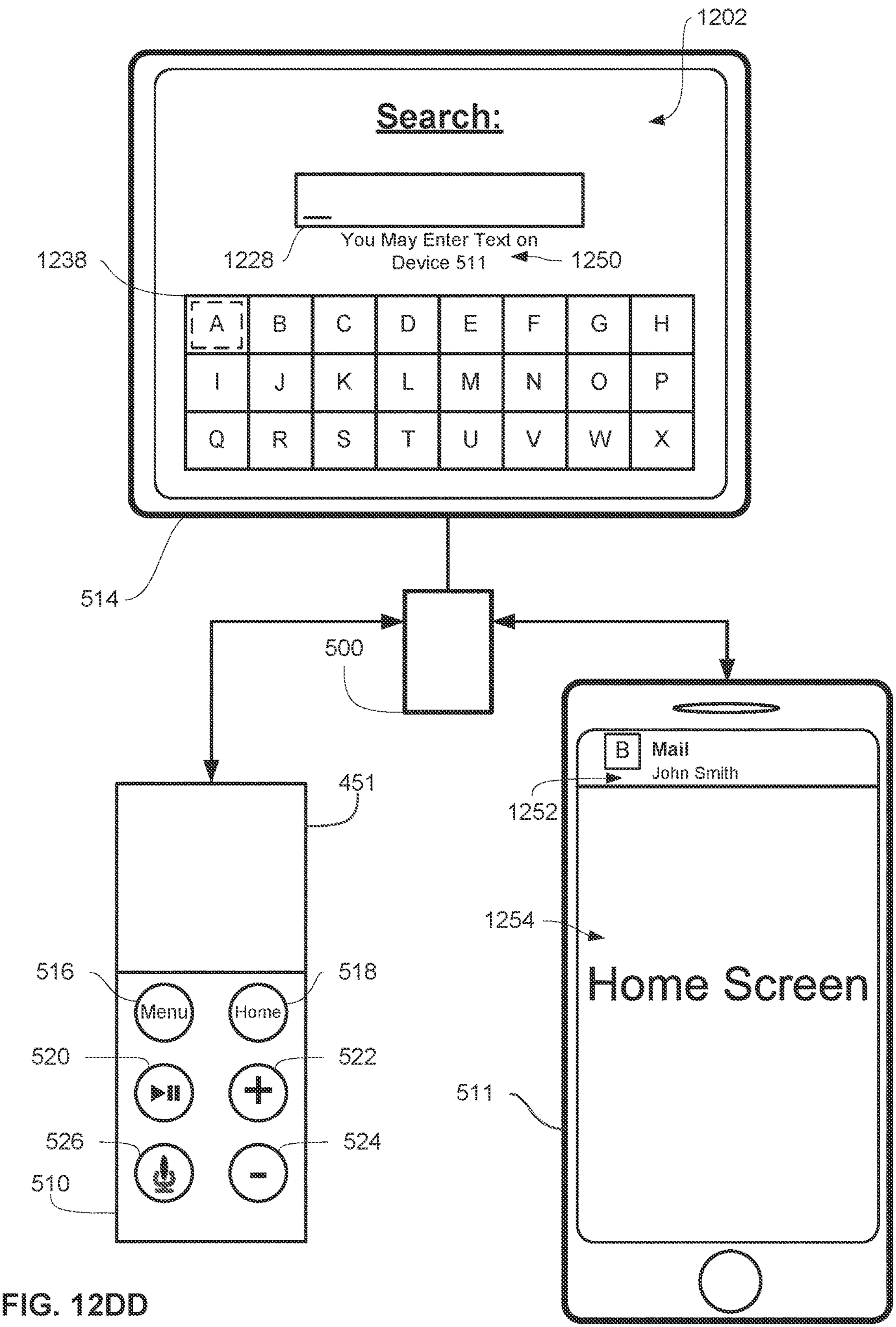
Figure 12E:
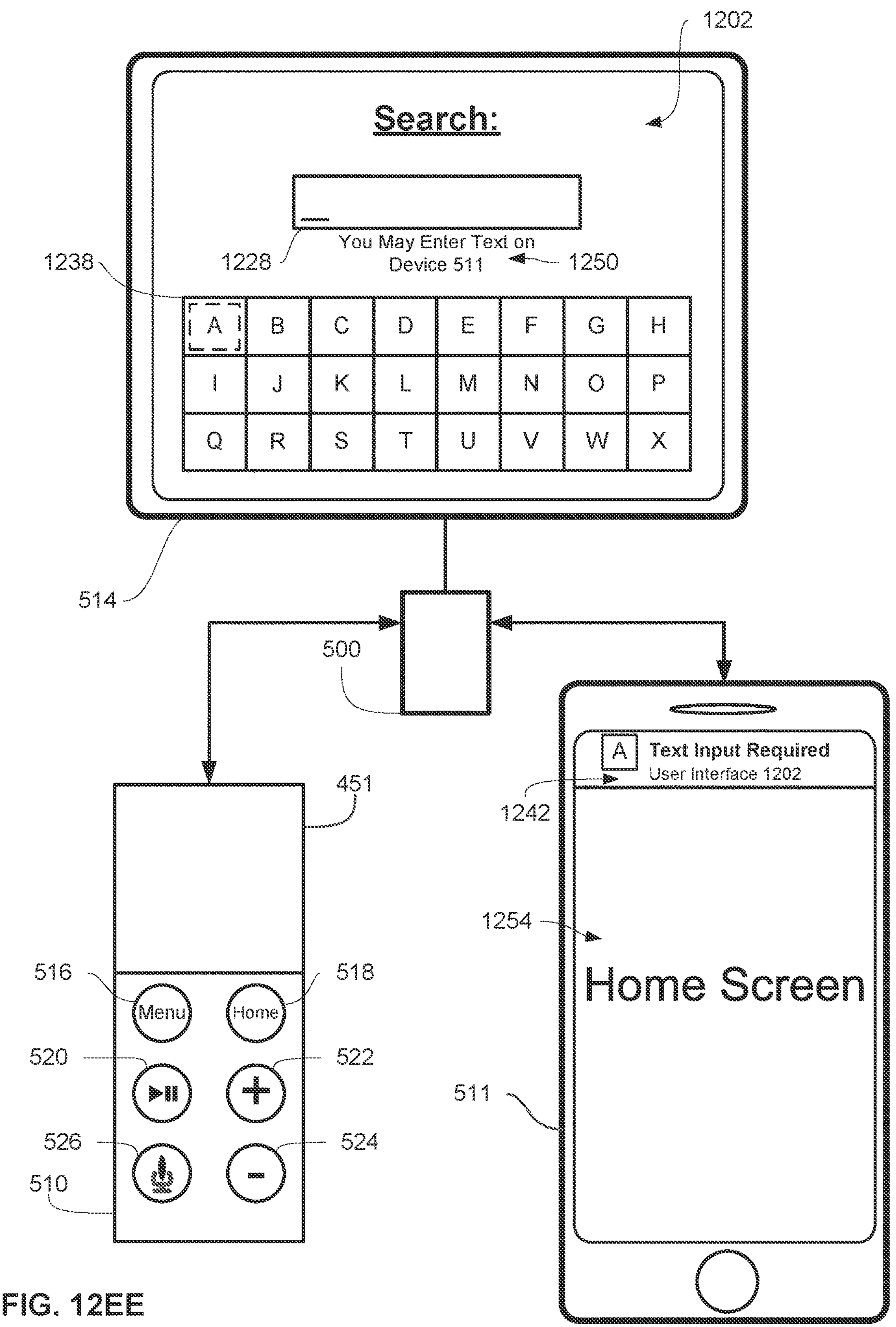
Figure 12F:
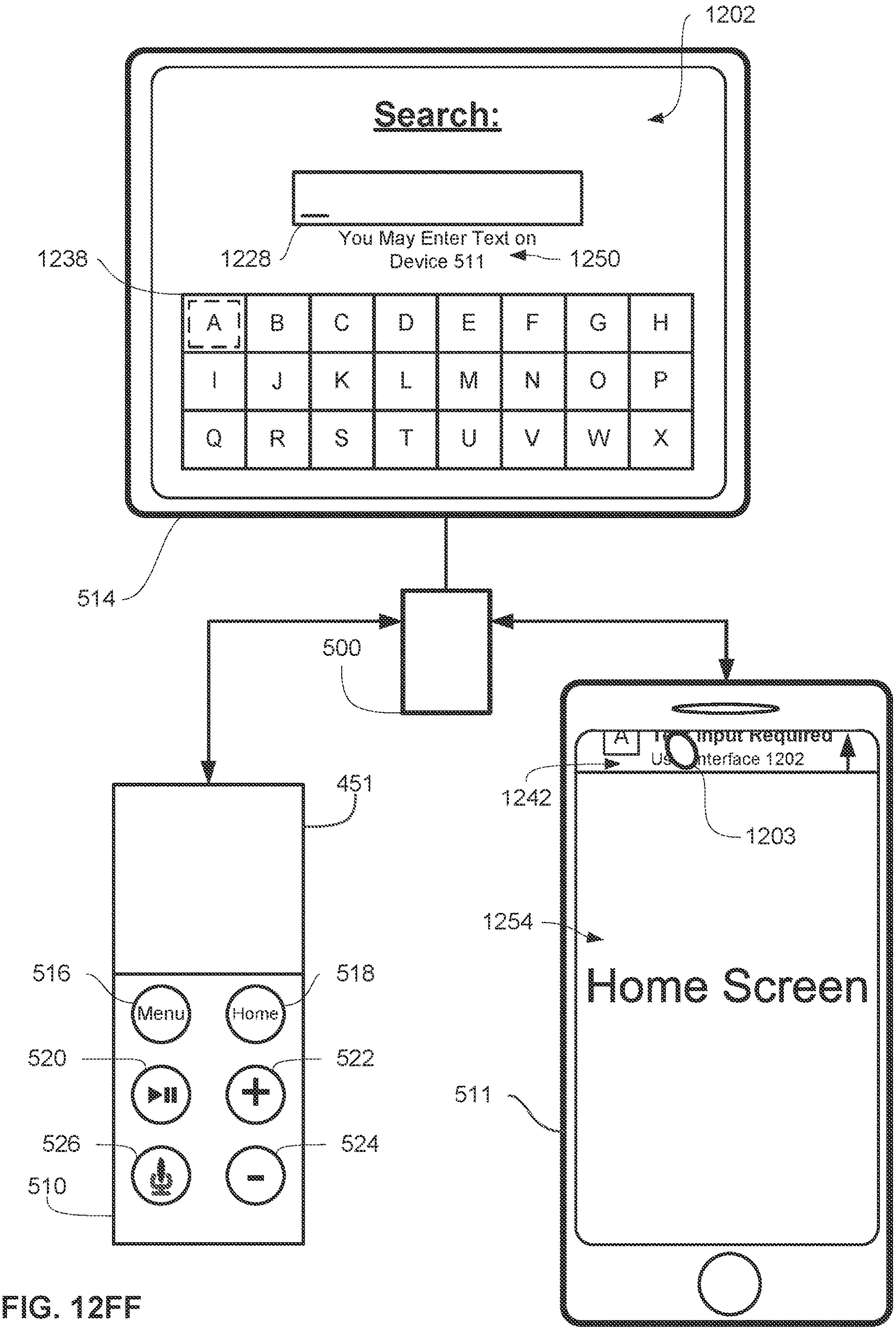
Figure 12G:
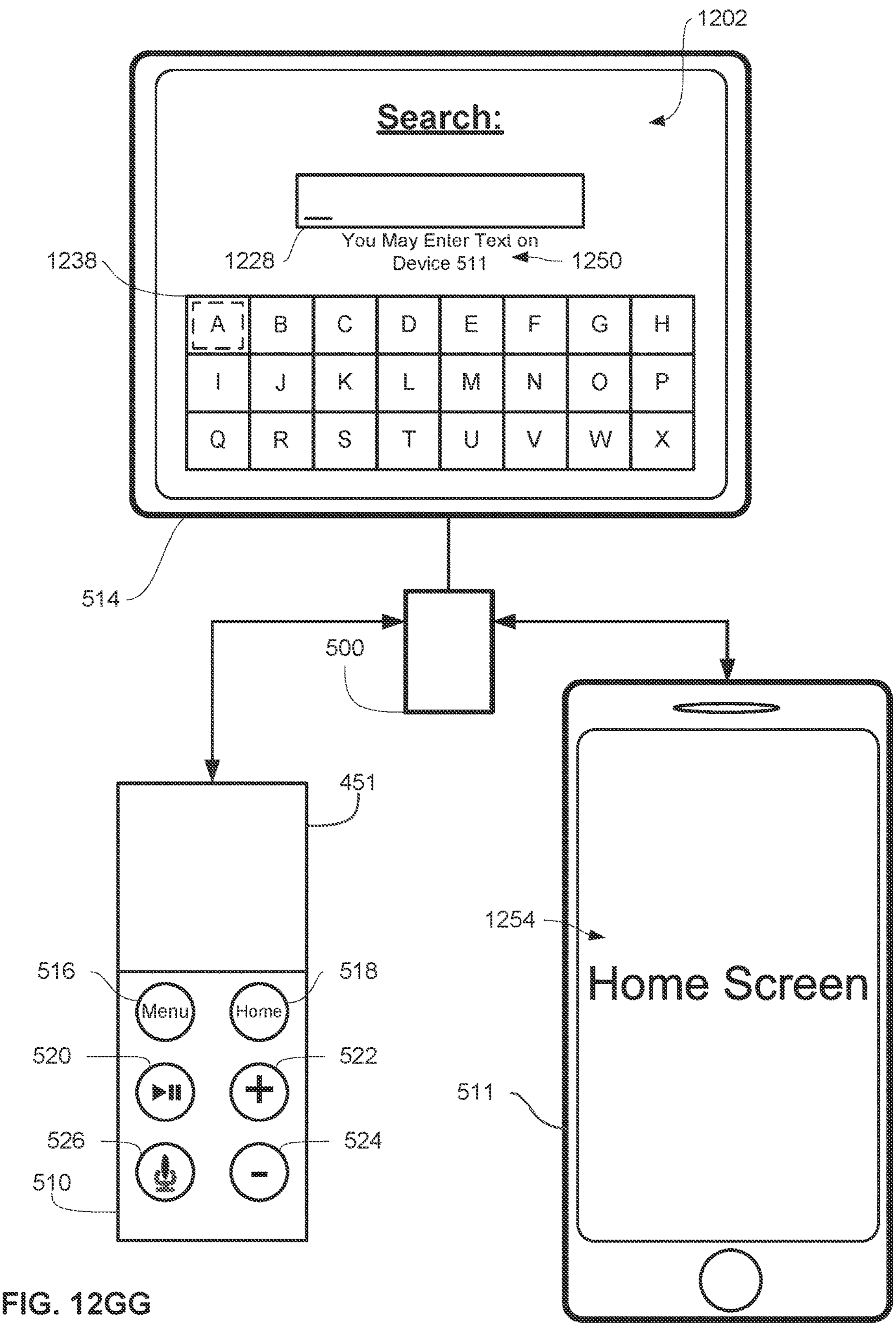
Figure 12H:
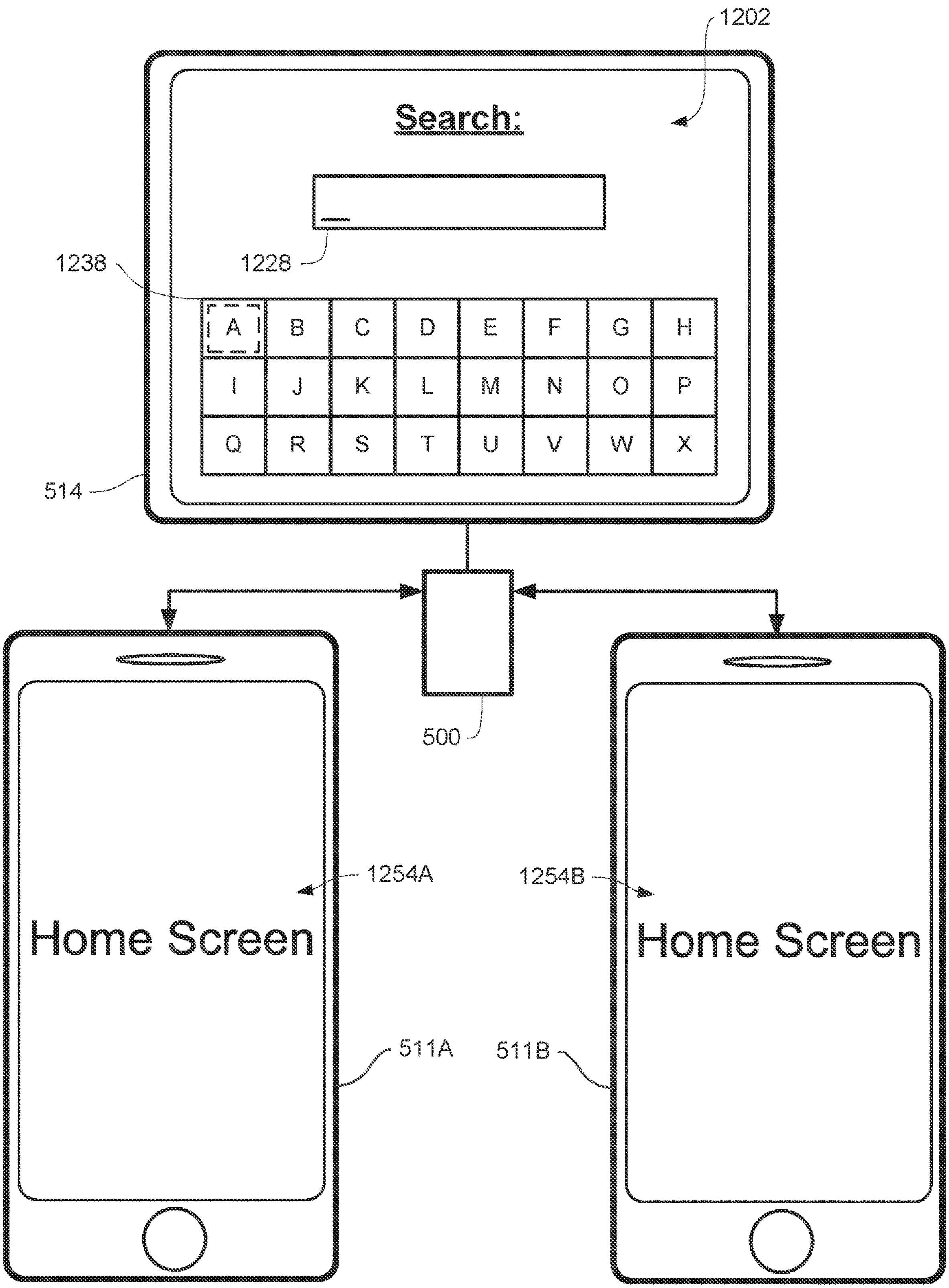
Figure 12I:
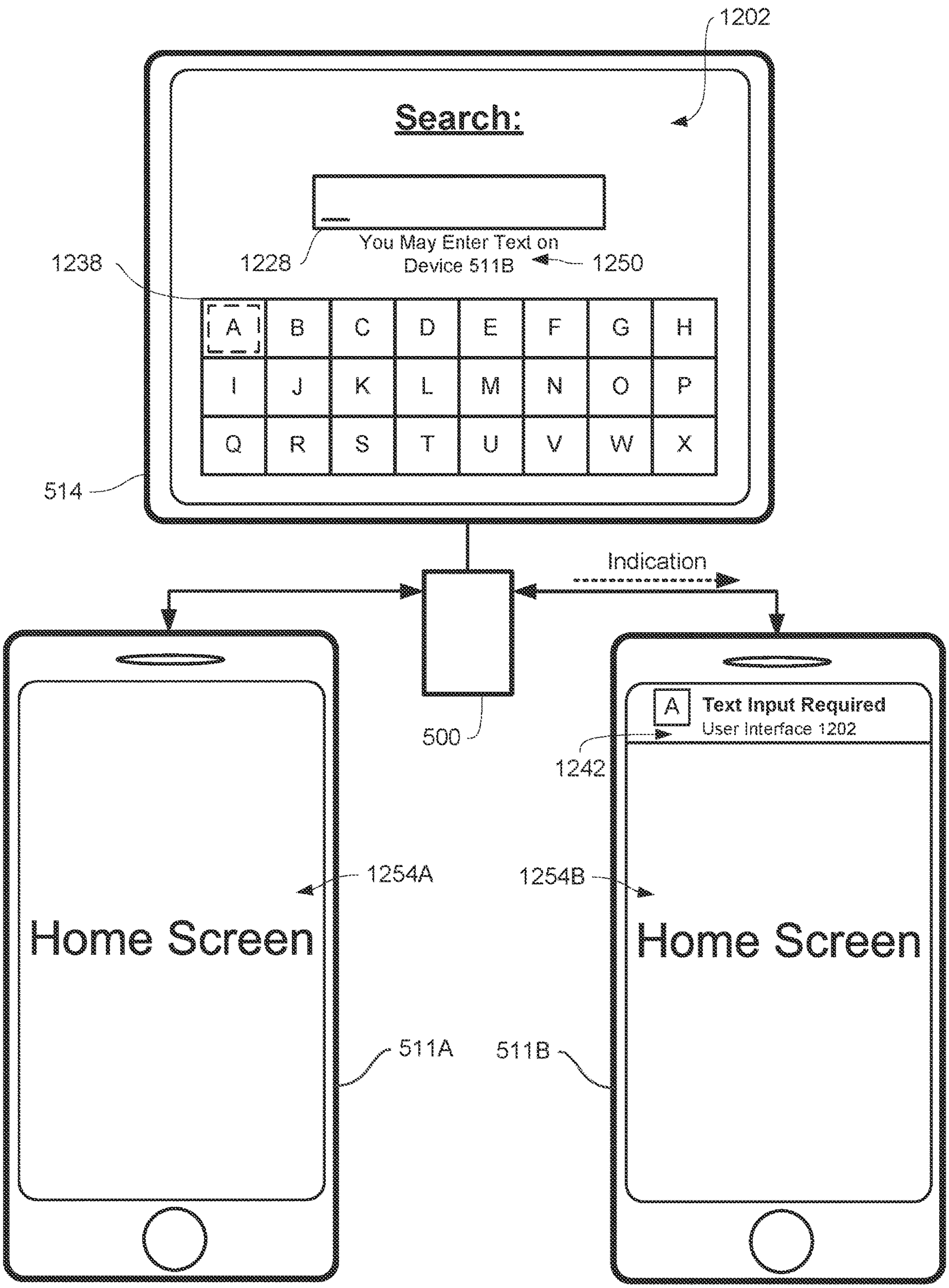
Figure 12J:
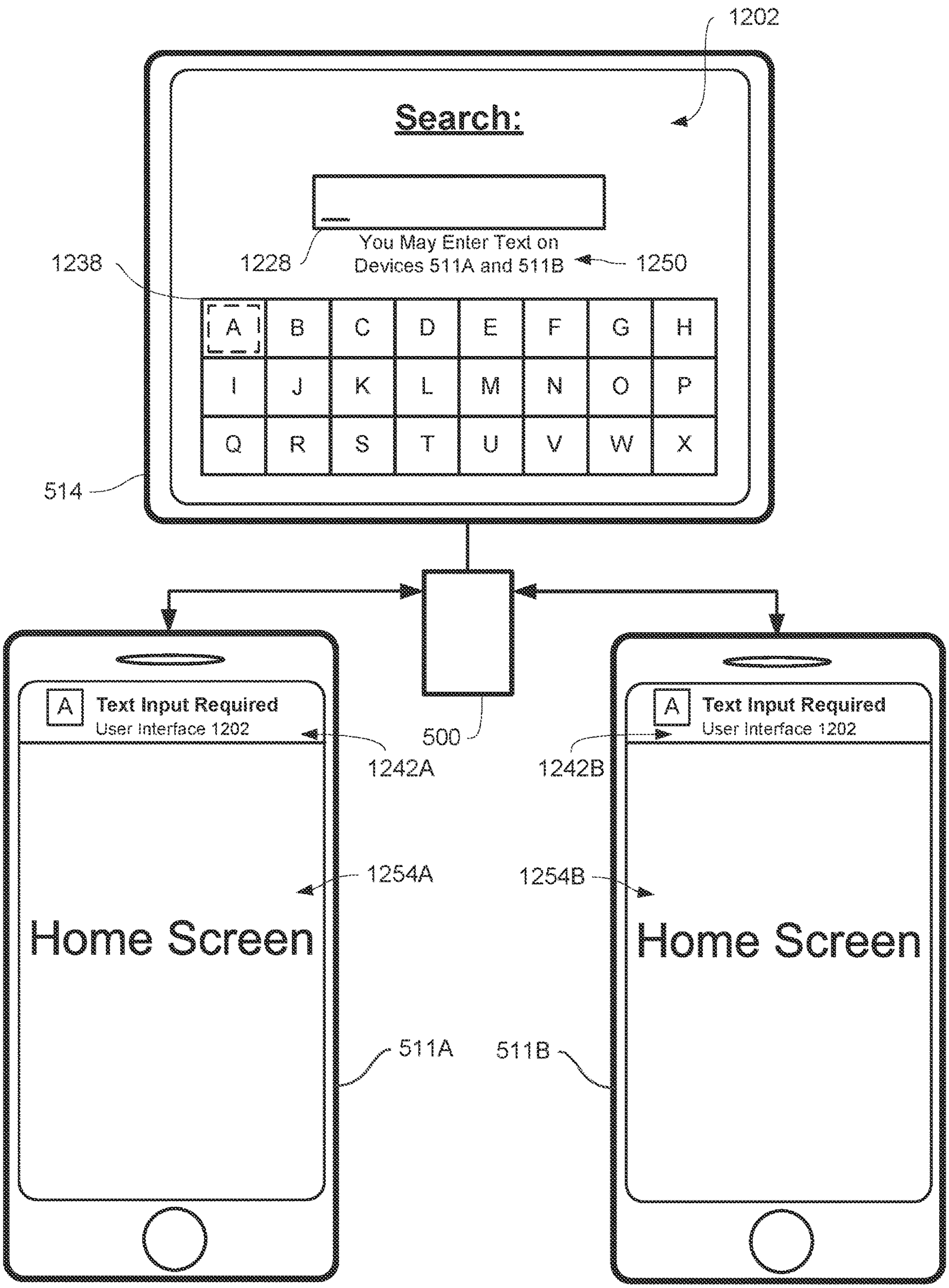
Figure 12K:
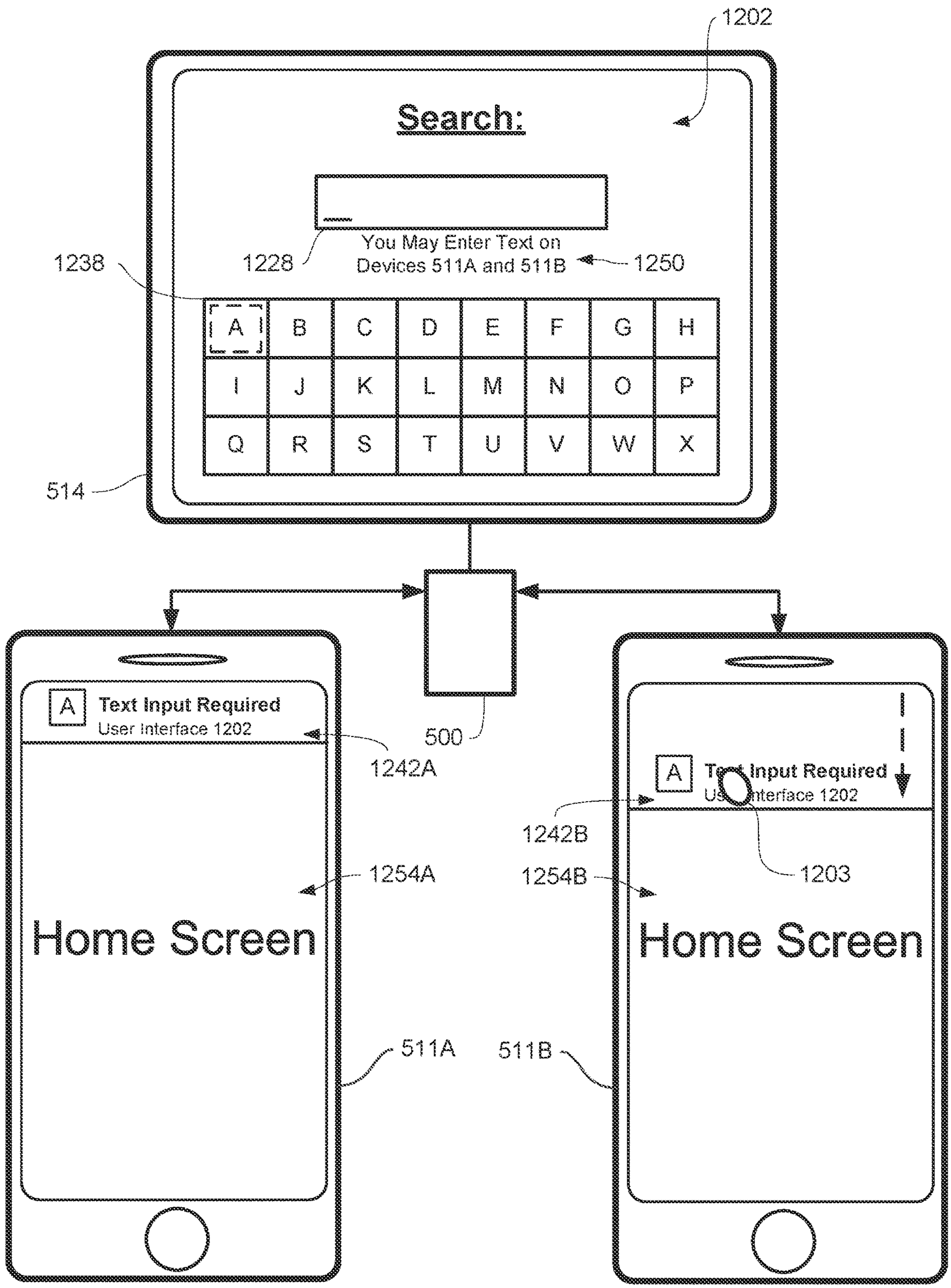
Figure 12L:
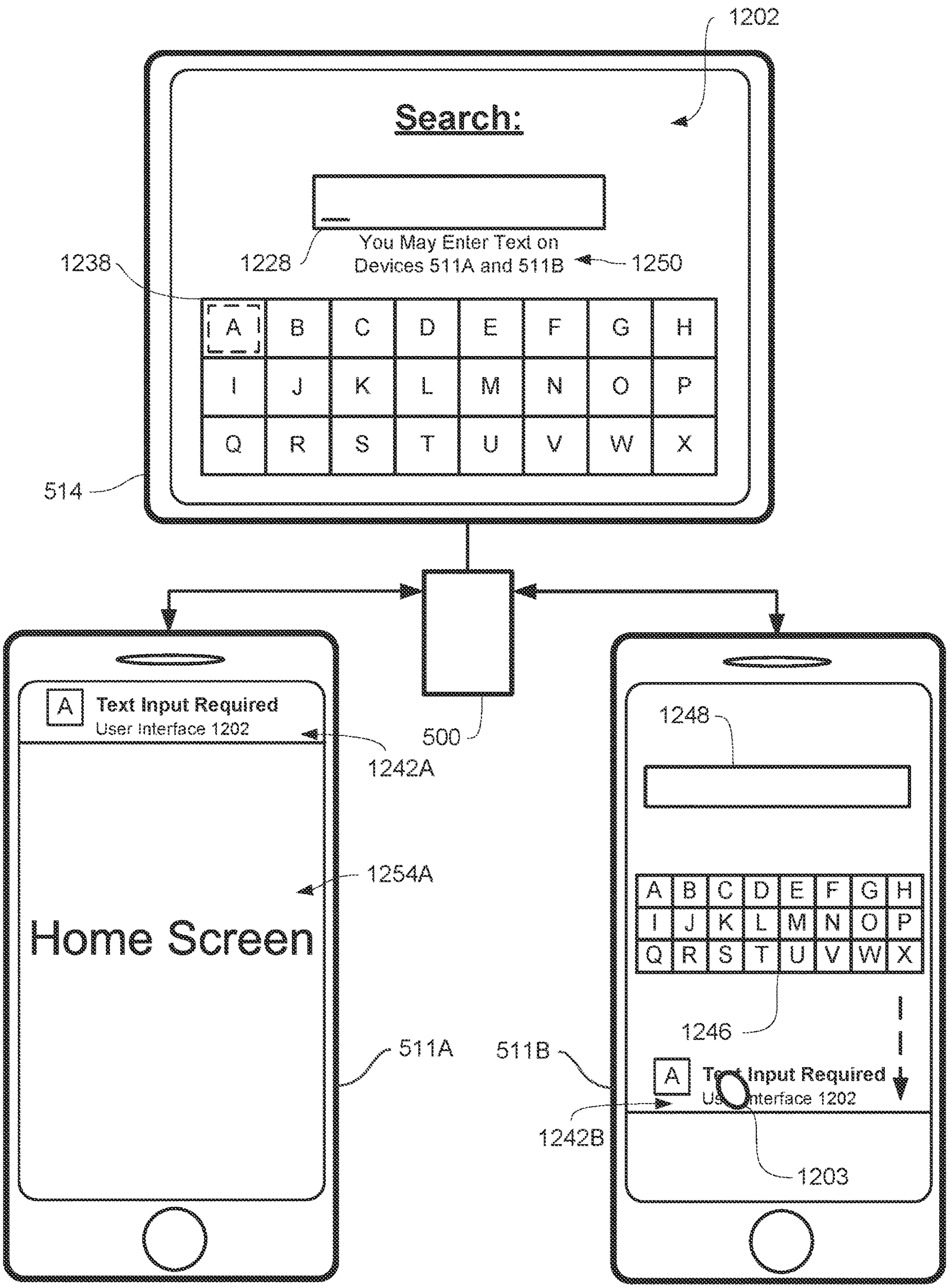
Figure 12M:
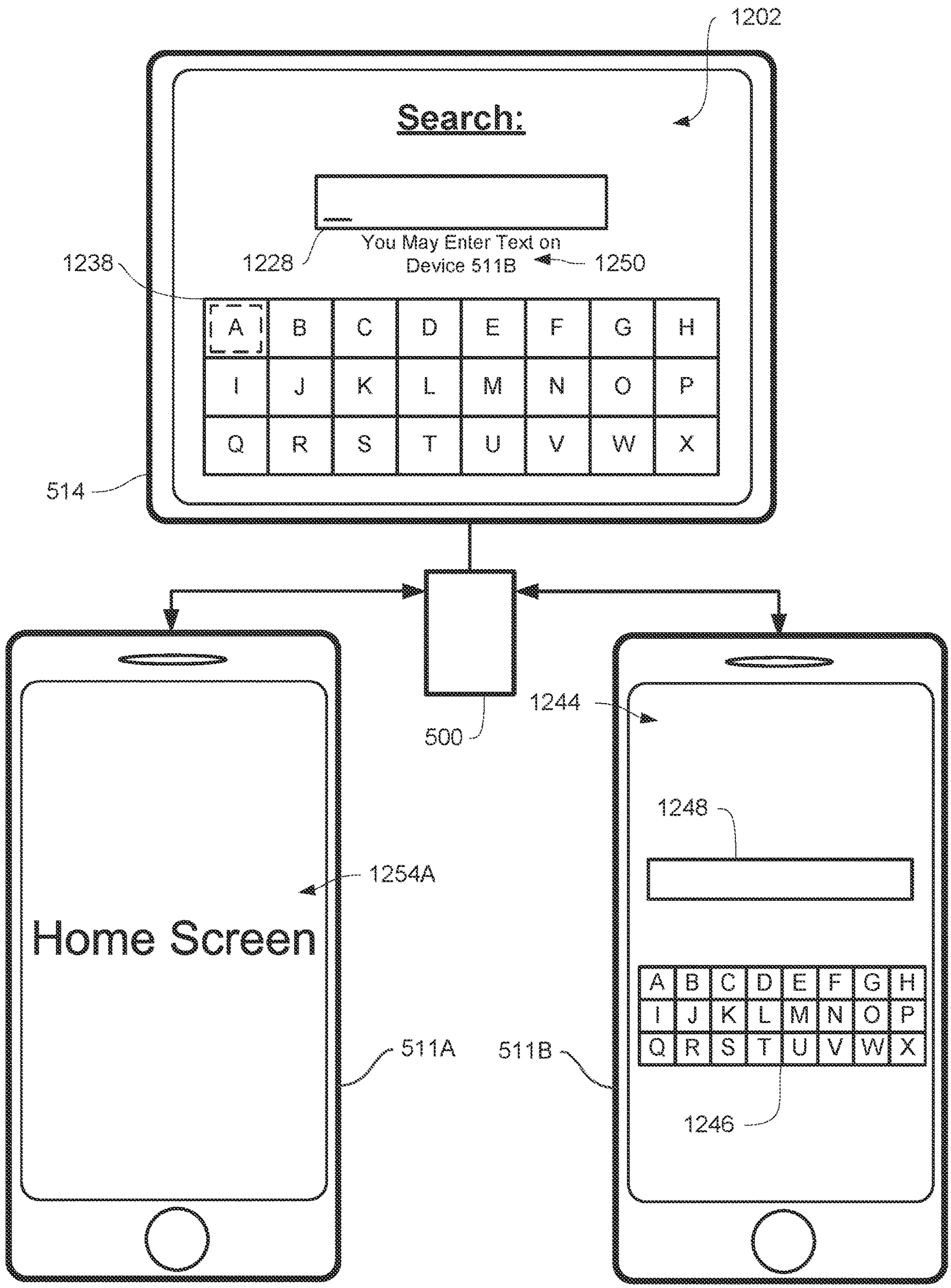
Figure 12N:
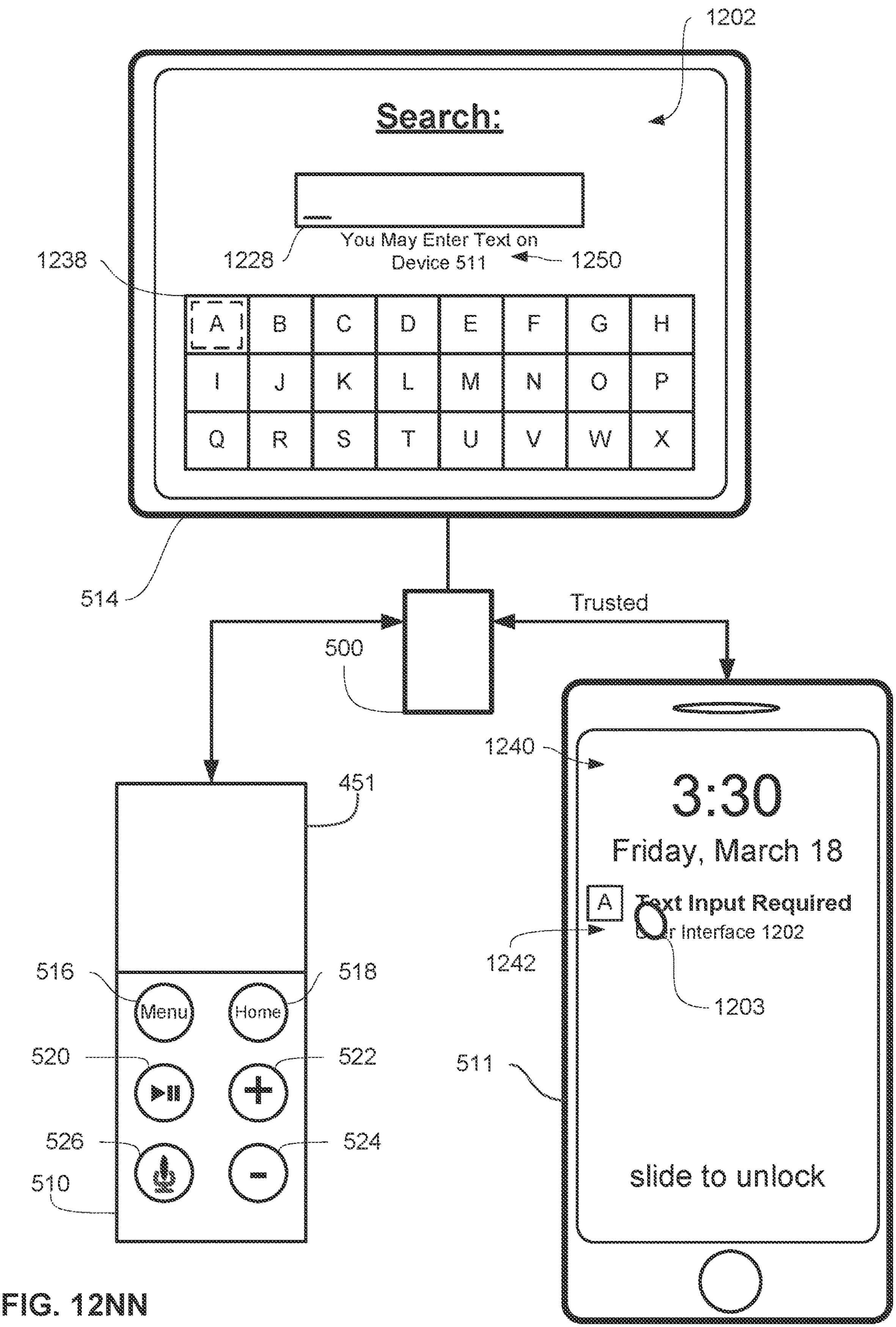
Figure 12O:
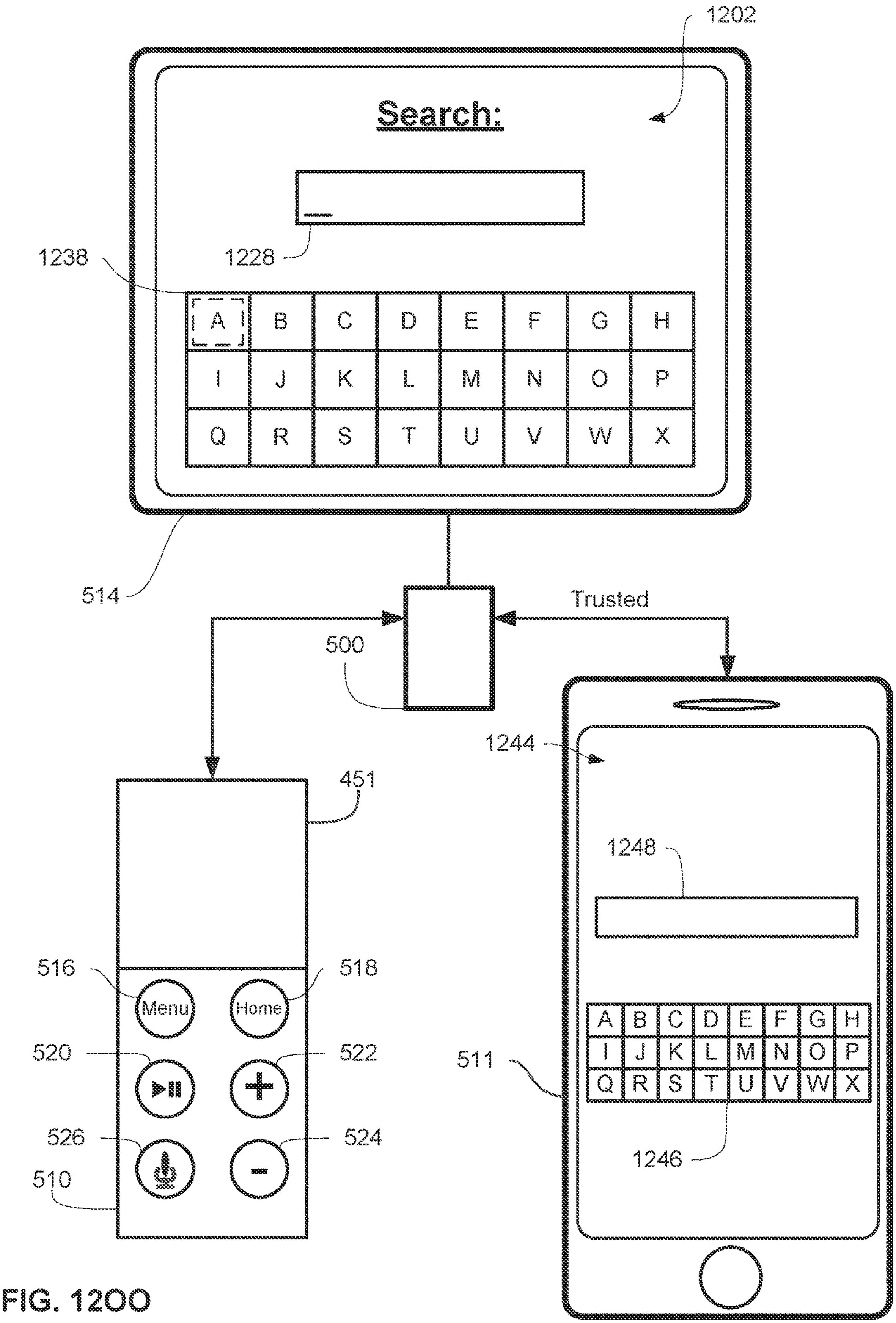
Figure 12P:
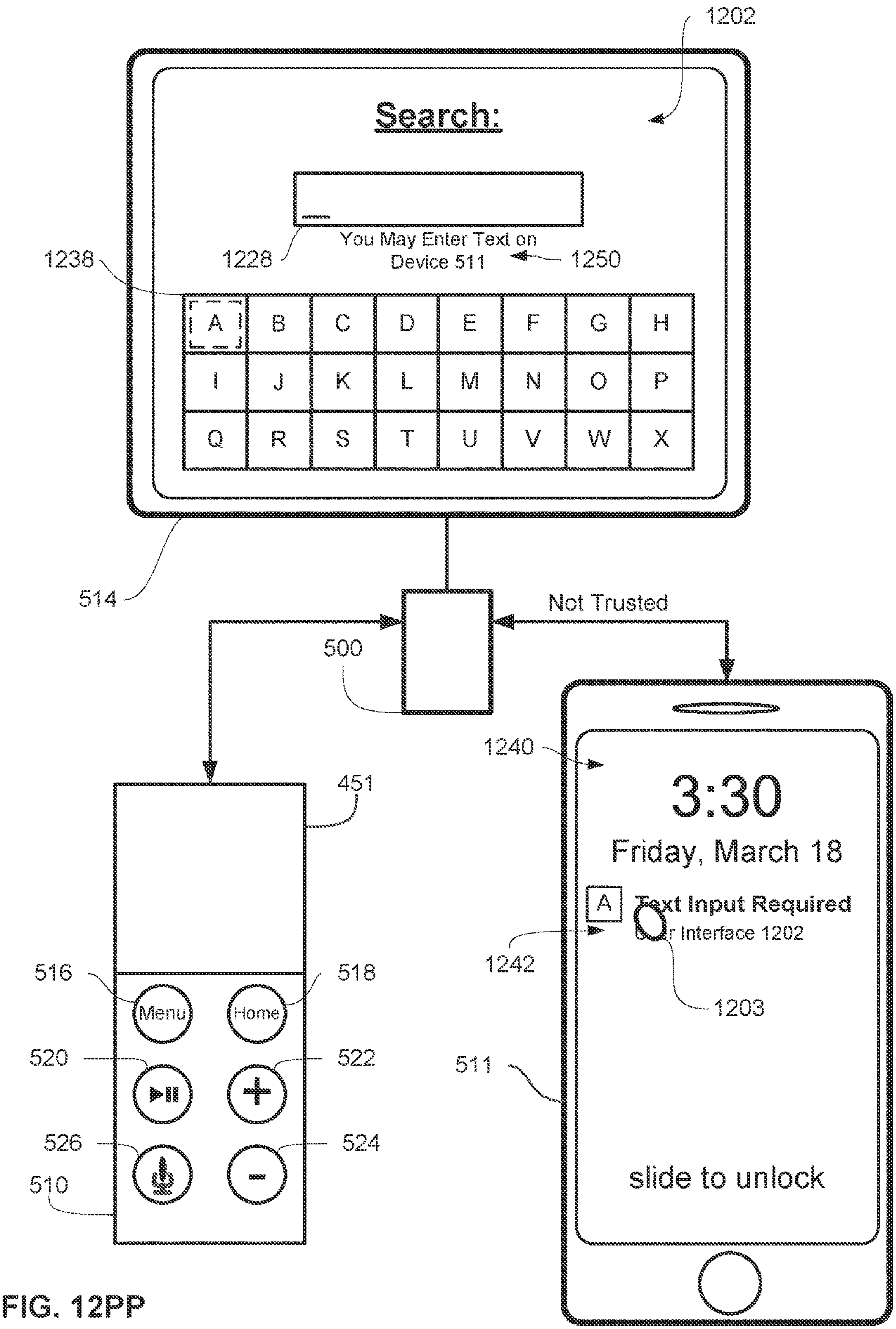
Figure 12Q:
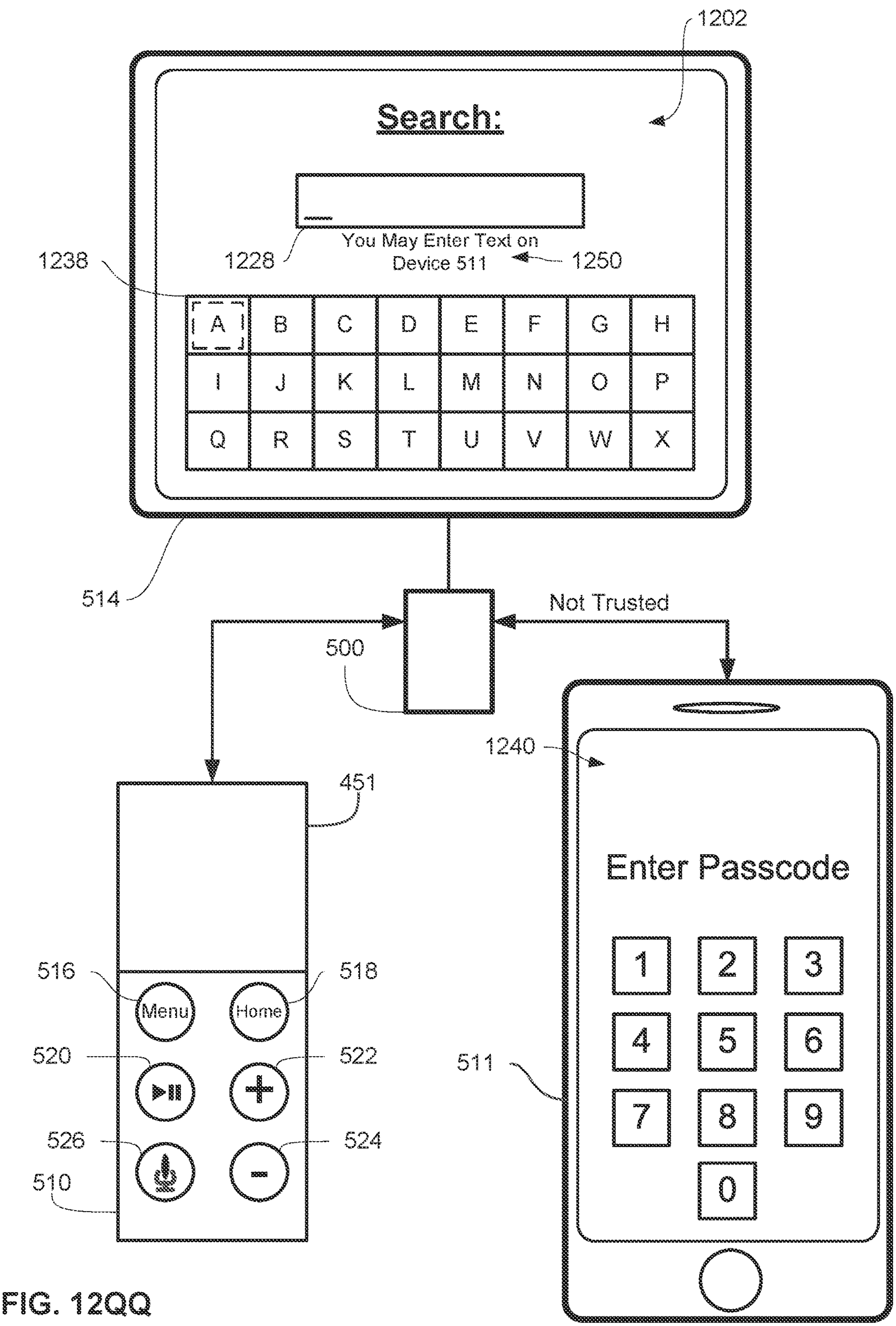
Figure 12R:
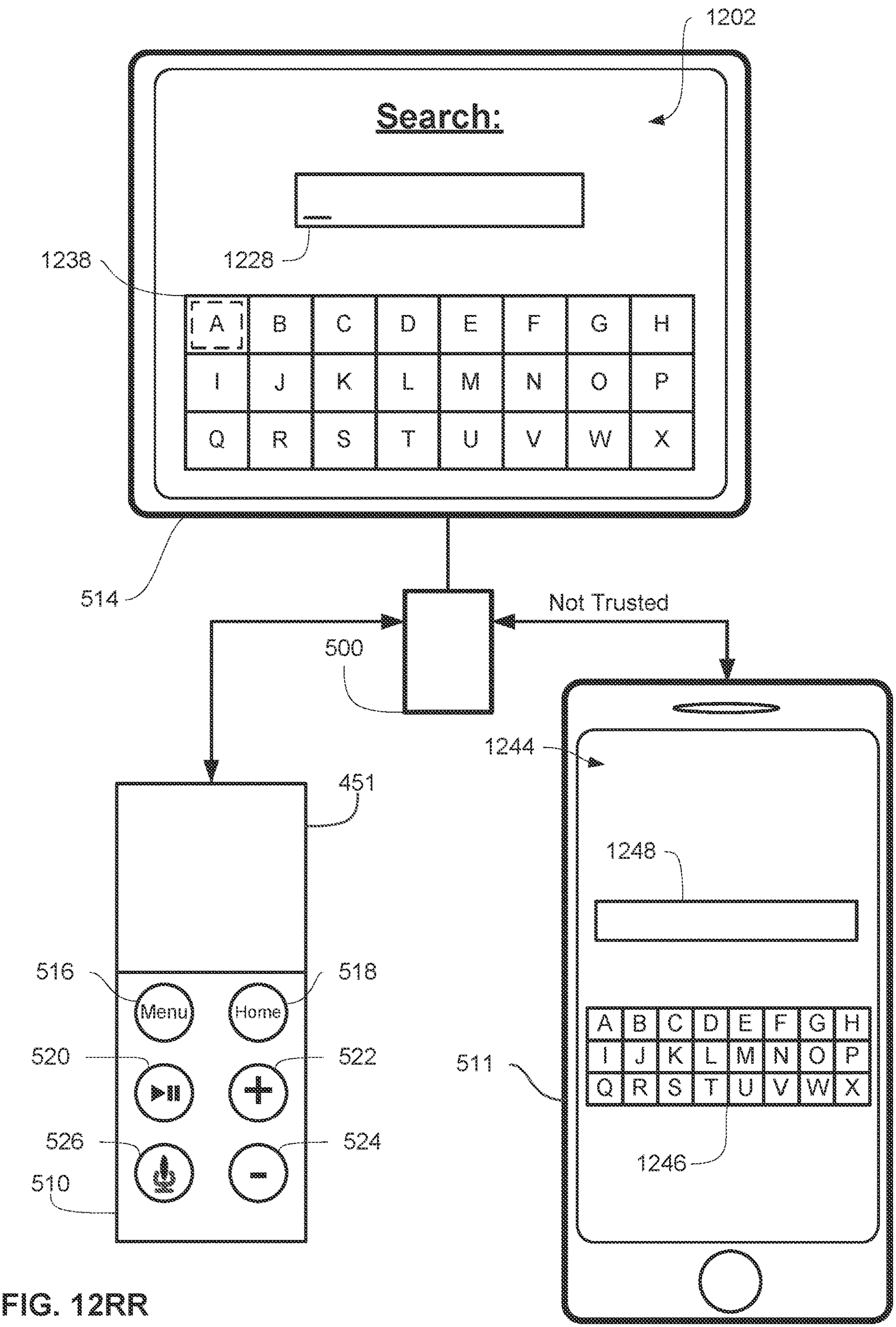
Figure 13B:
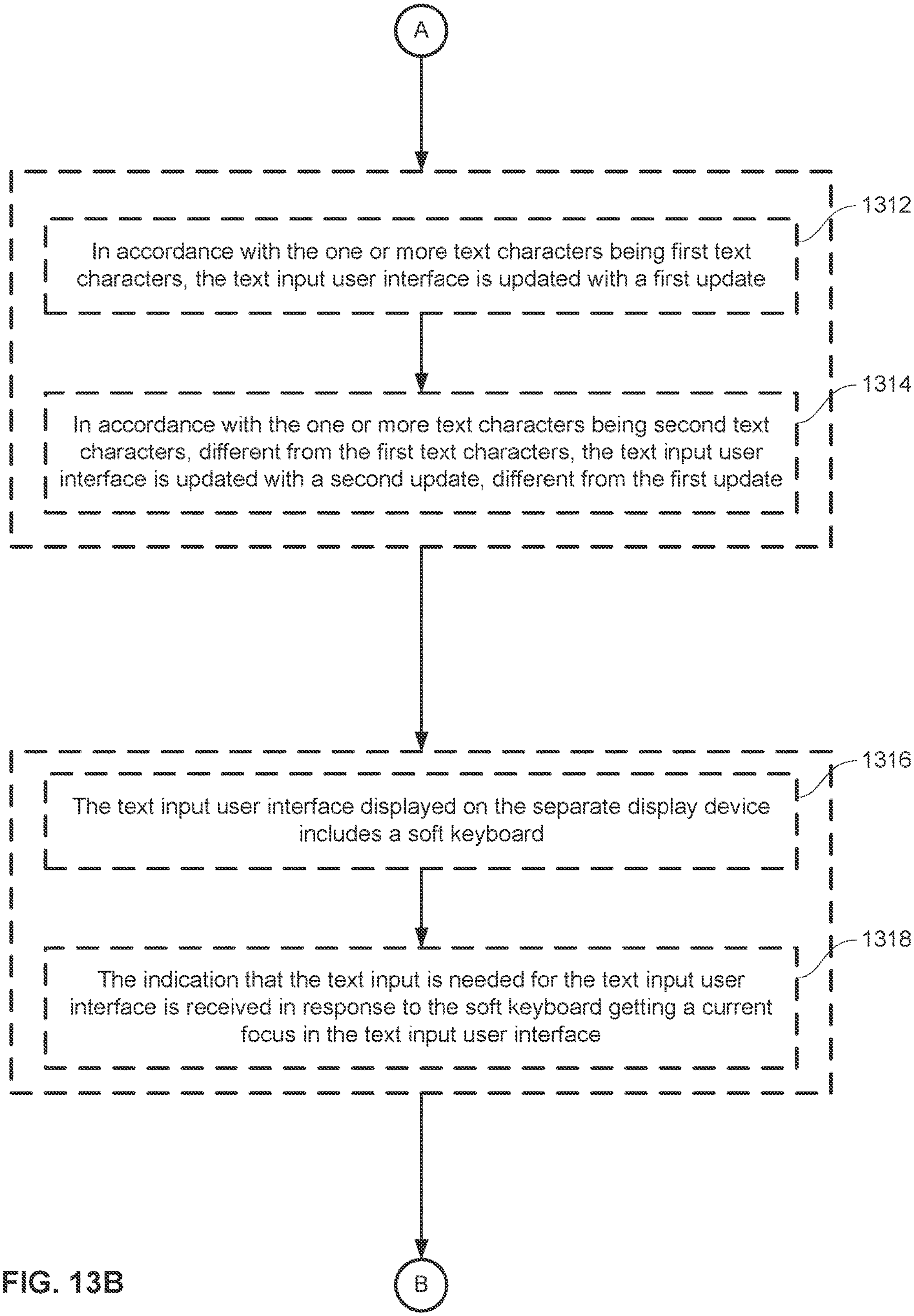
Figure 13C:
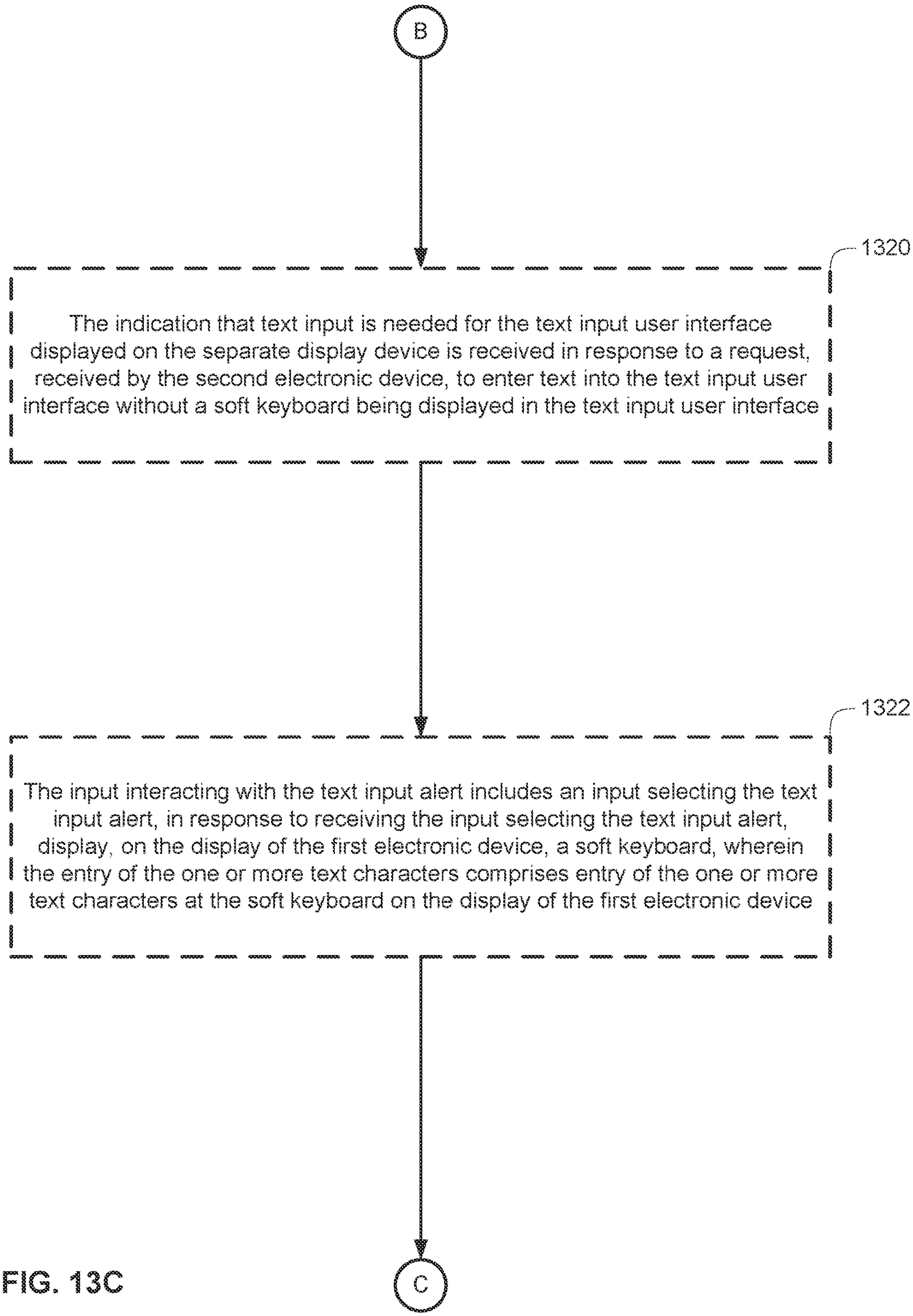
Figure 13D:
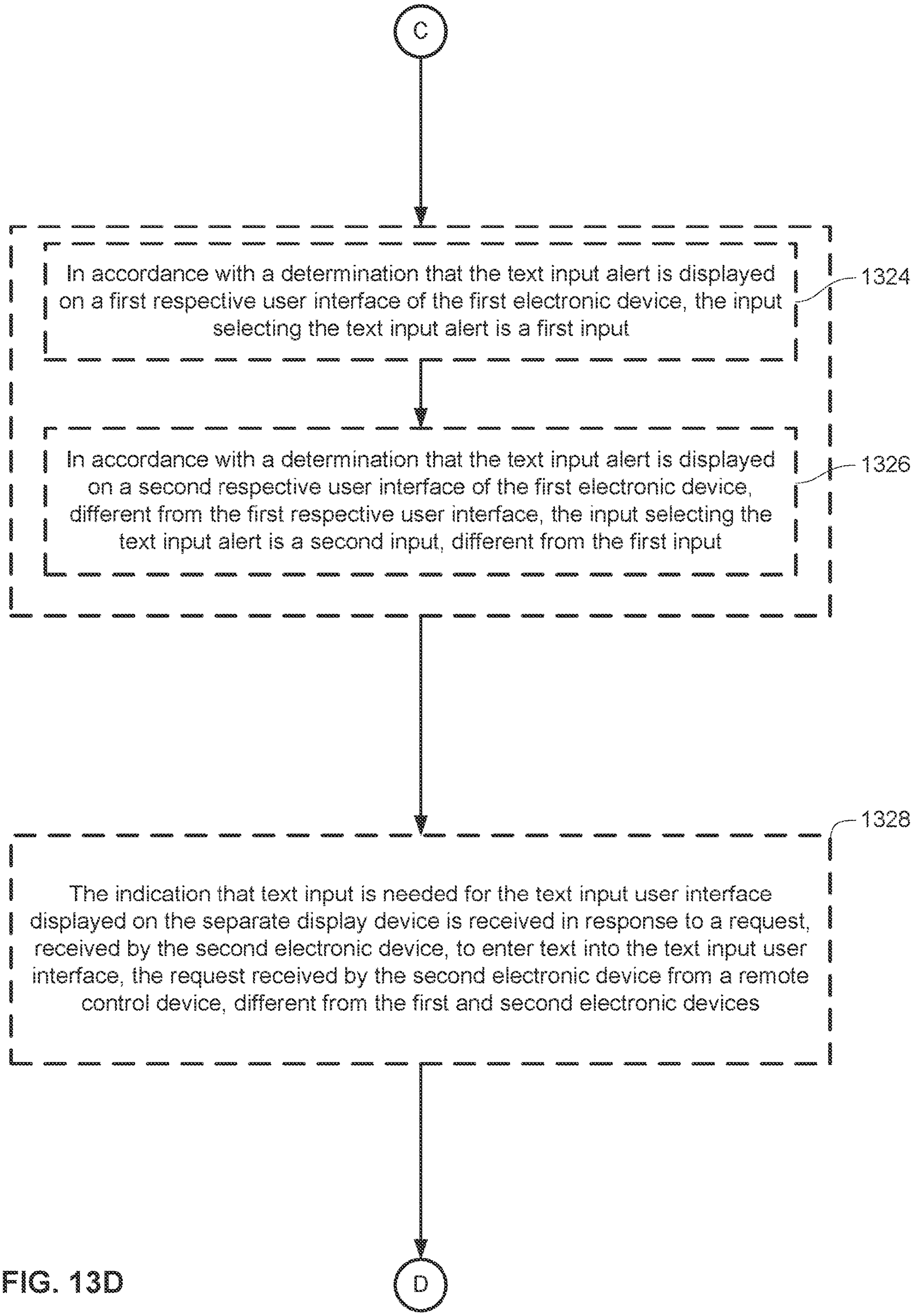
Figure 13E:
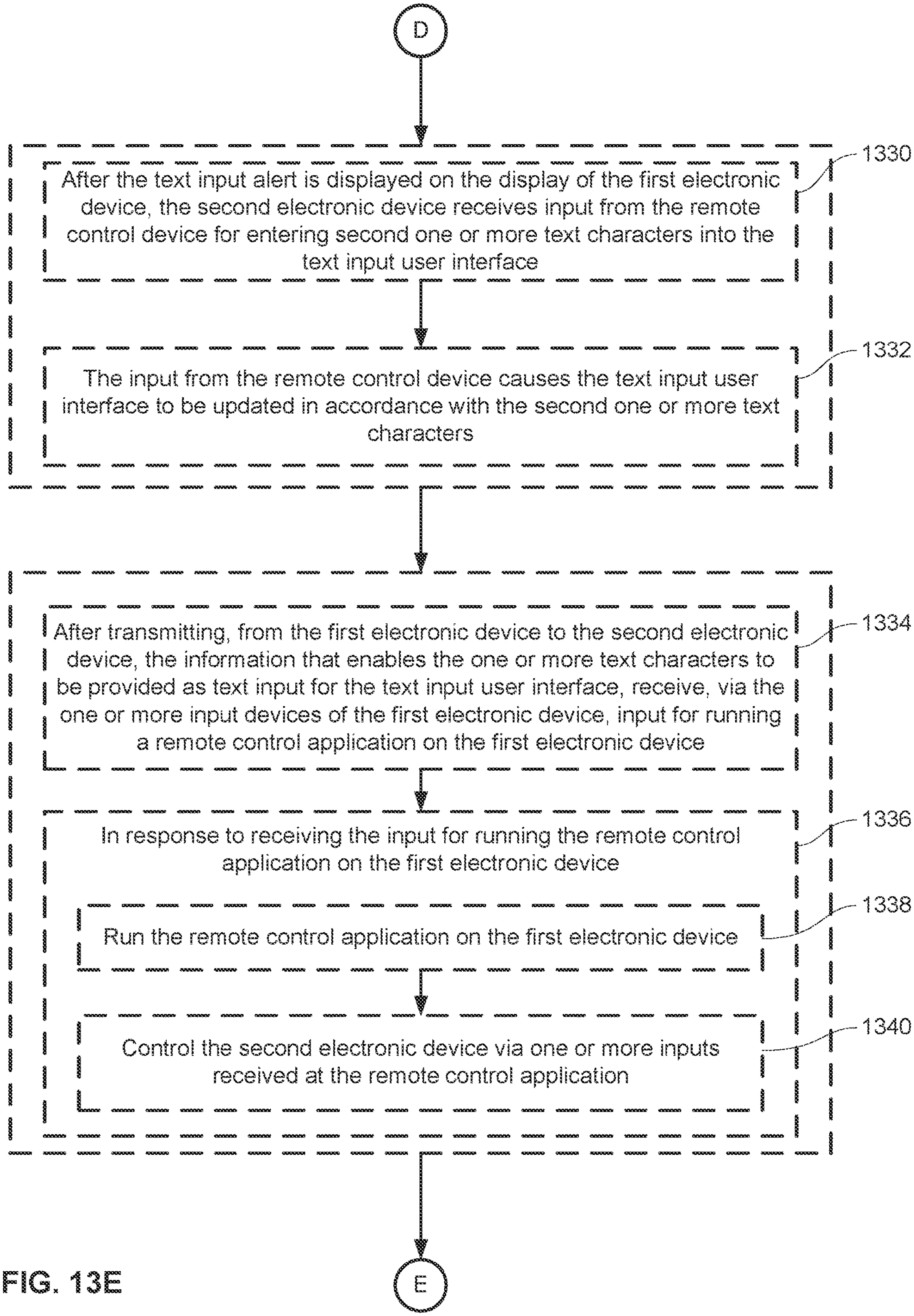
Figure 13F:
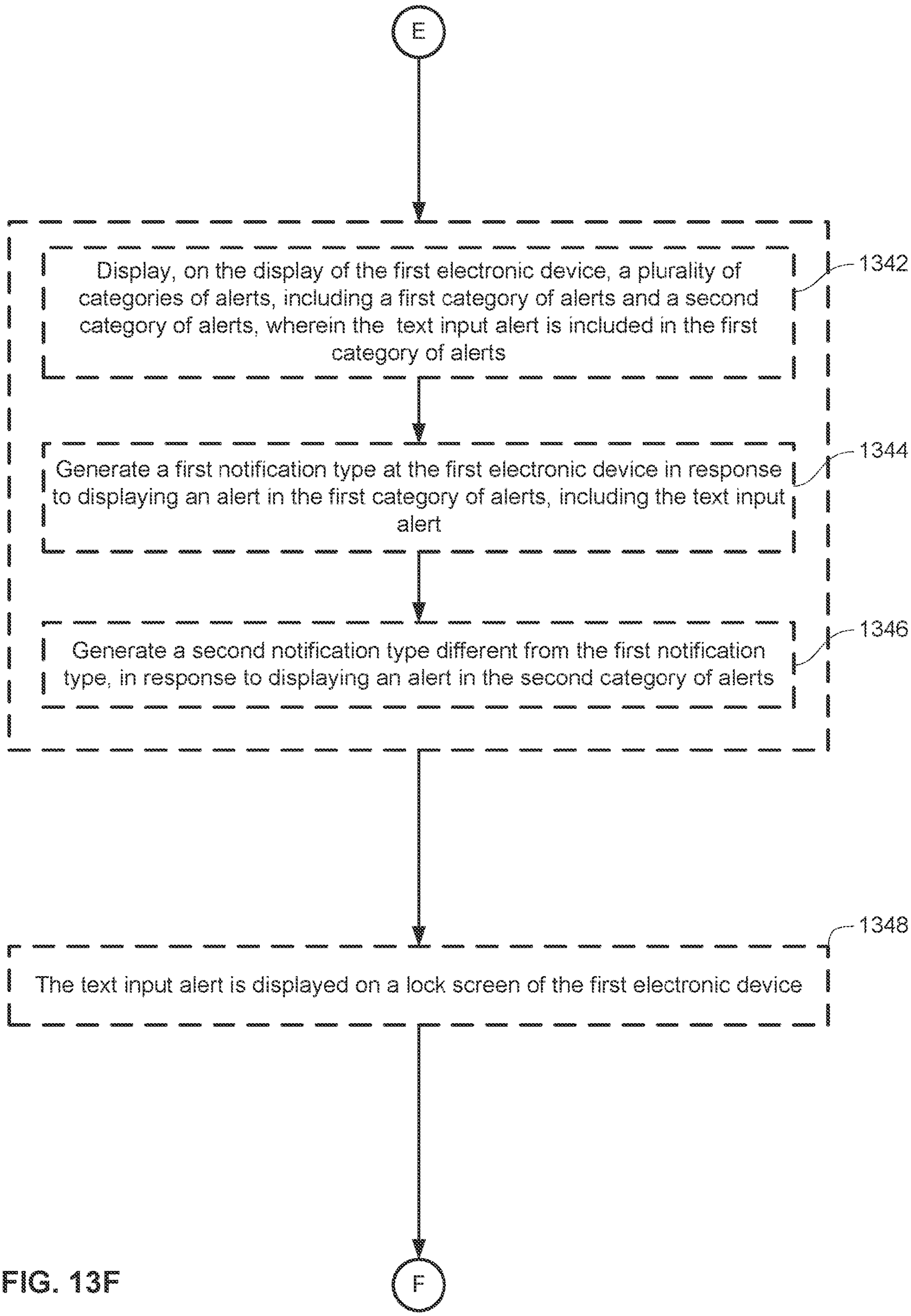
Figure 13G:
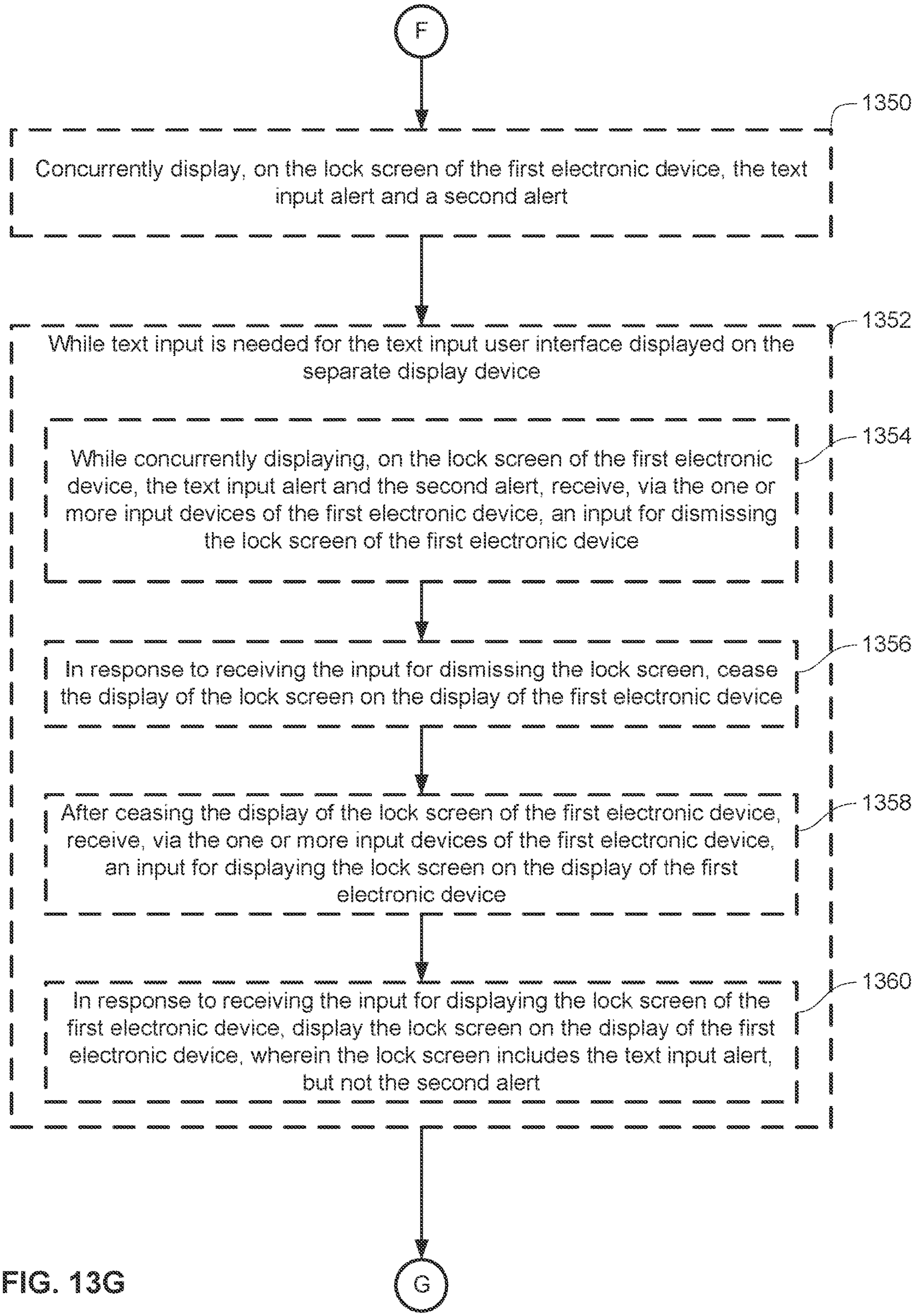
Figure 13H:
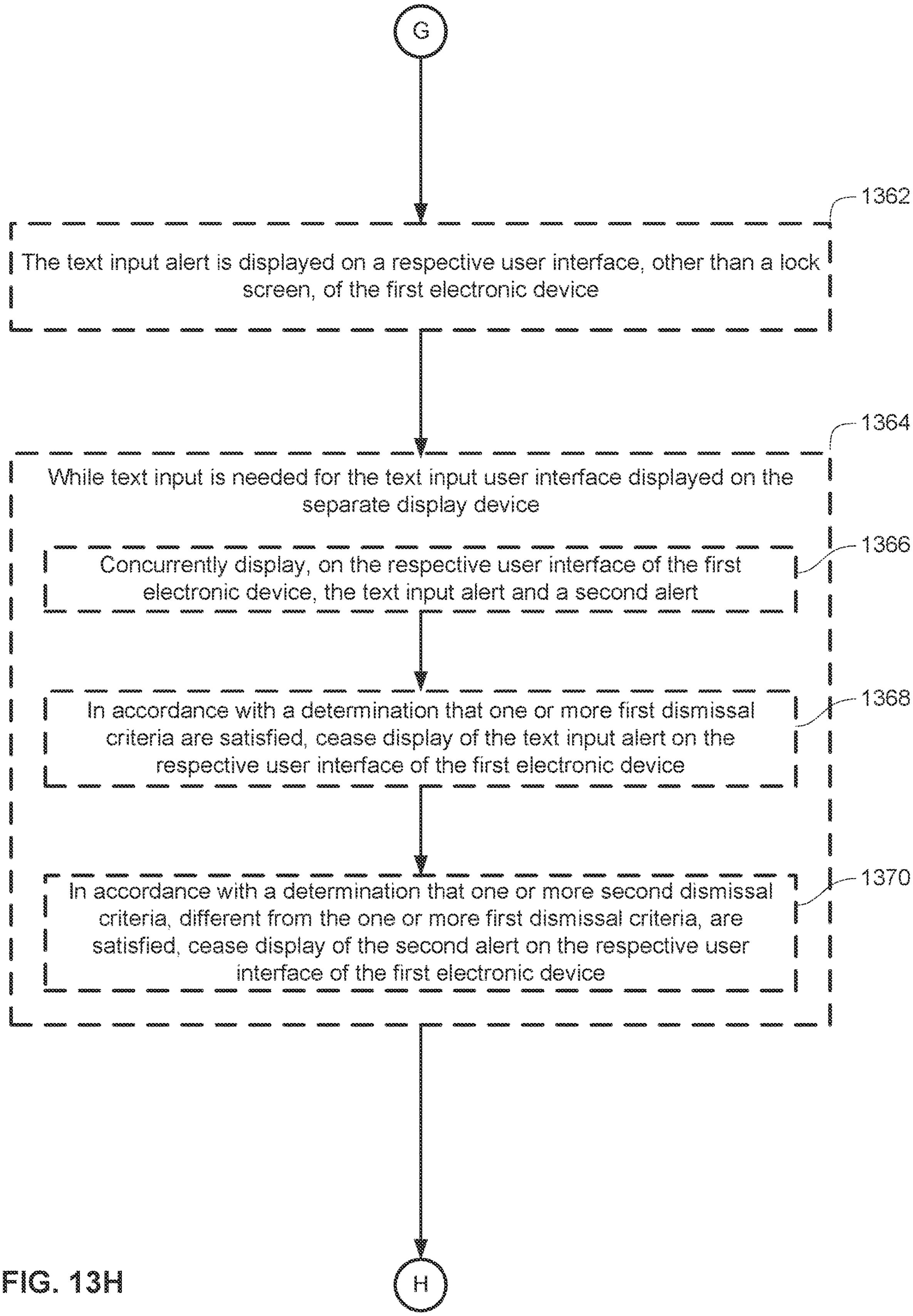
Figure 13I:
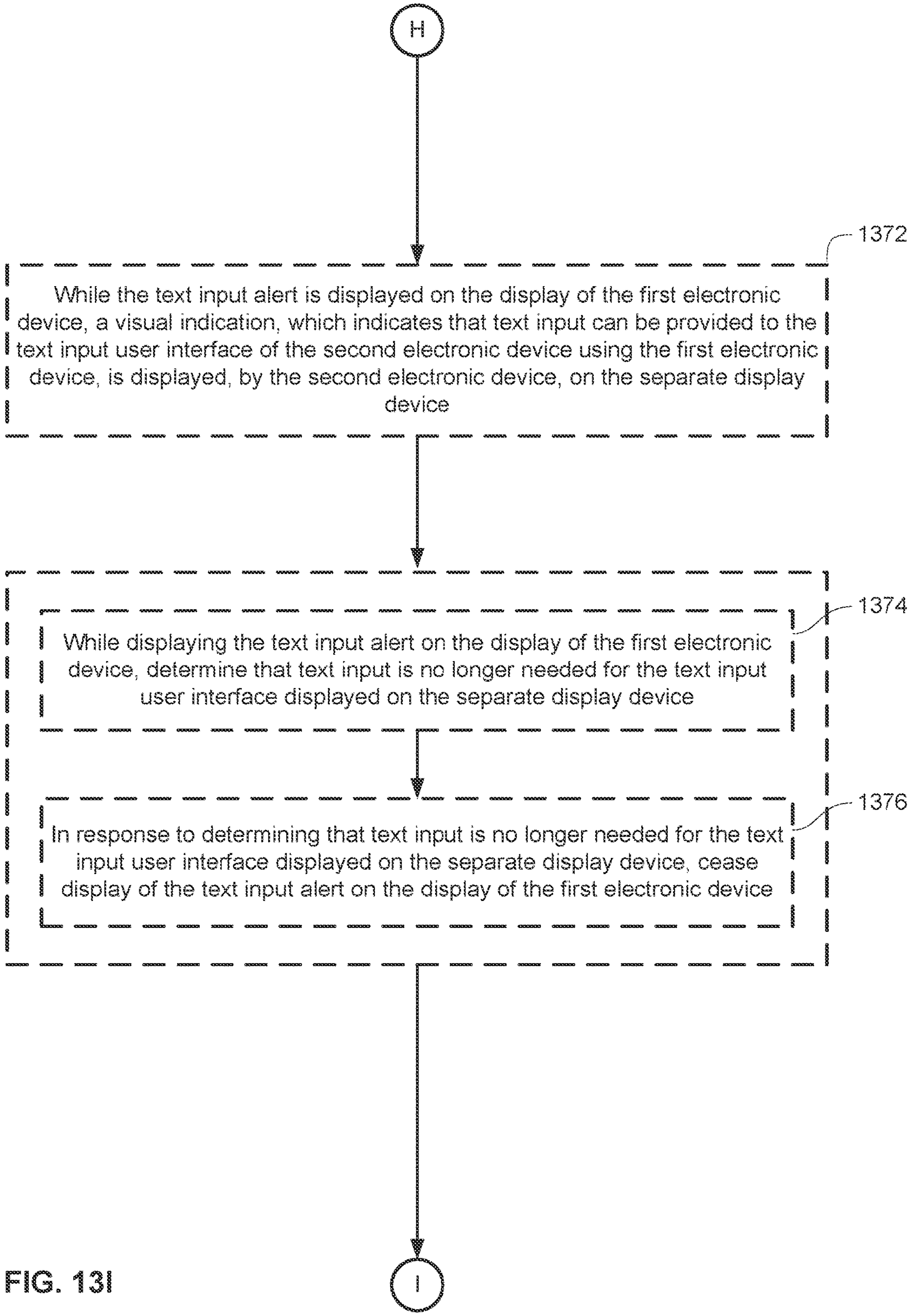
Figure 13J:
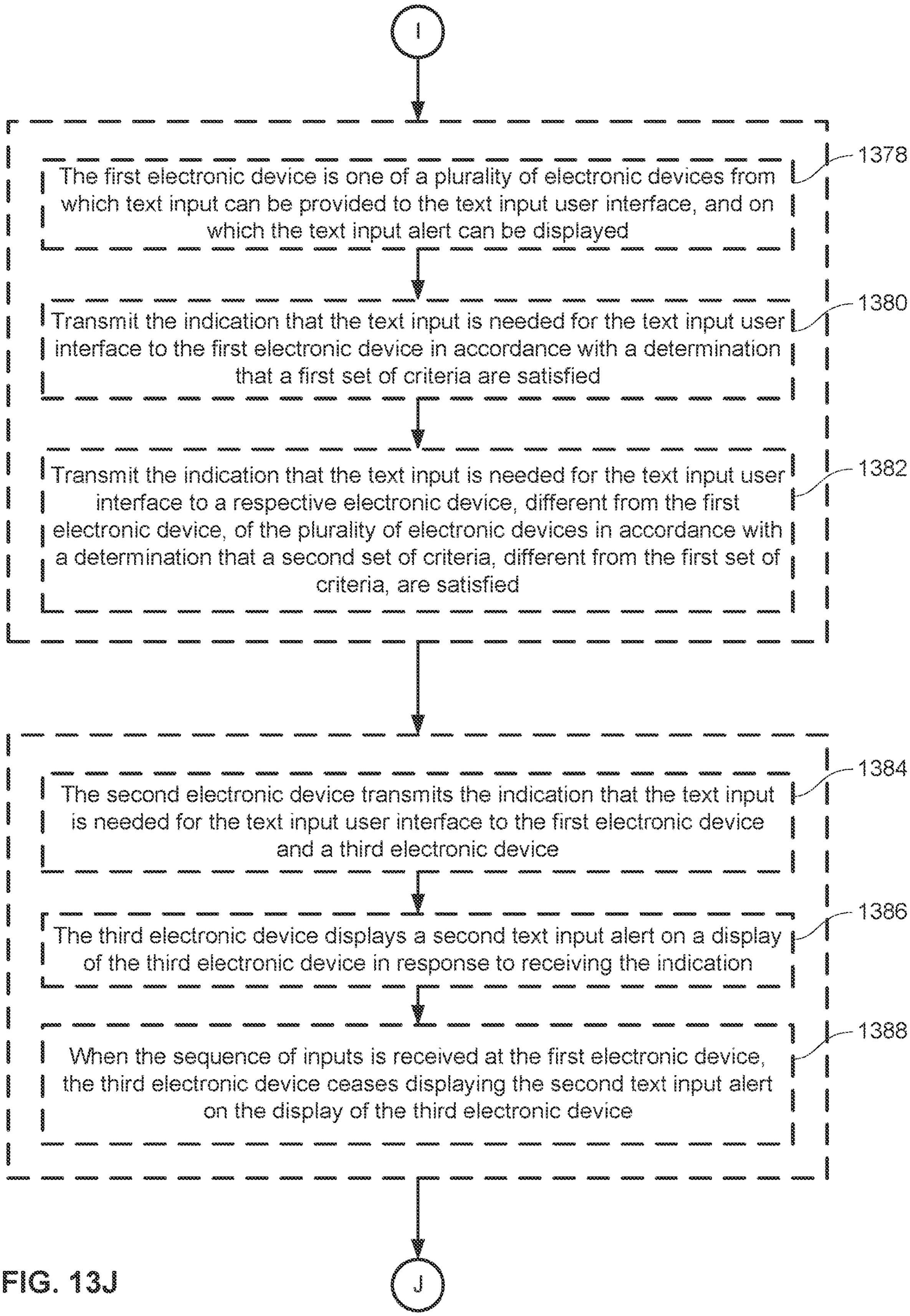
Figure 13K:
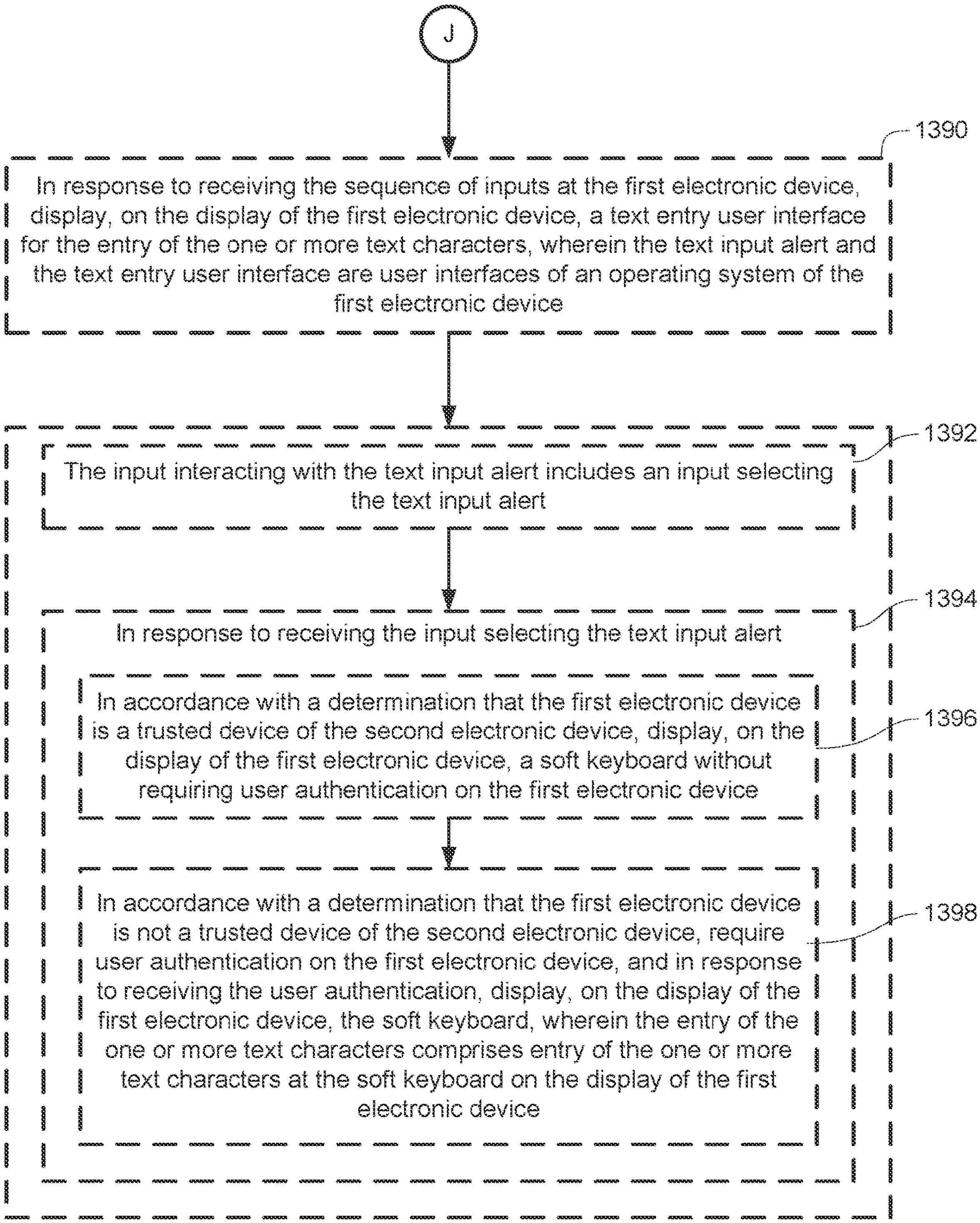

Selection of text input alert 1242 from home screen 1254 to enable entry of text from device 511 to text input user interface 1202 will be described with reference to FIGS. 12Y-12BB. In contrast to text input alert 1242 on lock screen 1240, selection of text input alert 1242 on home screen 1254 is optionally accomplished in response to a downward swipe of text input alert 1242. For example, in FIG. 12Y, contact 1203 has been detected on text input alert 1242. In FIGS. 12Z-12AA, contact 1203 is swiping downward on text input alert 1242, and thus pulling text input alert 1242 downward on device 511. As a result of the downward swipe of text input alert 1242, device 511 displays user interface 1244, as shown in FIG. 12BB, that optionally includes soft keyboard 1246 and text field 1248, as described previously with reference to FIG. 12K. Text input may be provided to text input user interface 1202 from user interface 1244.

Similar to as described with reference to lock screen 1240, text input alerts on home screen 1254 (or other user interfaces on device 511, outside of lock screen 1240) are optionally more "persistent" than other types of alerts, as will be described with reference to FIGS. 12CC-12EE. Specifically, in FIG. 12CC, device 511 is displaying text input alert 1242 on home screen 1254 (e.g., as described with reference to FIG. 12X). Text input alerts, such as text input alert 1242, displayed on home screen 1254 are optionally dismissed in response to the existence of different conditions than are alerts other than text input alerts (e.g., email alerts, text message alerts, voicemail alerts, etc.). For example, alerts other than text input alerts are optionally dismissed automatically once they have been displayed for a predetermined amount of time (e.g., 2, 3 or 5 seconds), whereas text input alerts, as long as text input for text entry user interface 1202 is needed, are optionally not dismissed automatically once they have been displayed for a predetermined amount of time (e.g., 2, 3 or 5 seconds).

For example, while device 511 was displaying text input alert 1242 on home screen 1254 in FIG. 12CC, device 511 optionally determines that John Smith has sent device 511 (or the user associated with device 511) a new email message. In response, device 511 displays email alert 1252 on home screen 1254, as illustrated in FIG. 12DD. In some embodiments, email alert 1252 is displayed concurrently with text input alert 1242, though in the embodiment of FIG. 12DD, email alert 1252 replaces display of text input alert 1242. After a predetermined amount of time (e.g., 2, 3 or 5 seconds) has elapsed since email alert 1252 was initially displayed, device 511 optionally dismisses email alert 1252. However, because text input for text entry user interface 1202 is still needed when email alert 1252 is dismissed, text input alert 1242 optionally remains displayed on home screen 1254, as illustrated in FIG. 12EE. Thus, text input alert 1242 is optionally more "persistent" than other types of alerts on home screen 1254.

Text input alert 1242 is optionally dismissed from home screen 1254 when a user explicitly dismisses it from home screen 1254 (in addition to being dismissed when text input is no longer needed for text entry user interface 1202). For example, in FIG. 12FF, a swipe up of text input alert 1242 is being detected by device 511. In response to the swipe, text input alert 1242 is optionally dismissed and no longer displayed on home screen 1254, as shown in FIG. 12GG.

In some embodiments, multiple multifunction devices may be in communication with electronic device 500. The behaviors of text input alerts on such multiple multifunction devices will be described with reference to FIGS. 12HH-12MM. In FIG. 12HH, electronic device 500 is optionally in a text entry mode, and is displaying text input user interface 1202 (e.g., as described with reference to FIG. 12E). Further, electronic device 500 is optionally in communication with devices 511A and 511B. Devices 511A and 511B are optionally multifunction devices, such as device 511 described previously. Device 511A is displaying home screen 1254A, and device 511B is displaying home screen 1254B. While FIGS. 12HH-12MM will be described with devices 511A and 511B displaying home screens 1254A and 1254B, respectively, it is understood that the examples of FIGS. 12HH-12MM are optionally implemented, in accordance with the disclosure above, in circumstances in which devices 511A and 511B are displaying lock screens, or circumstances in which one of devices 511A and 511B is displaying a lock screen, and the other of devices 511B is displaying a home screen (or any combination of user interfaces on devices 511A and 511B).

In some embodiments, in response to determining that text input is needed for text input user interface 1202, electronic device 500 only transmits an indication of the need for the text input to a subset of the devices with which electronic device 500 is in communication. In some embodiments, electronic device 500 transmits the indication to different devices in accordance with different criteria being satisfied. For example, 1) the one or more closest devices to electronic device 500 optionally are the devices that receive the indication; 2) one or more devices that are associated with (e.g., logged into) a user account that is authorized on electronic device 500 are optionally the devices that receive the indication; 3) one or more devices that have previously been paired with electronic device 500 are the devices that optionally receive the indication; 4) one or more devices that are on the same Wi-Fi network as electronic device 500 are optionally the devices that receive the indication; 5) one or more devices that are currently providing other input to electronic device 500 (e.g., currently controlling electronic device 500) are optionally the devices that receive the indication; and/or 6) one or more devices that are within a threshold distance of electronic device 500 are optionally the devices that receive the indication.

In FIG. 12HH, device 511B is optionally closer to electronic device 500 than is device 511A. As such, as shown in FIG. 12II, electronic device 500 optionally transmits the indication of the need for text input for text input user interface 1202 to device 511B, but not to device 511A. As a result, device 511B optionally displays text input alert 1242, while device 511A does not display a text input alert.

In some embodiments, electronic device 500 transmits the indication of the need for text input for text input user interface 1202 to multiple devices. For example, in FIG. 12JJ, both devices 511A and 511B have received the indication of the need for text input. As a result, device 511A is displaying text input alert 1242A, and device 511B is displaying text input alert 1242B, both indicating that text input is needed for text input user interface 1202. In some embodiments, to limit the number of devices that are concurrently providing text input to text input user interface 1202, if a user of one of devices 511A and 511B selects their respective text input alerts, the display of the text input alert on the other one of devices 511A and 511B is optionally ceased. For example, in FIGS. 12KK-12LL, a user of device 511B has swiped down text input alert 1242B to select it. As a result, device 511B displays user interface 1244 for entering text into text input user interface 1202, as shown in FIG. 12MM. Because text input alert 1242B on device 511B was selected, device 511A stops displaying text input alert 1242A, as shown in FIG. 12MM.

In some embodiments, authentication on device 511 is required before soft keyboard 1246 is displayed on device 511 (e.g., if text input alert 1242 is displayed on lock screen 1240 of device 511). Whether or not authentication is required optionally depends on whether device 511 is a trusted device of electronic device 500 (e.g., device 511 and electronic device 500 are on the same secured Wi-Fi network, or are signed into the same user account, such as an iCloud account). For example, in FIG. 12NN, device 511 is displaying text input alert 1242, as described with reference to FIG. 12E. Further, device 511 is a trusted device of electronic device 500 (indicated by "trusted" over the connection between device 511 and electronic device 500). Additionally, device 511 has detected a selection of text input alert 1242, as indicated by contact 1203. In response to the selection, because device 511 is a trusted device of electronic device 500, device 511 displays user interface 1244, including soft keyboard 1246, for providing text input to text input user interface 1202, without requiring authentication of device 511, as shown in FIG. 12OO. Exemplary details of user interface 1244 were described with reference to FIGS. 12K-12M.

In FIG. 12PP, device 511 is not a trusted device of electronic device 500 (indicated by "not trusted" over the connection between device 511 and electronic device 500). Device 511 has detected a selection of text input alert 1242, as indicated by contact 1203. In response to the selection, because device 511 is not a trusted device of electronic device 500, device 511 requests user authorization (e.g., a passcode) on lock screen 1240, as shown in FIG. 12QQ. If user authorization is not provided, device 511 optionally does not display soft keyboard 1246. On the other hand, if user authorization is provided in FIG. 12QQ, then device 511 displays user interface 1244, including soft keyboard 1246, for providing text input to text input user interface 1202, as shown in FIG. 12RR.

FIGS. 13A-13K are flow diagrams illustrating a method of indicating, on a multifunction device, the need for text input to an electronic device in accordance with some embodiments of the disclosure. The method 1300 is optionally performed at an electronic device such as device 100, device 300, device 500 or device 511 as described above with reference to FIGS. 1A-1B, 2-3 and 5A-5B. Some operations in method 1300 are, optionally, combined and/or the order of some operations is, optionally, changed.

As described below, the method 1300 provides ways of indicating, on a multifunction device, the need for text input to an electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device (e.g., a smartphone) with a display and one or more input devices (e.g., a touch screen), such as device 100 in FIG. 1A, 300 in FIGS. 3, 500 and/or 511 in FIG. 5A, displays (1302) a first user interface on the display of the first electronic device, wherein the first user interface is not a user interface of an application for controlling the second electronic device, such as in FIG. 12B (e.g., the first electronic device is optionally capable of running a remote control application for controlling the second electronic device from the first device, but the first user interface is not a user interface of the remote control application). For example, the first user interface is optionally a home screen of the first electronic device, such as in FIG. 12W, a lock screen of the first electronic device, such as in FIG. 12B, a user interface of an application other than the remote control application on the first electronic device, etc. In some embodiments, the first electronic device is configured to communicate with a second electronic device (e.g., a set top box) and the second electronic device is controlling display of a text input user interface (e.g., a text entry user interface, such as a search user interface) on a separate display device (e.g., a television) that is separate from the first electronic device, such as in FIG. 5A.

In some embodiments, while the first user interface is displayed on the display of the first electronic device, the first electronic devices receives (1304), from the second electronic device, an indication that text input is needed for the text input user interface displayed on the separate display device, such as in FIG. 12E (e.g., a text field in the text input user interface has been selected, a soft keyboard has been displayed in the text input user interface, a current focus in the text input user interface has been moved to a soft keyboard displayed in the text input user interface, etc.). In some embodiments, in response to receiving, from the second electronic device, the indication that the text input is needed for the text input user interface displayed on the separate display device, the first electronic device displays (1306) a text input alert on the display of the first electronic device, such as in FIG. 12E (e.g., replacing display of at least a portion of the first user interface with the text input alert). Thus, a user of the first electronic device is notified of the need for text input into the text input user interface, and of the ability to provide such text input from the first electronic device. This increases the efficiency of the interactions between the user and the second electronic device, thus reducing power consumption associated with those interactions. The first electronic device optionally receives (1308), via the one or more input devices of the first electronic device, a sequence of inputs including an input interacting with the text input alert and entry of one or more text characters, such as in FIGS. 12J-12M (e.g., selecting of the text input alert followed by entry of one or more characters on a soft keyboard displayed on a touch-sensitive display of the first electronic device). In some embodiments, in response to receiving the sequence of one or more inputs, the first electronic device transmits (1310), from the first electronic device to the second electronic device, information that enables the one or more text characters to be provided as text input for the text input user interface displayed on the separate display device, wherein providing the one or more text characters as text input for the text input user interface displayed on the separate display device causes the text input user interface on the separate display device to be updated in accordance with the one or more text characters, such as in FIGS. 12J-12M (e.g., a user name entry field is updated to show the user name, a search query is executed based on the one or more text characters, etc.).

In some embodiments, in accordance with the one or more text characters being first text characters, the text input user interface is updated (1312) with a first update, such as in FIG. 12L. In accordance with the one or more text characters being second text characters, different from the first text characters, the text input user interface is optionally updated (1314) with a second update, different from the first update, such as in FIG. 12M (e.g., the text input user interface is updated differently based on the text characters that are provided to it). For example, if an "A" is provided as an input, the text input user interface is updated based on the "A" input (e.g., updated to display "A" in a text input field), whereas if a "B" is provided as an input, the text input user interface is updated based on the "B" input (e.g., updated to display "B" in a text input field).

In some embodiments, the text input user interface displayed on the separate display device includes a soft keyboard (1316), such as in FIG. 12E (e.g., a soft keyboard having keys that are selectable to enter text corresponding to the selected keys into the text input user interface). This soft keyboard is optionally utilized to provide text input to the text input user interface with a remote control, or a multifunction device configured to operate as a remote control, as the second electronic device optionally does not include a hardware keyboard. In some embodiments, the indication that the text input is needed for the text input user interface is received (1318) in response to the soft keyboard getting a current focus in the text input user interface, such as in FIG. 12G (e.g., the focus in the text input user interface is moved to the soft keyboard in accordance with input from a remote control, the first electronic device or another electronic device that controls the second electronic device). In some embodiments, the indication that text input is needed for the text input user interface displayed on the separate display device is received (1320) in response to a request, received by the second electronic device, to enter text into the text input user interface without a soft keyboard being displayed in the text input user interface, such as in FIG. 12H (e.g., selection of a text field in the text input user interface causes the second electronic device to send the first electronic device the indication that text input is needed in the text input user interface, without the second electronic device displaying a soft keyboard in the text input user interface). Instead, a soft keyboard is optionally displayed on the display of the first electronic device for entering the text input.

In some embodiments, the input interacting with the text input alert includes an input selecting the text input alert, such as in FIG. 12J (e.g., a tap of the text input alert, a rightward swipe of the text input alert, a downward swipe of the text input alert, a touch with force above a force threshold, higher than a tap force threshold, of the text input alert). In response to receiving the input selecting the text input alert, the first electronic device optionally displays (1322), on the display of the first electronic device, a soft keyboard, wherein the entry of the one or more text characters comprises entry of the one or more text characters at the soft keyboard on the display of the first electronic device, such as in FIGS. 12K-12M (e.g., text input is provided to the second electronic device via the soft keyboard displayed on the first electronic device).

In some embodiments, in accordance with a determination that the text input alert is displayed on a first respective user interface of the first electronic device (e.g., a lock screen of the first electronic device), the input selecting the text input alert is a first input (1322), such as in FIG. 12J (e.g., swiping to the right on the text input alert, or a touch with force above a force threshold, higher than a tap force threshold, of the text input alert). In accordance with a determination that the text input alert is displayed on a second respective user interface of the first electronic device (e.g., a home screen or other user interface of an application running on the first electronic device), different from the first respective user interface, the input selecting the text input alert is optionally a second input (1326) (e.g., swiping down on the text input alert), different from the first input, such as in FIGS. 12Y-12AA.

In some embodiments, the indication that text input is needed for the text input user interface displayed on the separate display device is received (1328) in response to a request, received by the second electronic device, to enter text into the text input user interface (e.g., selection of a text field in the text input user interface, display of a soft keyboard on the text input user interface, changing a current focus in the text input user interface to a soft keyboard displayed in the text input user interface), the request received by the second electronic device from a remote control device, different from the first and second electronic devices, such as in FIGS. 12C-12H. In some embodiments, after the text input alert is displayed on the display of the first electronic device, the second electronic device receives (1330) input from the remote control device for entering second one or more text characters into the text input user interface, such as in FIGS. 12O-12Q (e.g., input selecting one or more keys of a soft keyboard displayed in the text input user interface). The input from the remote control device optionally causes (1332) the text input user interface to be updated in accordance with the second one or more text characters, such as in FIGS. 12O-12Q (e.g., even though the first electronic device displays the text input alert, and is capable of entering text into the text input user interface, a remote control device is optionally also able to enter text into the text input user interface). In some embodiments, the remote control device is a dedicated remote control device that enters characters into the text input user interface via directional inputs that move a focus in the text input user interface between keys in a virtual keyboard displayed in the text input user interface, such as in FIGS. 12O-12Q.

In some embodiments, after transmitting, from the first electronic device to the second electronic device, the information that enables the one or more text characters to be provided as text input for the text input user interface, the first electronic device receives (1334), via the one or more input devices of the first electronic device, input for running a remote control application on the first electronic device, such as in FIG. 12A (e.g., after providing the text input to the second electronic device via a soft keyboard that is part of the operating system of the first electronic device, launching a remote control application on the first electronic device for controlling the second electronic device). In some embodiments, in response to receiving (1336) the input for running the remote control application on the first electronic device, the first electronic device runs (1338) the remote control application on the first electronic device, such as in FIG. 12A. The first electronic device optionally controls (1340) the second electronic device via one or more inputs received at the remote control application, such as in FIG. 12A (e.g., receiving directional or other inputs in the remote control application, and controlling the second electronic device in accordance with those input).

In some embodiments, the first electronic device displays (1342), on the display of the first electronic device, a plurality of categories of alerts (e.g., alerts for incoming text messages, alerts for incoming calls, alerts for incoming emails, etc.), including a first category of alerts (e.g., text input alerts) and a second category of alerts (e.g., alerts for incoming text messages, etc.), wherein the text input alert is included in the first category of alerts, such as in FIGS. 12R-12S. The first electronic device optionally generates (1344) a first notification type (e.g., a visual notification with vibration of the first electronic device but no sound, or a visual notification with no sound or vibration at the first electronic device) at the first electronic device in response to displaying an alert in the first category of alerts, including the text input alert, such as in FIG. 12R. In some embodiments, the first electronic device generates (1346) a second notification type (e.g., vibration of the first electronic device and sound), different from the first notification type, in response to displaying an alert in the second category of alerts, such as in FIG. 12S (e.g., the first electronic device optionally treats text input alerts differently from other types of alerts). In this way, a user of the first electronic device is able to easily discern, without looking at the first electronic device, whether the first electronic device is displaying a text input alert, or a different type of alert. This saves power on the first electronic device, as the display of the electronic device can remain off. For example, other types of alerts optionally cause the first electronic device to generate a sound and/or vibration, whereas text input alerts optionally cause the first electronic device to only generate a vibration of the first electronic device, or cause the first electronic device to not generate vibration or sound at all.

In some embodiments, the text input alert is displayed (1348) on a lock screen of the first electronic device, such as in FIG. 12R (e.g., a user interface of the first electronic device that is displayed while the first electronic device is in a locked state). In some embodiments, user input on the lock screen is limited to selection of an alert displayed on the lock screen (e.g., text input alerts, incoming email alerts, incoming call alerts, incoming text message alerts, etc.), or entry of authentication information for unlocking the first electronic device. In some embodiments, the first electronic device concurrently displays (1350), on the lock screen of the first electronic device, the text input alert and a second alert, such as in FIG. 12S (e.g., multiple types of alerts are concurrently displayed on the lock screen of the first electronic device, such as the text input alert and an incoming email alert). In some embodiments, while text input is needed (1352) for the text input user interface displayed on the separate display device (e.g., while the second electronic device indicates to the first electronic device that text input is needed for the text input user interface): while concurrently displaying, on the lock screen of the first electronic device, the text input alert and the second alert (e.g., an incoming email alert), the first electronic device receives (1354), via the one or more input devices of the first electronic device, an input for dismissing the lock screen of the first electronic device, such as in FIG. 12T (e.g., input for unlocking the first electronic device). In response to receiving the input for dismissing the lock screen, the first electronic device optionally ceases (1356) the display of the lock screen on the display of the first electronic device, such as in FIG. 12T (e.g., displaying a home screen of the first electronic device after the first electronic device is unlocked). In some embodiments, after ceasing the display of the lock screen of the first electronic device, the first electronic device receives (1358), via the one or more input devices of the first electronic device, an input for displaying the lock screen on the display of the first electronic device, such as in FIG. 12U (e.g., receiving an input locking the first electronic device). In response to receiving the input for displaying the lock screen of the first electronic device, the first electronic device optionally displays (1360) the lock screen on the display of the first electronic device, wherein the lock screen includes the text input alert, but not the second alert, such as in FIG. 12U (e.g., dismissing the lock screen of the first electronic device optionally causes alerts, other than text input alerts, to be dismissed and not displayed again on the lock screen. In contrast, text input alerts are optionally "persistent" in that they are always displayed on the lock screen of the first electronic device as long as text input is needed in the text input user interface of the second electronic device). In this way, a user of the first electronic device maintains awareness of the need for text input in the text input user interface, which increases the efficiency of the interactions between the user and the second electronic device, reducing power consumption associated with those interactions.

In some embodiments, the text input alert is displayed (1362) on a respective user interface, other than a lock screen, of the first electronic device, such as in FIG. 12CC (e.g., a home screen, or a user interface of an application running on the first electronic device). In some embodiments, while text input is needed (1364) for the text input user interface displayed on the separate display device (e.g., while the second electronic device indicates to the first electronic device that text input is needed for the text input user interface): the first electronic device concurrently displays (1366), on the respective user interface of the first electronic device, the text input alert and a second alert, such as described with reference to FIG. 12DD (e.g., an incoming email alert). In accordance with a determination that one or more first dismissal criteria are satisfied (e.g., the user dismisses the text input alert, etc.), the first electronic device optionally ceases (1368) display of the text input alert on the respective user interface of the first electronic device, such as in FIG. 12EE. In some embodiments, in accordance with a determination that one or more second dismissal criteria (e.g., a time threshold has been reached, the user dismisses the second alert, etc.), different from the one or more first dismissal criteria, are satisfied, the first electronic device ceases (1370) display of the second alert on the respective user interface of the first electronic device, such as described with reference to FIG. 12EE (e.g., the criteria for dismissing a text input alert are optionally different than the criteria for dismissing other alert types, because text input alerts are optionally more “persistent” than other alert types as long as text input is needed in the text input user interface of the second electronic device). For example, other alert types are optionally dismissed either in response to user input dismissing them, or a time threshold having been reached since the alerts were displayed. In contrast, text input alerts are optionally displayed until the user dismisses them—text input alerts are optionally not dismissed in response to a time threshold being reached.

In some embodiments, while the text input alert is displayed on the display of the first electronic device, a visual indication, which indicates that text input can be provided to the text input user interface of the second electronic device using the first electronic device, is displayed (1372), by the second electronic device, on the separate display device, such as in FIG. 12E (e.g., a visual indication is displayed in the text input user interface that indicates to the user that text input can be provided using the first electronic device). This visual indication on the separate display device notifies users who can see the separate display of the ability to provide text input to the text input user interface using the first electronic device—something these users may not have known was possible. This increases the efficiency of the interactions between the users and the second electronic device, thus reducing power consumption associated with those interactions. In some embodiments, while displaying the text input alert on the display of the first electronic device, the first electronic device determines (1374) that text input is no longer needed for the text input user interface displayed on the separate display device, such as in FIG. 12V (e.g., the second electronic device optionally transmits, to the first electronic device, an indication that the text input is no longer needed. For example, completion of text entry, or navigation away from the text input user interface, optionally cause the second electronic device to indicate as much to the first electronic device). In response to determining that text input is no longer needed for the text input user interface displayed on the separate display device, the first electronic device optionally ceases (1376) display of the text input alert on the display of the first electronic device, such as in FIG. 12V (e.g., when text input is no longer needed, the text input alert is optionally no longer displayed).

In some embodiments, the first electronic device is one of a plurality of electronic devices from which text input can be provided to the text input user interface, and on which the text input alert can be displayed (1378), such as in FIG. 12HH (e.g., a plurality of smartphones in the vicinity of the second electronic device have the ability to provide text input to the second electronic device via soft keyboards displayed on their respective touch screens). For example, multiple users with separate smartphones may be interacting with the second electronic device/text input user interface concurrently, in a group setting, providing the ability for multiple users to interact with the second electronic device in parallel, thus increasing the efficiency of those interactions with the second electronic device. In some embodiments, the second electronic device is configured to: transmit (1380) the indication that the text input is needed for the text input user interface to the first electronic device in accordance with a determination that a first set of criteria are satisfied, such as in FIG. 12II. In some embodiments, the second electronic device is configured to: transmit (1382) the indication that the text input is needed for the text input user interface to a respective electronic device, different from the first electronic device, of the plurality of electronic devices in accordance with a determination that a second set of criteria, different from the first set of criteria, are satisfied, such as in FIG. 12II (e.g., not every one of the plurality of electronic devices receives the indication of needed text input from the second electronic device, and thus, not every one of the plurality of electronic devices displays a text input alert corresponding to the need for the text input at the second electronic device). Different electronic devices optionally receive the indication from the second electronic device in accordance with different criteria being satisfied. For example, 1) the one or more closest electronic devices to the second electronic device optionally are the electronic devices that receive the indication; 2) one or more electronic devices that are associated with (e.g., logged into) a user account that is authorized on the second electronic device are optionally the electronic devices that receive the indication; 3) one or more electronic devices that have previously been paired with the second electronic device are optionally the electronic devices that receive the indication; 4) one or more electronic devices that are on the same Wi-Fi network as the second electronic device are optionally the electronic devices that receive the indication; 5) one or more electronic devices that are currently providing other input to the second electronic device (e.g., currently controlling the second electronic device) are optionally the electronic devices that receive the indication; and/or 6) one or more electronic devices that are within a threshold distance of the second electronic device are optionally the electronic devices that receive the indication.

In some embodiments, the second electronic device transmits (1384) the indication that the text input is needed for the text input user interface to the first electronic device (e.g., a first smartphone in the vicinity of the second electronic device) and a third electronic device (e.g., a second smartphone in the vicinity of the second electronic device), such as in FIG. 12JJ. The third electronic device optionally displays (1386) a second text input alert on a display of the third electronic device in response to receiving the indication, such as in FIG. 12JJ (e.g., a text input alert is displayed on the first electronic device and the third electronic device in response to text input being needed in the text input user interface). In some embodiments, when the sequence of inputs is received at the first electronic device, the third electronic device ceases displaying (1388) the second text input alert on the display of the third electronic device, such as in FIGS. 12KK-12MM (e.g., once one of the electronic devices on which a text input alert is displayed receives an input for selecting its text input alert, the text input alerts displayed on other devices are dismissed so that only one electronic device provides text input to the second electronic device at any one moment in time).

In some embodiments, in response to receiving the sequence of inputs at the first electronic device, the first electronic device displays (1390), on the display of the first electronic device, a text entry user interface for the entry of the one or more text characters (e.g., a soft keyboard), wherein the text input alert and the text entry user interface are user interfaces of an operating system of the first electronic device, such as in FIGS. 12J-12K (e.g., the text input alert and the text entry user interface are built into the first electronic device and/or its operating system software, and are not part of a separate remote control application, on the first electronic device, for controlling the second electronic device). In some embodiments, the input interacting with the text input alert includes an input selecting the text input alert (1390), such as in FIG. 12J (e.g., a tap of the text input alert, a rightward swipe of the text input alert, a downward swipe of the text input alert, a touch with force above a force threshold, higher than a tap force threshold, of the text input alert). In some embodiments, in response to receiving (1394) the input selecting the text input alert: in accordance with a determination that the first electronic device is a trusted device of the second electronic device (e.g., the first electronic device and the second electronic device are on the same secured Wi-Fi network, or are signed into the same user account, such as an iCloud account), the first electronic device displays (1396), on the display of the first electronic device, a soft keyboard without requiring user authentication on the first electronic device, such as in FIGS. 12NN-12OO. In some embodiments, in accordance with a determination that the first electronic device is not a trusted device of the second electronic device, the first electronic device requires (1398) user authentication on the first electronic device, and in response to receiving the user authentication, displays, on the display of the first electronic device, the soft keyboard, such as in FIGS. 12PP-12RR (e.g., if the first electronic device is not a trusted device of the second electronic device, a user must unlock or otherwise enter authentication credentials for the first electronic device before text input to the second electronic device via the first electronic device is allowed), wherein the entry of the one or more text characters comprises entry of the one or more text characters at the soft keyboard on the display of the first electronic device (e.g., text input is provided to the second electronic device via the soft keyboard displayed on the first electronic device). Requiring user authentication before allowing text input from a non-trusted device helps ensure that unwanted and/or unauthorized input to the text input user interface is avoided.

It should be understood that the particular order in which the operations in FIGS. 13A-13K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500, 1700 and 1900) are also applicable in an analogous manner to method 1300 described above with respect to FIGS. 13A-13K. For example, the touch inputs, software remote control applications, simulated buttons, and/or simulated remote trackpads described above with reference to method 1300 optionally have one or more of the characteristics of the touch inputs, software remote control applications, simulated buttons, and/or simulated remote trackpads described herein with reference to other methods described herein (e.g., methods 700, 900, 1100, 1500, 1700 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 23) or application specific chips. Further, the operations described above with reference to FIGS. 13A-13K are, optionally, implemented by components depicted in FIGS. 1A-1B. For example, displaying operations 1302 and 1306, receiving operations 1304 and 1308 and transmitting operation 1310 are, optionally, implemented by event sorter 170, event recognizer 180, and event handler 190. Event monitor 171 in event sorter 170 detects a contact on the touch screen of device 511, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Primary Touch Navigation Area Selection

Users interact with electronic devices in many different manners, including interacting with content (e.g., music, movies, etc.) that may be available (e.g., stored or otherwise accessible) on the electronic devices. In some circumstances, a user may interact with an electronic device by alternating between using a dedicated remote control and a multifunction device to provide navigational inputs (e.g., swipes for scrolling content) to the electronic device. However, in some circumstances, the sizes of touch-sensitive surfaces for providing such navigational input on the dedicated remote control and the multifunction device differ. The embodiments described below provide ways in which the multifunction device selects a primary touch navigation area on its touch-sensitive surface that behaves similarly to the touch-sensitive surface of the dedicated remote control to provide users with a consistent input experience across the remote control and the multifunction device, thereby enhancing users' interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 14A-14GG illustrate exemplary ways in which a multifunction device selects a primary touch navigation area on its touch-sensitive surface that behaves similarly to the touch-sensitive surface of a dedicated remote control in accordance with some embodiments of the disclosure. The embodiments in these figures are used to illustrate the processes described below, including the processes described with reference to FIGS. 15A-15H.

Figure 14A:
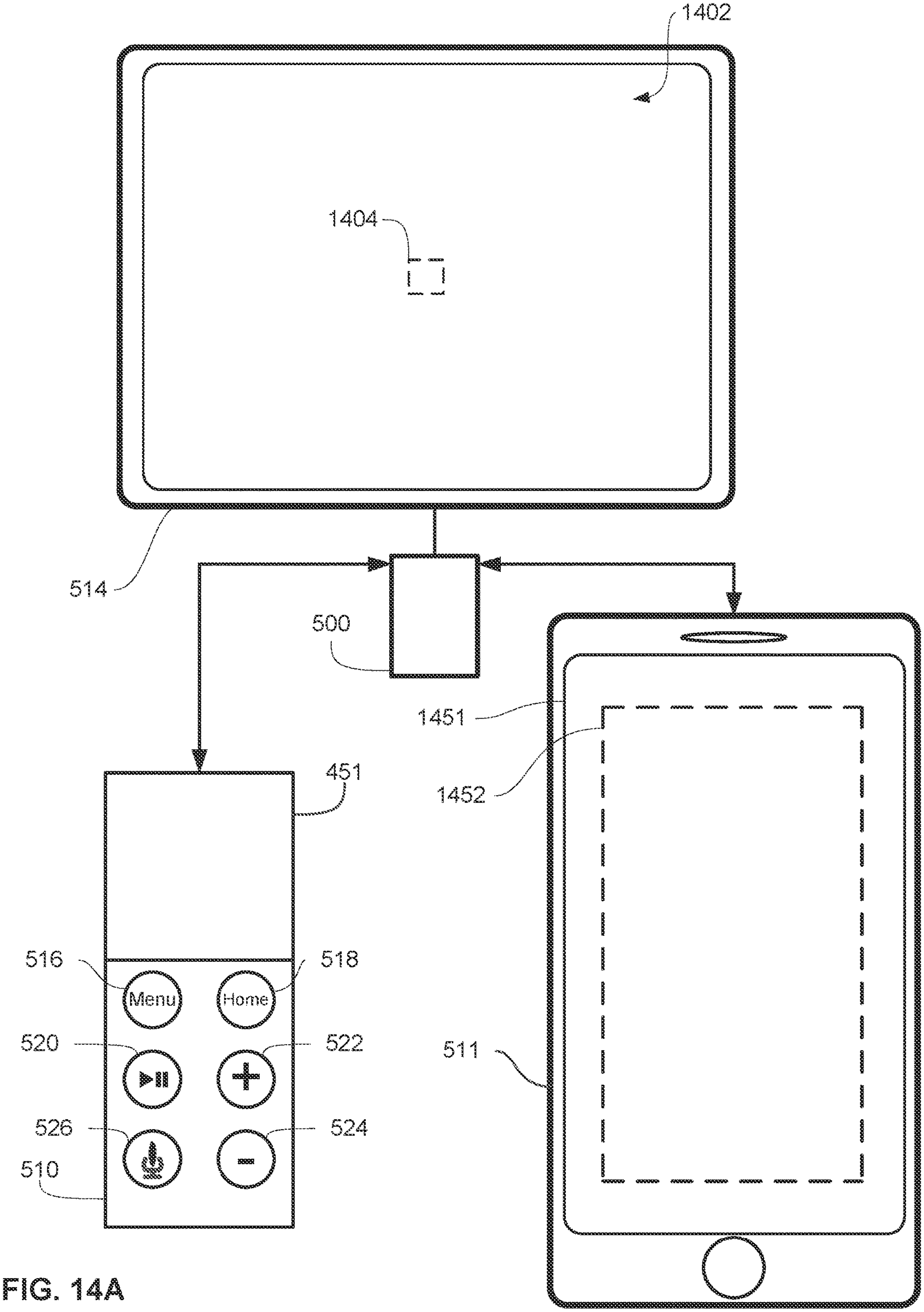
FIGS. 14A-14GG illustrate exemplary ways in which a multifunction device selects a primary touch navigation area on its touch-sensitive surface that behaves similarly to the touch-sensitive of a dedicated remote control in accordance with some embodiments of the disclosure.

FIG. 14A illustrates exemplary display 514. Display 514 optionally displays one or more user interfaces that include various content. In the example illustrated in FIG. 14A, display 514 displays user interface 1402 including cursor 1404, which corresponds to a current selection location of the user interface 1402 (e.g., receiving a selection input from an input device, such as a dedicated remote control, optionally selects an item in user interface 1402 over which cursor 1404 is positioned). User interface 1402 is optionally displayed by an application running on an electronic device (e.g., electronic device 500 of FIG. 5A) of which display 514 is a part, or to which display 514 is connected. Though user interface 1402 is illustrated as including cursor 1404, it is understood that cursor 1404 optionally corresponds to and/or represents any object or action that is controllable via a directional or navigational input received from an input device. For example, cursor 1404 moving to the left in user interface 1402 in response to a leftward directional input received from an input device optionally additionally or alternatively represents a list in user interface 1402 scrolling to the left, a character in a game moving to the left, scrubbing backwards (e.g., "to the left") through content playing on the electronic device, etc.

As described with reference to FIGS. 5A-5B, electronic device 500 is optionally controlled using remote 510 and/or device 511. Specifically, remote 510 and device 511 are optionally in communication with electronic device 500, and provide input to electronic device 500. Remote 510 optionally has features described with reference to FIG. 5B for providing input to electronic device 500. For example, selection of one or more of buttons 516, 518, 520, 522, 524 and 526 optionally causes remote 510 to transmit corresponding commands to electronic device 500, to which electronic device 500 responds accordingly. Touch-sensitive surface 451 is optionally for providing tap, click, selection, navigational and/or movement inputs to electronic device 500, to which electronic device 500 responds accordingly. For example, touch inputs (e.g., a swipe) detected on touch-sensitive surface 451 optionally control the location of cursor 1404 in user interface 1402.

Device 511 is optionally a multifunction device. In some embodiments, device 511 is a mobile telephone configured to run applications and perform multiple functions, such as telephone functions, messaging functions, etc., that are independent of controlling electronic device 500. In some embodiments, device 511 runs a remote control application that configures device 511 to operate as a remote control for electronic device 500, or device 511 is configured as part of its operating system to operate as a remote control for electronic device 500. In FIG. 14A, device 511 includes touch screen 1451 including touch navigation region 1452. Touch navigation region 1452 is optionally visible (e.g., visually differentiated from other UI elements on the display such as by being displayed with a visible border or in a different color than surrounding UI elements) or not visible on touch screen 1451. Touch navigation region 1452 is optionally an area of touch screen 1451 for providing tap, click, selection, navigational and/or movement inputs to electronic device 500, to which electronic device 500 responds accordingly. For example, touch inputs (e.g., a swipe) detected in touch navigation region 1452 optionally control the location of cursor 1404 in user interface 1402. In some embodiments, device 511 ignores and/or does not transmit touch inputs detected outside of touch navigation region 1452 to electronic device 500. In some embodiments, touch navigation region 1452 is a touch input region where the device accepts free-form touch inputs such as swipes, flicks, and taps and sends information about those touch inputs to a device that controls the user interface displayed on display 514, and touch inputs outside of touch navigation region 1452 are processed based on what user interface element they are detected on or near (e.g., a tap input on a button displayed outside of touch navigation region 1452 will be processed as an activation of that button, such as in FIGS. 14FF-14GG).

Because device 511 is able to operate as a remote control for electronic device 500, a user may wish to provide touch inputs to electronic device 500 via device 511, in addition or alternatively via remote 510. However, touch screen 1451 and/or touch navigation region 1452 of device 511 are optionally sized differently than touch-sensitive surface 451 of remote 510 (e.g., smaller or larger). Therefore, a user may be presented with a different experience when providing touch inputs to electronic device 500 via remote 510 than when providing touch inputs to electronic device 500 via device 511. Accordingly, in some embodiments, it is beneficial for device 511 to more closely mimic the layout and/or operation of remote 510 for providing touch inputs to electronic device 500 to maintain touch input consistency for a user across remote 510 and device 511, which improves the human-machine interface between the user and devices 500, 511 and/or remote 510.

Figure 14B:
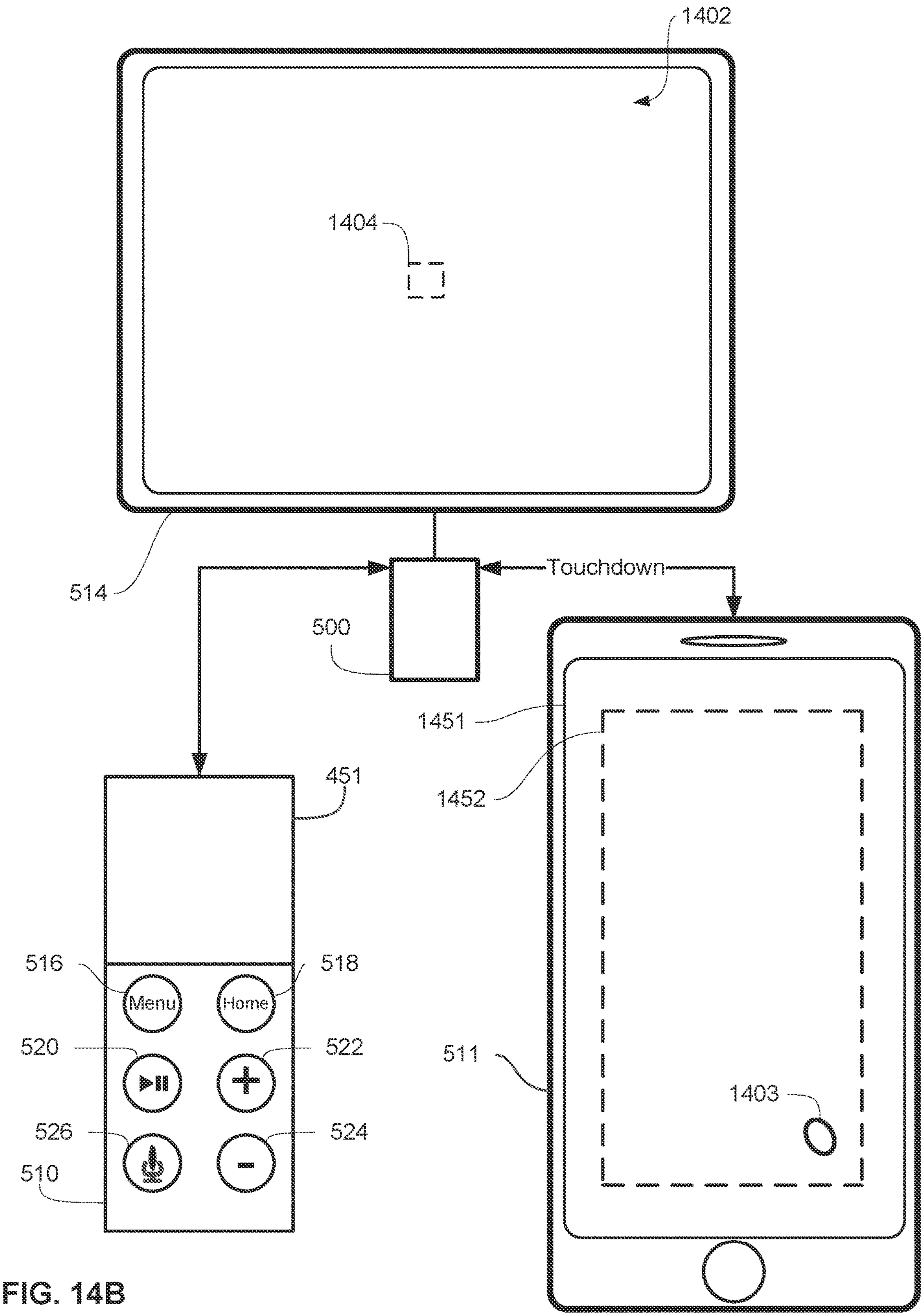
Figure 14C:
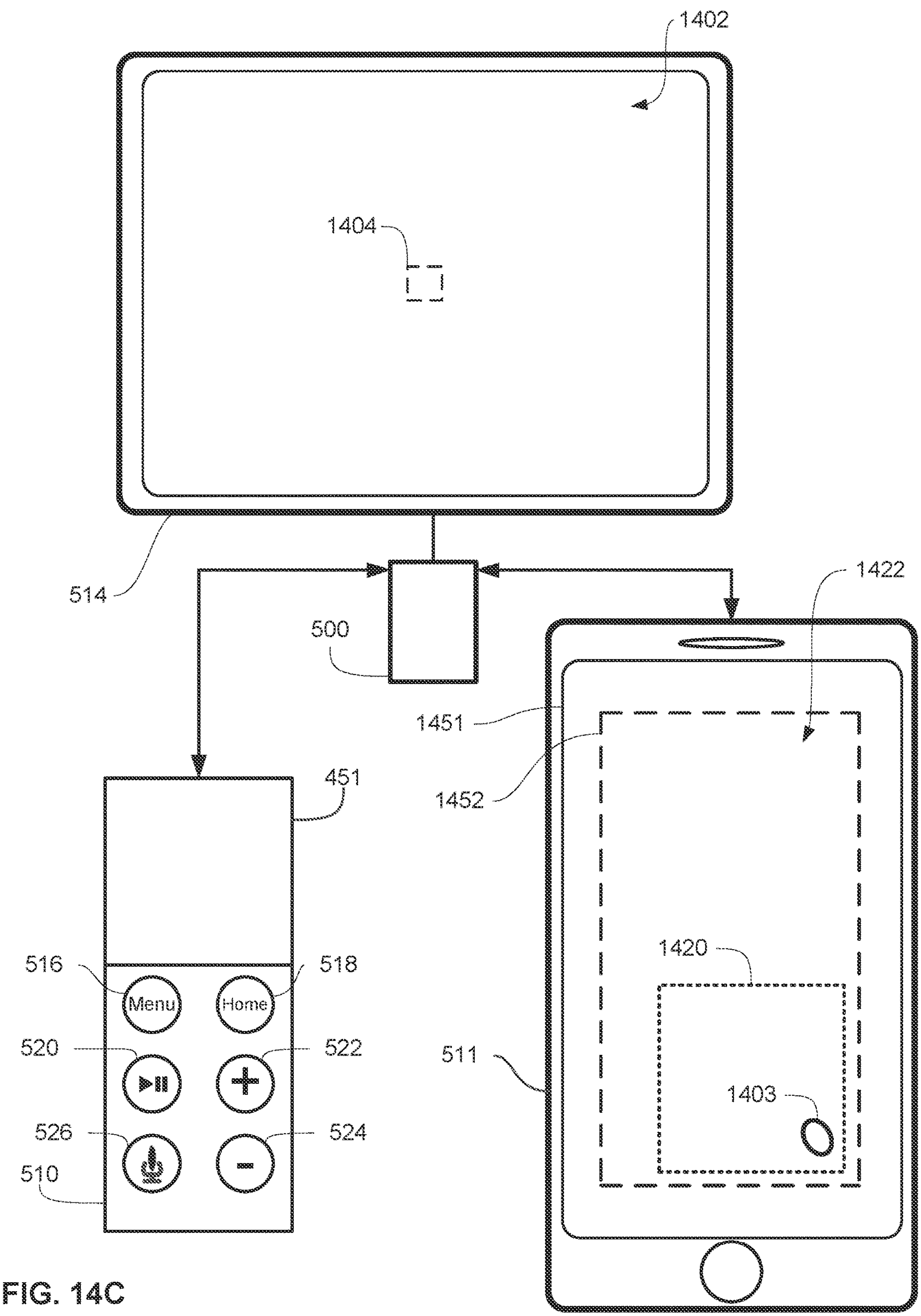

Therefore, as shown in FIGS. 14B-14C, device 511 optionally defines a primary touch navigation area in touch navigation region 1452 that shares one or more characteristics with touch-sensitive surface 451 of remote 510 when a user provides touch input in touch navigation region 1452 of device 511. Specifically, in FIG. 14B, device 511 detects touchdown of contact 1403 (e.g., at the beginning of touch input provided by a user) in touch navigation region 1452. In FIG. 14B, contact 1403 has been detected in the lower-right region of touch navigation region 1452. In some embodiments, device 511 transmits a "touchdown" command to electronic device 500 that is the same as a corresponding "touchdown" command that remote 510 transmits to electronic device 500 in response to detecting touchdown of a contact on touch-sensitive surface 451. As such, device 511 optionally appears no differently to electronic device 500 than does remote 510, and electronic device 500 need not be specially configured/programmed to respond to touch inputs provided by device 511.

In response to detecting contact 1403, device 511 selects primary touch navigation area 1420 in touch navigation region 1452 that includes the location at which contact 1403 was detected, as shown in FIG. 14C. Primary touch navigation area 1420 is optionally visible or not visible on touch screen 1451, is a subset of touch navigation region 1452, and excludes auxiliary area 1422 of touch navigation region 1452. In some embodiments, primary touch navigation area 1420 is an area in touch navigation region 1452 in which touch inputs cause a first kind of response, such as scrolling at a first speed in response to a swipe input, while touch inputs detected outside of primary touch navigation area 1420 (e.g., in auxiliary area 1422) cause a second kind of response, such as scrolling at a second speed, different from the first speed, in response to a swipe input, as will be described in more detail below. In FIG. 14C, primary touch navigation area 1420 shares characteristics with touch-sensitive surface 451 on remote 510 in that primary touch navigation area 1420 is the same/similar size as touch-sensitive surface 451, and device 511 optionally responds similarly to movement of contact 1403 detected within primary touch navigation area 1420 as does remote 510 to movement of a contact detected within touch-sensitive surface 451. Therefore, a user has the same or similar sized area for providing touch input on device 511 as on remote 510, while still enabling the user to start navigation by placing their finger down anywhere within touch navigation region 1452, which makes the user experience more consistent between remote 510 and device 511. Additionally, as shown in FIG. 14C, device optionally selects primary touch navigation area 1420 such that the location of contact 1403 in touch navigation region 1452 (e.g., the lower-right portion of touch navigation region 1452) corresponds to the location of contact 1403 in primary touch navigation area 1420 (e.g., the lower-right portion of primary touch navigation area 1420). In some embodiments, primary touch navigation area 1420, touch navigation region 1452 and touch-sensitive surface 451 of remote 510 have the same aspect ratio; in some embodiments, primary touch navigation area 1420, touch navigation region 1452 and touch-sensitive surface 451 of remote 510 have the same aspect ratio, but different areas; in some embodiments, primary touch navigation area 1420, touch navigation region 1452 and touch-sensitive surface 451 of remote 510 have the same aspect ratio, and touch navigation region 1452 has different area than touch-sensitive surface 451 of remote 510 and primary touch navigation area 1420 (which optionally have the same area).

Figure 14D:
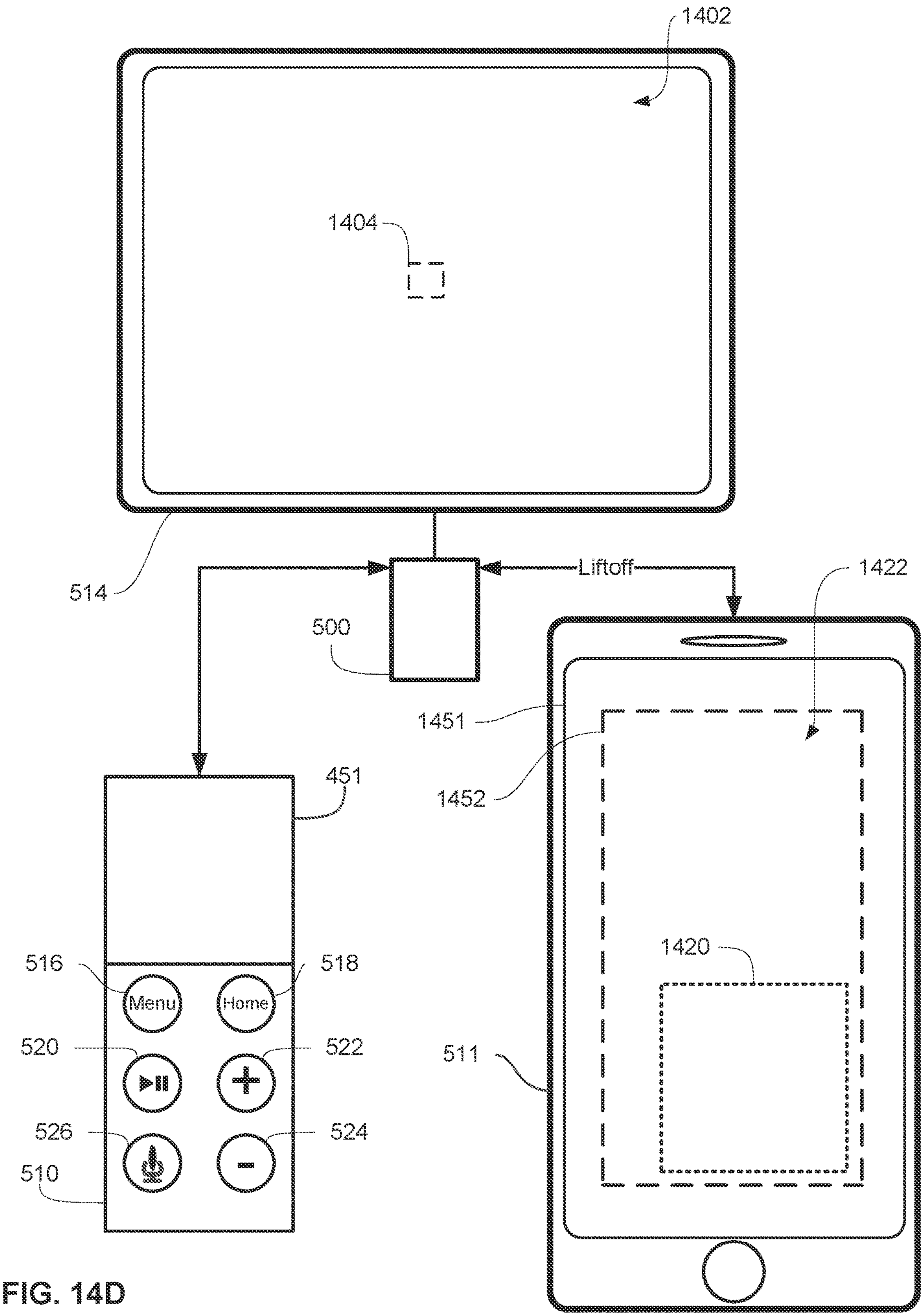
Figure 14E:
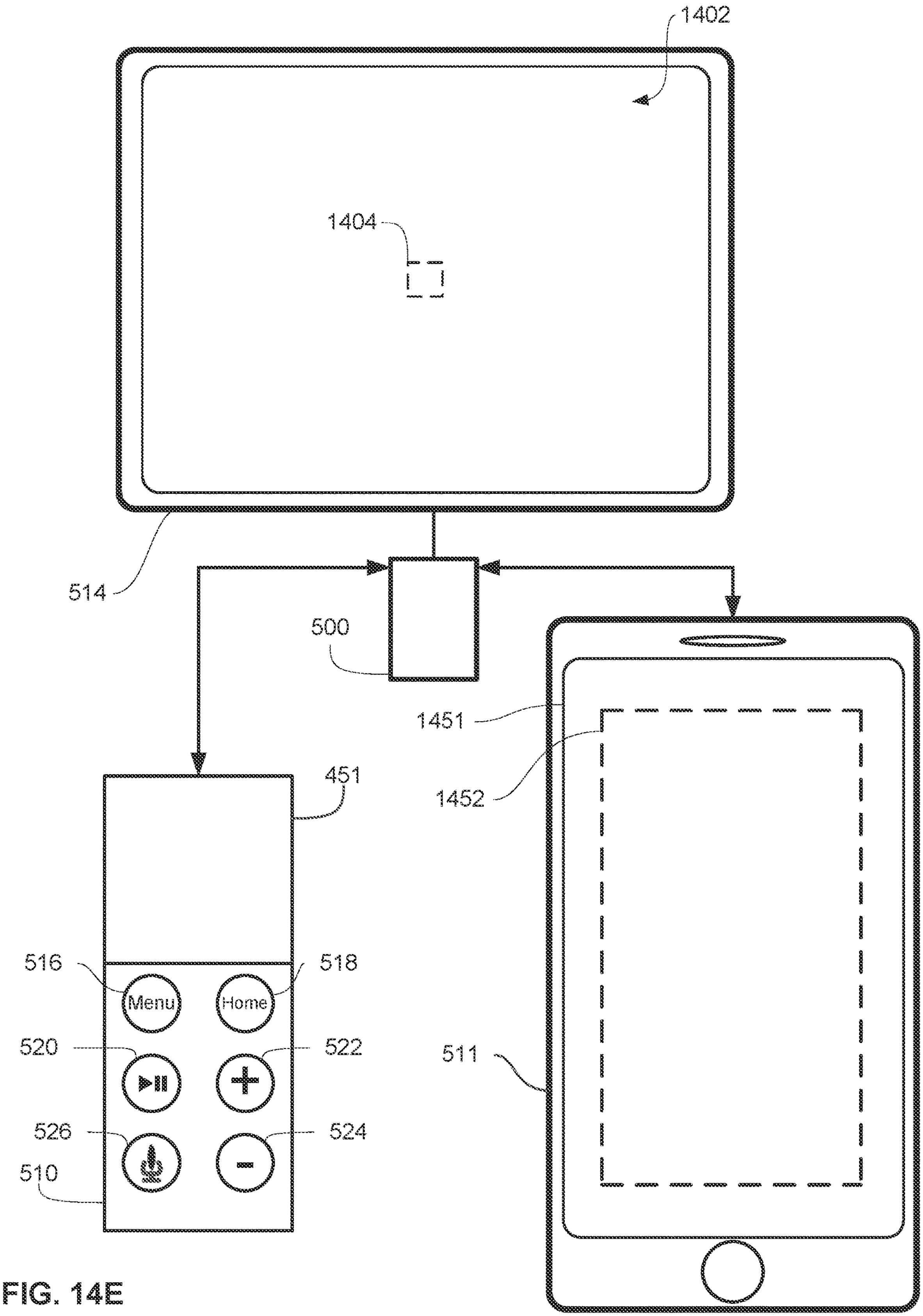
Figure 14F:
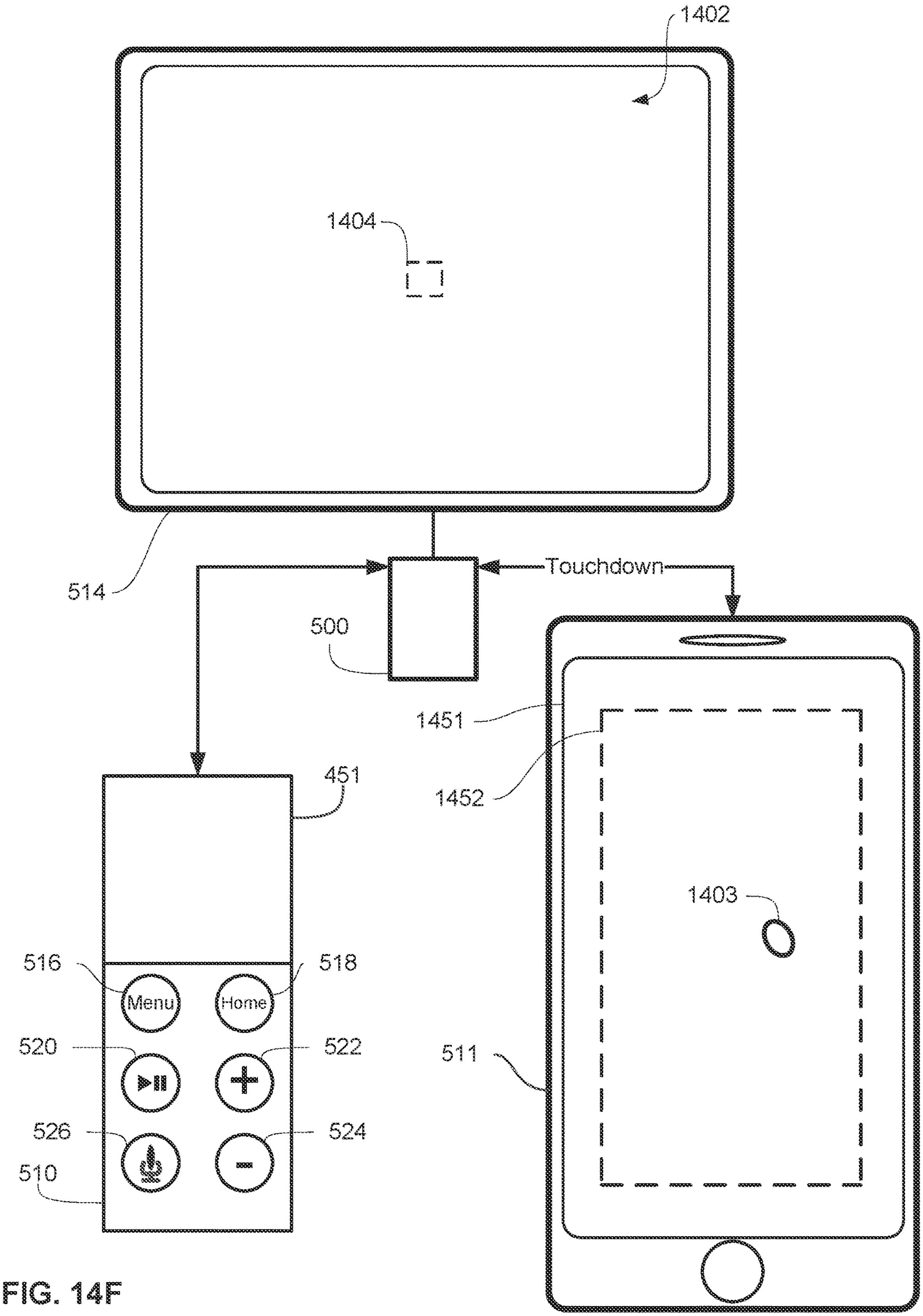

In some embodiments, when liftoff and touchdown of contact 1403 is detected, device 511 re-selects primary touch navigation area 1420 based on the location of contact 1403 when it touches down again in touch navigation region 1452. For example, in FIG. 14D, device 511 detects liftoff of contact 1403 and transmits a corresponding "liftoff" command to electronic device 500. In response, in FIG. 14E, device 511 has undesignated primary touch navigation area 1420 as such. In FIG. 14F, device 511 detects touchdown of contact 1403 again in touch navigation region 1452 (e.g., in the middle-right portion of touch navigation region 1452). In response, in FIG. 14G, device 511 selects a new primary touch navigation area 1420 that includes the location of contact 1403, and excludes auxiliary area 1424 (different from auxiliary area 1422 in FIG. 14C, because the location of primary touch navigation area 1420 in touch navigation region 1452 is different than in FIG. 14C) of touch navigation region 1452. As in FIG. 14C, the location of contact 1403 in touch navigation region 1452 (e.g., the middle-right portion) corresponds to the location of contact 1403 in primary touch navigation area 1420 (e.g., the middle-right portion).

In some embodiments, as mentioned above, device 511 responds to touch inputs detected inside primary touch navigation area 1420 differently than touch inputs detected outside primary touch navigation area 1420 (or inside auxiliary touch navigation area 1424). For example, from FIG. 14G to 14H, device 511 detects movement of contact 1403 within primary touch navigation area 1420 in a leftward-downward direction, as shown in FIG. 14H. In response, device 511 transmits a movement command to electronic device 500 corresponding to the movement of contact 1403, the movement command causing cursor 1404 to move a certain distance in the leftward-downward direction in user interface 1402. In FIG. 14I, device detects continued movement of contact 1403 in the leftward-downward direction as contact moves out of primary touch navigation area 1420 and into auxiliary touch navigation area 1424. In FIG. 14I, contact 1403 has moved the same distance in auxiliary touch navigation area 1424 as it did inside primary touch navigation area 1420. However, the movement command transmitted to electronic device 500 by device 511 causes cursor 1404 to move less in user interface 1402 than it did when contact 1403 was moving inside the primary touch navigation area 1420. Thus, in some embodiments, a certain amount of contact movement inside of primary touch navigation area 1420 is optionally determined by device 511 to correspond to a directional action with a greater magnitude than that same amount of contact movement outside of primary touch navigation area 1420 (e.g., inside auxiliary touch navigation area 1424).

In some embodiments, contact movement outside of primary touch navigation area 1420 is not recognized as touch input by device 511, which in turn does not generate a corresponding movement command to transmit to electronic device. For example, in FIG. 14J, device 511 detects contact 1403 moving within primary touch navigation area 1420, resulting in corresponding movement of cursor 1404 in user interface 1402, as described with reference to FIG. 14H. However, in FIG. 14K, movement of contact 1403 is detected by device 511 outside of primary touch navigation area 1420 (e.g., inside auxiliary touch navigation area 1424). As a result, device 511 does not recognize the movement of contact 1403 as a touch input, and does not generate or transmit a corresponding movement command to electronic device 500, and cursor 1404 does not move in accordance with the movement of contact 1403 outside of primary touch navigation area 1420.

In some embodiments, device 511 maps certain amounts of cursor movement in user interface 1402 to certain amounts of contact 1403 movement in primary touch navigation area 1420 and regions outside of primary touch navigation area 1420 (e.g., auxiliary touch navigation area 1424). For example, in FIG. 14L, device 511 optionally maps movement of contact 1403 from one edge of primary touch navigation area 1420 to an opposite edge of primary touch navigation area 1420 to 80% of cursor 1404 movement from one edge of user interface 1402 to another edge of user interface 1402. For example, device 511 detects movement of contact 1403 from the top edge of primary touch navigation area 1420 to the bottom edge of primary touch navigation area 1420, cursor 1404 will optionally move 80% of the way from the top edge of user interface 1402 to the bottom edge of user interface 1402. Device 511 optionally splits the remaining 20% of cursor 1404 movement in user interface 1402 between the region of auxiliary touch navigation area 1426 above primary touch navigation area 1420 and the region of auxiliary touch navigation area 1426 below primary touch navigation area 1420 (e.g., 10% to the region above primary touch navigation area 1420, and 10% to the region below primary touch navigation area 1420).

Accordingly, when primary touch navigation area 1420 is not centered in touch navigation region 1452, a certain amount of movement of contact 1403 above primary touch navigation region 1420 optionally results in a different amount of cursor 1404 movement in user interface 1402 than does that same amount of movement of contact 1430 below primary touch navigation region 1420. Specifically, in FIG. 14L, primary touch navigation area 1420 is distance 1432 from the top edge of touch navigation region 1452, and distance 1430 from the bottom edge of touch navigation region 1452, which is less than distance 1432. Contact 1403 is detected by device 511 at the bottom edge of primary touch navigation area 1420.

Figure 14G:
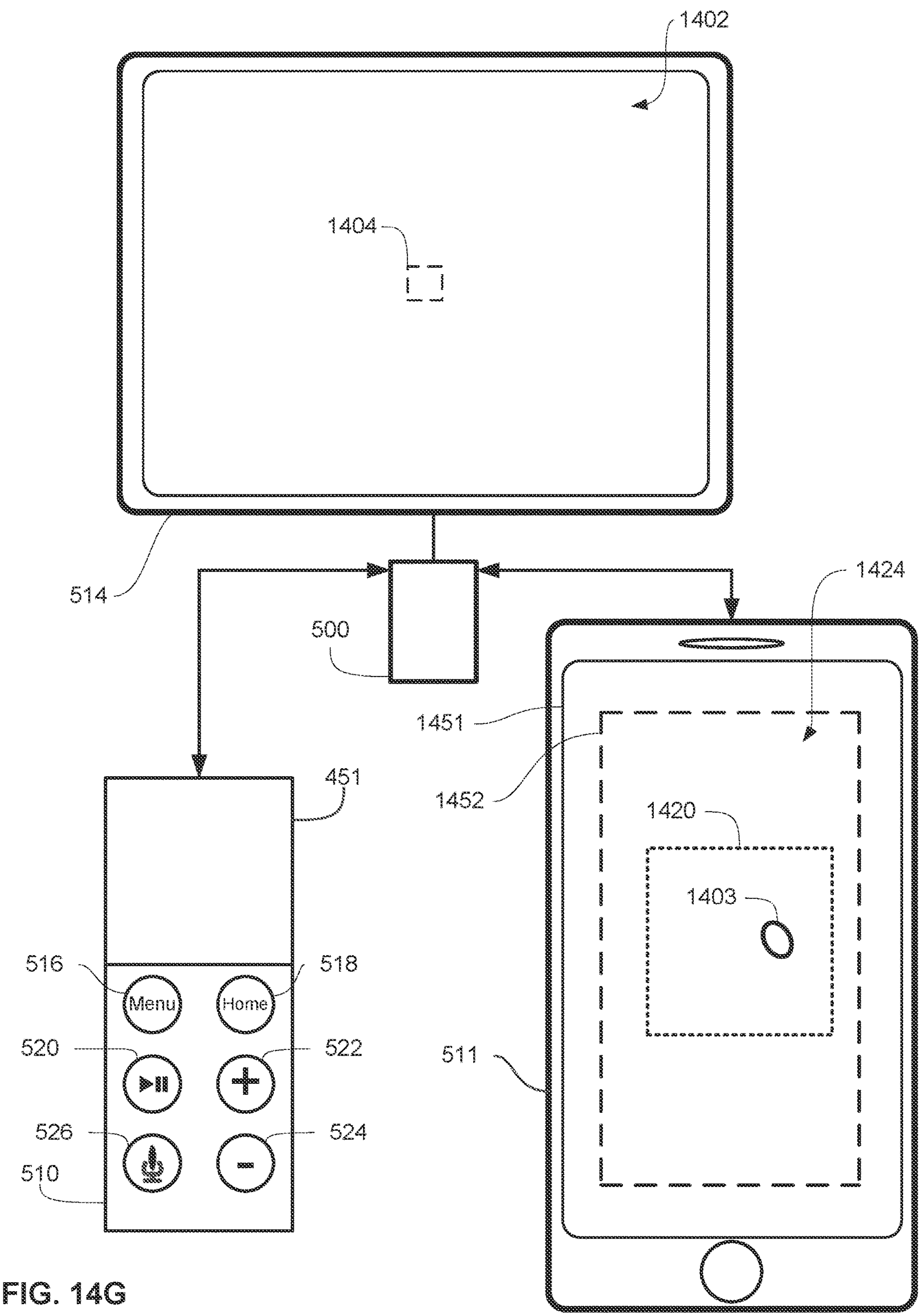
Figure 14H:
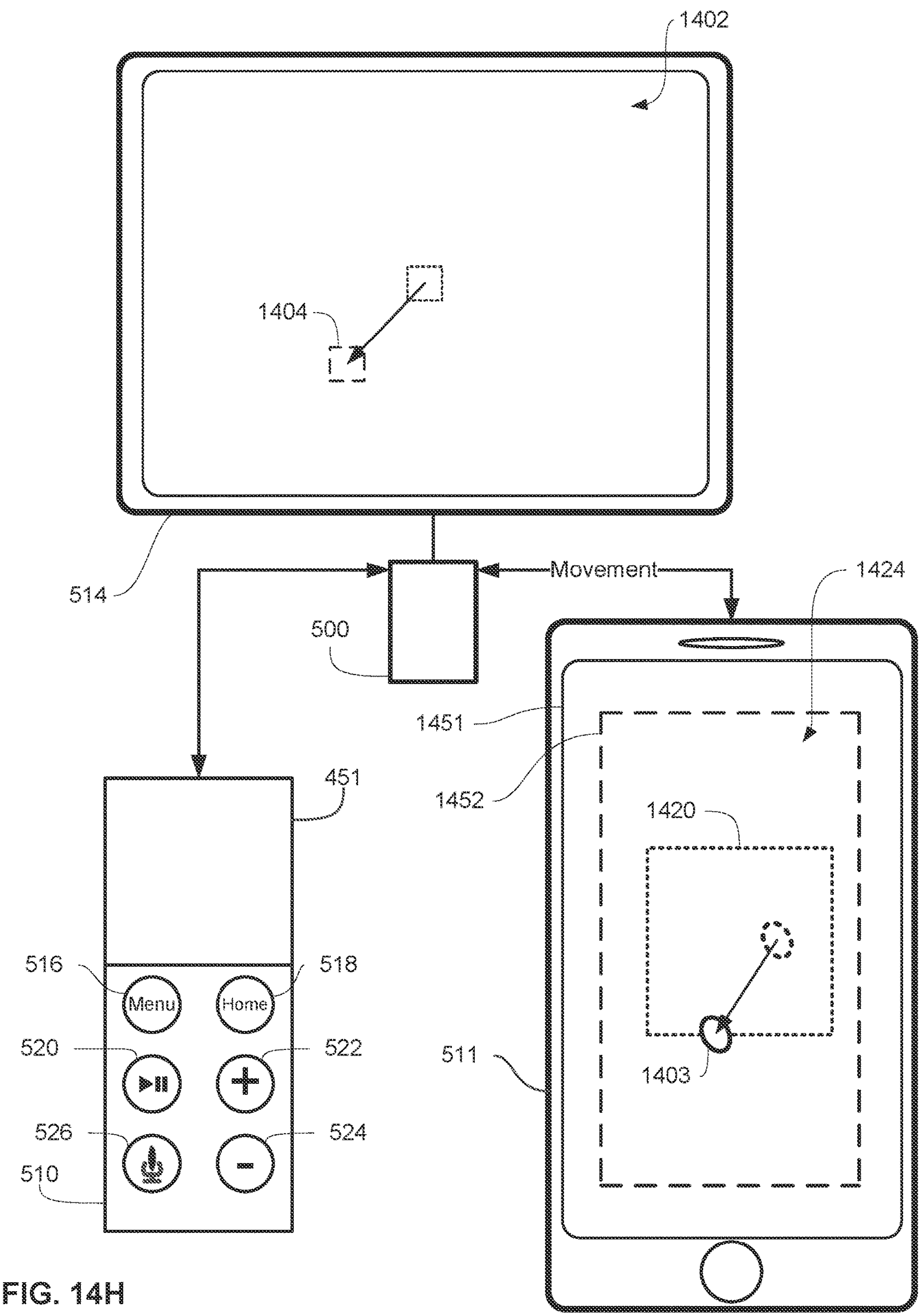
Figure 14I:
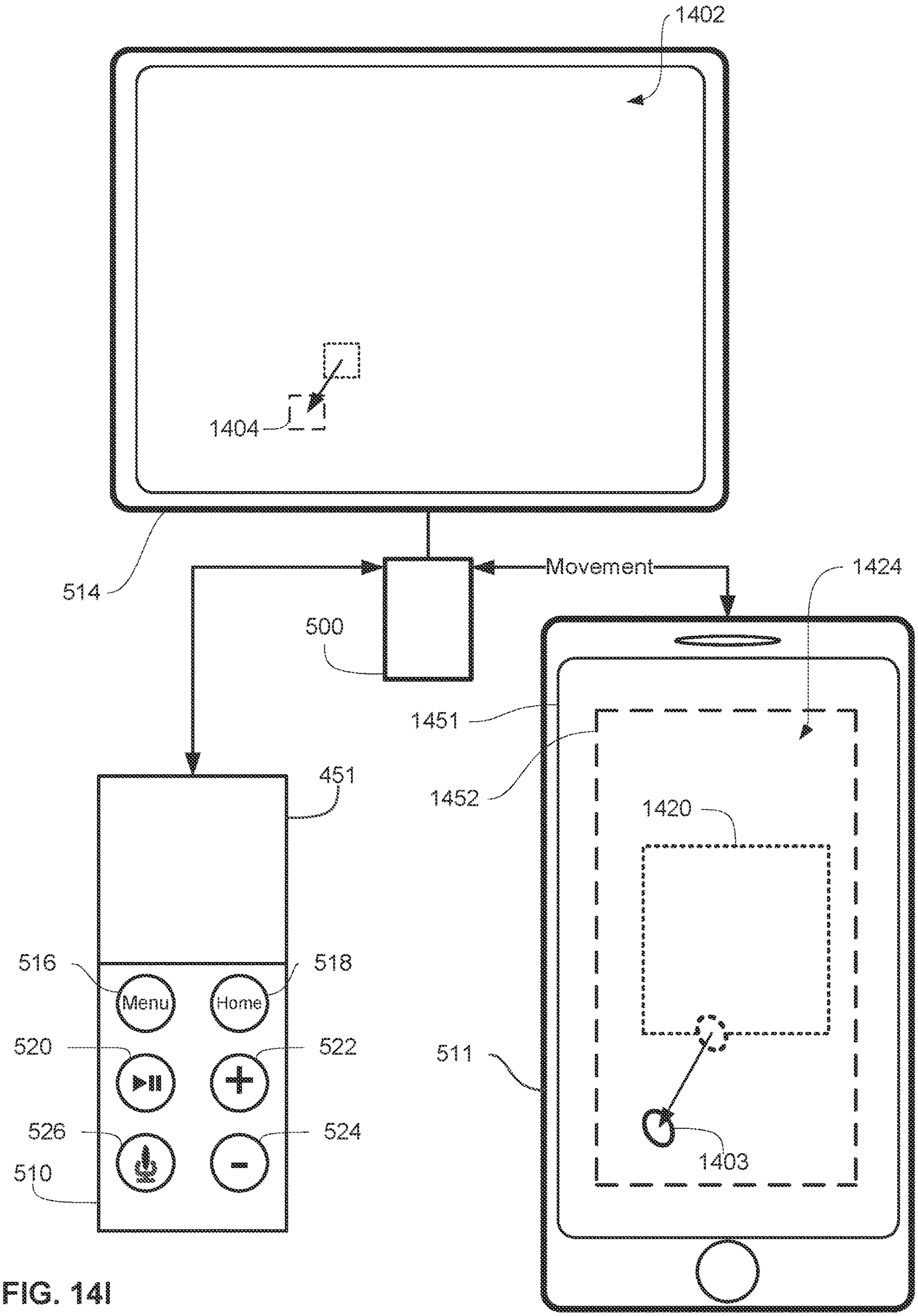
Figure 14J:
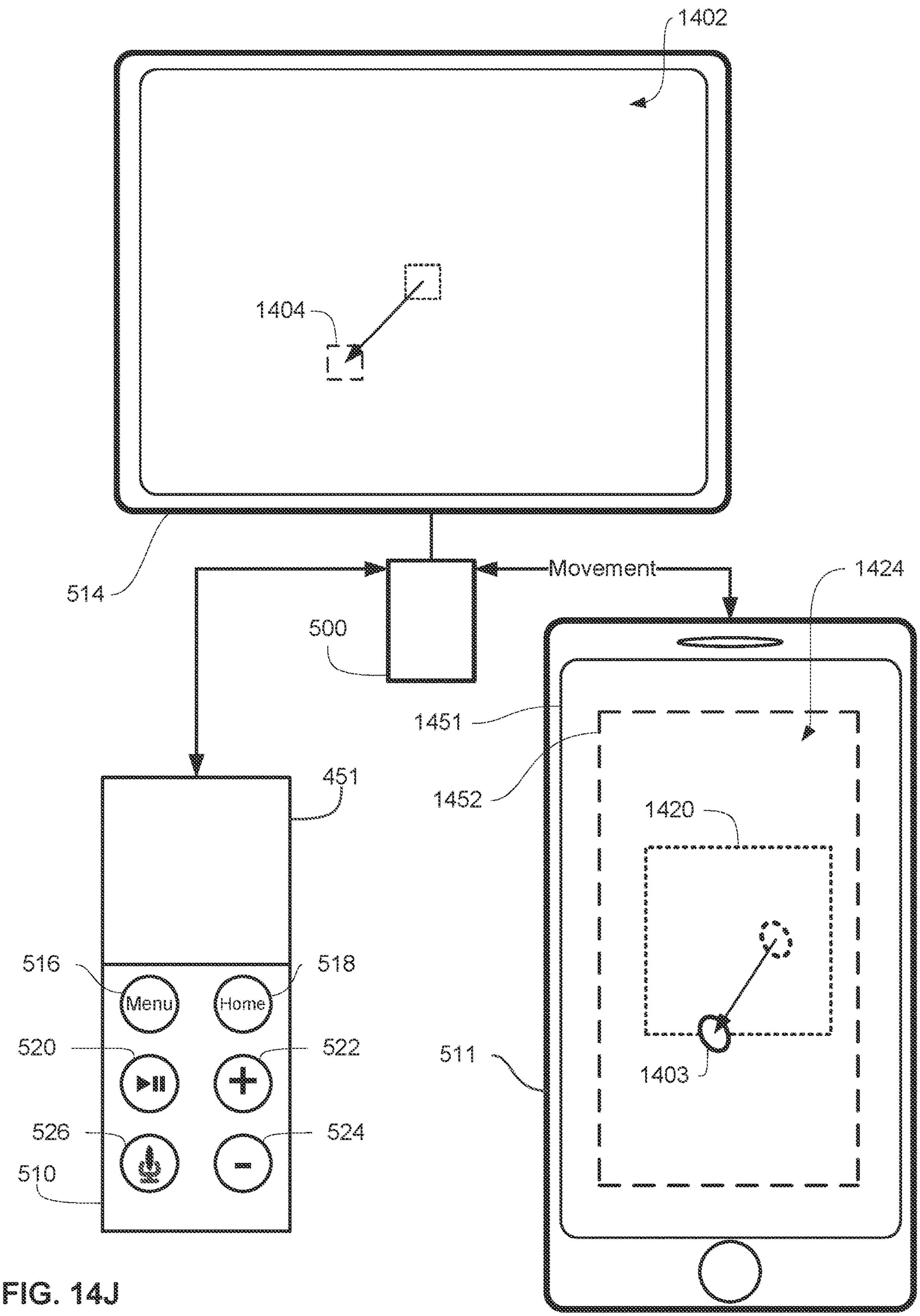
Figure 14K:
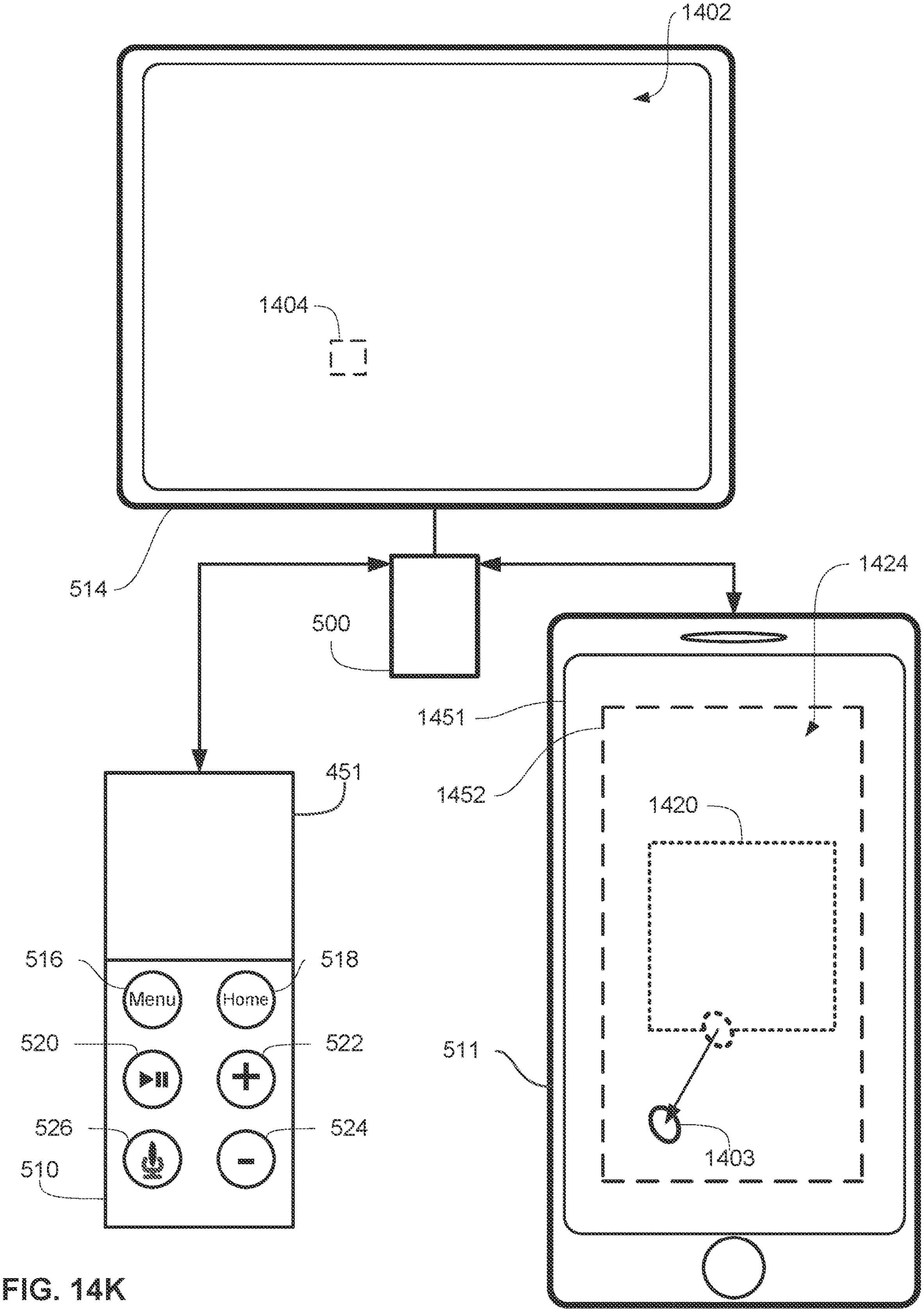
Figure 14L:
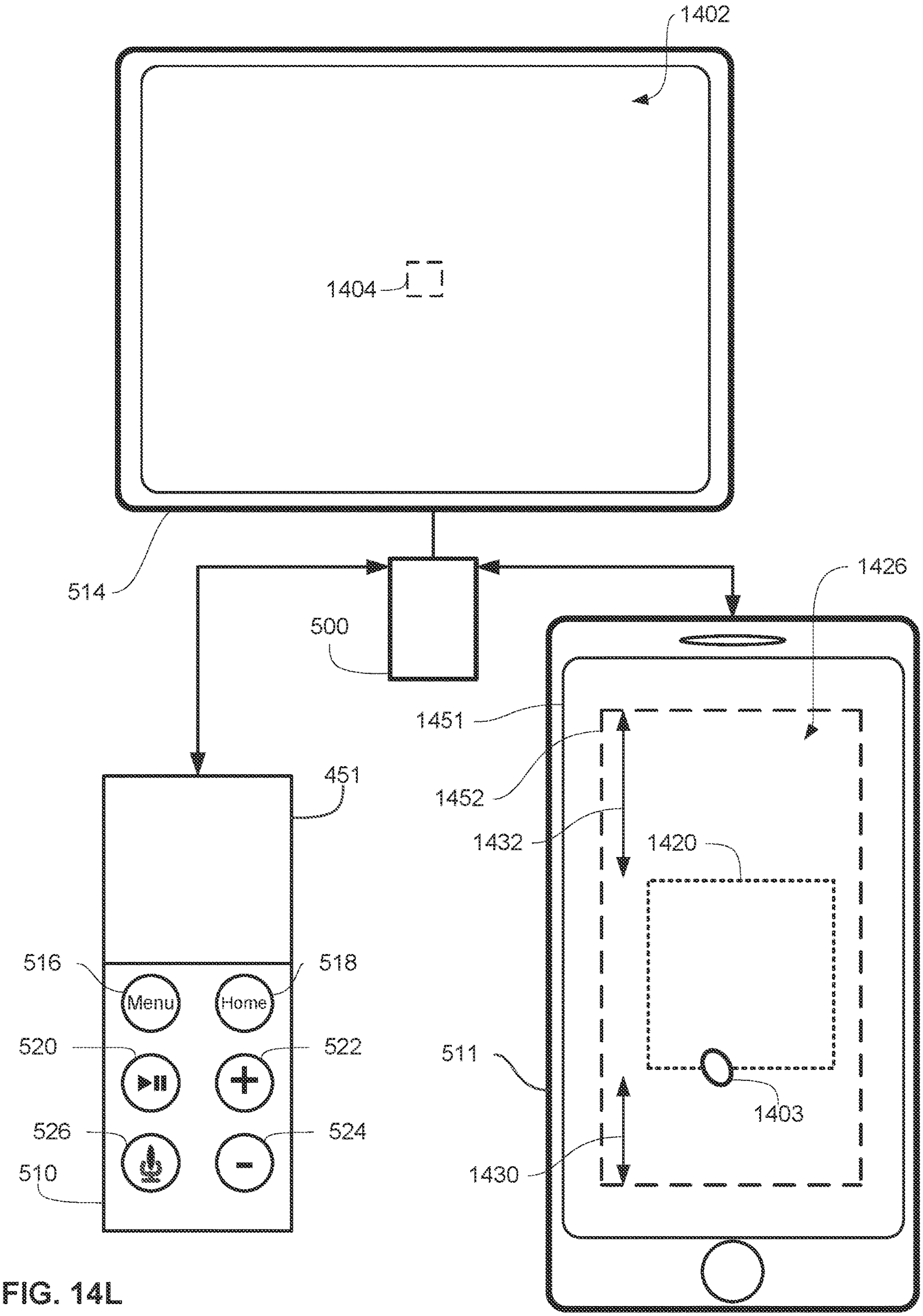
Figure 14M:
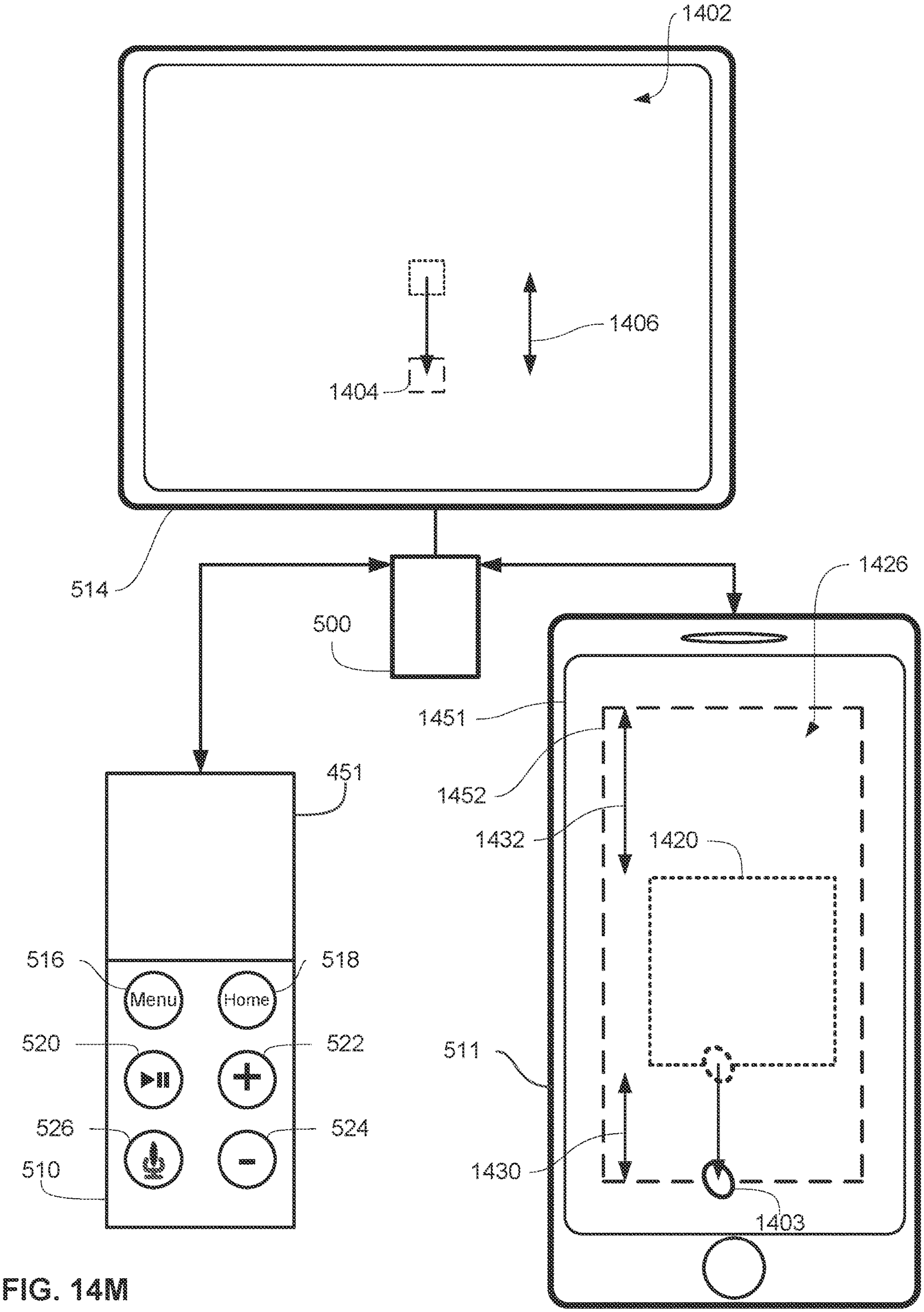
Figure 14N:
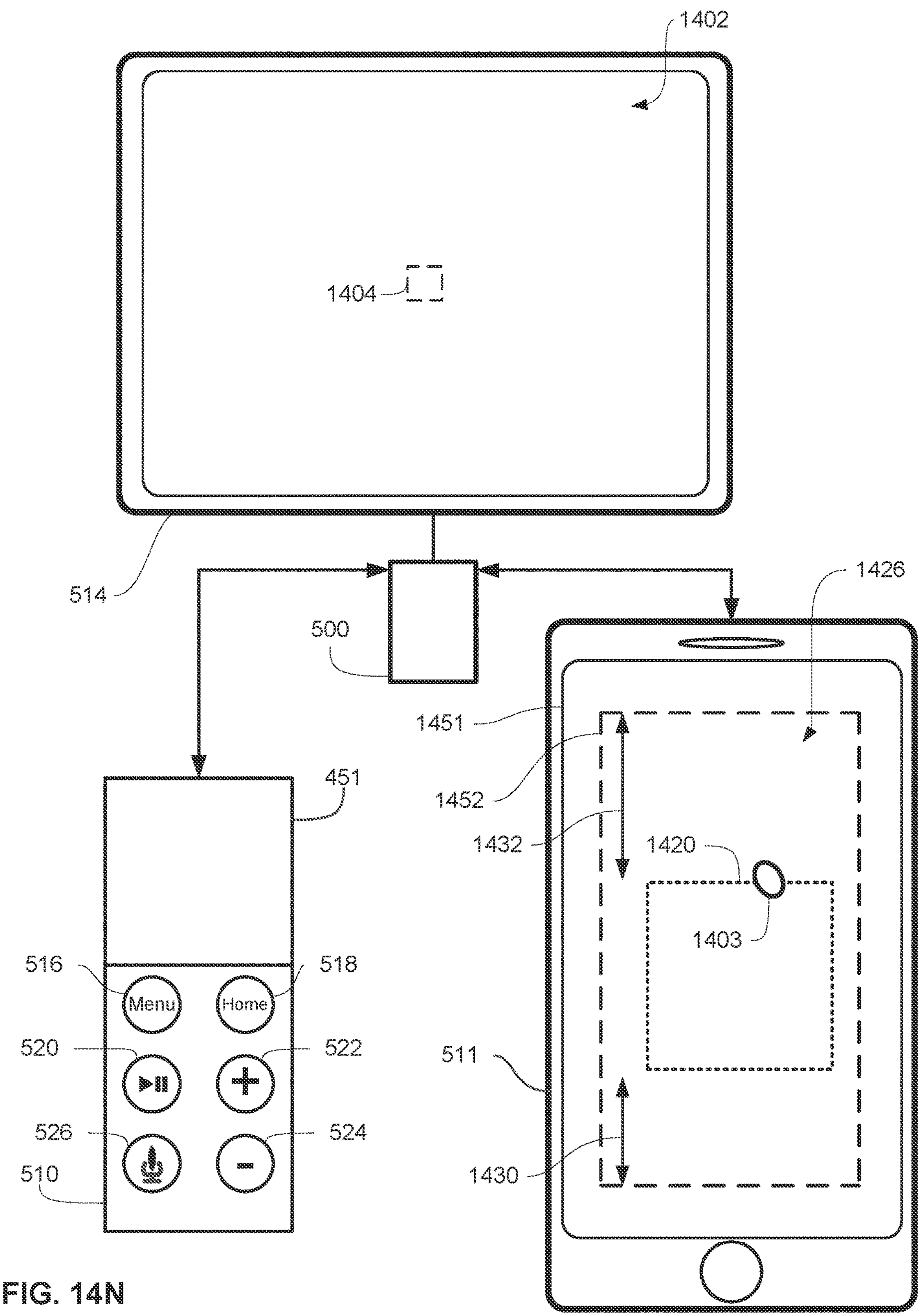
Figure 14O:
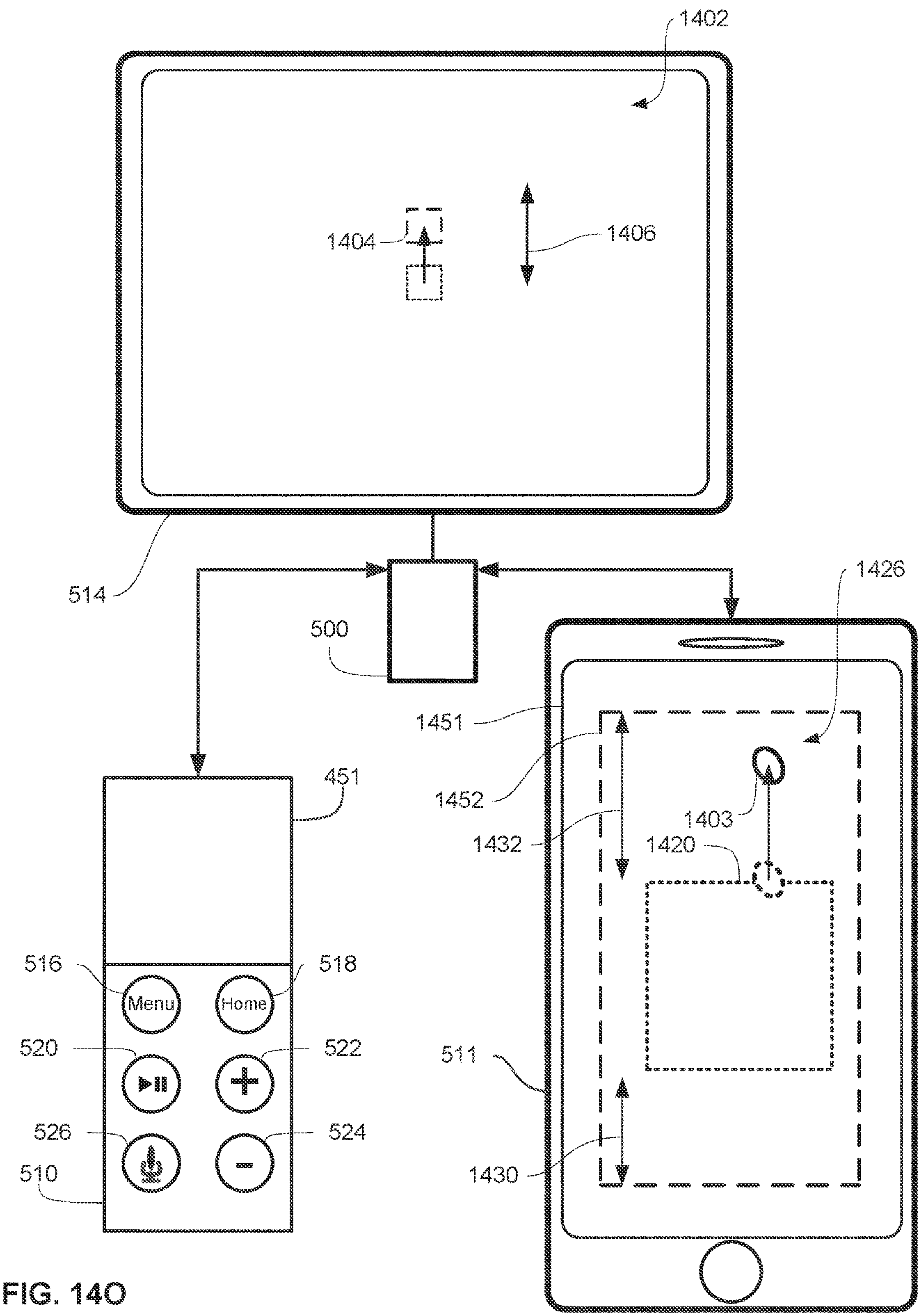

In FIG. 14M, device 511 detects contact 1403 moving distance 1430 from the bottom edge of primary touch navigation area 1420 to the bottom edge of touch navigation region 1452. In response, cursor 1404 moves downward, distance 1406 in user interface 1402. In contrast, in FIG.

Figure 14P:
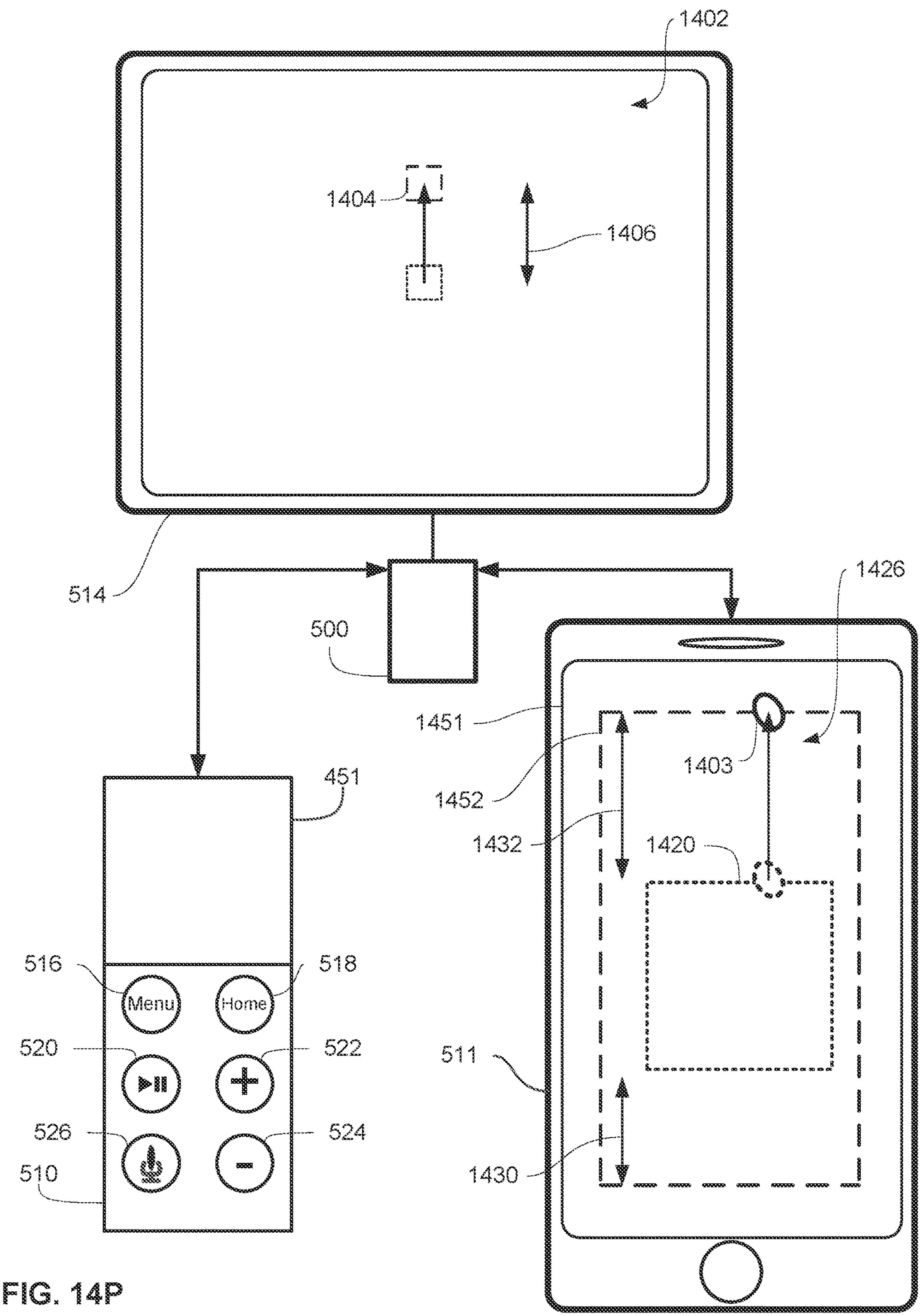

14N, contact 1403 is detected by device 511 at the top edge of primary touch navigation area 1420. In FIG. 14P, device 511 detects contact 1403 moving distance 1430 from the top edge of primary touch navigation area 1420 towards the top edge of touch navigation region 1452 (not quite reaching the top edge of touch navigation region 1452). In response, cursor 1404 moves upward a certain distance in user interface 1402 that is less than distance 1406 that cursor 1404 moved in FIG. 14M. In FIG. 14M, contact 1403 has to move a greater distance than distance 1430 (e.g., to reach the top of touch navigation region 1452) in order to move cursor 1404 distance 1406, the same distance as it moved in FIG. 14M, as shown in FIG. 14P.

Figure 14Q:
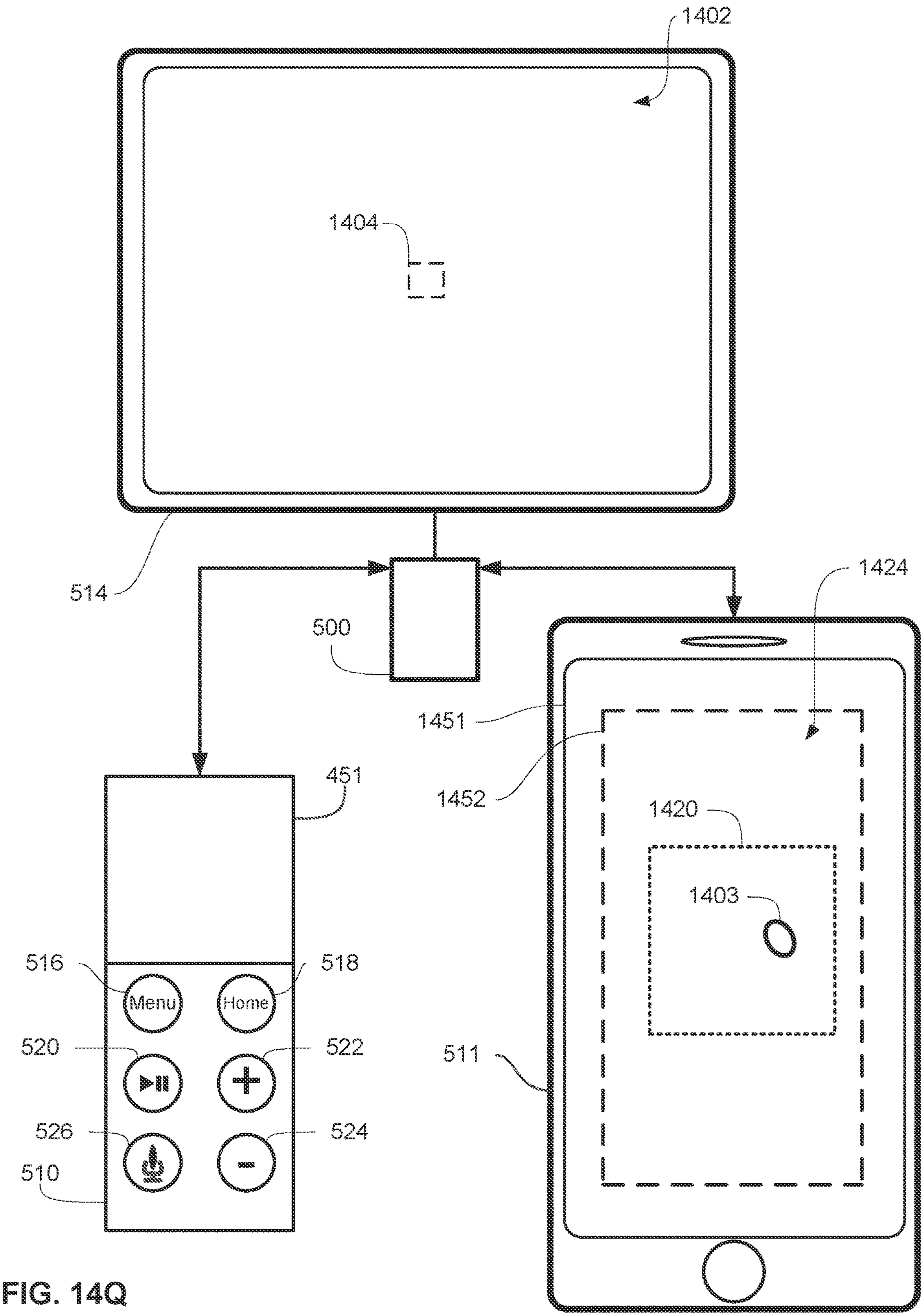
Figure 14R:
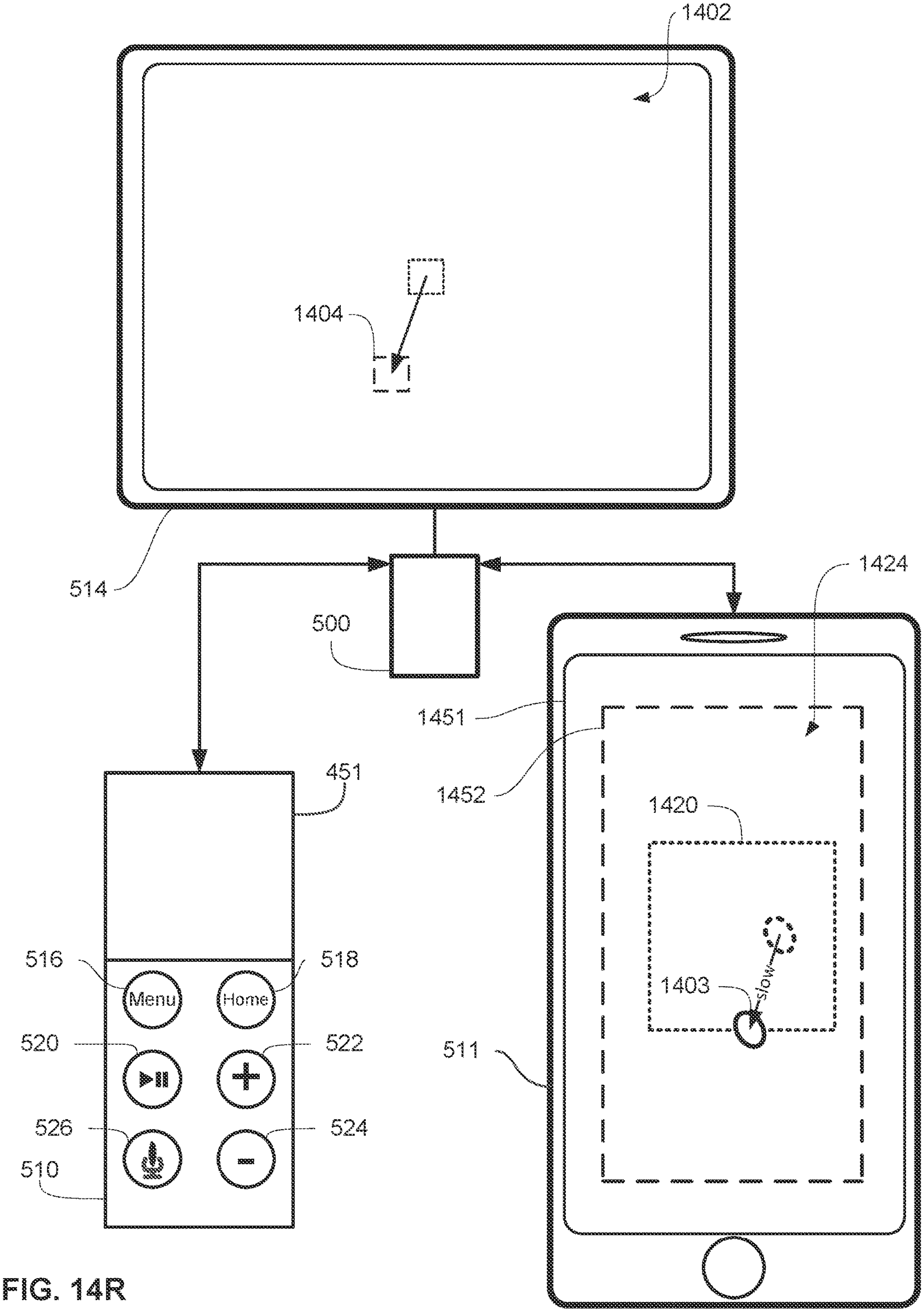
Figure 14S:
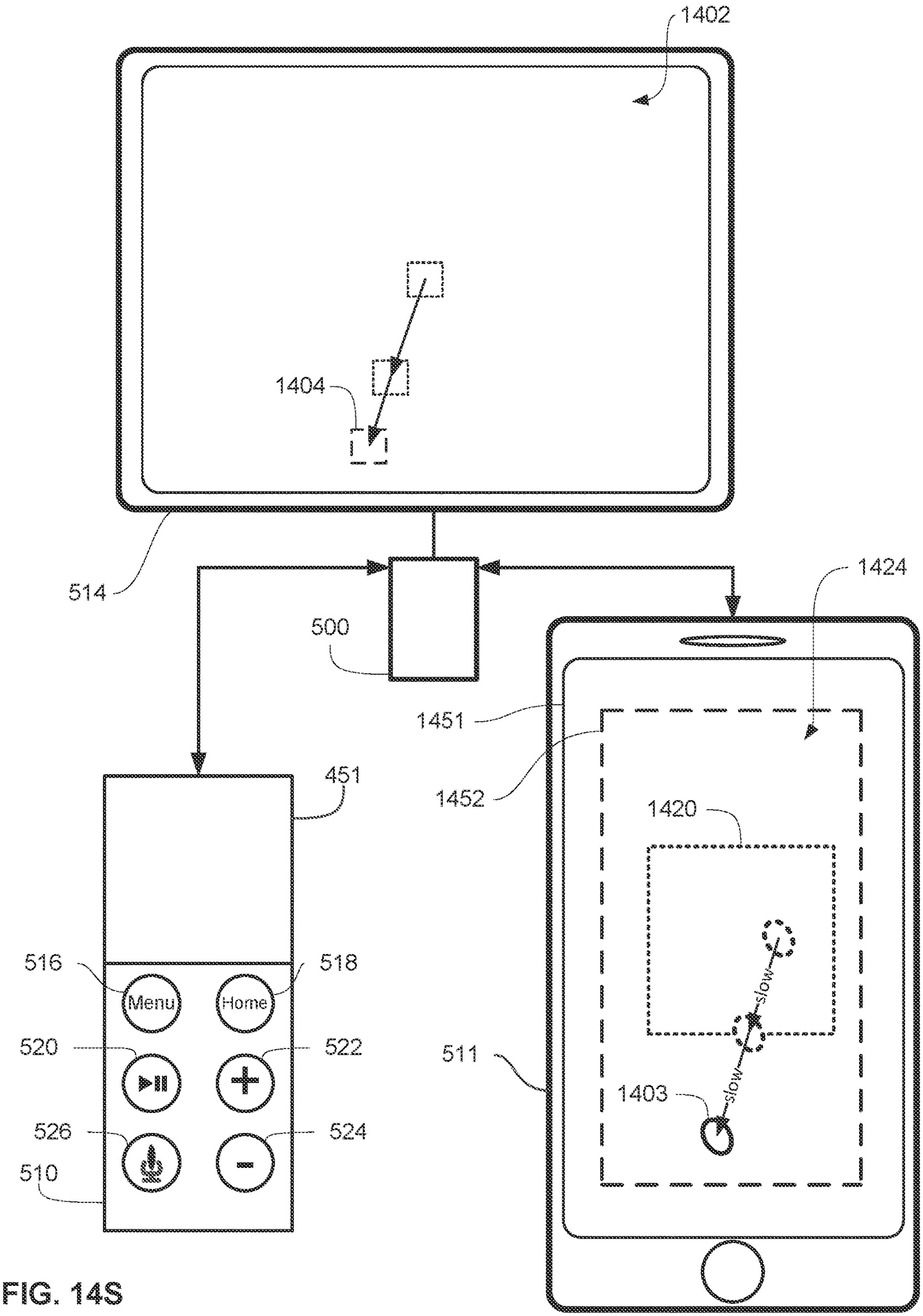

In some embodiments, device 511 responds differently to fast swipes that move from inside primary touch navigation area 1420 to outside primary touch navigation area 1420 than it responds to slow swipes that move from inside primary touch navigation area 1420 to outside primary touch navigation area 1420. For example, in FIG. 14Q, device detects contact 1403 and selects primary touch navigation area 1420, as described in FIG. 14G. In FIG. 14R, device 511 detects slow (e.g., slower than a threshold speed) movement of contact 1403 within primary touch navigation area 1420. In response, device 511 generates and transmits a movement command to electronic device 500 that corresponds to the movement of contact 1403 within primary touch navigation area 1420, which causes cursor 1404 to move in user interface 1402 in accordance with the movement of contact 1403 inside primary touch navigation area 1420. In FIG. 14S, device 511 detects continued slow movement of contact 1403 from inside primary touch navigation area 1420 to outside of primary touch navigation area 1420 (e.g., into auxiliary touch navigation area 1424). In response, device 511 continues to respond to the movement of contact 1403 in auxiliary touch navigation area 1424, and generates and transmits a movement command to electronic device 500 corresponding to the movement of contact 1403 in auxiliary touch navigation area 1424. This, in turn, causes cursor 1404 to move in user interface 1402 in accordance with the movement of contact 1403 in auxiliary touch navigation area 1424.

Figure 14T:
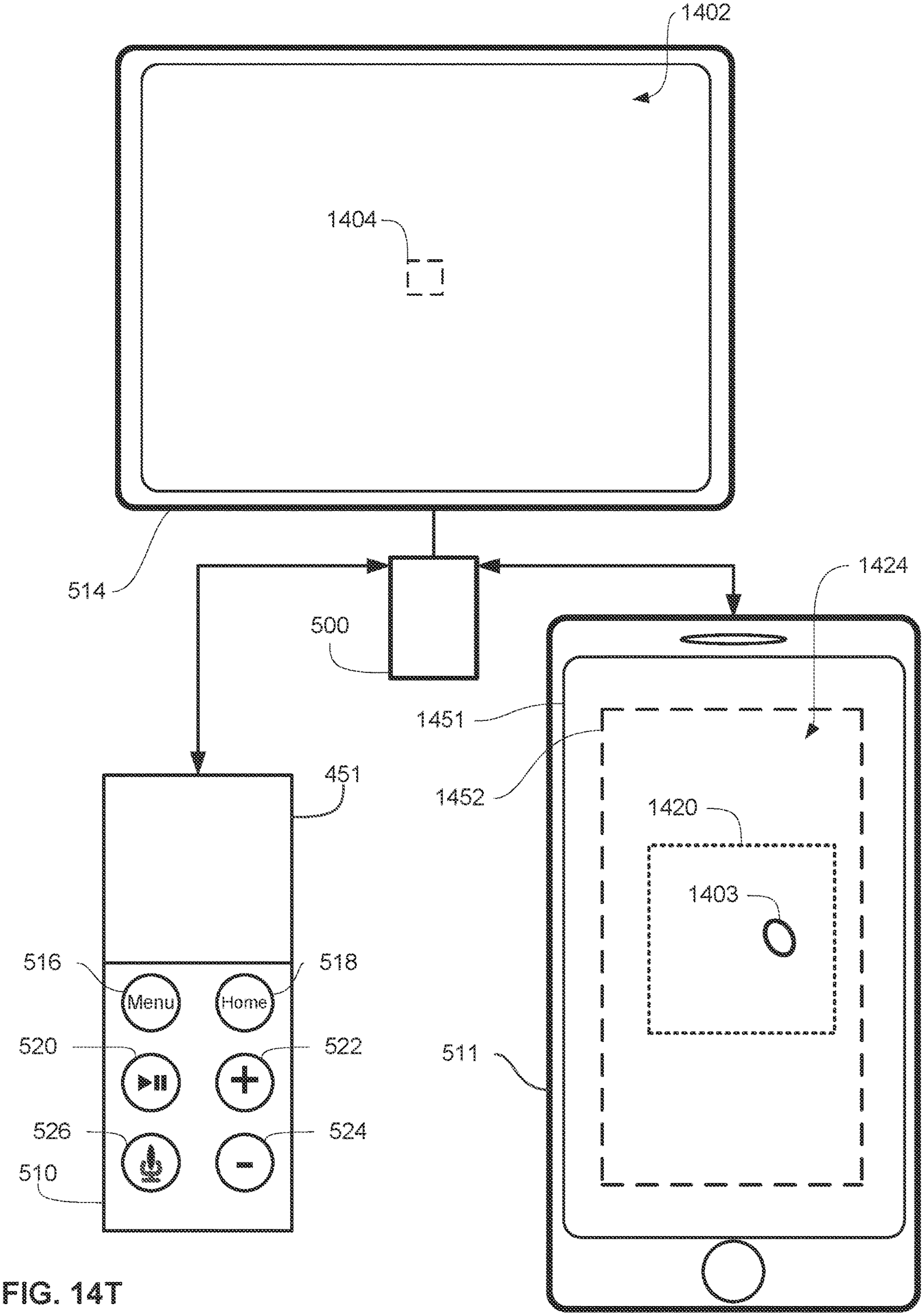
Figure 14U:
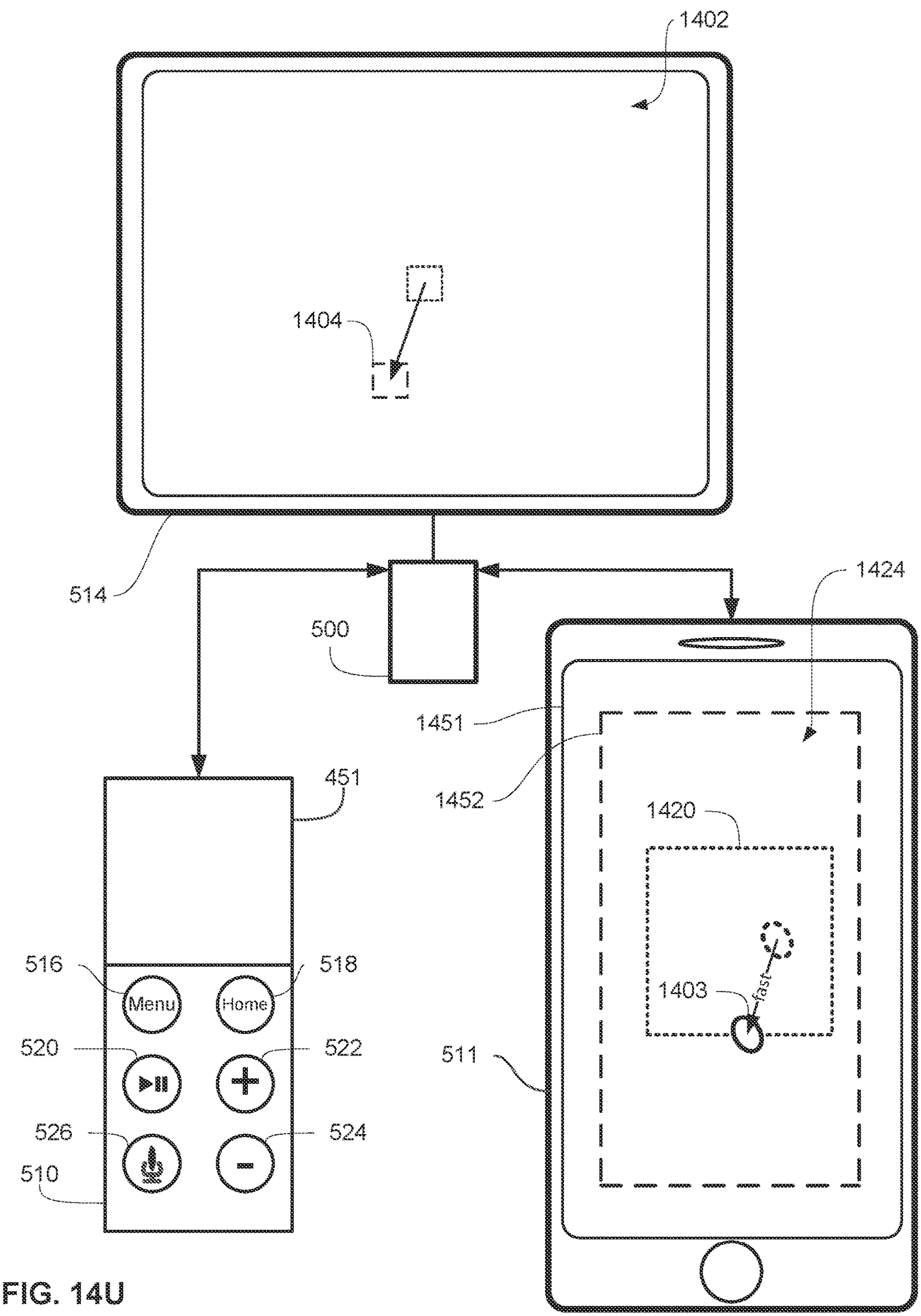
Figure 14V:
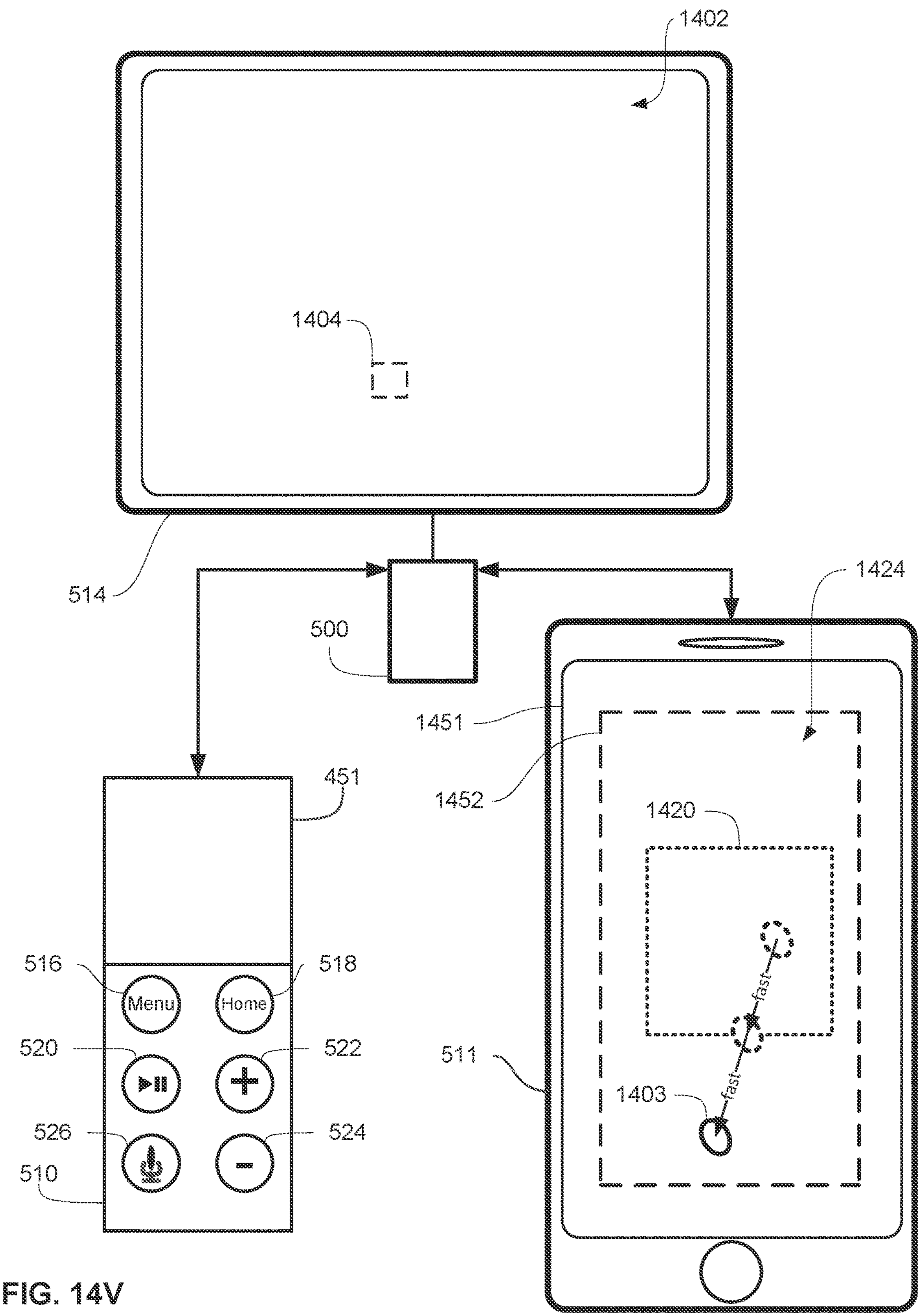

In contrast, in FIG. 14T, device 511 detects contact 1403 in primary touch navigation area 1420, and in FIG. 14U, device 511 detects fast (e.g., faster than the threshold speed) movement of contact 1403 within primary touch navigation area 1420. In response, device 511 generates and transmits a movement command to electronic device 500 that corresponds to the movement of contact 1403 within primary touch navigation area 1420, which causes cursor 1404 to move in user interface 1402 in accordance with the movement of contact 1403 inside primary touch navigation area 1420. In FIG. 14V, device 511 detects continued fast movement of contact 1403 from inside primary touch navigation area 1420 to outside of primary touch navigation area 1420 (e.g., into auxiliary touch navigation area 1424). In response, device 511 stops responding to the movement of contact 1403 in auxiliary touch navigation area 1424, and does not generate or transmit a movement command to electronic device 500 corresponding to the movement of contact 1403 in auxiliary touch navigation area 1424. In some embodiments, the device checks the speed of movement of the contact at a time proximate to when the contact moves over the boundary between the primary touch navigation area and the auxiliary touch navigation area. This, in turn, results in cursor 1404 not moving in user interface 1402 in response to the fast movement of contact 1403 outside of primary touch navigation area 1420. As such, in some embodiments, device 511 does not respond to fast movement of contact 1403 when contact 1403 exits primary touch navigation area 1420.

Figure 14W:
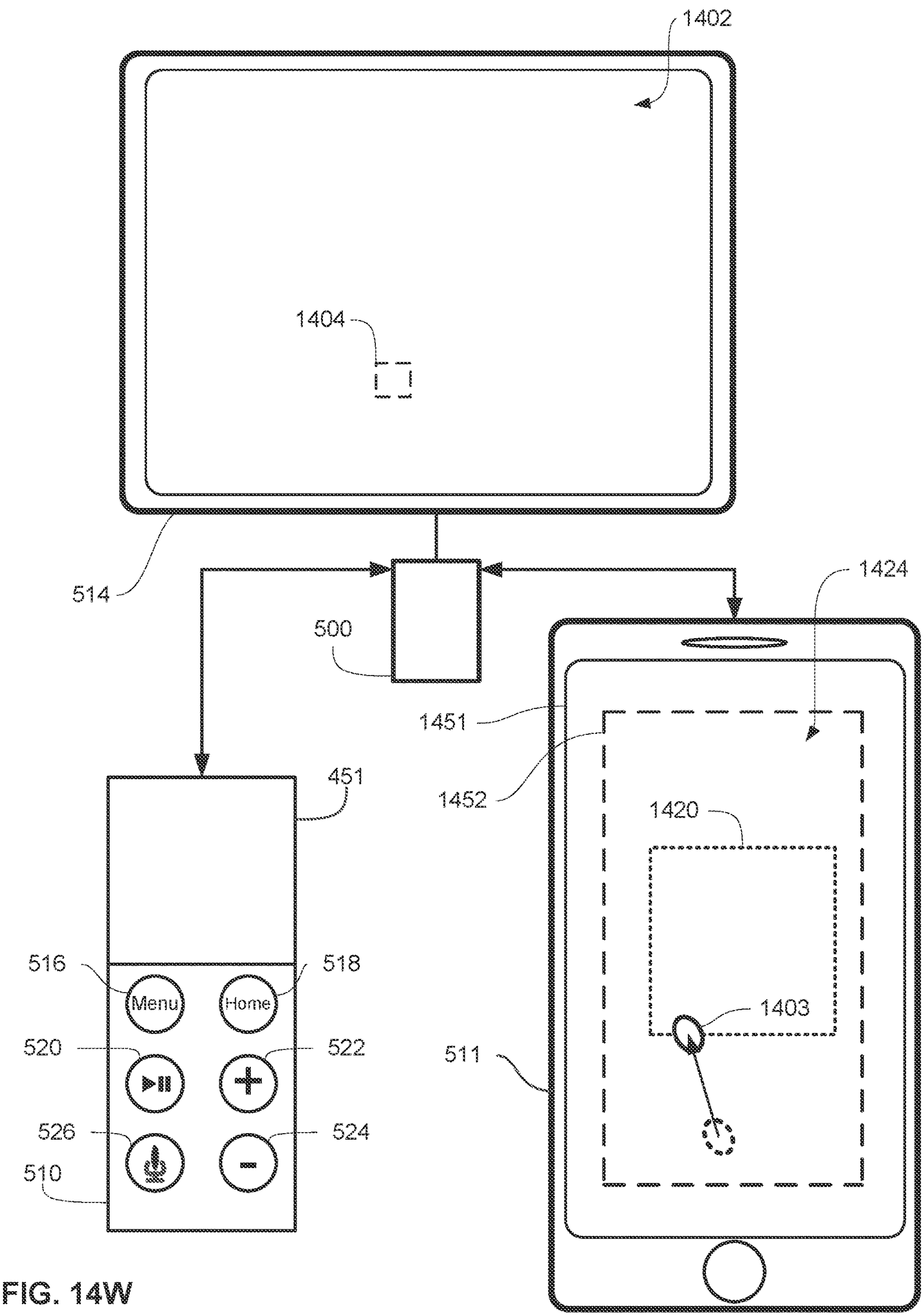
Figure 14X:
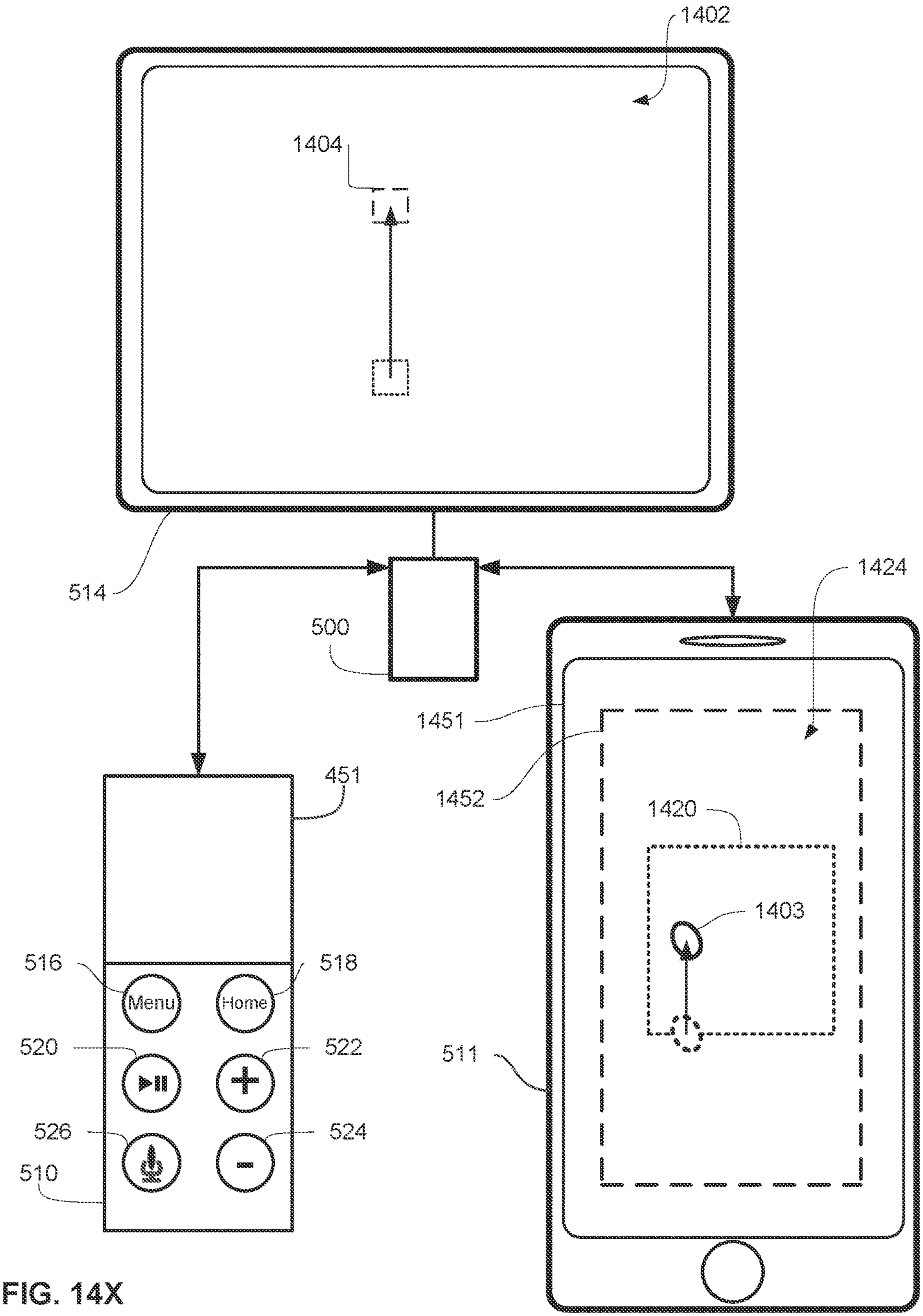

However, in some embodiments, if contact 1403 moves back into primary touch navigation area 1420 after exiting primary touch navigation area 1420 at a high speed, device 511 resumes responding to contact 1403 and/or its movement. For example, in FIG. 14W, device 511 detects contact 1403 moving from auxiliary touch navigation area 1424 to an edge of primary touch navigation area 1420. Because device 511 is optionally still not responding to movement of contact 1403 outside of primary touch navigation area 1420, cursor 1404 does not move in user interface 1402. In FIG. 14X, device 511 detects continued movement of contact 1403 into and within primary touch navigation area 1420, and thus, resumes responding to contact 1403 and/or its movement. Specifically, in response to detecting the upward movement of contact 1403 within primary touch navigation area 1420, device 511 generates and transmits a movement command to electronic device 500 that corresponds to that upward movement of contact 1403, which causes cursor 1404 to move in user interface 1402.

Figure 14Y:
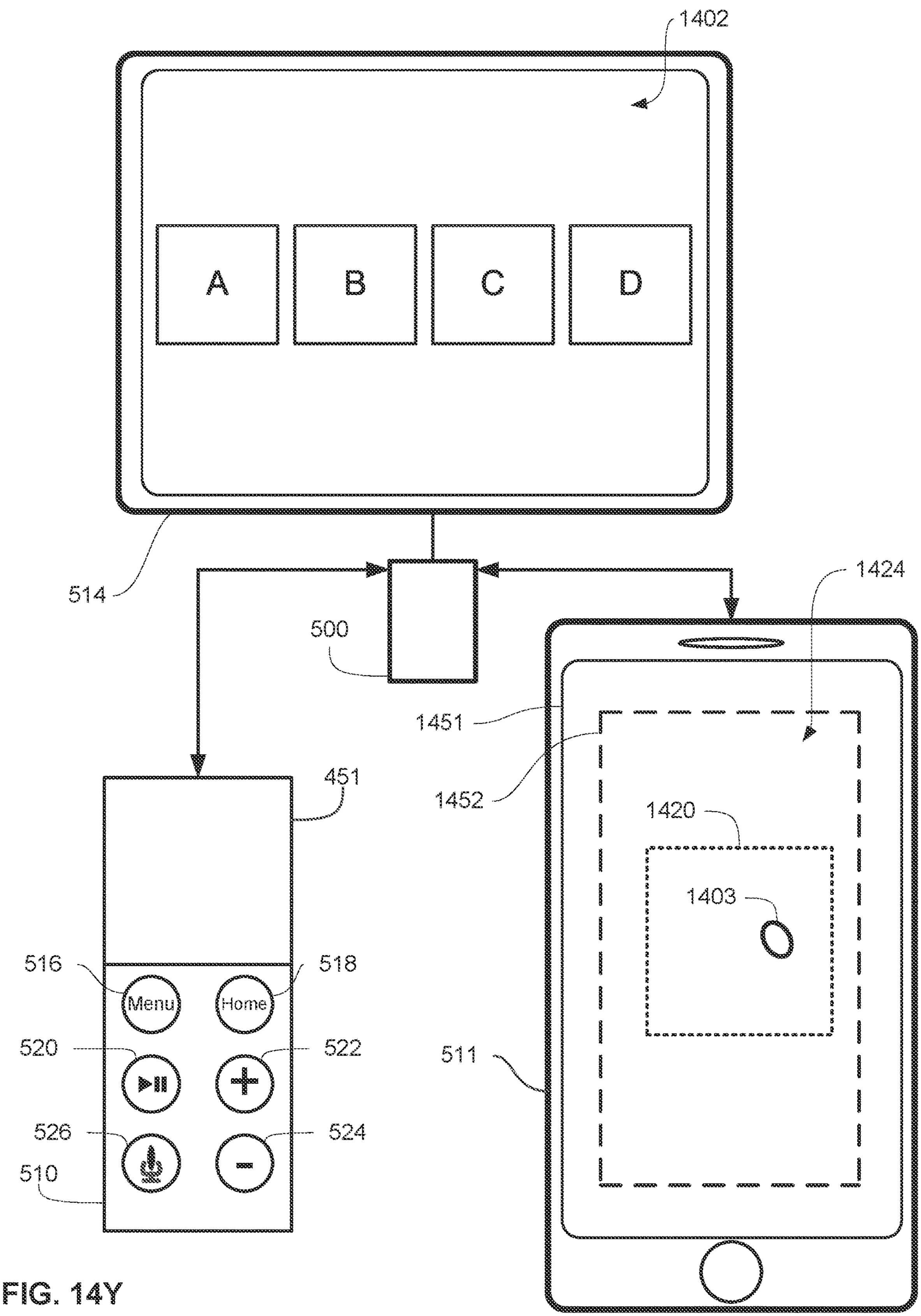
Figure 14Z:
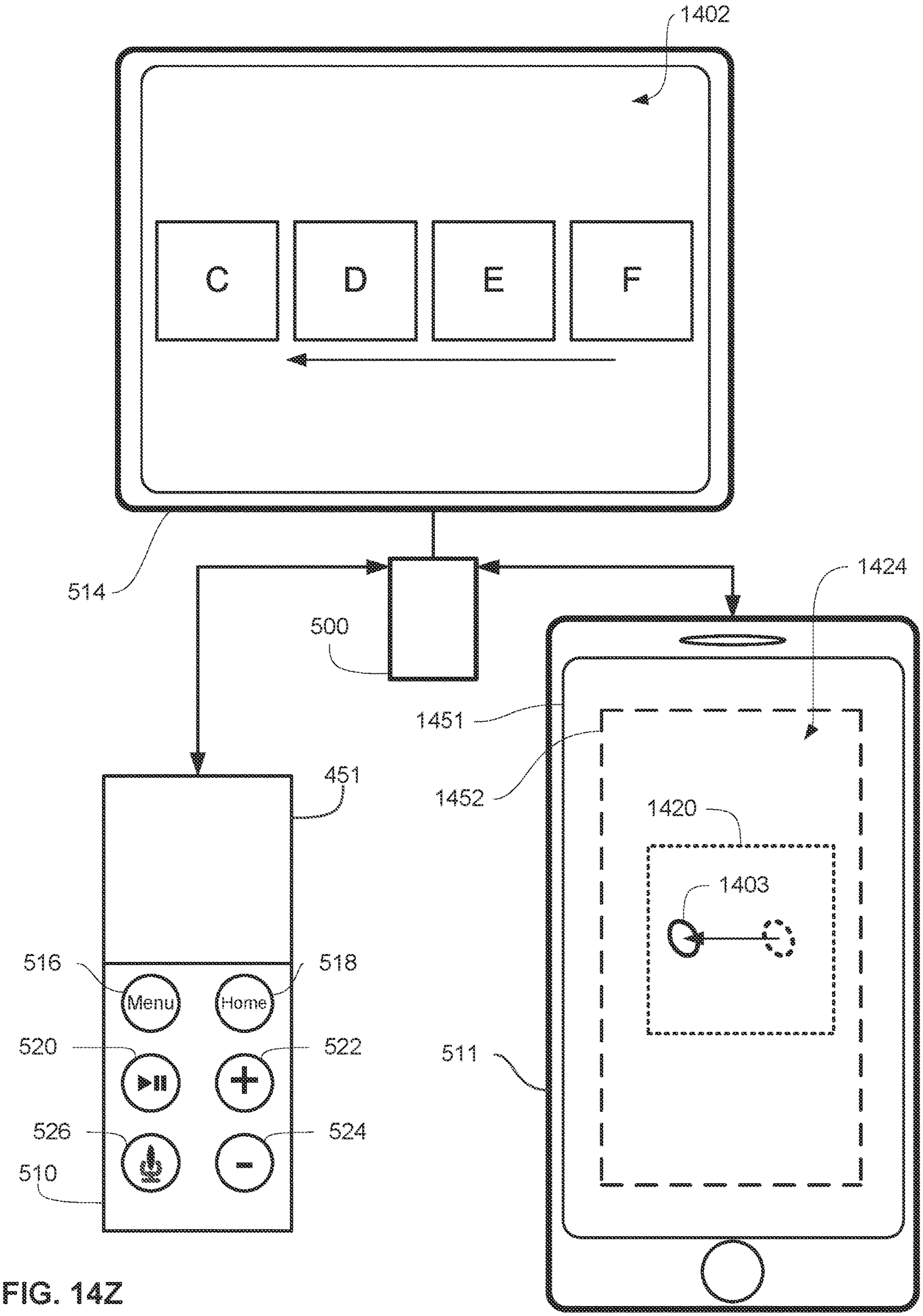
Figure 14A:
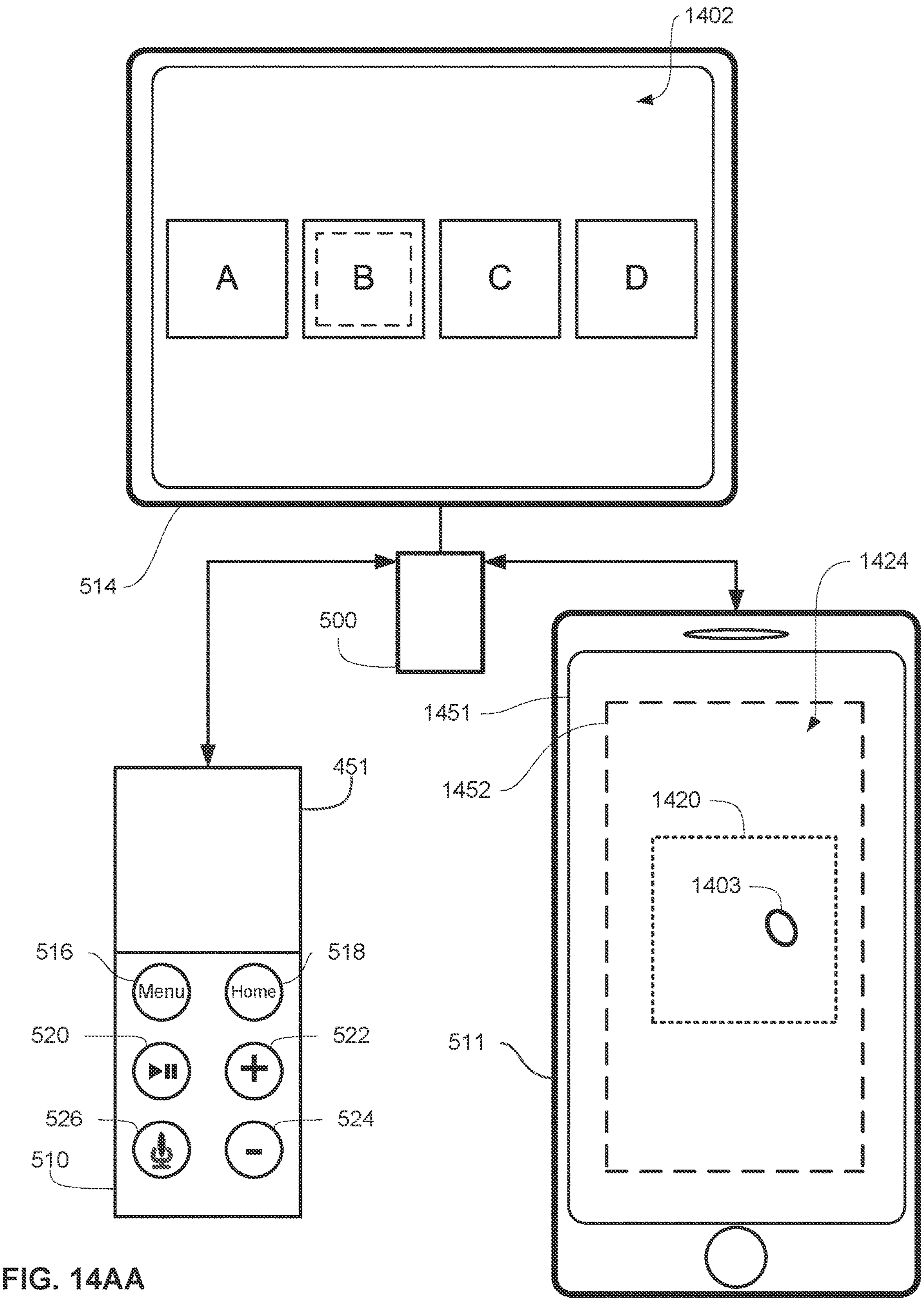
Figure 14B:
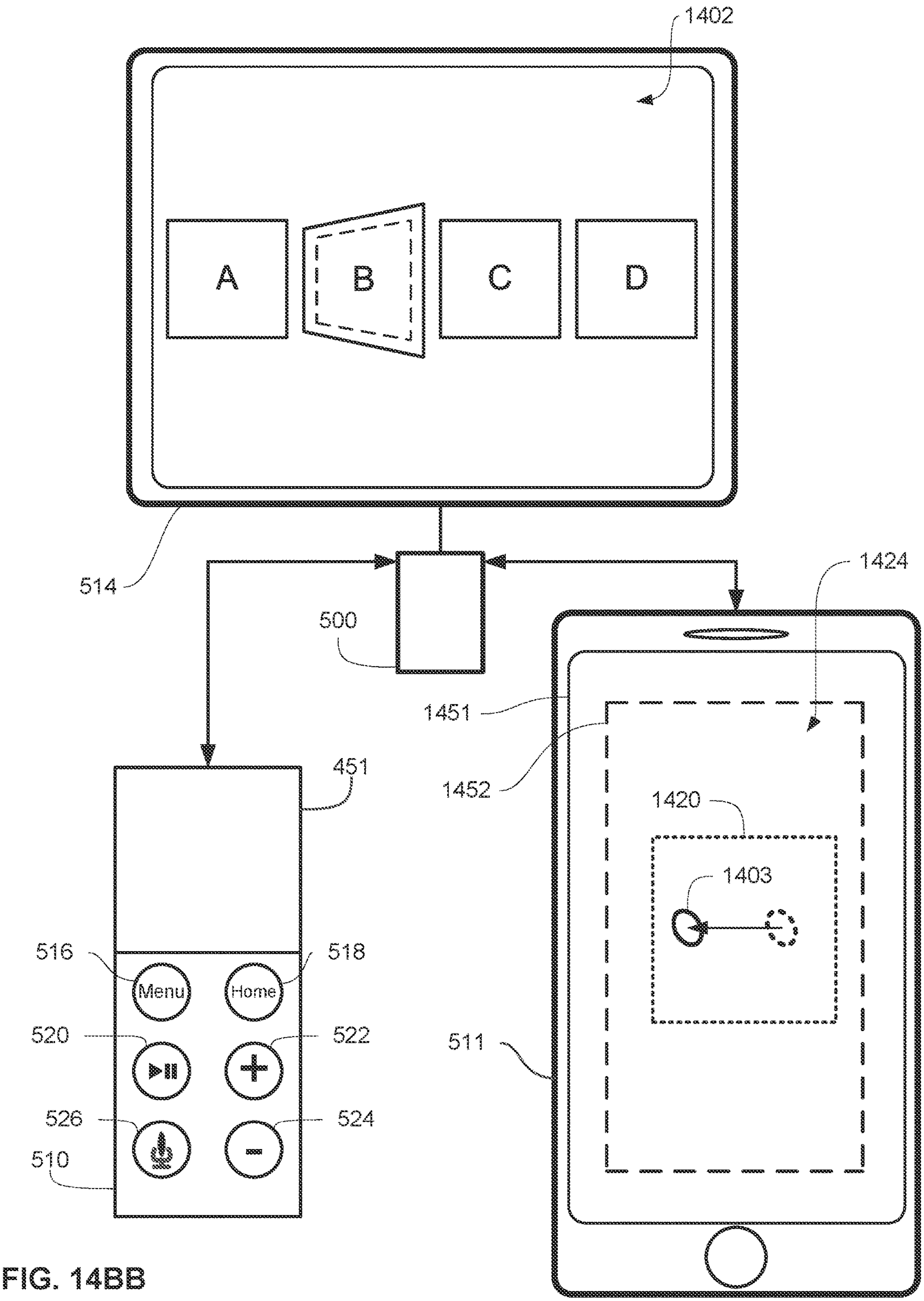
Figure 14C:
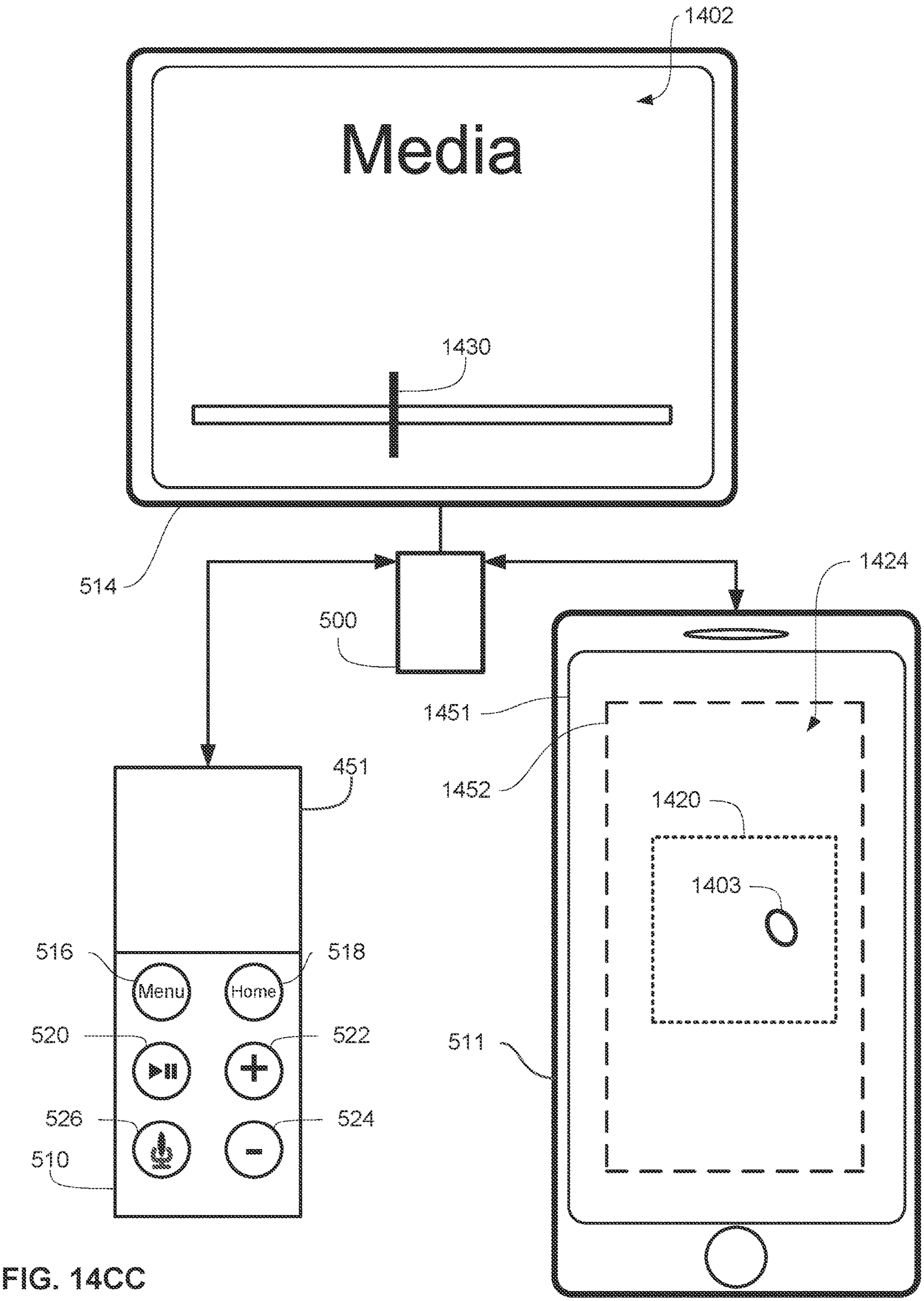
Figure 14D:
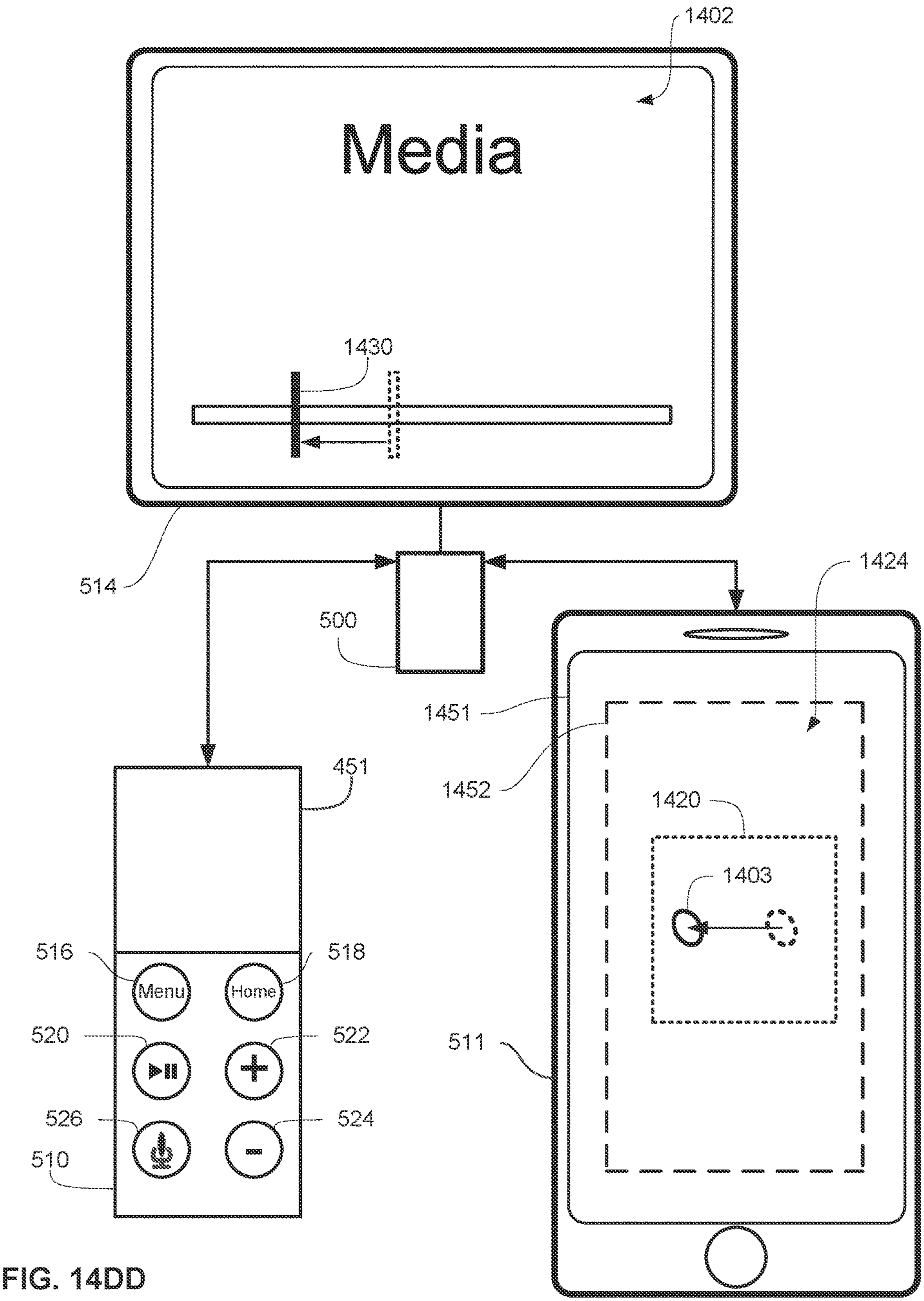
Figure 14E:
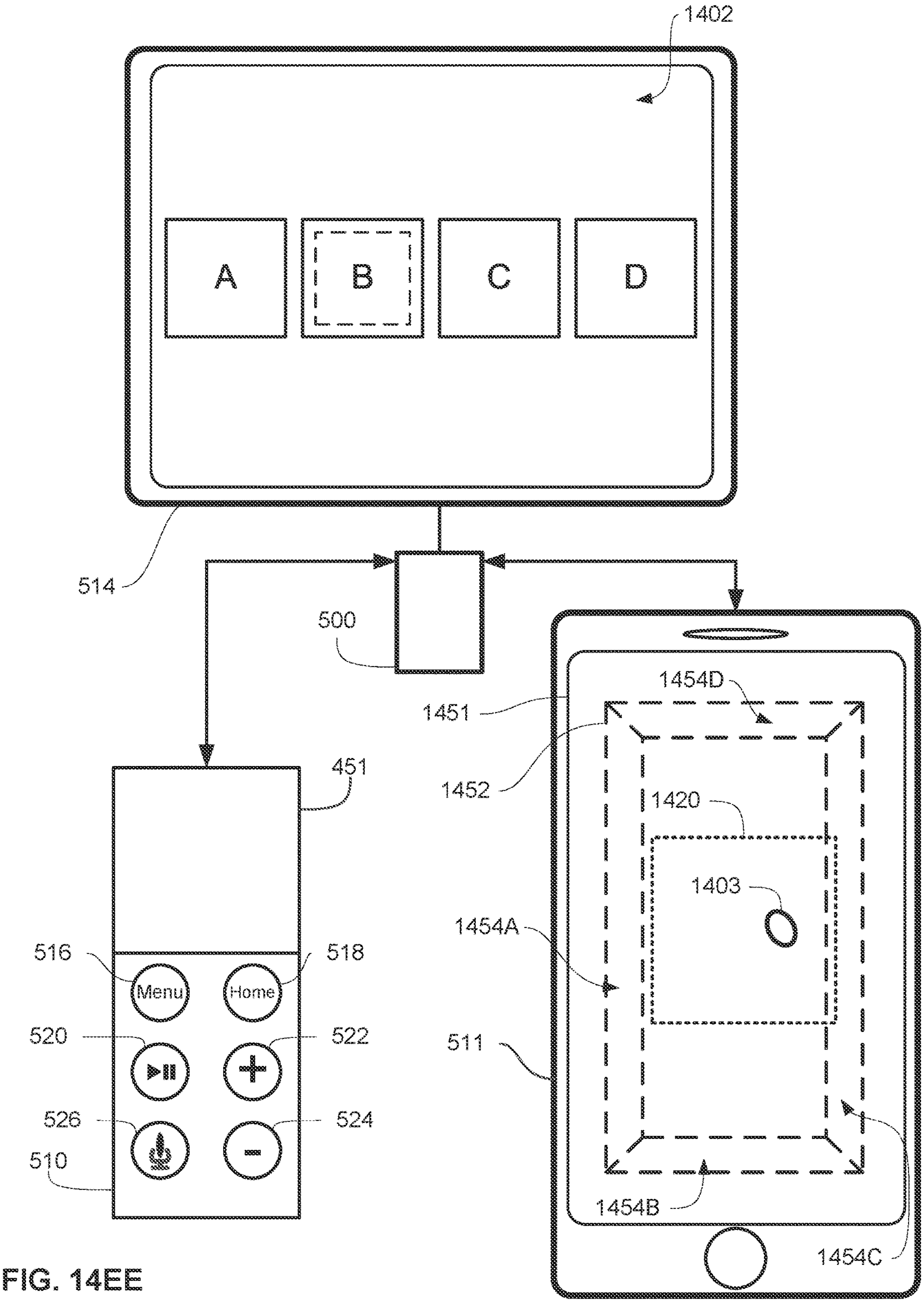
Figure 14F:
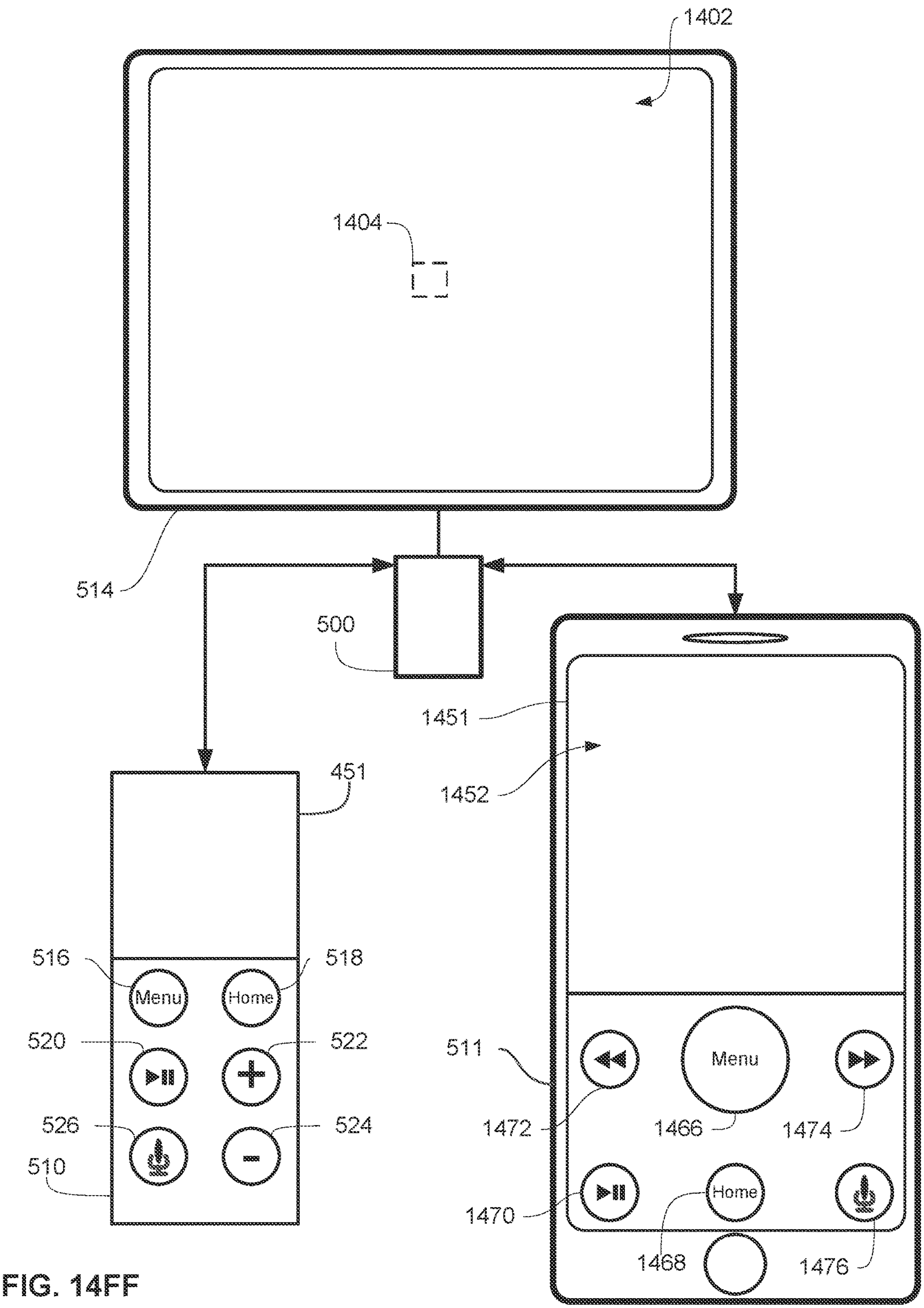
Figure 14G:
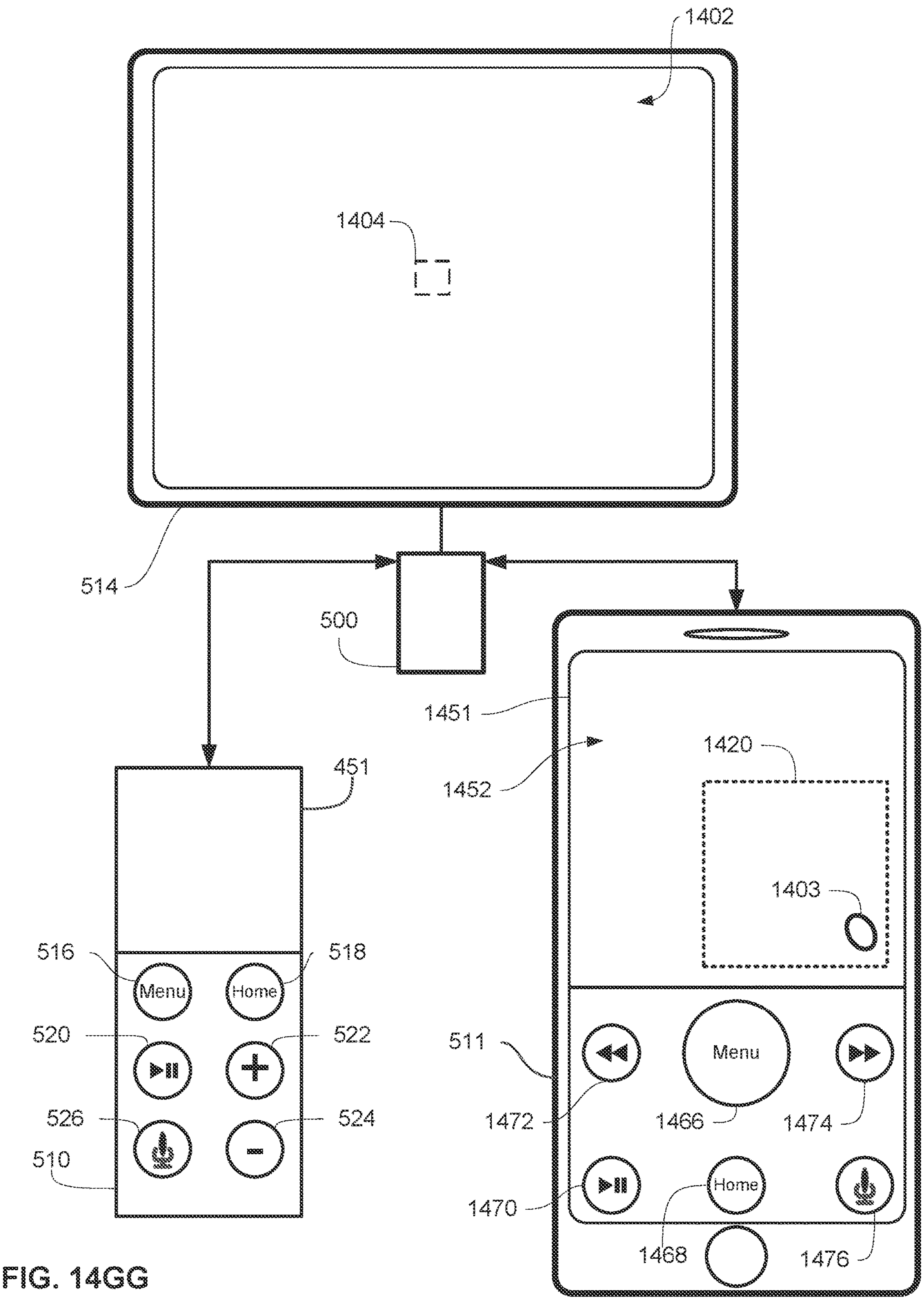
Figure 15B:
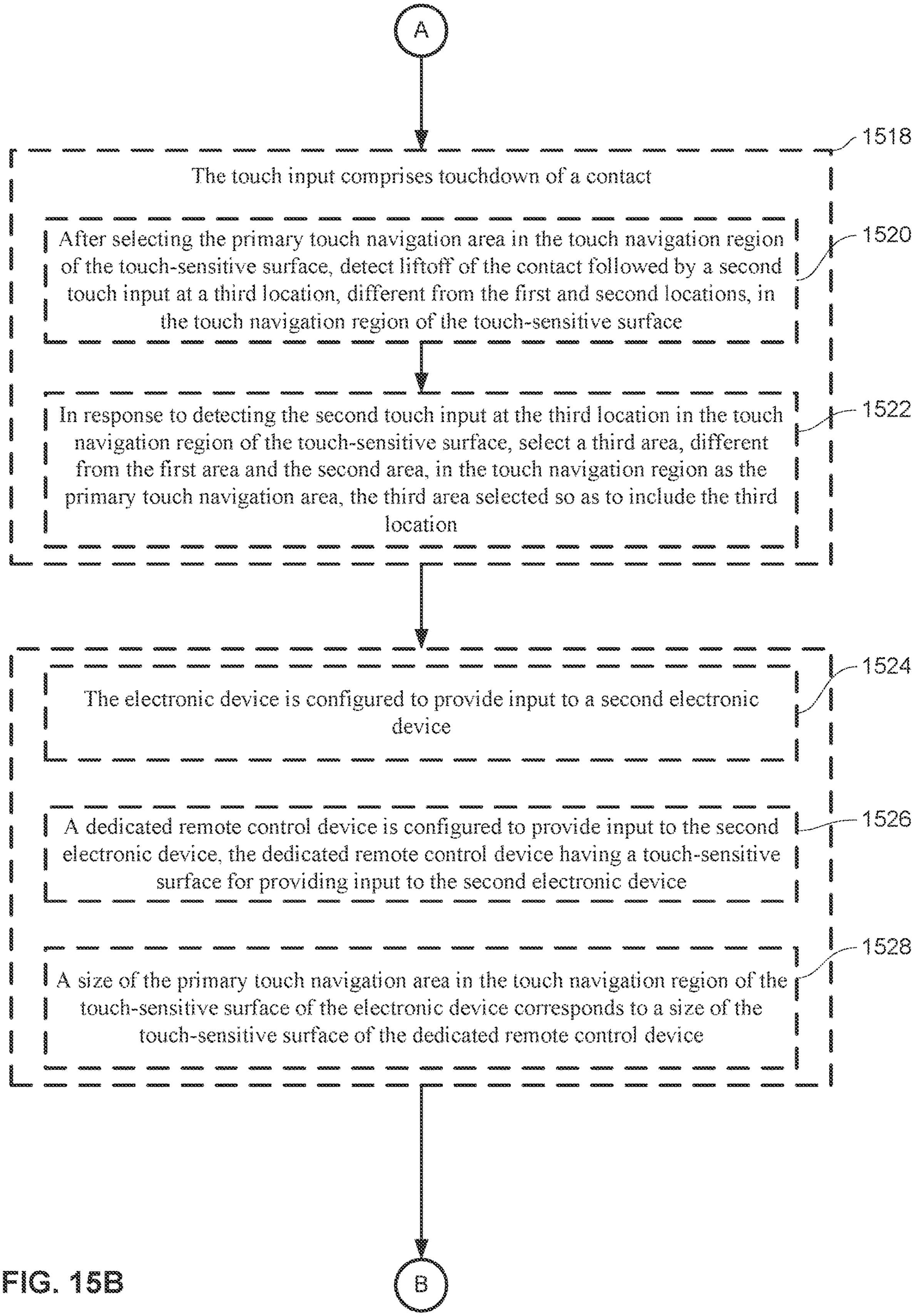
Figure 15D:
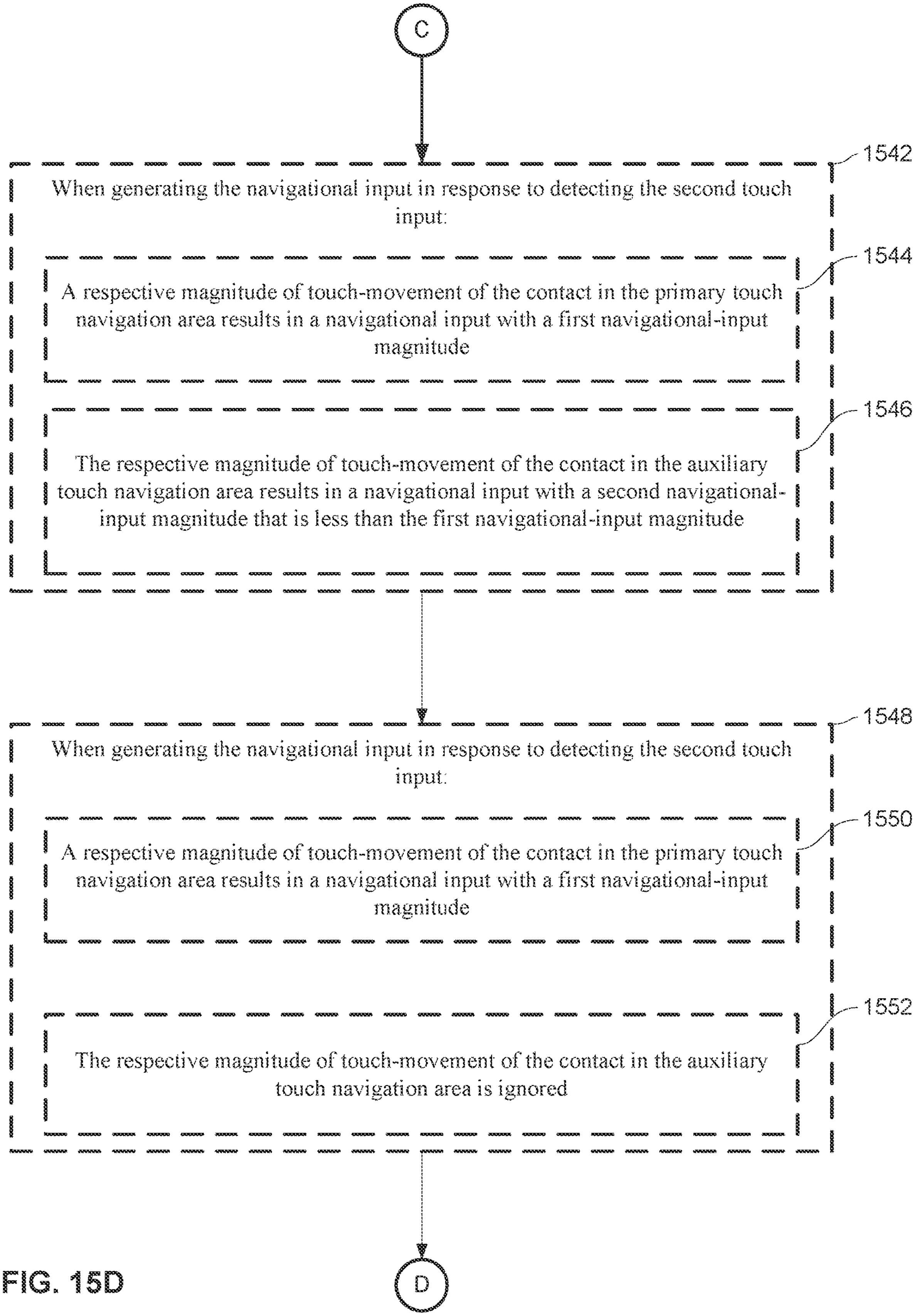
Figure 15F:
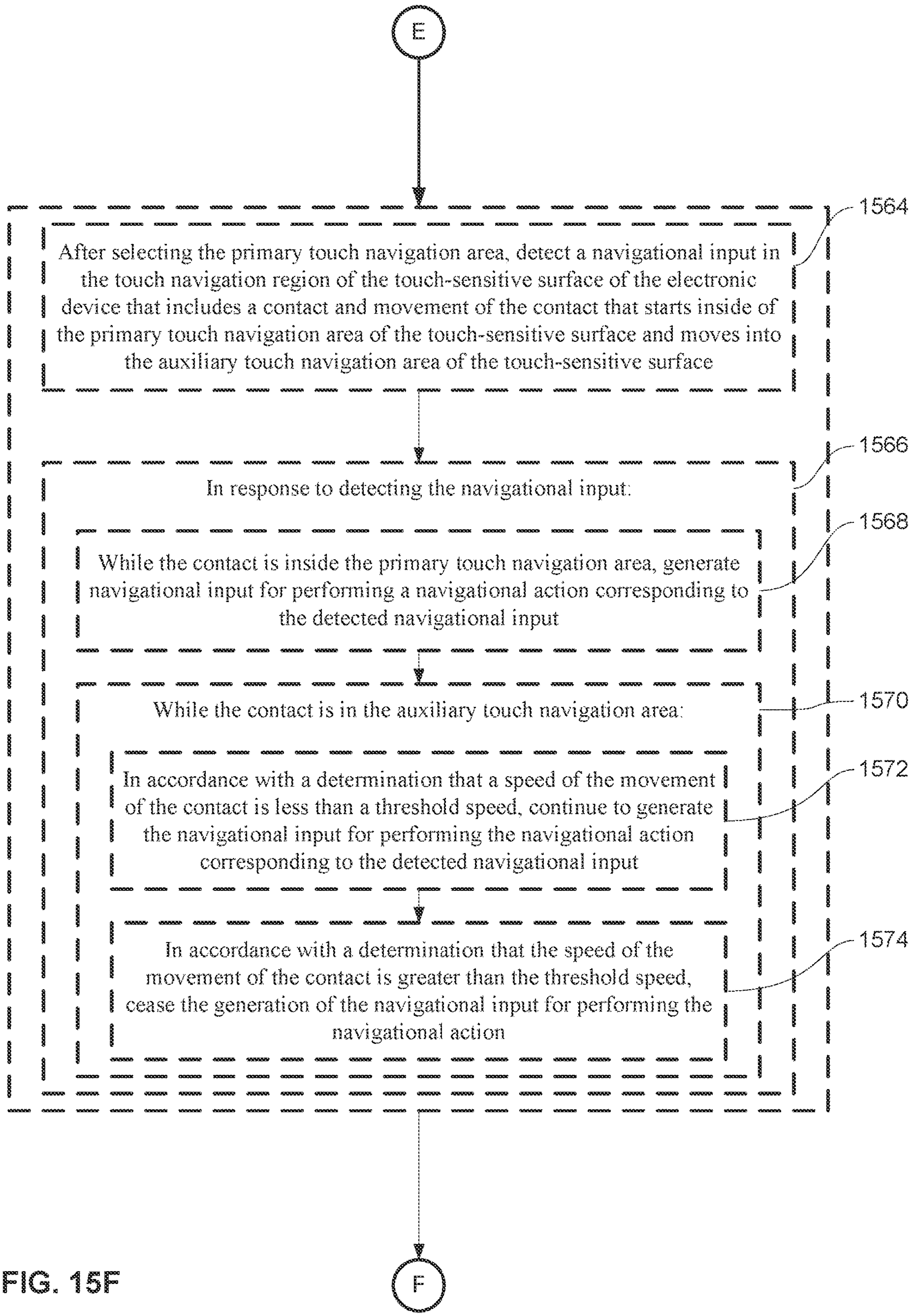
Figure 15H:
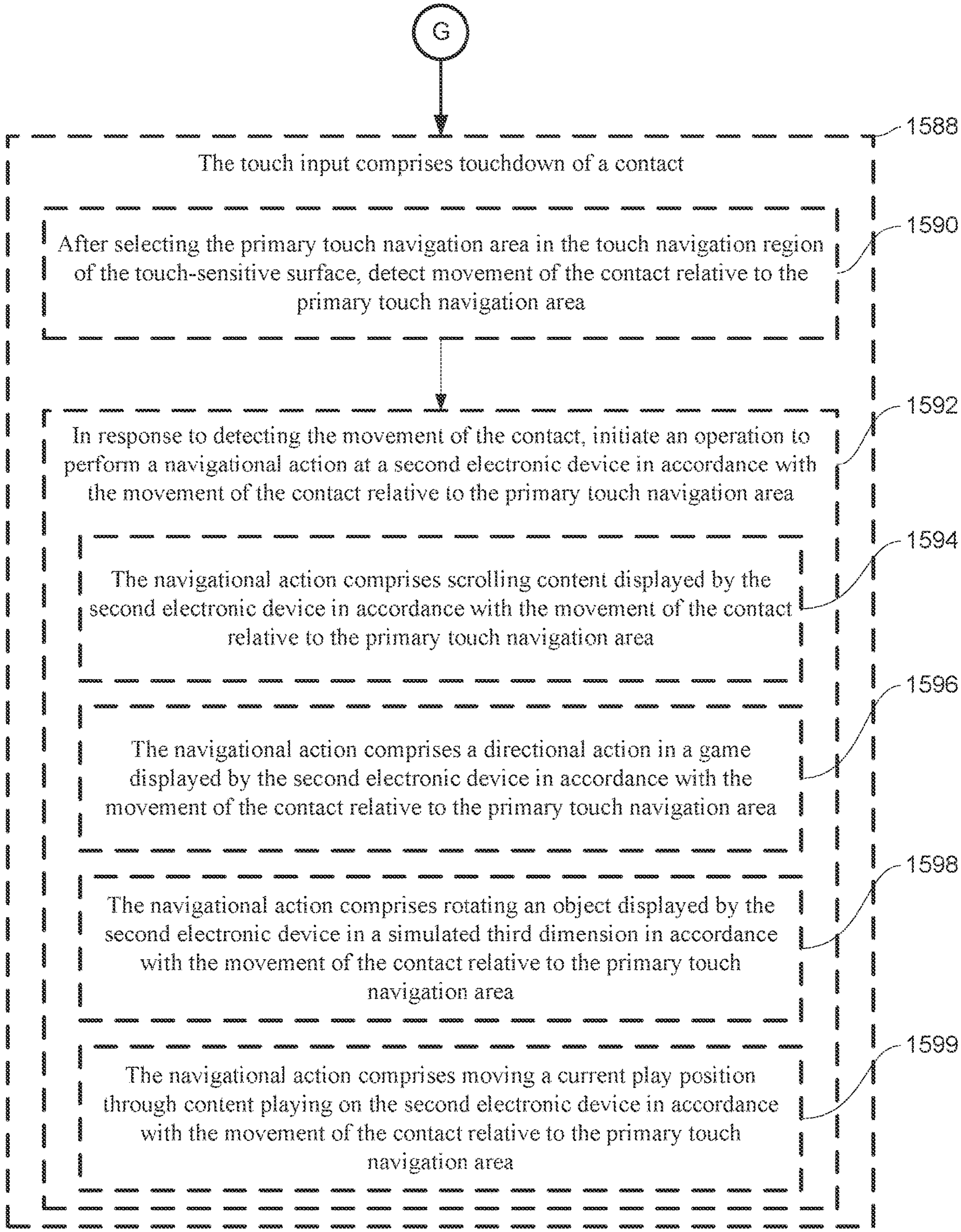

As previously mentioned, the inputs in touch navigation region 1452 are optionally used to control cursor movement, as discussed above, but are optionally implemented in other contexts in which touch input provides directional or navigational input to electronic device 500 instead of or in addition to controlling cursor movement. For example, in FIGS. 14Y-14Z, primary touch navigation area 1420 (and any or all of the other characteristics of device 511, touch navigation region 1452, primary touch navigation area 1420 and auxiliary touch navigation area 1424) is used to control scrolling of objects in user interface 1402. Specifically, in FIG. 14Y, user interface 1402 includes a row of objects A, B, C and D (and objects E and F are off the right side of user interface 1402, not displayed on display 514), and device 511 detects contact 1403 in primary touch navigation area 1420. In FIG. 14Z, device 511 detects leftward movement of contact 1403 in primary touch navigation area 1420, and in response, the row of objects is scrolled in user interface 1402 such that objects E and F are revealed in user interface 1402. Consequently, objects A and B are scrolled off the left side of user interface 1402.

In FIGS. 14AA-14BB, primary touch navigation area 1420 (and any or all of the other characteristics of device 511, touch navigation region 1452, primary touch navigation area 1420 and auxiliary touch navigation area 1424) is used to control the movement of a current selection cursor from one object to another in user interface 1402. In doing so, the objects in user interface 1402 are optionally tilted in a simulated third dimension to indicate that further movement of contact 1403 in touch navigation region 1452 (or primary touch navigation area 1420) will cause the current selection cursor to move from the current object to the next object. Specifically, in FIG. 14AA, user interface 1402 includes a row of objects A, B, C and D, a current selection cursor is positioned at object B (indicated by the dashed box in FIG. 14AA), and device 511 detects contact 1403 in primary touch navigation area 1420. In FIG. 14BB, device 511 detects leftward movement of contact 1403 in primary touch navigation area 1420, and in response, object B is tilted to the left in user interface 1402 (e.g., the left side of object B is pushed into user interface 1402, and the right side of object B is pulled out of user interface 1402), thus indicating that additional movement of contact 1403 to the left will result in the current selection cursor moving from object B to object A.

In FIGS. 14CC-14DD, primary touch navigation area 1420 (and any or all of the other characteristics of device 511, touch navigation region 1452, primary touch navigation area 1420 and auxiliary touch navigation area 1424) is used to control the current play position of media or content (e.g., music, movie, television show, etc.) playing on electronic device 500. Specifically, in FIG. 14CC, media is playing on electronic device, and the location of playhead 1430 in the bar displayed in user interface 1402 indicates the current play position within the media. Device 511 detects contact 1403 in primary touch navigation area 1420. In FIG. 14DD, device 511 detects leftward movement of contact 1403 in primary touch navigation area 1420, and in response, the current play position in the media is moved backward in time, as shown by the leftward movement of playhead 1430 within the bar displayed in user interface 1402.

In some embodiments, touch navigation region 1452 includes a plurality of predefined regions at a plurality of predefined locations in the touch navigation region 1452 (e.g., left, right, top, bottom regions). For example, in FIG. 14EE, touch navigation region 1452 includes regions 1454A, 1454B, 1454C and 1454D at the left, bottom, right and top, respectively, of touch navigation region 1452. The predefined locations of regions 1454A, 1454B, 1454C and 1454D are optionally independent of the location and/or size of primary touch navigation area 1420 in the touch navigation region 1452 (e.g., the left, right, top, bottom regions are positioned in touch navigation region 1452, independent of where primary touch navigation area 1420 is located); thus, regions 1454A, 1454B, 1454C and 1454D are optionally not limited by primary touch navigation area 1420. In some embodiments, as shown in FIG. 14EE, the left, right, top, bottom regions 1454 are positioned across the entire area of touch navigation region 1452, and are not limited by the area or position of primary touch navigation area 1420. Predefined regions 1454A, 1454B, 1454C and 1454D optionally correspond to predetermined navigational inputs (e.g., a click or tap input detected in the left, right, top, bottom regions causes device 511 to initiate an operation to perform a left, right, up, down navigational input, respectively, of a predefined magnitude, such as moving a current selection cursor by a single movement unit from object B to object C in user interface 1402).

As previously mentioned, in some embodiments, touch navigation region 1452 is displayed on touch screen 1451 along with one or more selectable buttons for controlling electronic device 500. For example, in FIG. 14FF, touch navigation region 1452 is concurrently displayed on touch screen 1451 with buttons 1466, 1468, 1470, 1472, 1474 and 1476. Touch navigation region 1452 optionally has the same aspect ratio as touch-sensitive surface 451 of remote 510. Additionally, it is understood that one or more of the embodiments described with reference to FIGS. 14A-14EE are optionally implemented with the configuration of touch navigation region 1452 and buttons 1466, 1468, 1470, 1472, 1474 and 1476 in FIGS. 14FF-14GG (e.g., touch navigation region 1452 optionally has the same behaviors and/or characteristics of touch navigation region 1452 in FIGS. 14A-14EE).

In some embodiments, one or more of buttons 1466, 1468, 1470, 1472, 1474 and 1476 in FIG. 14FF are selectable to control electronic device 500. Further, in some embodiments, one or more of buttons 1466, 1468, 1470, 1472, 1474 and 1476 correspond to (e.g., transmit the same command as, and/or cause electronic device 500 to perform the same function as) one or more of buttons 516, 518, 520, 522, 524 and 526 on remote 510. In some embodiments, detection of a selection of "menu" button 1466 by device 511 navigates electronic device 500 backwards in a currently-executing application or currently-displayed user interface (e.g., back to a user interface that was displayed previous to the currently-displayed user interface), or navigates electronic device 500 to a one-higher-level user interface than the currently-displayed user interface. In some embodiments, detection of a selection of "home" button 1468 by device 511 navigates electronic device 500 to a main, home, or root user interface from any user interface that is displayed on electronic device 500 (e.g., to a home screen of electronic device 500 that optionally includes one or more applications accessible on electronic device 500). In some embodiments, detection of a selection of "play/pause" button 1470 by device 511 toggles between playing and pausing a currently-playing content item on electronic device 500 (e.g., if a content item is playing on electronic device 500 when "play/pause" button 1470 is selected, the content item is optionally paused, and if a content item is paused on electronic device 500 when "play/pause" button 1470 is selected, the content item is optionally played). In some embodiments, detection of a selection of "backward skip" or "forward skip" buttons 1472 and 1474 by device 511 causes backward or forward skipping, respectively, of content playing on device 500 (e.g., in some embodiments, by a predetermined amount, such as 10 seconds). In some embodiments, detection of a selection of "audio input" button 1476 by device 511 allows a user to provide audio input (e.g., voice input) to electronic device 500; optionally, to a voice assistant on the electronic device 500. In some embodiments, device 511 includes a microphone via which the user provides audio input to electronic device 500 upon selection of "audio input" button 1476.

In FIG. 14GG, device 511 detects touchdown of contact 1403 (e.g., at the beginning of touch input provided by a user) in touch navigation region 1452. In FIG. 14GG, contact 1403 has been detected in the lower-right region of touch navigation region 1452. In response to detecting contact 1403, device 511 selects primary touch navigation area 1420 in touch navigation region 1452 that includes the location at which contact 1403 was detected, as shown in FIG. 14GG and as previously described in this disclosure. Additionally, as shown in FIG. 14GG, in some embodiments, primary touch navigation area 1420 has the same aspect ratio as touch navigation region 1452, which has the same aspect ratio as touch-sensitive surface 451 of remote 510.

FIGS. 15A-15H are flow diagrams illustrating a method of selecting a primary touch navigation area on the touch-sensitive surface of an electronic device that behaves similarly to the touch-sensitive surface of a dedicated remote control in accordance with some embodiments of the disclosure. The method 1500 is optionally performed at an electronic device such as device 100, device 300, device 500 or device 511 as described above with reference to FIGS. 1A-1B, 2-3 and 5A-5B. Some operations in method 1500 are, optionally, combined and/or the order of some operations is, optionally, changed.

As described below, the method 1500 provides ways of selecting a primary touch navigation area on the touch-sensitive surface of an electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a smartphone, a tablet, etc.) with a touch-sensitive surface (e.g., a touch screen), such as device 100 in FIG. 1A, 300 in FIGS. 3, 500 and/or 511 in FIG. 5A, detects (1502) a touch input (e.g., a touchdown of a contact) in a touch navigation region of the touch-sensitive surface of the electronic device, such as in FIG. 14B (e.g., a tablet computer, a mobile phone, etc., with a touch screen, or an electronic device with a touch-sensitive surface having no display capabilities, such as a trackpad). In some embodiments, a portion of the touch-sensitive surface is designated as the touch navigation region in which touch activity, such as swipe inputs, is detectable, while another portion of the touch-sensitive surface is designated for other functionality, such as in FIG. 14A. For example, the electronic device is optionally running a remote control application for controlling a second electronic device, the remote control application displaying a touch navigation region in a portion of a touch screen of the electronic device, and displaying remote control buttons in a different portion of the touch screen. In some embodiments, in response to detecting the touch input in the touch navigation region of the touch-sensitive surface (1504), in accordance with a determination that the touch input was detected at a first location in the touch navigation region of the touch-sensitive surface (e.g., detected in the upper-right portion of the touch navigation region), the electronic device selects (1506) a first area in the touch navigation region as a primary touch navigation area, wherein the first area is a subset of the touch navigation region that excludes a first auxiliary portion of the touch navigation region, and the first area is selected so as to include the first location, such as in FIG. 14C. For example, the electronic device optionally identifies an area in the upper-right portion of the touch navigation region, surrounding the location of the touch input, as the primary touch navigation area, such as in FIG. 14C. In some embodiments, the primary touch navigation area is an area in the touch navigation region in which touch inputs cause a first kind of response, such as scrolling at a first speed in response to a swipe input, while touch inputs detected outside of the primary touch navigation area cause a second kind of response, such as scrolling at a second speed in response to a swipe input.

In some embodiments, in accordance with a determination that the touch input was detected at a second location in the touch navigation region of the touch-sensitive surface (e.g., detected in the lower-left portion of the touch navigation region), the electronic device selects (1508) a second area in the touch navigation region as the primary touch navigation area, wherein the second area is a subset of the touch navigation region that excludes a second auxiliary portion of the touch navigation region, the second area is selected so as to include the second location, and the second area is different from the first area, such as in FIG. 14G. For example, the electronic device optionally identifies an area in the lower-left portion of the touch navigation region, surrounding the location of the touch input, as the primary touch navigation area. Thus, the location of the touch input optionally determines where, in the touch navigation region, the primary touch navigation area is located. As a result, the electronic device optionally provides consistent primary touch navigation area touch detection behavior to a user, regardless of where in the touch navigation region the user's touch input is detected. In some embodiments, the second location at which the touch input was detected is in the first auxiliary portion of the touch navigation region (e.g., a first auxiliary touch navigation area), and the first location at which the touch input was detected is in the second auxiliary portion of the touch navigation region (1510), such as in FIGS. 14C and 14G (e.g., the second location is outside of the first area surrounding the first location, and the first location is outside of the second area surrounding the second location). In some embodiments, the first area in the touch navigation region includes at least a portion of the second auxiliary portion of the touch navigation region (e.g., a second auxiliary touch navigation area), and the second area in the touch navigation region includes at least a portion of the first auxiliary portion of the touch navigation region (1512), such as in FIGS. 14C and 14G (e.g., the first area is in the second auxiliary portion, and the second area is in the first auxiliary portion). In some embodiments, the first area in the touch navigation region includes at least a portion of the second area in the touch navigation region (1514), such as in FIGS. 14C and 14G (e.g., the first and second areas at least partially overlap).

In some embodiments, the primary touch navigation area is selected so that a location of the touch input in the primary touch navigation area (e.g., relative to a center of the primary touch navigation area) corresponds to a location of the touch input in the touch navigation region of the touch-sensitive surface (1516) (e.g., relative to a center of the touch navigation region), such as in FIGS. 14C and 14G. In some embodiments, the primary touch navigation area is optionally defined such that the relative location of the touch input in the resulting primary touch navigation area corresponds to the relative location of the touch input in the touch navigation region of the touch-sensitive surface. For example, if the touch input is detected in the upper-right portion of the touch navigation region, the primary touch navigation area is optionally selected such that the touch input is in the upper-right portion of the primary touch navigation area. Similarly, if the touch input is detected in the lower-left portion of the touch navigation region, the primary touch navigation area is optionally selected such that the touch input is in the lower-left portion of the primary touch navigation area.

In some embodiments, the touch input comprises touchdown of a contact (1518), and the electronic device, after selecting the primary touch navigation area in the touch navigation region of the touch-sensitive surface, detects (1520) liftoff of the contact (e.g., as in FIG. 14D) followed by a second touch input (e.g., a touchdown of a second contact) at a third location, different from the first and second locations, in the touch navigation region of the touch-sensitive surface, such as in FIG. 14F (e.g., detecting the second touch input in the lower-middle portion of the touch navigation region). In response to detecting the second touch input at the third location in the touch navigation region of the touch-sensitive surface, the electronic device optionally selects (1522) a third area, different from the first area and the second area, in the touch navigation region as the primary touch navigation area, the third area selected so as to include the third location, such as in FIG. 14G. For example, in some embodiments, when a contact is lifted off the touch-sensitive surface, and a new contact subsequently touches down, the primary touch navigation area is selected again. For example, after a first primary touch navigation area is selected based on the first touch input, a second, distinct touch input causes a different primary touch navigation area to be selected if the second touch input is detected at a different location on the touch-sensitive surface than was the first touch input. In some embodiments, the primary touch navigation area selected based on the third location in the touch navigation region has some or all of the properties of the primary touch navigation area described above and below, and, optionally, an area of the touch navigation region that is outside of the primary touch navigation area is selected as an auxiliary touch navigation area that has some or all of the properties of the auxiliary touch navigation areas described above and below.

In some embodiments, the electronic device is configured to provide input to a second electronic device (1524) (e.g., electronic device 500), such as in FIGS. 14A-14C. For example, the electronic device is optionally a multifunction device such as a smartphone, tablet or other electronic device that is also configured to provide input to the second electronic device, which is optionally a set-top box or other electronic device. In some embodiments, a dedicated remote control device (e.g., remote 510) is also configured to provide (1526) input to the second electronic device (e.g., electronic device 500) (e.g., the second electronic device (e.g., a set-top box) is also controllable from a dedicated remote control device, in addition to a smartphone, for example), the dedicated remote control device having a touch-sensitive surface for providing input to the second electronic device, such as in FIGS. 14A-14C. For example, the dedicated remote control device optionally includes a touch-sensitive surface on which navigational inputs, such as swipes, are detectable to provide navigational inputs to the second electronic device. In some embodiments, a size of the primary touch navigation area in the touch navigation region of the touch-sensitive surface of the electronic device (e.g., the primary touch navigation area defined on the touch-sensitive surface of the electronic device) corresponds to a size of the touch-sensitive surface of the dedicated remote control device (1528), such as in FIG. 14C. For example, the primary touch navigation area defined on the touch-sensitive surface of the electronic device is optionally the same size/shape (or substantially the same size/shape, such as being within 5%, 10%, 15%, or 25% of the same size/shape) as the touch-sensitive surface of the dedicated remote control. In this way, the electronic device provides an input experience to a user that is consistent with the user's input experience with the dedicated remote control device.

In some embodiments, the size of the primary touch navigation area is the same regardless of the size of the touch-sensitive surface of the electronic device. For example, in some embodiments, in accordance with a determination that the electronic device is a first device on which the touch navigation region has a first size (the first size of the touch navigation region is optionally based on a size of a touch-sensitive surface on the first device), the primary touch navigation area has a respective size (1530), and in accordance with a determination that the electronic device is a second device on which the touch navigation region has a second size (the second size of the touch navigation region is optionally based on a size of a touch-sensitive surface on the second device), larger than the first size, the primary touch navigation area still has the respective size (1532). For example, the touch navigation regions of different devices optionally have different sizes (e.g., larger touch-sensitive surfaces optionally result in larger touch navigation regions), but the size of the primary touch navigation area optionally remains constant from one device to another. In some embodiments, the second device mentioned above has a larger auxiliary touch navigation area than the auxiliary touch navigation area on the first device (e.g., because the second device has a larger touch navigation region and the primary touch navigation area within the touch navigation regions is the same on both the first device and the second device).

In some embodiments, detecting the touch input includes detecting a contact on the touch-sensitive surface (1534), and in response to detecting the touch input in the touch navigation region of the touch-sensitive surface, the electronic device selects (1536) an area outside of the primary touch navigation area in the touch navigation region as an auxiliary touch navigation area, such as in FIG. 14C (e.g., the remainder of the touch navigation region outside of the primary touch navigation area is the auxiliary touch navigation area). After selecting the primary touch navigation area and the auxiliary touch navigation area, the electronic device optionally detects (1538) a second touch input including a movement of the contact in the touch navigation region of the touch-sensitive surface of the electronic device (e.g., the first touch input and the second touch input are part of a continuous sequence of inputs that are detected based on a same contact detected on the touch navigation region of the touch-sensitive surface) that includes movement of the contact through a portion of the primary touch navigation area and a portion of the auxiliary touch navigation area, such as in FIGS. 14H and 14I. In response to detecting the second touch input in the touch navigation region of the touch-sensitive surface, the electronic device optionally generates (1540) navigational input that includes a navigational-input magnitude of navigation that is based on a touch-movement magnitude of the movement of the contact in the touch navigation region, such as in FIGS. 14H and 14I, where movement of the contact in the primary touch navigation area results in a navigational input with a greater navigational-input magnitude (e.g., as in FIG. 14H) than movement of the contact in the auxiliary touch navigation area (e.g., as in FIG. 14I). For example, in some embodiments, touch navigation input detected in the auxiliary touch navigation area optionally causes slower navigation than touch navigation input detected in the primary touch navigation area, such as in FIGS. 14H and 14I.

In some embodiments, when the electronic device generates the navigational input in response to detecting the second touch input (1542), a respective magnitude of touch-movement of the contact in the primary touch navigation area results in a navigational input with a first navigational-input magnitude (1544), such as in FIG. 14H, and the respective magnitude of touch-movement of the contact in the auxiliary touch navigation area results in a navigational input with a second navigational-input magnitude that is less than the first navigational-input magnitude (1546), such as in FIG. 14I. Thus, in some embodiments, touch navigation input detected in the auxiliary touch navigation area optionally causes slower navigation than touch navigation input detected in the primary touch navigation area. For example, a scrolling input (e.g., a swipe) detected in the primary touch navigation area optionally causes a list or other user interface element displayed by the second electronic device to scroll relatively quickly, while a scrolling input detected in the auxiliary touch navigation area optionally causes the list or other user interface element to scroll relatively slowly. In some embodiments, a single swipe (e.g., touchdown of a contact, movement of the contact, and liftoff of the contact) crosses over from the primary touch navigation area to the auxiliary touch navigation area, or vice versa, and speed of the corresponding scrolling input changes accordingly as the swipe crosses from one area to the other.

In some embodiments, when the electronic device generates the navigational input in response to detecting the second touch input (1548), a respective magnitude of touch-movement of the contact in the primary touch navigation area results in a navigational input with a first navigational-input magnitude (1550), such as in FIG. 14J, and the respective magnitude of touch-movement of the contact in the auxiliary touch navigation area is ignored (1552) by the electronic device, such as in FIG. 14K (e.g., movement of the contact in the auxiliary touch navigation area results in no or zero magnitude navigational input). In some embodiments, a first edge (e.g., a left edge) of the primary touch navigation area is positioned at a first distance from a corresponding first edge (e.g., a left edge) of the touch navigation region, and a second edge (e.g., a right edge) of the primary touch navigation area is positioned at a second distance, different from the first distance, from a corresponding second edge (e.g., a right edge) of the touch navigation region (1554). For example, the primary touch navigation area is closer to the right edge of the touch navigation region than the left edge of the touch navigation region. In other words, the primary touch navigation area is optionally not centered in the touch navigation region, such as in FIG. 14L. In some embodiments, after selecting the primary touch navigation area, the electronic device detects (1556) a second touch input on the touch-sensitive surface (e.g., a continuation of the first touch input, on which selection of the primary touch navigation area was based, without detecting liftoff of the contact) comprising a respective amount of movement of the contact from a respective edge of the primary touch navigation area toward a respective edge of the touch navigation region of the touch-sensitive surface, such as in FIGS. 14M and 14P (e.g., a contact at the left edge of the primary touch navigation area that moves a certain amount towards the left edge of the touch navigation region, or a contact at the right edge of the primary touch navigation area that moves a certain amount towards the right edge of the touch navigation region. In response to detecting the second touch input on the touch-sensitive surface (1558), in accordance with a determination that the respective edge of the primary touch navigation area is the first edge of the primary touch navigation area (e.g., the contact is detected on the left edge of the primary touch navigation area), and the movement of the contact is toward the first edge of touch navigation region (e.g., the movement of the contact is toward the left edge of the touch navigation area), the electronic device optionally initiates (1560) an operation to perform a navigational action having a first magnitude in accordance with the respective amount of movement of the contact, such as in FIG. 14M (e.g., detecting a certain amount of movement of the contact (e.g., 1 cm) from the left edge of the primary touch navigation area to the left edge of the touch navigation region results in a certain amount of navigation). In accordance with a determination that the respective edge of the primary touch navigation area is the second edge of the primary touch navigation area (e.g., the contact is detected on the right edge of the primary touch navigation area), and the movement of the contact is toward the second edge of touch navigation region (e.g., the movement of the contact is toward the right edge of the touch navigation area), the electronic device optionally initiates (1562) an operation to perform the navigational action having a second magnitude, different from the first magnitude, in accordance with the respective amount of movement of the contact, such as in FIG. 14P (e.g., detecting a certain amount of movement of the contact (e.g., 1 cm) from the right edge of the primary touch navigation area to the right edge of the touch navigation region results in an amount of navigation that is different from the amount of navigation that results from 1 cm of leftward contact movement from the left edge of the primary touch navigation area).

For example, in some embodiments, the primary touch navigation area is closer to the right edge of the touch navigation region than the left edge of the touch navigation region. Additionally, some amount (e.g., 80%) of navigational input is optionally achievable from the touch navigation region via contact movement detected from one edge (e.g., the left edge) of the primary touch navigation area to another edge (e.g., the right edge) of the primary touch navigation area, such as in FIGS. 14L-14P. The remaining amount of navigational input (e.g., 20%) is optionally partitioned between the areas to the left and right of the primary touch navigation area in the touch navigation region of the touch-sensitive surface. For example, a remaining 10% of the navigational input is optionally achievable via contact movement detected from the left edge of the touch navigation region to the left edge of the primary touch navigation area (or vice versa), and another remaining 10% of the navigational input is optionally achievable via contact movement detected from the right edge of the touch navigation region to the right edge of the primary touch navigation area (or vice versa). Therefore, if the primary touch navigation area is closer to the right side than the left side of the touch navigation region, the amount of navigational input that results from a given amount of contact movement on the left side of the primary touch navigation area (e.g., between the left edge of the primary touch navigation area and the left edge of the touch navigation region) is optionally less than the amount of navigational input that results from the given amount of contact movement on the right side of the primary touch navigation area (e.g., between the right edge of the primary touch navigation area and the right edge of the touch navigation region).

In some embodiments, after selecting the primary touch navigation area, the electronic device detects (1564) a navigational input (e.g., a swipe or scrolling input) in the touch navigation region of the touch-sensitive surface of the electronic device (e.g., the first touch input and the navigational input are part of a continuous sequence of inputs that are detected based on a same contact detected on the touch navigation region of the touch-sensitive surface) that includes a contact and movement of the contact (e.g., a swipe or scrolling input) that starts inside of the primary touch navigation area of the touch-sensitive surface and moves into the auxiliary touch navigation area of the touch-sensitive surface, such as in FIGS. 14R-14V (e.g., a contact performing a swipe is originally located inside the primary touch navigation area, and as the swipe is performed, the contact moves outside of the primary touch navigation area). In response to detecting the navigational input (1566), while the contact is inside the primary touch navigation area (e.g., the contact performing the swipe is located inside the primary touch navigation area), the electronic device optionally generates (1568) navigational input for performing a navigational action corresponding to the detected navigational input, such as in FIGS. 14R and 14U (e.g., causing content to be scrolled at a first speed on a second electronic device that is controlled by the electronic device). While the contact is in the auxiliary touch navigation area (1570) (e.g., the contact performing the swipe is located outside of the primary touch navigation area), in accordance with a determination that a speed of the movement of the contact is less than a threshold speed (e.g., a slow swipe), the electronic device optionally continues to generate (1572) the navigational input for performing the navigational action corresponding to the detected navigational input, such as in FIG. 14S. For example, in some embodiments, the navigational action while the navigational input is inside the primary touch navigation area is correlated to a proportionally greater magnitude of navigational action than the same magnitude of navigational input outside of the primary touch navigation area, as described above. Further, in accordance with a determination that the speed of the movement of the contact is greater than the threshold speed (e.g., a fast swipe), the electronic device optionally ceases (1574) the generation of the navigational input for performing the navigational action, such as in FIG. 14V. For example, if a fast swipe moves outside of the primary touch navigation area, the electronic device optionally stops responding to the swipe when it moves outside of the primary touch navigation area, but if a slow swipe moves outside of the primary touch navigation area, the electronic device optionally continues to cause scrolling based on the movement of the contact, but does so more slowly than in the primary touch navigation area.

In some embodiments, the speed of the movement of the contact is greater than the threshold speed (e.g., the swipe is a fast swipe), and the navigational input has moved into the auxiliary touch navigation area (1576) (e.g., the contact performing the swipe has moved outside of the primary touch navigation area). In such embodiments, after ceasing the generation of the navigational input, the electronic device optionally detects (1578) movement of the contact back into the primary touch navigation area, such as in FIGS. 14W-14X (e.g., the contact performing the swipe has moved back inside the primary touch navigation area). In response to detecting the movement of the contact back into the primary touch navigation area, the electronic device optionally resumes (1580) the generation of the navigational input for performing the navigational action corresponding to the detected navigational input inside the primary navigation area, such as in FIG. 14X (e.g., once a fast swipe moves back into the primary touch navigation area, the electronic device optionally again starts to respond to the movement of the navigational input within the primary touch navigation area). In some embodiments, the touch navigation region includes a plurality of predefined regions at a plurality of predefined locations in the touch navigation region (e.g., left, right, top, bottom regions), independent of a location of the primary touch navigation area in the touch navigation region (e.g., the left, right, top, bottom regions are positioned in the touch navigation region, independent of where the primary touch navigation area is located—in some embodiments, the left, right, top, bottom regions are positioned across the entire area of the touch navigation region), the plurality of predefined regions corresponding to predetermined navigational inputs (1582), such as in FIG. 14EE. For example, a click or tap input detected in the left, right, top, bottom regions causes the electronic device to initiate an operation to perform a left, right, up, down navigational input, respectively, of a predefined magnitude, such as moving a current selection cursor by a single movement unit.

In some embodiments, a dedicated remote control device is configured to provide input to a second electronic device (e.g., the second electronic device (e.g., a set-top box) is controllable from a dedicated remote control device), the dedicated remote control device having a touch-sensitive surface for providing input to the second electronic device (e.g., the dedicated remote control device optionally includes a touch-sensitive surface on which touch inputs, such as taps or swipes, are detectable to provide corresponding inputs to the second electronic device), and the dedicated remote control device configured to provide, to the second electronic device, a command of a touch input type (e.g., a type of command that corresponds to and describes touch input detected on a touch-sensitive surface) corresponding to a touch input detected on the touch-sensitive surface of the dedicated remote control device (1584). For example, when the dedicated remote control device detects touchdown of a contact, movement of the contact, and/or liftoff of the contact on the touch-sensitive surface of the dedicated remote control device, the dedicated remote control device transmits one or more touch input commands to the second electronic device that correspond to the contact behavior detected on the touch-sensitive surface of the dedicated remote control. In such embodiments, in response to detecting the touch input in the touch navigation region of the touch-sensitive surface electronic device, the electronic device optionally provides (1586), to the second electronic device, a command of the touch input type corresponding to the touch input detected in the touch navigation region of the touch-sensitive surface of the electronic device, such as in FIGS. 14B, 14D, 14F and 14H-14J. For example, when the electronic device detects touchdown of a contact, movement of the contact, and/or liftoff of the contact on the touch-sensitive surface of the electronic device, the electronic device transmits one or more touch input commands to the second electronic device that correspond to the contact behavior detected on the touch-sensitive surface of the electronic device, such as in FIGS. 14B, 14D, 14F and 14H-14J. Therefore, in some embodiments, the electronic device transmits touch commands to the second electronic device that are of the same type as touch commands transmitted to the second electronic device from a dedicated remote control device. Accordingly, software created for the second electronic device need not be specially programmed to accept input from the electronic device and from a dedicated remote control device, because the electronic device optionally interacts with the second electronic device in the same way as does a dedicated remote control device. Therefore, software programming for the second electronic device is simplified. Additionally, the electronic device's definition of the primary touch navigation area as described in this disclosure ensures that the electronic device, when acting as a remote control to the second electronic device, provides the same (or substantially the same) navigation response to a user as the dedicated remote control device, thus making the human-machine interface more efficient.

In some embodiments, the touch input comprises touchdown of a contact (1588), and after selecting the primary touch navigation area in the touch navigation region of the touch-sensitive surface, the electronic device detects (1590) movement of the contact relative to the primary touch navigation area, such as in FIG. 14H (e.g., detecting the contact move within and/or outside of the primary touch navigation area). In response to detecting the movement of the contact, the electronic device optionally initiates (1592) an operation to perform a navigational action at a second electronic device (e.g., a set-top box that the electronic device is configured to control) in accordance with the movement of the contact relative to the primary touch navigation area, such as in FIG. 14H (e.g., scrolling content or otherwise performing a navigational action at the second electronic device based on the speed, magnitude and/or direction of the movement of the contact relative to the primary touch navigation area). For example, a left-to-right swipe of the contact detected in the primary touch navigation area optionally causes the electronic device to initiate an operation to scroll content on the second electronic device from left to right. In some embodiments, the navigational action described above comprises scrolling content displayed by the second electronic device (e.g., a list of items, a grid of icons, etc., displayed on a television by the second electronic device) in accordance with the movement of the contact relative to the primary touch navigation area (1594), such as in FIGS. 14Y-14Z (e.g., the direction, amount and/or speed of the scrolling of the content is optionally based on the direction, magnitude and/or speed, respectively, of the movement of the contact relative to the primary touch navigation area). In some embodiments, the navigational action described above comprises a directional action in a game (e.g., moving a character, steering a car, etc.) displayed by the second electronic device in accordance with the movement of the contact relative to the primary touch navigation area (1596) (e.g., the direction, amount and/or speed of the directional action is optionally based on the direction, magnitude and/or speed, respectively, of the movement of the contact relative to the primary touch navigation area). For example, a left-to-right swipe in the primary touch navigation area optionally causes a character in the game to move to the right.

In some embodiments, the navigational action comprises rotating an object (e.g., an icon in a grid of icons) displayed by the second electronic device in a simulated third dimension in accordance with the movement of the contact relative to the primary touch navigation area (1598), such as in FIGS. 14AA-14BB (e.g., the direction, amount and/or speed of the rotation of the object is optionally based on the direction, magnitude and/or speed, respectively, of the movement of the contact relative to the primary touch navigation area). For example, a left-to-right swipe in the primary touch navigation area optionally causes the object/icon to rotate or tilt to the right (e.g., about an axis that is parallel to the display, so that the object appears to rotate out of the display). An amount of tilting of the object/icon optionally indicates that a current focus is going to shift from the currently-selected object/icon to the next object/icon in the direction of the movement of the contact. In some embodiments, the navigational action comprises moving a current play position (e.g., as graphically represented by a playhead or other graphical indication of a current play position in content) through content (e.g., a movie, music, television show, etc.) playing on the second electronic device in accordance with the movement of the contact relative to the primary touch navigation area (1599), such as in FIGS. 14CC-14DD (e.g., the direction, amount and/or speed of the movement through the content is optionally based on the direction, magnitude and/or speed, respectively, of the movement of the contact relative to the primary touch navigation area). For example, a left-to-right swipe in the primary touch navigation area optionally causes the current play position in the content to move forward (e.g., causes the second electronic device to scrub forward or fast-forward through the content).

It should be understood that the particular order in which the operations in FIGS. 15A-15H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1700 and 1900) are also applicable in an analogous manner to method 1500 described above with respect to FIGS. 15A-15H. For example, the touch inputs, software remote control applications, primary touch navigation areas and/or simulated remote trackpads described above with reference to method 1500 optionally have one or more of the characteristics of the touch inputs, software remote control applications, primary touch navigation areas and/or simulated remote trackpads described herein with reference to other methods described herein (e.g., methods 700, 900, 1100, 1300, 1700 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 24) or application specific chips. Further, the operations described above with reference to FIGS. 15A-15H are, optionally, implemented by components depicted in FIGS. 1A-1B. For example, detecting operation 1502 and selecting operations 1506 and 1508 are, optionally, implemented by event sorter 170, event recognizer 180, and event handler 190. Event monitor 171 in event sorter 170 detects a contact on touch screen 1451, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Movement-Based Primary Touch Navigation Area Selection

Users interact with electronic devices in many different manners, including interacting with content (e.g., music, movies, etc.) that may be available (e.g., stored or otherwise accessible) on the electronic devices. In some circumstances, a user interacts with an electronic device by alternating between using a dedicated remote control and a multifunction device to provide navigational inputs (e.g., swipes for scrolling content) to the electronic device. However, in some circumstances, the sizes of touch-sensitive surfaces for providing such navigational input on the dedicated remote control and the multifunction device differ. In some embodiments, the multifunction device optionally selects a primary touch navigation area on its touch-sensitive surface that has one or more characteristics (e.g., size) of the touch-sensitive surface of a dedicated remote control, as described above with reference to FIGS. 14A-14GG and 15A-15H. However, in certain cases, the primary touch navigation area selected by the multifunction device limits the distance a touch input is able to move in a given direction, because a boundary of the primary touch navigation area selected ends up being relatively close to the touch input in that given direction. The embodiments described below provide ways in which the multifunction device selects a primary touch navigation area on its touch-sensitive surface, based on movement of a contact when it is first detected by the multifunction device (e.g., when the contact touches down on the touch-sensitive surface), so as to increase or maximize the distance the contact is able to move in a given direction before reaching a boundary of the primary touch navigation area in that given direction, thereby enhancing users' interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 16A:
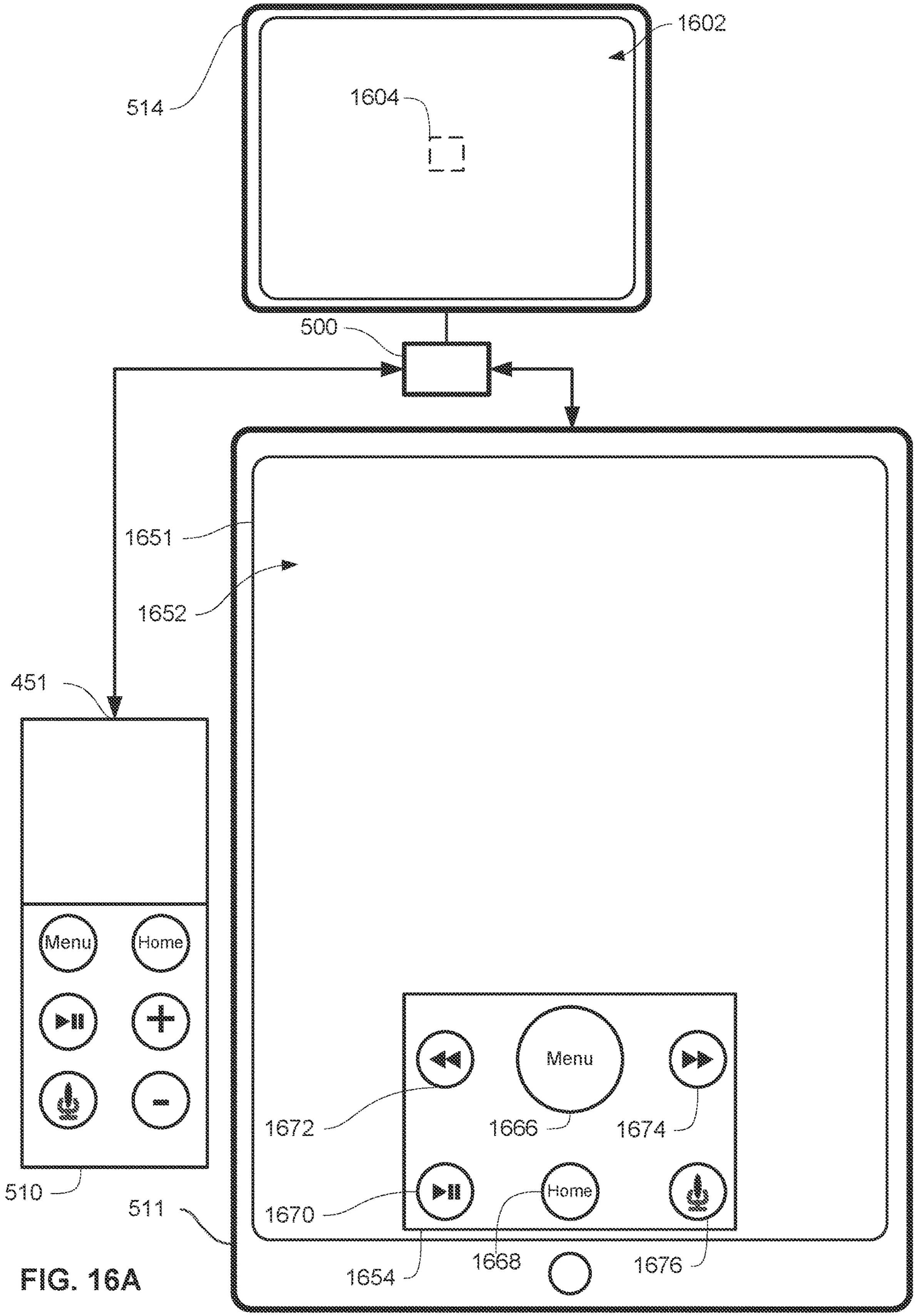
FIGS. 16A-16T illustrate exemplary ways in which a multifunction device selects a primary touch navigation area on its touch-sensitive surface based on movement of a contact when it is first detected by the multifunction device (e.g., when the contact touches down on the touch-sensitive surface) in accordance with some embodiments of the disclosure.
Figure 16B:
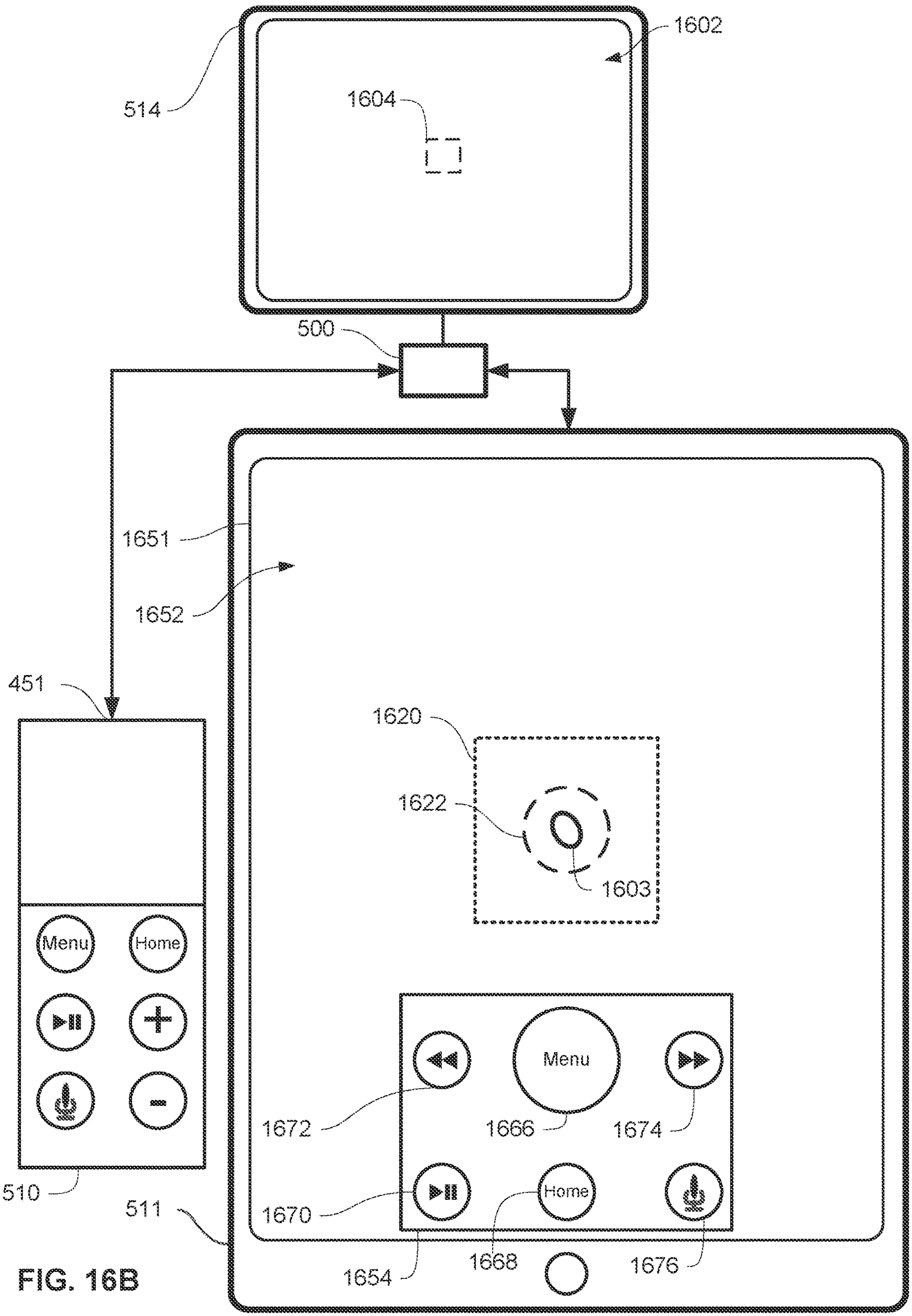
Figure 16C:
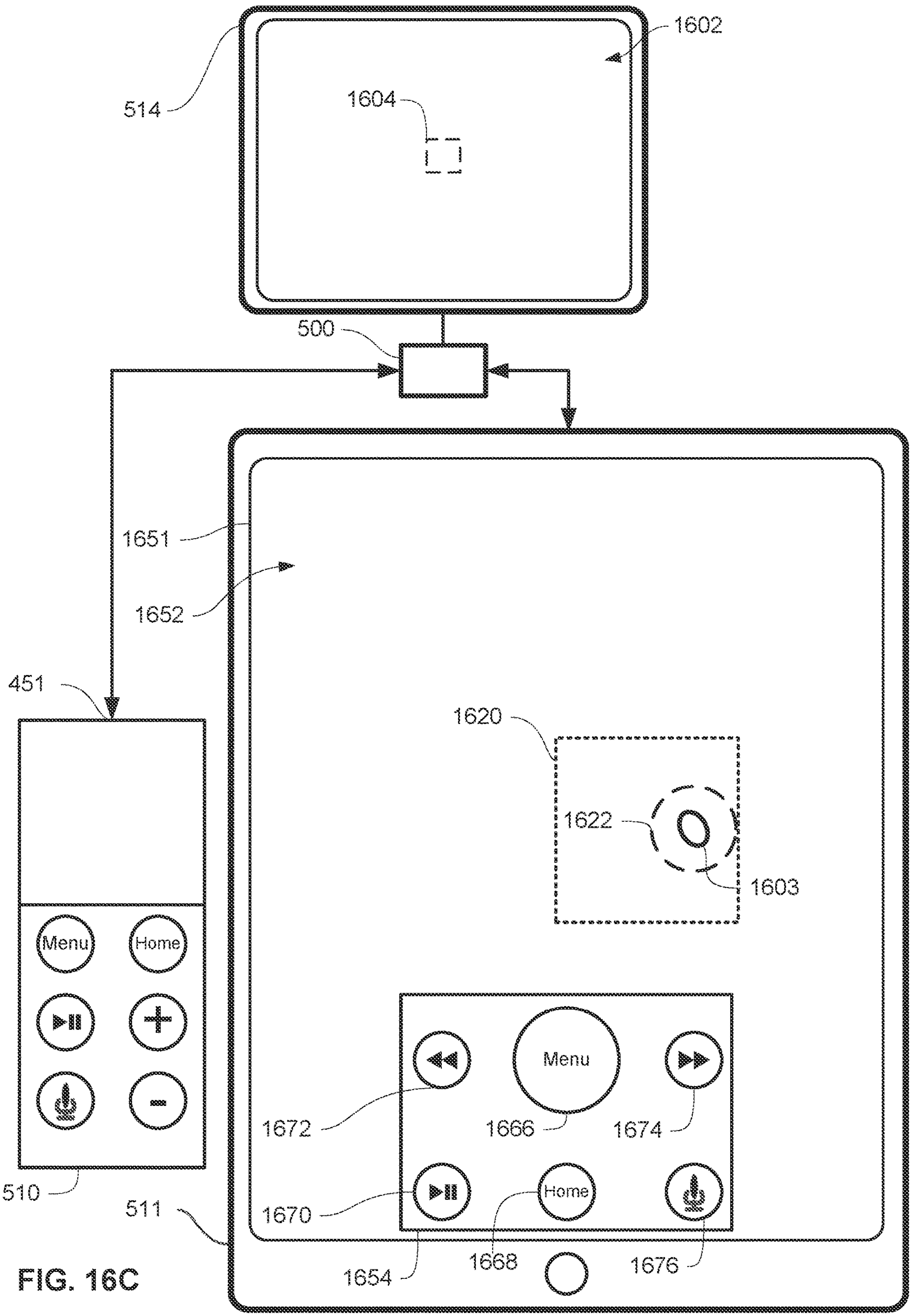
Figure 16D:
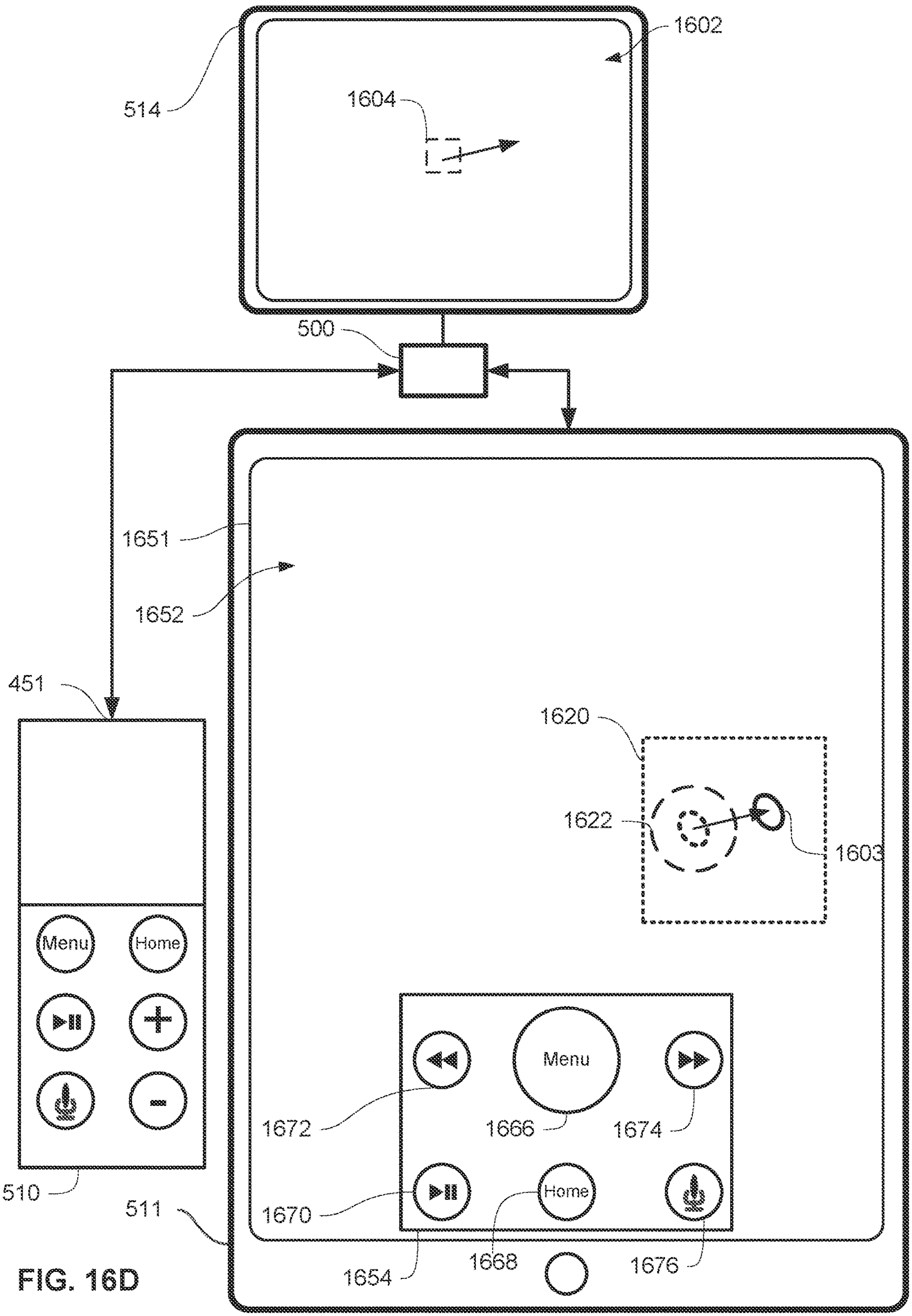
Figure 16E:
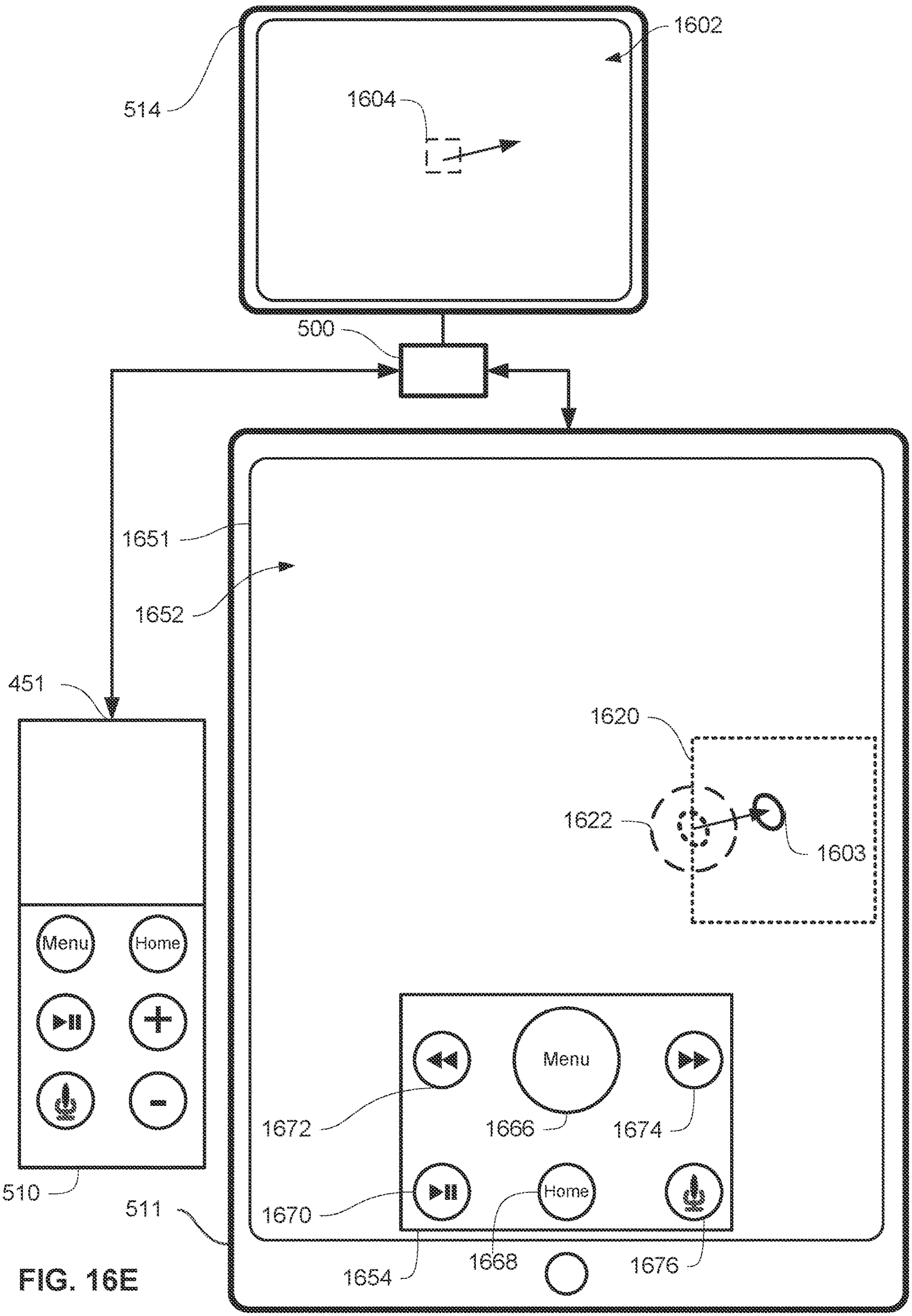
Figure 16F:
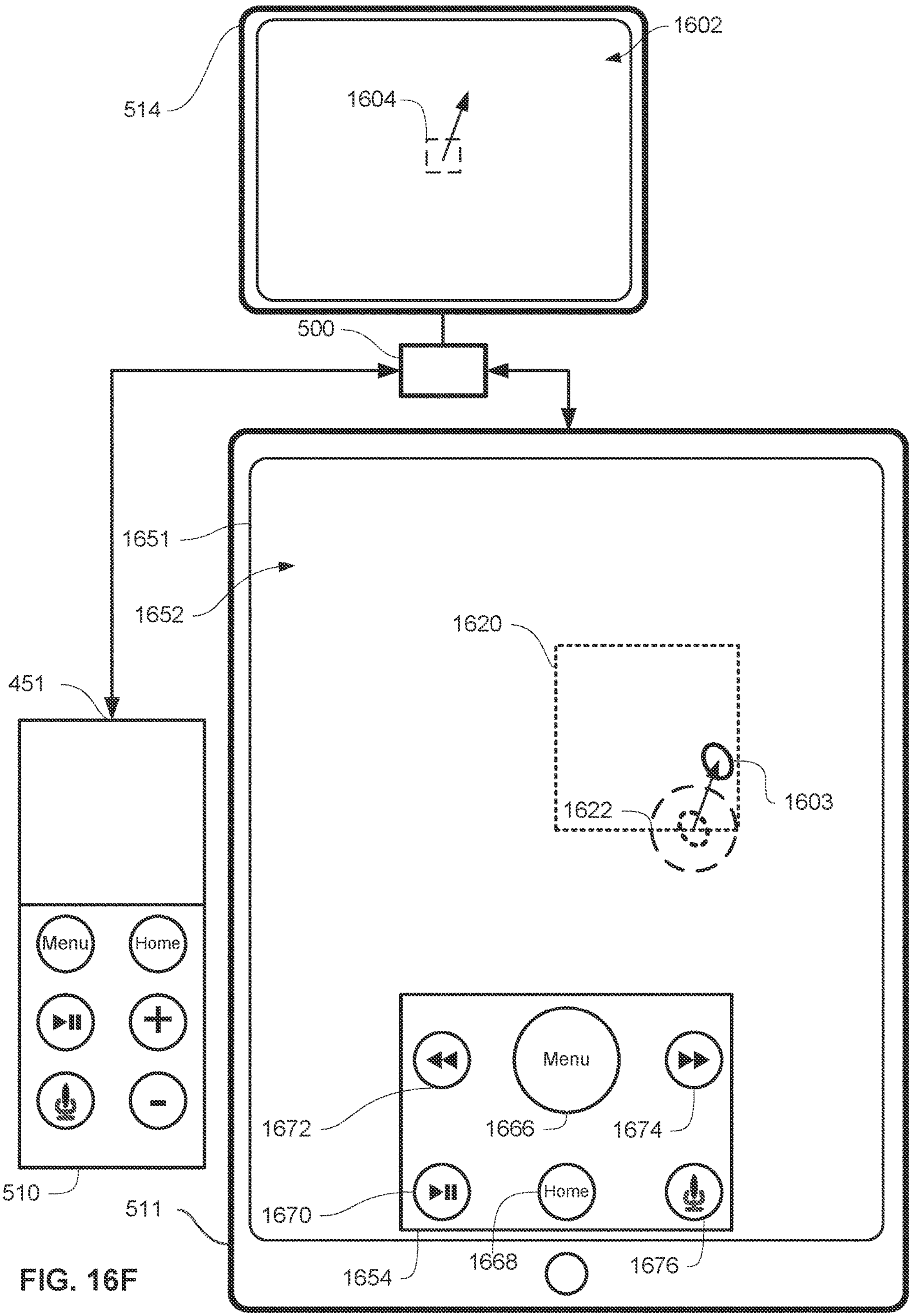
Figure 16G:
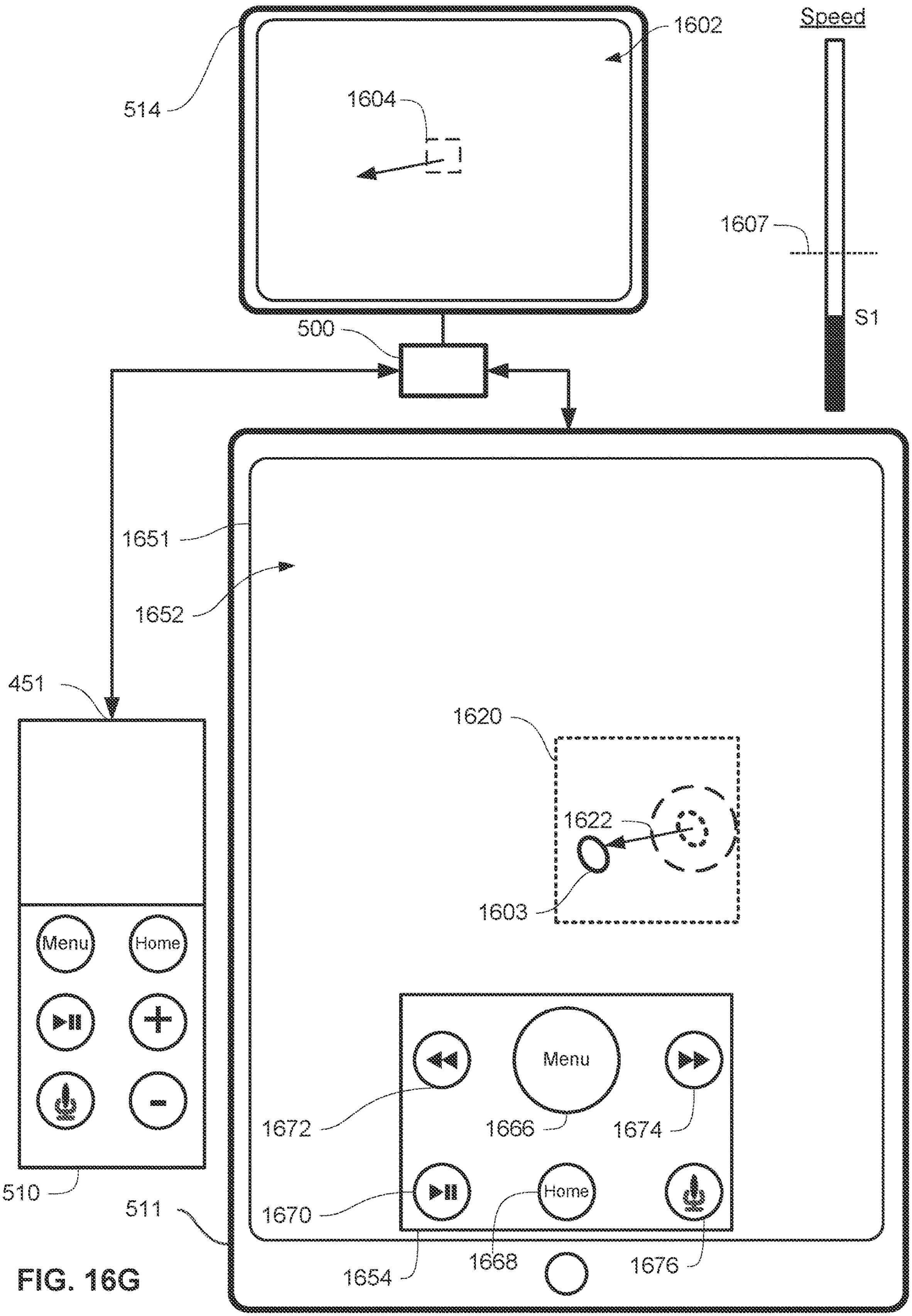
Figure 16H:
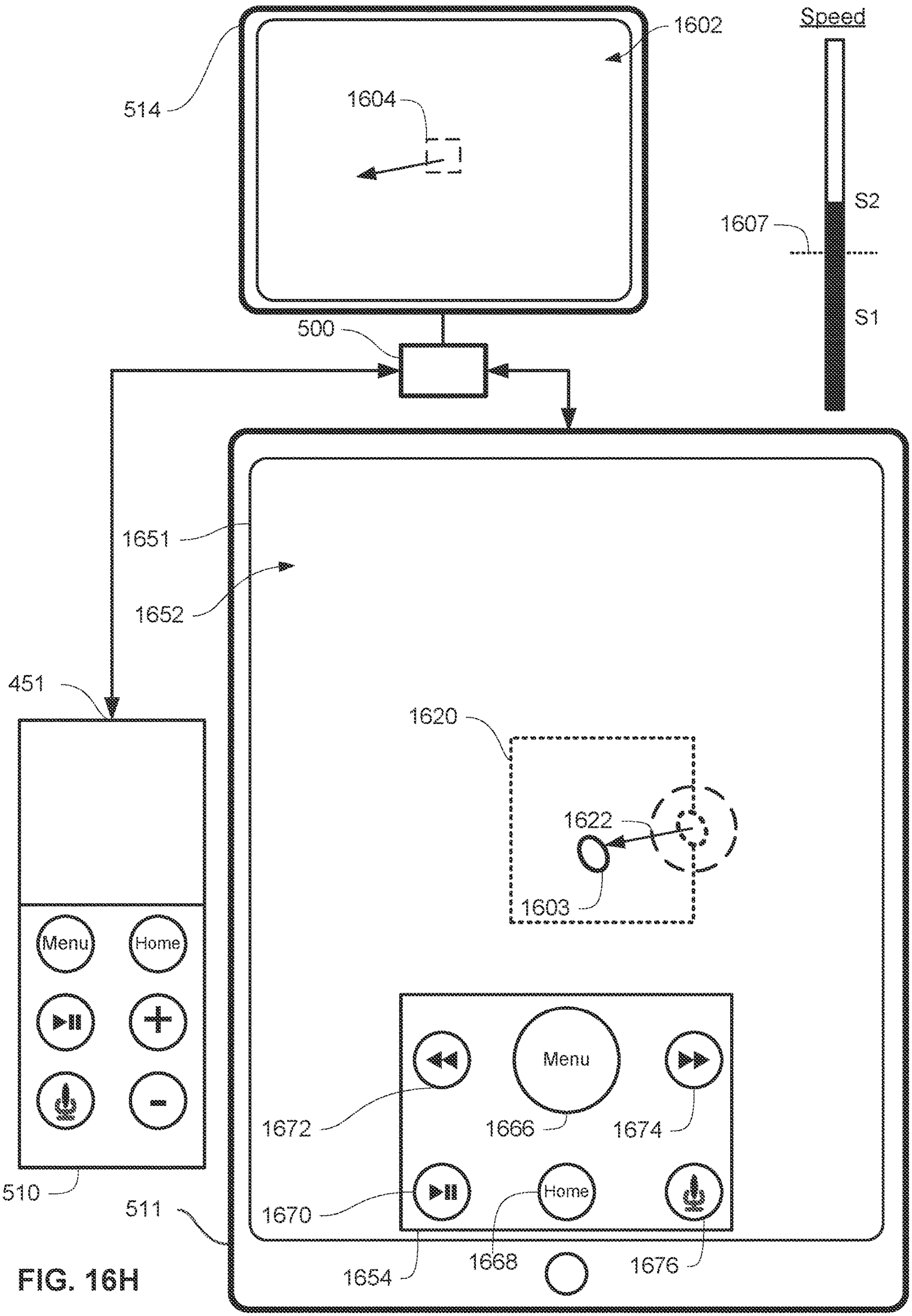
Figure 16I:
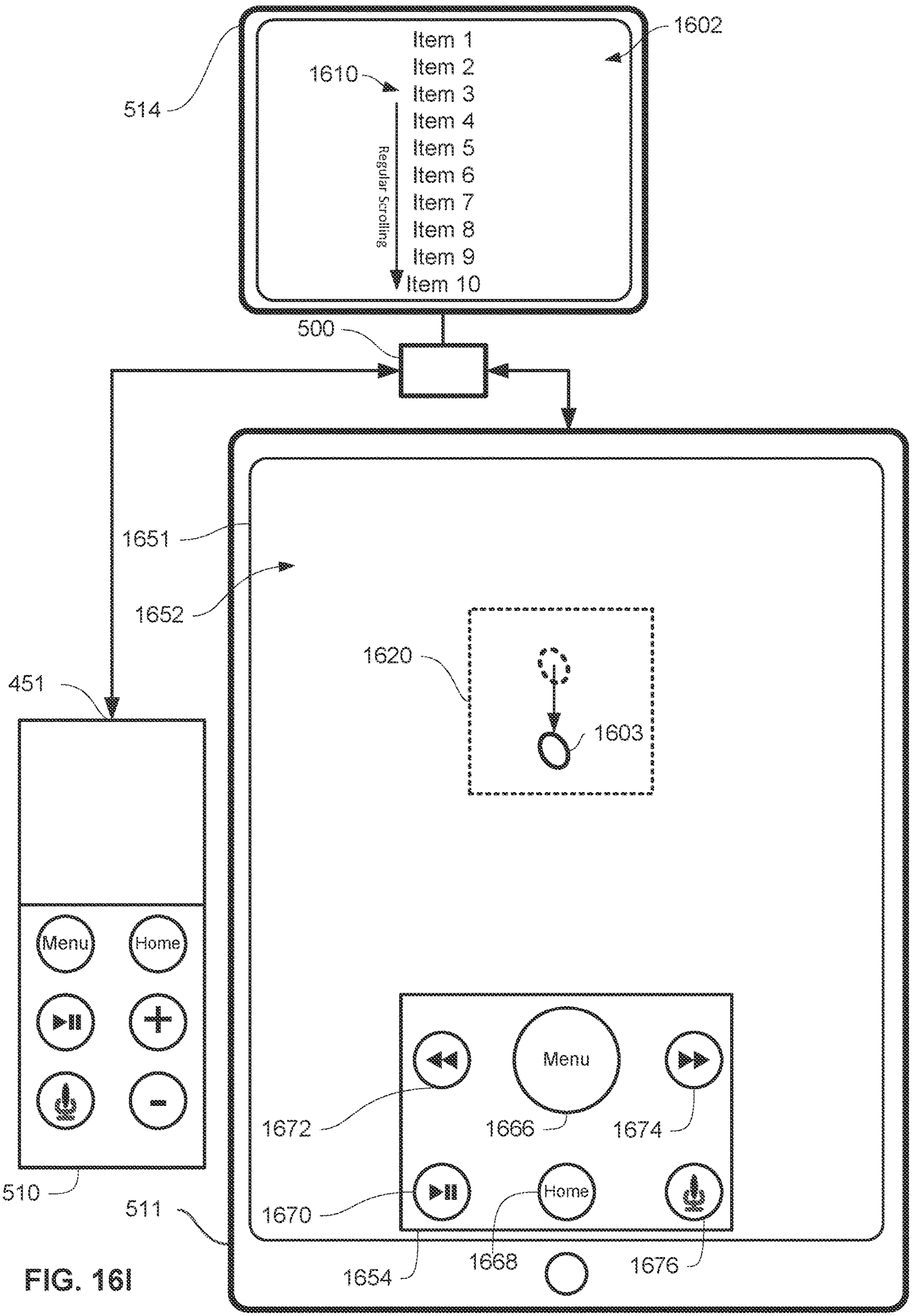
Figure 16J:
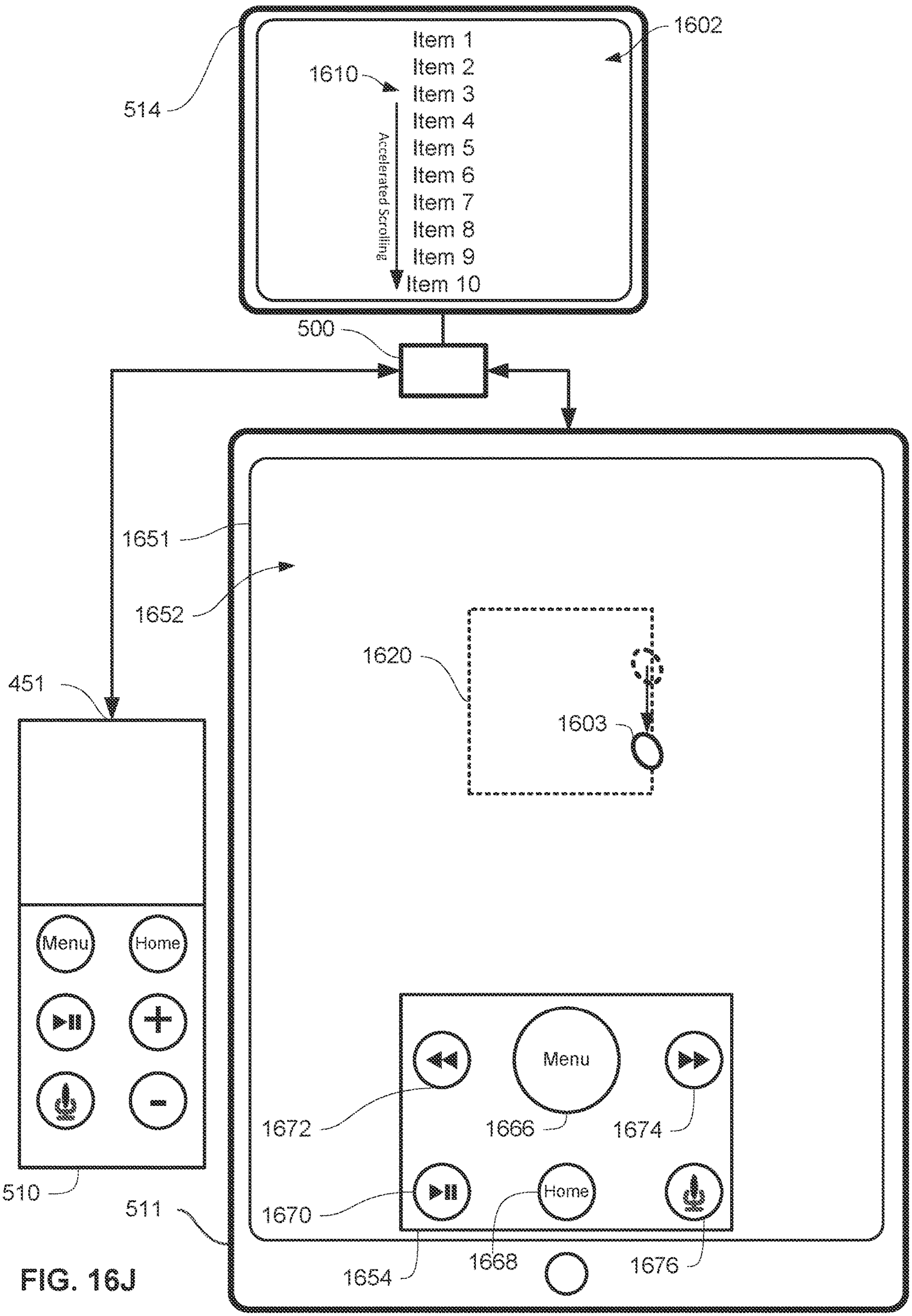
Figure 16K:
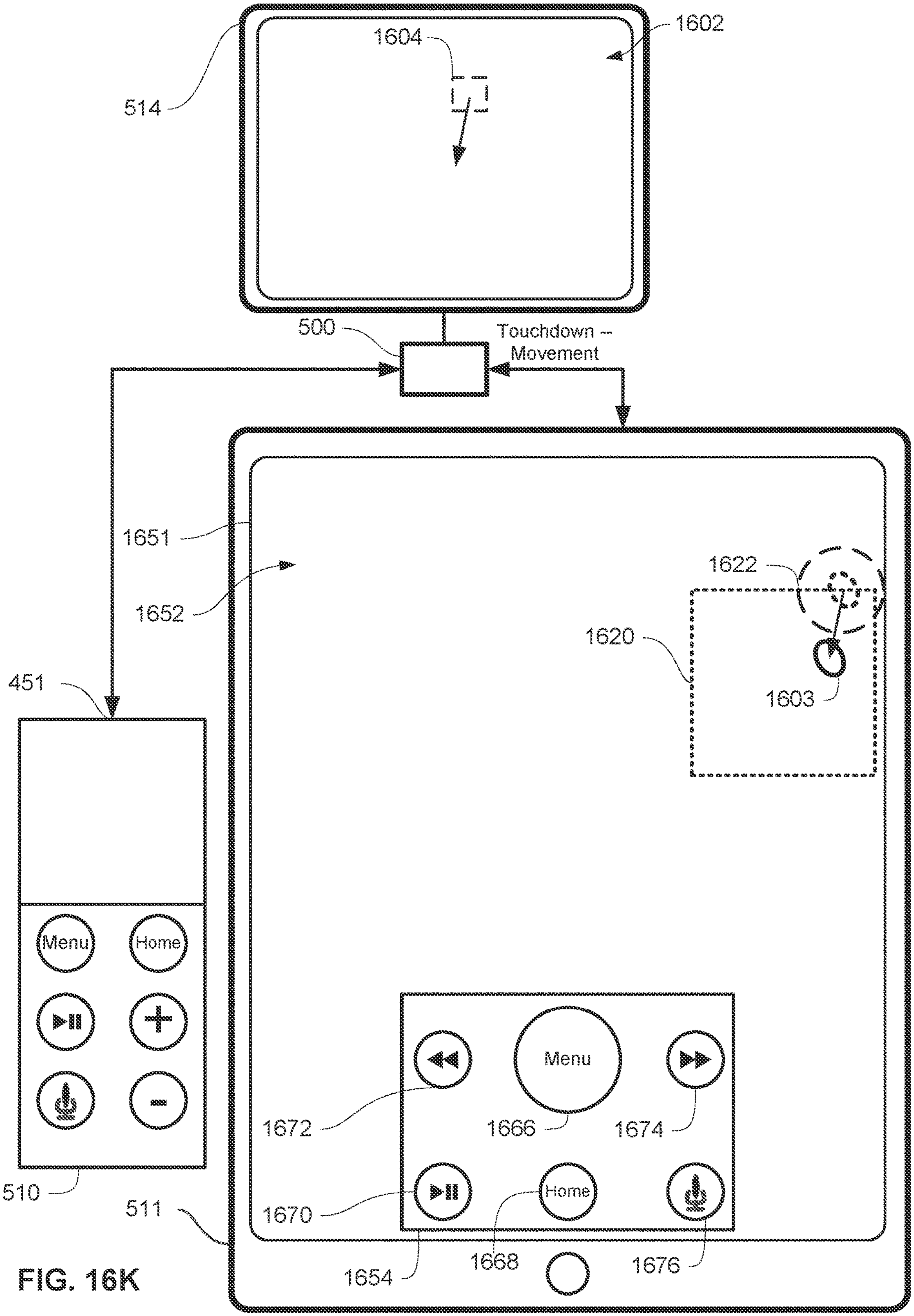
Figure 16L:
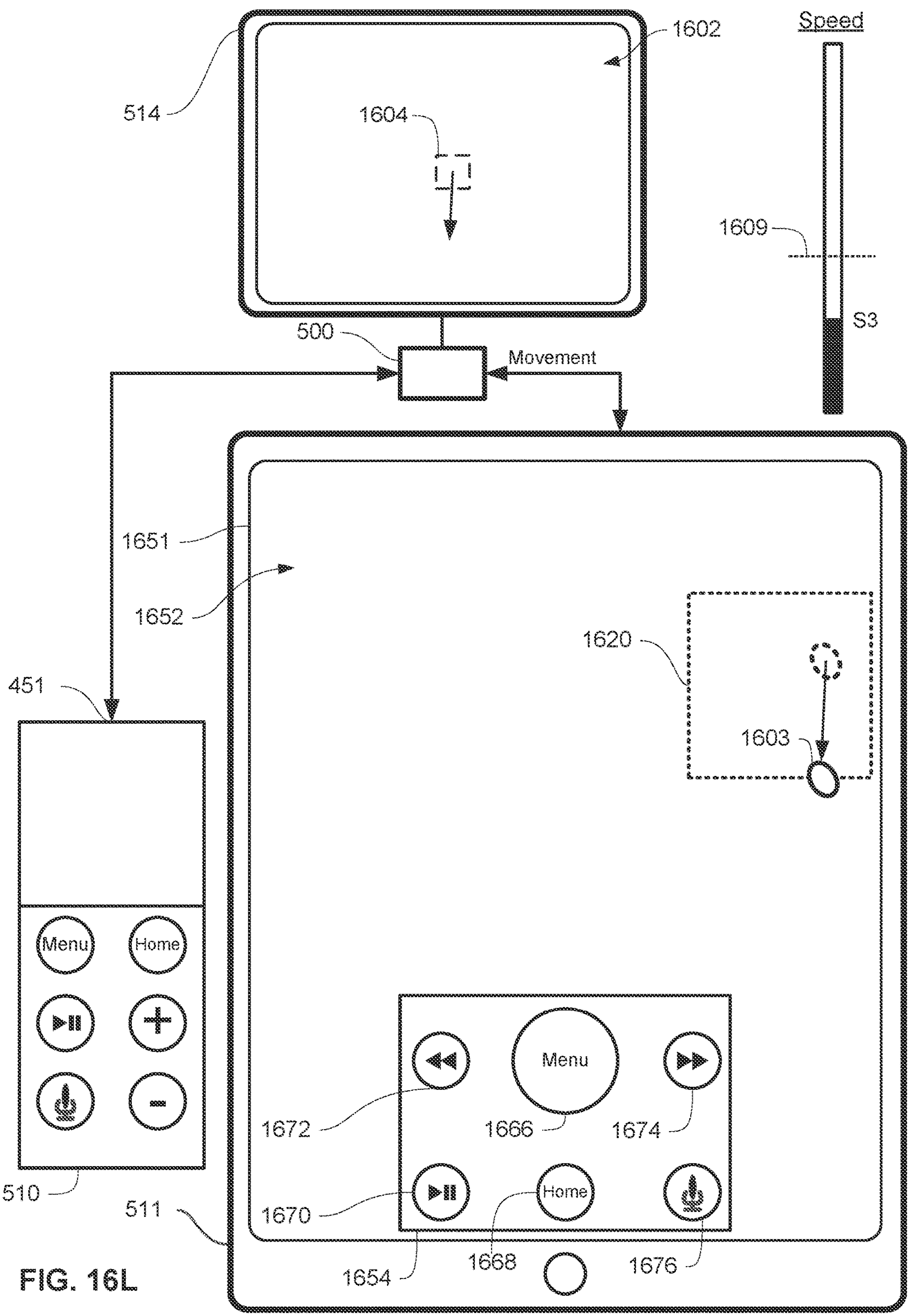
Figure 16M:
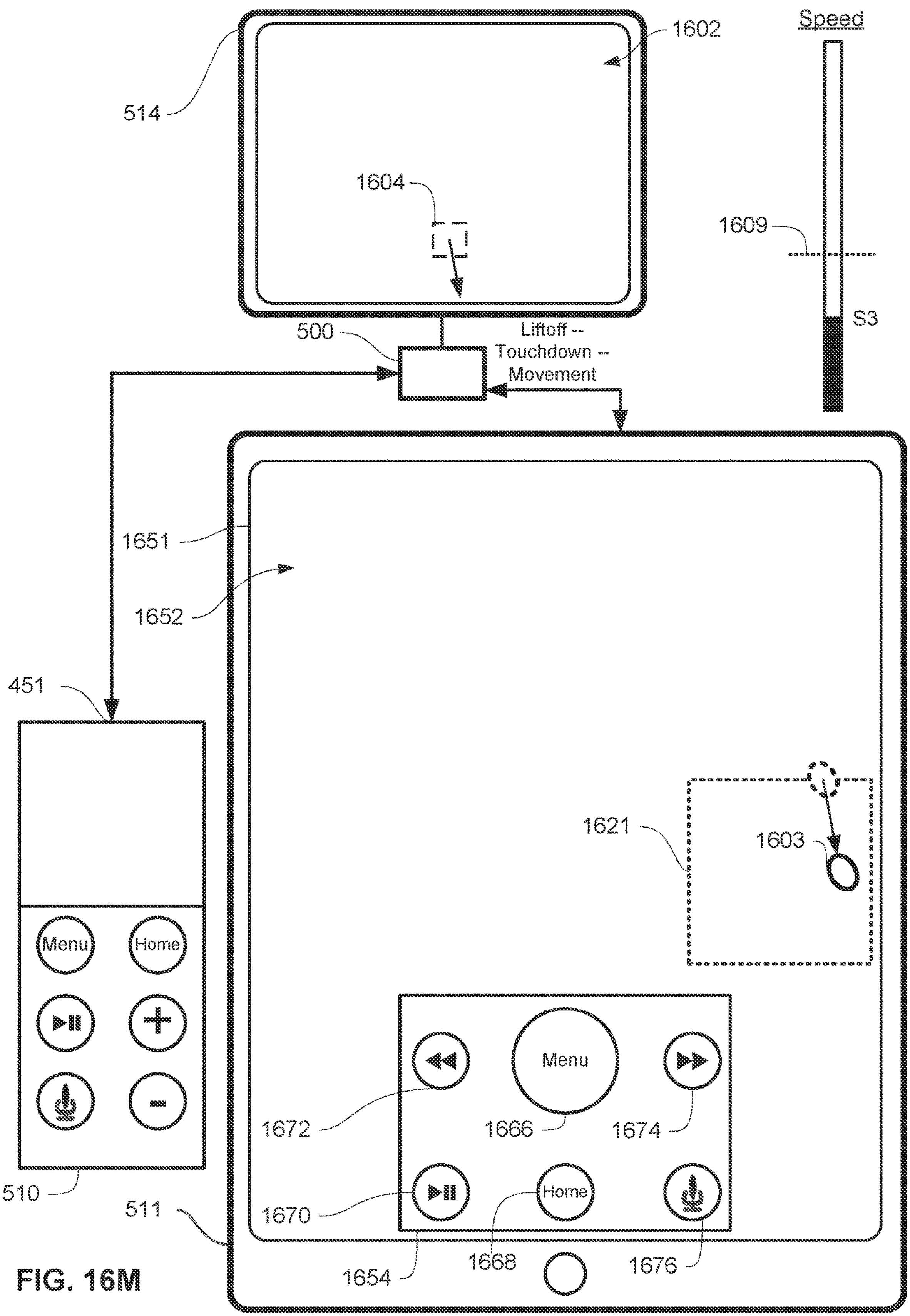
Figure 16N:
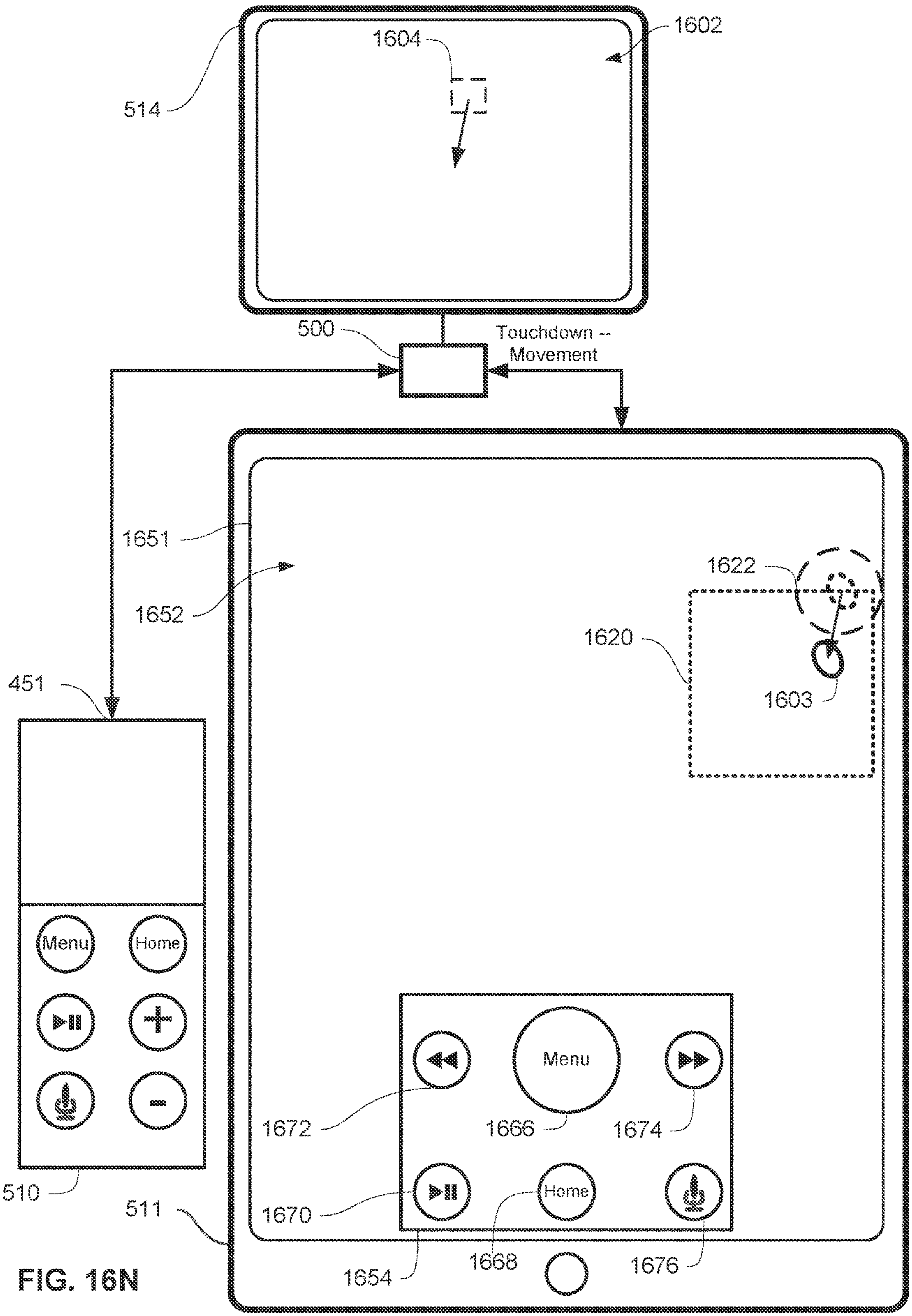
Figure 16O:
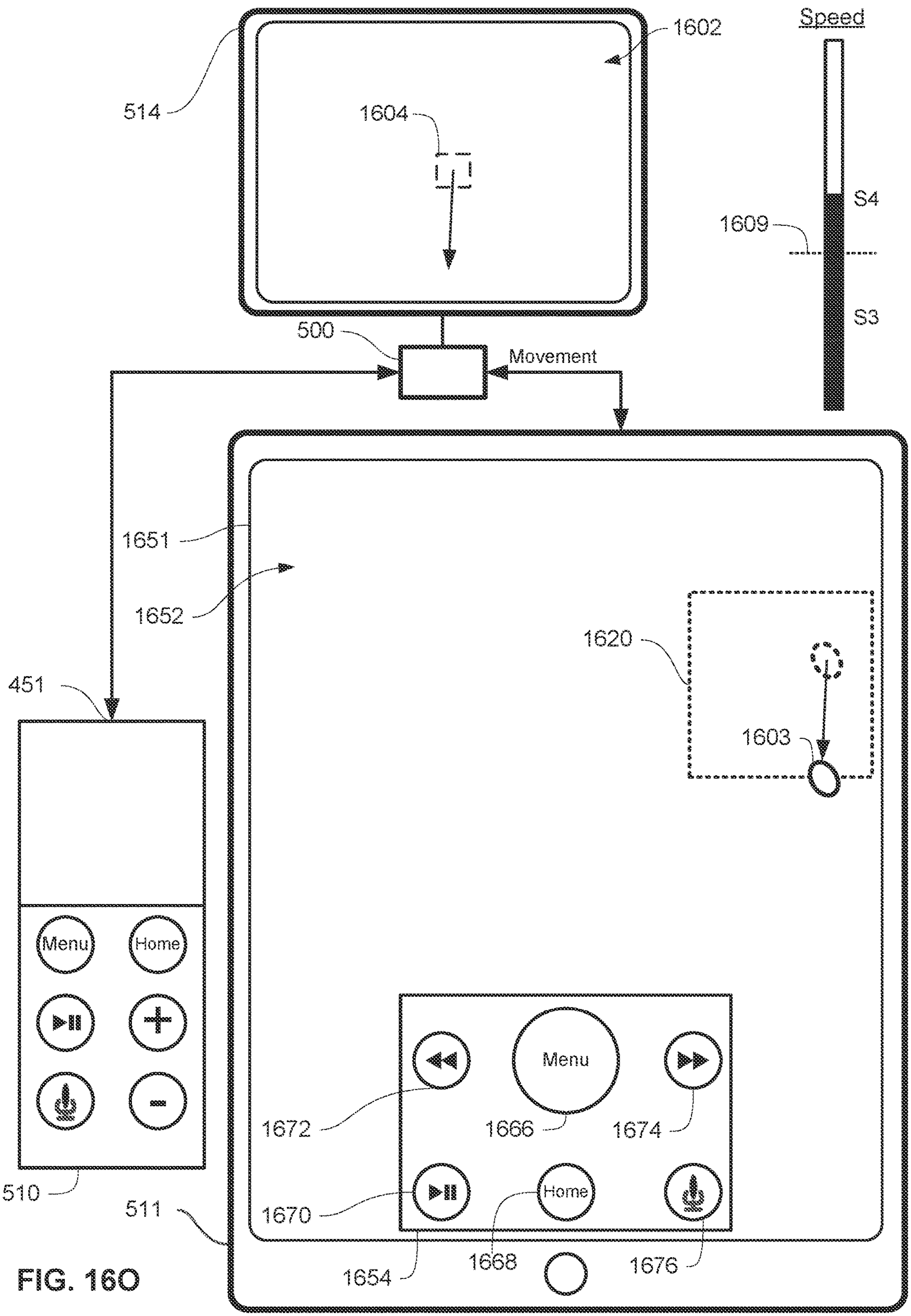
Figure 16P:
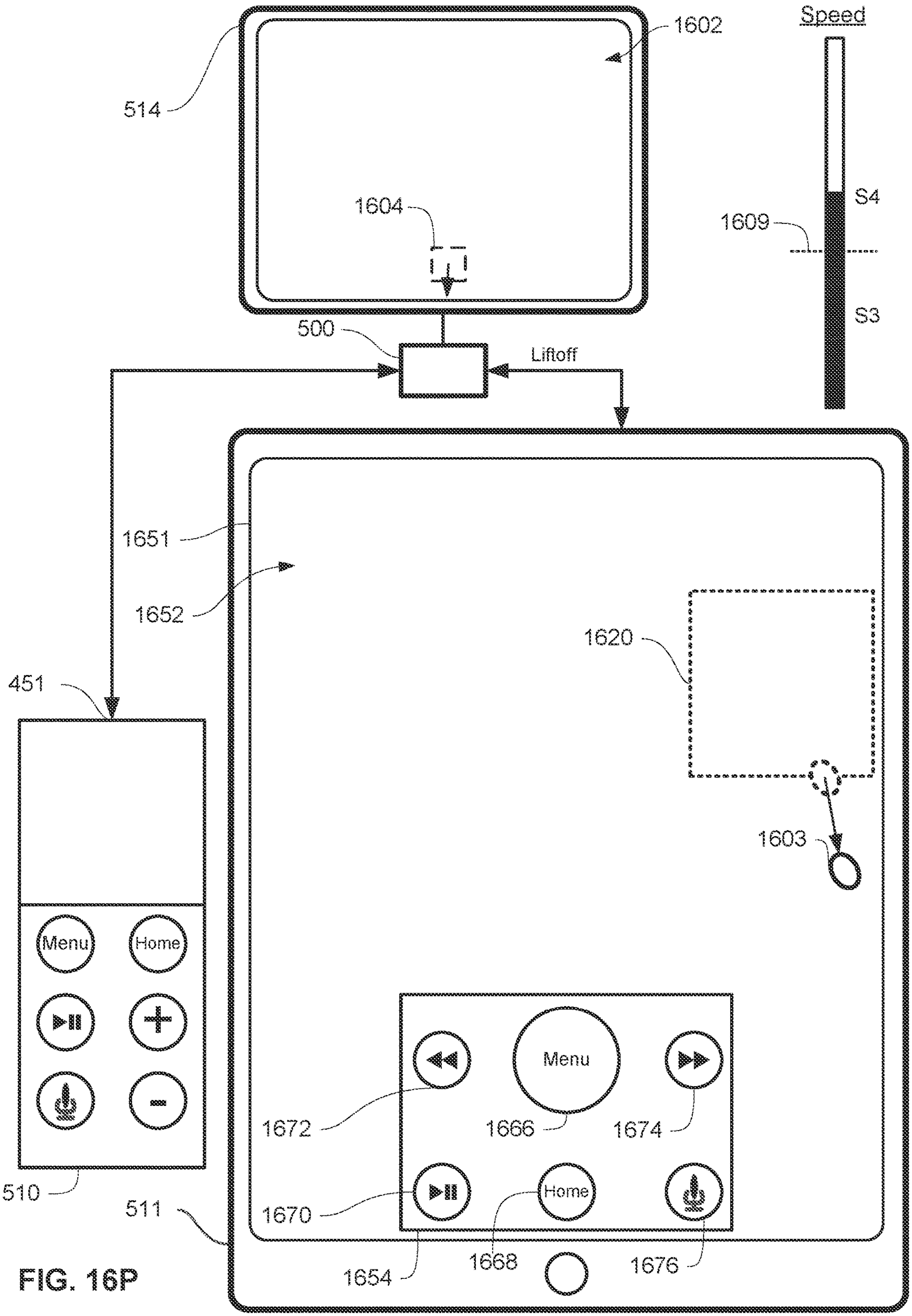
Figure 16Q:
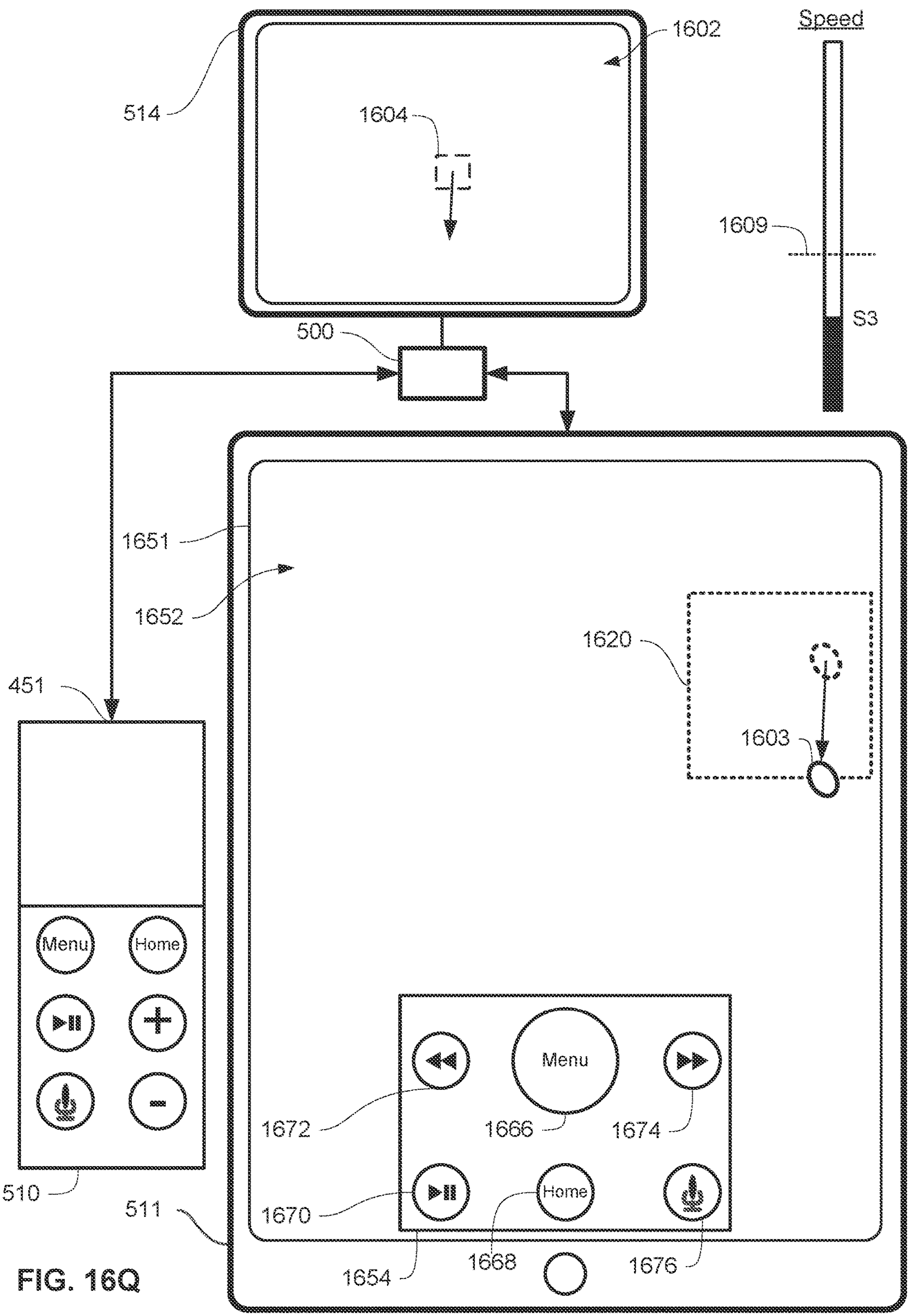
Figure 16R:
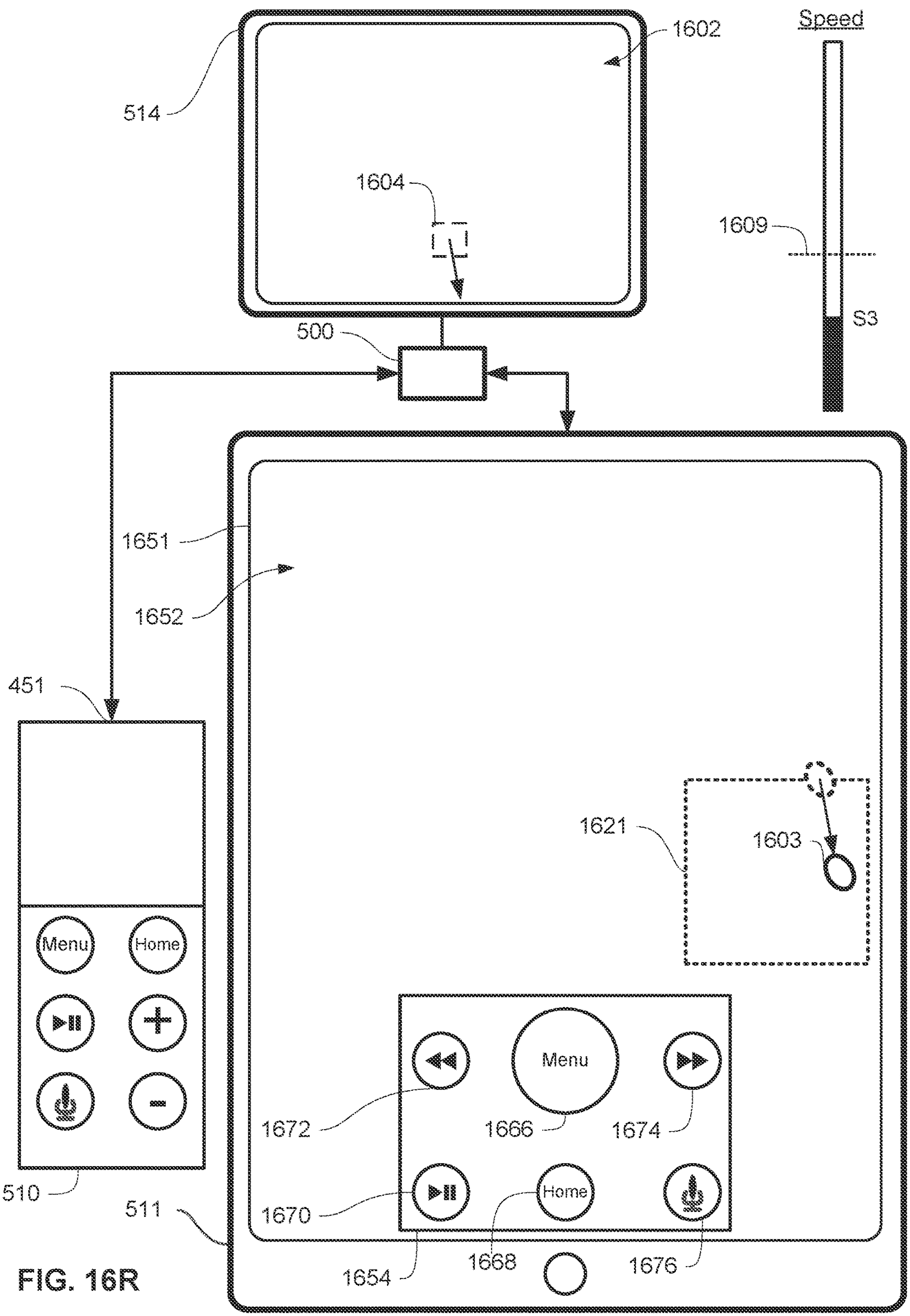
Figure 16S:
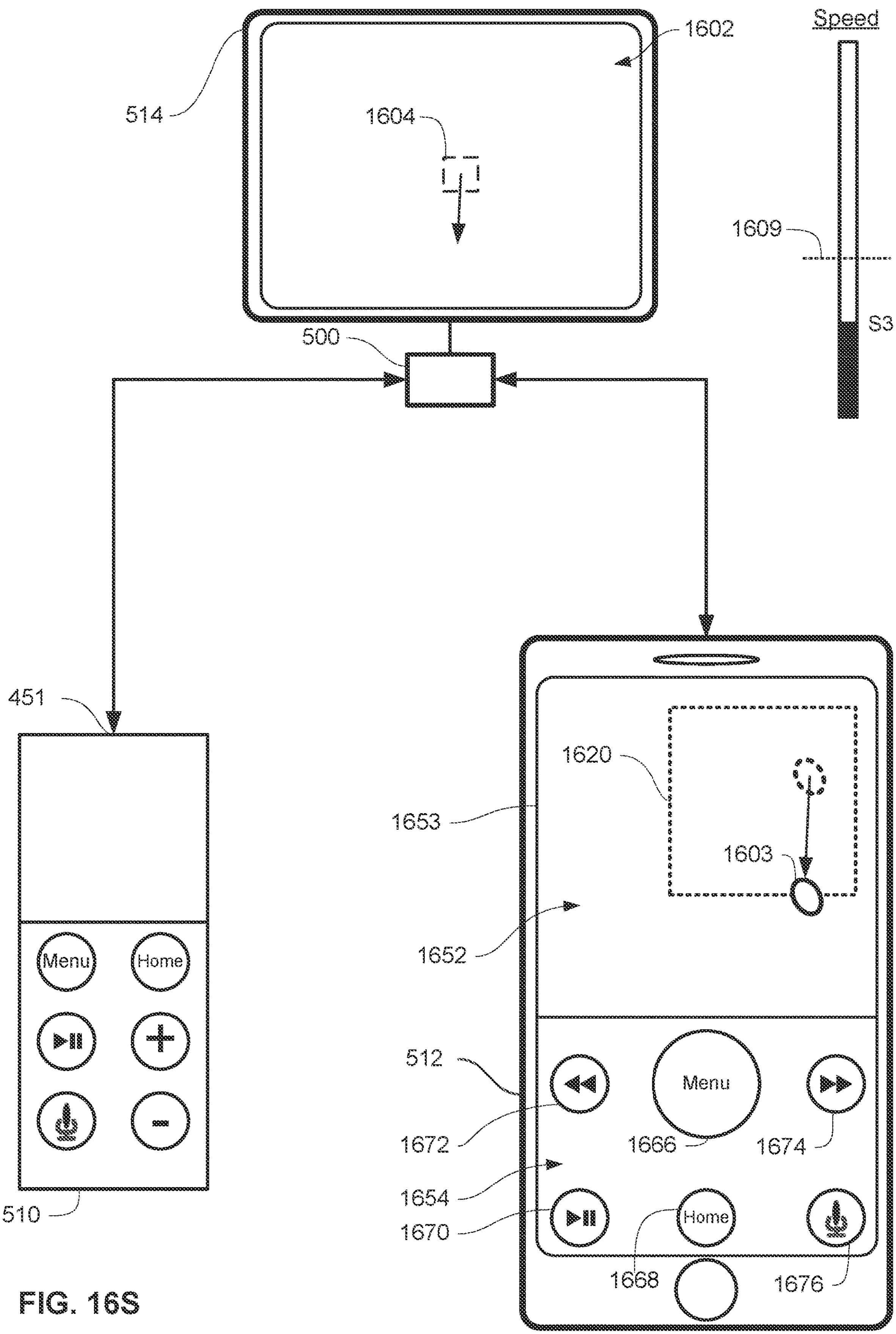
Figure 16T:
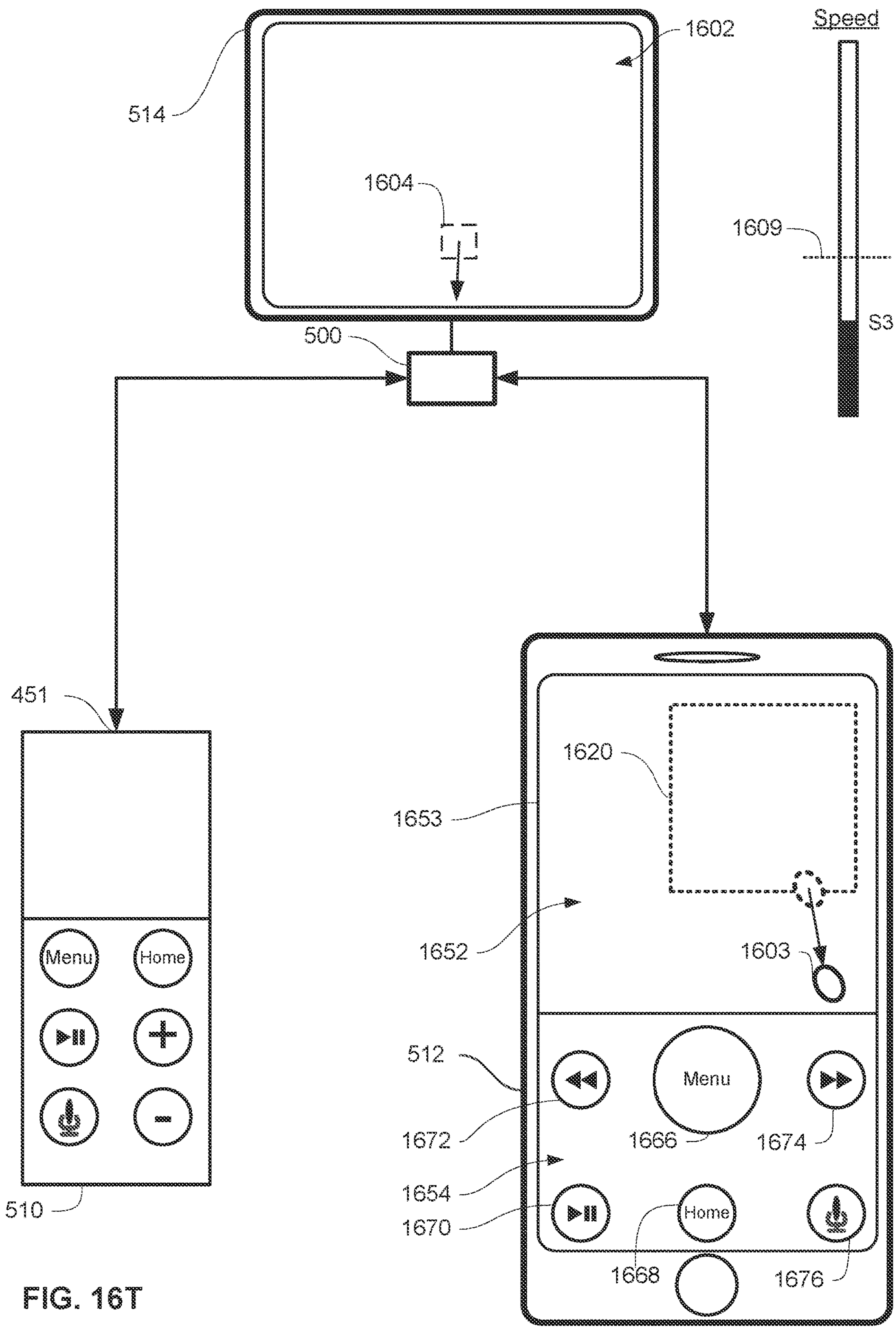
Figure 17B:
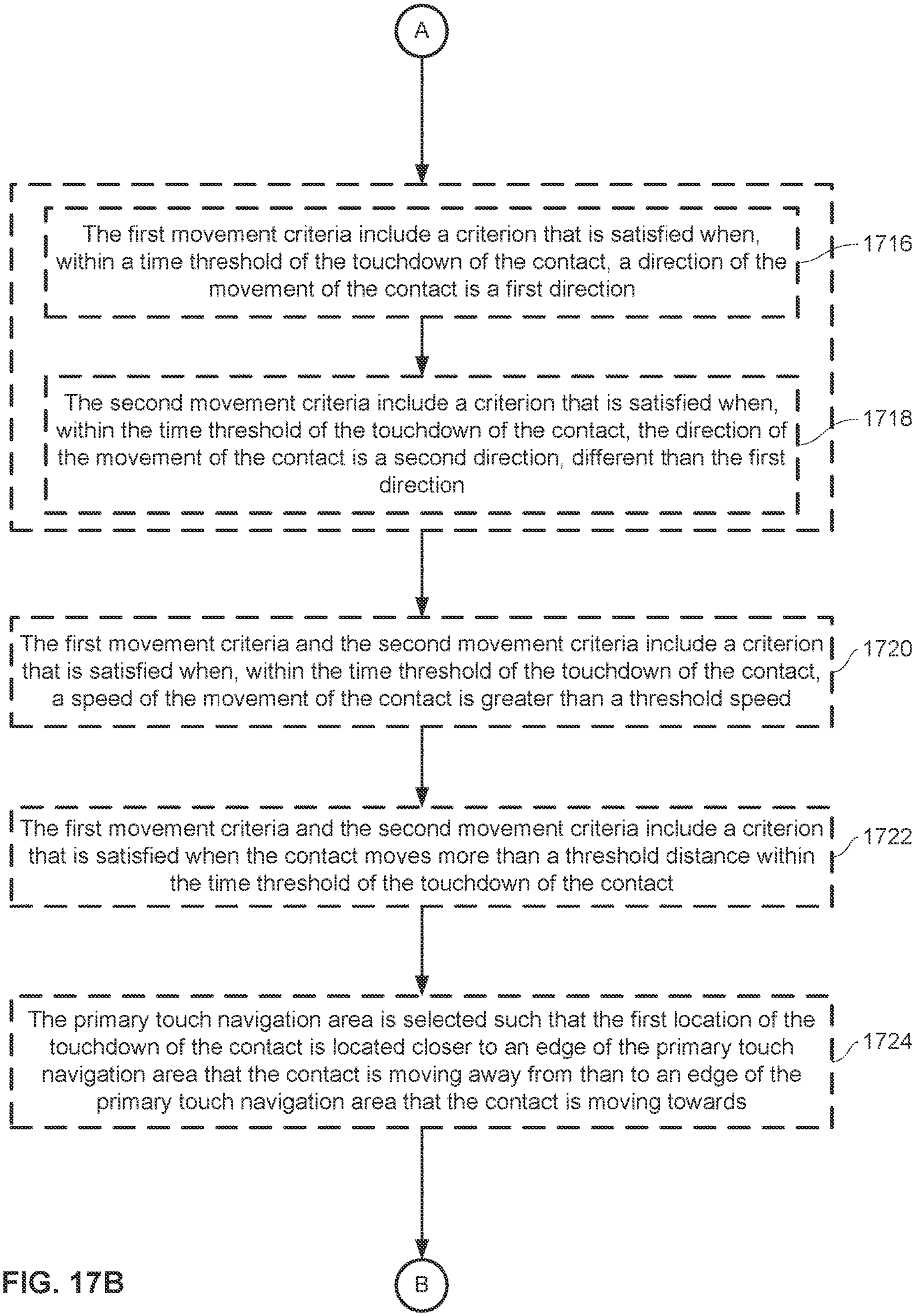
Figure 17D:
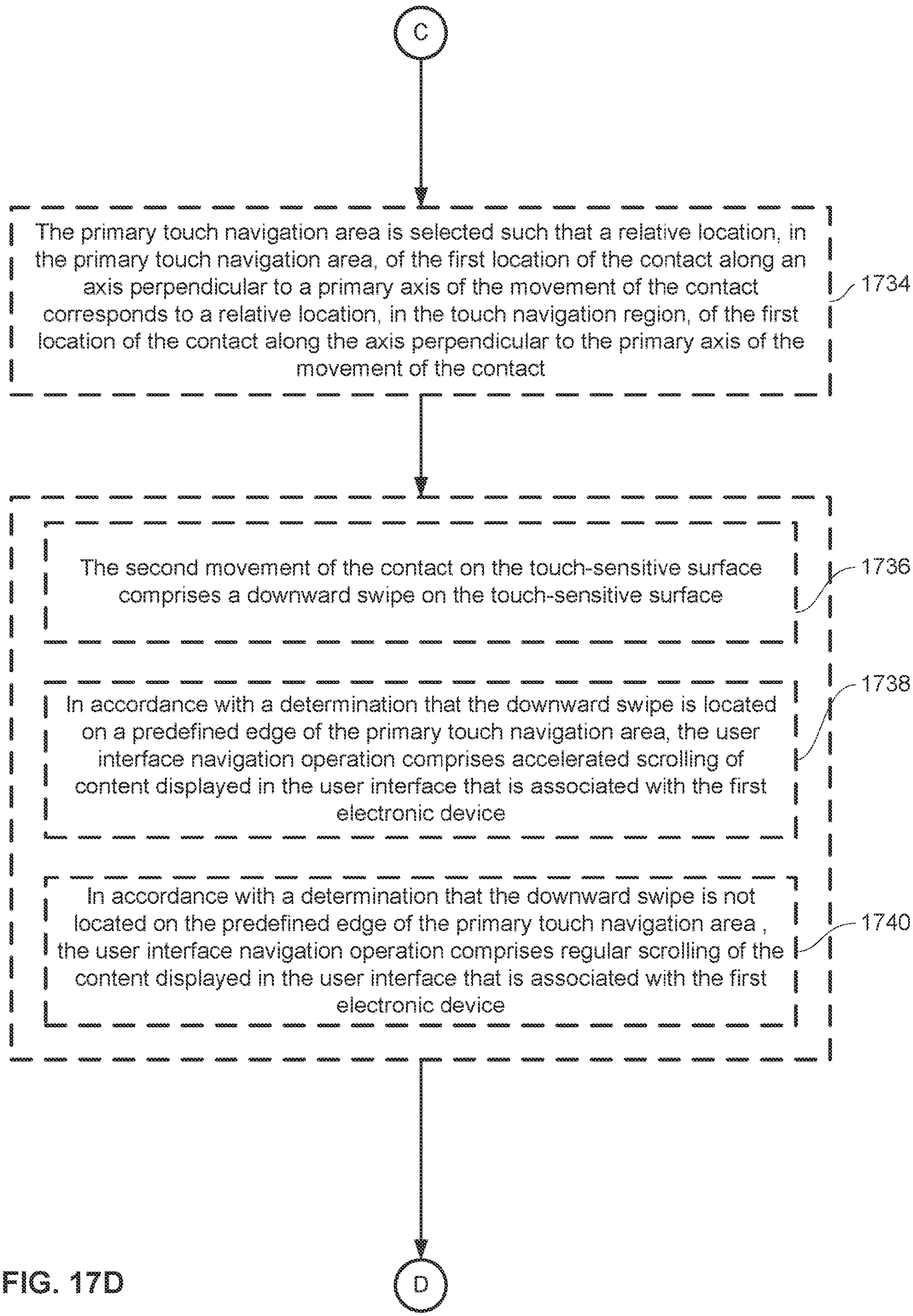
Figure 17E:
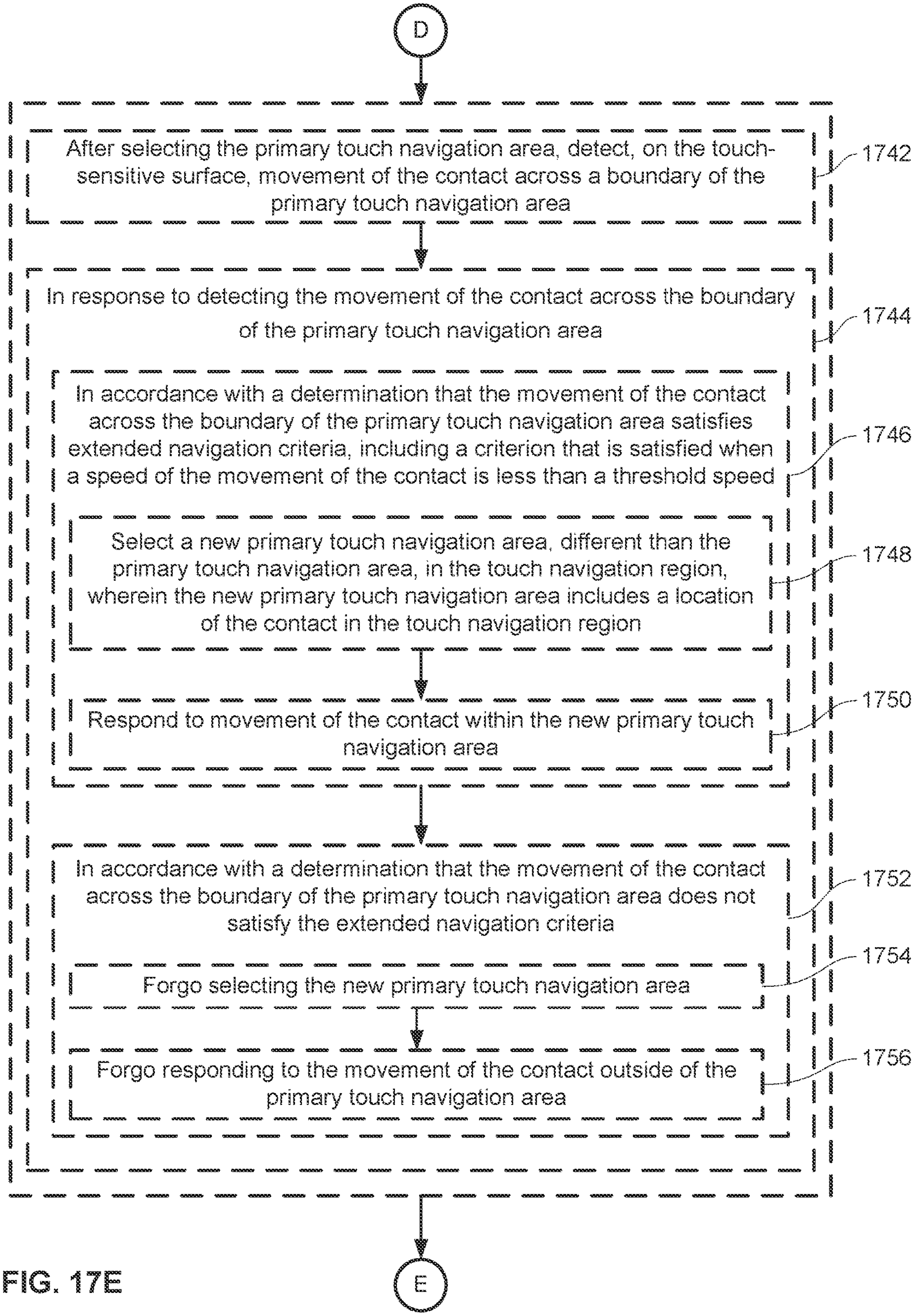
Figure 17F:
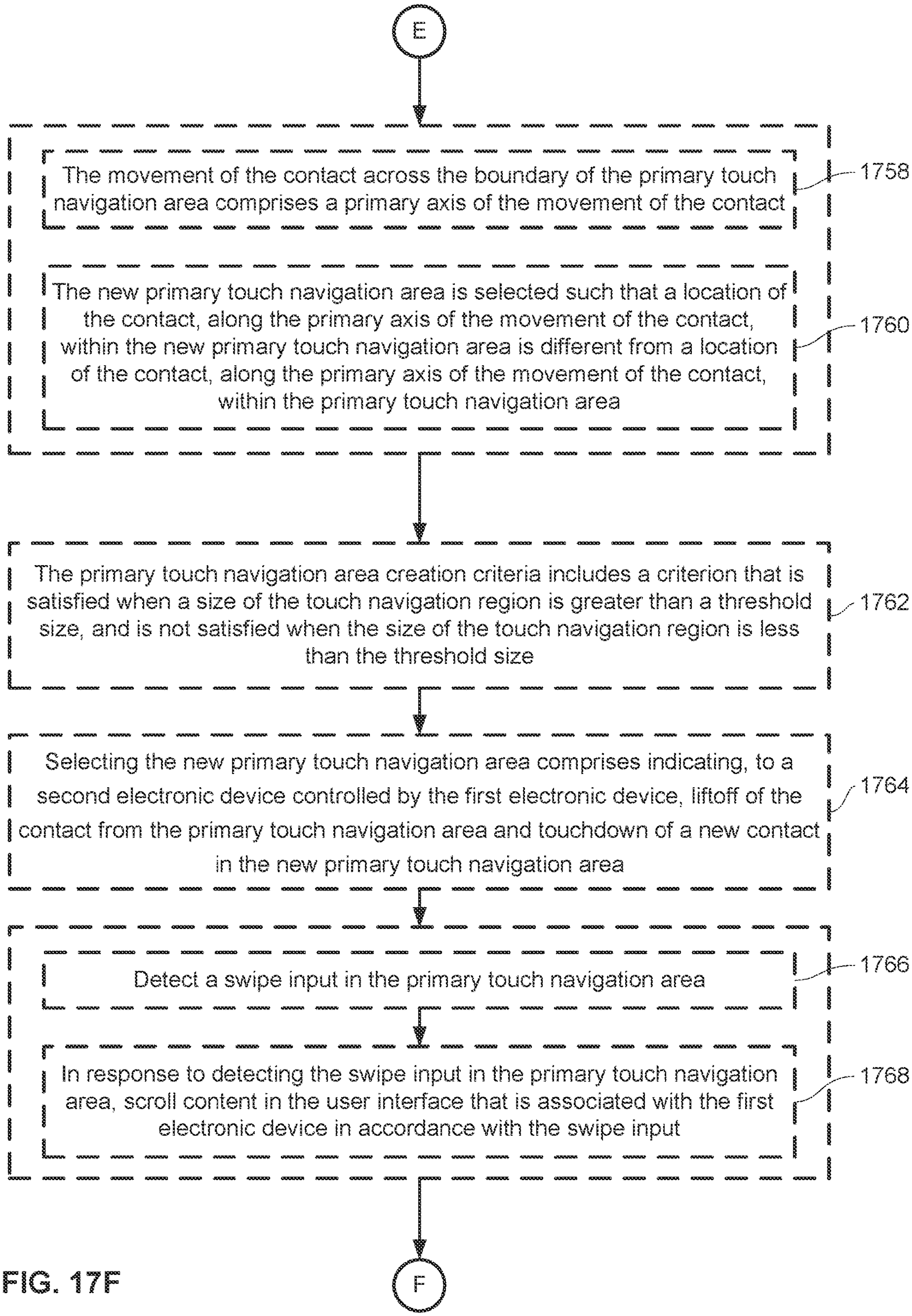
Figure 17G:
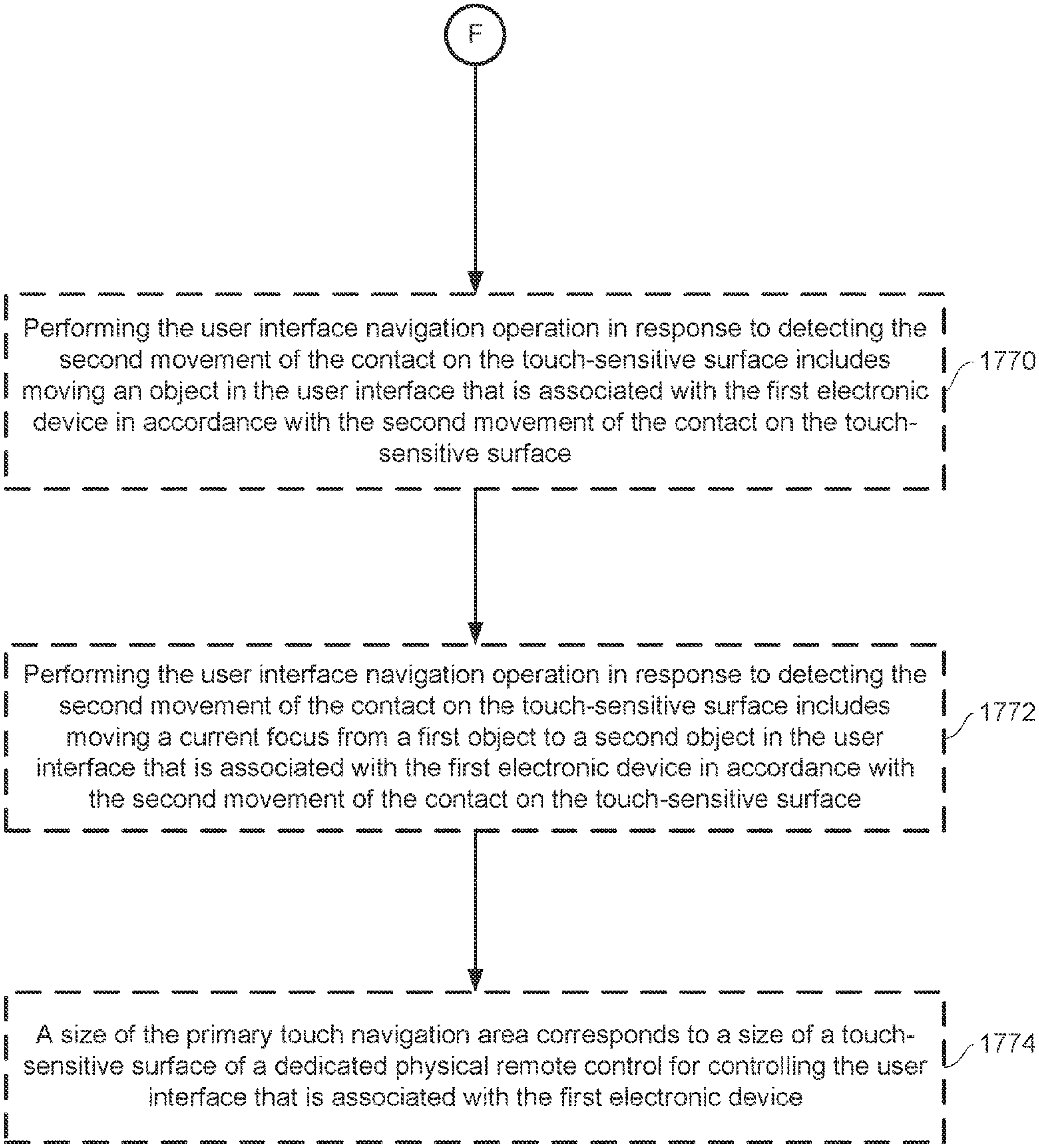

FIGS. 16A-16T illustrate exemplary ways in which a multifunction device selects a primary touch navigation area on its touch-sensitive surface based on movement of a contact when it is first detected by the multifunction device (e.g., when the contact touches down on the touch-sensitive surface) in accordance with some embodiments of the disclosure. The embodiments in these figures are used to illustrate the processes described below, including the processes described with reference to FIGS. 17A-17G.

FIG. 16A illustrates exemplary display 514. Display 514 optionally displays one or more user interfaces that include various content. In the example illustrated in FIG. 16A, display 514 displays user interface 1602 including cursor 1604, which corresponds to a current selection location of the user interface 1602 (e.g., receiving a selection input from an input device, such as a dedicated remote control, optionally selects an item in user interface 1602 over which cursor 1604 is positioned). User interface 1602 is optionally displayed by an application running on an electronic device (e.g., electronic device 500 of FIG. 5A) of which display 514 is a part, or to which display 514 is connected. Though user interface 1602 is illustrated as including cursor 1604, it is understood that cursor 1604 optionally corresponds to and/or represents any object or action that is controllable via a directional or navigational input received from an input device. For example, cursor 1604 moving to the left in user interface 1602 in response to a leftward directional input received from an input device optionally additionally or alternatively represents a list in user interface 1602 scrolling to the left, a character in a game moving to the left, scrubbing backwards (e.g., "to the left") through content playing on the electronic device, etc.

As described with reference to FIGS. 5A-5B, 14A-14GG and 15A-15H, electronic device 500 is optionally controlled using remote 510 and/or device 511. Specifically, remote 510 and device 511 are optionally in communication with electronic device 500, and provide input to electronic device 500. Remote 510 optionally has features described with reference to FIG. 5B for providing input to electronic device 500. For example, selection of one or more of the buttons of remote 510 optionally causes remote 510 to transmit corresponding commands to electronic device 500, to which electronic device 500 responds accordingly. Touch-sensitive surface 451 of remote 510 is optionally for providing tap, click, selection, navigational and/or movement inputs to electronic device 500, to which electronic device 500 responds accordingly. For example, touch inputs (e.g., a swipe) detected on touch-sensitive surface 451 optionally control the location of cursor 1604 in user interface 1602.

Device 511 is optionally a multifunction device. In some embodiments, device 511 is a tablet computer or a mobile telephone configured to run applications and perform multiple functions, such as messaging functions, internet browsing functions, content (e.g., movies, television shows, etc.) viewing functions, etc., that are independent of controlling electronic device 500. In some embodiments, device 511 runs a remote control application that configures device 511 to operate as a remote control for electronic device 500, or device 511 is configured as part of its operating system to operate as a remote control for electronic device 500. In FIG. 16A, device 511 includes touch screen 1651 that displays touch navigation region 1652 and control panel region 1654 (e.g., as part of the user interface of a remote control application running on device 511). Touch navigation region 1652 is optionally visible (e.g., visually differentiated from other UI elements on the display—e.g., control panel 1654—such as by being displayed with a visible border or in a different color or shading than surrounding UI elements) or not visible on touch screen 1651. Touch navigation region 1652 is optionally an area of touch screen 1651 for providing tap, click, selection, navigational and/or movement inputs to electronic device 500, to which electronic device 500 responds accordingly, as described with reference to FIGS. 14A-14GG and 15A-15H. For example, touch inputs (e.g., a swipe) detected in touch navigation region 1652 optionally control the location of cursor 1604 in user interface 1602. In some embodiments, device 511 ignores and/or does not transmit touch inputs detected outside of touch navigation region 1652 to electronic device 500. In some embodiments, touch navigation region 1652 is a touch input region where the device accepts free-form touch inputs such as swipes, flicks, and taps and sends information about those touch inputs to device 500 that controls the user interface displayed on display 514, and touch inputs detected outside of touch navigation region 1652 (e.g., in control panel region 1654) are processed based on what user interface element they are detected on or near (e.g., a tap input on a button displayed outside of touch navigation region 1652, such as selection of one or more of buttons 1666, 1668, 1670, 1672, 1674 and 1676 within control panel 1654, will be processed as an activation of that button, such as described with reference to FIGS. 14A-14GG and 15A-15H).

Because device 511 is able to operate as a remote control for electronic device 500, a user may wish to provide touch inputs to electronic device 500 via device 511, in addition or alternatively to via remote 510. However, touch screen 1651 and/or touch navigation region 1652 of device 511 are optionally sized differently than touch-sensitive surface 451 of remote 510 (e.g., smaller or larger). In the example of FIG. 16A, touch screen 1651 and touch navigation region 1652 are significantly larger than touch-sensitive surface 451 (e.g., 10, 20 or 40 times larger). Therefore, a user is optionally presented with a different experience when providing touch inputs to electronic device 500 via remote 510 than when providing touch inputs to electronic device 500 via device 511. Accordingly, in some embodiments, device 511 defines a primary touch navigation area in touch navigation region 1652 that shares one or more characteristics with touch-sensitive surface 451 of remote 510 when a user provides touch input in touch navigation region 1652 of device 511, as described with reference to FIGS. 14A-14GG and 15A-15H. Further, in some of the embodiments described with reference to FIGS. 16A-16T, the primary touch navigation area selected by device 511 differs based on the movement of the touch input when it is first detected by device 511 (e.g., when touchdown of a contact that makes up the touch input is detected). Specific examples of the above will now be described.

For example, in FIG. 16B, device 511 detects touchdown of contact 1603 (e.g., a user's finger or stylus first coming into contact with touch screen 1651) in touch navigation region 1652. In FIG. 16B, contact 1603 has been detected in the center of touch navigation region 1652. In some embodiments, device 511 transmits a "touchdown" command to electronic device 500 that is the same as a corresponding "touchdown" command that remote 510 transmits to electronic device 500 in response to detecting touchdown of a contact on touch-sensitive surface 451. As such, device 511 optionally appears no differently to electronic device 500 than does remote 510, and electronic device 500 need not be specially configured/programmed to respond to touch inputs provided by device 511.

In some embodiments, upon touchdown of contact 1603, device 511 determines whether the movement of contact 1603 satisfies various criteria (e.g., contact 1603 is not moving, contact 1603 is moving slowly, contact 1603 is moving in a specific direction, etc.), additional details of which will be described later. In FIG. 16B, contact 1603 is not moving when it touches down in touch navigation region 1652 (e.g., contact 1603 has touched down, and has not moved more than threshold distance 1622 within a time threshold, such as 0.1, 0.2 or 0.4 seconds, of touching down). As a result, device 511 selects primary touch navigation area 1620 in touch navigation region 1652 such that primary touch navigation area 1620 includes the location at which contact 1603 was detected. In circumstances such as these where contact 1603 does not move more than threshold distance 1622 within the above-described time threshold of touching down, device 511 optionally selects the location of primary touch navigation area 1620 in the manner that device 511 in FIGS. 14A-14GG selects the location of primary touch navigation area 1420. Threshold distance 1662 is optionally 2%, 5%, 10%, etc. of the width and/or height of primary touch navigation area 1620. In circumstances such as those illustrated in FIG. 16B where contact 1603 is not moving when it touches down (or moving less than threshold distance 1622 within the time threshold of touching down), device 511 optionally selects primary touch navigation area 1620 such that the relative location of contact 1603 within primary touch navigation area 1620 corresponds to the relative location of contact 1603 within touch navigation region 1652. For example, in FIG. 16B, contact 1603 was detected in the center (e.g., in both the horizontal and vertical dimensions) of touch navigation region 1652. As a result, device 511 selects primary touch navigation region 1620 such that the location at which contact 1603 touched down is in the center (e.g., in both the horizontal and vertical dimensions) of primary touch navigation area 1620. Similarly, in FIG. 16C, non-moving (or substantially non-moving, as discussed above) contact 1603 is detected in the vertical center of touch navigation region 1652, but offset from the horizontal center of touch navigation region 1652 to the right by 25%. As a result, device 511 selects primary touch navigation area 1620 such that the location at which contact 1603 touched down is in the center of primary touch navigation area 1620 in the vertical dimension, but offset from the horizontal center of primary touch navigation area 1620 to the right by 25%. Similar proportional selection of primary touch navigation area 1620 with respect to the touchdown location of contact 1603 was also described with reference to FIGS. 14A-14GG and 15A-15H, some or all of the details of which optionally apply to the selection of primary touch navigation area 1620 in FIGS. 16B and 16C, as well.

As described with reference to FIGS. 14A-14GG, primary touch navigation area 1620 is optionally visible or not visible on touch screen 1651, and is a subset of touch navigation region 1652. In some embodiments, the primary touch navigation area 1620 is an area in the touch navigation region 1652 in which touch inputs cause a first kind of response at electronic device 500, such as scrolling at a first speed in response to a swipe input, while touch inputs detected outside of the primary touch navigation area 1620 cause a second kind of response at electronic device 500, such as no response at all (e.g., touch inputs are not recognized outside of the primary touch navigation area) or scrolling at a second speed in response to a swipe input. Additional or alternative details of primary touch navigation area 1620 were described with reference to primary touch navigation area 1420 in FIGS. 14A-14GG and 15A-15H, some or all of the details of which optionally apply to the primary touch navigation area 1620 in FIGS. 16A-16T, as well.

Proportional selection of primary touch navigation area 1620 in touch navigation region 1652 is, in some circumstances, problematic when contact 1603 is moving when it touches down (or starts moving laterally shortly after touching down) in touch navigation region 1652 toward a boundary of the primary touch navigation are that is near the touch down location of the contact. For example, in FIG. 16C, if contact 1603 was moving to the right when it touched down in touch navigation region 1652, contact 1603 would be able to move only a small distance (e.g., about 25% of the width of primary touch navigation area 1620) before reaching the right boundary of primary touch navigation area 1620, because primary touch navigation area 1620 in FIG. 16C was selected such that the touchdown location of contact 1630 is 25% to the right of the center of primary touch navigation area 1620 in the horizontal dimension. This placement and other similar placements of primary touch navigation area 1620 in similar circumstances limit the distance contact 1603 is able to move before reaching a boundary of primary touch navigation area 1620. As such, in circumstances where contact 1603 is moving when it touches down in touch navigation region 1652, device 511 optionally accounts for such movement in selecting primary touch navigation area 1620, as will now be described.

For example, in FIG. 16D, contact 1603 is moving to the right (e.g., the primary or major axis of the movement of contact 1603 is to the right) when it touches down in touch navigation region 1652 (e.g., contact 1603 has touched down in touch navigation region 1652, and begins moving to the right after touch down). Further, contact 1603 has moved more than threshold distance 1622 within the previously-described time threshold of its touchdown. The location of the touchdown of contact 1603 in FIG. 16D is the same as the location of the touchdown of contact 1603 in FIG. 16C. However, because contact 1603 was moving when it touched down in touch navigation region 1652 (e.g., contact 1603 has moved more than threshold distance 1622 within the previously-described time threshold of its touchdown), device 511 selects primary touch navigation area 1620 such that the location of the touchdown of contact 1603 is closer to the left boundary of primary touch navigation area 1620 (e.g., the boundary of primary touch navigation area 1620 opposite the primary direction of the movement of contact 1603, which is to the right) than in the primary touch navigation area 1620 in FIG. 16C. Device 511 has maintained, as that described in FIG. 16C, the relative location of the touchdown of contact 1603 within primary touch navigation area 1620 in the vertical dimension (e.g., the axis orthogonal to the primary axis of the movement of contact 1603). As a result of the selection of primary touch navigation area 1620 such that the touchdown location of contact 1603 is closer to the left boundary of primary touch navigation area 1620 than in FIG. 16C, as shown in FIG. 16D, contact 1603 is able to move further in the direction in which it was moving when it touched down in touch navigation region 1652 (e.g., to the right) before reaching the right boundary of primary touch navigation area 1620. As such, the usable area of primary touch navigation area 1620 in the direction of the movement of contact 1603 is increased as compared with FIG. 16C. As described with reference to FIGS. 14A-14GG and 15A-15H, information about movement of contact 1603 within primary touch navigation area 1620 is transmitted by device 511 to device 500, which causes cursor 1604 to move in accordance with the movement of contact 1603, as shown in FIG. 16D.

In some embodiments, device 511 selects primary touch navigation area 1620 such that the touchdown location of contact 1603 is not only closer to the boundary of primary touch navigation area 1620 that is opposite the direction in which contact 1603 is moving, but coincident with or on the boundary of primary touch navigation area 1620 that is opposite the direction in which contact 1603 is moving. For example, in FIG. 16E, contact 1603 is moving to the right when it touches down in touch navigation region 1652, as described with reference to FIG. 16D. However, in FIG. 16E, device 511 has selected primary touch navigation area 1620 such that the touchdown location of contact 1603 is on the left edge of primary touch navigation area 1620. As a result, the usable area of primary touch navigation area 1620 in the direction of the movement of contact 1603 is further increased as compared with FIG. 16D.

FIG. 16F illustrates an example in which contact 1603 is moving up (e.g., the primary or major direction of its movement is up) when it touches down in touch navigation region 1652. The touchdown location of contact 1603 is the same as that in FIGS. 16D-16E. As a result of contact 1603 moving up when it touches down in touch navigation region 1652, device 511 selects primary touch navigation area 1620 such that the touchdown location of contact 1603 is located on the bottom edge of primary touch navigation area 1620 (e.g., as compared with the left edge of primary touch navigation area 1620 as shown in FIG. 16E). The relative location of the touchdown of contact 1603 within primary touch navigation area 1620 in the horizontal dimension (e.g., the axis orthogonal to the primary axis of the movement of contact 1603) is 25% to the right of the center of primary touch navigation area 1620, because contact 1603 touched down 25% to the right of the center of touch navigation region 1652, as in to FIGS. 16C-16E. As a result of device selecting primary touch navigation area 1620 such that the touchdown location of contact 1603 is on the bottom edge of primary touch navigation area 1620, the usable area of primary touch navigation area 1620 in the direction of the movement of contact 1603 (e.g., upwards) is increased. As before, information about the movement of contact 1603 within primary touch navigation area 1620 is transmitted by device 511 to device 500, which causes cursor 1604 to move in accordance with the movement of contact 1603, as shown in FIG. 16F.

In some embodiments, not only must contact 1603 move more than threshold distance 1622 within the above-described time threshold of touching down in touch navigation region 1652 for device 511 to select primary touch navigation area 1620 based on the movement of contact 1603 (e.g., as described with reference to FIGS. 16D-16F), but the speed of the movement of contact 1603 within the time threshold must be greater than a speed threshold (e.g., greater than ¼, ⅓, ½ etc. of the width or height of primary touch navigation area 1620 per second) for device 511 to select primary touch navigation area 1620 based on the movement of contact 1603 (e.g., as described with reference to FIGS. 16D-16F). If the speed of contact 1603 is not greater than the above-described speed threshold, device 511 optionally selects primary touch navigation area 1620 as described with reference to FIGS. 16B-16C. The speed of contact 1603 that is compared to the threshold speed is optionally the average speed of the contact 1603 during the time threshold, a peak speed of the contact 1603 during the time threshold, a speed of the contact 1603 after having moved a specified distance (e.g., threshold distance 1622), a speed of the contact 1603 at the time threshold, etc.

For example, in FIG. 16G, the above-described speed threshold is represented by 1607. Contact 1603 touches down in touch navigation region 1652, moves to the left more than threshold distance 1622 within the time threshold, but is moving to the left with a speed S1, less than threshold 1607. Because contact 1603 is moving slower than threshold 1607, device 511 does not select primary touch navigation area 1620 such that the touchdown location of contact 1603 is on the right edge of primary touch navigation area 1620 (e.g., the edge of primary touch navigation area 1620 opposite the direction of movement of contact 1603). Rather, device 511 selects primary touch navigation area 1620 such that the relative location of the touchdown location of contact 1603 within primary touch navigation area 1620 is proportional in both horizontal and vertical dimensions to the relative location of the touchdown location of contact 1603 within touch navigation region 1652 (e.g., as described with reference to FIGS. 16B-16C).

However, in FIG. 16H, contact 1603 touches down in the same location and moves in the same direction as contact 1603 in FIG. 16G, and also moves more than threshold distance 1622 within the time threshold, but moves at speed S2, which is greater than threshold 1607, rather than at speed S1. As a result, device 511 selects primary touch navigation area 1620 such that the touchdown location of contact 1603 is on the right edge of primary touch navigation area 1620 (e.g., the edge of primary touch navigation area 1620 opposite the direction of movement of contact 1603).

As previously described with reference to FIGS. 14A-14GG and 15A-15H, touch inputs detected in different regions of primary touch navigation area 1620 optionally cause the same response at device 500 as do touch inputs detected in those same different regions of touch-sensitive surface 451 of remote 510. For example, a swipe input detected in primary touch navigation area 1620 or touch-sensitive surface 451 optionally causes scrolling of a list displayed in user interface 1602. If that swipe input is not detected on a predefined edge (e.g., the right edge) of primary touch navigation area 1620, the scrolling performed on device 500 in user interface 1602 is a regular scrolling operation, as shown in FIG. 16I (e.g., a downward swipe in the center region of primary touch navigation area 1620 causes a downward regular scrolling of list 1610 in user interface 1602). If that swipe input is detected on the predefined edge (e.g., the right edge) of primary touch navigation area 1620, the scrolling performed on device 500 in user interface 1602 is an accelerated scrolling operation, as shown in FIG. 16J (e.g., a downward swipe on the right edge of primary touch navigation area 1620 causes a downward accelerated scrolling of list 1610 in user interface 1602). In some embodiments, accelerated scrolling through list 1610 includes displaying, in user interface 1602 on display, an index user interface element that includes a plurality of index objects (e.g., an index of A-Z, 1-9, dates and/or times, television channels, artist names, etc.). This index user interface element allows for the user to quickly scroll through list of items 1610, thus increasing the efficiency of the human-machine interface. In some embodiments, a first index object of the plurality of index objects corresponds to a first plurality of the items in list 1610 (e.g., "A" in the index corresponds to multiple items in list 1610 starting with "A"), a second index object of the plurality of index objects corresponds to a second plurality of the items in list 1610 (e.g., "B" in the index corresponds to multiple items in list 1610 starting with "B"). In some embodiments, in accordance with the downward swipe of contact 1603 detected on the right edge of primary touch navigation area 1620, the device 500 moves a focus in the user interface from one index object to a different index object in the index user interface element in accordance with the movement of contact 1603. When a given index object receives the focus, the one or more elements in list 1610 that correspond to that index object are scrolled to/displayed in user interface 1602. As such, in the accelerated scrolling mode, the user is able to scroll through the index objects in the index elements to quickly scroll through the list of items in list 1610. In contrast, in the normal scrolling mode, the focus in user interface 1602 is moved from one item in list 1610 to a different item in list 1610 in accordance with the movement of the contact, such as in FIG. 16I, which scrolls through items in list 1610 one-by-one rather than index object-by-index object as in accelerated scrolling.

In some embodiments, if contact 1603 crosses a boundary of primary touch navigation area 1620 (e.g., reaches a boundary of primary touch navigation area 1620 and exits primary touch navigation area 1620), device 511, depending on the speed of the movement of contact 1603, creates a new primary touch navigation area 1620 so that the movement of contact 1603 continues to be detected and transmitted to device 500. For example, in FIG. 16K, contact 1603 has touched down in touch navigation region 1652 and is moving downward in primary touch navigation area 1620. Device 511 transmits a touchdown command to device 500 corresponding to the touchdown of contact 1603, followed by a movement command to device 500 corresponding to the movement of contact 1603 in primary touch navigation area 1620, which causes cursor 1604 to move in accordance with the movement of contact 1603, as shown in FIG. 16K.

In FIG. 16L, contact 1603 moves at speed S3 lower than threshold 1609 to the bottom boundary of primary touch navigation area 1620, and device 511 continues to transmit a movement command to device 500 corresponding to the movement of contact 1603 in primary touch navigation area 1620. As a result, cursor 1604 continues to respond to, and in accordance with, the movement of contact 1603, as shown in FIG. 16L.

In FIG. 16M, contact 1603 has continued to move downwards, outside of primary touch navigation area 1620, at speed S3 less than threshold 1609. Because contact 1603 was moving at speed S3, lower than threshold 1609, across the lower boundary of primary touch navigation area 1620, device 511 has created a new primary touch navigation area 1621 in touch navigation region 1652. New primary touch navigation area 1621 is selected by device 511 to be aligned with the previous primary touch navigation area 1620 in the dimension orthogonal to the movement of contact 1603 (e.g., in the horizontal dimension), and to place contact 1603 on the edge of the new primary touch navigation area 1621 that is opposite the direction of the primary axis of the movement of contact 1603 (e.g., at the top edge of the new primary touch navigation area 1621, which is opposite the downward direction of the movement of contact 1603). When contact 1603 exits the previous primary touch navigation area 1620 and device 511 creates the new primary touch navigation area 1621, device 511 transmits a liftoff command to device 500 (corresponding to contact 1603 exiting the previous primary touch navigation area 1620) and a touchdown command to device 500 (corresponding to contact 1603 being placed in the new primary touch navigation area 1621 by device 511). Subsequent movement of contact 1603 in the new primary touch navigation area 1621 causes device 511 to transmit to device 500 a movement command corresponding to the movement of contact 1603 in the new primary touch navigation area 1621, which causes cursor 1604 to continue to respond to, and in accordance with, the movement of contact 1603. The creation of new primary touch navigation area 1621 as described with reference FIGS. 16K-16M allows device 511 (and device 500) to continue an ongoing navigation operation corresponding to the movement of contact 1603, without interruption, when contact 1603 exits primary touch navigation area 1620 and is moving slowly across touch navigation area 1652. In some embodiments, threshold 1609 is ⅛, ¼, ⅓, etc. of a linear dimension of the primary touch navigation area 1620 per second.

In contrast, in FIGS. 16N-16P, contact 1603 exits primary touch navigation area 1620 when moving faster than the threshold speed 1609—as a result, device 511 does not create a new primary touch navigation area when contact 1603 exits primary touch navigation area 1620, as will now be described. For example, in FIG. 16N, contact 1603 is moving downward in primary touch navigation area 1620, as described with reference to FIG. 16K. In FIG. 16O, contact 1603 moves to the bottom boundary of primary touch navigation area 1620 at speed S4, greater than threshold 1609. Device 511 transmits a movement command to device 500 corresponding to the movement of contact 1603 within primary touch navigation area 1620, and cursor 1604 in user interface 1602 responds to such movement, as described with reference to FIG. 16L. However, in FIG. 16P, contact 1603 exits primary touch navigation area 1620 at speed S4, greater than threshold 1609. As a result, device 511 does not create a new primary touch navigation area (e.g., as described with reference to FIG. 16M). Rather, device 511 transmits a liftoff command to device 500, which corresponds to contact 1603 exiting primary touch navigation area 1620, but does not transmit subsequent touchdown and/or movement commands corresponding to movement of contact 1603 outside of primary touch navigation area 1620, even though device 511 optionally continues to detect contact 1603 and/or its movement outside of primary touch navigation area 1620. As a result, cursor 1604 does not respond to movement of contact 1603 outside of primary touch navigation area 1620. In some embodiments, a navigation operation being performed at device 500 in response to the detected movement of contact 1603 in primary touch navigation area 1620 (before contact 1603 exited primary touch navigation area 1620) is continued as though contact 1603 had ceased to be detected on touch screen 1651. For example, if the navigation operation had simulated inertia, the navigation operation would continue with a speed based on the speed of contact 1603 on "liftoff" (e.g., on exiting primary touch navigation area 1620) from touch screen 1652.

In some embodiments, whether device 511 creates a new primary touch navigation area 1620 when contact moves outside of primary touch navigation area 1620 depends on the size of touch navigation region 1652, in addition or alternatively to the speed of contact 1603 as described with reference to FIGS. 16K-16P. For example, if touch navigation region 1652 is larger than a threshold size (e.g., because device 511 is a specified device having touch screen 1651 larger than a threshold size, such as a tablet computer, or because the portion of touch screen 1651 in which touch navigation region 1652 is displayed—such as in a multitasking configuration as in FIG. 18Q—is larger than a threshold size), then device 511 optionally creates a new primary touch navigation area when contact moves outside of the primary touch navigation area 1620, and if touch navigation region 1652 is smaller than the threshold size (e.g., because device 511 is a specified device having touch screen 1651 smaller than the threshold size, such as a mobile telephone, or because the portion of touch screen 1651 in which touch navigation region 1652 is displayed—such as in a multitasking configuration as in FIG. 18Q—is smaller than a threshold size), then device 511 optionally does not create a new primary touch navigation area when contact moves outside of the primary touch navigation area. The threshold size is optionally 10, 20 or 40 times the size of primary touch navigation area 1620. For example, in FIGS. 16Q-16R, device 511 is a relatively large device with a relatively large touch screen 1651 (e.g., a tablet computer with an 8", 10" or 12" touch screen) such that touch navigation region 1652 is larger than the above-described threshold size, and contact 1603 is moving at speed S3 less than threshold 1609 when it exits primary touch navigation area 1620. As a result, device 511 creates a new primary touch navigation area 1621 when contact moves outside of primary touch navigation area 1620, as described with reference to FIGS. 16K-16M. However, in FIGS. 16S-16T, while contact 1603 is also moving at speed S3 less than threshold 1609 when it exits primary touch navigation area 1620, device 512 is a relatively small device with a relatively small touch screen (e.g., a mobile telephone with a 4", 5" or 6" touch screen) such that touch navigation region 1652 is smaller than the above-described threshold size, such as one or more of device 112 in FIGS. 10A-10N, device 511 in FIGS. 12A-12RR and device 511 in FIGS. 14A-14GG. As a result, device 512 does not create a new primary touch navigation area 1621 when contact 1603 moves outside of primary touch navigation area 1620, as described with reference to FIGS. 16N-16P.

FIGS. 17A-17G are flow diagrams illustrating a method of selecting a primary touch navigation area on a touch-sensitive surface of an electronic device based on movement of a contact when it is first detected by the electronic device (e.g., when the contact touches down on the touch-sensitive surface) in accordance with some embodiments of the disclosure. The method 1700 is optionally performed at an electronic device such as device 100, device 300, device 500 or device 511 as described above with reference to FIGS. 1A-1B, 2-3 and 5A-5B. Some operations in method 1700 are, optionally, combined and/or the order of some operations is, optionally, changed.

As described below, the method 1700 provides ways of selecting a primary touch navigation area on a touch-sensitive surface of an electronic device based on movement of a contact when it is first detected by the electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device (e.g., a tablet computer, a mobile phone, etc., with a touch screen, or an electronic device with a touch-sensitive surface having no display capabilities, such as a trackpad) has a touch-sensitive surface, such as shown in FIG. 16A. In some embodiments, a portion of the touch-sensitive surface is designated as the touch navigation region in which touch activity, such as swipe inputs, is detectable, while another portion of the touch-sensitive surface is designated for other functionality, such as in FIG. 16A. For example, the electronic device is optionally running a remote control application for controlling a second electronic device, the remote control application displaying a touch navigation region in a portion of a touch screen of the electronic device, and displaying remote control buttons in a different portion of the touch screen. In some embodiments, the first electronic device detects (1702) a touchdown of a contact at a first location in a touch navigation region of the touch-sensitive surface of the first electronic device, such as in FIG. 16C. In some embodiments, in response to detecting the touchdown of the contact at the first location in the touch navigation region of the touch-sensitive surface (1704), the first electronic device selects (1706) a respective area of the touch navigation region as a primary touch navigation area, such as in FIGS. 16D-16F.

In some embodiments, in accordance with a determination that movement of the contact satisfies first movement criteria (e.g., the major axis of the movement of the contact is towards the left on the touch-sensitive surface), the first electronic device selects (1708) a first area in the touch navigation region as the primary touch navigation area, wherein: the first area is a subset of the touch navigation region that excludes a first auxiliary portion of the touch navigation region, and the first area is selected so as to include the first location, such as in FIGS. 16D-16E. For example, the first electronic device identifies an area in the touch navigation region, which includes the location of the touchdown of the contact, as the primary touch navigation area so as to increase or maximize the distance the contact can continue to move in the direction in which it was moving when it touched down before reaching a boundary of the primary touch navigation area. For example, if the contact is moving to the left when it touches down on the touch-sensitive surface, the primary touch navigation area is selected so that the contact is located on the right-most border of the primary touch navigation area, such as in FIG. 16H. In some embodiments, the primary touch navigation area is an area in the touch navigation region in which touch inputs cause a first kind of response at the second electronic device, such as scrolling at a first speed in response to a swipe input, while touch inputs detected outside of the primary touch navigation area cause a second kind of response at the second electronic device, such as no response at all (e.g., touch inputs are not recognized outside of the primary touch navigation area or scrolling at a second speed in response to a swipe input). As a result, due to the fact that the movement of the contact satisfies the first movement criteria, the starting position of the contact on the touch-sensitive surface is effectively mapped to a first side of the primary touch navigation area instead of being mapped to a second side of the primary touch navigation area (e.g., the user is able to perform the same set of navigation operations as if they had placed their finger down on a first side of a touch-sensitive surface of a dedicated remote control).

In some embodiments, in accordance with a determination that the movement of the contact satisfies second movement criteria (e.g., the major axis of the movement of the contact is towards the right on the touch-sensitive surface), different from the first movement criteria, the first electronic device selects (1710) a second area, different from the first area, in the touch navigation region as the primary touch navigation area, wherein: the second area is a subset of the touch navigation region that excludes a second auxiliary portion of the touch navigation region that is different from the first auxiliary portion, and the second area is selected so as to include the first location, such as in FIG. 16F. For example, if the contact is moving to the right when it touches down on the touch-sensitive surface, the primary touch navigation area is selected so that the contact is located on the left-most border of the primary touch navigation area, such as in FIG. 16E. Thus, the direction of movement of the contact when it touches down on the touch-sensitive surface optionally determines where, in the touch navigation region, the primary touch navigation area is located, such as in FIGS. 16D-16F. As a result, the first electronic device optionally maximizes the distance a user's touch input can continue to move when it touches down, regardless of where in the touch navigation region the touch input is initially detected. As a result, due to the fact that the movement of the contact satisfies the second movement criteria, the starting position of the contact on the touch-sensitive surface is effectively mapped to the second side of the primary touch navigation area instead of being mapped to the first side of the primary touch navigation area (e.g., the user is able to perform the same set of navigation operations as if they had placed their finger down on a second side of the touch-sensitive surface of the dedicated remote control).

In some embodiments, after selecting the respective area as the primary touch navigation area, the first electronic device detects (1712) second movement of the contact on the touch-sensitive surface, such as in FIGS. 16D-16F. In some embodiments, in response to detecting the second movement of the contact on the touch-sensitive surface, the first electronic device performs (1714) a user interface navigation operation in a user interface that is associated with the first electronic device (e.g., a user interface displayed on a remotely controlled display such as a television screen or display 514 in FIGS. 16A-16T), wherein movement within the primary touch navigation area corresponds to a respective range of navigation operations in the user interface that is determined based on a distance between the contact and an edge of the primary touch navigation area. In some embodiments, if the first area is selected as the primary touch navigation area (e.g., due to movement of the contact in the first direction during an initial portion of the input), the range of navigation operations in the first direction has a first magnitude and the range of navigation operations in a second direction that is opposite to the first direction has a second magnitude where the first magnitude is greater than the second magnitude; and if the second area is selected as the primary touch navigation area (e.g., due to movement of the contact in the second direction during an initial portion of the input), the range of navigation operations in the second direction has a third magnitude and the range of navigation operations in the first direction that is opposite to the second direction has a fourth magnitude where the third magnitude is greater than the fourth magnitude. In some embodiments, the sum of the first magnitude and the second magnitude is the same (or approximately the same) as the sum of the third magnitude and the fourth magnitude (e.g., the size of the range of navigation operations is the same for the primary touch navigation area, but the maximum and minimum values of the range of navigation operations change based on where the primary touch navigation region is placed relative to the contact on the touch-sensitive surface). The above-described manner of the first electronic device selecting the primary touch navigation area allows the device to increase the amount of usable space in the primary touch navigation area for detecting touch inputs, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first movement criteria include a criterion that is satisfied when (e.g., the first movement criteria require that), within a time threshold (e.g., 0.1, 0.2, 0.4 seconds) of the touchdown of the contact, a direction of the movement of the contact is a first direction (e.g., the primary axis of the movement of the contact within a time threshold of when it touches down is towards the left on the touch-sensitive surface such that the first electronic device selects the primary touch navigation area towards the left in the touch navigation region of the touch-sensitive surface, such as in FIG. 16H) (1716), such as in FIG. 16E. In some embodiments, the second movement criteria include a criterion that is satisfied when (e.g., the second movement criteria require that), within the time threshold of the touchdown of the contact, the direction of the movement of the contact is a second direction, different than (e.g., opposite to) the first direction (1718), such as in FIG. 16F. For example, the primary axis of the movement of the contact within the time threshold of when it touches down is towards the right on the touch-sensitive surface such that the first electronic device selects the primary touch navigation area towards the right in the touch navigation region of the touch-sensitive surface, such as in FIG. 16E. In this way, the first electronic device is able to, based on the movement of the contact, maximize the amount of usable space in the primary touch navigation area for detecting touch inputs in the direction of the movement of the contact, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first movement criteria and the second movement criteria include a criterion that is satisfied when (e.g., the first movement criteria and the second movement criteria require that), within the time threshold of the touchdown of the contact, a speed of the movement of the contact is greater than a threshold speed (e.g., ¼, ⅓, ½, etc. of a linear dimension, such as the width, of the primary touch navigation area per second) (1720), such as in FIGS. 16G-16H. The speed of the contact that is compared to the threshold is optionally the average speed of the contact during the time threshold, a peak speed of the contact during the time threshold, a speed of the contact after having moved a specified distance, a speed of the contact at the time threshold, etc. By requiring movement above a certain speed before selecting the primary touch navigation area, as described, the first electronic device ensures that a user is, indeed, providing a moving input to the first electronic device as opposed to a non-moving input, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first movement criteria and the second movement criteria include a criterion that is satisfied when (e.g., the first movement criteria and the second movement criteria require that) the contact moves more than a threshold distance within the time threshold of the touchdown of the contact (e.g., 2%, 5%, 10%, etc. of a linear dimension, such as the width, of the primary touch navigation area) (1722), such as in FIGS. 16D-16H. By requiring movement more than a certain distance before selecting the primary touch navigation area, as described, the first electronic device ensures that a user is, indeed, providing a moving input to the first electronic device as opposed to a non-moving input, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the primary touch navigation area is selected such that the first location of the touchdown of the contact (e.g., where the contact initially touched-down in the touch navigation region) is located closer to an edge of the primary touch navigation area that the contact is moving away from than to an edge of the primary touch navigation area that the contact is moving towards (1724), such as in FIGS. 16D-16F. For example, if the primary touch navigation area is a rectangle or square, and the primary axis of the movement of the contact is towards the left on the touch navigation region, the first electronic device selects the primary touch navigation area such that the location of the initial touchdown of the contact is at or near the right edge of the primary touch navigation area, such as in FIG. 16H. The first electronic device similarly selects the primary touch navigation area for primary axes of movement of the contact that are to the right, upwards, and downwards. For example, if the primary axis of the movement of the contact is towards the right on the touch navigation region, the first electronic device selects the primary touch navigation area such that the location of the initial touchdown of the contact is at or near the left edge of the primary touch navigation area, such as in FIGS. 16D-16E; if the primary axis of the movement of the contact is upwards on the touch navigation region, the first electronic device selects the primary touch navigation area such that the location of the initial touchdown of the contact is at or near the bottom edge of the primary touch navigation area, such as in FIG. 16F; and if the primary axis of the movement of the contact is downwards on the touch navigation region, the first electronic device selects the primary touch navigation area such that the location of the initial touchdown of the contact is at or near the top edge of the primary touch navigation area, such as in FIG. 16K. In this way, the first electronic device is able to, based on the movement of the contact, maximize the amount of usable space in the primary touch navigation area for detecting touch inputs in the direction of the movement of the contact, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first movement criteria include a criterion that is satisfied when (e.g., the first movement criteria require that), within a time threshold (e.g., 0.1, 0.2, 0.4 seconds) of the touchdown of the contact, the movement of the contact satisfies the first movement criteria (1726). For example, the movement of the contact must satisfy the first movement criteria within the time threshold of touchdown of the contact if the first area is to be selected as the primary touch navigation area. In some embodiments, the second movement criteria include a criterion that is satisfied when (e.g., the second movement criteria require that), within the time threshold (e.g., 0.1, 0.2, 0.4 seconds) of the touchdown of the contact, the movement of the contact satisfies the second movement criteria (1728). For example, the movement of the contact must satisfy the second movement criteria within the time threshold of touchdown of the contact if the second area is to be selected as the primary touch navigation area.

In some embodiments, in response to detecting the touchdown of the contact at the first location in the touch navigation region of the touch-sensitive surface (1730), in accordance with a determination that the contact has movement less than a movement threshold (e.g., 2%, 5%, 10%, etc. of a linear dimension, such as the width, of the primary touch navigation area) within the time threshold of the touchdown of the contact, the first electronic device selects (1732) a third area, different from the first area and the second area, in the touch navigation region as the primary touch navigation area (e.g., if the contact has little or no movement after touchdown, a different area of the touch navigation region is selected as the primary touch navigation area), such as in FIGS. 16B-16C. In some embodiments, the third area is a subset of the touch navigation region that excludes a third auxiliary portion of the touch navigation region that is different from the first auxiliary portion and the second auxiliary portion. In some embodiments, the third area is selected so as to include the first location. In some embodiments, a relative location, in the primary touch navigation area, of the first location of the contact corresponds to a relative location, in the touch navigation region, of the first location of the contact, such as in FIGS. 16B-16C. For example, if the contact is detected in the upper-right portion of the touch navigation region, the primary touch navigation area is optionally selected to encompass the touchdown location such that the touchdown location is in the upper-right portion of the primary touch navigation area. Similarly, if the contact is detected in the lower-left portion of the touch navigation region, the primary touch navigation area is optionally selected to encompass the touchdown location such that the touchdown location is in the lower-left portion of the primary touch navigation area. In some embodiments, if the third area is selected as the primary touch navigation area (e.g., due to a lack of movement of the contact during an initial portion of the input), the range of navigation operations in the second direction has a fifth magnitude and the range of navigation operations in the first direction that is opposite to the second direction has a sixth magnitude where the fifth magnitude is approximately equal to than the sixth magnitude. Such proportional placement of the primary touch navigation area in cases where no or little movement of the contact exists improves the user's interaction with the first electronic device, as the response of the first electronic device is optionally consistent with the user's expectations (e.g., the user optionally expects that if the user touches the lower-right portion of the touch navigation region, the touch will be interpreted as being in the lower-right portion of the primary touch navigation area, etc.). Further, such proportional placement of the primary touch navigation area allows the first electronic device to be used to detect location-based inputs correctly in the same manner as a dedicate remote control. For example, touching the middle-right portion of a touch-sensitive surface of the dedicated remote control optionally causes a certain function, such as skipping through content playing on a set-top box, to be performed. With such proportional placement of the primary touch navigation area, touching the middle-right portion of the touch navigation region of the first electronic device would be recognized as being an input to perform the same function. Thus, the operability of the device is improved and the user-device interface is made more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the primary touch navigation area is selected (1734) such that a relative location, in the primary touch navigation area, of the first location of the contact along an axis perpendicular to a primary axis of the movement of the contact corresponds to a relative location, in the touch navigation region, of the first location of the contact along the axis perpendicular to the primary axis of the movement of the contact, such as in FIGS. 16E-16F. For example, the primary touch navigation area is selected such that the location of the contact, in the primary touch navigation area, along the axis perpendicular to the primary axis of movement of the contact corresponds to the location of the contact, in the touch navigation region of the touch-sensitive surface, along the axis perpendicular to the primary axis of movement of the contact. For example, if the contact is detected in the upper-right portion of the touch navigation region and is moving towards the left, the primary touch navigation area is optionally selected to encompass the touchdown location such that the touchdown location is in the upper portion of the primary touch navigation area—in this example, the touchdown location may be in the center, slightly to the right or on the right edge of the primary touch navigation area along the horizontal axis. However, if the contact is detected in the upper-right portion of the touch navigation region and is moving down, the primary touch navigation area is optionally selected to encompass the touchdown location such that the touchdown location is in the right portion of the primary touch navigation area—in this example, the touchdown location is, optionally, in the center, slightly above or on the top edge of the primary touch navigation area along the vertical axis, such as in FIG. 16K. Similarly, if the contact is detected in the lower-left portion of the touch navigation region and is moving to the right, the primary touch navigation area is optionally selected to encompass the touchdown location such that the touchdown location is in the lower portion of the primary touch navigation area—in this example, the touchdown location is, optionally, in the center, slightly to the left or on the left edge of the primary touch navigation area along the horizontal axis. However, if the contact is detected in the lower-left portion of the touch navigation region and is moving up, the primary touch navigation area is optionally selected to encompass the touchdown location such that the touchdown location is in the left portion of the primary touch navigation area—in this example, the touchdown location may be in the center, slightly below or on the bottom edge of the primary touch navigation area along the vertical axis. Such proportional placement of the primary touch navigation area in the axis perpendicular to the primary axis of the movement of the contact improves the user's interaction with the first electronic device, as the response of the first electronic device is optionally consistent with the user's expectations (e.g., the user optionally expects that if the user swipes down on the right portion of the touch navigation region, the swipe will be interpreted as being in the right portion of the primary touch navigation area, etc.). Further, such proportional placement of the primary touch navigation area allows the first electronic device to be used to detect location-based inputs correctly in the same manner as a dedicate remote control. For example, swiping down on the right portion of a touch-sensitive surface of the dedicated remote control optionally causes a certain function, such as accelerated scrolling through a list displayed on a set-top box, to be performed. With such proportional placement of the primary touch navigation area, swiping down in the right portion of the touch navigation region of the first electronic device would be recognized as being an input to perform the same function, such as in FIG. 16J. Thus, the operability of the device is improved and the user-device interface is made more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second movement of the contact on the touch-sensitive surface comprises a downward swipe on the touch-sensitive surface (e.g., after the primary touch navigation area is selected, a downward swipe is detected) (1736), such as in FIGS. 16I-16J. In some embodiments, in accordance with a determination that the downward swipe is located on a predefined edge (e.g., a right edge) of the primary touch navigation area (e.g., a determination that the contact is being detected on the right edge of the primary touch navigation area when the downward swipe is performed), the user interface navigation operation comprises accelerated scrolling of content displayed in the user interface that is associated with the first electronic device (1738), such as in FIG. 16J. For example, a swipe detected on the right edge of the primary touch navigation area optionally causes scrolling through a list of items displayed in the user interface on a separate device, such as a set-top box, in an accelerated manner. This behavior optionally mirrors the result of a swipe detected on the right edge of the touch-sensitive surface of a dedicated remote control for controlling the user interface. In some embodiments, in accordance with a determination that the downward swipe is not located on the predefined edge of the primary touch navigation area (e.g., a determination that the contact is not being detected on the right edge of the primary touch navigation area when the downward swipe is performed), the user interface navigation operation comprises regular scrolling of the content displayed in the user interface that is associated with the first electronic device (1740), such as in FIG. 16I. For example, a swipe detected in a region of the primary touch navigation area that is not the right edge of the primary touch navigation area optionally causes scrolling through a list of items displayed in the user interface on a separate device, such as a set-top box, in a regular manner (e.g., non-accelerated manner). This behavior optionally mirrors the result of a swipe detected in a non-right edge region of the touch-sensitive surface of a dedicated remote control for controlling the user interface. Thus, the operability of the device is improved and the user-device interface is made more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after selecting the primary touch navigation area, the first electronic device detects (1742), on the touch-sensitive surface, movement of the contact across a boundary of the primary touch navigation area (e.g., the contact moves from inside to outside the primary touch navigation area), such as in FIGS. 16K-16R. In some embodiments, in response to detecting the movement of the contact across the boundary of the primary touch navigation area (1744), in accordance with a determination that the movement of the contact across the boundary of the primary touch navigation area satisfies extended navigation criteria, including a criterion that is satisfied when (e.g., the extended navigation criteria require that) a speed of the movement of the contact is less than a threshold speed (e.g., at the moment the contact crosses the boundary of the primary touch navigation area, its speed is less than the speed threshold) (1746), the first electronic device selects (1748) a new primary touch navigation area, different than the primary touch navigation area, in the touch navigation region, wherein the new primary touch navigation area includes a location of the contact in the touch navigation region, such as in FIGS. 16K-16M. In some embodiments, the first electronic device responds (1750) to movement of the contact within the new primary touch navigation area, such as in FIG. 16M. For example, if the contact moves outside of the primary touch navigation area in a slow manner, the first electronic device selects a new primary touch navigation area that includes the contact so that the contact may continue to move and that movement can continue to be detected in a primary touch navigation area. For example, if the contact is moving towards the left and exits the primary touch navigation area, the first electronic device selects a new primary touch navigation area that is aligned, vertically, with the previous primary touch navigation area, but places the contact on the right edge of the new primary touch navigation area so that the contact can continue to move to the left in the new primary touch navigation area. This enables the device to continue an ongoing navigation operation without interruption if the touch input is moving slowly across the touch-sensitive surface—thus, the user-device interface is improved, because the user is able to use more of, or even the entirety of, the area of the touch navigation region to provide touch input in such circumstances, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the movement of the contact across the boundary of the primary touch navigation area does not satisfy the extended navigation criteria (e.g., at the moment the contact crosses the boundary of the primary touch navigation area, its speed is greater than the speed threshold) (1752), the first electronic devices forgoes (1754) selecting the new primary touch navigation area, such as in FIGS. 16N-16P. In some embodiments, the first electronic device forgoes (1756) responding to the movement of the contact outside of the primary touch navigation area, such as in FIG. 16P. For example, if the contact moves outside of the primary touch navigation area in a fast manner, the first electronic device does not select a new primary touch navigation area. Rather, the first electronic device ceases responding to the movement of the contact outside of the primary touch navigation area. In some embodiments, a navigation operation being performed in response to the input on the touch-sensitive surface is continued as though the contact had ceased to be detected on the touch-sensitive surface. For example, if the navigation operation had simulated inertia, the navigation operation would continue with a speed based on the speed of the contact on liftoff from the touch-sensitive surface. Thus, the user-device interface is improved, because the first electronic device operates in a manner consistent with the dedicated remote control, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the movement of the contact across the boundary of the primary touch navigation area comprises a primary axis of the movement of the contact (e.g., the primary movement of the contact is horizontal, vertical, etc.) (1758). In some embodiments, the new primary touch navigation area is selected such that a location of the contact, along the primary axis of the movement of the contact, within the new primary touch navigation area is different from a location of the contact, along the primary axis of the movement of the contact, within the primary touch navigation area (1760), such as in FIG. 16M. For example, the new primary touch navigation area is selected so that the contact can continue to move in the direction in which it is moving, and that contact can continue to be detected in the new primary touch navigation area, such as in FIG. 16M. For example, the new primary touch navigation area is selected so that the location of the contact is in the center of the new area along the primary axis of the movement of the contact, on the edge of the new primary touch navigation area opposite the direction of movement along the primary axis of the movement of the contact, etc. For example, if the contact is moving to the left outside of the primary touch navigation area, the location of the contact in the new primary touch navigation area is in the center, in the center-right or on the right edge of the primary touch navigation area. In this way, the first electronic device is able to, based on the movement of the contact, increase or maximize the amount of usable space in the new primary touch navigation area for detecting touch inputs in the direction of the movement of the contact, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the primary touch navigation area creation criteria includes a criterion that is satisfied when a size of the touch navigation region is greater than a threshold size, and is not satisfied when the size of the touch navigation region is less than the threshold size (1762), such as in FIGS. 16Q-16T. For example, a new primary touch navigation area is only selected when the touch navigation region, or the touch screen of the first electronic device, is large enough to allow for sequentially creating multiple primary touch navigation areas along a given direction, such as in FIGS. 16Q-16R. In this way, the first electronic device optionally limits creating new primary touch navigation areas to situations in which there is sufficient space to create such new areas, thus operating in a manner that is compatible with, and not inconsistent with, the size of the touch navigation region and/or touch screen available to the device, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first electronic device indicates (1764), to a second electronic device controlled by the first electronic device, liftoff of the contact from the primary touch navigation area and touchdown of a new contact in the new primary touch navigation area, such as in FIG. 16M. For example, in the circumstance where the first electronic device is controlling a second electronic device, such as a set-top box, and transmitting remote control commands to the second electronic device in response to touch inputs detected at the first electronic device, the first electronic device presents, to the second electronic device, the creation of the new primary touch navigation area as a liftoff of the contact from the old primary touch navigation region and instantaneous touchdown of the contact in the new primary touch navigation region. In some embodiments, the touchdown of the new contact is indicated at the same time as or close to the same time as the liftoff of the contact is indicated so as to preserve a continuity of an ongoing navigation operation, thus improving the operation of the first electronic device, the interactions between the first electronic device and the second electronic device, and the interactions between a user and the first electronic device, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first electronic device detects (1766) a swipe input in the primary touch navigation area. In some embodiments, in response to detecting the swipe input in the primary touch navigation area, the first electronic device scrolls (1768) content in the user interface that is associated with the first electronic device in accordance with the swipe input, such as in FIGS. 16I-16J. In some embodiments, performing (1770) the user interface navigation operation in response to detecting the second movement of the contact on the touch-sensitive surface includes moving an object in the user interface that is associated with the first electronic device in accordance with the second movement of the contact on the touch-sensitive surface, such as in FIG. 16E. In some embodiments, performing (1772) the user interface navigation operation in response to detecting the second movement of the contact on the touch-sensitive surface includes moving a current focus from a first object to a second object in the user interface that is associated with the first electronic device in accordance with the second movement of the contact on the touch-sensitive surface, such as in FIG. 16E.

In some embodiments, a size of the primary touch navigation area corresponds to a size of a touch-sensitive surface of a dedicated physical remote control for controlling the user interface that is associated with the first electronic device (1774), such as in FIGS. 16B-16T. For example, a physical remote optionally controls a second electronic device, such as a set-top box, that displays the user interface on a display device, such as a television. The first electronic device is optionally also configured to control the second electronic device in a similar manner. In such a circumstance, the size of the primary touch navigation area on the first electronic device is optionally the same size as, or +/−25% or 50% of, the size of the touch-sensitive surface of the dedicated physical remote control. In this way, the user-device interface is improved, because the first electronic device optionally mimics and operates in a manner consistent with the dedicated physical remote control, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be understood that the particular order in which the operations in FIGS. 17A-17G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500 and 1900) are also applicable in an analogous manner to method 1700 described above with respect to FIGS. 17A-17G. For example, the touch inputs, software remote control applications, touch navigation regions, primary touch navigation areas, and/or simulated remote trackpads described above with reference to method 1700 optionally have one or more of the characteristics of the touch inputs, software remote control applications, touch navigation regions, primary touch navigation areas, and/or simulated remote trackpads described herein with reference to other methods described herein (e.g., methods 700, 900, 1100, 1300, 1500 and 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 25) or application specific chips. Further, the operations described above with reference to FIGS. 17A-17G are, optionally, implemented by components depicted in FIGS. 1A-1B. For example, detecting operation 1702 and selecting operations 1706, 1708 and 1710 are, optionally, implemented by event sorter 170, event recognizer 180, and event handler 190. Event monitor 171 in event sorter 170 detects a contact on touch screen 1651, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Movable Control Panel Overlaid on Touch Navigation Region

Users interact with electronic devices in many different manners, including interacting with content (e.g., music, movies, etc.) that are, optionally, available (e.g., stored or otherwise accessible) on the electronic devices. In some circumstances, a user interacts with an electronic device by using a multifunction device to provide control (e.g., forward skip, backward skip, play, pause, etc.) and/or navigational inputs (e.g., swipes for scrolling content) to the electronic device. The multifunction device optionally presents a user interface that includes a touch navigation region in which navigational inputs are detected, and a control panel region overlaid on the touch navigation region and that includes one or more buttons at which control inputs are detected. The embodiments described below provide ways in which the multifunction device arranges the control panel region and the touch navigation region in the user interface of the multifunction device, thereby enhancing users' interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 18A:
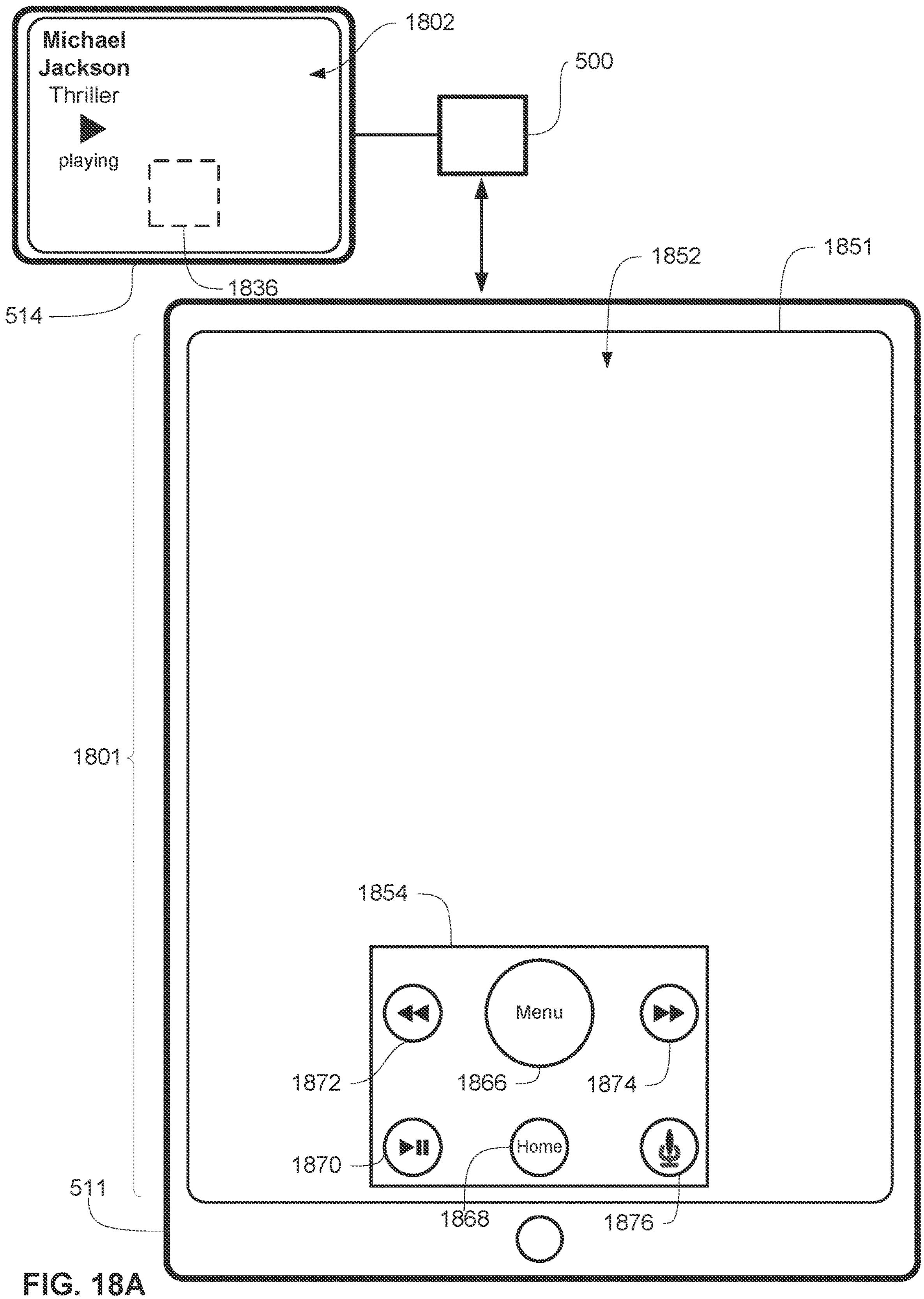
FIGS. 18A-18II illustrate exemplary ways in which a multifunction device arranges a control panel region and a touch navigation region in a user interface of the multifunction device in accordance with some embodiments of the disclosure.

FIGS. 18A-181I illustrate exemplary ways in which a multifunction device arranges a control panel region and a touch navigation region in a user interface of the multifunction device in accordance with some embodiments of the disclosure. The embodiments in these figures are used to illustrate the processes described below, including the processes described with reference to FIGS. 19A-19H.

FIG. 18A illustrates exemplary display 514. Display 514 optionally displays one or more user interfaces that include various content. In the example illustrated in FIG. 18A, display 514 displays a content application (e.g., a content playback application) running on an electronic device (e.g., electronic device 500 of FIG. 5A) of which display 514 is a part, or to which display 514 is connected, as described with reference to FIGS. 10A-10N. In some embodiments, the content application is for displaying or playing content (e.g., movies, songs, TV shows, games, a menu for an application, or a menu for navigating to media content, etc.). The content application displays user interface 1002. In FIG. 18A, content application is playing the song "Thriller" by Michael Jackson on electronic device 500.

Providing input to the application (e.g., to control the application, to control content playback on electronic device 500, to control the location of a current focus indicator in user interface 1802, etc.) is optionally accomplished by detecting various control inputs (e.g., a selection input, a movement input, a dedicated button input, etc.) on multifunction device 511, which is optionally configured to operate in a manner analogous to a dedicated remote control of device 500. In particular, device 511 is optionally a multifunction device that is running a remote control application for controlling device 500, such as device 112 in FIGS. 10A-10N, device 511 in FIG. 12A, device 511 in FIGS. 14A-14GG and devices 511/512 in FIGS. 16A-16T. Device 511 in FIGS. 18A-181I optionally corresponds to device 511 in FIGS. 16A-16T (e.g., device 511 is a tablet computer with relatively large touch screen 1851, such as 10, 20 or 40 times the size of touch-sensitive surface 451 on remote 510).

In FIG. 18A, device 511 is displaying, in user interface 1801, touch navigation region 1852 and control panel region 1854 overlaid on touch navigation region 1852. User interface 1801 is optionally a user interface of a remote control application running on device 511, as described with reference to FIGS. 10A-10N, 14A-14GG and 16A-16T. Touch navigation region 1852 is optionally a region in which detected touch inputs cause touchpad operations, such as directional operations, to be performed at device 500 (e.g., as described with reference to FIGS. 10A-10N, 14A-14FF and 16A-16T). For example, touch navigation region 1852 optionally corresponds to touch navigation region 1652 in FIGS. 16A-16T. Control panel region 1854 includes one or more buttons (e.g., buttons 1866, 1868, 1870, 1872, 1874 and 1876) for performing control operations at device 500, such as play/pause, reverse skip, forward skip, etc. (e.g., as described with reference to FIGS. 10A-10N, 14FF-14GG and 16A-16T). For example, control panel region 1854 optionally corresponds to the control panel region in FIGS. 10A-10N, the control panel region in FIGS. 14FF-14GG and/or region 1654 in FIGS. 16A-16T.

Indicator 1836 indicates the response of device 500 to a touch input detected in touch navigation region 1852 of user interface 1801. It is understood that indicator 1836 is illustrated for ease of description, in some embodiments indicator 1836 is displayed on the display in user interface 1802 in some embodiments indicator 1836 is not displayed on the display in user interface 1802.

As described above, touch inputs detected anywhere in touch navigation region 1852 optionally cause performance of one or more touchpad operations at device 500. For example, in FIG. 18B, a left to right swipe of contact 1803 is detected in the middle region of touch navigation region 1852. In response, forward scrubbing (e.g., forward skipping in accordance with the movement of contact 1803) of "Thriller" is performed at device 500, as shown in indicator 1836. In some embodiments, the indicator includes moving a progress indicator along a scrubbing bar that indicates current progress through video and/or audio content, or displaying an image that corresponds to a current playback position for visual content such as a video or television show. Similarly, the same left to right swipe of contact 1803 is detected in FIG. 18C, but this time in the lower-right region of touch navigation region 1852. Despite the different location at which the swipe input is detected in touch navigation region 1852, device 500 responds in the same way it did in FIG. 18B by scrubbing forward through "Thriller" in accordance with the movement of contact 1803.

Figure 18B:
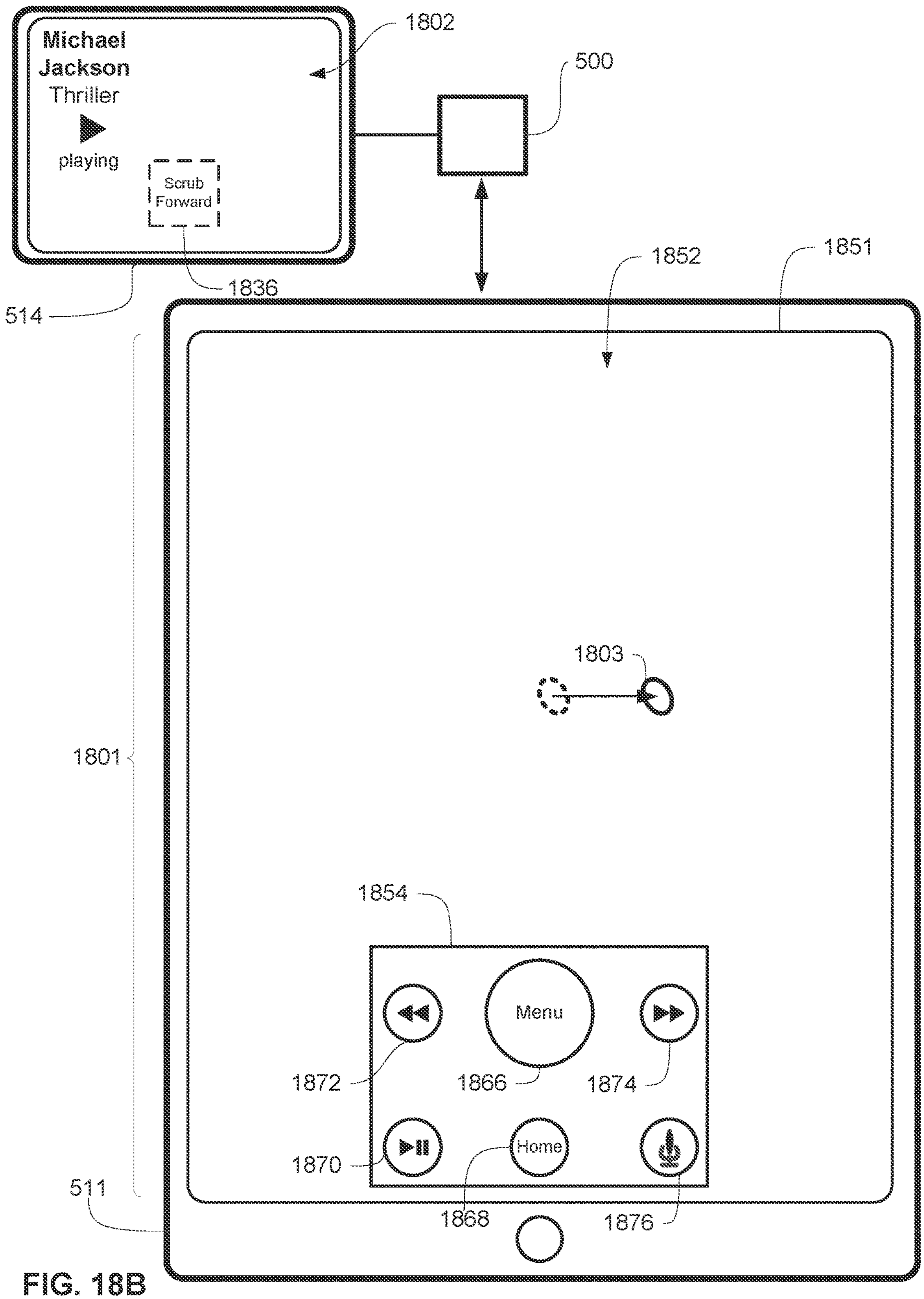

As described above, touch inputs detected in control panel region 1854 optionally cause performance of one or more control operations at device 500. For example, in FIG. 18D, contact 1803 (e.g., a tap) is detected at a location in user interface 1801 at which button 1870 (play/pause button) in control panel 1854 is displayed. In response to the detection of contact 1803 in FIG. 18D, device 500 pauses "Thriller", as shown in FIG. 18E.

In some embodiments, control panel 1854 is movable within user interface 1801, and any part of touch navigation region 1852 that is exposed as a result of moving control panel 1854 is usable to provide touchpad inputs to device 500. For example, in FIG. 18F, touchdown of contact 1803 is detected in a portion of control panel 1854 that does not include buttons 1866, 1868, 1870, 1872, 1874 or 1876. If contact 1803 is stationary or substantially stationary (e.g., moves less than 1 mm, 2 mm or 3 mm) for longer than a time threshold (e.g., 0.1, 0.2 or 0.4 seconds), device 511 initiates a control panel movement mode, and control panel 1854 changes appearance (e.g., becomes enlarged, changes shading, etc.), as shown in FIG. 18G. Subsequent movement of contact 1803 optionally moves control panel 1854 within user interface 1801 in accordance with such movement. For example, in FIG. 18H, contact 1803 has moved up and to the right, and control panel 1854 is correspondingly moved up and to the right. In FIG. 18I, upon liftoff of contact 1803 from control panel 1854, device 511 transitions out of the control panel movement mode, and the control panel 1854 remains at the position in user interface 1801 at which it was located when the liftoff of contact 1803 was detected.

Subsequent to moving control panel 1854 as described in FIGS. 18F-18I, touchdown of contact 1803 is detected at the location in user interface 1801 at which button 1870 was located prior to control panel 1854 having been moved (e.g., the location at which contact 1803 was detected in FIG. 18D), as shown in FIG. 18I. This time, because control panel 1854 has moved, contact 1803 is detected in touch navigation region 1852 that was exposed by the movement of control panel 1854. Therefore, rather than causing performance of a control operation (e.g., as was performed in FIG. 18D), detection of contact 1803 optionally causes performance of a touchpad operation. For example, as contact 1803 moves to the left, as shown in FIG. 18J, a backward scrubbing operation in performed through "Thriller" in accordance with the right to left movement of contact 1803, as shown by indicator 1836.

In FIGS. 18F-18I, device 511 allowed control panel 1854 to be moved anywhere within user interface 1801. However, in some embodiments, device 511 only allows control panel to be moved to one of a plurality of predefined locations in user interface 1801. For example, in FIGS. 18K-18L, contact 1803 moves control panel 1854 in the same manner that it did in FIGS. 18F-18H. In FIG. 18M, liftoff of contact 1803 is detected. In FIG. 18N, upon liftoff of contact 1803, device 511 transitions out of the control panel movement mode, and control panel 1854, rather than remaining at the location at which it was located when liftoff of contact 1803 was detected, snaps to the closest predefined region in user interface 1801 at which control panel 1854 is allowed to be located. For example, in FIG. 18N, control panel 1854 snaps to a lower-right region of user interface 1801 upon detecting liftoff of contact 1803, because the lower-right region of user interface 1801 is closer to the current location of control panel 1854 than is a different predefined region of user interface 1801 (e.g., the lower-middle region of user interface 1801 at which control panel 1854 was originally located in FIG. 18K). Device 511 optionally similarly snaps control panel 1854 to other predefined regions, if any, of user interface 1801 at which control panel 1854 is allowed to be located in response to detecting the end of the control panel movement operation (e.g., detecting the liftoff of contact 1803 that is part of the movement operation).

In some embodiments, whether device 511 allows control panel 1854 to be moved within user interface 1801 depends on whether the size of user interface 1801 is greater than or less than a size threshold (e.g., greater than or less than four, eight or fifteen times the size of control panel 1854 in user interface 1801. In some embodiments, the size used by device 511 for determining whether movement of control panel 1854 is allowed is whether the width of user interface 1801 is greater than a threshold width, such as two, four or eight times the width of control panel 1854). For example, in FIG. 18O, device 511 has been rotated into a landscape orientation, though user interface 1801 continues to be displayed in substantially all of touch screen 1851. In FIGS. 18O-18P, device 511 allows control panel 1854 to be moved (e.g., as described with reference to FIGS. 18F-18N). In FIG. 18Q, device 511 has transitioned from operating in a non-multitasking configuration in FIG. 18P to operating in a multitasking configuration in FIG. 18Q in which user interface 1801 of the remote control application is displayed on touch screen 1851 concurrently with user interface 1805 of another application running on device 511. As such, the size of user interface 1801 in FIG. 18Q is smaller than (e.g., approximately half of) the size of user interface 1801 in FIGS. 18O-18P. However, the size of user interface 1801 in FIG. 18Q is optionally still sufficiently large (e.g., greater than the above-described size threshold) that device 511 still allows control panel 1854 to be moved within user interface 1801, as shown in FIG. 18R.

Figure 18C:
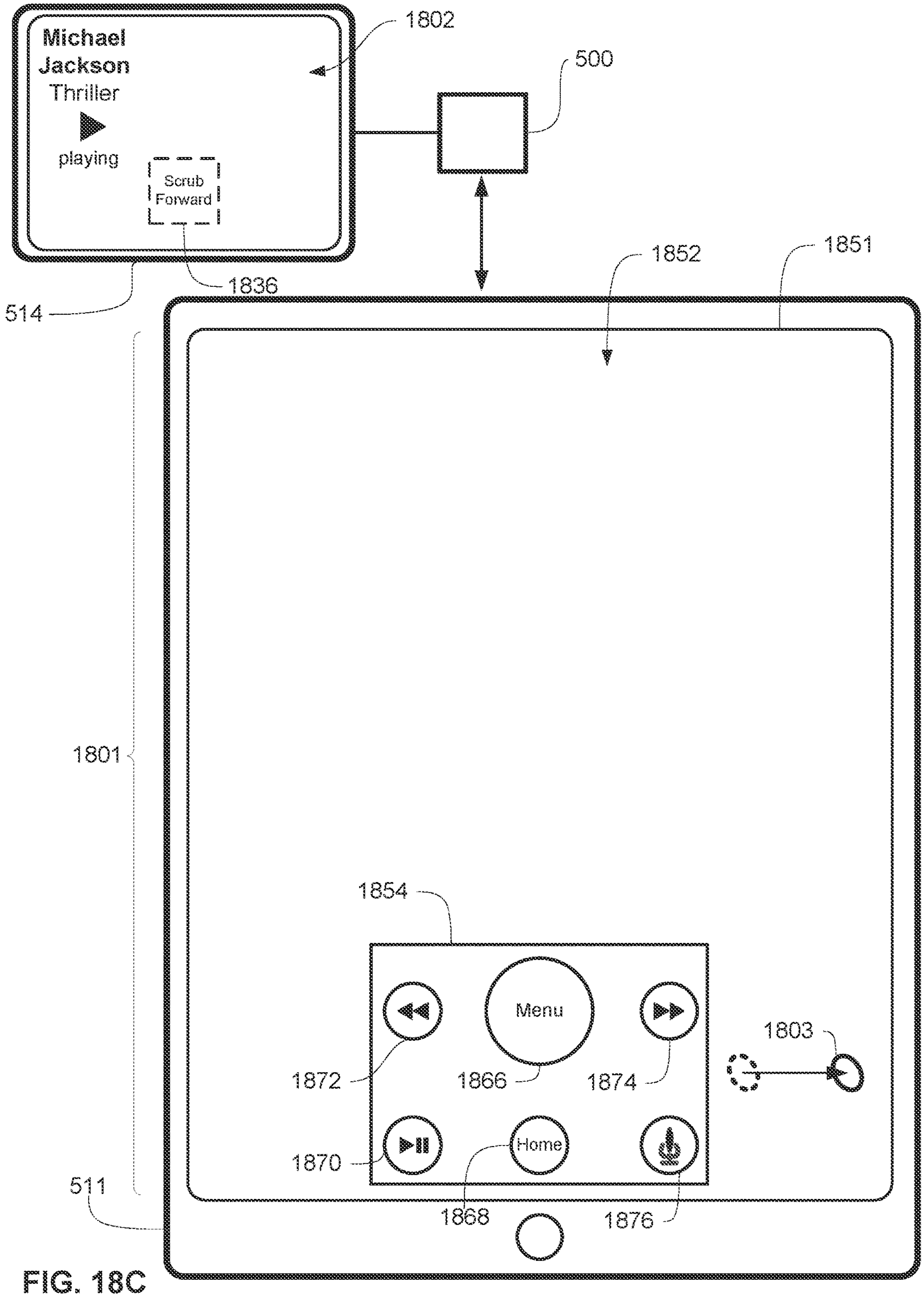
Figure 18D:
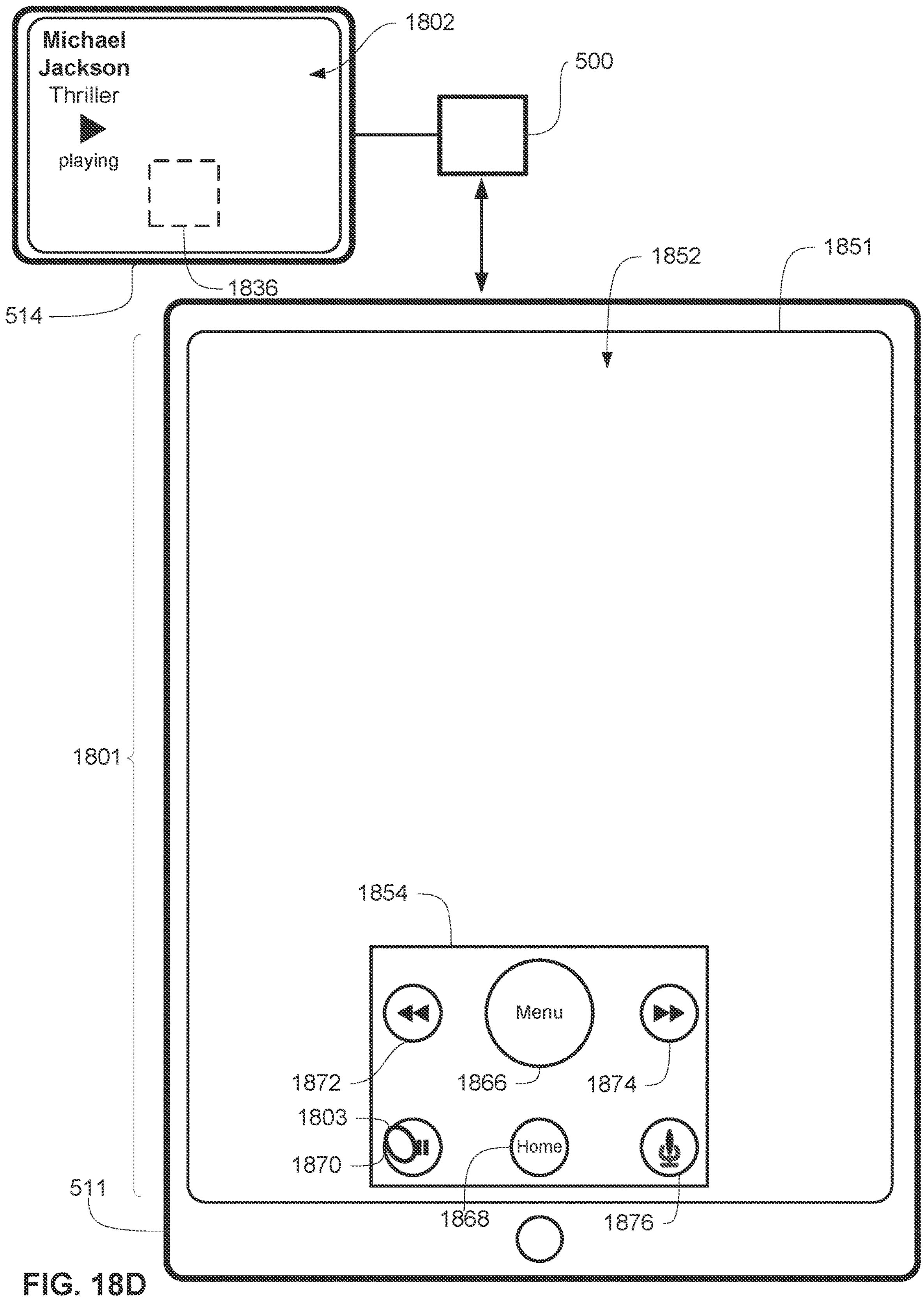
Figure 18E:
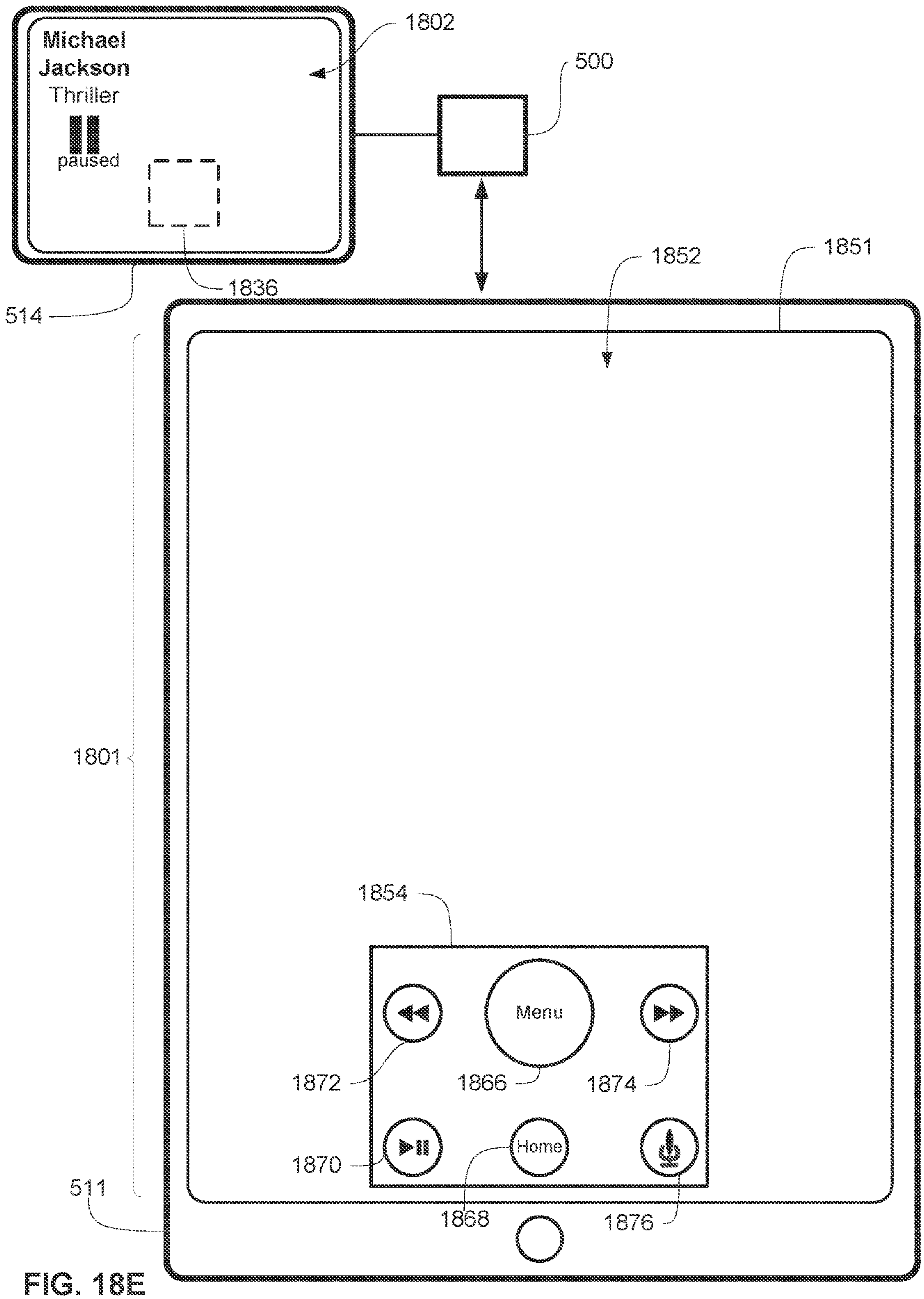
Figure 18F:
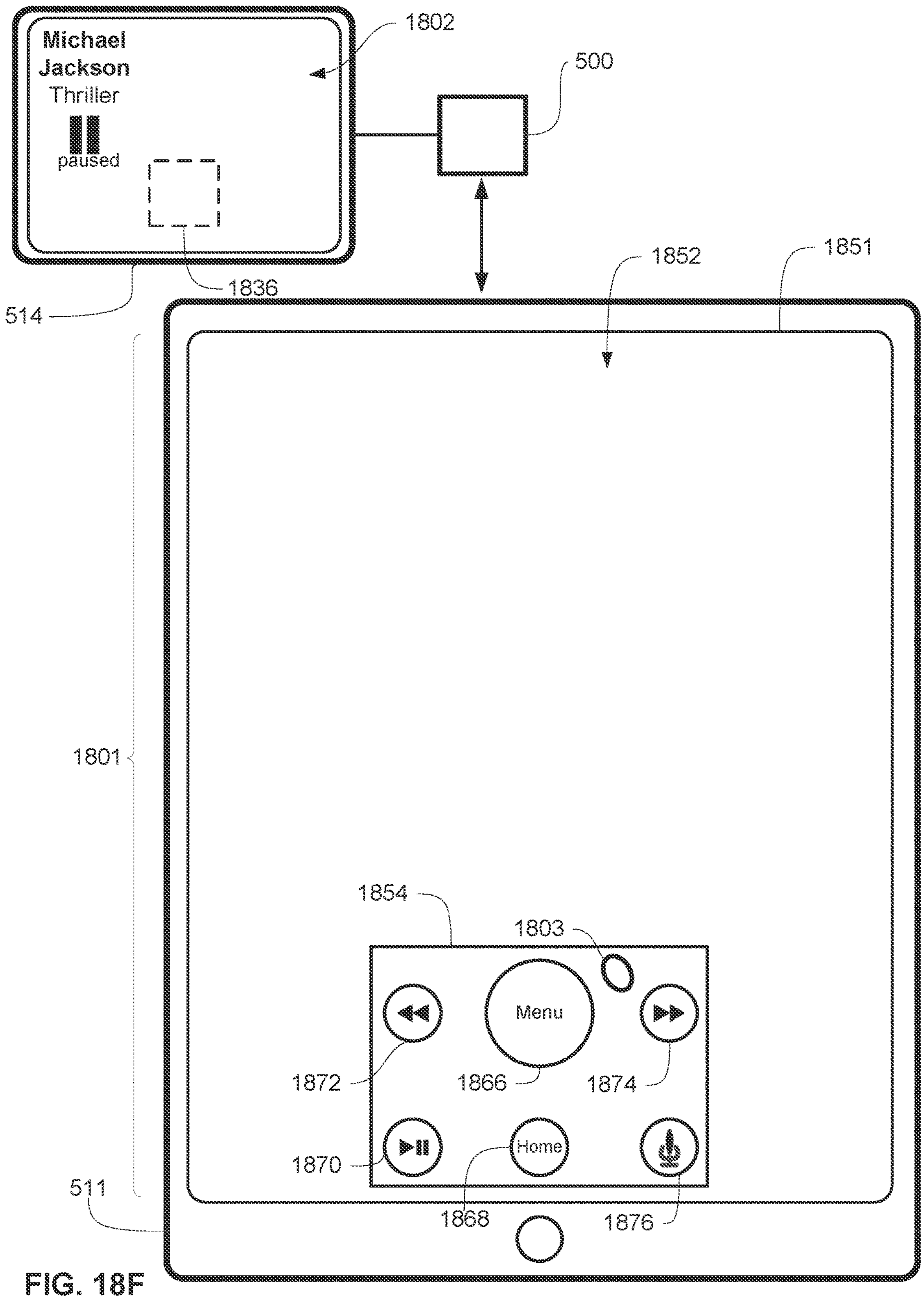
Figure 18G:
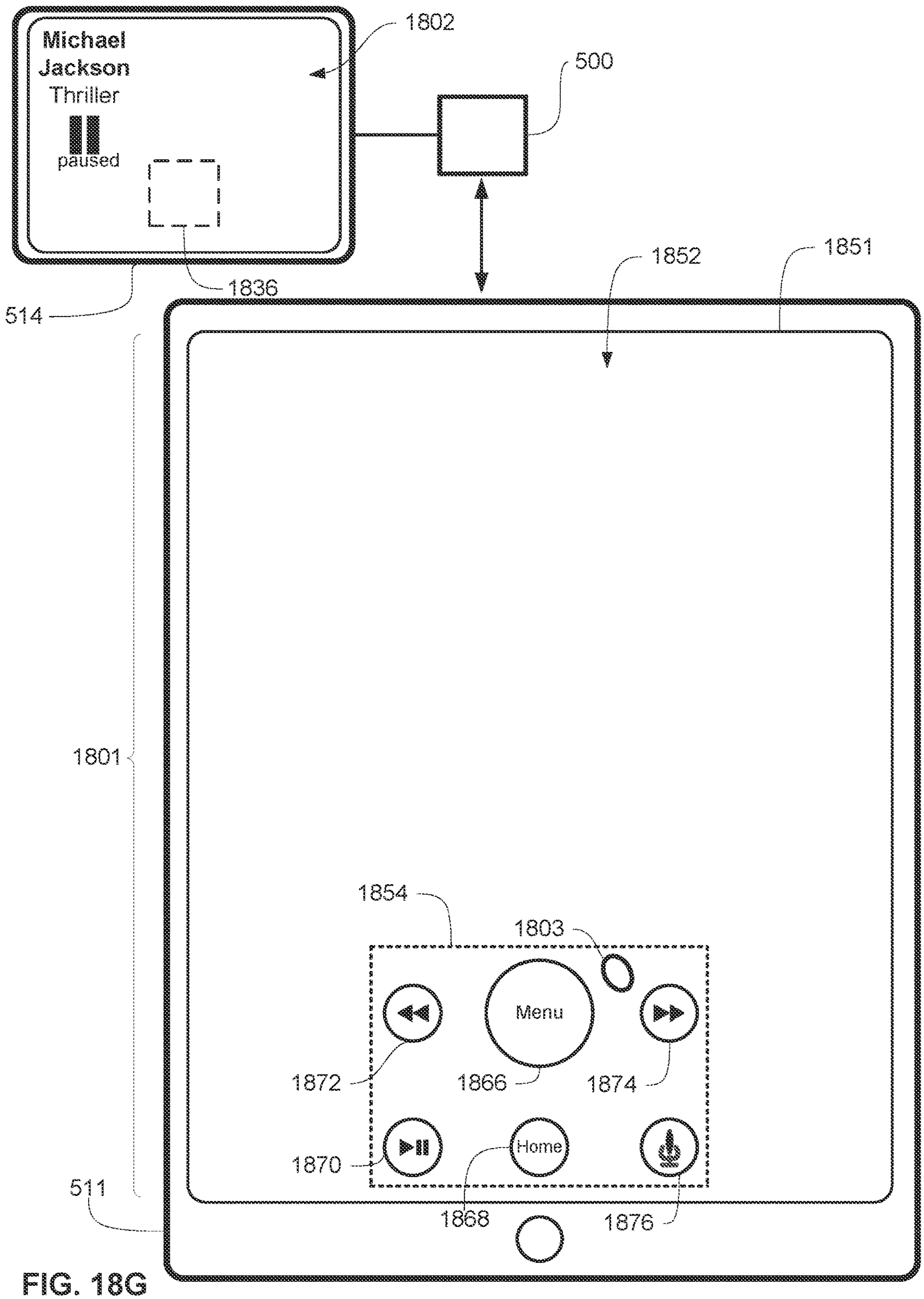
Figure 18H:
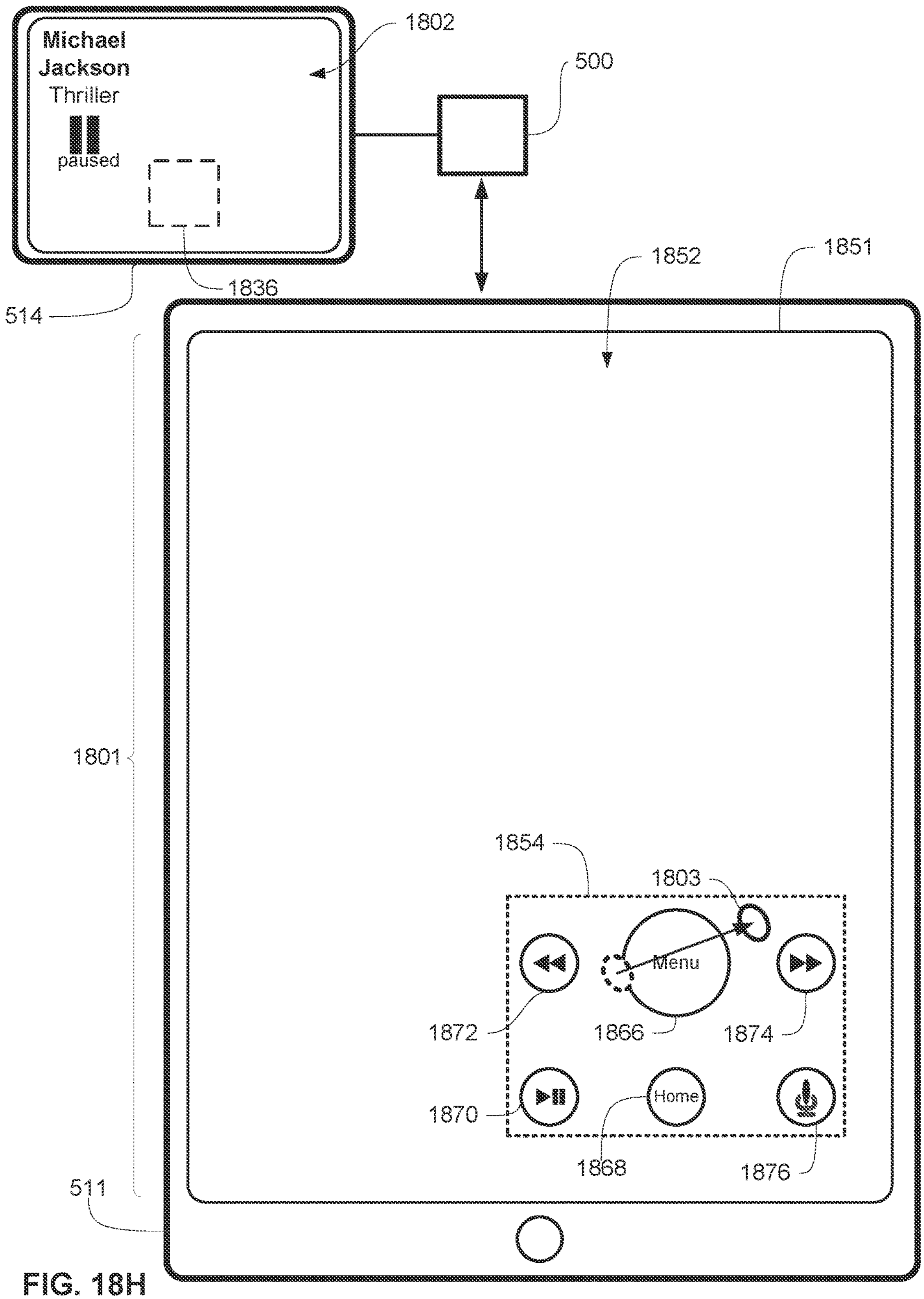
Figure 18I:
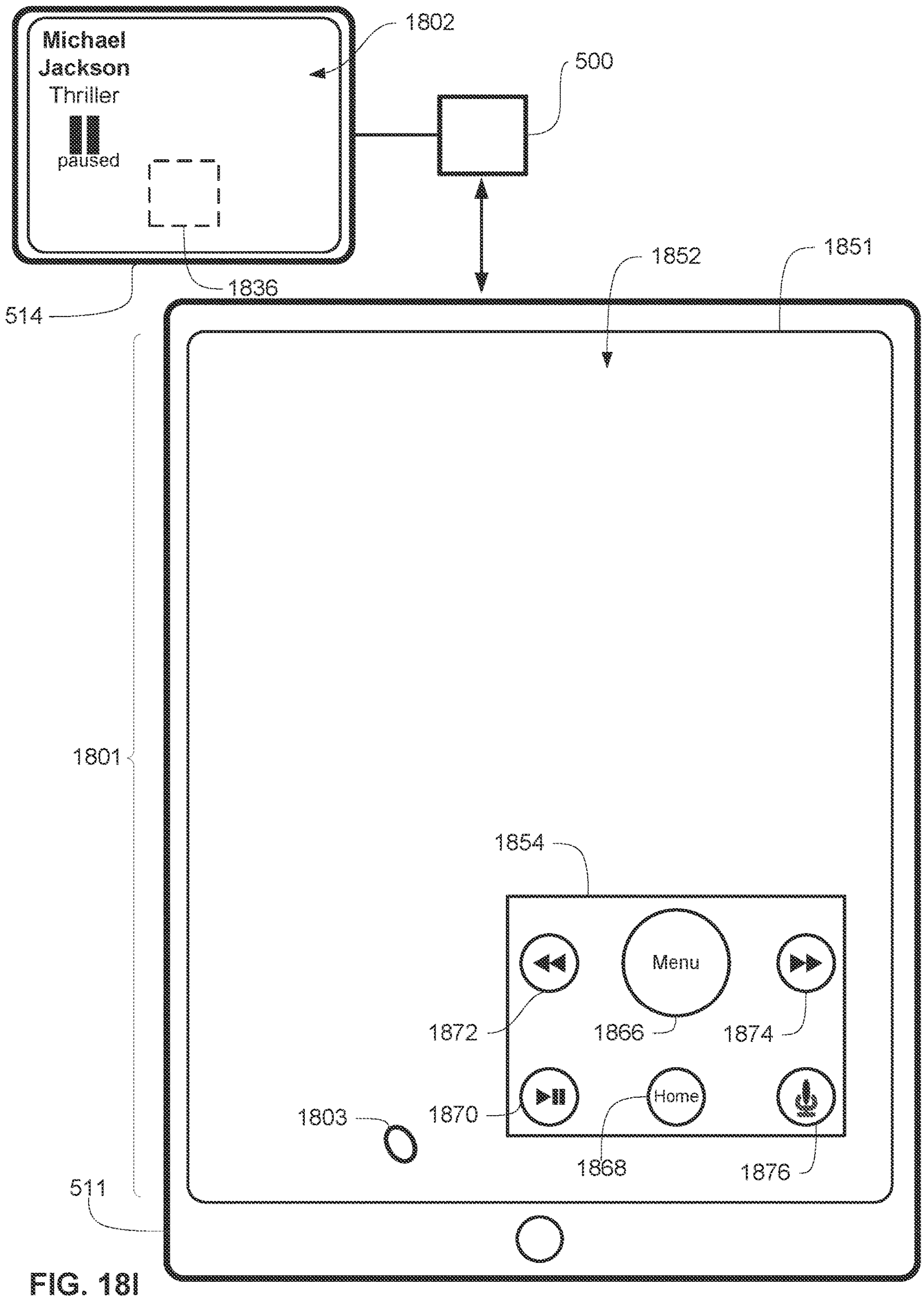
Figure 18J:
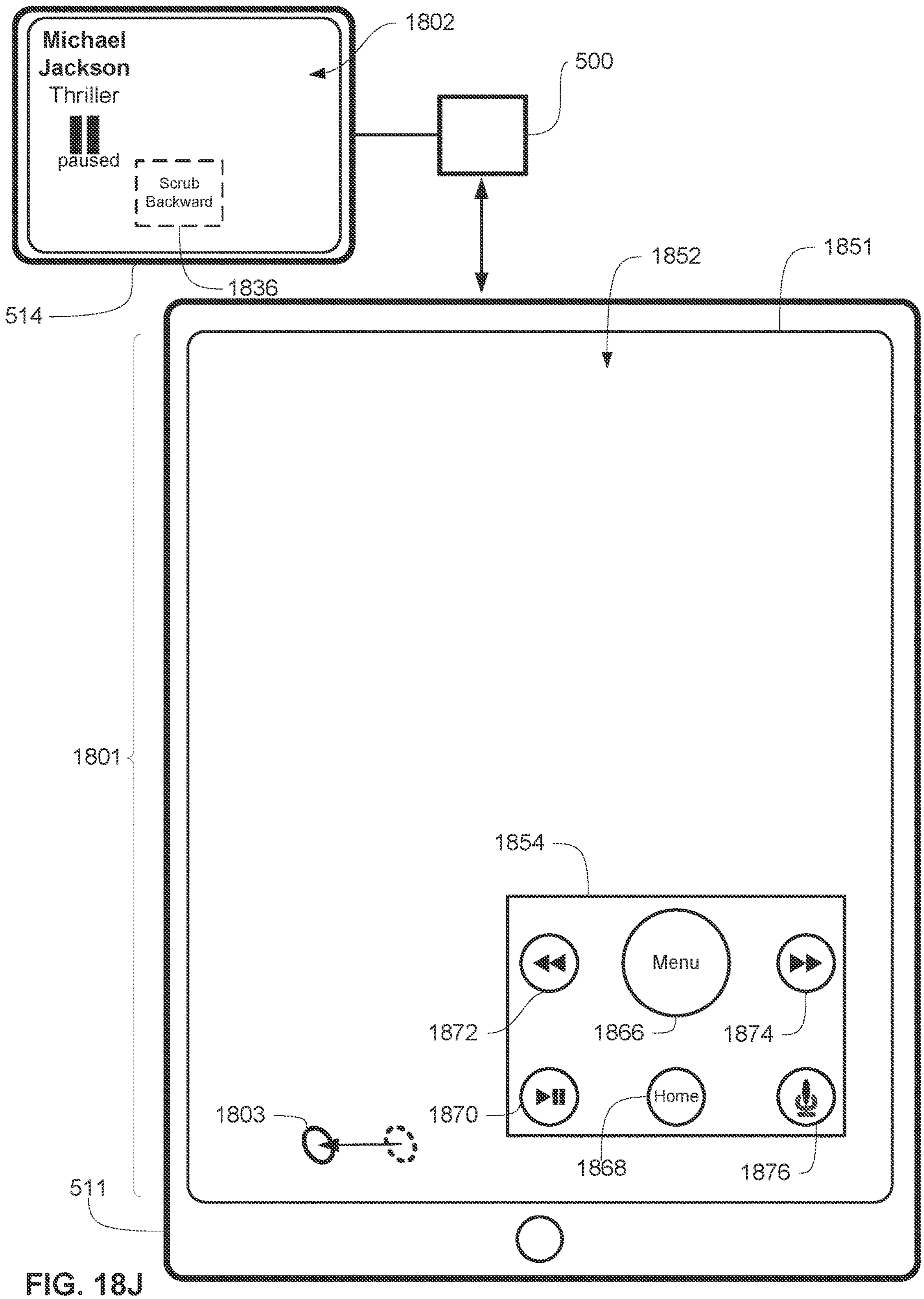
Figure 18K:
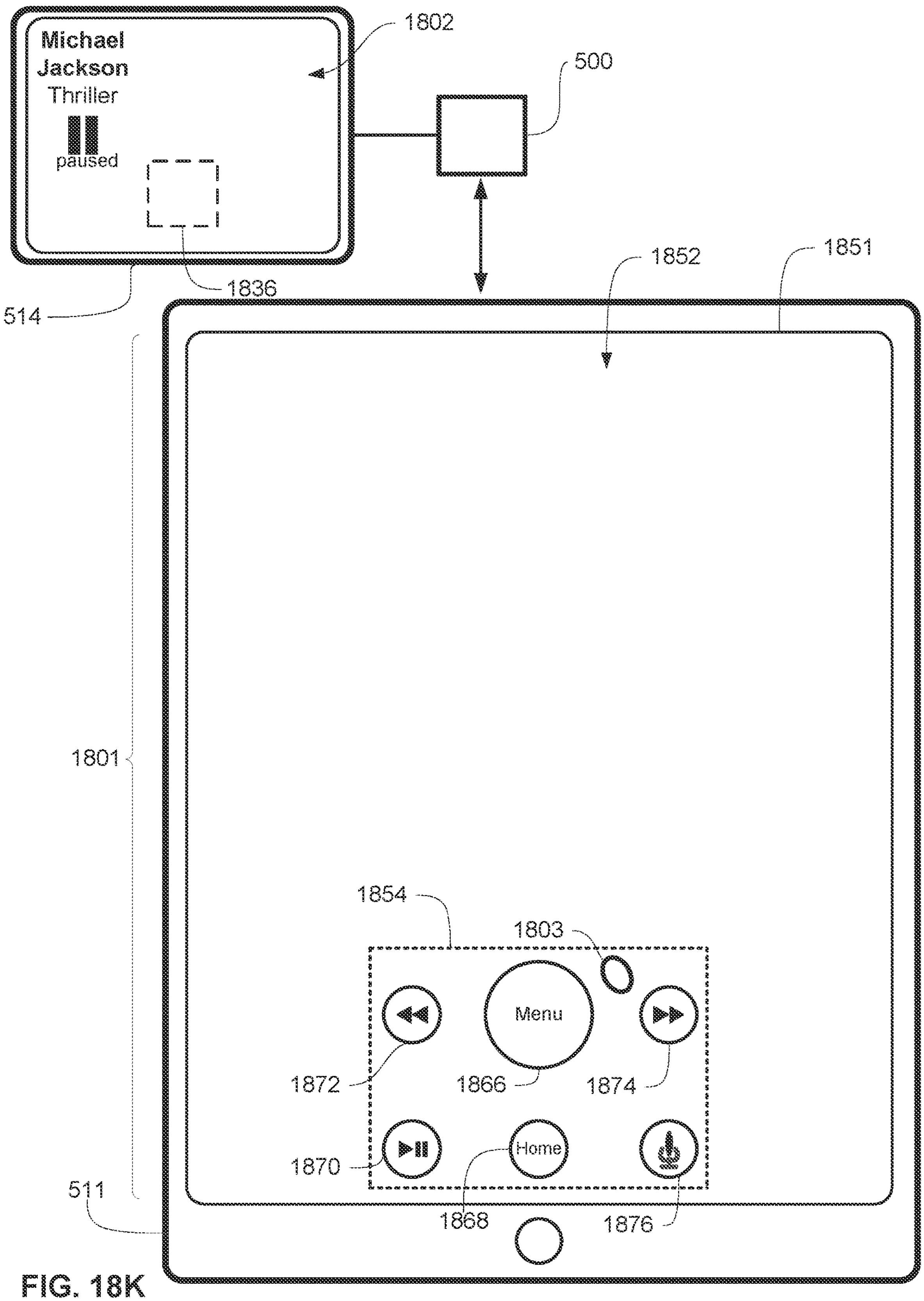
Figure 18L:
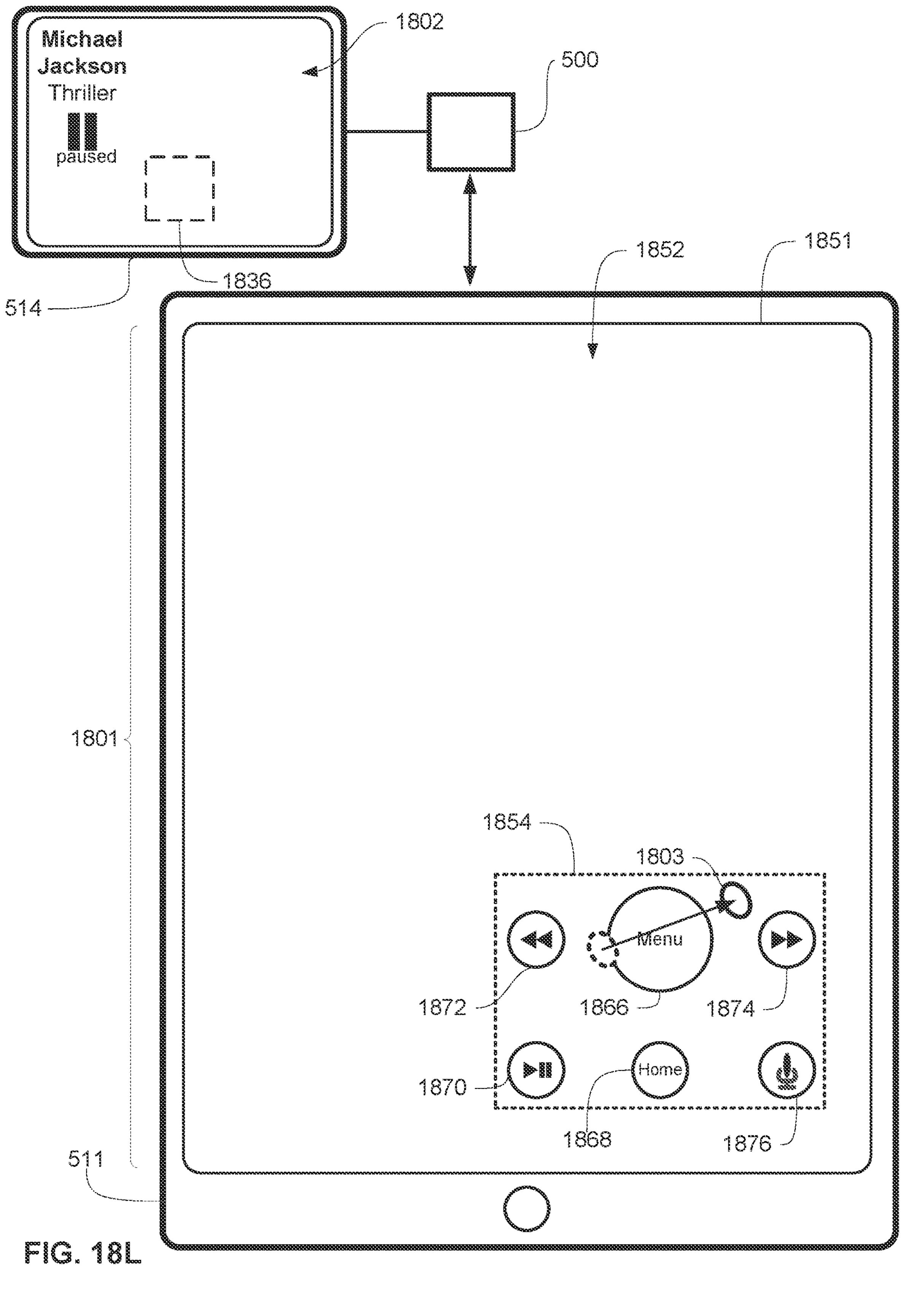
Figure 18M:
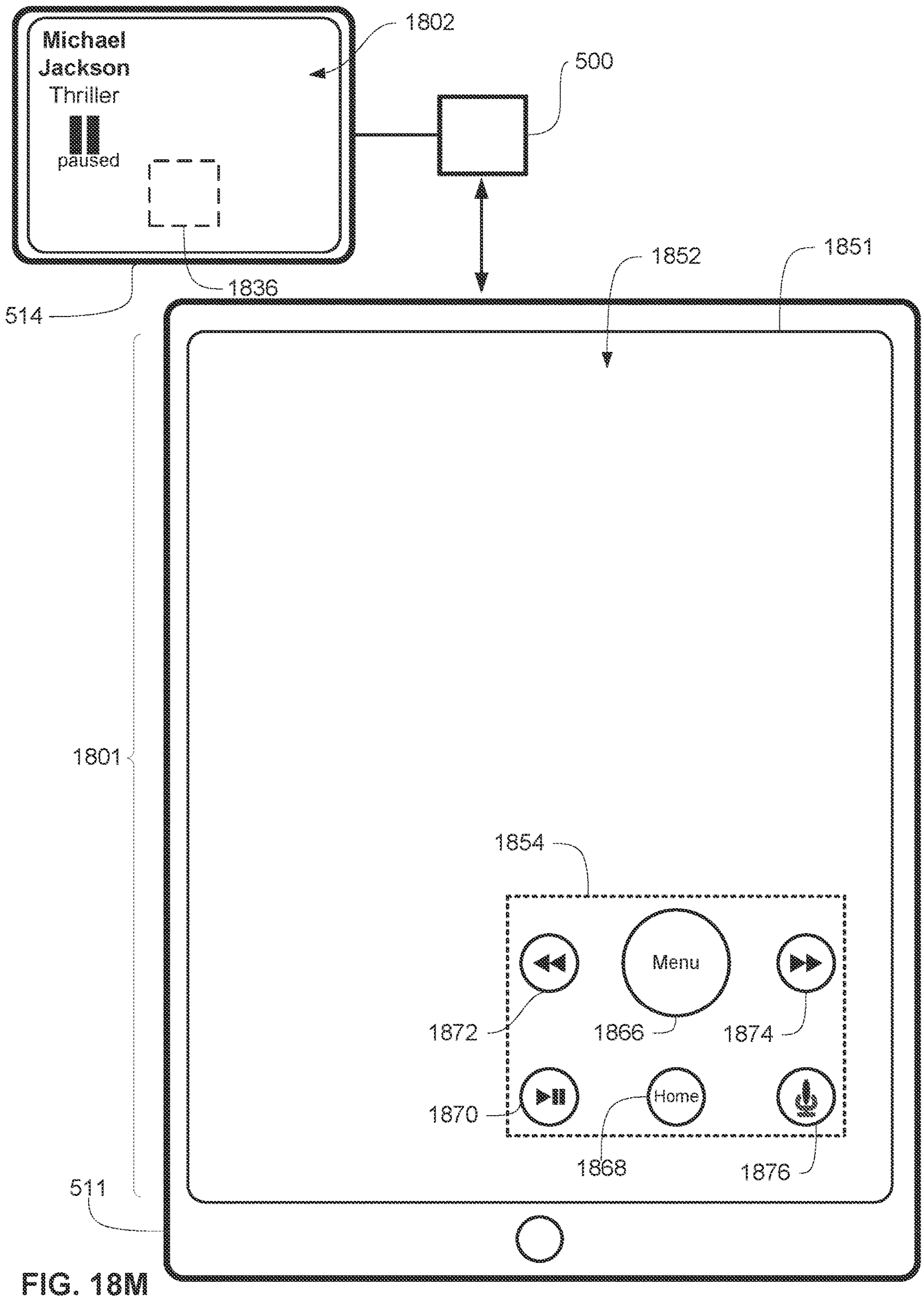
Figure 18N:
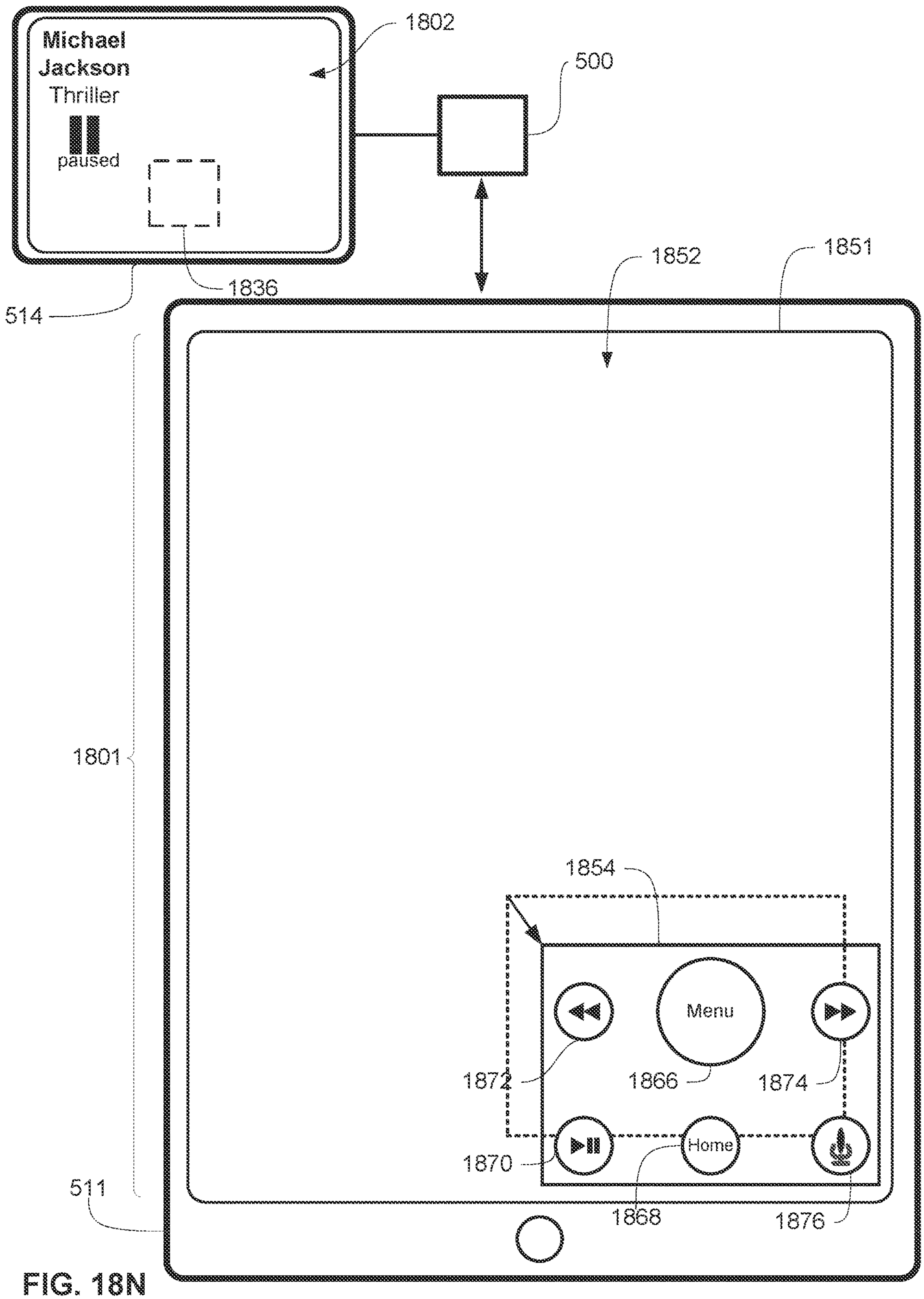
Figure 18O:
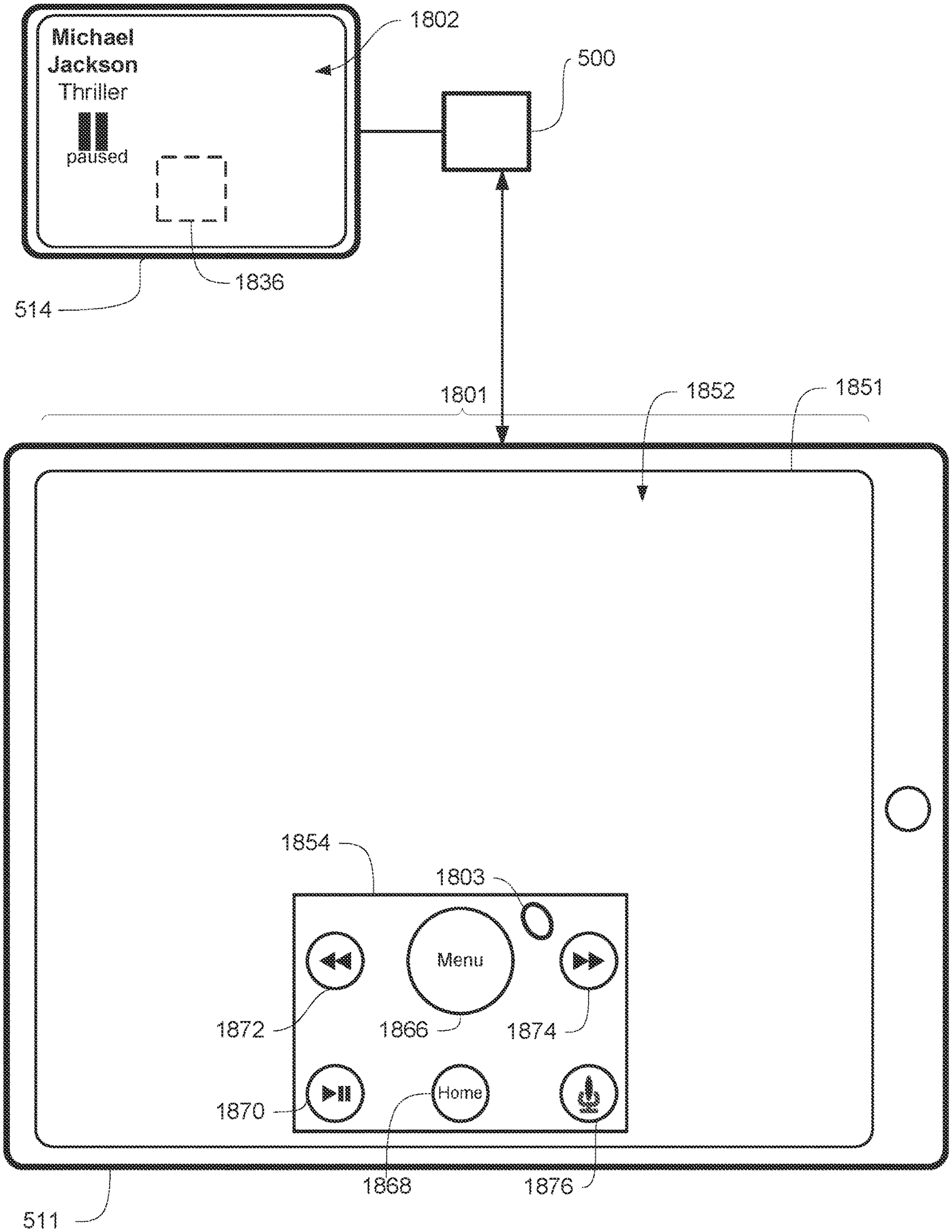
Figure 18P:
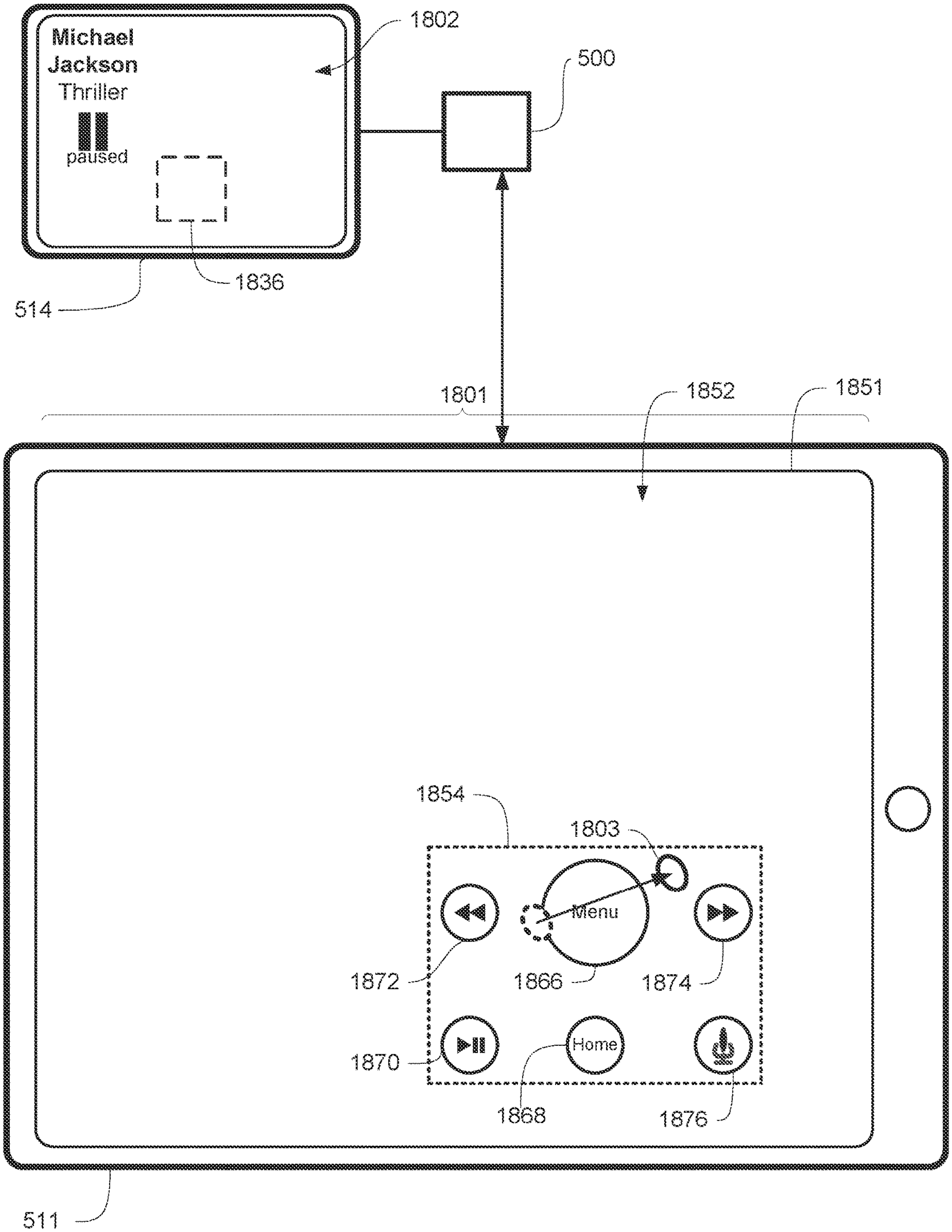
Figure 18Q:
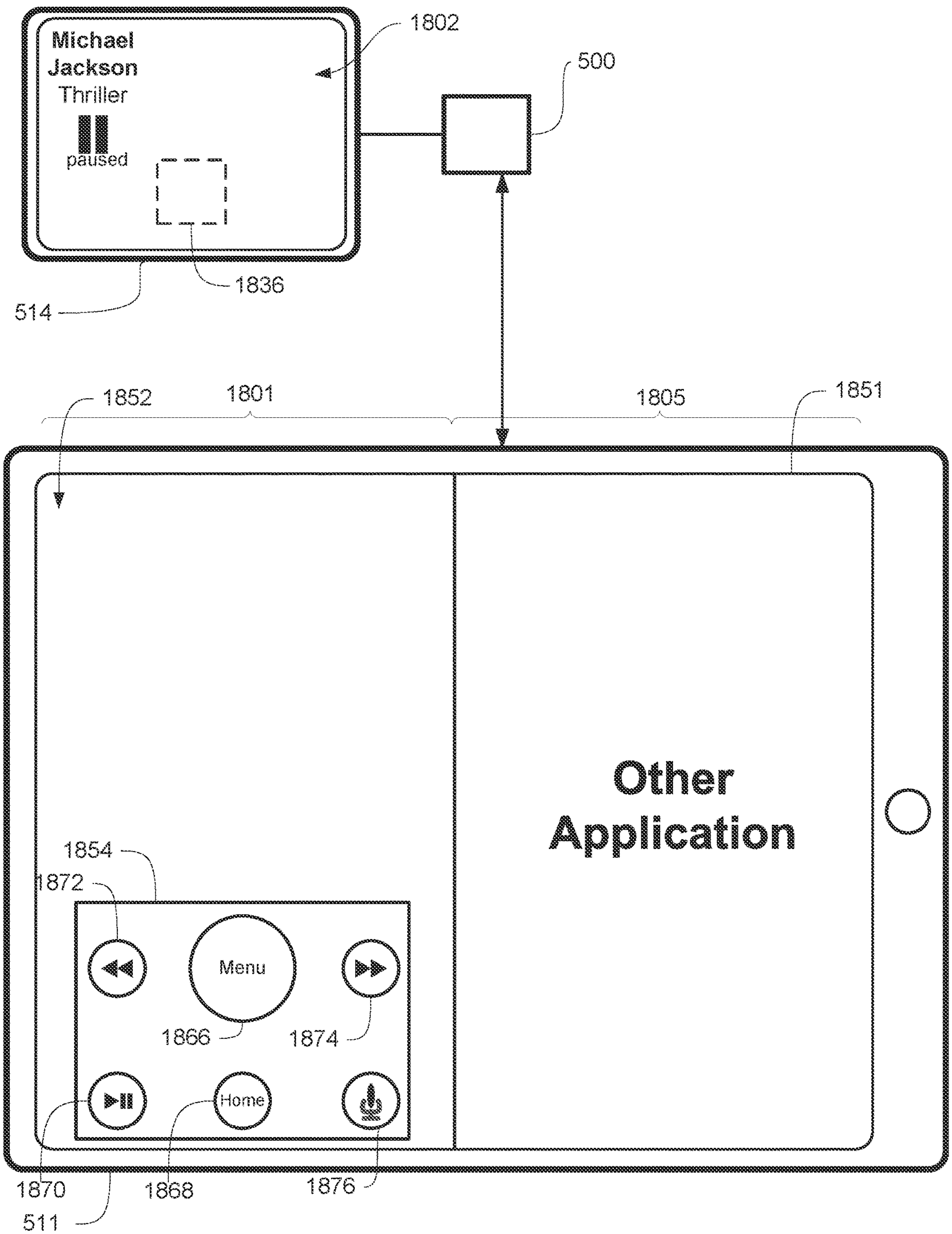
Figure 18R:
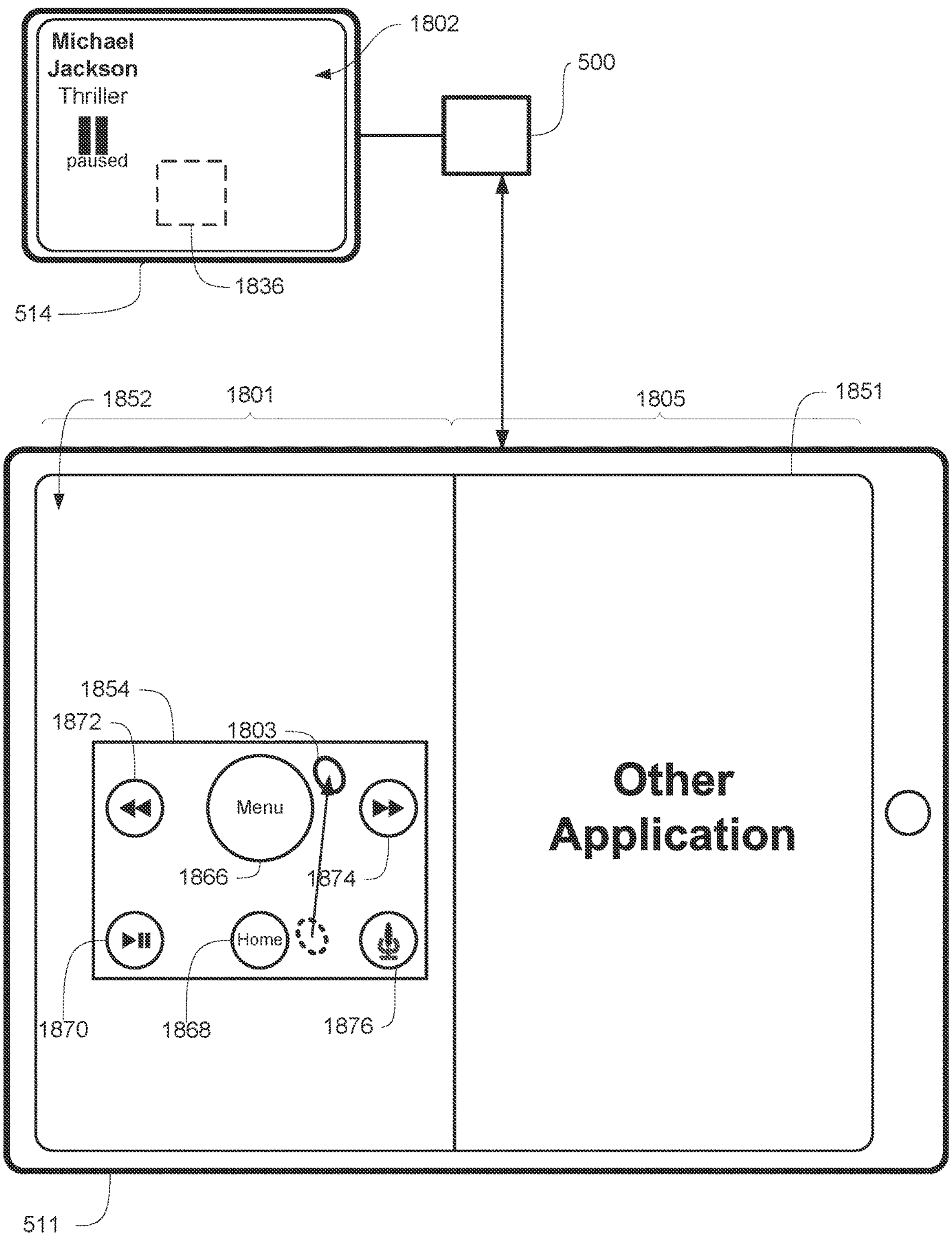
Figure 18S:
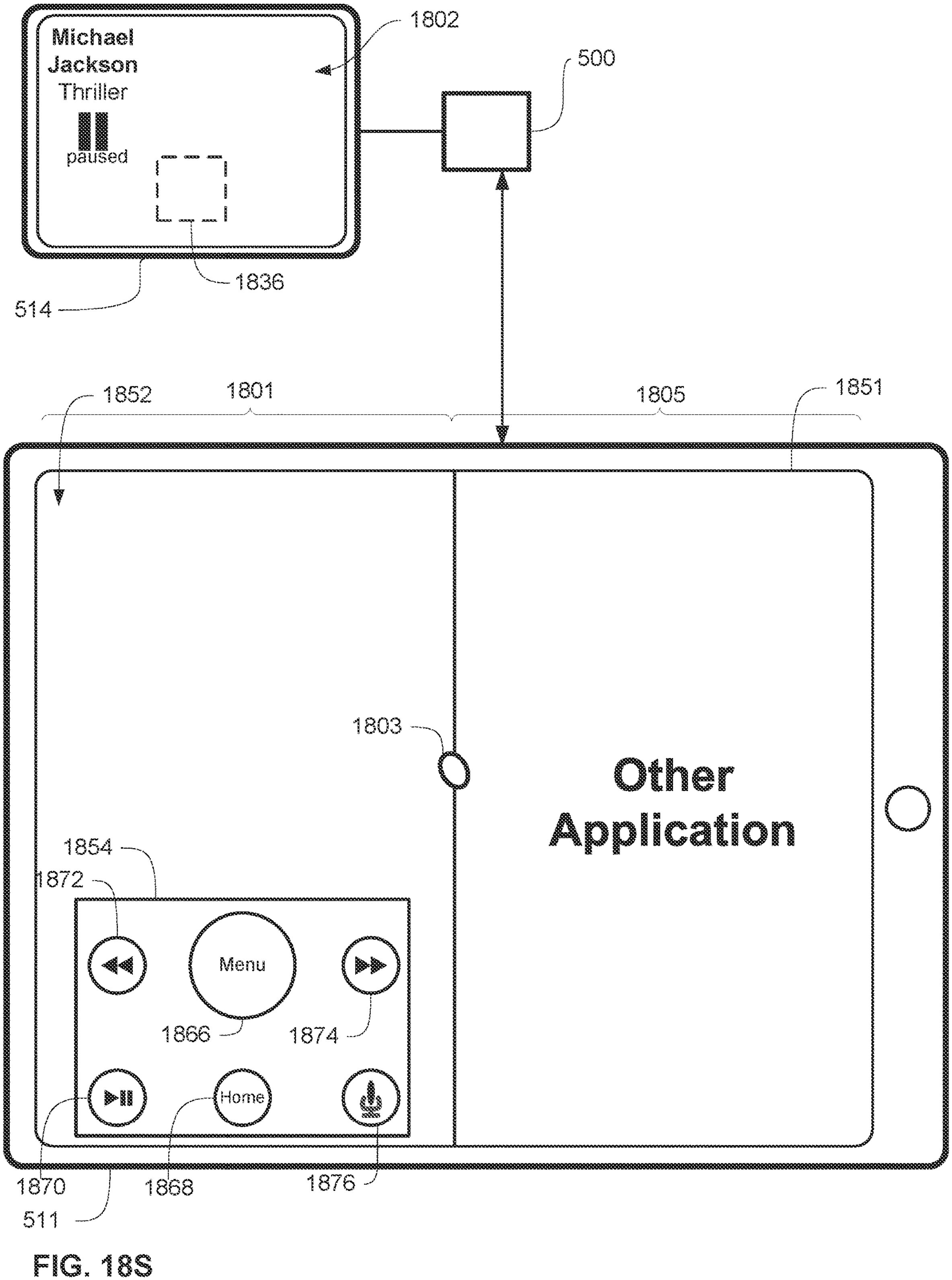
Figure 18T:
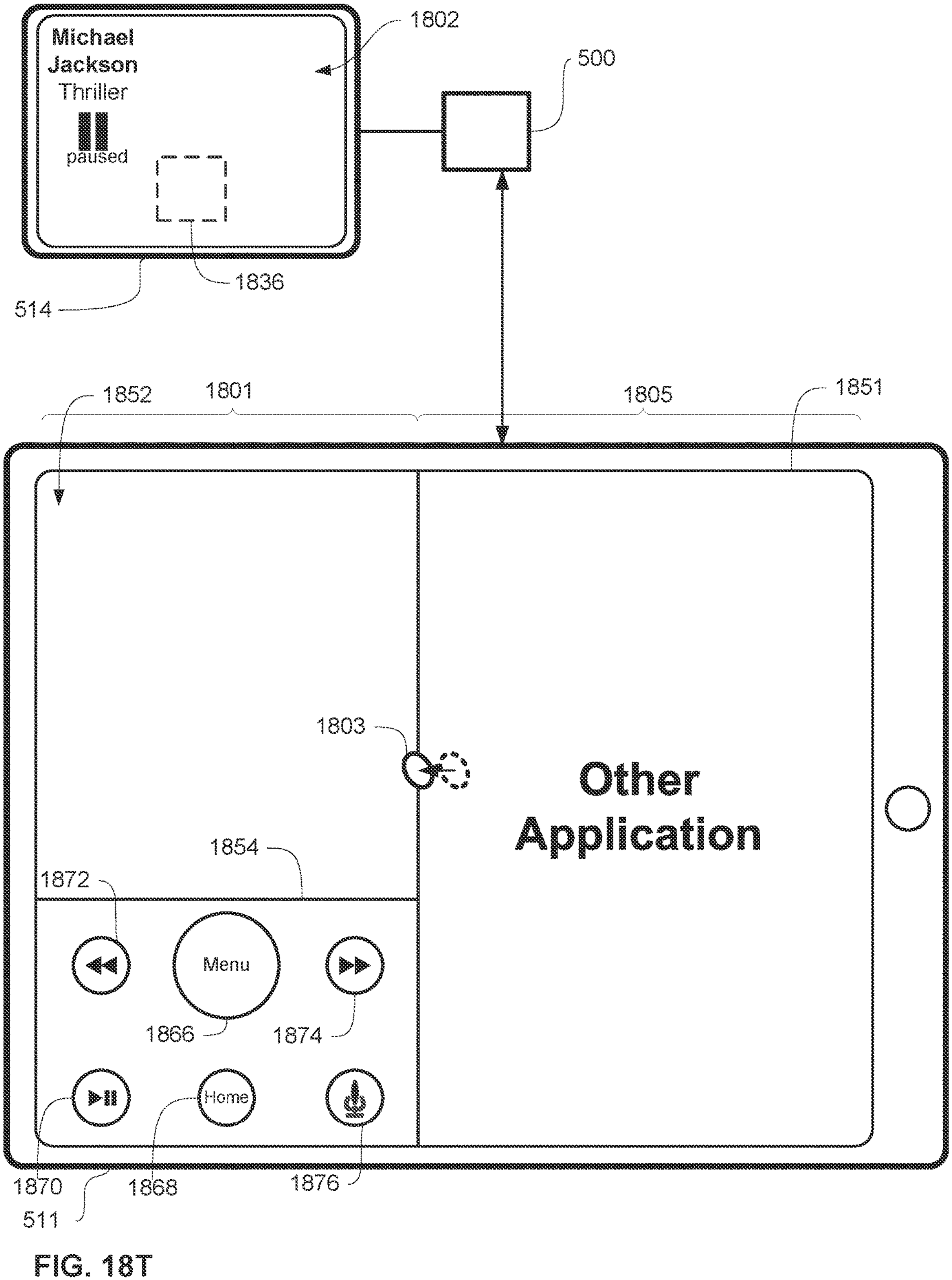
Figure 18U:
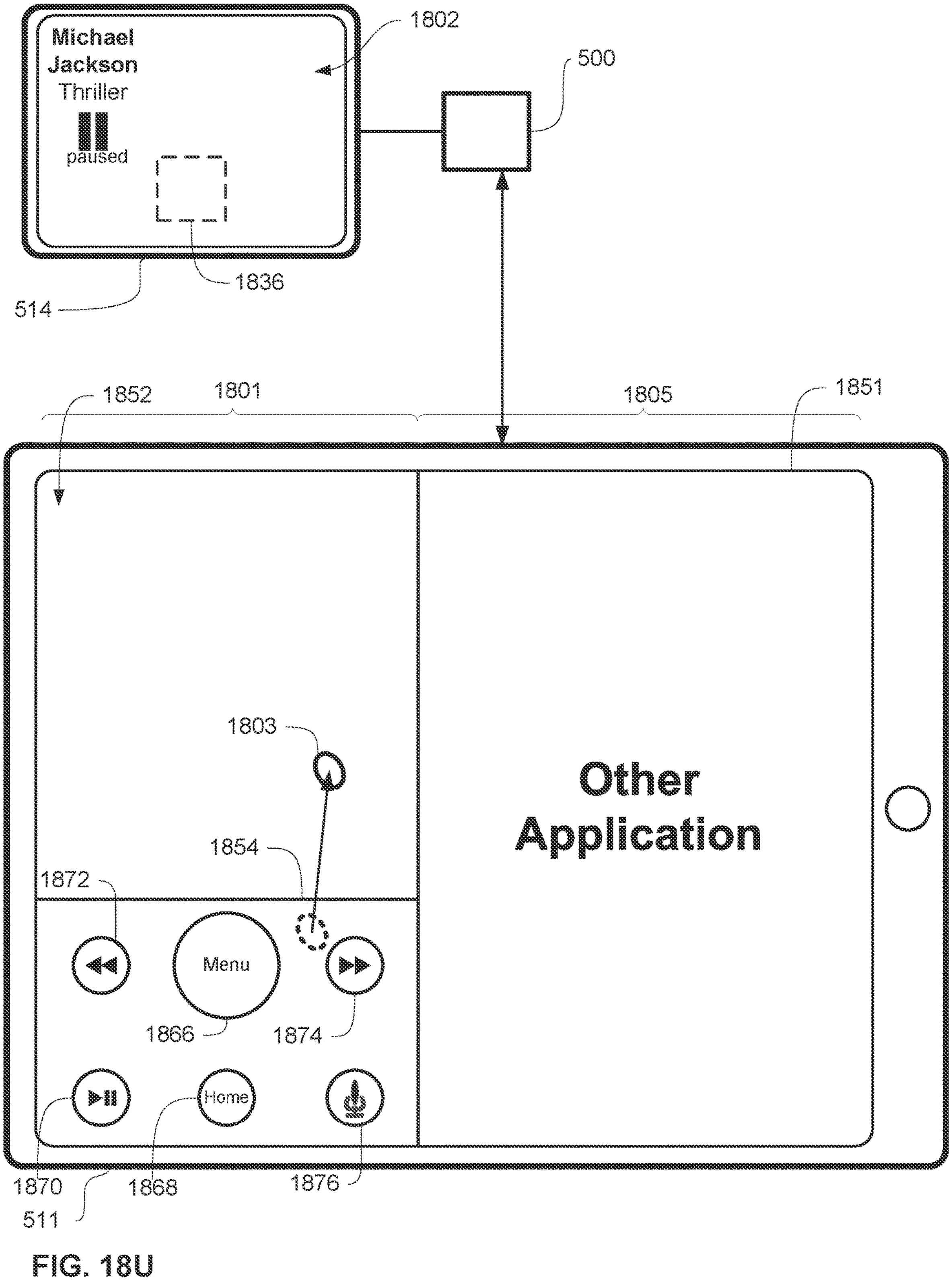

In FIGS. 18S-18T, contact 1803 is detected at the displayed boundary between user interface 1801 and 1805, and movement of contact 1803 to the left causes the size of user interface 1801 to be reduced while the size of user interface 1805 is increased. In particular, the size of user interface 1801 has optionally been reduced to less than the above-described threshold size required for device 511 to allow movement of control panel 1854 within user interface 1801. As such, as shown in FIG. 18U, an input for moving control panel 1854 including movement of contact 1803 is detected, but device 511 does not allow control panel to be moved. In this way, device 511 optionally allows or disallows movement of control panel 1854 within user interface 1801 based on the size of user interface 1801.

Figure 18V:
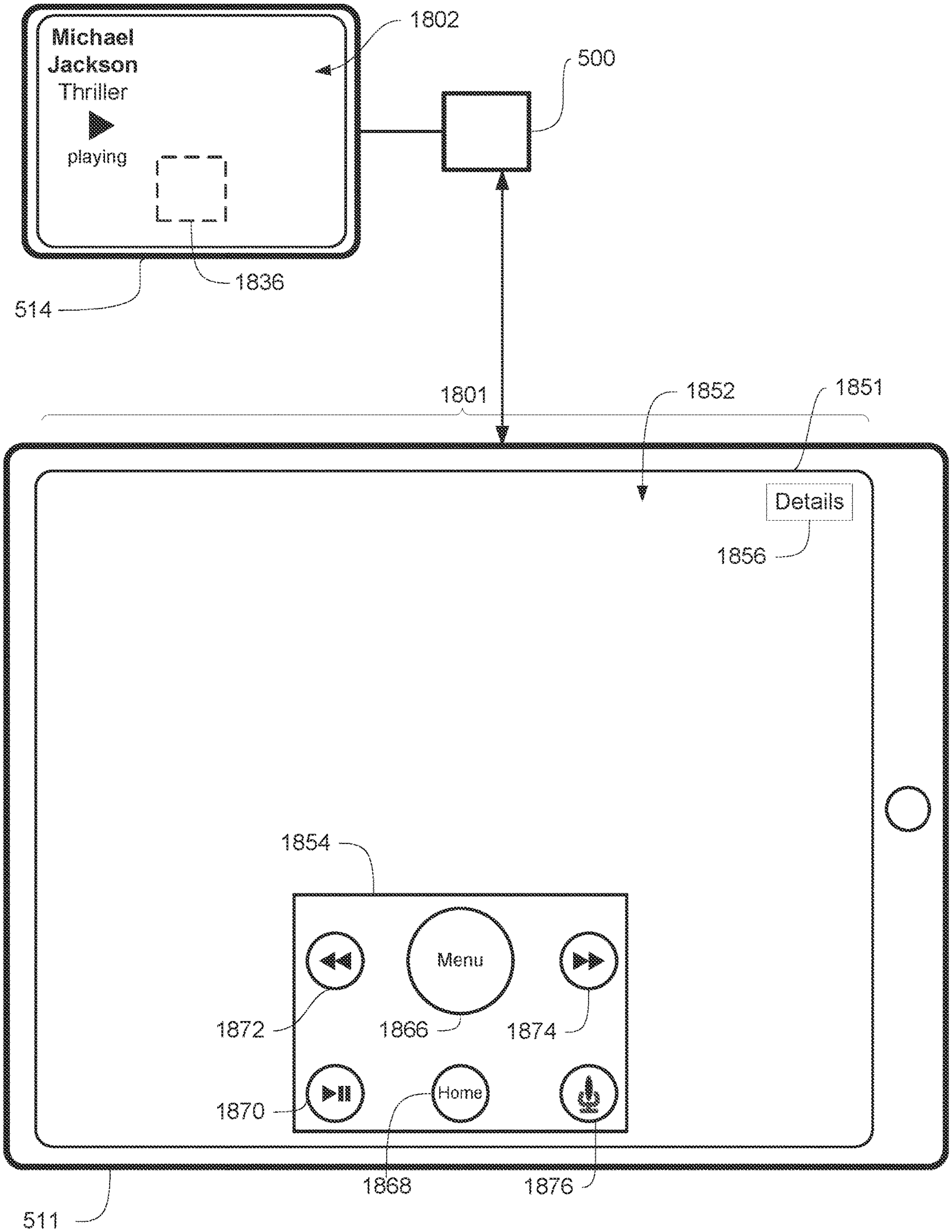
Figure 18W:
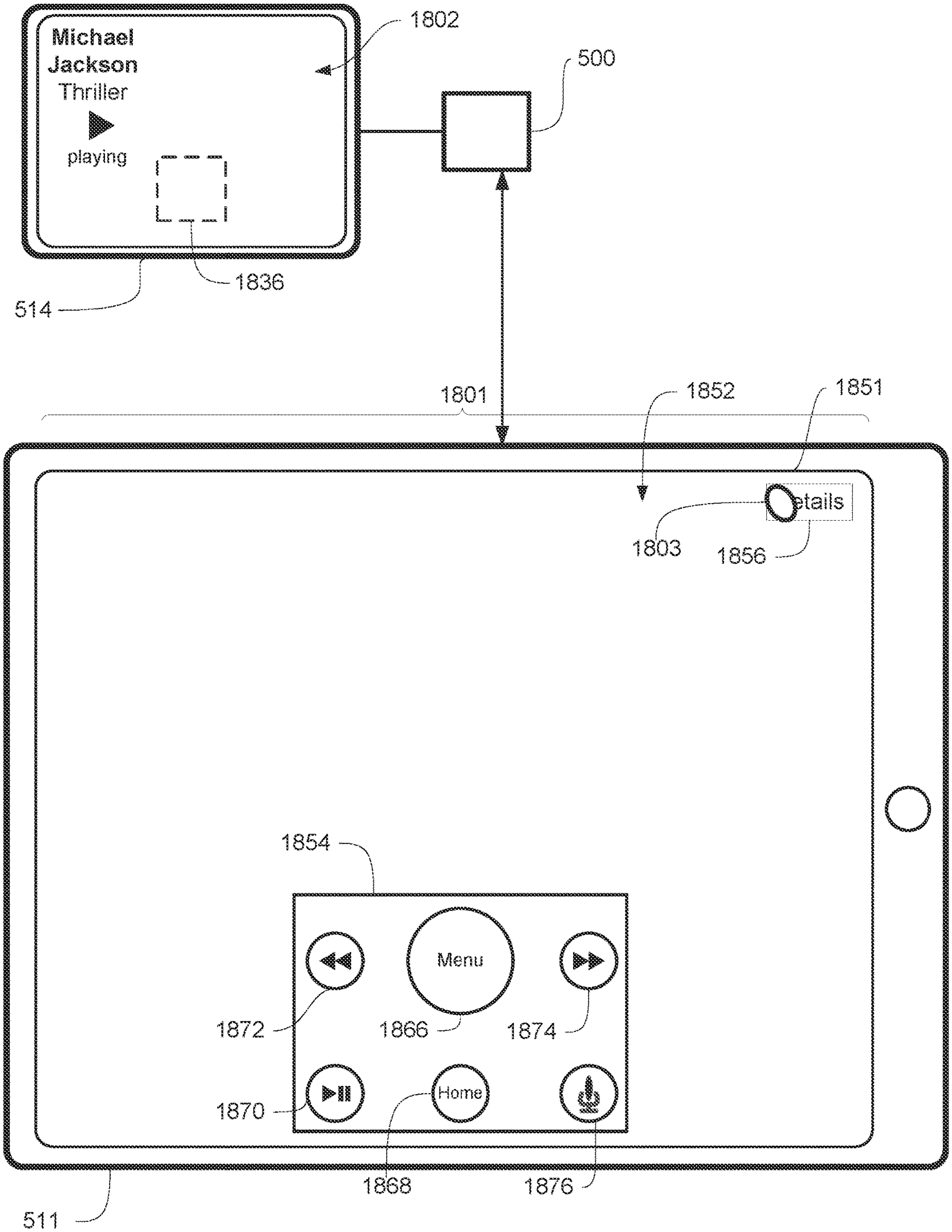
Figure 18X:
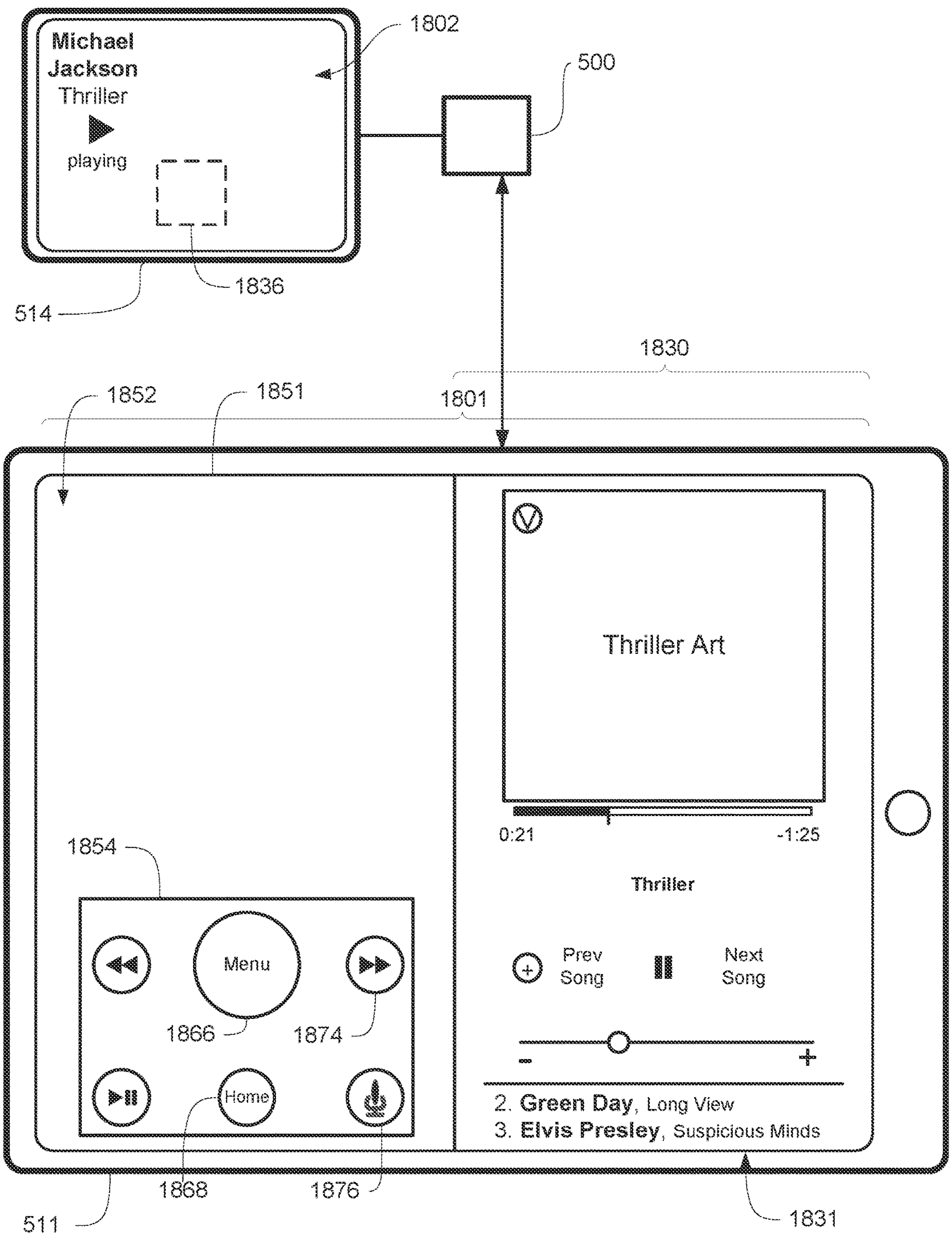

Device 511 similarly behaves differently based on the size of user interface 1801 (or, more generally, the amount of available space in user interface 1801) in other contexts. For example, in FIG. 18V, user interface 1801 includes "Details" button 1856. In FIG. 18W, contact 1803 (e.g., a tap) is detected on "Details" button 1856, which causes touch navigation region 1852 to be reduced in size, and "Now Playing" panel 1830 to be displayed concurrently with touch navigation region 1852 and control panel 1854 in user interface 1801, as shown in FIG. 18X. "Now Playing" panel 1830 optionally corresponds to panel 1038 in FIGS. 10I and 10N, and includes information about content playing on the electronic device 500 that device 511 is controlling (e.g., information about "Thriller" that is playing on device 500, as shown in FIG. 18X). For example, the "Now Playing" panel 1830 optionally includes artwork corresponding to "Thriller", playback controls for "Thriller", the title "Thriller", and a progress bar for "Thriller", among other things as described with reference to FIGS. 10I and 10N. Additionally, the "Now Playing" panel 1830 includes region 1831 in the lower part of panel 1830 that includes information about additional content items on device 500 that are in a currently-playing playlist on device 500 (e.g., artist, title and/or order). For example, in FIG. 18X, the playlist includes "Thriller" (currently playing on device 500), "Long View" (the second song on the playlist), and "Suspicious Minds" (the third song on the playlist list). Region 1831 optionally displays fewer or more content items that are coming up on the playlist of device 500 so as to provide a reference of upcoming content on device 500.

Because the display of the "Now Playing" panel 1830 in user interface 1801 has reduced the size of touch navigation region 1852, and thus the area in which control panel 1854 is able to be moved, to optionally less than the above-described threshold size required for moving control panel 1854, device 511 optionally does not allow control panel 1854 to be moved in the example of FIG. 18X. For example, in FIG. 18Y, input for moving control panel 1854 including contact 1803 and movement of contact 1803 is detected, but device 511 does not allow control panel 1854 to be moved.

In some embodiments, whether "Now Playing" panel 1830 is displayed concurrently with touch navigation region 1852 and control panel 1854 (e.g., as in FIG. 18X) depends on whether the size of user interface 1801 is greater than or less than a size threshold—this determination is optionally affected by whether device 511 is a device with a relatively large touch screen 1851 (e.g., a tablet computer) or whether device 511 is a device with a relatively small touch screen 1851 (e.g., a mobile telephone). For example, in FIG. 18Z, device 511 is a device with a relatively small touch screen 1851 (e.g., device 511 in FIG. 18Z corresponds to device 511 in FIGS. 12A-12RR and/or 14A-14GG, such as a mobile telephone, with a 4", 5" or 6" touch screen) such that user interface 1801 is smaller than a threshold size (e.g., two, four or five times the size of control panel 1854). Selection of "Details" button 1856 is detected in FIG. 18AA, and as a result, "Now Playing" panel 1830 is displayed on touch screen 1851 without displaying touch navigation region 1852 or control panel 1854 (e.g., "Now Playing" panel 1830 has replaced touch navigation region 1852 and control panel 1854 on touch screen 1851), as shown in FIG. 18BB. In contrast, in FIG. 18CC, device 511 is a device with a relatively large touch screen 1851 (e.g., device 511 in FIG. 18CC corresponds to device 511 in FIGS. 16A-16T and/or device 511 in FIGS. 18A-18Y, such as a tablet computer, with a 8", 10" or 12" touch screen) such that user interface 1801 is larger than the above-described threshold size. As such, "Now Playing" panel 1830 is displayed concurrently with touch navigation region 1852 and control panel 1854 in response to selection of "Details" button 1856 (e.g., as shown in FIGS. 18W-18X).

However, even though device 511 in FIG. 18CC has a relatively large touch screen 1851, if the display area on the touch screen 1851 in which user interface 1801 is displayed is smaller than the above-described threshold size, device 511 will optionally display "Now Playing" panel 1830 in place of touch navigation region 1852 and control panel 1854 (e.g., similar to as in FIG. 18BB) rather than concurrently with touch navigation region 1852 and control panel 1854 (e.g., as shown in FIG. 18CC). For example, in FIG. 18DD, device 511 has transitioned from a non-multitasking mode in FIG. 18CC to a multitasking mode in FIG. 18DD in which user interface 1805 of another application is also displayed on touch screen 1851 (e.g., as described with reference to FIGS. 18Q-18U). As a result, in FIG. 18DD, device 511 has ceased displaying touch navigation region 1852 and control panel 1854, and instead is displaying "Now Playing" panel 1830, because the region of touch screen 1851 remaining for user interface 1801 and/or "Now Playing" panel 1830 has optionally been reduced to being less than the above-described threshold size due to device 511 also displaying user interface 1805 on touch screen 1851.

However, if the region of touch screen 1851 for displaying user interface 1801 and/or "Now Playing" panel 1830 is increased to be greater than the above-described threshold size, device 511 will optionally redisplay touch navigation region 1852 and control panel 1854 such that touch navigation region 1852, control panel 1854 and "Now Playing" panel 1830 are concurrently displayed in user interface 1801. For example, in FIGS. 18EE-18FF, user input is detected that increases the size of the region of touch screen 1851 that is for displaying user interface 1801 (e.g., to greater than the above-described threshold size) and decreases the size of the region of touch screen 1851 that is for displaying user interface 1805. As a result, device 511 has redisplayed touch navigation region 1852 and control panel 1854 such that touch navigation region 1852, control panel 1854 and "Now Playing" panel 1830 are concurrently displayed in user interface 1801, as shown in FIG. 18GG. Analogously, in FIGS. 18HH-18II, user input is detected that decreases the size of the region of touch screen 1851 that is for displaying user interface 1801 (e.g., to less than the above-described threshold size) and increases the size of the region of touch screen 1851 that is for displaying user interface 1805. As a result, device 511 has ceased displaying touch navigation region 1852 and control panel 1854 such that "Now Playing" panel 1830 is displayed without displaying touch navigation region 1852 and control panel 1854, as shown in FIG. 18II.

FIGS. 19A-19H are flow diagrams illustrating a method of arranging a control panel region and a touch navigation region in a user interface of an electronic device in accordance with some embodiments of the disclosure. The method 1900 is optionally performed at an electronic device such as device 100, device 300, device 500 or device 511 as described above with reference to FIGS. 1A-1B, 2-3 and 5A-5B. Some operations in method 1900 are, optionally, combined and/or the order of some operations is, optionally, changed.

As described below, the method 1900 provides ways of arranging a control panel region and a touch navigation region in a user interface of an electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device with a touch screen (e.g., a tablet computer, a mobile phone, etc., with a touch screen) displays (1902), on the touch screen, a user interface (e.g., a user interface of a remote control application that is running on the first electronic device for controlling a second electronic device) that includes a touch navigation region (1904), wherein touch input detected in the touch navigation region causes performance of one or more touchpad operations (e.g., scrolling a list displayed on a separate display controlled by the first electronic device, such as a television coupled to a set-top box, moving focus between selectable objects displayed on the television, scrubbing through content displayed on the television, etc.) and a user interface region (1906) that includes one or more selectable elements (e.g., a control panel including one or more controls for controlling the second electronic device, such as a play button, a pause button, and/or one or more context dependent buttons such as a skip forward or skip backward button etc.) overlaid on the touch navigation region, such as in FIG. 18A, including a first selectable element displayed at a first location in the user interface, wherein touch input detected at the one or more selectable elements causes performance of one or more control operations (e.g., the touch navigation region is a region in which touch activity, such as swipe inputs, is detectable to perform touchpad operations on the second electronic device, such as moving a highlight indicator, scrolling through content, etc.). In some embodiments, the control panel is overlaid anywhere on the touch navigation region. The control panel optionally includes one or more buttons, including a respective button located at the first location in the user interface, that are selectable to perform control operations on the second electronic device, such as playing/pausing content, displaying a home screen user interface, etc., such as in FIG. 18A. The control panel is optionally positioned over the touch navigation region in the user interface such that the respective button in the control panel is located at the first location in the user interface, such as in FIG. 18A.

In some embodiments, while displaying, on the touch screen, the user interface, the first electronic device detects (1906), at the touch screen, a first touch input at the first location in the user interface (e.g., a tap, click, etc. is detected at the first location in the user interface), such as in FIG. 18D. In some embodiments, in response to detecting the first touch input, the first electronic device performs (1910) a first control operation of the one or more control operations that corresponds to the first selectable element (e.g., the first electronic device optionally transmits to the second electronic device a control command corresponding to the selected button), such as in FIG. 18E. For example, if the button is a play button, the first electronic device transmits a play command to the second electronic device.

In some embodiments, after performing the first control operation, the electronic device removes (1912) at least a portion of the user interface region that includes the first selectable element from the first location in the user interface (e.g., the control panel is optionally movable anywhere over the touch navigation region), such as in FIGS. 18F-18I. For example, in response to user input to do so, such as a touch-and-hold input and subsequent drag detected on the control panel, the control panel is moved to a different location over the touch navigation region such that the control panel and/or its buttons are no longer located at the first location in the user interface. In some embodiments, after removing (1914) the at least the portion of the user interface region from the first location in the user interface (e.g., after the control panel has been moved away from the first location in the user interface): the first electronic device detects (1916), at the touch screen, a second touch input at the first location in the user interface (e.g., a swipe, a tap, click, etc. is detected at the first location in the user interface), such as in FIGS. 18I-18J. In some embodiments, in response to detecting the second touch input, the first electronic device performs (1918) a first touchpad operation of the one or more touchpad operations in accordance with the second touch input (e.g., the first electronic device optionally transmits to the second electronic device a touchpad command corresponding to the second touch input), such as in FIG. 18J. For example, if the second touch input is a right-to-left swipe, such as in FIG. 18J, the first electronic device optionally transmits a right-to-left movement command to the second electronic device, which causes, for example, horizontal scrolling of content displayed on the second electronic device, scrubbing through content playing on the second electronic device, horizontally moving focus between selectable objects displayed by the second electronic device, etc. Thus, a user is free to move the control panel to different locations over the touch navigation region to customize the location of the control panel, and similarly the areas of the user interface in which touchpad activity can be detected, according to user preferences, and a given location or region in the user interface is usable to perform control operations or touchpad operations depending on whether the control panel is or is not, respectively, located at that given location or region in the user interface. In some embodiments, any part of the touch navigation region that is not overlaid by the control panel is optionally usable for detecting touchpad input so as to increase the available touch regions for receiving touch inputs. This increases the flexibility of the first electronic device to be used to detect inputs, touch or otherwise, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface region comprises (1920) a control panel that includes one or more controls for controlling a second electronic device (e.g., media playback controls, such as a play button, a pause button, and/or one or more context dependent buttons such as a skip forward or skip backward button, etc. for controlling playback of media on a second electronic device that the first electronic device is configured to control), such as in FIG. 18A.

In some embodiments, removing the at least the portion of the user interface region from the first location in the user interface comprises moving (1922) the user interface region from a location in the user interface at which the user interface region overlays a first portion of the touch navigation region to another location in the user interface at which the user interface region overlays a second portion of the touch navigation region, different from the first portion of the touch navigation region (e.g., a press and hold input detected in an area of the user interface region that does not include one of the selectable elements, followed by a drag input optionally moves the user interface region in accordance with the drag input in the user interface), such as in FIGS. 18F-18I. For example, if a contact is detected in a region of the user interface region that does not include one of the selectable elements, the contact is detected for longer than a time threshold, such as 0.1, 0.2 or 0.4 seconds, and the contact moves less than a movement threshold within that time threshold, such as less than 1 mm, 2 mm or 4 mm, movement of the user interface region is optionally initiated, and subsequent movement of the contact moves the user interface region within the user interface. Being able to move the control panel in this way enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first electronic device moves the user interface region in response to detecting (1924), at the touch screen, touchdown of a contact, movement of the contact from an initial location in the user interface to a final location in the user interface, and liftoff of the contact, such as in FIGS. 18K-18M. In some embodiments, moving the user interface region comprises (1926) moving (1928) the user interface region from an initial position in the user interface to a respective position in the user interface in accordance with the movement of the contact from the initial location in the user interface to the final location in the user interface (e.g., the user interface region is dragged around the user interface in accordance with the movement of the contact), such as in FIGS. 18K-18M. For example, if the contact moves from left to right after initiating the movement of the user interface region, the user interface region is dragged from left to right in the user interface. In some embodiments, in response to detecting the liftoff of the contact, the first electronic device moves (1930) the user interface region from the respective position in the user interface to a final position in the user interface that is a position in the user interface of a plurality predefined positions in the user interface that is closest to the respective position in the user interface (e.g., upon liftoff of the contact, the user interface region snaps to the closest predefined location for the user interface region in the user interface, such as the lower left of the user interface, the lower middle of the user interface, or the lower right of the user interface), such as in FIG. 18N. In some embodiments, if the amount of movement of the contact is below a threshold amount of movement, the user interface region snaps back to the prior location of the user interface region instead of snapping to a new location. By limiting the location of the user interface region to one or more predefined regions in the user interface, the first electronic device is able to provide the user with a more predictable user interface presentation, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first electronic device moves the user interface region in response to detecting (1932), at the touch screen, touchdown of a contact, movement of the contact from an initial location in the user interface to a final location in the user interface, and liftoff of the contact, such as in FIGS. 18F-18I. In some embodiments, moving the user interface region comprises (1934) moving (1936) the user interface region from an initial position in the user interface to a respective position in the user interface in accordance with the movement of the contact from the initial location in the user interface to the final location in the user interface (e.g., the user interface region is dragged around the user interface in accordance with the movement of the contact), such as in FIGS. 18F-18I. For example, if the contact moves from left to right after initiating the movement of the user interface region, the user interface region is dragged from left to right in the user interface. In some embodiments, in response to detecting the liftoff of the contact, the first electronic device maintains (1938) the user interface region at the respective position in the user interface (e.g., upon liftoff of the contact, the user interface region is maintained at the respective position in the user interface), such as in FIG. 18I. As such, the location of the user interface region in the user interface is not limited, but rather can be anywhere in the user interface. Being able to move the control panel in this way enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that a size of the user interface is greater than a threshold size, the first electronic device allows (1940) the user interface region to be moved within the user interface in response to detecting input to move the user interface region within the user interface (e.g., movement of the user interface region within the user interface is only allowed if the user interface is greater than a threshold size, such as being displayed on a device with a display larger than a threshold size), such as in FIGS. 18F-18P. In some embodiments, in accordance with a determination that the size of the user interface is less than the threshold size, the first electronic device prevents (1942) the user interface region from being moved within the user interface in response to detecting input to move the user interface region within the user interface (e.g., movement of the user interface region within the user interface is not allowed if the user interface is smaller than a threshold size, such as being displayed on a device with a display smaller than a threshold size), such as in FIGS. 18T-18U. In this way, the first electronic device optionally limits movement of the user interface region to situations in which there is sufficient space in the user interface to move the user interface region, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the touch screen concurrently displays (1944) the user interface of a first application and a second user interface of a second application, different than the first application (e.g., the first electronic device is displaying both the user interface with the touch navigation region, etc. of a remote control application, and the user interface of another application running on the first electronic device in a split screen/multitasking configuration), such as in FIGS. 18Q-18U. In some embodiments, the user interface of the first application is displayed (1946) in a first region of the touch screen (e.g., the user interface is sized to take up a first portion of the touch screen). In some embodiments, the second user interface of the second application is displayed (1948) in a second region of the touch screen, different than the first region of the touch screen (e.g., the second user interface is sized to take up a second portion of the touch screen). In some embodiments, determining whether the size of the user interface is greater than or less than the threshold size comprises determining (1950) whether a size of the first region of the touch screen is greater than or less than a threshold size (e.g., the size of the portion of the touch screen that is used to display the user interface of the remote control application is the relevant size in determining whether the user interface region can be moved within the user interface), such as in FIGS. 18Q-18U. In some embodiments, resizing the first region and/or the second region causes the device to determine whether the size of the user interface is greater than or less than the threshold size to determine whether or not to allow the user interface region to be moved within the user interface in response to detecting input, such as in FIGS. 18S-18T. In this way, the first electronic device is able to dynamically respond to changes in the size of the user interface and control the user interface accordingly, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 18Y:
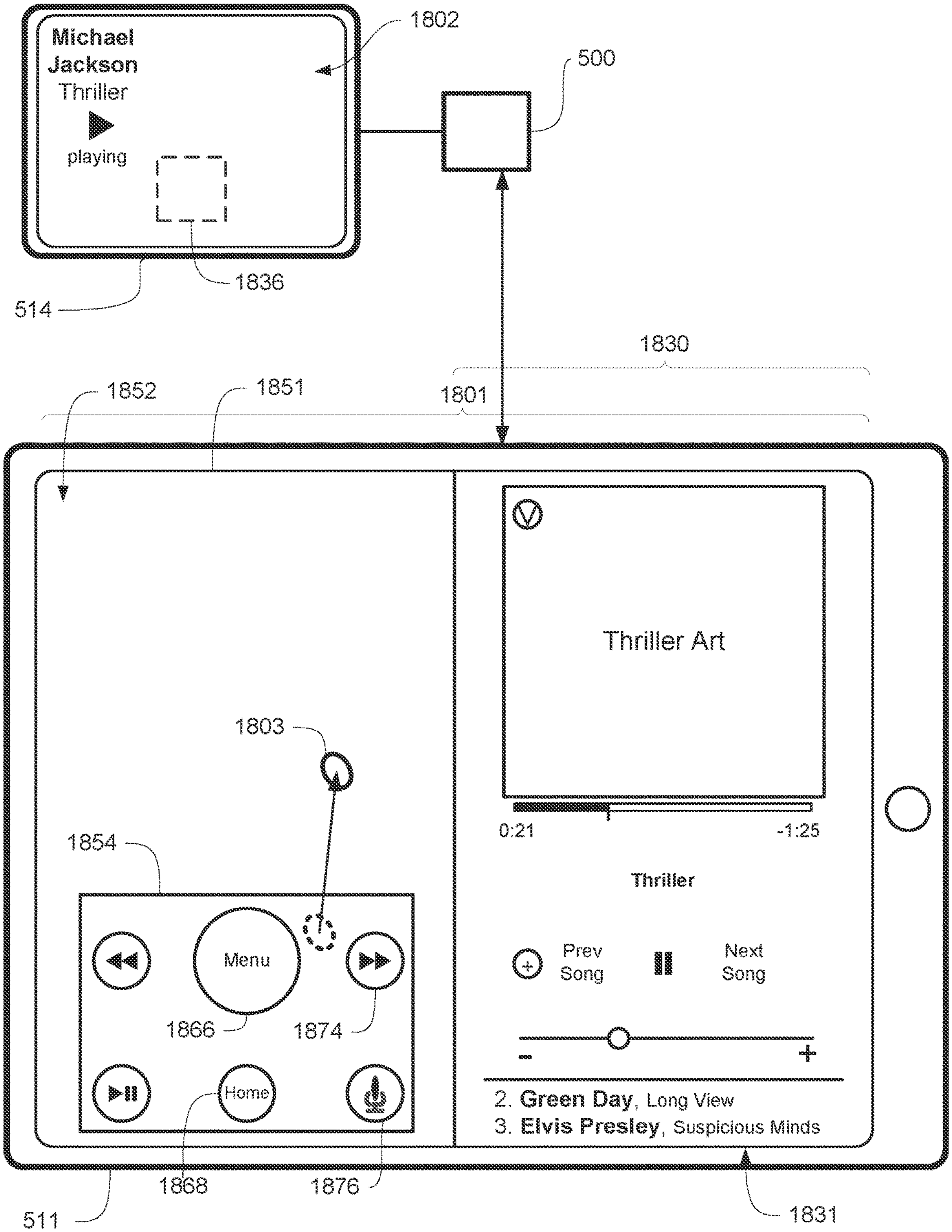
Figure 18Z:
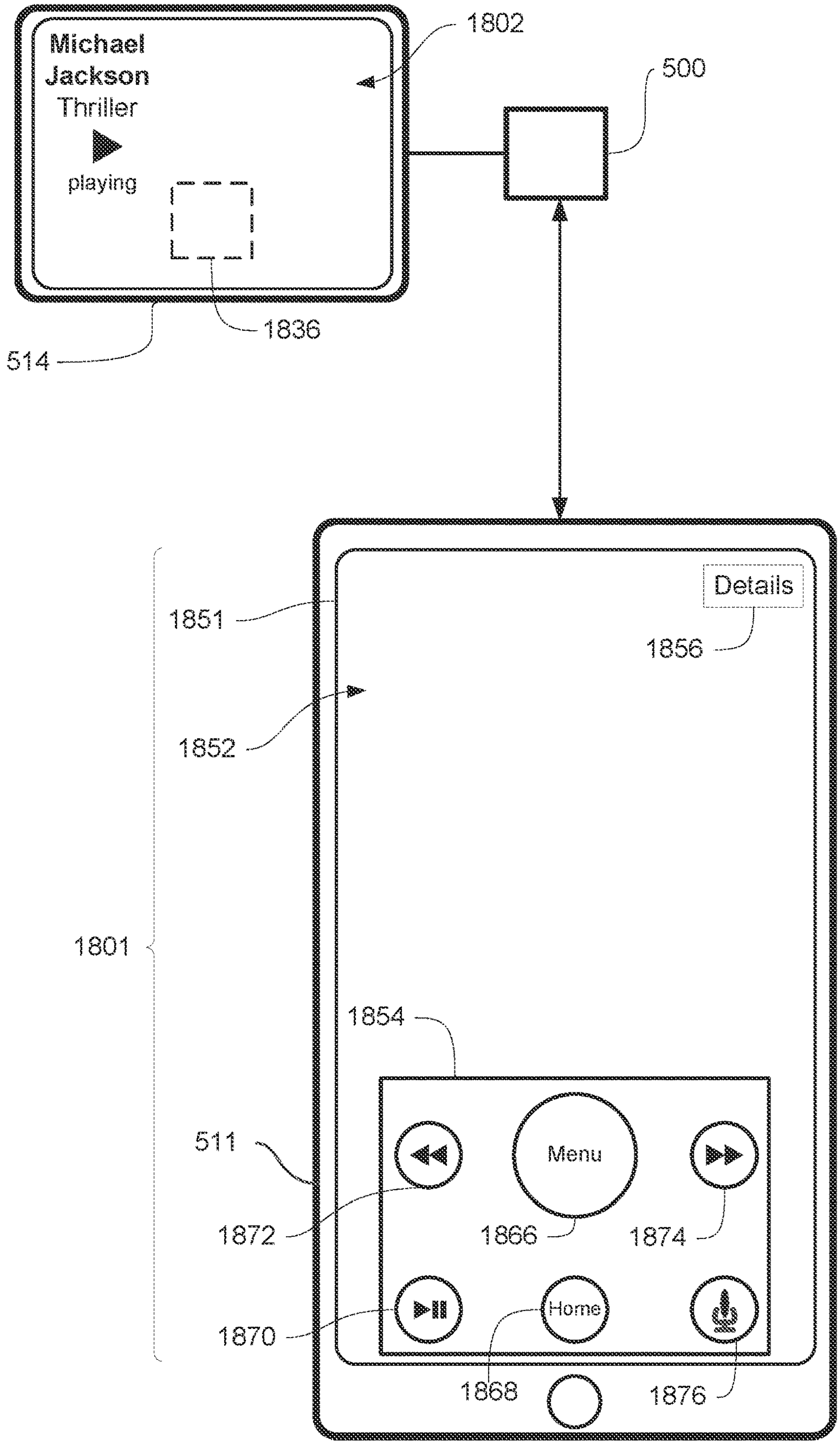
Figure 18A:
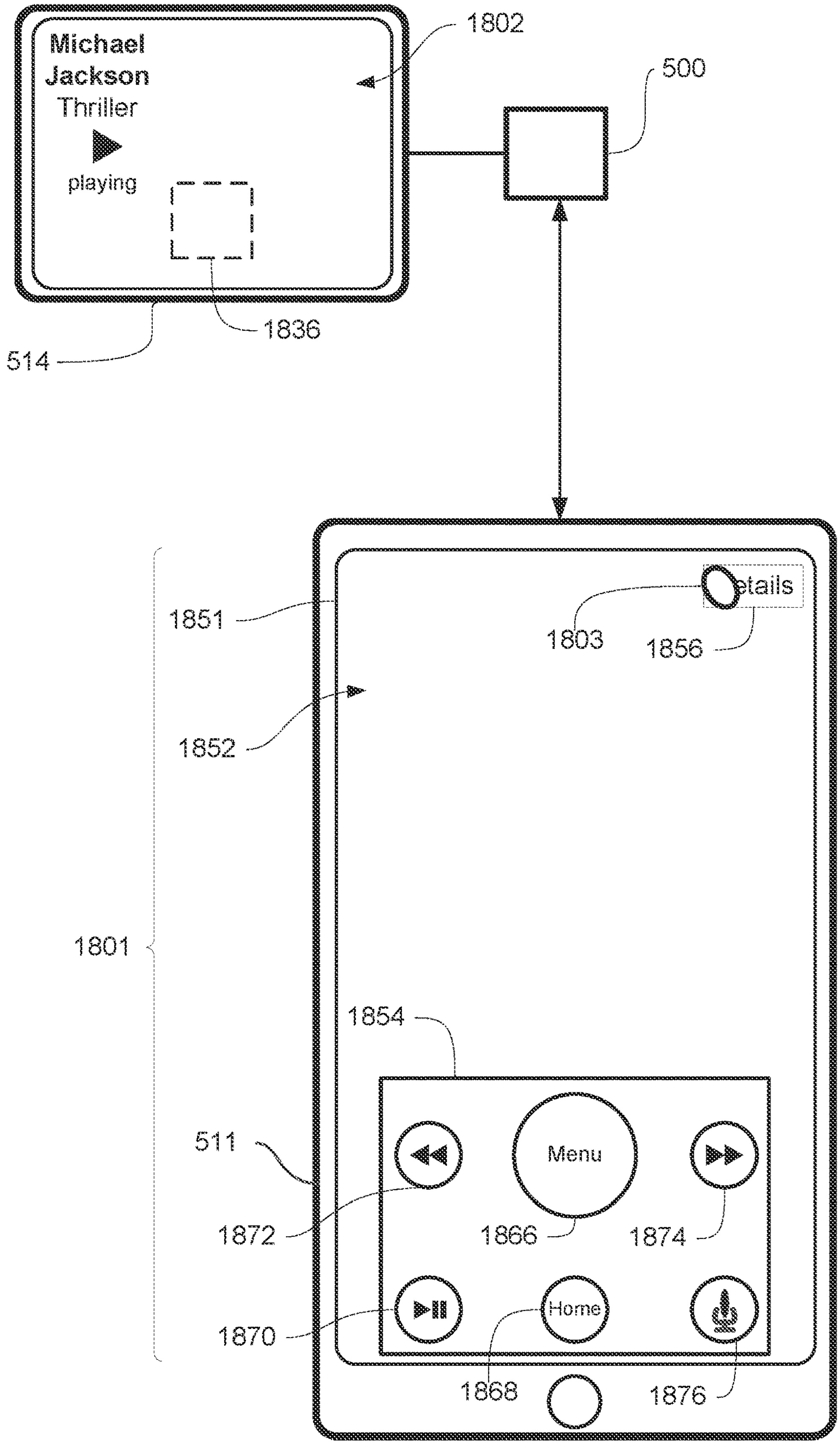
Figure 18B:
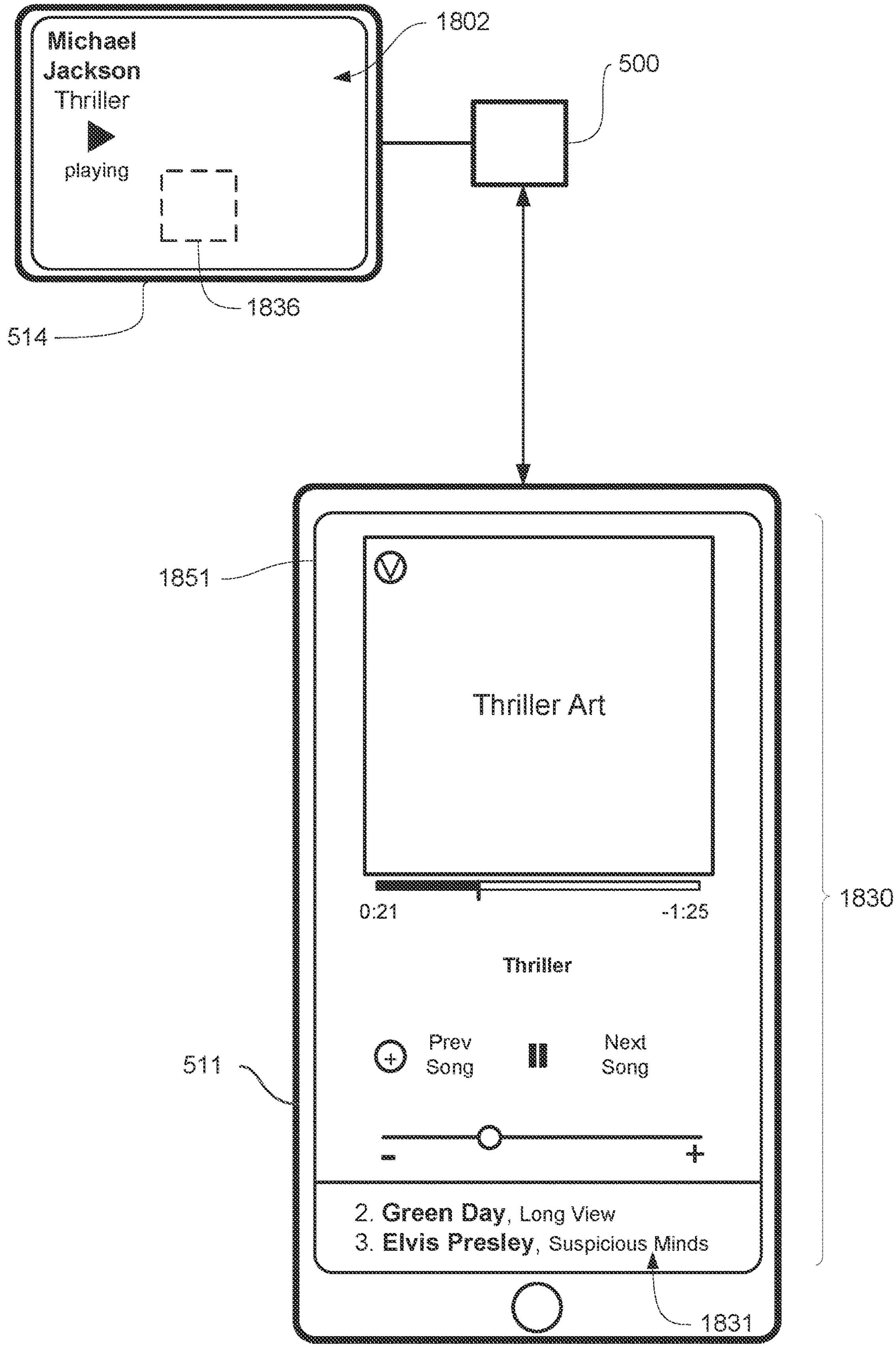
Figure 18C:
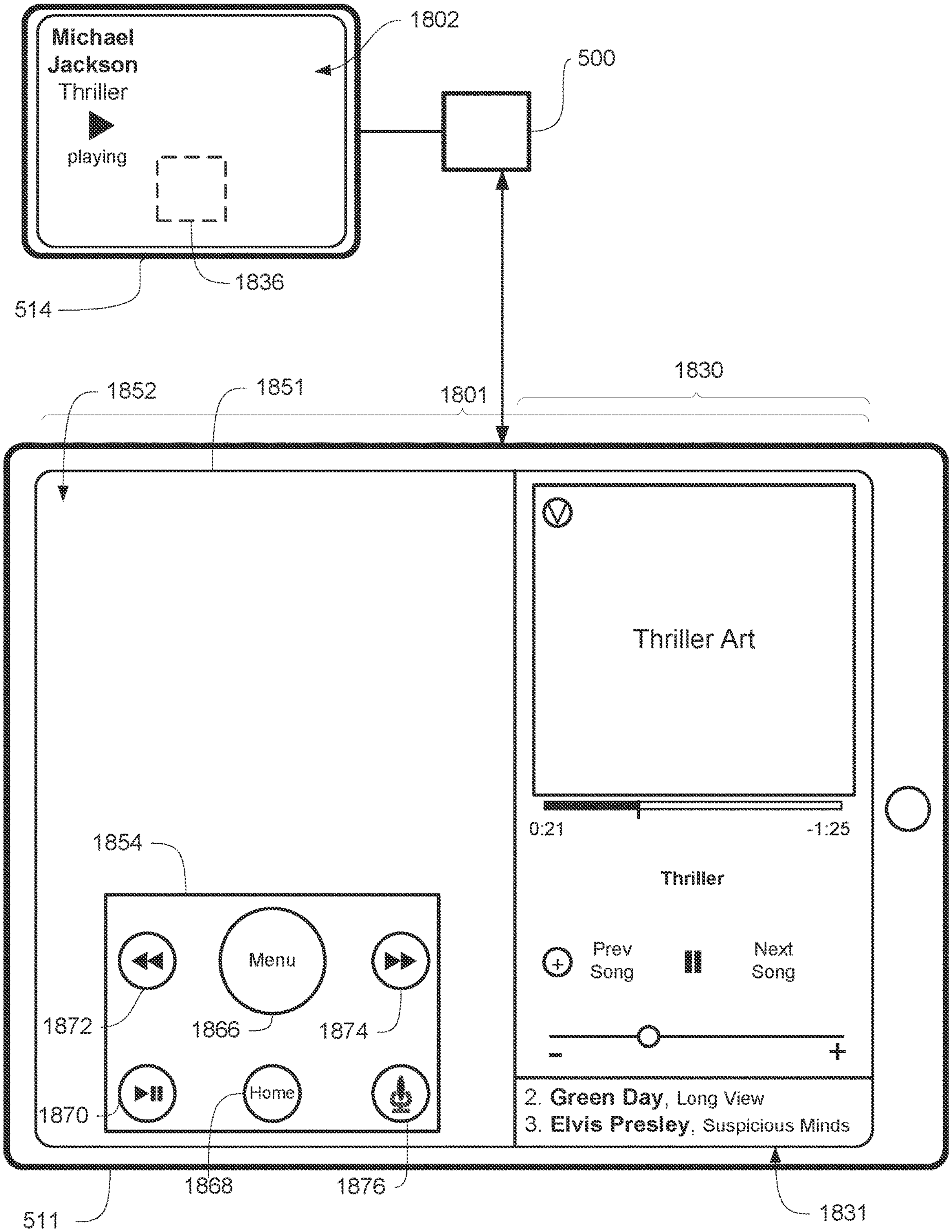
Figure 18D:
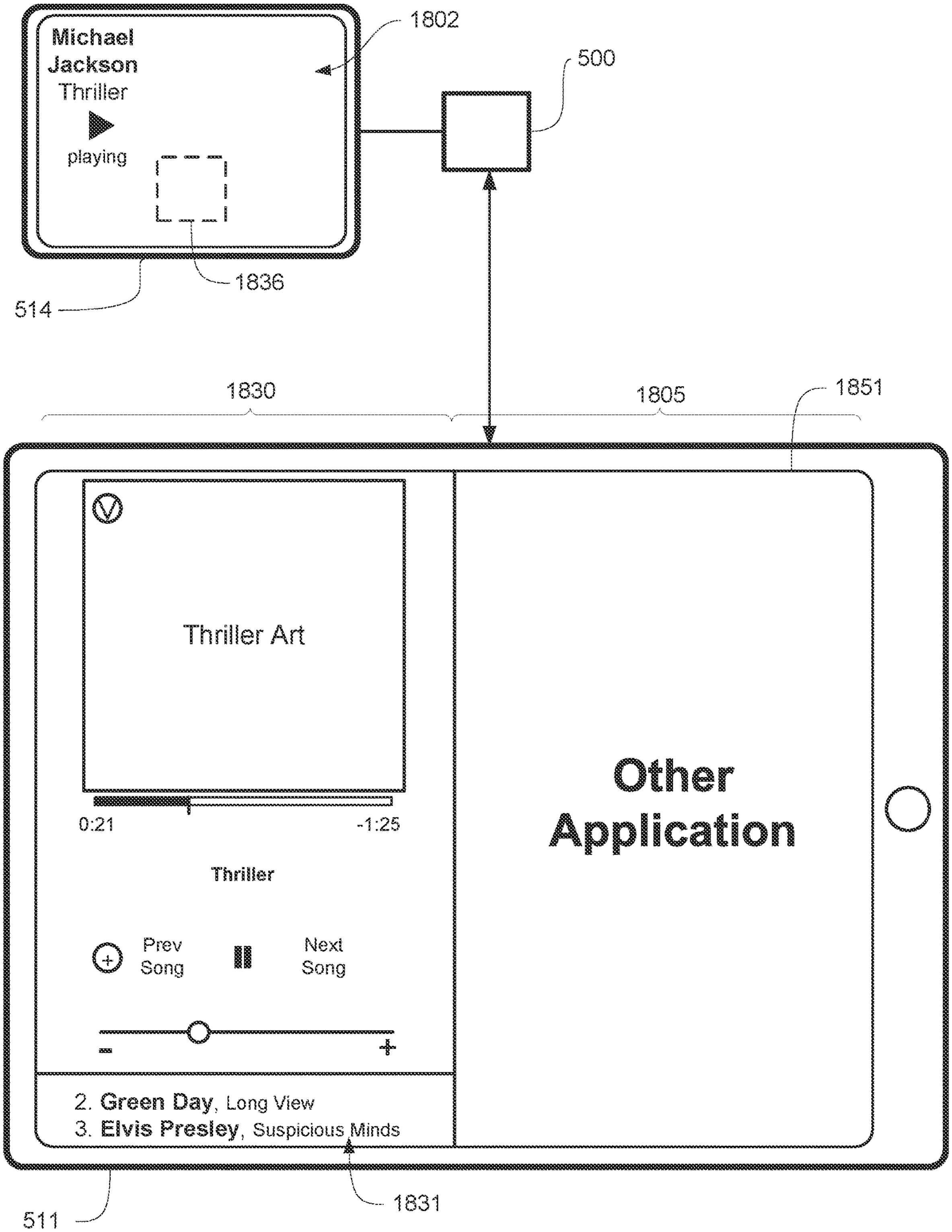
Figure 18E:
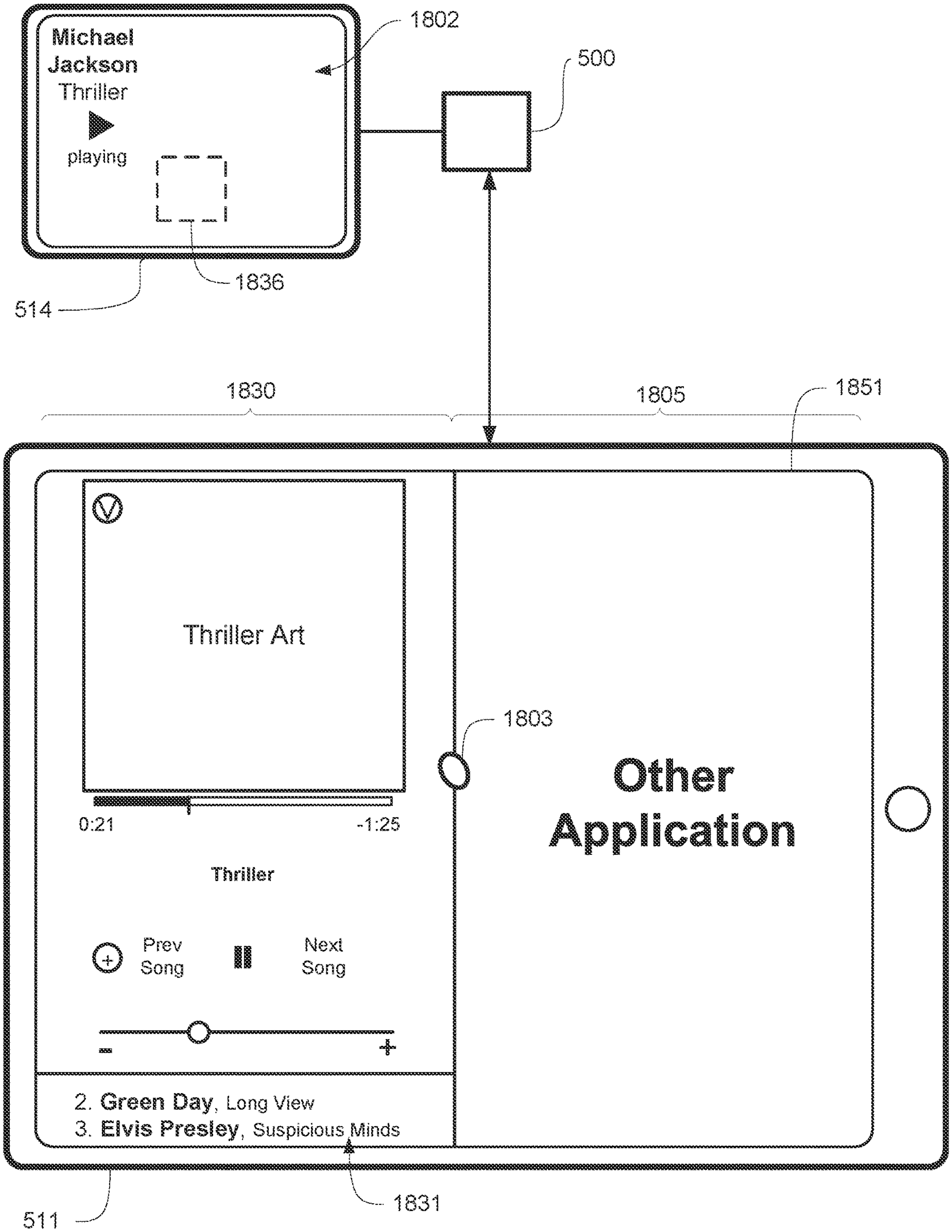
Figure 18F:
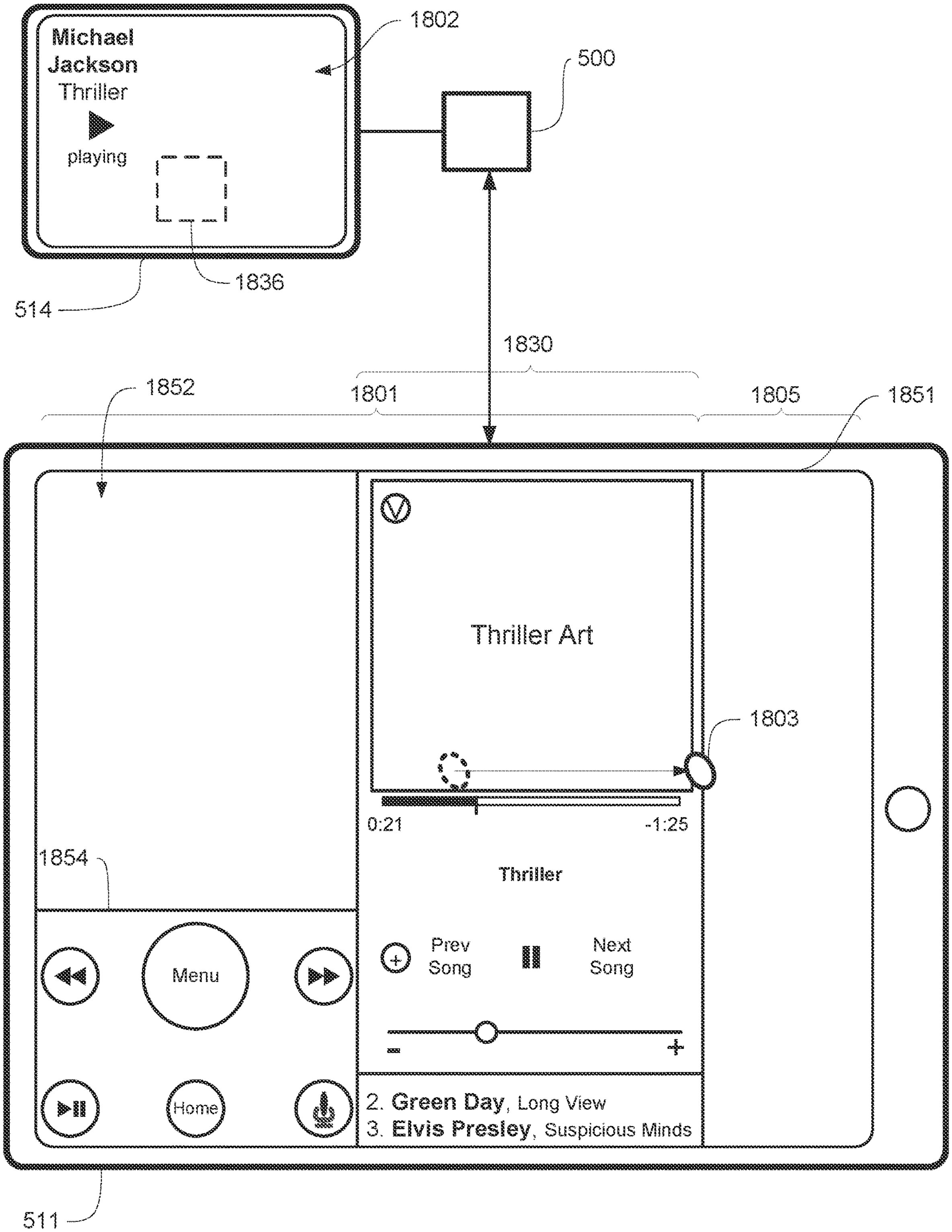
Figure 18G:
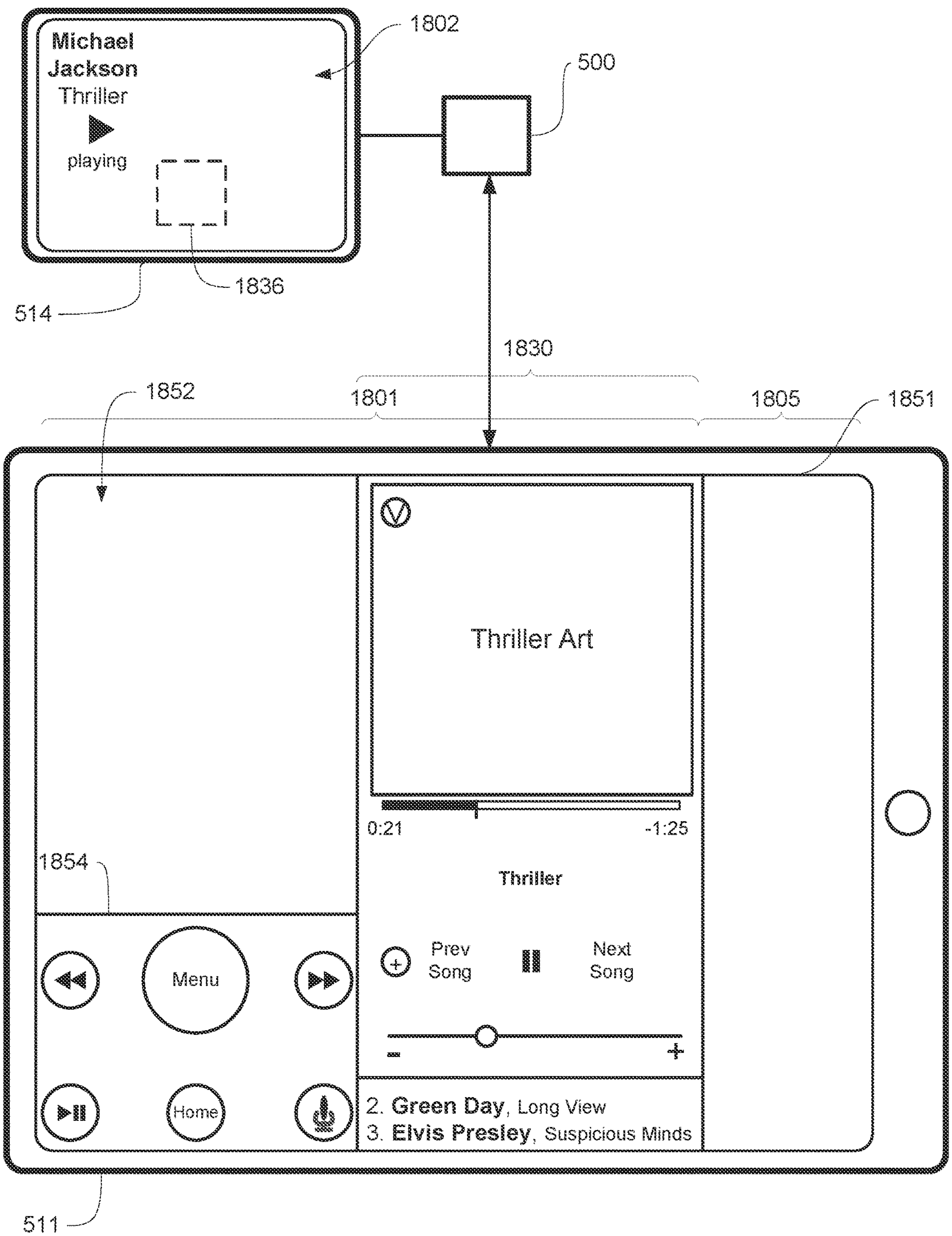
Figure 18H:
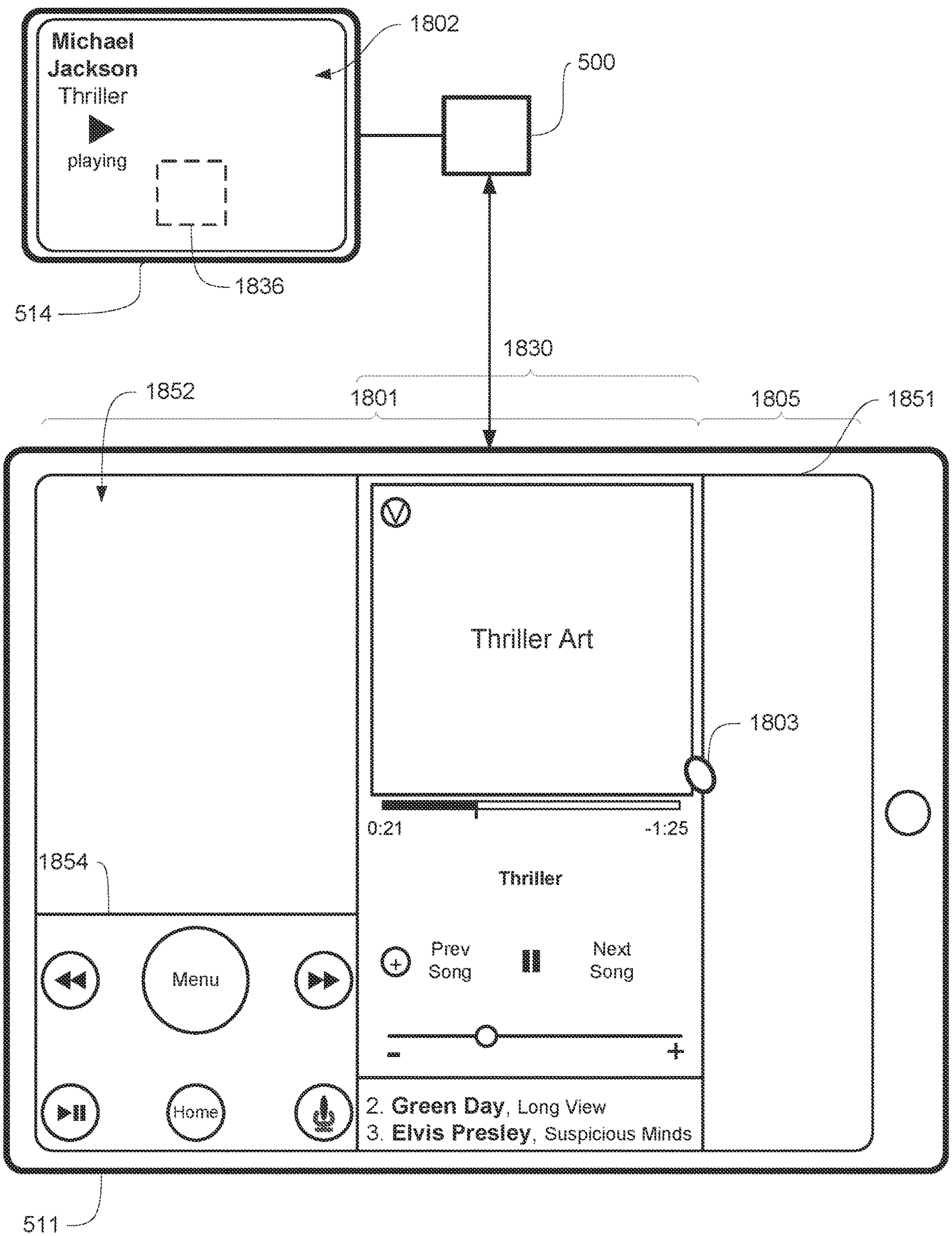
Figure 18I:
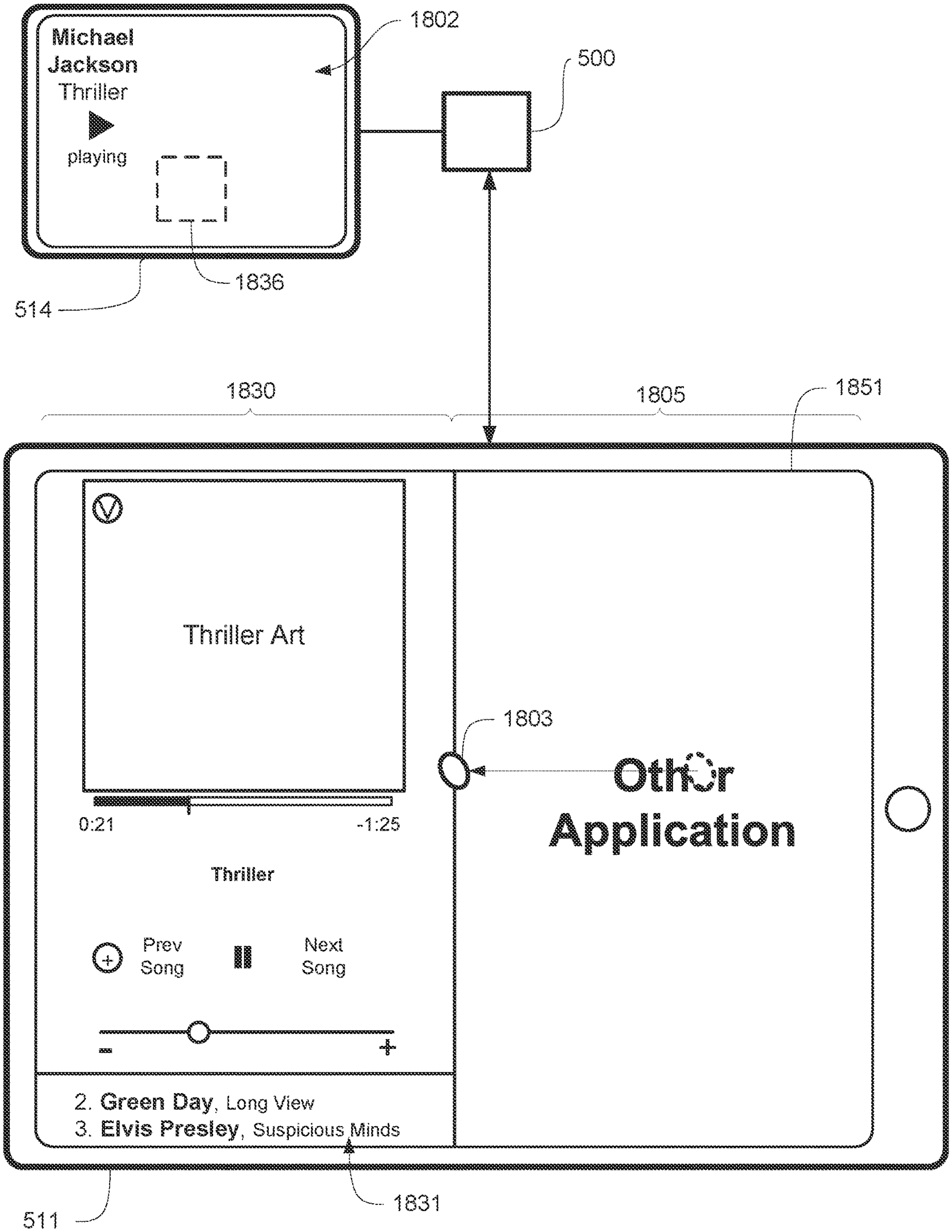
Figure 19A:
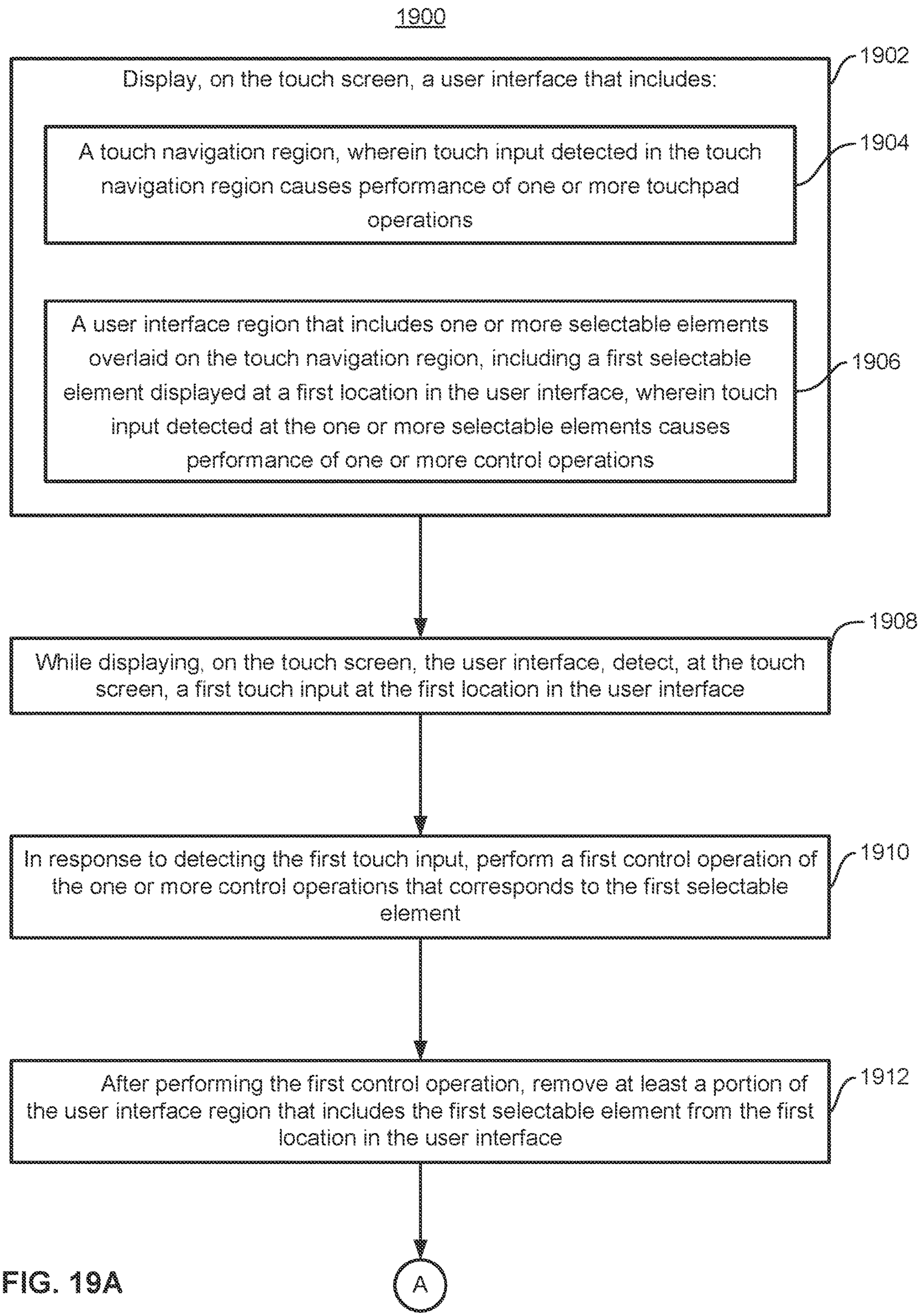
FIGS. 19A-19H are flow diagrams illustrating a method of arranging a control panel region and a touch navigation region in a user interface of an electronic device in accordance with some embodiments of the disclosure.
Figure 19B:
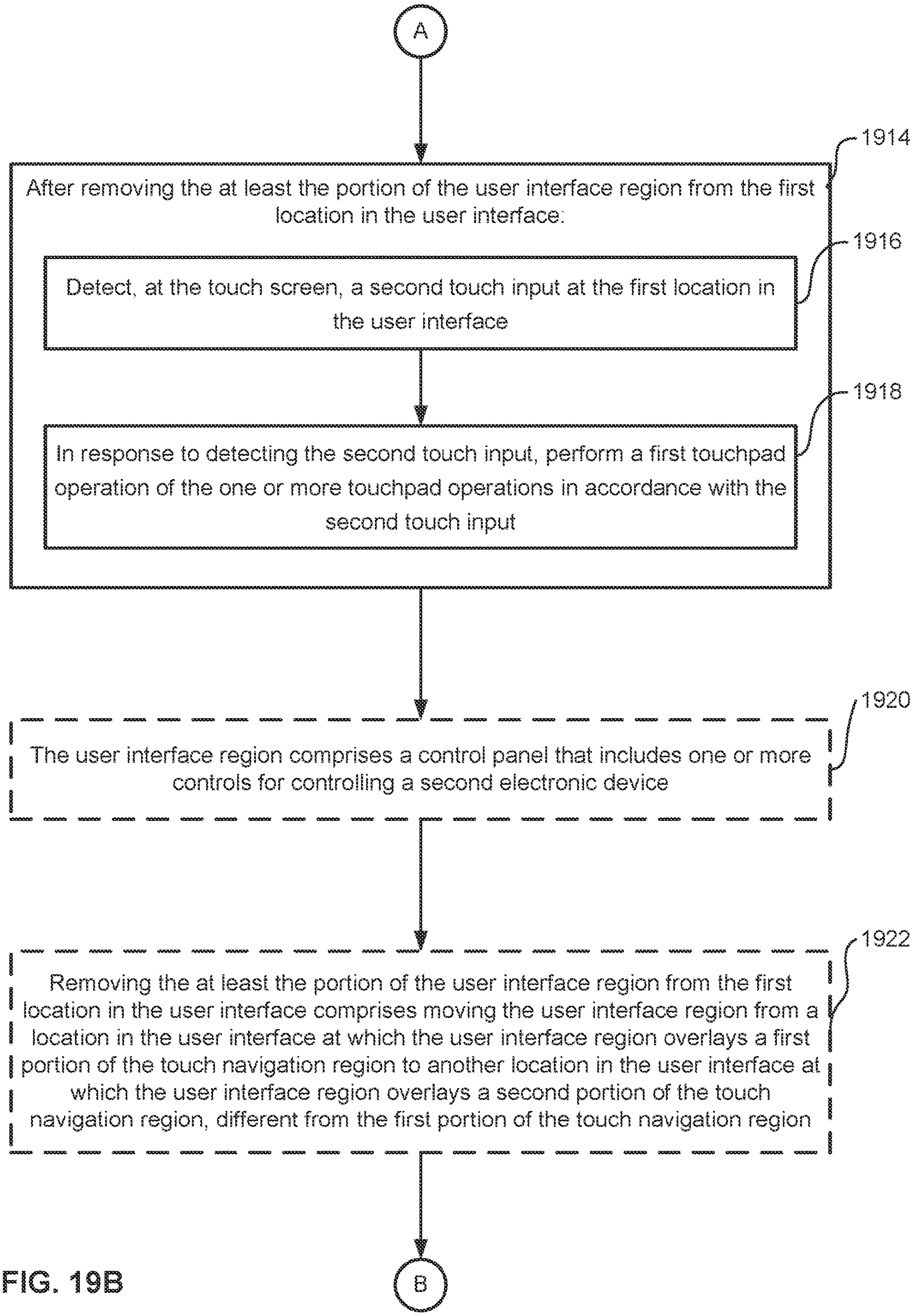
Figure 19C:
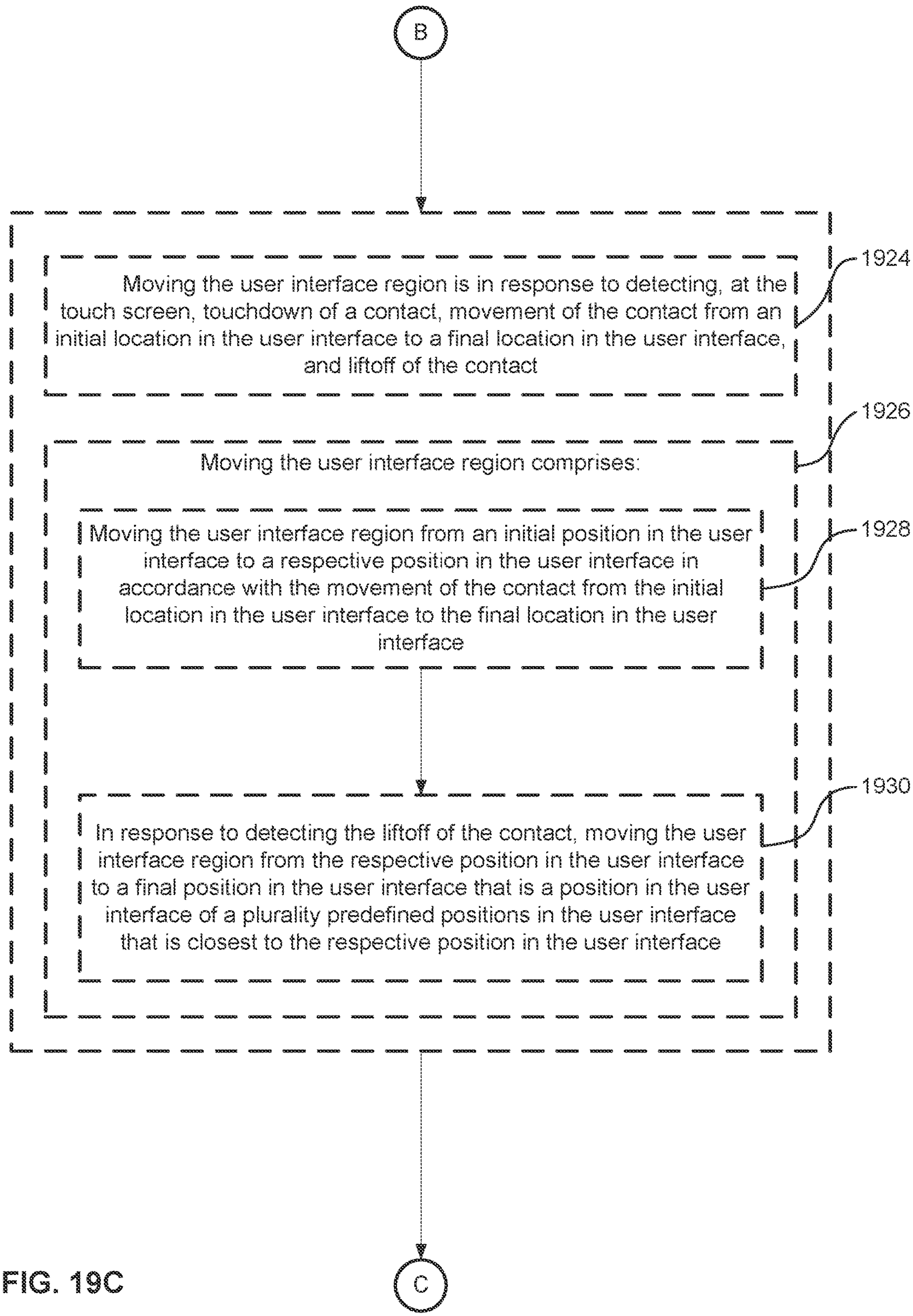
Figure 19D:
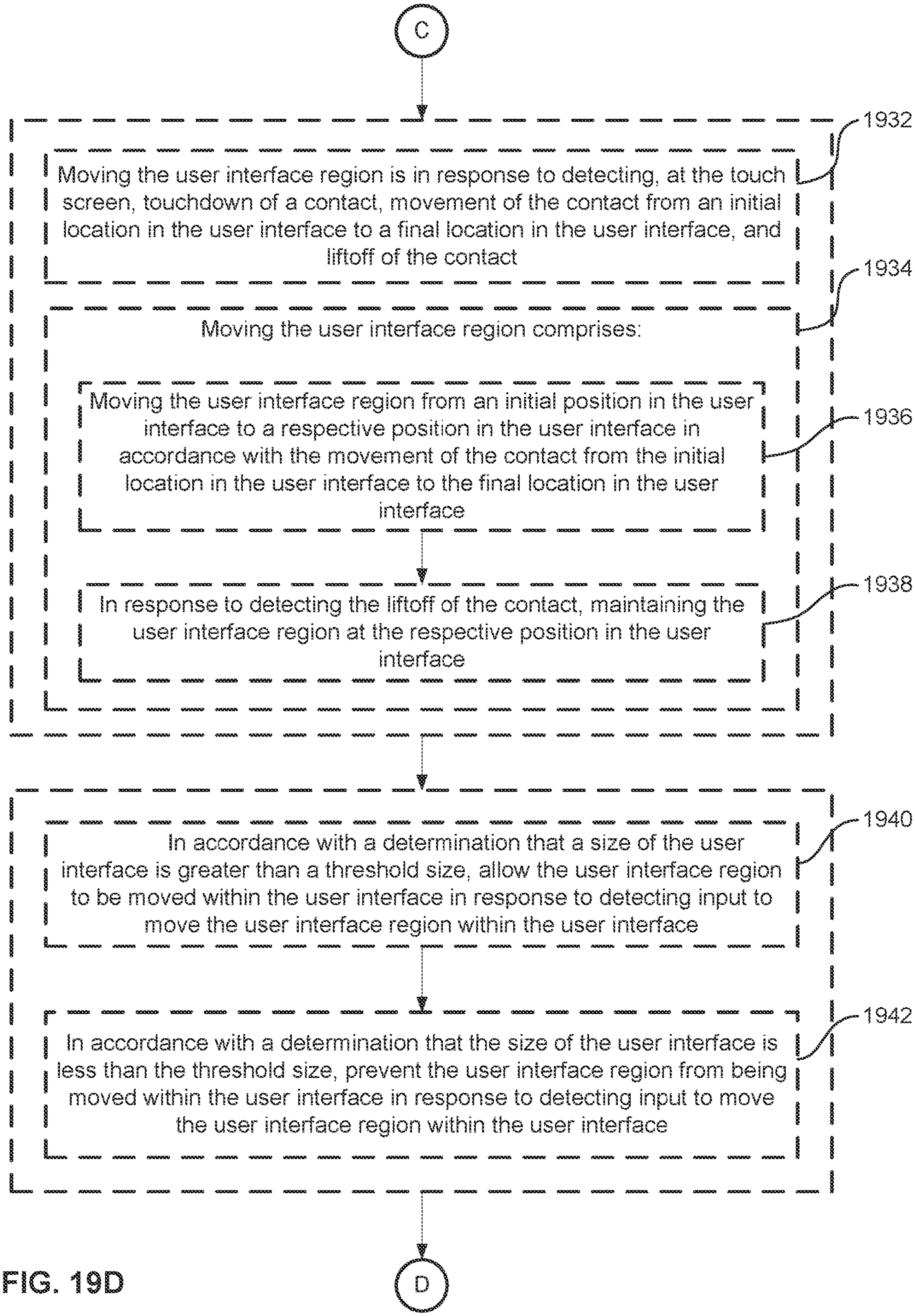
Figure 19E:
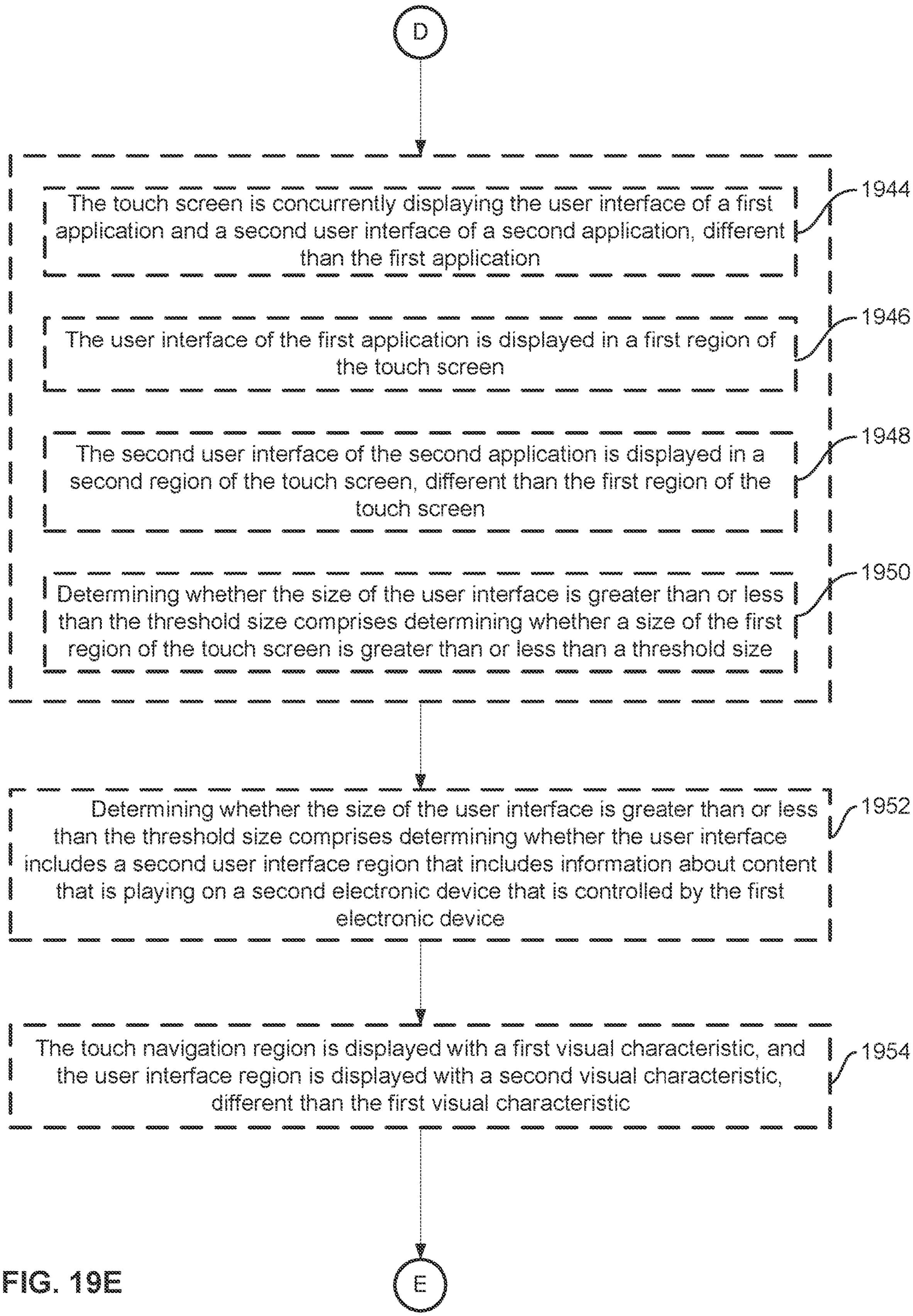
Figure 19F:
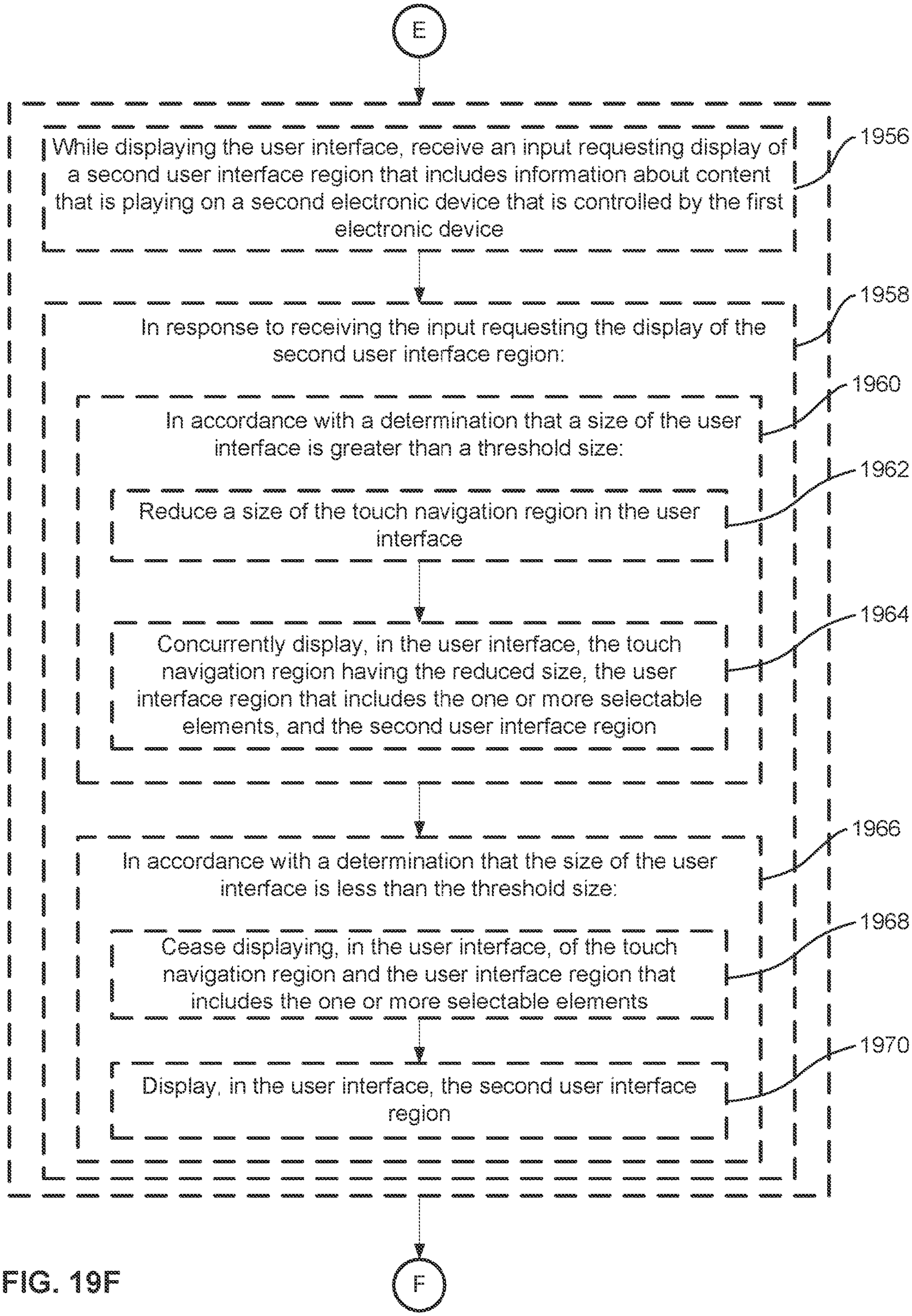
Figure 19G:
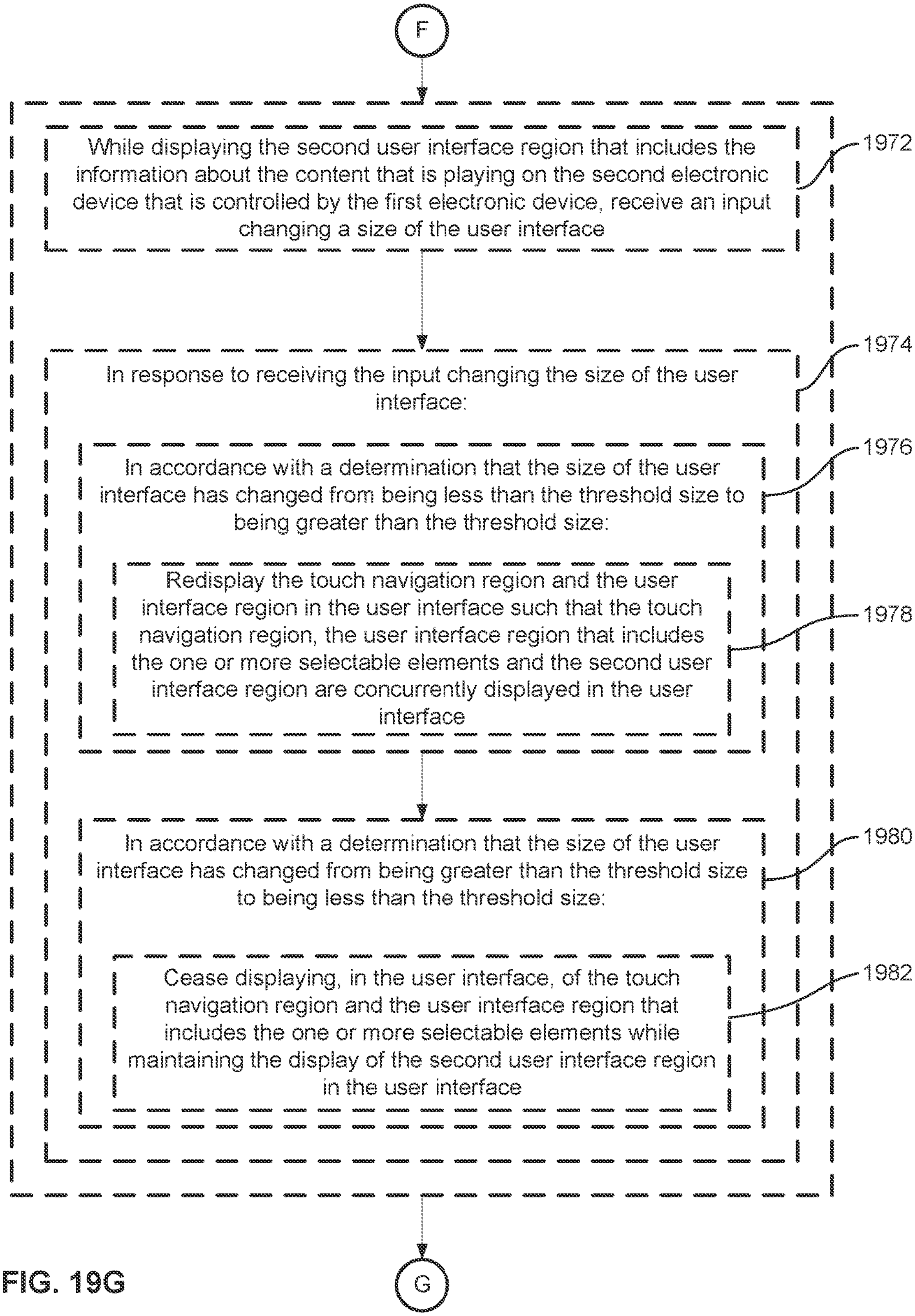
Figure 19H:
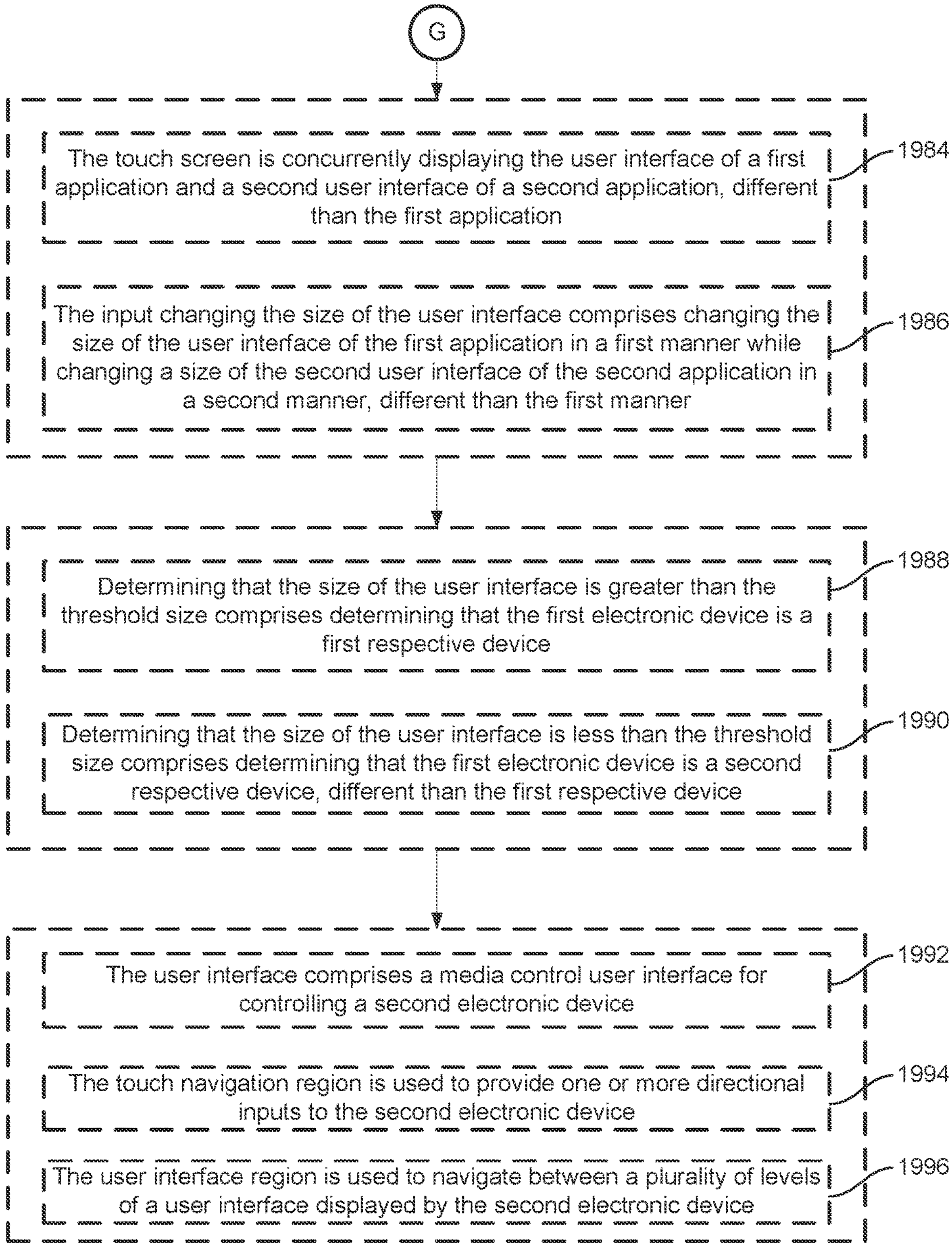

In some embodiments, determining whether the size of the user interface is greater than or less than the threshold size comprises determining (1952) whether the user interface includes a second user interface region that includes information about content that is playing on a second electronic device that is controlled by the first electronic device (e.g., the user interface may include another user interface region—a "now playing" panel—that includes information about content playing on the second electronic device that the first electronic device is controlling), such as in FIGS. 18X-18Y. The "now playing" panel optionally includes artwork corresponding to the content, playback controls for the content, a title of the content, and a progress bar for the content. If the user interface is displaying the "now playing" panel, there may not be sufficient space in the user interface to be able to move the user interface region within it—as such, movement of the user interface region while this "now playing" panel is being displayed may not be allowed, such as in FIG. 18Y. In this way, the first electronic device optionally limits movement of the user interface region to situations in which there is sufficient space in the user interface to move the user interface region, thus operating in a manner that is compatible with, and not inconsistent with, the size of the user interface, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the touch navigation region is displayed (1954) with a first visual characteristic, and the user interface region is displayed with a second visual characteristic, different than the first visual characteristic (e.g., different colors, different shades of a color, different texture etc.), such as in FIG. 18A. In this way, the first electronic device clearly conveys to the user of the first electronic device which areas of the user interface are for touch inputs (e.g., the touch navigation region) and which areas of the user interface are not for touch inputs (e.g., the user interface region), which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the user interface, the first electronic device receives (1956) an input requesting display of a second user interface region that includes information about content that is playing on a second electronic device that is controlled by the first electronic device (e.g., selection of a button displayed in the user interface for displaying a "now playing" panel, which optionally includes information previously described, and optionally also includes an "up next" list of content items that are in queue to be played on the second electronic device), such as in FIG. 18W or 18AA. In some embodiments, in response (1958) to receiving the input requesting the display of the second user interface region, in accordance with a determination (1960) that a size of the user interface is greater than a threshold size, the first electronic device reduces (1962) a size of the touch navigation region in the user interface and concurrently displays (1964), in the user interface, the touch navigation region having the reduced size, the user interface region that includes the one or more selectable elements, and the second user interface region (e.g., if the size of the user interface is greater than a threshold size, the size of the touch navigation region is reduced and the "now playing" panel is displayed concurrently with the touch navigation region and the control panel), such as in FIGS. 18W-18X. In some embodiments, in accordance with a determination (1966) that the size of the user interface is less than the threshold size, the first electronic device ceases (1968) displaying, in the user interface, of the touch navigation region and the user interface region that includes the one or more selectable elements; and displays (1970), in the user interface, the second user interface region (e.g., if the size of the user interface is less than the threshold size, the touch navigation region and control panel cease to be displayed, and the now playing panel is displayed in the user interface, instead), such as in FIGS. 18AA-18BB. In this way, the first electronic device optionally limits concurrent display of the touch navigation region, the user interface region, and the second user interface region to situations in which there is sufficient space in the user interface to perform such concurrent displaying, thus operating in a manner that is compatible with, and not inconsistent with, the size of the user interface, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the second user interface region that includes the information about the content that is playing on the second electronic device that is controlled by the first electronic device, the first electronic device receives (1972) an input changing a size of the user interface (e.g., rotating the first electronic device from a landscape orientation to a portrait orientation, or vice versa, or changing a size of the region of the touch screen that is reserved for the user interface, such as in a split screen/multitasking configuration), such as in FIGS. 18EE-18FF or 18HH-18II. In some embodiments, in response to receiving (1974) the input changing the size of the user interface and in accordance with a determination (1976) that the size of the user interface has changed from being less than the threshold size to being greater than the threshold size, the first electronic device redisplays (1978) the touch navigation region and the user interface region in the user interface such that the touch navigation region, the user interface region that includes the one or more selectable elements and the second user interface region are concurrently displayed in the user interface (e.g., rearranging the user interface into the concurrent display layout where the touch navigation region, the user interface region and the second user interface region are displayed concurrently), such as in FIGS. 18EE-18GG. In some embodiments, in accordance with a determination (1980) that the size of the user interface has changed from being greater than the threshold size to being less than the threshold size, the first electronic devices ceases displaying (1982), in the user interface, of the touch navigation region and the user interface region that includes the one or more selectable elements while maintaining the display of the second user interface region in the user interface (e.g., rearranging the user interface into the non-concurrent display layout where the touch navigation region and the user interface region are not displayed, and the second user interface region is displayed, instead), such as in FIGS. 18HH-18II. In this way, the first electronic device is able to dynamically respond to changes in the size of the user interface and control the user interface accordingly, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the touch screen concurrently displays (1984) the user interface of a first application and a second user interface of a second application, different than the first application (e.g., the first electronic device is displaying both the user interface with the touch navigation region, etc. of a remote control application, and the user interface of another application running on the first electronic device in a split screen/multitasking configuration), such as in FIGS. 18DD-18II. In some embodiments, the input changing (1986) the size of the user interface comprises changing the size of the user interface of the first application in a first manner while changing a size of the second user interface of the second application in a second manner, different than the first manner (e.g., increasing the size of the portion of the touch screen reserved for the user interface of the first application while reducing the size of the portion of the touch screen reserved for the second user interface of the second application, or vice versa), such as in FIGS. 18FF and 18II. In this way, the first electronic device is able to dynamically reconfigure the layout of the user interface even when used in a split screen/multitasking environment, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently).

In some embodiments, determining that the size of the user interface is greater than the threshold size comprises determining (1988) that the first electronic device is a first respective device. In some embodiments, determining that the size of the user interface is less than the threshold size comprises determining (1990) that the first electronic device is a second respective device, different than the first respective device (e.g., if the first electronic device is a device with a large touch screen, then the first electronic device optionally determines that the size of the user interface is greater than the threshold size, and if the first electronic device is a device with a small touch screen, then the first electronic device optionally determines that the size of the user interface is less than the threshold size), such as in FIGS. 18Z-18CC. In some embodiments, the determination of the size of the user interface is a determination of what device the first electronic device is. In this way, the first electronic device optionally limits concurrent display of the touch navigation region, the user interface region, and the second user interface region to situations in which the device has a touch screen that is sufficiently large to perform such concurrent displaying, thus operating in a manner that is compatible with, and not inconsistent with, the size of the touch screen, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface comprises (1992) a media control user interface for controlling a second electronic device (e.g., the user interface is a user interface of a remote control application for controlling media playback on the second electronic device, such as a set-top box), such as in FIG. 18A. In some embodiments, the touch navigation region is used (1994) to provide one or more directional inputs to the second electronic device (e.g., touch inputs detected in the touch navigation region cause the first electronic device to transmit, to the second electronic device, directional commands corresponding to the touch inputs), such as in FIGS. 18B-18C. For example, a left-to-right swipe input in the touch navigation region causes the first electronic device to transmit a left-to-right directional input to the second electronic device that, optionally, causes the second electronic device to perform a user interface navigation operation such as a scrolling operation, focus movement operation, or content scrubbing operation with a direction based on the direction of the swipe input. In some embodiments, the user interface region is used (1996) to navigate between a plurality of levels of a user interface displayed by the second electronic device (and, optionally, to control media playback on the second electronic device). For example, the user interface region optionally includes a home button or a back button for navigating to a home screen of the second electronic device, or moving backwards in the navigation hierarchy of the second electronic device, such as in FIG. 18A. In some embodiments, the user interface region includes playback controls for content playing on the second electronic device, such as play/pause buttons, forward skip and backward skip buttons, etc., such as in FIG. 18A.

It should be understood that the particular order in which the operations in FIGS. 19A-19H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500 and 1700) are also applicable in an analogous manner to method 1500 described above with respect to FIGS. 19A-19H. For example, the touch inputs, software remote control applications, touch navigation regions, touch screens, control operations, touchpad operations and/or simulated remote trackpads described above with reference to method 1900 optionally have one or more of the characteristics of the touch inputs, software remote control applications, touch navigation regions, touch screens, control operations, touchpad operations and/or simulated remote trackpads described herein with reference to other methods described herein (e.g., methods 700, 900, 1100, 1300, 1500 and 1700). For brevity, these details are not repeated here.

The operations in the information processing methods described above are, optionally, implemented by running one or more functional modules in an information processing apparatus such as general purpose processors (e.g., as described with respect to FIGS. 1A, 3, 5A and 26) or application specific chips. Further, the operations described above with reference to FIGS. 19A-19H are, optionally, implemented by components depicted in FIGS. 1A-1B. For example, detecting operations 1908 and 1916 and performing operations 1910 and 1918 are, optionally, implemented by event sorter 170, event recognizer 180, and event handler 190. Event monitor 171 in event sorter 170 detects a contact on touch screen 1851, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 20:
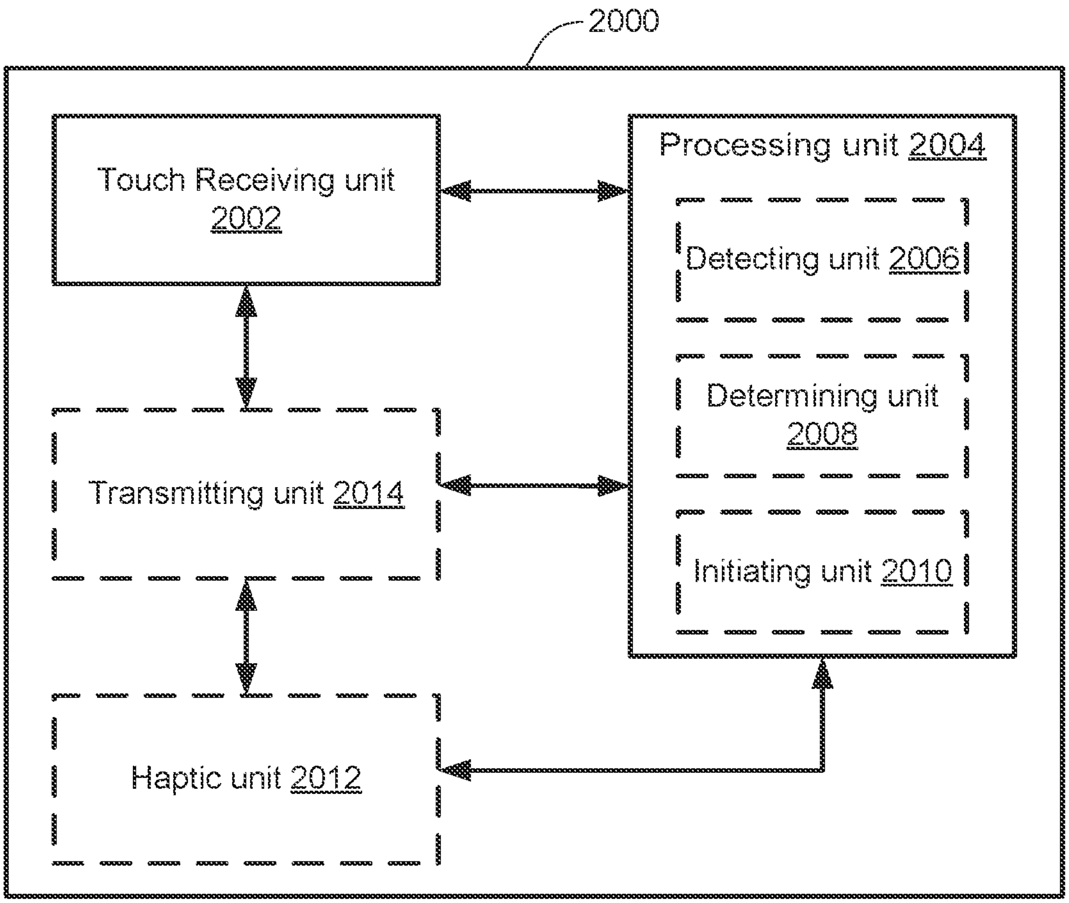
FIGS. 20-26 are functional block diagrams of electronic devices in accordance with some embodiments of the disclosure.

In accordance with some embodiments, FIG. 20 shows a functional block diagram of an electronic device 2000 (e.g., device 100 in FIG. 1A, 300 in FIG. 3 and/or 500 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device 2000 optionally includes a touch receiving unit 2002 configured to receive touch inputs, a processing unit 2004 coupled to the receiving unit 2002, a transmitting unit 2014 coupled to the processing unit 2004 and the touch receiving unit 2002 and a haptic unit 2012 coupled to the processing unit 2004, the touch receiving unit 2002, and the transmitting unit 2014. In some embodiments, the processing unit 2004 includes a detecting unit 2006, a determining unit 2008, and an initiating unit 2010.

In some embodiments, the touch receiving unit 2002 is configured to, while a respective object, of a plurality of selectable user interface objects displayed in a user interface on a display, has focus, detect a touch input on a touch-sensitive surface, wherein detecting the touch input includes detecting touchdown of a contact on a touch-sensitive surface. In some embodiments, the processing unit 2004 is configured to, after detecting the touchdown of the contact, in accordance with a determination (e.g., with the determining unit 2008) that the touch input comprises the touchdown of the contact followed by liftoff of the contact within a first time threshold, and movement of the contact is less than a threshold amount of movement, initiate (e.g., with the initiating unit 2010) an operation to display, on the display, content associated with the respective object. In some embodiments, the processing unit 2004 is configured to, in accordance with a determination (e.g., with the determining unit 2008) that the touch input comprises the touchdown of the contact followed by the movement of the contact that is greater than the threshold amount of movement within the first time threshold, initiate (e.g., with the initiating unit 2010) an operation to display, on the display, a change in an appearance of the respective object to indicate that continued movement of the contact will result in changing focus to a different object of the plurality of selectable user interface objects in the user interface displayed by the display.

In some embodiments, the processing unit 2004 is optionally configured to, in accordance with the determination (e.g., with the determining unit 2008) that the touch input comprises the touchdown of the contact followed by the movement of the contact that is greater than the threshold amount of movement within the first time threshold, forgo initiating (e.g., with the initiating unit 2010) the operation to display the content associated with the respective object when the contact is lifted off of the touch-sensitive surface.

In some embodiments, the processing unit 2004 is further configured to, after detecting (e.g., with the touch receiving unit 2002) the touchdown of the contact, in accordance with a determination (e.g., with the determining unit 2008) that the touch input comprises the touchdown of the contact followed by the liftoff of the contact after the first time threshold, and the movement of the contact during the first time threshold is less than the threshold amount of movement, initiate (e.g., with the initiating unit 2010) an operation to display, on the display, a change in the appearance of the respective object to indicate that the liftoff of the contact will result in the content associated with the respective object to be displayed on the display.

In some embodiments, the touch receiving unit 2002 is further configured to, after detecting the touchdown of the contact, in accordance with the determination (e.g., with the determining unit 2008) that the touch input comprises the touchdown of the contact followed by the liftoff of the contact after the first time threshold, and the movement of the contact during the first time threshold is less than the threshold amount of movement, detect a movement of the contact after the first time threshold without initiating (e.g., with the initiating unit 2010) an operation to display, on the display, a change in the appearance of the respective object in accordance with the movement of the contact detected after the first time threshold.

In some embodiments, the processing unit further configured to, after detecting (e.g., with the touch receiving unit 2002) the touchdown of the contact, in accordance with a determination (e.g., with the determining unit 2008) that the touch input comprises the touchdown of the contact followed by the liftoff of the contact after a second time threshold, longer than the first time threshold, and the movement of the contact during the second time threshold is less than the threshold amount of movement, initiate (e.g., with the initiating unit 2010) an operation to display, on the display, a change in the appearance of the respective object to indicate that subsequent movement of the contact will result in movement of the respective object within an arrangement of the plurality of selectable user interface objects.

In some embodiments, wherein it is determined (e.g., with the determining unit 2008) that the touch input comprises the touchdown of the contact followed by the liftoff of the contact after the second time threshold, and the movement of the contact during the second time threshold is less than the threshold amount of movement, the processing unit 2004 is further configured to, after the second time threshold detect (e.g., with the detecting unit 2006) the subsequent movement of the contact and initiate (e.g., with the initiating unit 2010) an operation to move the respective object within the arrangement of the plurality of selectable user interface objects in accordance with the detected subsequent movement of the contact.

In some embodiments, the electronic device 2000 optionally includes a transmitting unit 2014 coupled to the processing unit. The transmitting unit 2014 is optionally used to transmit information about detected contacts and/or events to the second electronic device. In some embodiments, initiating (e.g., with the initiating unit 2010) the operation to display the content associated with the respective object comprises transmitting, with the transmitting unit 2014, a corresponding first event to the second electronic device to display the content associated with the respective object on the display. In some embodiments, initiating (e.g., with the initiating unit 2010) the operation to display the change in the appearance of the respective object comprises transmitting, with the transmitting unit 2014, a corresponding second event to the second electronic device to display the change in the appearance of the respective object. In some embodiments, the electronic device comprises a mobile telephone.

In some embodiments, the transmitting unit 2014 is further configured to, after detecting (e.g., with the touch receiving unit 2002) the touchdown of the contact, continually transmit information about a position of the contact on the touch-sensitive surface of the electronic device to the second electronic device. In some embodiments, the transmitting unit 2014 is further configured to, in response to detecting (e.g., with the touch receiving unit 2002) the touchdown of the contact, transmit a simulated touchdown event to the second electronic device. In some embodiments, the transmitting unit 2014 is further configured to, in accordance with the determination (e.g., with the determining unit 2008) that the touch input comprises the touchdown of the contact followed by the liftoff of the contact within the first time threshold, and the movement of the contact is less than the threshold amount of movement, transmit a simulated button press event followed by a simulated button release event to the second electronic device.

In some embodiments, the transmitting unit 2014 is further configured to, after detecting (e.g., with the touch receiving unit 2002) the touchdown of the contact, in accordance with a determination (e.g., with the determining unit 2008) that the touch input comprises the touchdown of the contact followed by the liftoff of the contact after the first time threshold, and the movement of the contact during the first time threshold is less than the threshold amount of movement: transmit a simulated button press event to the second electronic device in response to detecting (e.g., with the detecting unit 2006) expiration of the first time threshold, and transmit (e.g., with the transmitting unit 2014) a simulated button release event to the second electronic device in response to detecting (e.g., with the detecting unit 2006) the liftoff of the contact.

In some embodiments, the electronic device comprises a multifunction device running a remote control application, and the remote control application causes the electronic device to transmit (e.g., with the transmitting unit 2014) events, including the corresponding first event and the corresponding second event, to the second electronic device, the transmitted events corresponding to events transmitted to the second electronic device by a dedicated remote control device of the second electronic device, the dedicated remote control device having a trackpad that includes button click functionality.

In some embodiments, the electronic device 2000 further comprises a haptic unit 2012 coupled to the processing unit 2004 and configured to provide tactile output at the electronic device. The haptic unit 2012 optionally provides tactile output to a user of electronic device 2000 in response to detecting (e.g., with the detecting unit 2006) a particular kind of input or input condition. In some embodiments, the processing unit 2004 is further configured to, after detecting (e.g., with the touch receiving unit 2002) the touchdown of the contact, in accordance with the determination (e.g., with the determining unit 2008) that the touch input comprises the touchdown of the contact followed by the liftoff of the contact within the first time threshold, and the movement of the contact is less than the threshold amount of movement, initiate (e.g., with the initiating unit 2010), an operation to provide haptic feedback (e.g., with the haptic unit 2012) at the electronic device 2000 in response to detecting the liftoff of the contact. In some embodiments, the processing unit 2004 is further configured to, in accordance with a determination (e.g., with the determining unit 2008) that the touch input comprises the touchdown of the contact followed by the liftoff of the contact after the first time threshold, and the movement of the contact during the first time threshold is less than the threshold amount of movement, initiate (e.g., with the initiating unit 2010) an operation to provide first haptic feedback (e.g., with the haptic unit 2012) at the electronic device in response to detecting expiration of the first time threshold, and to provide second haptic feedback at the electronic device in response to detecting the liftoff of the contact.

Figure 21:
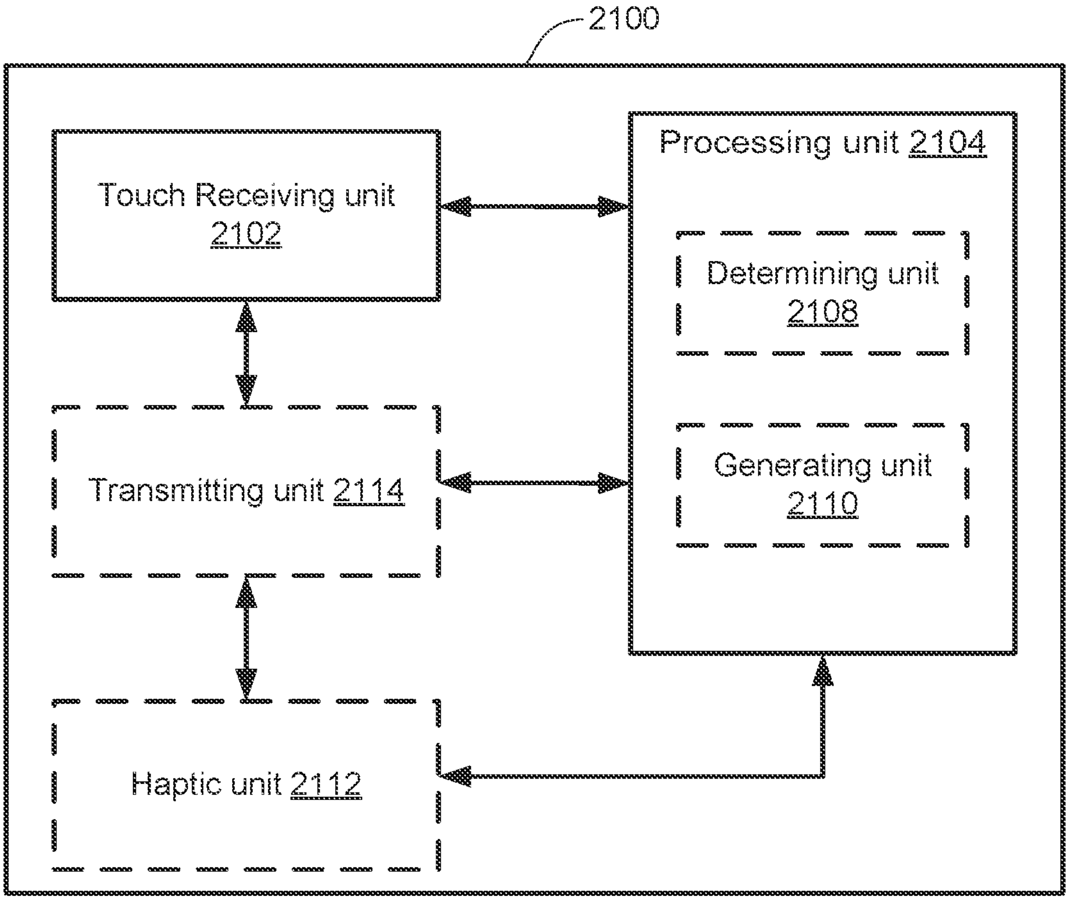

In accordance with some embodiments, FIG. 21 shows a functional block diagram of an electronic device 2100 (e.g., device 100 in FIG. 1A, 300 in FIG. 3 and/or 500 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, an electronic device 2100 optionally includes a touch receiving unit 2102 configured to receive touch inputs and a processing unit 2104 coupled to the receiving unit 2102. The electronic device 2100 optionally includes a transmitting unit 2114 configured to transmit one or more events to a second electronic device, different from the electronic device and coupled to the processing unit 2104 and the touch receiving unit 2102. The electronic device 2100 optionally includes a haptic unit 2112 configured to provide tactile output and coupled to the processing unit 2104, the touch receiving unit 2102, and the transmitting unit 2114. In some embodiments, the processing unit 2104 includes a determining unit 2108, and a generating unit 2110.

In some embodiments, the electronic device 2100 is configured to control a user interface displayed by a display and comprises a touch receiving unit 2102 configured to detect a touch input on a touch-sensitive surface, wherein detecting the touch input includes detecting touchdown of a contact, movement of the contact, and an increase in a characteristic intensity of the contact to a respective intensity. In some embodiments, the processing unit 2104 is configured to, in response to detecting (e.g., with the touch receiving unit 2102) the touch input, in accordance with a determination (e.g., with the determining unit 2108) that the movement of the contact meets first movement criteria when the increase in the characteristic intensity of the contact to the respective intensity is detected, wherein the first movement criteria include a criterion that is met when the contact has a first speed during the touch input, generate (e.g., with the generating unit 2110) a selection input that corresponds to the increase in intensity of the contact to the respective intensity. In some embodiments, the processing unit 2104 is configured to, in response to detecting (e.g., with the touch receiving unit 2102) the touch input, in accordance with a determination (e.g., with the determining unit 2108) that the movement of the contact meets second movement criteria when the increase in the characteristic intensity of the contact to the respective intensity is detected, wherein the second movement criteria include a criterion that is met when the contact has a second speed during the touch input that is greater than the first speed, forgo generation (e.g., with the generating unit 2110) of the selection input that corresponds to the increase in intensity of the contact to the respective intensity.

In some embodiments, generating (e.g., with the generating unit 2110) the selection input that corresponds to the increase in intensity of the contact to the respective intensity comprises initiating (e.g., with the generating unit 2110) an operation to provide haptic feedback (e.g., with the haptic unit 2112) at the electronic device 2100 in response to generating (e.g., with the generating unit 2110) the selection input.

In some embodiments, the electronic device 2100 optionally generates (e.g., with the generating unit 2110) differing types of inputs based on characteristics of a detected (e.g., with the touch receiving unit 2102) contact (e.g., the characteristic intensity, movement of the contact, an increase in the characteristic intensity of the contact to the respective intensity, etc.). In some embodiments, the processing unit 2104 is further configured to, in accordance with a determination (e.g., with the determining unit 2108) that the movement of the contact meets the first movement criteria, and, after the increase in the characteristic intensity of the contact to the respective intensity is detected (e.g., with the touch receiving unit 2102), the movement of the contact is less than a movement threshold, generate (e.g., with the generating unit 2110) a click-and-hold input that corresponds to the contact. In some embodiments, the processing unit 2104 is further configured to, in accordance with a determination (e.g., with the determining unit 2108) that the movement of the contact meets the first movement criteria, and, after the increase in the characteristic intensity of the contact to the respective intensity is detected (e.g., with the touch receiving unit 2102), the movement of the contact is greater than the movement threshold, generate (e.g., with the generating unit 2110) a click-and-drag input that corresponds to the movement of the contact.

In some embodiments, the processing unit 2104 is further configured to, in accordance with a determination (e.g., with the determining unit 2108) that the movement of the contact meets the second movement criteria, and the movement of the contact is less than a movement threshold, generate (e.g., with the generating unit 2110) a tap input that corresponds to the contact. In some embodiments, the processing unit 2104 is further configured to, in accordance with a determination (e.g., with the determining unit 2108) that the movement of the contact meets the second movement criteria, and the movement of the contact is greater than the movement threshold, generate (e.g., with the generating unit 2110) a swipe input that corresponds to the movement of the contact.

In some embodiments, generating (e.g., with the generating unit 2110) the selection input comprises transmitting, with the transmitting unit 2114, a corresponding first event to a second electronic device, different from the electronic device, to select a currently-selected user interface element displayed by the second electronic device. In some embodiments, the electronic device comprises a mobile telephone. In some embodiments, the transmitting unit 2114 is further configured to, in response to detecting (e.g., with the touch receiving unit 2102) the touchdown of the contact, transmit a simulated touchdown event to the second electronic device. In some embodiments, the transmitting unit 2114 is further configured to, in accordance with the determination (e.g., with the determining unit 2108) that the movement of the contact meets the first movement criteria, transmit a simulated button press event to the second electronic device.

In some embodiments, the electronic device comprises a multifunction device running a remote control application, and the remote control application causes the electronic device to transmit (e.g., with the transmitting unit 2114) events, including the corresponding first event, to the second electronic device, the transmitted events corresponding to events transmitted to the second electronic device by a dedicated remote control device of the second electronic device, the dedicated remote control device having a trackpad that includes button click functionality.

In some embodiments, the touch receiving unit 2102 is further configured to detect a second touch input on the touch-sensitive surface, wherein detecting the second touch input includes detecting touchdown of a second contact, movement of the second contact, and an increase in a characteristic intensity of the second contact to a second respective intensity, greater than the respective intensity. In some embodiments, the processing unit 2104 is further configured to, in response to detecting (e.g., with the touch receiving unit 2102) the second touch input, in accordance with a determination (e.g., with the determining unit 2108) that the movement of the second contact meets the second movement criteria when the increase in the characteristic intensity of the second contact to the second respective intensity is detected, wherein the second movement criteria include a criterion that is met when the second contact has the second speed during the touch input that is greater than the first speed, generate (e.g., with the generating unit 2110) a selection input that corresponds to the increase in intensity of the second contact to the second respective intensity. In some embodiments, the processing unit 2104 is further configured to, in response to detecting (e.g., with the touch receiving unit 2102) the second touch input, in accordance with a determination (e.g., with the determining unit 2108) that the movement of the second contact meets third movement criteria when the increase in the characteristic intensity of the second contact to the second respective intensity is detected, wherein the third movement criteria include a criterion that is met when the second contact has a third speed during the second touch input that is greater than the second speed, forgo generation (e.g., with the generating unit 2110) of the selection input that corresponds to the increase in intensity of the second contact to the second respective intensity.

In some embodiments, wherein the movement of the contact meets the second movement criteria, the touch receiving unit 2102 is further configured to detect a second touch input on the touch-sensitive surface after detecting liftoff of the contact in the touch input, wherein detecting the second touch input includes detecting touchdown of a second contact, movement of the second contact, and an increase in a characteristic intensity of the second contact to the respective intensity. In some embodiments, the processing unit 2104 is further configured to, in response to detecting (e.g., with the touch receiving unit 2102) the second touch input, the movement of the second contact meeting the first movement criteria, wherein the first movement criteria includes a criterion that is met when the second contact has the first speed during the second touch input, in accordance with a determination (e.g., with the determining unit 2108) that the touchdown of the second contact is detected after a time threshold of the liftoff of the contact, generate (e.g., with the generating unit 2110) a second selection input that corresponds to the increase in intensity of the second contact to the respective intensity; and in accordance with a determination (e.g., with the determining unit 2108) that the touchdown of the second contact is detected within the time threshold of the liftoff of the contact, forgo generation (e.g., with the generating unit 2110) of the second selection input that corresponds to the increase in intensity of the second contact to the respective intensity.

In some embodiments, wherein the movement of the contact meets the second movement criteria, the touch receiving unit 2102 is further configured to, before detecting liftoff of the contact, detect a slowdown of the contact from the second speed. In some embodiments, the processing unit 2104 is further configured to, in response to detecting (e.g., with the touch receiving unit 2102) the slowdown of the contact from the second speed, in accordance with a determination (e.g., with the determining unit 2108) that the movement of the contact after detecting the slowdown of the contact meets the first movement criteria, wherein the first movement criteria include the criterion that is met when the contact has the first speed during the touch input, generate (e.g., with the generating unit 2110) the selection input that corresponds to the increase in intensity of the contact to the respective intensity. In some embodiments, the first movement criteria include a criterion that is met when, after detecting the slowdown of the contact from the second speed, the contact has the first speed for longer than a time threshold.

Figure 22:
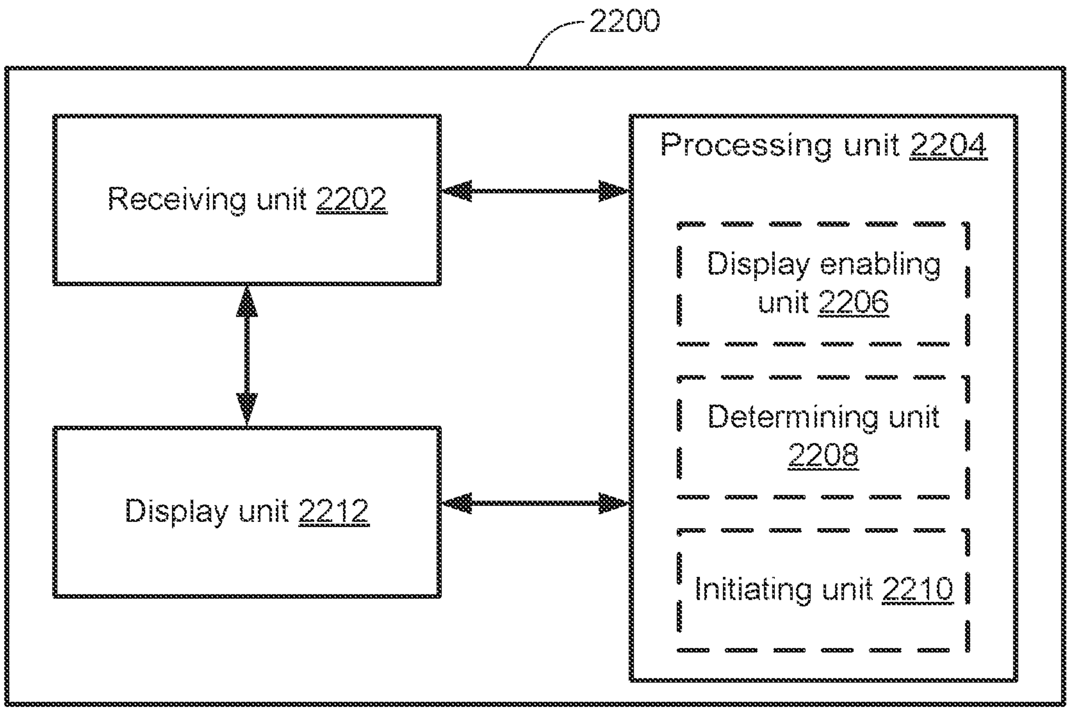

In accordance with some embodiments, FIG. 22 shows a functional block diagram of a first electronic device 2200 (e.g., device 100 in FIG. 1A, 300 in FIG. 3 and/or 500 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 optionally includes a receiving unit 2202 configured to receive inputs, and a processing unit 2204 coupled to the receiving unit 2202. The first electronic device 2200 optionally includes a display unit coupled to the receiving unit 2202 and the processing unit 2204. In some embodiments, the processing unit 2204 includes a display enabling unit 2206, a determining unit 2208, and an initiating unit 2210.

In some embodiments, the processing unit 2204 is configured to concurrently display (e.g., with the display enabling unit 2206), on the display unit 2212, a remote control user interface element including a first set of controls simulating a remote control for navigating a user interface displayed on a remote display controlled by a second electronic device, different from the first electronic device; and a content user interface element including a graphical representation of content being played on the remote display by the second electronic device. In some embodiments, the receiving unit 2202 is configured to, while concurrently displaying (e.g., with the display enabling unit 2206), on the display unit 2212, the remote control user interface element and the content user interface element, receive an input at the first electronic device. In some embodiments, the processing unit 2204 is configured to, in response to receiving the input, in accordance with a determination (e.g., with the determining unit 2208) that the input was received at a respective control of the first set of controls, initiate (e.g., with the initiating unit 2210) an operation to navigate the user interface displayed on the remote display by the second electronic device in accordance with the input received at the respective control.

In some embodiments, the processing unit 2204 is further configured to, in response to receiving (e.g., with the receiving unit 2202) the input, in accordance with a determination (e.g., with the determining unit 2208) that the input corresponds to a request to change a status of the content being played by the second electronic device: initiate (e.g., with the initiating unit 2210) an operation to change the status of the content being played by the second electronic device in accordance with the input and update (e.g., with the display enabling unit 2206) the content user interface element to reflect the change in the status of the content being played by the second electronic device.

In some embodiments, a configuration of the remote control user interface element is independent of the content being played on the remote display by the second electronic device. In some embodiments, the content user interface element includes a second set of one or more controls for navigating the content being played on the remote display by the second electronic device.

In some embodiments, the processing unit 2204 is further configured to, in response to receiving (e.g., with the receiving unit 2202) the input, in accordance with a determination (e.g., with the determining unit 2208) that the input corresponds to a selection of a respective control of the second set of controls in the content user interface element, initiate (e.g., with the initiating unit 2210) an operation to control playback of the content being played on the remote display by the second electronic device while maintaining the concurrent display of the remote control user interface element and the content user interface element, the operation corresponding to the selected respective control of the second set of controls. In some embodiments, the processing unit 2204 is further configured to, in response to receiving (e.g., with the receiving unit 2202) the input, in accordance with a determination (e.g., with the determining unit 2208) that the input corresponds to a selection of the content user interface element other than the one or more of the second set of controls, display (e.g., with the display enabling unit 2206) an expanded content user interface element including the second set of controls and a third set of controls for navigating the content being played by the second electronic device. In some embodiments, the second set of controls and the third set of controls include one or more of a play/pause button, a reverse skip button, a forward skip button, a scrubber bar, a progress bar, a volume control for controlling a volume of the second electronic device, and a favorite button for designating the content being played by the second electronic device as a favorite content.

In some embodiments, the expanded content user interface element is customized to the content being played by the second electronic device. In some embodiments, the expanded content user interface element includes information about the content being played by the second electronic device not displayed on the display unit prior to receiving the input. In some embodiments, the content user interface element includes a first set of information about the content being played by the second electronic device, and the expanded content user interface element includes the first set of information and a second set of information about the content being played by the second electronic device, the second set of information including the information not displayed on the display unit 2212 prior to receiving the input. In some embodiments, the first set of information and the second set of information include one or more of a category of the content being played by the second electronic device, a title of the content being played by the second electronic device, an image of the content being played by the second electronic device, and an artist associated with the content being played by the second electronic device.

In some embodiments, displaying (e.g., with the display enabling unit 2206) the expanded content user interface element includes ceasing display (e.g., with the display enabling unit 2206) of the remote control user interface element on the display unit 2212. In some embodiments, initiating (e.g., with the initiating unit 2210) the operation to navigate the user interface displayed by the second electronic device in accordance with the input received at the respective control comprises maintaining the display (e.g., with the display enabling unit 2206) of the remote control user interface element and the content user interface element on the display unit 2212. In some embodiments, the processing unit 2204 is further configured to, in response to receiving (e.g., from the receiving unit 2202) the input, in accordance with a determination (e.g., with the determining unit 2208) that the input was received at the content user interface element and corresponds to a request to control a state of play of the content being played by the second electronic device, initiate (e.g., with the initiating unit 2210) an operation to control the state of play of the content being played by the second electronic device in accordance with the input received while maintaining the display (e.g., with the display enabling unit 2206) of the remote control user interface element and the content user interface element on the display unit 2212.

In some embodiments, first set of controls includes one or more of a trackpad region, a menu button, a home button, a virtual assistant button, a play/pause button, and volume control. In some embodiments, in accordance with a determination (e.g., with the determining unit 2208) that the second electronic device is configured to adjust a volume level of the content being played by the second electronic device, the first set of controls includes the volume control and in accordance with a determination (e.g., with the determining unit 2208) that the second electronic device is not configured to adjust the volume level of the content being played by the second electronic device, the first set of controls does not include the volume control. In some embodiments, at least one control of the first set of controls is included in the remote control user interface independent of a context of the second electronic device.

In some embodiments, the processing unit 2204 is further configured to, in accordance with a determination (e.g., with the determining unit 2208) that content is being played by the second electronic device, display (e.g., with the display enabling unit 2206) the content user interface element on the display unit 2212, the content user interface element including the graphical representation of the content being played by the second electronic device and in accordance with a determination (e.g., with the determining unit 2208) that content is not being played by the second electronic device, forgo displaying (e.g., with the display enabling unit 2206) the content user interface element on the display unit. In some embodiments, the first electronic device is a portable electronic device, and the second electronic device is a set-top box connected to the remote display. In some embodiments, the first electronic device comprises a mobile telephone, a media player, or a wearable device.

In some embodiments, the processing unit 2204 is further configured to, while concurrently displaying (e.g., with the display enabling unit 2206), on the display unit 2212, the remote control user interface element and the content user interface element, display (e.g., with the display enabling unit 2206), on the display unit 2212, a game controller launch user interface element. In some embodiments, the receiving unit 2202 is further configured to receive a second input, via the receiving unit 2202, corresponding to a selection of the game controller launch user interface element. In some embodiments, the processing unit 2204 is further configured to, in response to receiving the second input, display (e.g., with the display enabling unit 2206), on the display unit 2212, a game controller user interface element.

In some embodiments, the processing unit 2204 is further configured to, in accordance with a determination (e.g., with the determining unit 2208) that a game is running on the second electronic device, display (e.g., with the display enabling unit 2206) a game controller launch user interface element on the remote display, and in accordance with a determination (e.g., with the determining unit 2208) that a game is not running on the second electronic device, forgo displaying (e.g., with the display enabling unit 2206) the game controller launch user interface element on the remote display. In some embodiments, displaying (e.g., with the display enabling unit 2206) the game controller user interface element comprises ceasing display (e.g. with the display enabling unit 2206) of the remote control user interface element and/or the content user interface element on the display unit 2212.

In some embodiments, the game controller user interface element includes a respective set of one or more controls for controlling a respective game running on the second electronic device. In some embodiments, the respective set of controls includes one or more of a directional control and a button input. In some embodiments, in accordance with a determination (e.g., with the determining unit 2208) that the respective game running on the second electronic device is a first game, the respective set of controls is a first set of game controls, and in accordance with a determination (e.g., with the determining unit 2208) that the respective game running on the second electronic device is a second game, different from the first game, the respective set of controls is a second set of game controls, different from the first set of game controls.

In some embodiments, the processing unit 2204 is further configured to, in response to receiving (e.g., with the receiving unit 2202) the second input corresponding to the selection of the game controller launch user interface element, concurrently display (e.g., with the display enabling unit 2206), on the display unit 2212, the game controller user interface element, and a second remote control user interface element, different from the remote control user interface element, the second remote control user interface element including a second set of controls simulating the remote control for navigating the user interface displayed on the remote display controlled by the second electronic device. In some embodiments, the second set of controls, in the second remote control user interface element, simulating the remote control is a subset of the first set of controls, in the remote control user interface element, simulating the remote control. In some embodiments, the first set of controls in the remote control user interface element is displayed (e.g., with the display enabling unit 2206) in a first configuration on the display unit 2212, and the second set of controls in the second remote control user interface element is displayed (e.g., with the display enabling unit 2206) in a second configuration on the display unit 2212, different from the first configuration. In some embodiments, the remote control user interface element and the content user interface element are displayed (e.g., with the display enabling unit 2206) on the display unit 2212 in a first orientation mode, and the game controller user interface element is displayed (e.g., with the display enabling unit 2206) on the display unit 2212 in a second orientation mode, different from the first orientation mode.

Figure 23:
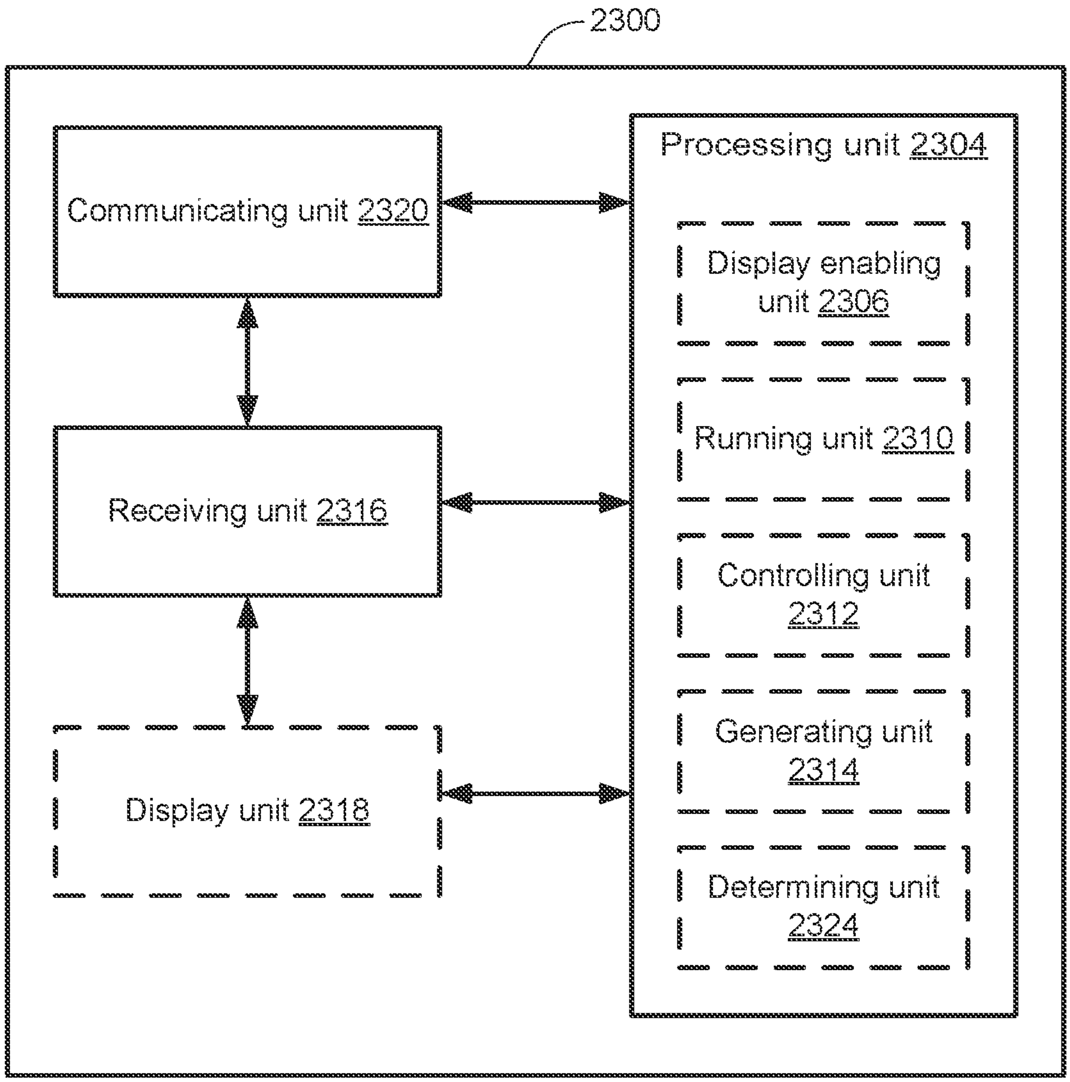

In accordance with some embodiments, FIG. 23 shows a functional block diagram of a first electronic device 2300 (e.g., device 100 in FIG. 1A, 300 in FIGS. 3, 500 and/or 511 in FIG. 5A) configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 23 are, optionally, combined or separated into sub-blocks to implement the principles of the various described embodiments. Therefore, the description herein optionally supports any possible combination or separation or further definition of the functional blocks described herein.

As shown in FIG. 23, a first electronic device 2300 optionally includes a communication unit 2320 configured to communicate with a second electronic device, a receiving unit 2316 coupled to the communication unit 2320 and configured to receive inputs, a display unit 2318 coupled to the communication unit 2320 and the receiving unit 2316 and configured to display information, and a processing unit 2304 coupled to the communication unit 2320, the receiving unit 2316 and the display unit 2318. In some embodiments, the processing unit 2304 includes a display enabling unit 2306, a running unit 2310, a controlling unit 2312, a generating unit 2314 and a determining unit 2324.

In some embodiments, the communicating unit 2320 is configured to communicate with a second electronic device, wherein the second electronic device is controlling display of a text input user interface on a separate display device that is separate from the first electronic device 2300. In some embodiments, the processing unit 2304 is configured to display (e.g., with a display enabling unit 2306) a first user interface on a display (e.g., display unit 2318) of the first electronic device 2300, wherein the first user interface is not a user interface of an application for controlling the second electronic device. In some embodiments, the receiving unit 2316 is configured to, while the first user interface is displayed (e.g., with the display enabling unit 2306) on the display (e.g., display unit 2318) of the first electronic device 2300, receive, from the second electronic device, an indication that text input is needed for the text input user interface displayed on the separate display device. The processing unit 2304 is optionally further configured to, in response to receiving, from the second electronic device, the indication that the text input is needed for the text input user interface displayed on the separate display device, display (e.g., with the display enabling unit 2306) a text input alert on the display (e.g., display unit 2318) of the first electronic device 2300. In some embodiments, the receiving unit 2316 is further configured to receive a sequence of inputs including an input interacting with the text input alert and entry of one or more text characters. In some embodiments, the processing unit 2304 is further configured to, in response to receiving the sequence of one or more inputs, transmit (e.g., with communicating unit 2320), from the first electronic device 2300 to the second electronic device, information that enables the one or more text characters to be provided as text input for the text input user interface displayed on the separate display device, wherein providing the one or more text characters as text input for the text input user interface displayed on the separate display device causes the text input user interface on the separate display device to be updated in accordance with the one or more text characters.

In some embodiments, in accordance with the one or more text characters being first text characters, the text input user interface is updated with a first update. In accordance with the one or more text characters being second text characters, different from the first text characters, the text input user interface is optionally updated with a second update, different from the first update. In some embodiments, the text input user interface displayed on the separate display device includes a soft keyboard, and the indication that the text input is needed for the text input user interface is received (e.g., by the communicating unit 2320) in response to the soft keyboard getting a current focus in the text input user interface. In some embodiments, the indication that text input is needed for the text input user interface displayed on the separate display device is received in response to a request, received by the second electronic device, to enter text into the text input user interface without a soft keyboard being displayed in the text input user interface.

In some embodiments, the input interacting with the text input alert includes an input selecting the text input alert. The processing unit 2304 is optionally further configured to: in response to receiving (e.g., with the receiving unit 2316) the input selecting the text input alert, display (e.g., with the display enabling unit 2306), on the display (e.g., display unit 2318) of the first electronic device 2300, a soft keyboard, wherein the entry of the one or more text characters comprises entry of the one or more text characters at the soft keyboard on the display (e.g., display unit 2318) of the first electronic device 2300. In some embodiments, in accordance with a determination that the text input alert is displayed on a first respective user interface (e.g., with the display enabling unit 2316) of the first electronic device 2300, the input selecting the text input alert is a first input, and in accordance with a determination that the text input alert is displayed (e.g., with the display enabling unit 2316) on a second respective user interface of the first electronic device 2300, different from the first respective user interface, the input selecting the text input alert is a second input, different from the first input.

In some embodiments, the indication that text input is needed for the text input user interface displayed on the separate display device is received in response to a request, received by the second electronic device, to enter text into the text input user interface, the request received by the second electronic device from a remote control device, different from the first and second electronic devices. After the text input alert is displayed (e.g., with the display enabling unit 2306) on the display (e.g., display unit 2318) of the first electronic device 2300, the second electronic device optionally receives input from the remote control device for entering second one or more text characters into the text input user interface, wherein the input from the remote control device causes the text input user interface to be updated in accordance with the second one or more text characters.

The receiving unit 2316 is optionally further configured to, after transmitting (e.g., with the communicating unit 2320), from the first electronic device 2300 to the second electronic device, the information that enables the one or more text characters to be provided as text input for the text input user interface, receive input for running a remote control application (e.g., with the running unit 2310) on the first electronic device 2300. In some embodiments, the processing unit 2304 is further configured to, in response to receiving (e.g., with the receiving unit 2316) the input for running the remote control application on the first electronic device 2300: run (e.g., with the running unit 2310) the remote control application on the first electronic device 2300; and control (e.g., with the controlling unit 2312) the second electronic device via one or more inputs received at the remote control application.

In some embodiments, the processing unit 2304 is further configured to: display (e.g., with the display enabling unit 2306), on the display (e.g., display unit 2318) of the first electronic device 2300, a plurality of categories of alerts, including a first category of alerts and a second category of alerts, wherein the text input alert is included in the first category of alerts. In some embodiments, the processing unit 2304 is configured to generate (e.g., with a generating unit 2314) a first notification type at the first electronic device 2300 in response to displaying (e.g., with display enabling unit 2306) an alert in the first category of alerts, including the text input alert, and generate (e.g., with a generating unit 2314) a second notification type, different from the first notification type, in response to displaying (e.g., with display enabling unit 2306) an alert in the second category of alerts. In some embodiments, the text input alert is displayed (e.g., with display enabling unit 2306) on a lock screen (e.g., displayed on display unit 2318) of the first electronic device 2300.

In some embodiments, the processing unit 2304 is further configured to: concurrently display (e.g., with display enabling unit 2306), on the lock screen (e.g., displayed on display unit 2318) of the first electronic device 2300, the text input alert and a second alert. In some embodiments, while text input is needed for the text input user interface displayed on the separate display device: the receiving unit 2316 is further configured to, while concurrently displaying (e.g., with display enabling unit 2306), on the lock screen (e.g., displayed on display unit 2318) of the first electronic device 2300, the text input alert and the second alert, receive an input for dismissing the lock screen of the first electronic device 2300. In some embodiments, the processing unit 2304 is further configured to, in response to receiving (e.g., with receiving unit 2316) the input for dismissing the lock screen, cease the display (e.g., with display enabling unit 2306) of the lock screen on the display of the first electronic device 2300. In some embodiments, the receiving unit 2316 is further configured to, after ceasing the display (e.g., with the display enabling unit 2306) of the lock screen of the first electronic device 2300, receive an input for displaying (e.g., with the display enabling unit 2306) the lock screen on the display (e.g., display unit 2318) of the first electronic device 2300. In some embodiments, the processing unit 2304 is further configured to, in response to receiving (e.g., with receiving unit 2316) the input for displaying (e.g., with display enabling unit 2306) the lock screen of the first electronic device 2300, display (e.g., with display enabling unit 2306) the lock screen on the display (e.g., display unit 2318) of the first electronic device 2300, wherein the lock screen includes the text input alert, but not the second alert.

The text input alert is optionally displayed (e.g., with display enabling unit 2306) on a respective user interface (e.g., displayed on display unit 2318), other than a lock screen, of the first electronic device 2300. In some embodiments, the processing unit 2304 is further configured to: while text input is needed for the text input user interface displayed on the separate display device: concurrently display (e.g., with display enabling unit 2306), on the respective user interface (e.g., displayed with display unit 2318) of the first electronic device 2300, the text input alert and a second alert; in accordance with a determination (e.g., with determining unit 2324) that one or more first dismissal criteria are satisfied, and cease display (e.g., with display enabling unit 2306) of the text input alert on the respective user interface (e.g., displayed with display unit 2318) of the first electronic device 2300. In some embodiments, the processing unit 2304 is further configured to, in accordance with a determination (e.g., with determining unit 2324) that one or more second dismissal criteria, different from the one or more first dismissal criteria, are satisfied, cease display (e.g., with display enabling unit 2306) of the second alert on the respective user interface (e.g., displayed with display unit 2318) of the first electronic device 2300.

In some embodiments, while the text input alert is displayed (e.g., with display enabling unit 2306) on the display (e.g., display unit 2318) of the first electronic device 2300, a visual indication, which indicates that text input can be provided to the text input user interface of the second electronic device using the first electronic device 2300, is displayed, by the second electronic device, on the separate display device. The processing unit 2304 is optionally further configured to: while displaying (e.g., with display enabling unit 2306) the text input alert on the display (e.g., display unit 2318) of the first electronic device 2300, determine (e.g., with determining unit 2324) that text input is no longer needed for the text input user interface displayed on the separate display device; and in response to determining (e.g., with determining unit 2324) that text input is no longer needed for the text input user interface displayed on the separate display device, cease display (e.g., with display enabling unit 2306) of the text input alert on the display (e.g., display unit 2318) of the first electronic device 2300.

In some embodiments, the first electronic device 2300 is one of a plurality of electronic devices from which text input can be provided to the text input user interface, and on which the text input alert can be displayed (e.g., with display enabling unit 2306), and the second electronic device is configured to: transmit the indication (e.g., received by the communication unit 2320) that the text input is needed for the text input user interface to the first electronic device 2300 in accordance with a determination that a first set of criteria are satisfied, and transmit the indication that the text input is needed for the text input user interface to a respective electronic device, different from the first electronic device 2300, of the plurality of electronic devices in accordance with a determination that a second set of criteria, different from the first set of criteria, are satisfied.

In some embodiments, the second electronic device transmitted the indication (e.g., received by the communication unit 2320) that the text input is needed for the text input user interface to the first electronic device 2300 and a third electronic device, where the third electronic device displays a second text input alert on a display of the third electronic device in response to receiving the indication. In some embodiments, when the sequence of inputs is received (e.g., with receiving unit 2316) at the first electronic device 2300, the third electronic device ceases displaying the second text input alert on the display of the third electronic device.

The processing unit 2304 is optionally further configured to: in response to receiving (e.g., with receiving unit 2316) the sequence of inputs at the first electronic device 2300, display (e.g., with display enabling unit 2306), on the display (e.g., display unit 2318) of the first electronic device 2300, a text entry user interface for the entry of the one or more text characters, wherein the text input alert and the text entry user interface are user interfaces of an operating system of the first electronic device 2300. In some embodiments, the input interacting with the text input alert includes an input selecting the text input alert, and the processing unit 2304 is further configured to, in response to receiving (e.g., with receiving unit 2316) the input selecting the text input alert: in accordance with a determination (e.g., with determining unit 2324) that the first electronic device 2300 is a trusted device of the second electronic device, display (e.g., with display enabling unit 2306), on the display (e.g., display 2318) of the first electronic device 2300, a soft keyboard without requiring user authentication on the first electronic device 2300. In some embodiments, in accordance with a determination (e.g., with determining unit 2324) that the first electronic device 2300 is not a trusted device of the second electronic device, the processing unit 2304 is configured to require (e.g., with display enabling unit 2306) user authentication on the first electronic device 2300, and in response to receiving the user authentication, display (e.g., with display enabling unit 2306), on the display (e.g., display unit 2318) of the first electronic device 2300, the soft keyboard, wherein the entry of the one or more text characters comprises entry of the one or more text characters at the soft keyboard on the display (e.g., display unit 2318) of the first electronic device 2300.

Figure 24:
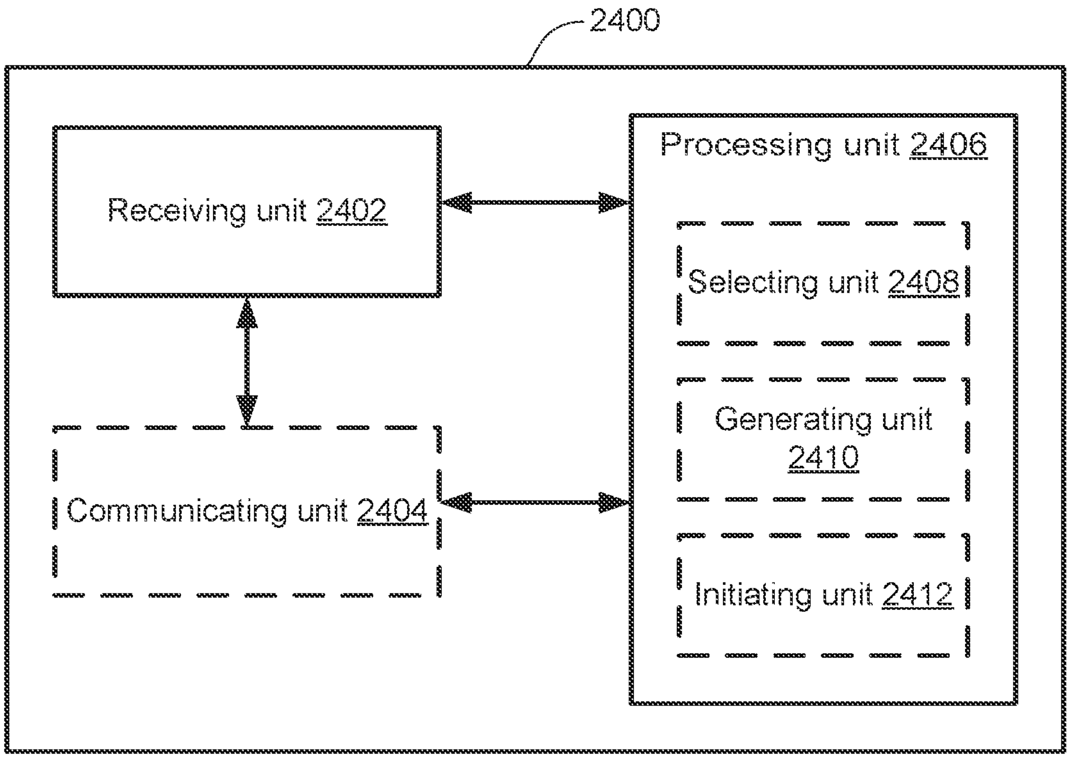

In accordance with some embodiments, FIG. 24 shows a functional block diagram of an electronic device 2400 (e.g., device 100 in FIG. 1A, 300 in FIGS. 3, 500 and/or 511 in FIG. 5A) configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 24 are, optionally, combined or separated into sub-blocks to implement the principles of the various described embodiments. Therefore, the description herein optionally supports any possible combination or separation or further definition of the functional blocks described herein.

As shown in FIG. 24, electronic device 2400 optionally includes a receiving unit 2402 configured to detect inputs (e.g., on a touch-sensitive surface), a communicating unit 2404 coupled to the receiving unit 2402 and configured to communicate with a second electronic device, and a processing unit 2406 coupled to the receiving unit 2402 and the communicating unit 2404. In some embodiments, the processing unit 2406 includes a selecting unit 2408, a generating unit 2410 and an initiating unit 2412.

In some embodiments, the receiving unit 2402 is configured to detect a touch input in a touch navigation region of a touch-sensitive surface of the electronic device, and the processing unit 2406 is configured to, in response to detecting (e.g., with the receiving unit 2402) the touch input in the touch navigation region of the touch-sensitive surface, in accordance with a determination that the touch input was detected at a first location in the touch navigation region of the touch-sensitive surface, select (e.g., with the selecting unit 2408) a first area in the touch navigation region as a primary touch navigation area, wherein the first area is a subset of the touch navigation region that excludes a first auxiliary portion of the touch navigation region, and the first area is selected so as to include the first location, and in accordance with a determination that the touch input was detected at a second location in the touch navigation region of the touch-sensitive surface, select (e.g., with the selecting unit 2408) a second area in the touch navigation region as the primary touch navigation area, wherein the second area is a subset of the touch navigation region that excludes a second auxiliary portion of the touch navigation region, the second area is selected so as to include the second location, and the second area is different from the first area. In some embodiments, the second location at which the touch input was detected is in the first auxiliary portion of the touch navigation region, and the first location at which the touch input was detected is in the second auxiliary portion of the touch navigation region. In some embodiments, the first area in the touch navigation region includes at least a portion of the second auxiliary portion of the touch navigation region, and the second area in the touch navigation region includes at least a portion of the first auxiliary portion of the touch navigation region. In some embodiments, the first area in the touch navigation region includes at least a portion of the second area in the touch navigation region.

In some embodiments, detecting the touch input includes detecting a contact on the touch-sensitive surface, the processing unit 2406 is further configured to, in response to detecting (e.g., with the receiving unit 2402) the touch input in the touch navigation region of the touch-sensitive surface, select (e.g., with the selecting unit 2408) an area outside of the primary touch navigation area in the touch navigation region as an auxiliary touch navigation area, the receiving unit 2402 is further configured to, after selecting the primary touch navigation area and the auxiliary touch navigation area, detect a second touch input including a movement of the contact in the touch navigation region of the touch-sensitive surface of the electronic device that includes movement of the contact through a portion of the primary touch navigation area and a portion of the auxiliary touch navigation area, and the processing unit 2406 is further configured to, in response to detecting the second touch input in the touch navigation region of the touch-sensitive surface, generate (e.g., with the generating unit 2410) navigational input that includes a navigational-input magnitude of navigation that is based on a touch-movement magnitude of the movement of the contact in the touch navigation region, wherein movement of the contact in the primary touch navigation area results in a navigational input with a greater navigational-input magnitude than movement of the contact in the auxiliary touch navigation area.

In some embodiments, when generating the navigational input in response to detecting the second touch input: a respective magnitude of touch-movement of the contact in the primary touch navigation area results in a navigational input with a first navigational-input magnitude; and the respective magnitude of touch-movement of the contact in the auxiliary touch navigation area results in a navigational input with a second navigational-input magnitude that is less than the first navigational-input magnitude. In some embodiments, when generating the navigational input in response to detecting the second touch input: a respective magnitude of touch-movement of the contact in the primary touch navigation area results in a navigational input with a first navigational-input magnitude; and the respective magnitude of touch-movement of the contact in the auxiliary touch navigation area is ignored.

In some embodiments, a first edge of the primary touch navigation area is positioned at a first distance from a corresponding first edge of the touch navigation region, and a second edge of the primary touch navigation area is positioned at a second distance, different from the first distance, from a corresponding second edge of the touch navigation region, the receiving unit 2402 is further configured to, after selecting (e.g., with the selecting unit 2408) the primary touch navigation area, detect a second touch input on the touch-sensitive surface comprising a respective amount of movement of the contact from a respective edge of the primary touch navigation area toward a respective edge of the touch navigation region of the touch-sensitive surface, and the processing unit 2406 is further configured to, in response to detecting (e.g., with the receiving unit 2402) the second touch input on the touch-sensitive surface: in accordance with a determination that the respective edge of the primary touch navigation area is the first edge of the primary touch navigation area, and the movement of the contact is toward the first edge of touch navigation region, initiate (e.g., with the initiating unit 2412) an operation to perform a navigational action having a first magnitude in accordance with the respective amount of movement of the contact; and in accordance with a determination that the respective edge of the primary touch navigation area is the second edge of the primary touch navigation area, and the movement of the contact is toward the second edge of touch navigation region, initiate (e.g., with the initiating unit 2412) an operation to perform the navigational action having a second magnitude, different from the first magnitude, in accordance with the respective amount of movement of the contact.

In some embodiments, the primary touch navigation area is selected so that a location of the touch input in the primary touch navigation area corresponds to a location of the touch input in the touch navigation region of the touch-sensitive surface. In some embodiments, the receiving unit 2402 is further configured to, after selecting (e.g., with the selecting unit 2408) the primary touch navigation area, detect a navigational input in the touch navigation region of the touch-sensitive surface of the electronic device that includes a contact and movement of the contact that starts inside of the primary touch navigation area of the touch-sensitive surface and moves into the auxiliary touch navigation area of the touch-sensitive surface, and the processing unit 2406 is further configured to, in response to detecting (e.g., with the receiving unit 2402) the navigational input: while the contact is inside the primary touch navigation area, generate (e.g., with the generating unit 2410) navigational input for performing a navigational action corresponding to the detected navigational input; and while the contact is in the auxiliary touch navigation area: in accordance with a determination that a speed of the movement of the contact is less than a threshold speed, continue to generate (e.g., with the generating unit 2410) the navigational input for performing the navigational action corresponding to the detected navigational input; and in accordance with a determination that the speed of the movement of the contact is greater than the threshold speed, cease the generation (e.g., with the generating unit 2410) of the navigational input for performing the navigational action.

In some embodiments, the speed of the movement of the contact is greater than the threshold speed, and the navigational input has moved into the auxiliary touch navigation area, the receiving unit 2402 is further configured to, after ceasing the generation (e.g., with the generating unit 2410) of the navigational input, detect movement of the contact back into the primary touch navigation area, and the processing unit 2406 is further configured to, in response to detecting (e.g., with the receiving unit 2402) the movement of the contact back into the primary touch navigation area, resume the generation (e.g., with the generating unit 2410) of the navigational input for performing the navigational action corresponding to the detected navigational input inside the primary navigation area. In some embodiments, the electronic device 2400 is configured to provide input to a second electronic device, a dedicated remote control device is configured to provide input to the second electronic device, the dedicated remote control device having a touch-sensitive surface for providing input to the second electronic device, and a size of the primary touch navigation area in the touch navigation region of the touch-sensitive surface of the electronic device 2400 corresponds to a size of the touch-sensitive surface of the dedicated remote control device.

In some embodiments, in accordance with a determination that the electronic device 2400 is a first device on which the touch navigation region has a first size, the primary touch navigation area has a respective size, and in accordance with a determination that the electronic device 2400 is a second device on which the touch navigation region has a second size, larger than the first size, the primary touch navigation area has the respective size. In some embodiments, the touch navigation region includes a plurality of predefined regions at a plurality of predefined locations in the touch navigation region, independent of a location of the primary touch navigation area in the touch navigation region, the plurality of predefined regions corresponding to predetermined navigational inputs. In some embodiments, a dedicated remote control device is configured to provide input to a second electronic device, the dedicated remote control device having a touch-sensitive surface for providing input to the second electronic device, and the dedicated remote control device configured to provide, to the second electronic device, a command of a touch input type corresponding to a touch input detected on the touch-sensitive surface of the dedicated remote control device, and the processing unit 2406 is further configured to, in response to detecting (e.g., with the receiving unit 2402) the touch input in the touch navigation region of the touch-sensitive surface electronic device, provide (e.g., with the generating unit 2410), to the second electronic device, a command of the touch input type corresponding to the touch input detected in the touch navigation region of the touch-sensitive surface of the electronic device 2400.

In some embodiments, the touch input comprises touch-down of a contact, the receiving unit 2402 is further configured to, after selecting the primary touch navigation area in the touch navigation region of the touch-sensitive surface, detect movement of the contact relative to the primary touch navigation area, and the processing unit 2406 is further configured to, in response to detecting (e.g., with the receiving unit 2402) the movement of the contact, initiate (e.g., with the initiating unit 2412) an operation to perform a navigational action at a second electronic device in accordance with the movement of the contact relative to the primary touch navigation area. In some embodiments, the navigational action comprises scrolling content displayed by the second electronic device in accordance with the movement of the contact relative to the primary touch navigation area. In some embodiments, the navigational action comprises a directional action in a game displayed by the second electronic device in accordance with the movement of the contact relative to the primary touch navigation area. In some embodiments, the navigational action comprises rotating an object displayed by the second electronic device in a simulated third dimension in accordance with the movement of the contact relative to the primary touch navigation area. In some embodiments, the navigational action comprises moving a current play position through content playing on the second electronic device in accordance with the movement of the contact relative to the primary touch navigation area.

In some embodiments, the touch input comprises touchdown of a contact, the receiving unit 2402 is further configured to, after selecting (e.g., with the selecting unit 2408) the primary touch navigation area in the touch navigation region of the touch-sensitive surface, detect liftoff of the contact followed by a second touch input at a third location, different from the first and second locations, in the touch navigation region of the touch-sensitive surface, and the processing unit 2406 is further configured to, in response to detecting (e.g., with the receiving unit 2402) the second touch input at the third location in the touch navigation region of the touch-sensitive surface, select (e.g., with the selecting unit 2408) a third area, different from the first area and the second area, in the touch navigation region as the primary touch navigation area, the third area selected so as to include the third location.

Figure 25:
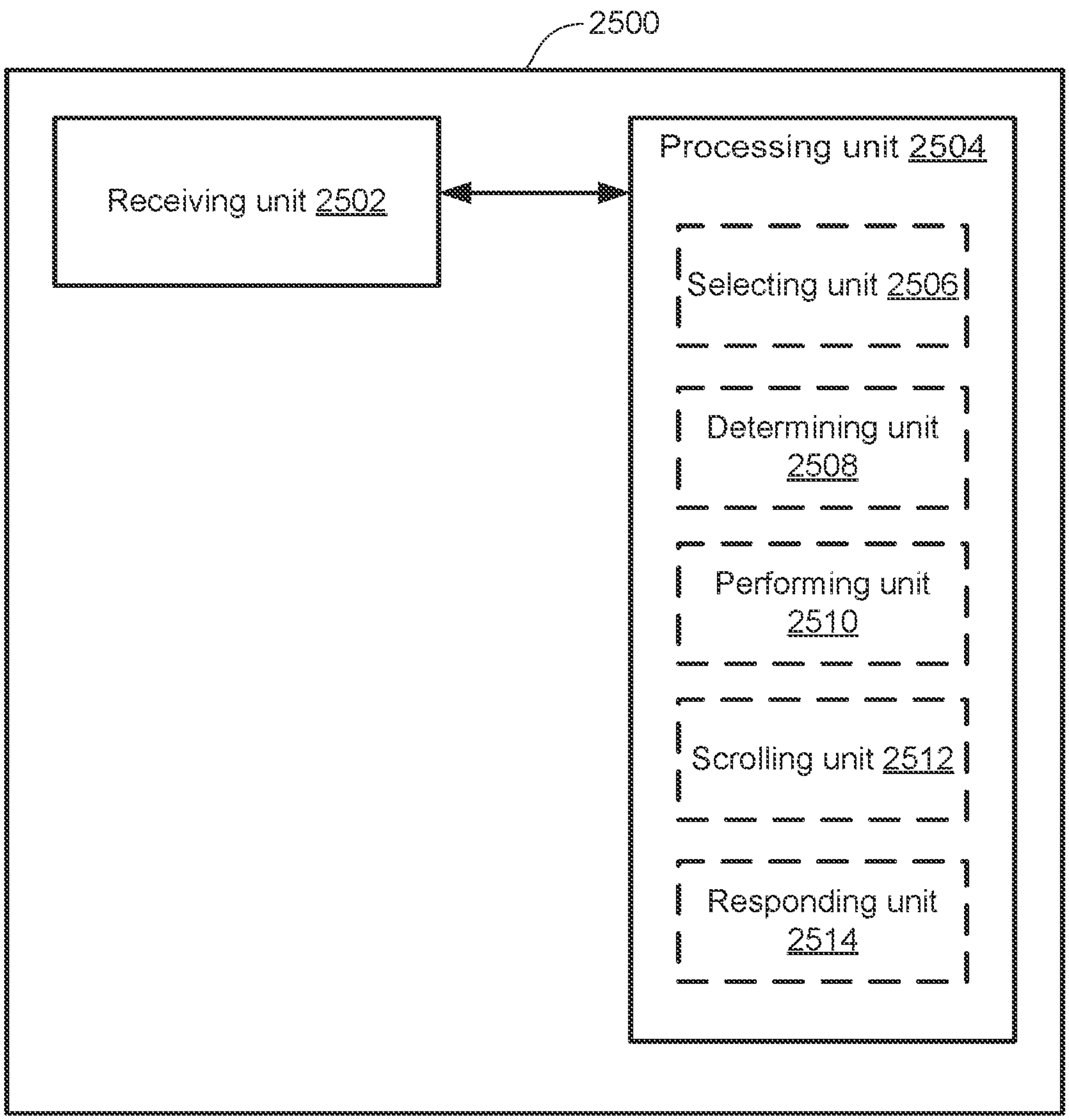

In accordance with some embodiments, FIG. 25 shows a functional block diagram of a first electronic device 2500 (e.g., device 100 in FIG. 1A, 300 in FIGS. 3, 500 and/or 511 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, a first electronic device 2500 optionally includes a receiving unit 2502 configured to receive inputs and a processing unit 2504 coupled to the receiving unit 2502. In some embodiments, the processing unit 2504 includes a selecting unit 2506, a determining unit 2508, a performing unit 2510, a scrolling unit 2512, and a responding unit 2514.

In some embodiments, the receiving unit 2502 is configured to detect touchdown of a contact at a first location in a touch navigation region of a touch-sensitive surface of the first electronic device 2500. In some embodiments, the processing unit 2504 is configured to, in response to detecting (e.g., with the receiving unit 2502) the touchdown of the contact at the first location in the touch navigation region of the touch-sensitive surface, select (e.g., with the selecting unit 2506) a respective area of the touch navigation region as a primary touch navigation area, and in accordance with a determination (e.g., with the determining unit 2508) that movement of the contact satisfies first movement criteria, select (e.g., with the selecting unit 2506) a first area in the touch navigation region as the primary touch navigation area. In some embodiments, the first area is a subset of the touch navigation region that excludes a first auxiliary portion of the touch navigation region, and the first area is selected (e.g., with the selecting unit 2506) so as to include the first location. In some embodiments, the processing unit 2504 is configured to, in accordance with a determination (e.g., with the determining unit 2508) that the movement of the contact satisfies second movement criteria, different from the first movement criteria, select (e.g., with the selecting unit 2506) a second area, different from the first area, in the touch navigation region as the primary touch navigation area. In some embodiments, the second area is a subset of the touch navigation region that excludes a second auxiliary portion of the touch navigation region that is different from the first auxiliary portion, and the second area is selected (e.g., with the selecting unit 2506) so as to include the first location. In some embodiments, the receiving unit 2502 is further configured to, after selecting (e.g., with the selecting unit 2506) the respective area as the primary touch navigation area, detect second movement of the contact on the touch-sensitive surface. In some embodiments, the processing unit 2504 is further configured to, in response to detecting the second movement of the contact on the touch-sensitive surface, perform (e.g., with the performing unit 2510) a user interface navigation operation in a user interface that is associated with the first electronic device 2500. In some embodiments, movement within the primary touch navigation area corresponds to a respective range of navigation operations in the user interface that is determined (e.g., with the determining unit 2508) based on a distance between the contact and an edge of the primary touch navigation area.

In some embodiments, the first movement criteria include a criterion that is satisfied when, within a time threshold of the touchdown of the contact, a direction of the movement of the contact is a first direction. In some embodiments, the second movement criteria include a criterion that is satisfied when, within the time threshold of the touchdown of the contact, the direction of the movement of the contact is a second direction, different than the first direction. In some embodiments, the first movement criteria and the second movement criteria include a criterion that is satisfied when, within the time threshold of the touchdown of the contact, a speed of the movement of the contact is greater than a threshold speed. In some embodiments, the first movement criteria and the second movement criteria include a criterion that is satisfied when the contact moves more than a threshold distance within the time threshold of the touchdown of the contact.

In some embodiments, the primary touch navigation area is selected (e.g., with the selecting unit 2506) such that the first location of the touchdown of the contact is located closer to an edge of the primary touch navigation area that the contact is moving away from than to an edge of the primary touch navigation area that the contact is moving towards. In some embodiments, the first movement criteria include a criterion that is satisfied when, within a time threshold of the touchdown of the contact, the movement of the contact satisfies the first movement criteria. In some embodiments, the second movement criteria include a criterion that is satisfied when, within the time threshold of the touchdown of the contact, the movement of the contact satisfies the second movement criteria.

In some embodiments, the processing unit 2504 is further configured to, in response to detecting (e.g., with the receiving unit 2502) the touchdown of the contact at the first location in the touch navigation region of the touch-sensitive surface, in accordance with a determination (e.g., with the determining unit 2508) that the contact has movement less than a movement threshold within the time threshold of the touchdown of the contact, select (e.g., with the selecting unit 2506) a third area, different from the first area and the second area, in the touch navigation region as the primary touch navigation area. In some embodiments, the third area is a subset of the touch navigation region that excludes a third auxiliary portion of the touch navigation region that is different from the first auxiliary portion and the second auxiliary portion, the third area is selected (e.g., with the selecting unit 2506) so as to include the first location, and a relative location, in the primary touch navigation area, of the first location of the contact corresponds to a relative location, in the touch navigation region, of the first location of the contact. In some embodiments, the primary touch navigation area is selected (e.g., with the selecting unit 2506) such that a relative location, in the primary touch navigation area, of the first location of the contact along an axis perpendicular to a primary axis of the movement of the contact corresponds to a relative location, in the touch navigation region, of the first location of the contact along the axis perpendicular to the primary axis of the movement of the contact.

In some embodiments, the second movement of the contact on the touch-sensitive surface comprises a downward swipe on the touch-sensitive surface. In some embodiments, in accordance with a determination (e.g., with the determining unit 2508) that the downward swipe is located on a predefined edge of the primary touch navigation area, the user interface navigation operation comprises accelerated scrolling (e.g., with the scrolling unit 2512) of content displayed in the user interface that is associated with the first electronic device 2500. In some embodiments, in accordance with a determination (e.g., with the determining unit 2508) that the downward swipe is not located on the predefined edge of the primary touch navigation area, the user interface navigation operation comprises regular scrolling (e.g., with the scrolling unit 2512) of the content displayed in the user interface that is associated with the first electronic device 2500.

In some embodiments, the receiving unit 2502 is further configured to, after selecting (e.g., with the selecting unit 2506) the primary touch navigation area, detect, on the touch-sensitive surface, movement of the contact across a boundary of the primary touch navigation area. In some embodiments, the processing unit 2504 is further configured to, in response to detecting (e.g., with the receiving unit 2502) the movement of the contact across the boundary of the primary touch navigation area, in accordance with a determination (e.g., with the determining unit 2508) that the movement of the contact across the boundary of the primary touch navigation area satisfies extended navigation criteria, including a criterion that is satisfied when a speed of the movement of the contact is less than a threshold speed, select (e.g., with the selecting unit 2506) a new primary touch navigation area, different than the primary touch navigation area, in the touch navigation region, wherein the new primary touch navigation area includes a location of the contact in the touch navigation region, and respond (e.g., with the responding unit 2514) to movement of the contact within the new primary touch navigation area. In some embodiments, the processing unit 2504 is further configured to, in accordance with a determination (e.g., with the determining unit 2508) that the movement of the contact across the boundary of the primary touch navigation area does not satisfy the extended navigation criteria, forego (e.g., with the selecting unit 2506) selecting the new primary touch navigation area, and forego (e.g., with the responding unit 2514) responding to the movement of the contact outside of the primary touch navigation area.

In some embodiments, the movement of the contact across the boundary of the primary touch navigation area comprises a primary axis of the movement of the contact. In some embodiments, the new primary touch navigation area is selected (e.g., with the selecting unit 2506) such that a location of the contact, along the primary axis of the movement of the contact, within the new primary touch navigation area is different from a location of the contact, along the primary axis of the movement of the contact, within the primary touch navigation area. In some embodiments, the primary touch navigation area creation criteria includes a criterion that is satisfied when a size of the touch navigation region is greater than a threshold size, and is not satisfied when the size of the touch navigation region is less than the threshold size. In some embodiments, selecting (e.g., with the selecting unit 2506) the new primary touch navigation area comprises indicating, to a second electronic device controlled by the first electronic device 2500, liftoff of the contact from the primary touch navigation area and touchdown of a new contact in the new primary touch navigation area.

In some embodiments, the receiving unit 2502 is further configured to detect a swipe input in the primary touch navigation area. In some embodiments, the processing unit 2504 is further configured to, in response to detecting (e.g., with the receiving unit 2502) the swipe input in the primary touch navigation area, scroll (e.g., with the scrolling unit 2512) content in the user interface that is associated with the first electronic device 2500 in accordance with the swipe input. In some embodiments, performing (e.g., with the performing unit 2510) the user interface navigation operation in response to detecting (e.g., with the receiving unit 2502) the second movement of the contact on the touch-sensitive surface includes moving an object in the user interface that is associated with the first electronic device 2500 in accordance with the second movement of the contact on the touch-sensitive surface. In some embodiments, performing (e.g., with the performing unit 2510) the user interface navigation operation in response to detecting (e.g., with the receiving unit 2502) the second movement of the contact on the touch-sensitive surface includes moving a current focus from a first object to a second object in the user interface that is associated with the first electronic device 2500 in accordance with the second movement of the contact on the touch-sensitive surface. In some embodiments, a size of the primary touch navigation area corresponds to a size of a touch-sensitive surface of a dedicated physical remote control for controlling the user interface that is associated with the first electronic device 2500.

Figure 26:
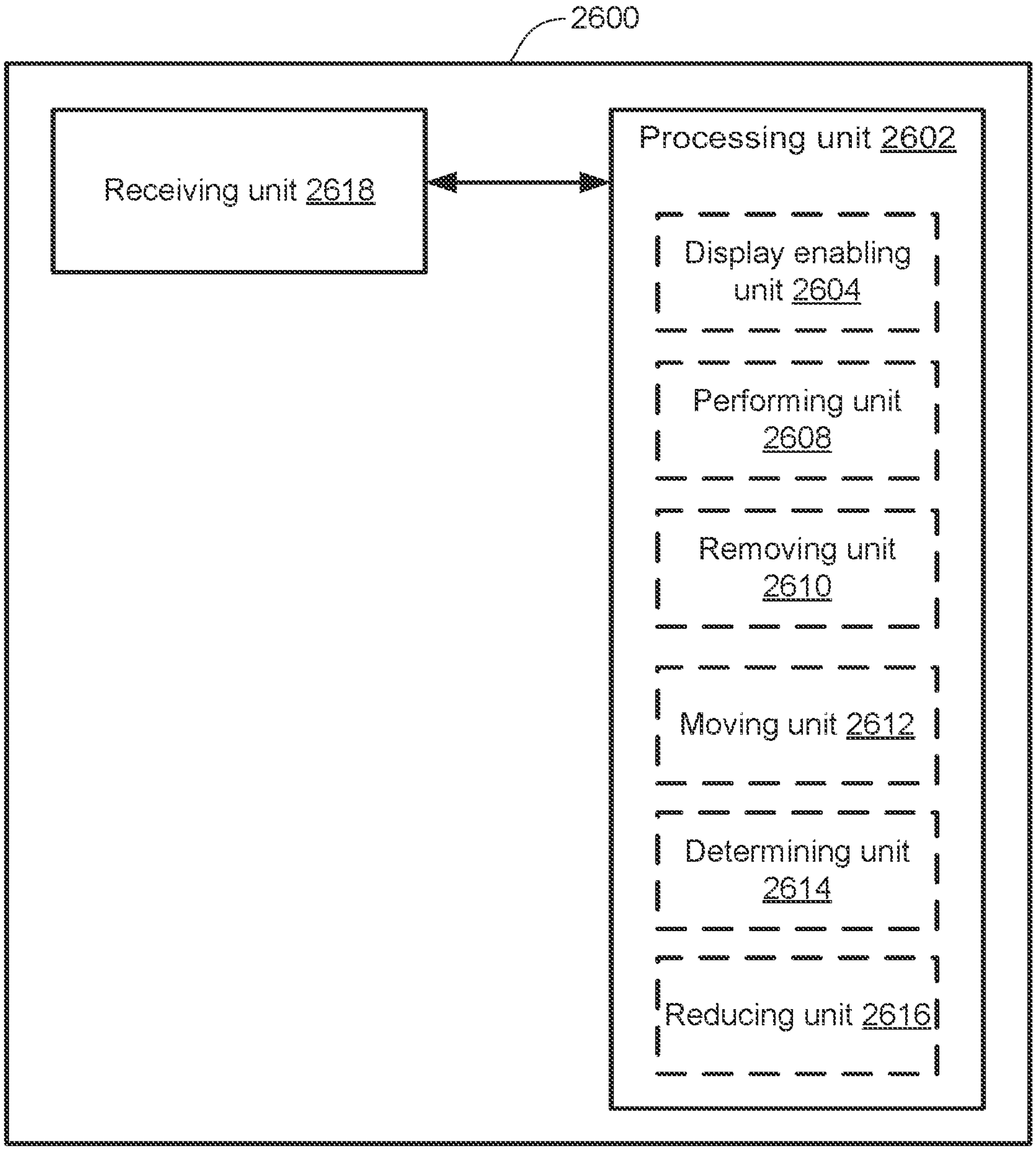

In accordance with some embodiments, FIG. 26 shows a functional block diagram of a first electronic device 2600 (e.g., device 100 in FIG. 1A, 300 in FIGS. 3, 500 and/or 511 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, a first electronic device 2600 optionally includes a receiving unit 2618 configured to receive inputs and a processing unit 2602 coupled to the receiving unit 2618. In some embodiments, the processing unit 2602 includes a display enabling unit 2604, a performing unit 2608, a removing unit 2610, a moving unit 2612, a determining unit 2614, and a reducing unit 2616.

In some embodiments, the processing unit 2602 is configured to display (e.g., with the display enabling unit 2604), on a touch screen of the first electronic device 2600, a user interface that includes a touch navigation region, and a user interface region that includes one or more selectable elements overlaid on the touch navigation region, including a first selectable element displayed at a first location in the user interface. In some embodiments, touch input detected (e.g., with the receiving unit 2618) in the touch navigation region causes performance (e.g., with the performing unit 2608) of one or more touchpad operations. In some embodiments, touch input detected (e.g., with the receiving unit 2618) at the one or more selectable elements causes performance (e.g., with the performing unit 2608) of one or more control operations. In some embodiments, the receiving unit 2618 is configured to, while displaying (e.g., with the display enabling unit 2604), on the touch screen, the user interface, detect, at the touch screen, a first touch input at the first location in the user interface. In some embodiments, the processing unit 2602 is further configured to, in response to detecting (e.g., with the receiving unit 2618) the first touch input, perform (e.g., with the performing unit 2608) a first control operation of the one or more control operations that corresponds to the first selectable element. In some embodiments, the processing unit 2602 is further configured to, after performing (e.g., with the performing unit 2608) the first control operation, remove (e.g., with the removing unit 2610) at least a portion of the user interface region that includes the first selectable element from the first location in the user interface. In some embodiments, the receiving unit 2618 is further configured to, after removing (e.g., with the removing unit 2610) the at least the portion of the user interface region from the first location in the user interface, detect, at the touch screen, a second touch input at the first location in the user interface. In some embodiments, the processing unit 2602 is further configured to, in response to detecting (e.g., with the receiving unit 2618) the second touch input, perform (e.g., with the performing unit 2608) a first touchpad operation of the one or more touchpad operations in accordance with the second touch input. In some embodiments, the user interface region comprises a control panel that includes one or more controls for controlling a second electronic device.

In some embodiments, removing (e.g., with the removing unit 2610) the at least the portion of the user interface region from the first location in the user interface comprises moving the user interface region from a location in the user interface at which the user interface region overlays a first portion of the touch navigation region to another location in the user interface at which the user interface region overlays a second portion of the touch navigation region, different from the first portion of the touch navigation region. In some embodiments, the processing unit 2602 is further configured to move (e.g., with the moving unit 2612) the user interface region in response to detecting (e.g., with the receiving unit 2618), at the touch screen, touchdown of a contact, movement of the contact from an initial location in the user interface to a final location in the user interface, and liftoff of the contact. In some embodiments, moving (e.g., with the moving unit 2612) the user interface region comprises moving the user interface region from an initial position in the user interface to a respective position in the user interface in accordance with the movement of the contact from the initial location in the user interface to the final location in the user interface. In some embodiments, the processing unit 2602 is further configured to, in response to detecting (e.g., with the receiving unit 2618) the liftoff of the contact, move (e.g., with the moving unit 2612) the user interface region from the respective position in the user interface to a final position in the user interface that is a position in the user interface of a plurality predefined positions in the user interface that is closest to the respective position in the user interface.

In some embodiments, the processing unit 2602 is further configured to move (e.g., with the moving unit 2612) the user interface region in response to detecting (e.g., with the receiving unit 2618), at the touch screen, touchdown of a contact, movement of the contact from an initial location in the user interface to a final location in the user interface, and liftoff of the contact. In some embodiments, moving (e.g., with the moving unit 2612) the user interface region comprises moving the user interface region from an initial position in the user interface to a respective position in the user interface in accordance with the movement of the contact from the initial location in the user interface to the final location in the user interface. In some embodiments, the processing unit 2602 is further configured to, in response to detecting (e.g., with the receiving unit 2618) the liftoff of the contact, maintain (e.g., with the moving unit 2612) the user interface region at the respective position in the user interface.

In some embodiments, the processing unit 2602 further configured to, in accordance with a determination (e.g., with the determining unit 2614) that a size of the user interface is greater than a threshold size, allow (e.g., with the moving unit 2612) the user interface region to be moved within the user interface in response to detecting (e.g., with the receiving unit 2618) input to move the user interface region within the user interface. In some embodiments, the processing unit 2602 further configured to, in accordance with a determination (e.g., with the determining unit 2614) that the size of the user interface is less than the threshold size, prevent (e.g., with the moving unit 2612) the user interface region from being moved within the user interface in response to detecting input to move the user interface region within the user interface.

In some embodiments, the touch screen is concurrently displaying (e.g., with the display enabling unit 2604) the user interface of a first application and a second user interface of a second application, different than the first application. In some embodiments, the user interface of the first application is displayed (e.g., with the display enabling unit 2604) in a first region of the touch screen. In some embodiments, the second user interface of the second application is displayed (e.g., with the display enabling unit 2604) in a second region of the touch screen, different than the first region of the touch screen. In some embodiments, determining (e.g., with the determining unit 2614) whether the size of the user interface is greater than or less than the threshold size comprises determining whether a size of the first region of the touch screen is greater than or less than a threshold size. In some embodiments, determining (e.g., with the determining unit 2614) whether the size of the user interface is greater than or less than the threshold size comprises determining whether the user interface includes a second user interface region that includes information about content that is playing on a second electronic device that is controlled by the first electronic device 2600.

In some embodiments, the touch navigation region is displayed (e.g., with the display enabling unit 2604) with a first visual characteristic, and the user interface region is displayed (e.g., with the display enabling unit 2604) with a second visual characteristic, different than the first visual characteristic.

In some embodiments, the receiving unit 2618 is further configured to, while displaying (e.g., with the display enabling unit 2604) the user interface, receive an input requesting display of a second user interface region that includes information about content that is playing on a second electronic device that is controlled by the first electronic device 2600. In some embodiments, the processing unit 2602 is further configured to, in response to receiving (e.g., with the receiving unit 2618) the input requesting the display of the second user interface region, in accordance with a determination (e.g., with the determining unit 2614) that a size of the user interface is greater than a threshold size, reduce (e.g., with the reducing unit 2616) a size of the touch navigation region in the user interface, and concurrently display (e.g., with the display enabling unit 2604), in the user interface, the touch navigation region having the reduced size, the user interface region that includes the one or more selectable elements, and the second user interface region. In some embodiments, the processing unit 2602 is further configured to, in accordance with a determination (e.g., with the determining unit 2614) that the size of the user interface is less than the threshold size, cease (e.g., with the display enabling unit 2604) display, in the user interface, of the touch navigation region and the user interface region that includes the one or more selectable elements, and display (e.g., with the display enabling unit 2604), in the user interface, the second user interface region.

In some embodiments, the receiving unit 2618 is further configured to, while displaying (e.g., with the display enabling unit 2604) the second user interface region that includes the information about the content that is playing on the second electronic device that is controlled by the first electronic device 2600, receive an input changing a size of the user interface. In some embodiments, the processing unit 2602 is further configured to, in response to receiving (e.g., with the receiving unit 2618) the input changing the size of the user interface, in accordance with a determination (e.g., with the determining unit 2614) that the size of the user interface has changed from being less than the threshold size to being greater than the threshold size, redisplay (e.g., with the display enabling unit 2604) the touch navigation region and the user interface region in the user interface such that the touch navigation region, the user interface region that includes the one or more selectable elements and the second user interface region are concurrently displayed in the user interface. In some embodiments, the processing unit 2602 is further configured to, in accordance with a determination (e.g., with the determining unit 2614) that the size of the user interface has changed from being greater than the threshold size to being less than the threshold size, cease (e.g., with the display enabling unit 2604) display, in the user interface, of the touch navigation region and the user interface region that includes the one or more selectable elements while maintaining the display (e.g., with the display enabling unit 2604) of the second user interface region in the user interface.

In some embodiments, the touch screen is concurrently displaying (e.g., with the display enabling unit 2604) the user interface of a first application and a second user interface of a second application, different than the first application. In some embodiments, the input changing the size of the user interface comprises changing (e.g., with the display enabling unit 2604) the size of the user interface of the first application in a first manner while changing (e.g., with the display enabling unit 2604) a size of the second user interface of the second application in a second manner, different than the first manner. In some embodiments, determining (e.g., with the determining unit 2614) that the size of the user interface is greater than the threshold size comprises determining that the first electronic device 2600 is a first respective device. In some embodiments, determining (e.g., with the determining unit 2614) that the size of the user interface is less than the threshold size comprises determining that the first electronic device 2600 is a second respective device, different than the first respective device. In some embodiments, the user interface comprises a media control user interface for controlling a second electronic device, the touch navigation region is used to provide one or more directional inputs to the second electronic device, and the user interface region is used to navigate between a plurality of levels of a user interface displayed by the second electronic device.

The operations described above with reference to FIGS. 7A-7E, 9A-9G, 11A-11J, 13A-13K, 15A-15H, 17A-17G and 19A-19H are, optionally, implemented by components depicted in FIGS. 1A-1B or FIGS. 20-26. For example, detecting operations 702, 902, 1502, 1702, 1908 and 1916, initiating operations 706, 708 and 1110, generating operation 906, receiving operations 1108, 1304 and 1308, performing operations 1910 and 1918 and selecting operations 1506, 1508, 1706, 1708 and 1710 are, optionally implemented by event sorter 170, event recognizer 180, and event handler 190. Event monitor 171 in event sorter 170 detects a contact on a touch-sensitive surface or touch screen, and event dispatcher module 174 delivers the event information to application 136-1. A respective event recognizer 180 of application 136-1 compares the event information to respective event definitions 186, and determines whether a first contact at a first location on the touch-sensitive surface or touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B or FIGS. 20-26.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device with one or more processors and memory:

detecting a touch input on a touch-sensitive surface of an input device that controls a user interface displayed by a display, wherein detecting the touch input includes detecting touchdown of a contact, movement of the contact, and an increase in a characteristic intensity of the contact to a respective intensity, wherein the characteristic intensity corresponds to force with which the contact is touching the touch-sensitive surface of the input device; and in response to detecting the touch input:

in accordance with a determination that the movement of the contact meets first movement criteria when the increase in the characteristic intensity of the contact to the respective intensity is detected, wherein the first movement criteria include a criterion that is met when the contact has a first speed during the touch input, generating a selection input that corresponds to the increase in intensity of the contact to the respective intensity;

in accordance with a determination that the respective intensity is less than a first intensity threshold and that the movement of the contact meets second movement criteria when the increase in the characteristic intensity of the contact to the respective intensity is detected, wherein the second movement criteria include a criterion that is met when the contact has a second speed during the touch input that is greater than the first speed, forgoing generation of the selection input that corresponds to the increase in intensity of the contact to the respective intensity; and in accordance with a determination that the respective intensity is greater than the first intensity threshold and that the movement of the contact meets the second movement criteria, generating the selection input that corresponds to the increase in the intensity of the contact to the respective intensity.

2. The method of claim 1, wherein generating the selection input that corresponds to the increase in intensity of the contact to the respective intensity comprises initiating an operation to provide haptic feedback at the input device in response to generating the selection input.

3. The method of claim 1, further comprising:

in accordance with a determination that the movement of the contact meets the first movement criteria, and, after the increase in the characteristic intensity of the contact to the respective intensity is detected, the movement of the contact is less than a movement threshold, generating a click-and-hold input that corresponds to the contact.

4. The method of claim 3, further comprising:

in accordance with a determination that the movement of the contact meets the first movement criteria, and, after the increase in the characteristic intensity of the contact to the respective intensity is detected, the movement of the contact is greater than the movement threshold, generating a click-and-drag input that corresponds to the movement of the contact.

5. The method of claim 1, further comprising:

in accordance with a determination that the movement of the contact meets the second movement criteria, and the movement of the contact is less than a movement threshold, generating a tap input that corresponds to the contact.

6. The method of claim 5, further comprising:

in accordance with a determination that the movement of the contact meets the second movement criteria, and the movement of the contact is greater than the movement threshold, generating a swipe input that corresponds to the movement of the contact.

7. The method of claim 1, wherein:

the electronic device comprises the input device and the touch-sensitive surface, and generating the selection input comprises transmitting, by the electronic device, a corresponding first event to a second electronic device, different from the electronic device, to select a currently-selected user interface element displayed by the second electronic device.

8. The method of claim 7, wherein the electronic device comprises a mobile telephone.

9. The method of claim 7, further comprising:

in response to detecting the touchdown of the contact, transmitting, by the electronic device, a simulated touchdown event to the second electronic device.

10. The method of claim 7, further comprising:

in accordance with the determination that the movement of the contact meets the first movement criteria, transmitting, by the electronic device, a simulated button press event to the second electronic device.

11. The method of claim 7, wherein:

the electronic device comprises a multifunction device running a remote control application, and the remote control application causes the electronic device to transmit events, including the corresponding first event, to the second electronic device, the transmitted events corresponding to events transmitted to the second electronic device by a dedicated remote control device of the second electronic device, the dedicated remote control device having a trackpad that includes button click functionality.

12. The method of claim 1, further comprising:

detecting a second touch input on the touch-sensitive surface of the input device, wherein detecting the second touch input includes detecting touchdown of a second contact, movement of the second contact, and an increase in a characteristic intensity of the second contact to a second respective intensity, greater than the respective intensity; and in response to detecting the second touch input:

in accordance with a determination that the movement of the second contact meets the second movement criteria when the increase in the characteristic intensity of the second contact to the second respective intensity is detected, wherein the second movement criteria include a criterion that is met when the second contact has the second speed during the touch input that is greater than the first speed, generating a selection input that corresponds to the increase in intensity of the second contact to the second respective intensity; and in accordance with a determination that the movement of the second contact meets third movement criteria when the increase in the characteristic intensity of the second contact to the second respective intensity is detected, wherein the third movement criteria include a criterion that is met when the second contact has a third speed during the second touch input that is greater than the second speed, forgoing generation of the selection input that corresponds to the increase in intensity of the second contact to the second respective intensity.

13. The method of claim 1, wherein the movement of the contact meets the second movement criteria, and the method further comprises:

detecting a second touch input on the touch-sensitive surface of the input device after detecting liftoff of the contact in the touch input, wherein detecting the second touch input includes detecting touchdown of a second contact, movement of the second contact, and an increase in a characteristic intensity of the second contact to the respective intensity; and in response to detecting the second touch input, the movement of the second contact meeting the first movement criteria, wherein the first movement criteria includes a criterion that is met when the second contact has the first speed during the second touch input:

in accordance with a determination that the touchdown of the second contact is detected after a time threshold of the liftoff of the contact, generating a second selection input that corresponds to the increase in intensity of the second contact to the respective intensity; and in accordance with a determination that the touchdown of the second contact is detected within the time threshold of the liftoff of the contact, forgoing generation of the second selection input that corresponds to the increase in intensity of the second contact to the respective intensity.

14. The method of claim 1, wherein the movement of the contact meets the second movement criteria, and the method further comprises:

before detecting liftoff of the contact, detecting a slowdown of the contact from the second speed; and in response to detecting the slowdown of the contact from the second speed, in accordance with a determination that the movement of the contact after detecting the slowdown of the contact meets the first movement criteria, wherein the first movement criteria include the criterion that is met when the contact has the first speed during the touch input, generating the selection input that corresponds to the increase in intensity of the contact to the respective intensity.

15. The method of claim 14, wherein the first movement criteria include a criterion that is met when, after detecting the slowdown of the contact from the second speed, the contact has the first speed for longer than a time threshold.

16. The method of claim 1, further comprising:

after generating the selection input that corresponds to the increase in intensity of the contact to the respective intensity, initiating an operation to select an item in the user interface corresponding to a respective location at which the contact is positioned touching the touch-sensitive surface of the input device.

17. The method of claim 1, wherein the selection input that corresponds to the increase in intensity of the contact to the respective intensity is associated with an intensity threshold greater than a respective intensity threshold required to generate a selection input prior to the movement of the contact meeting the first movement criteria.

18. The method of claim 1, wherein:

generating the selection input that corresponds to the increase in the intensity of the contact to the respective intensity in accordance with the determination that the movement of the contact meets the first movement criteria is in accordance with a determination that the respective intensity is greater than a second intensity threshold required to generate a selection input, and the second intensity threshold is less than the first intensity threshold.

19. An electronic device, comprising:

one or more processors;

memory;

a display device;

one or more input devices; and one or more programs, wherein the one or more programs are stored in the memory and configured to be executed by the one or more processors, the one or more programs including instructions for:

detecting a touch input on a touch-sensitive surface of an input device that controls a user interface displayed by a display, wherein detecting the touch input includes detecting touchdown of a contact, movement of the contact, and an increase in a characteristic intensity of the contact to a respective intensity, wherein the characteristic intensity corresponds to force with which the contact is touching the touch-sensitive surface of the input device; and in response to detecting the touch input:

in accordance with a determination that the movement of the contact meets first movement criteria when the increase in the characteristic intensity of the contact to the respective intensity is detected, wherein the first movement criteria include a criterion that is met when the contact has a first speed during the touch input, generating a selection input that corresponds to the increase in intensity of the contact to the respective intensity;

in accordance with a determination that the respective intensity is less than a first intensity threshold and that the movement of the contact meets second movement criteria when the increase in the characteristic intensity of the contact to the respective intensity is detected, wherein the second movement criteria include a criterion that is met when the contact has a second speed during the touch input that is greater than the first speed, forgoing generation of the selection input that corresponds to the increase in intensity of the contact to the respective intensity, and in accordance with a determination that the respective intensity is greater than the first intensity threshold and that the movement of the contact meets the second movement criteria, generating the selection input that corresponds to the increase in the intensity of the contact to the respective intensity.

20. The electronic device of claim 19, wherein generating the selection input that corresponds to the increase in intensity of the contact to the respective intensity comprises initiating an operation to provide haptic feedback at the input device in response to generating the selection input.

21. The electronic device of claim 19, the one or more programs further including instructions for:

in accordance with a determination that the movement of the contact meets the first movement criteria, and, after the increase in the characteristic intensity of the contact to the respective intensity is detected, the movement of the contact is less than a movement threshold, generating a click-and-hold input that corresponds to the contact.

22. The electronic device of claim 21, the one or more programs further including instructions for:

in accordance with a determination that the movement of the contact meets the first movement criteria, and, after the increase in the characteristic intensity of the contact to the respective intensity is detected, the movement of the contact is greater than the movement threshold, generating a click-and-drag input that corresponds to the movement of the contact.

23. The electronic device of claim 19, the one or more programs further including instructions for:

in accordance with a determination that the movement of the contact meets the second movement criteria, and the movement of the contact is less than a movement threshold, generating a tap input that corresponds to the contact.

24. The electronic device of claim 23, the one or more programs further including instructions for:

in accordance with a determination that the movement of the contact meets the second movement criteria, and the movement of the contact is greater than the movement threshold, generating a swipe input that corresponds to the movement of the contact.

25. The electronic device of claim 19, wherein:
the electronic device comprises the input device and the touch-sensitive surface, and
generating the selection input comprises transmitting, by the electronic device, a corresponding first event to a second electronic device, different from the electronic device, to select a currently-selected user interface element displayed by the second electronic device.

26. The electronic device of claim 25, wherein the electronic device comprises a mobile telephone.

27. The electronic device of claim 25, the one or more programs further including instructions for:
in response to detecting the touchdown of the contact, transmitting, by the electronic device, a simulated touchdown event to the second electronic device.

28. The electronic device of claim 25, the one or more programs further including instructions for:
in accordance with the determination that the movement of the contact meets the first movement criteria, transmitting, by the electronic device, a simulated button press event to the second electronic device.

29. The electronic device of claim 25, wherein:
the electronic device comprises a multifunction device running a remote control application, and
the remote control application causes the electronic device to transmit events, including the corresponding first event, to the second electronic device, the transmitted events corresponding to events transmitted to the second electronic device by a dedicated remote control device of the second electronic device, the dedicated remote control device having a trackpad that includes button click functionality.

30. The electronic device of claim 19, the one or more programs further including instructions for:
detecting a second touch input on the touch-sensitive surface of the input device, wherein detecting the second touch input includes detecting touchdown of a second contact, movement of the second contact, and an increase in a characteristic intensity of the second contact to a second respective intensity, greater than the respective intensity; and
in response to detecting the second touch input:
in accordance with a determination that the movement of the second contact meets the second movement criteria when the increase in the characteristic intensity of the second contact to the second respective intensity is detected, wherein the second movement criteria include a criterion that is met when the second contact has the second speed during the touch input that is greater than the first speed, generating a selection input that corresponds to the increase in intensity of the second contact to the second respective intensity; and
in accordance with a determination that the movement of the second contact meets third movement criteria when the increase in the characteristic intensity of the second contact to the second respective intensity is detected, wherein the third movement criteria include a criterion that is met when the second contact has a third speed during the second touch input that is greater than the second speed, forgoing generation of the selection input that corresponds to the increase in intensity of the second contact to the second respective intensity.

31. The electronic device of claim 19, wherein the movement of the contact meets the second movement criteria, and the one or more programs further including instructions for:
detecting a second touch input on the touch-sensitive surface of the input device after detecting liftoff of the contact in the touch input, wherein detecting the second touch input includes detecting touchdown of a second contact, movement of the second contact, and an increase in a characteristic intensity of the second contact to the respective intensity; and
in response to detecting the second touch input, the movement of the second contact meeting the first movement criteria, wherein the first movement criteria includes a criterion that is met when the second contact has the first speed during the second touch input:
in accordance with a determination that the touchdown of the second contact is detected after a time threshold of the liftoff of the contact, generating a second selection input that corresponds to the increase in intensity of the second contact to the respective intensity; and
in accordance with a determination that the touchdown of the second contact is detected within the time threshold of the liftoff of the contact, forgoing generation of the second selection input that corresponds to the increase in intensity of the second contact to the respective intensity.

32. The electronic device of claim 19, wherein the movement of the contact meets the second movement criteria, and the one or more programs further including instructions for:
before detecting liftoff of the contact, detecting a slowdown of the contact from the second speed; and
in response to detecting the slowdown of the contact from the second speed, in accordance with a determination that the movement of the contact after detecting the slowdown of the contact meets the first movement criteria, wherein the first movement criteria include the criterion that is met when the contact has the first speed during the touch input, generating the selection input that corresponds to the increase in intensity of the contact to the respective intensity.

33. The electronic device of claim 32, wherein the first movement criteria include a criterion that is met when, after detecting the slowdown of the contact from the second speed, the contact has the first speed for longer than a time threshold.

34. The electronic device of claim 19, the one or more programs further including instructions for:
after generating the selection input that corresponds to the increase in intensity of the contact to the respective intensity, initiating an operation to select an item in the user interface corresponding to a respective location at which the contact is positioned touching the touch-sensitive surface of the input device.

35. The electronic device of claim 19, wherein the selection input that corresponds to the increase in intensity of the contact to the respective intensity is associated with an intensity threshold greater than a respective intensity threshold required to generate a selection input prior to the movement of the contact meeting the first movement criteria.

36. The electronic device of claim 19, wherein:
generating the selection input that corresponds to the increase in the intensity of the contact to the respective intensity in accordance with the determination that the movement of the contact meets the first movement criteria is in accordance with a determination that the respective intensity is greater than a second intensity threshold required to generate a selection input, and the second intensity threshold is less than the first intensity threshold.

37. A non-transitory computer readable storage medium storing one or more programs, the one or more programs comprising instructions, which when executed by one or more processors of an electronic device with a display device and one or more input devices, cause the electronic device to:

detect a touch input on a touch-sensitive surface of an input device that controls a user interface displayed by a display, wherein detecting the touch input includes detecting touchdown of a contact, movement of the contact, and an increase in a characteristic intensity of the contact to a respective intensity, wherein the characteristic intensity corresponds to force with which the contact is touching the touch-sensitive surface of the input device; and in response to detecting the touch input:

in accordance with a determination that the movement of the contact meets first movement criteria when the increase in the characteristic intensity of the contact to the respective intensity is detected, wherein the first movement criteria include a criterion that is met when the contact has a first speed during the touch input, generate a selection input that corresponds to the increase in intensity of the contact to the respective intensity;

in accordance with a determination that the respective intensity is less than a first intensity threshold and that the movement of the contact meets second movement criteria when the increase in the characteristic intensity of the contact to the respective intensity is detected, wherein the second movement criteria include a criterion that is met when the contact has a second speed during the touch input that is greater than the first speed, forgo generation of the selection input that corresponds to the increase in intensity of the contact to the respective intensity; and in accordance with a determination that the respective intensity is greater than the first intensity threshold and that the movement of the contact meets the second movement criteria, generating the selection input that corresponds to the increase in the intensity of the contact to the respective intensity.

38. The non-transitory computer readable storage medium of claim 37, wherein generating the selection input that corresponds to the increase in intensity of the contact to the respective intensity comprises initiating an operation to provide haptic feedback at the input device in response to generating the selection input.

39. The non-transitory computer readable storage medium of claim 37, the one or more programs further comprising instructions for:

in accordance with a determination that the movement of the contact meets the first movement criteria, and, after the increase in the characteristic intensity of the contact to the respective intensity is detected, the movement of the contact is less than a movement threshold, generating a click-and-hold input that corresponds to the contact.

40. The non-transitory computer readable storage medium of claim 39, the one or more programs further comprising instructions for:

in accordance with a determination that the movement of the contact meets the first movement criteria, and, after the increase in the characteristic intensity of the contact to the respective intensity is detected, the movement of the contact is greater than the movement threshold, generating a click-and-drag input that corresponds to the movement of the contact.

41. The non-transitory computer readable storage medium of claim 37, the one or more programs further comprising instructions for:

in accordance with a determination that the movement of the contact meets the second movement criteria, and the movement of the contact is less than a movement threshold, generating a tap input that corresponds to the contact.

42. The non-transitory computer readable storage medium of claim 41, the one or more programs further comprising instructions for:

in accordance with a determination that the movement of the contact meets the second movement criteria, and the movement of the contact is greater than the movement threshold, generating a swipe input that corresponds to the movement of the contact.

43. The non-transitory computer readable storage medium of claim 37, wherein:

the electronic device comprises the input device and the touch-sensitive surface, and generating the selection input comprises transmitting, by the electronic device, a corresponding first event to a second electronic device, different from the electronic device, to select a currently-selected user interface element displayed by the second electronic device.

44. The non-transitory computer readable storage medium of claim 43, wherein the electronic device comprises a mobile telephone.

45. The non-transitory computer readable storage medium of claim 43, the one or more programs further comprising instructions for:

in response to detecting the touchdown of the contact, transmitting, by the electronic device, a simulated touchdown event to the second electronic device.

46. The non-transitory computer readable storage medium of claim 43, the one or more programs further comprising instructions for:

in accordance with the determination that the movement of the contact meets the first movement criteria, transmitting, by the electronic device, a simulated button press event to the second electronic device.

47. The non-transitory computer readable storage medium of claim 43, wherein:

the electronic device comprises a multifunction device running a remote control application, and the remote control application causes the electronic device to transmit events, including the corresponding first event, to the second electronic device, the transmitted events corresponding to events transmitted to the second electronic device by a dedicated remote control device of the second electronic device, the dedicated remote control device having a trackpad that includes button click functionality.

48. The non-transitory computer readable storage medium of claim 37, the one or more programs further comprising instructions for:

detecting a second touch input on the touch-sensitive surface of the input device, wherein detecting the second touch input includes detecting touchdown of a second contact, movement of the second contact, and an increase in a characteristic intensity of the second contact to a second respective intensity, greater than the respective intensity; and in response to detecting the second touch input:

in accordance with a determination that the movement of the second contact meets the second movement criteria when the increase in the characteristic intensity of the second contact to the second respective intensity is detected, wherein the second movement criteria include a criterion that is met when the second contact has the second speed during the touch input that is greater than the first speed, generating a selection input that corresponds to the increase in intensity of the second contact to the second respective intensity; and in accordance with a determination that the movement of the second contact meets third movement criteria when the increase in the characteristic intensity of the second contact to the second respective intensity is detected, wherein the third movement criteria include a criterion that is met when the second contact has a third speed during the second touch input that is greater than the second speed, forgoing generation of the selection input that corresponds to the increase in intensity of the second contact to the second respective intensity.

49. The non-transitory computer readable storage medium of claim 37, wherein the movement of the contact meets the second movement criteria, and the one or more programs further comprising instructions for:

detecting a second touch input on the touch-sensitive surface of the input device after detecting liftoff of the contact in the touch input, wherein detecting the second touch input includes detecting touchdown of a second contact, movement of the second contact, and an increase in a characteristic intensity of the second contact to the respective intensity; and in response to detecting the second touch input, the movement of the second contact meeting the first movement criteria, wherein the first movement criteria includes a criterion that is met when the second contact has the first speed during the second touch input:

in accordance with a determination that the touchdown of the second contact is detected after a time threshold of the liftoff of the contact, generating a second selection input that corresponds to the increase in intensity of the second contact to the respective intensity; and in accordance with a determination that the touchdown of the second contact is detected within the time threshold of the liftoff of the contact, forgoing generation of the second selection input that corresponds to the increase in intensity of the second contact to the respective intensity.

50. The non-transitory computer readable storage medium of claim 37, wherein the movement of the contact meets the second movement criteria, and the one or more programs further comprising instructions for:

before detecting liftoff of the contact, detecting a slowdown of the contact from the second speed; and in response to detecting the slowdown of the contact from the second speed, in accordance with a determination that the movement of the contact after detecting the slowdown of the contact meets the first movement criteria, wherein the first movement criteria include the criterion that is met when the contact has the first speed during the touch input, generating the selection input that corresponds to the increase in intensity of the contact to the respective intensity.

51. The non-transitory computer readable storage medium of claim 50, wherein the first movement criteria include a criterion that is met when, after detecting the slowdown of the contact from the second speed, the contact has the first speed for longer than a time threshold.

52. The non-transitory computer readable storage medium of claim 37, the one or more programs further comprising instructions for:

after generating the selection input that corresponds to the increase in intensity of the contact to the respective intensity, initiating an operation to select an item in the user interface corresponding to a respective location at which the contact is positioned touching the touch-sensitive surface of the input device.

53. The non-transitory computer readable storage medium of claim 37, wherein the selection input that corresponds to the increase in intensity of the contact to the respective intensity is associated with an intensity threshold greater than a respective intensity threshold required to generate a selection input prior to the movement of the contact meeting the first movement criteria.

54. The non-transitory computer readable storage medium of claim 37, wherein:

generating the selection input that corresponds to the increase in the intensity of the contact to the respective intensity in accordance with the determination that the movement of the contact meets the first movement criteria is in accordance with a determination that the respective intensity is greater than a second intensity threshold required to generate a selection input, and the second intensity threshold is less than the first intensity threshold.

* * * * *